Figure 1:
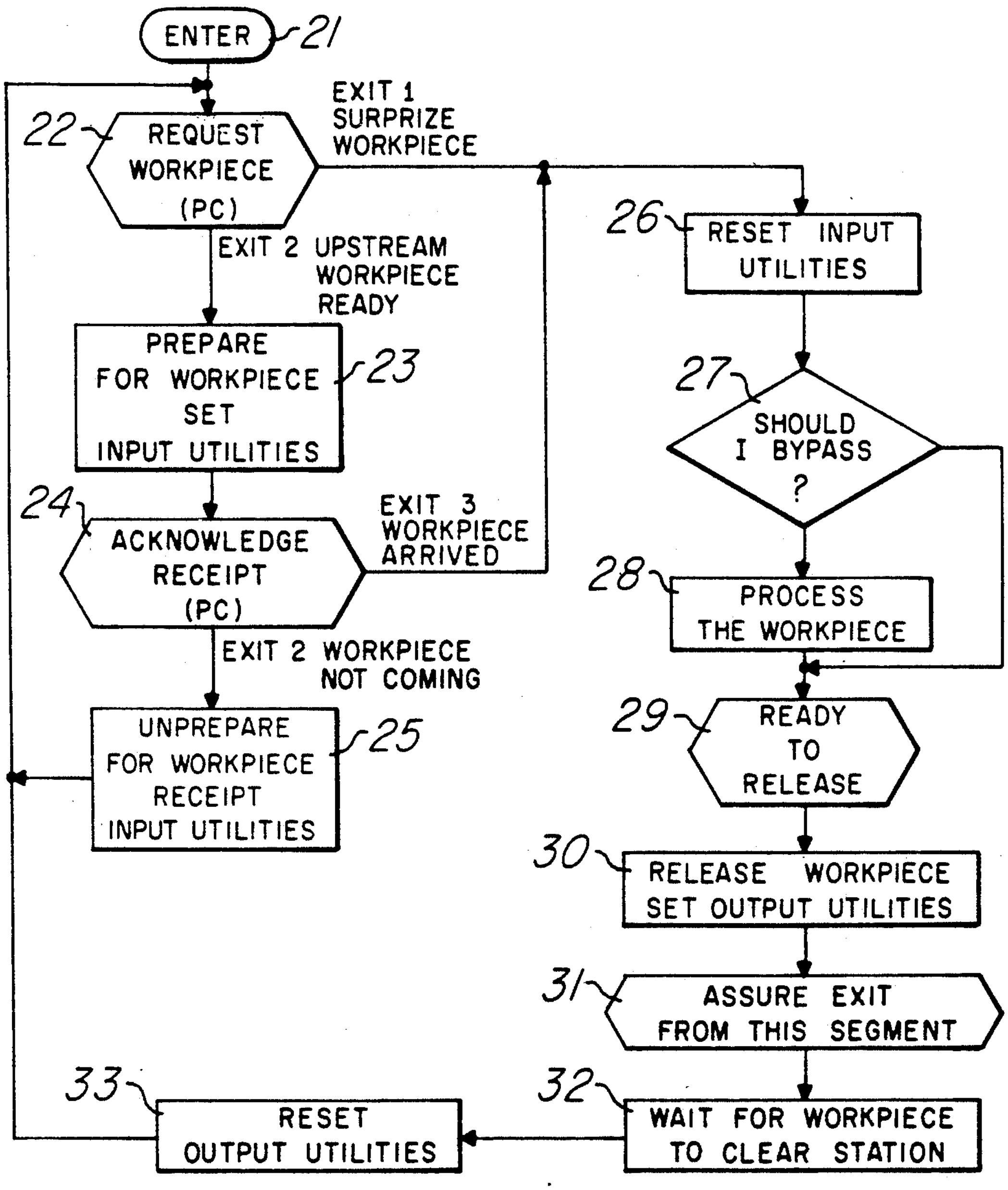

US005216613A

United States Patent [19]

Head, III

[11] Patent Number: 5,216,613

[45] Date of Patent: Jun. 1, 1993

[54] SEGMENTED ASYNCHRONOUS OPERATION OF AN AUTOMATED ASSEMBLY LINE

[75] Inventor: Claude D. Head, III, Dallas, Tex.

[73] Assignee: Texas Instruments Incorporated, Dallas, Tex.

[21] Appl. No.: 928,631

[22] Filed: Aug. 12, 1992

Related U.S. Application Data

[60] Continuation of Ser. No. 837,670, Feb. 14, 1992, abandoned, which is a division of Ser. No. 759,799, Sep. 13, 1991, abandoned, which is a continuation of Ser. No. 398,796, Aug. 24, 1989, abandoned, which is a division of Ser. No. 696,876, Jan. 30, 1985, Pat. No. 4,884,674, which is a continuation of Ser. No. 599,211, Apr. 12, 1984, abandoned, which is a continuation of Ser. No. 269,306, Jun. 1, 1981, abandoned, which is a division of Ser. No. 134,387, Apr. 16, 1971, Pat. No. 4,306,292.

[51] Int. Cl.[5] .......... G11B 3/70

[52] U.S. Cl. .......... 369/275.2; 369/13; 369/283

[58] Field of Search .......... 364/468, 478, 401–403, 364/131–139, DIG. 1 MS File, DIG. 2 MS File; 377/2, 15, 16; 29/430, 564–564.8; 483/4–6, 7–11; 340/825.06, 825.07, 825.08, 825.22, 825.23; 198/339.1, 341, 345.1, 345.2, 460, 464.2

[56] References Cited

U.S. PATENT DOCUMENTS

| | | | |
|---|---|---|---|
| 3,122,231 | 2/1964 | Pence et al. | 198/341 |
| 3,576,540 | 4/1971 | Fair et al. | 364/200 |
| 3,626,385 | 12/1971 | Bouman | 364/138 X |
| 3,703,725 | 11/1972 | Gomersall et al. | 364/468 X |
| 3,812,947 | 5/1974 | Nygaard | 198/341 |
| 4,237,598 | 12/1980 | Williamson | 364/478 X |
| 4,309,600 | 1/1982 | Perry et al. | 364/468 X |

*Primary Examiner*—Joseph Ruggiero
*Attorney, Agent, or Firm*—Ronald O. Neerings; James C. Kesterson; Richard L. Donaldson

[57] ABSTRACT

An automated assembly line is controlled by a computer system. The assembly line is comprised of a plurality of machines which are each segmented into its basic unit operations providing work stations. The work stations are then controlled by the computer system and operated asynchronously with respect to the other work stations of the assembly line.

7 Claims, 65 Drawing Sheets

SEGMENTED ASYNCHRONOUS OPERATION OF AN AUTOMATED ASSEMBLY LINE

This application is a continuation of application Ser. No. 07/837,670, filed Feb. 14, 1992, abandoned, which is a divisional of Ser. No. 07/759,799, filed Sep. 13, 1991, abandoned, which is a continuation of Ser. No. 07/398,796 filed Aug. 24, 1989, abandoned, which is a divisional of Ser. No. 06/696,876 filed Jan. 30, 1985, U.S. Pat. No. 4,884,674 which is a continuation of Ser. No. 06/599,211 filed Apr. 12, 1984, abandoned, which is a continuation of Ser. No. 06/269,306 filed Jun. 1, 1981, abandoned, which is a divisional of Ser. No. 05/134,387 filed Apr. 16, 1971, U.S. Pat. No. 4,306,292.

This invention relates to automated assembly lines and, in particular, to computer controlled and operated automated assembly lines. More particularly, the invention relates to methods for the real time asynchronous operation of a computer controlled and operated automated assembly line.

This invention also relates to copending patent application Ser. No. 134,388 now U.S. Pat. No. 4,314,342 by McNeir et al for UNSAFE MACHINES WITHOUT SAFE POSITIONS, assigned to the assignee of and filed of even date with the present invention.

The invention is widely useful for the computer control and operation of automated assembly lines. One such assembly line in which the present invention has been successfully utilized is described in copending patent application Ser. No. 845,733, filed Jul. 29, 1969 now U.S. Pat. No. 3,765,763 by James L. Nygaard for AUTOMATIC SLICE PROCESSING. This particular assembly line is for the manufacturing of semiconductor circuits and devices. Application Ser. No. 845,733 is hereby incorporated by reference. Other lines in which the present invention is useful include automobile manufacturing assembly lines, engine manufacturing assembly lines, tire manufacturing assembly lines, railroad operation and control, etc..

The invention will best be understood from the claims when read in conjunction with the detailed description and drawings wherein:

INTRODUCTION

Figure 2:
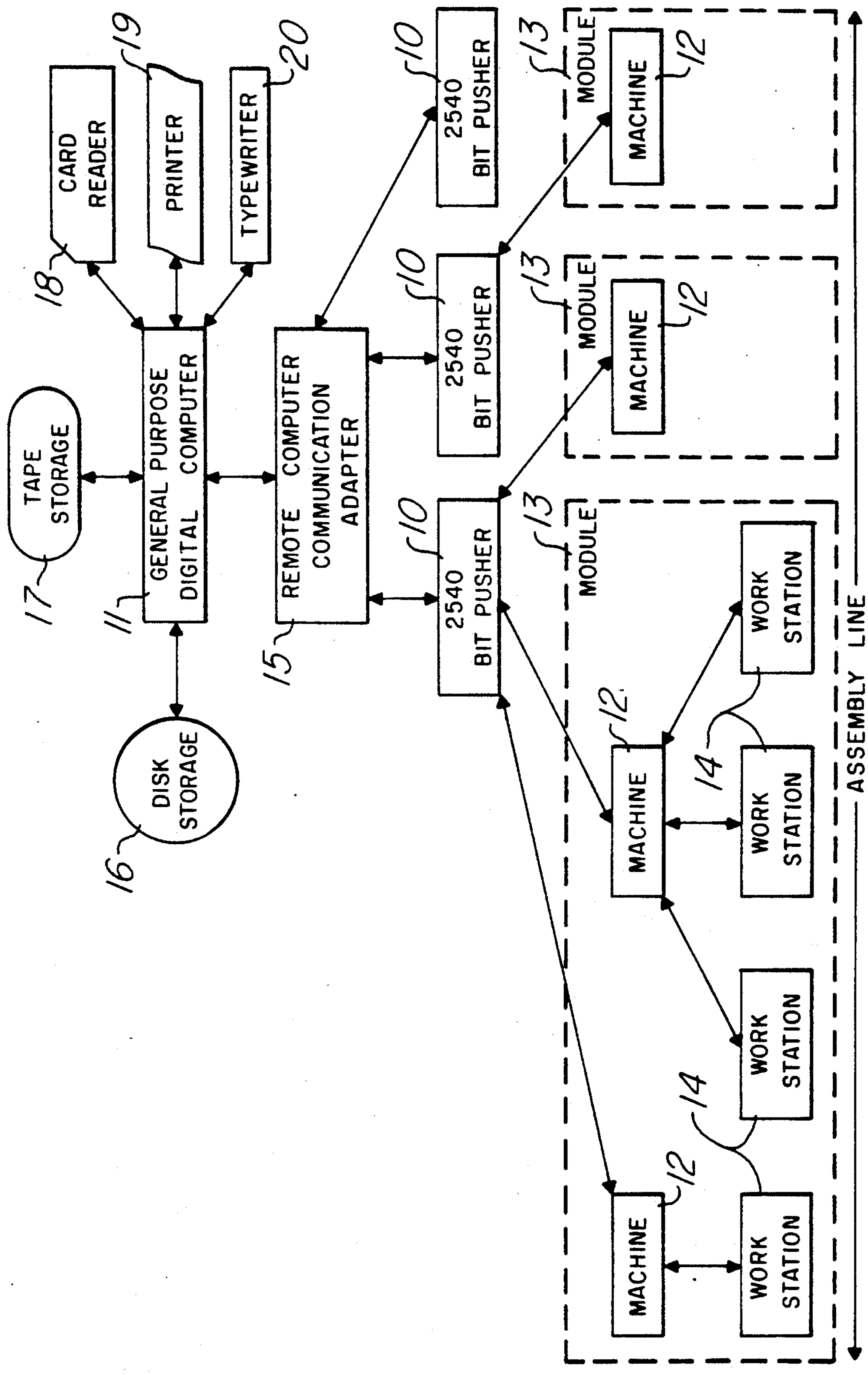
Figure 10:
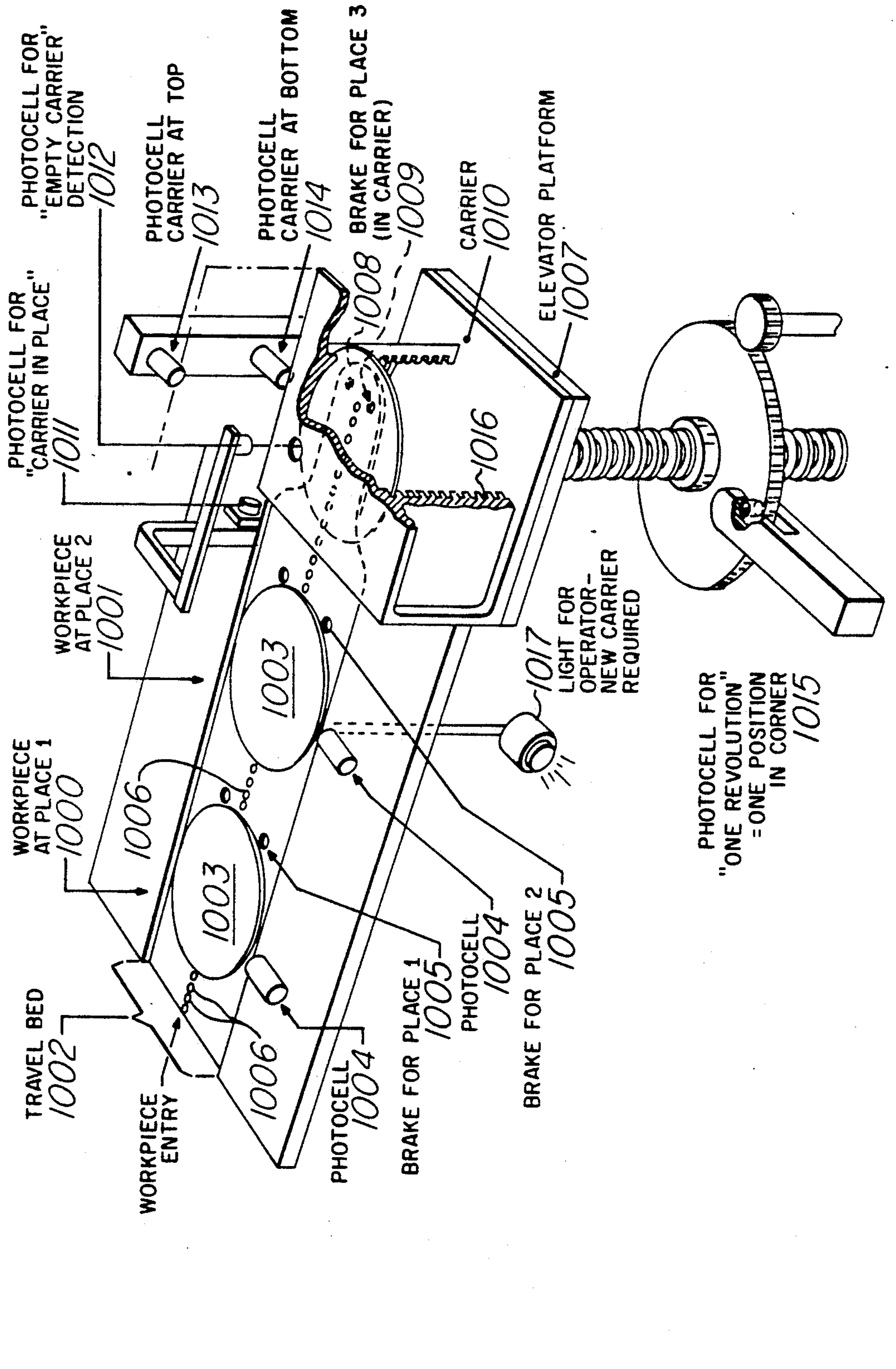
Figure 11A:
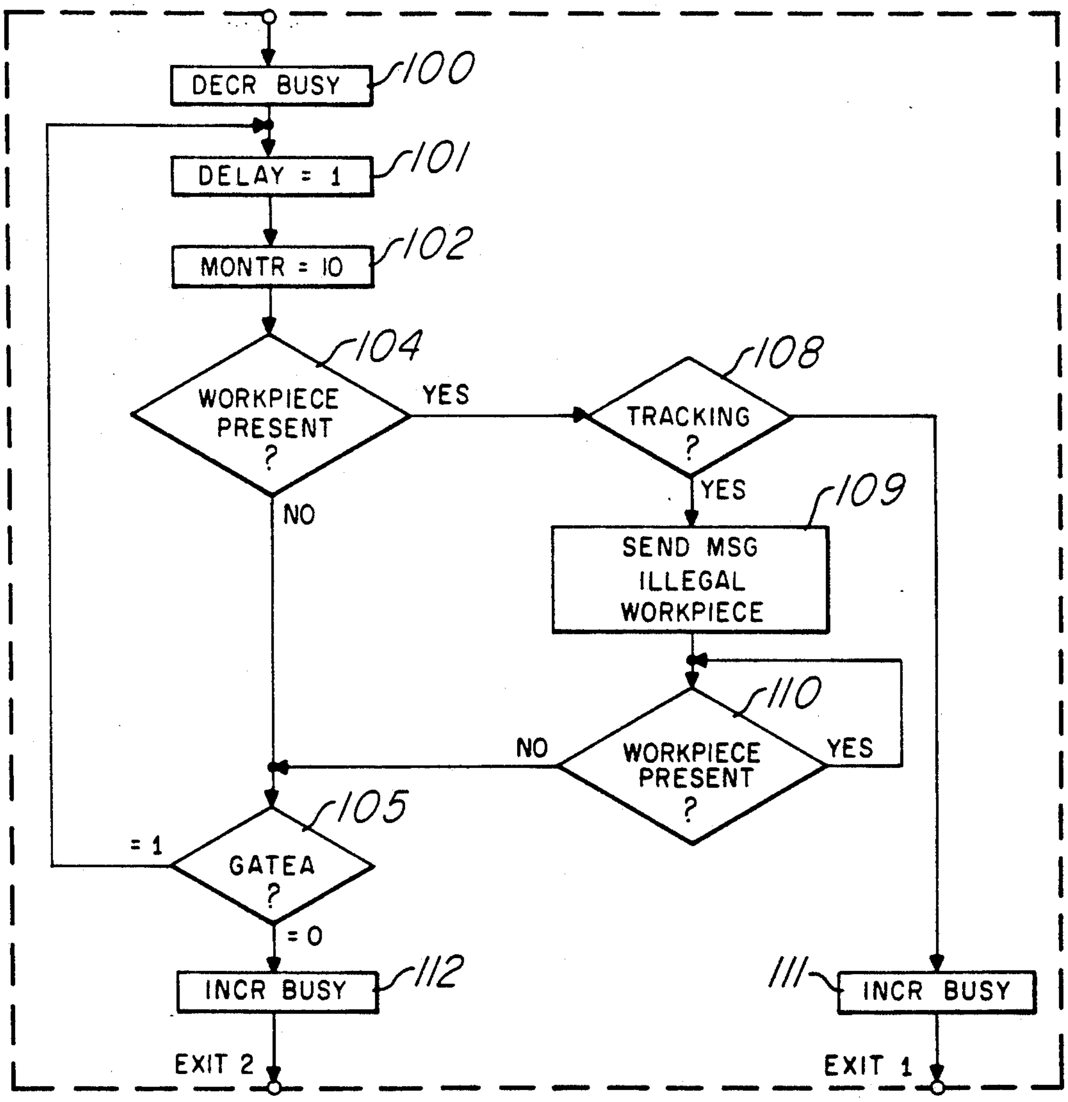
Figure 11B:
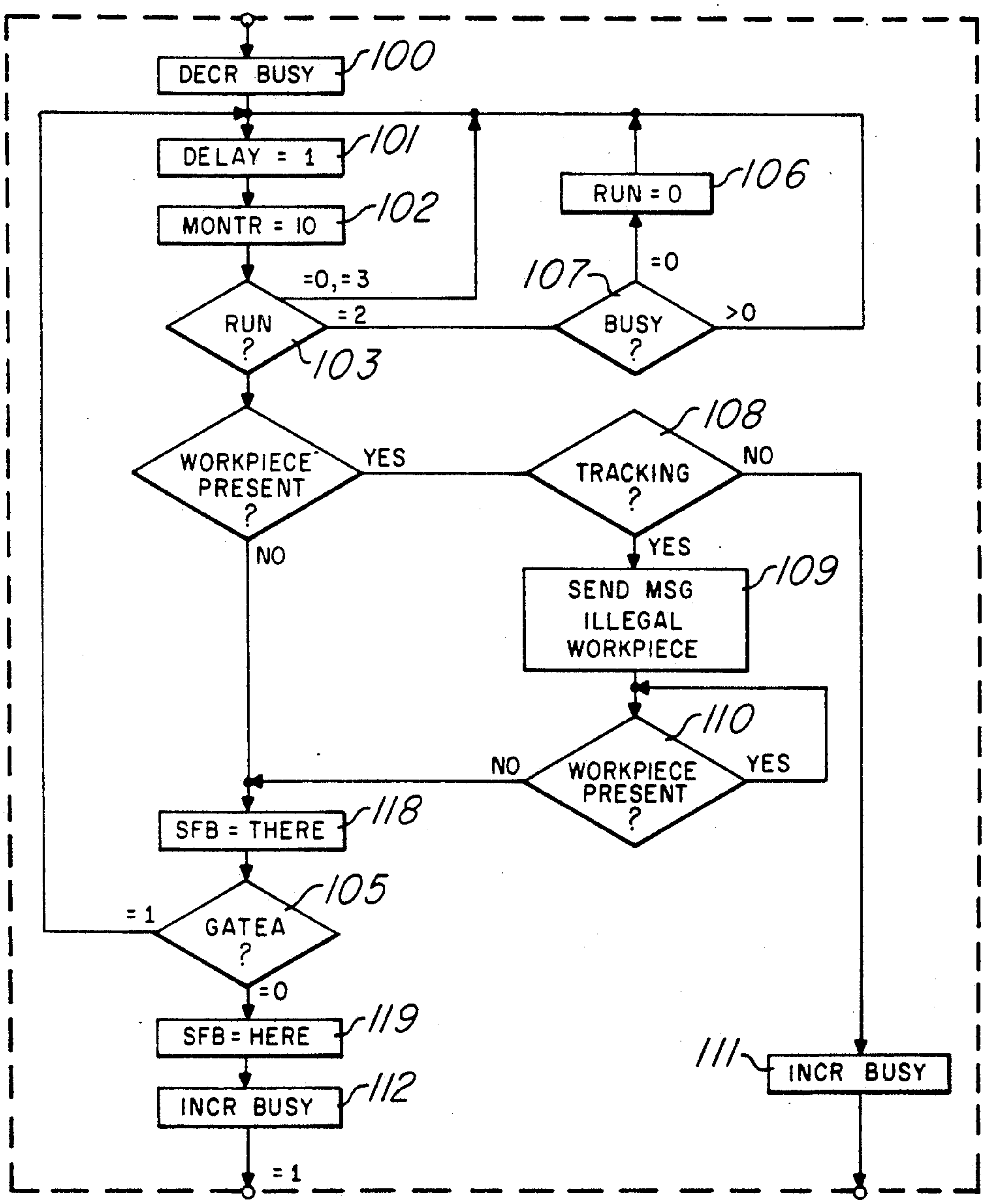
Figure 11C:
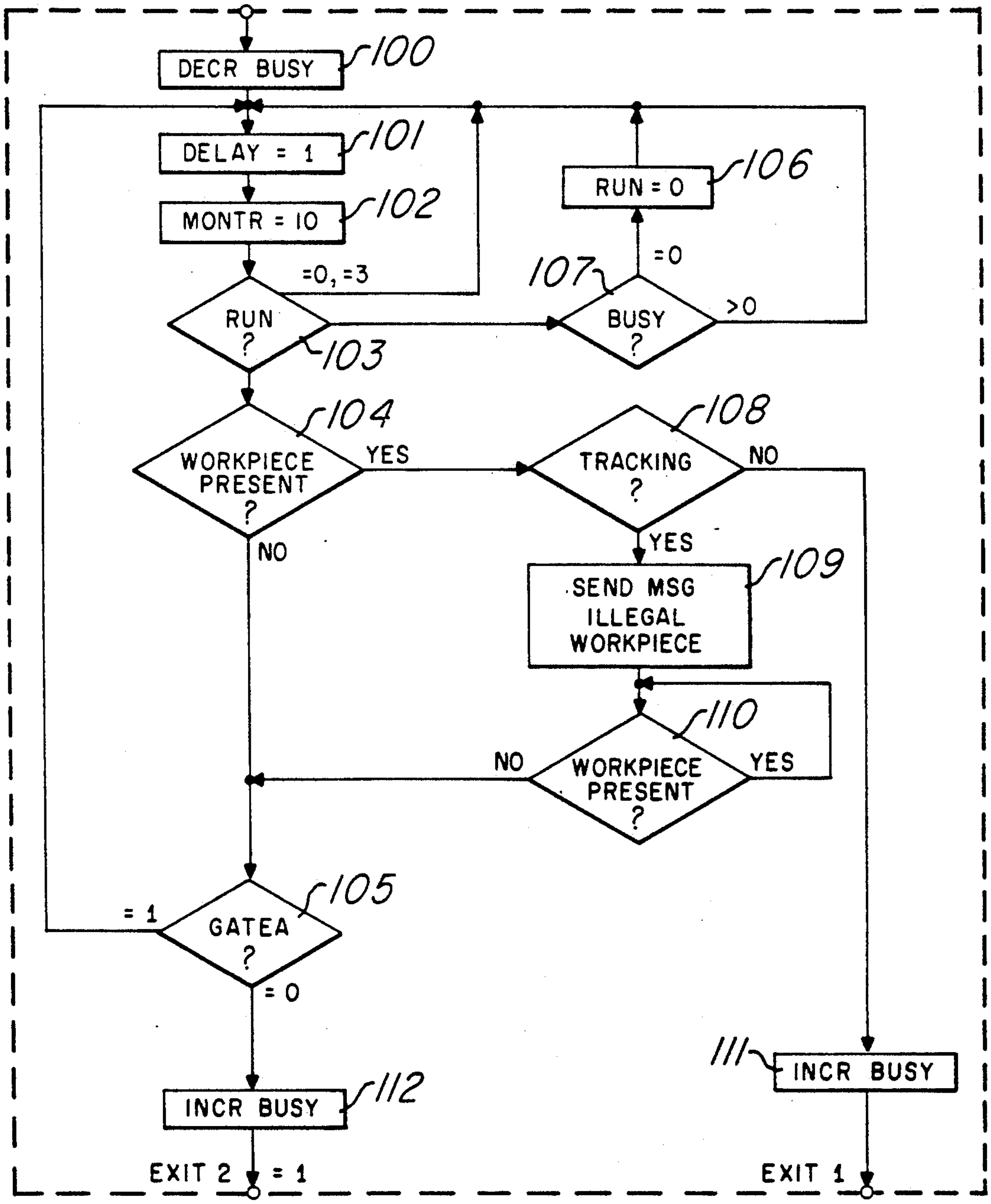
Figure 11D:
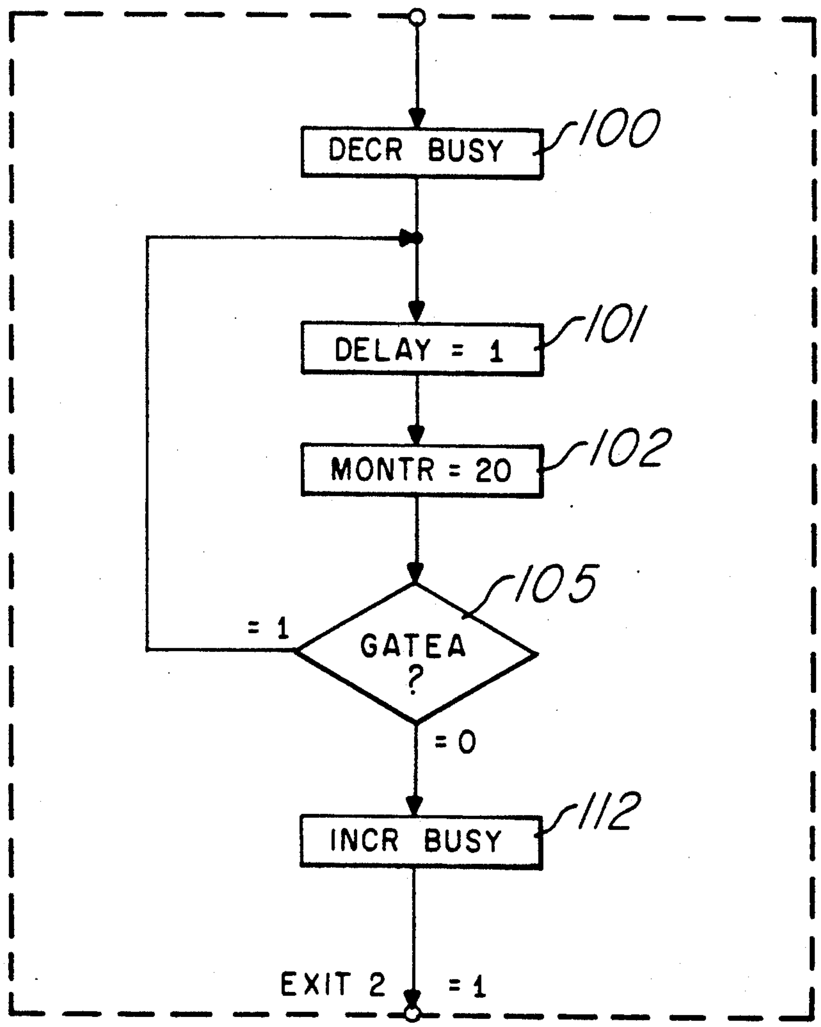
Figure 11E:
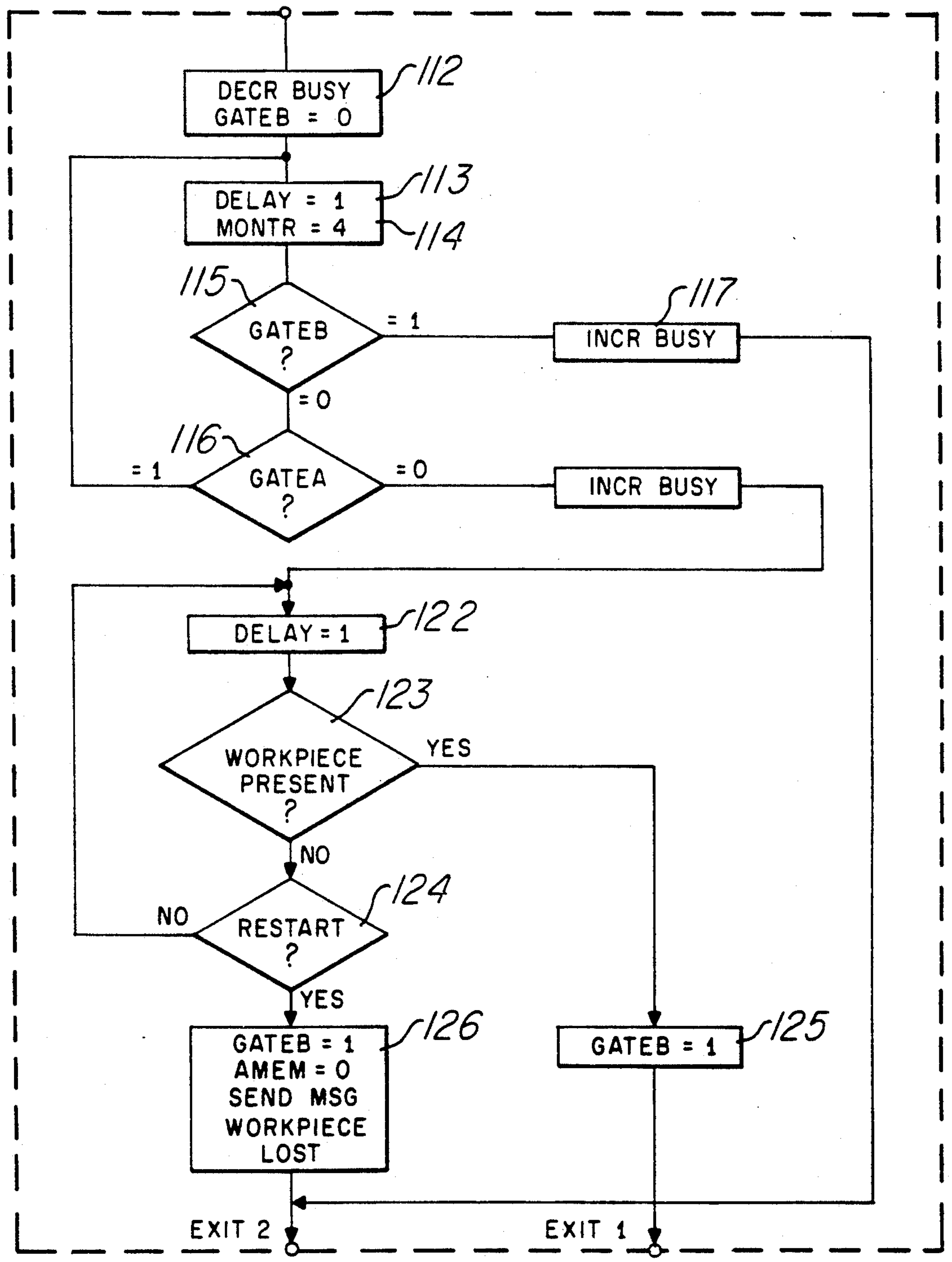
Figure 11F:
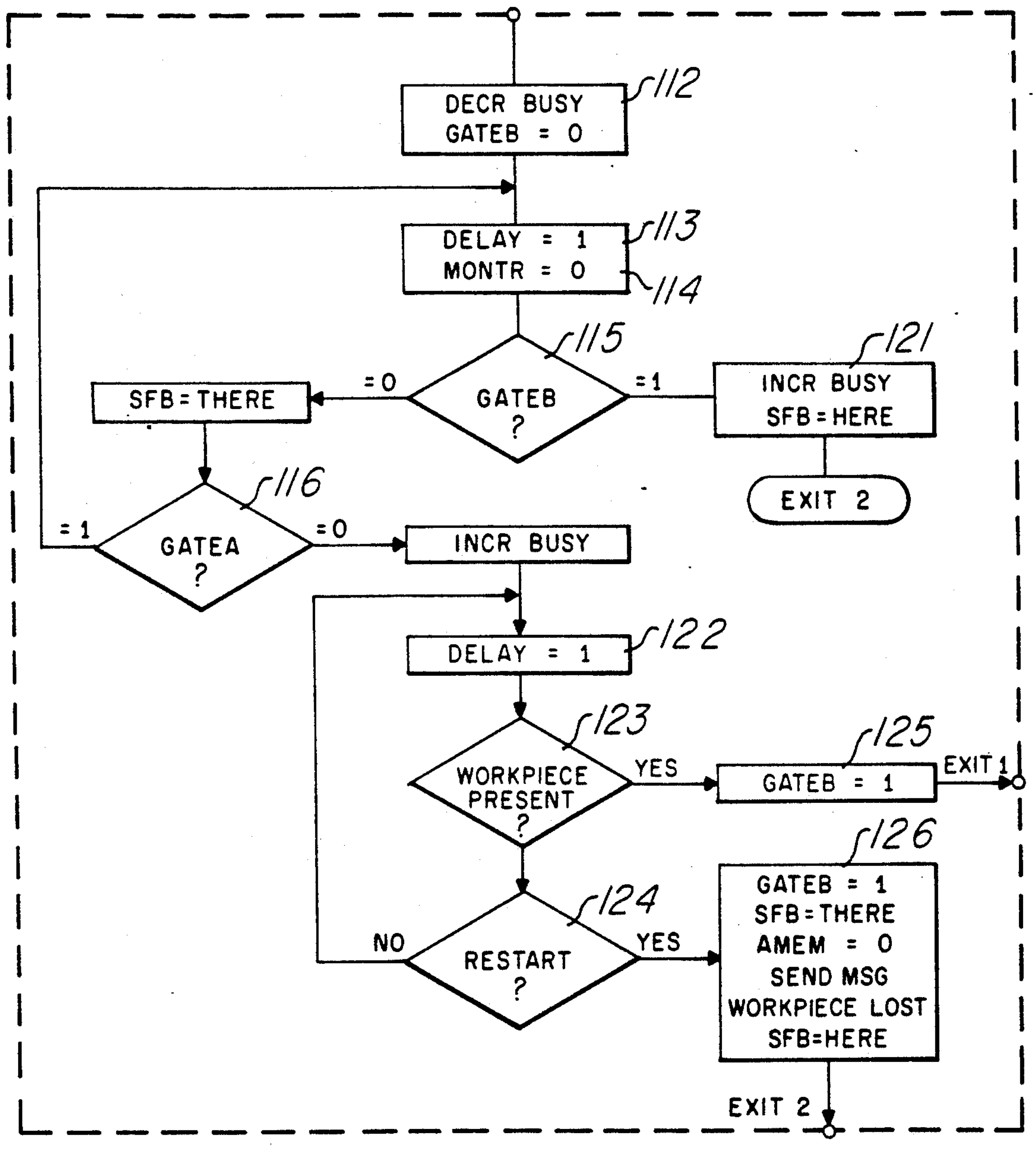

- FIG. 1 Flowchart of a general segment operating procedure
- FIG. 10 Infra
- TABLES 1A-B Description of the normal sequence of events when a workpiece is transferred from work station to work station
- FIG. 2 Block diagram of a computer system utilized in conjunction with an embodiment of the invention

BIT PUSHER COMPUTER 10

- TABLE IIa Description of four special MODE 2 registers utilized to accomplish reentrancy
- TABLE II Description of the 2540M bit pusher status word conventions and the order of the interrupt service routine
- TABLE III Description of the interrupt levels of an embodiment of the 2540M bit pusher and their assignments
- TABLE IV Description of the four major areas into which the 2540M computer core is divided and the core assignments of these four areas in the present embodiment
- TABLE V Description of the core structure of the 2540M computer for MODE 1 programs and data to provide segmented operation in the present embodiment
- TABLE VI Description of the core structure of the 2540M computer for MODE 2 programs and data in the present embodiment
- TABLE VIIa Description of the basic core structure of the MODE 2 Machine Header Array subdivision
- TABLE VIIb Description of the basic core structure of the MODE 2 Machine Procedures
- TABLE VIIc Description of the basic core structure of the MODE 2 Machine Data Area
- TABLE VIId Description of the basic core structure of the MODE 2 Abnormal Neighbor Pointers
- TABLE VIIe Description of the basic core structure of the MODE 2 Software Bit Flags

2540M PROGRAMS

PROCEDURE SEGMENTS

CONTEXT SWITCHING

SUPERVISORY PROGRAMS

GENERAL PURPOSE COMPUTER 11

- FIG. 2 Supra

GLOBAL SOFTWARE SUBROUTINES

- TABLE VIII Summarizes the relationship between the various GLOBAL subroutines

(I.1) REQUEST WORKPIECE ROUTINES

Figure 3A:
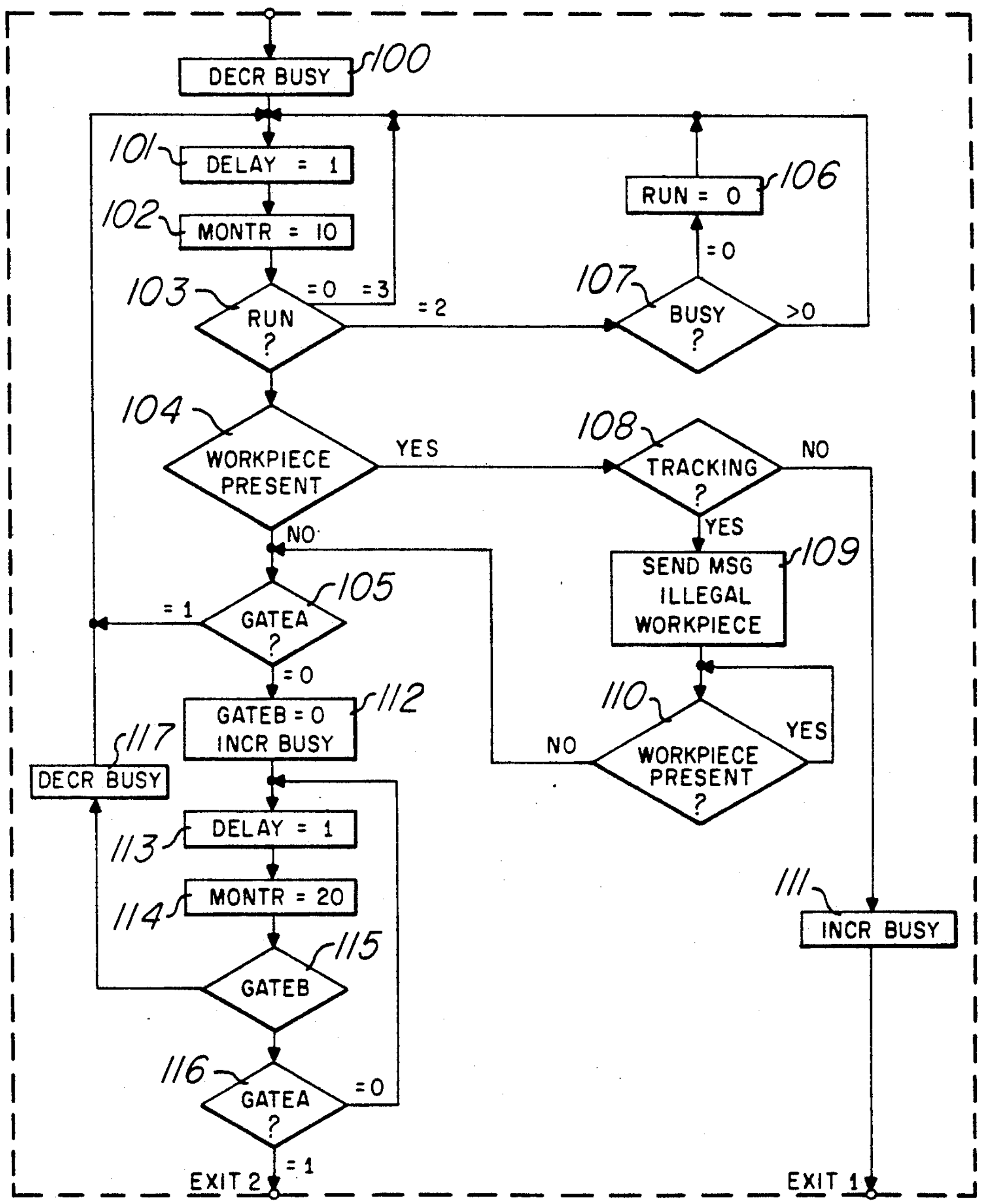
Figure 3B:
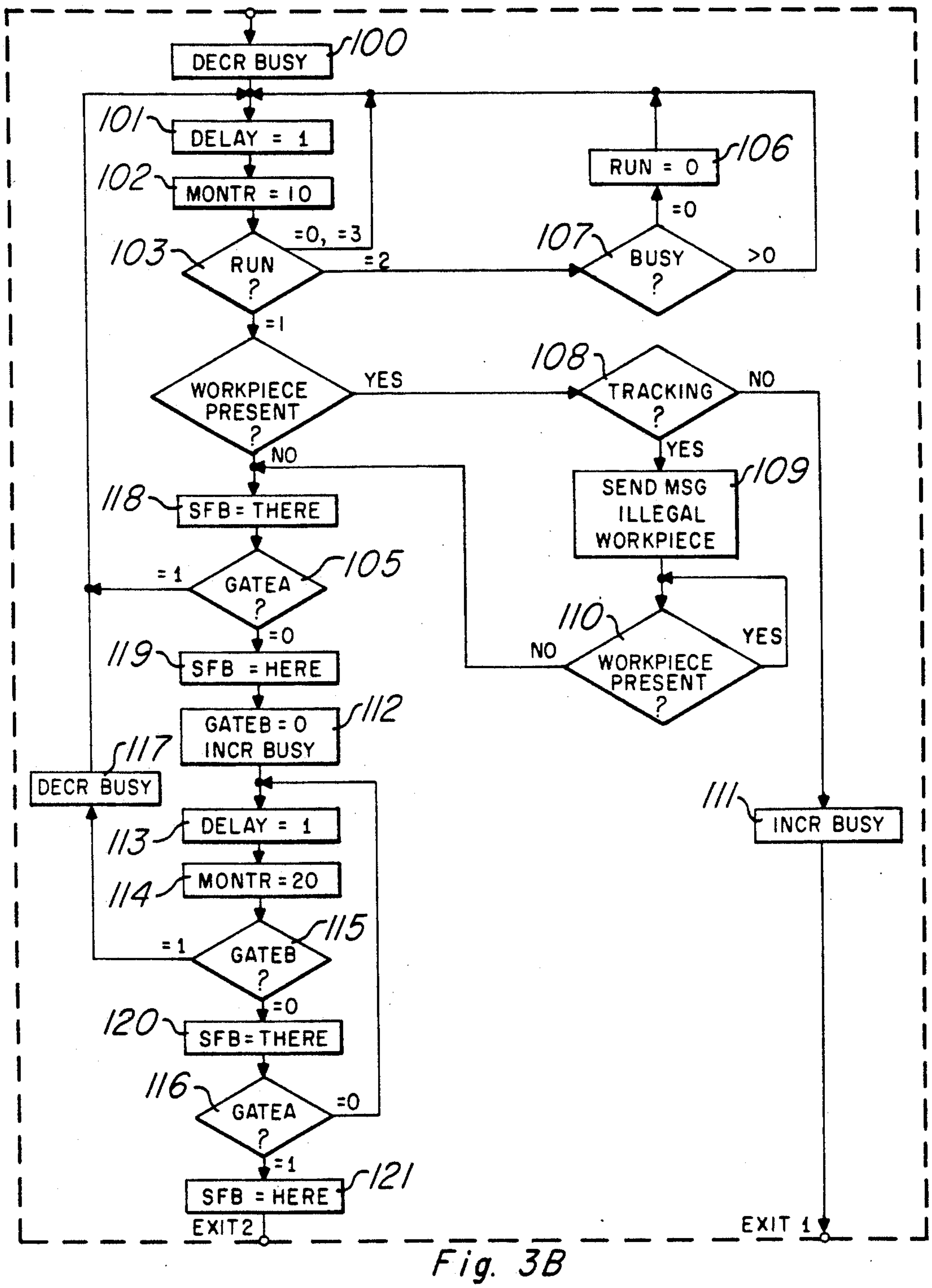
Figure 3C:
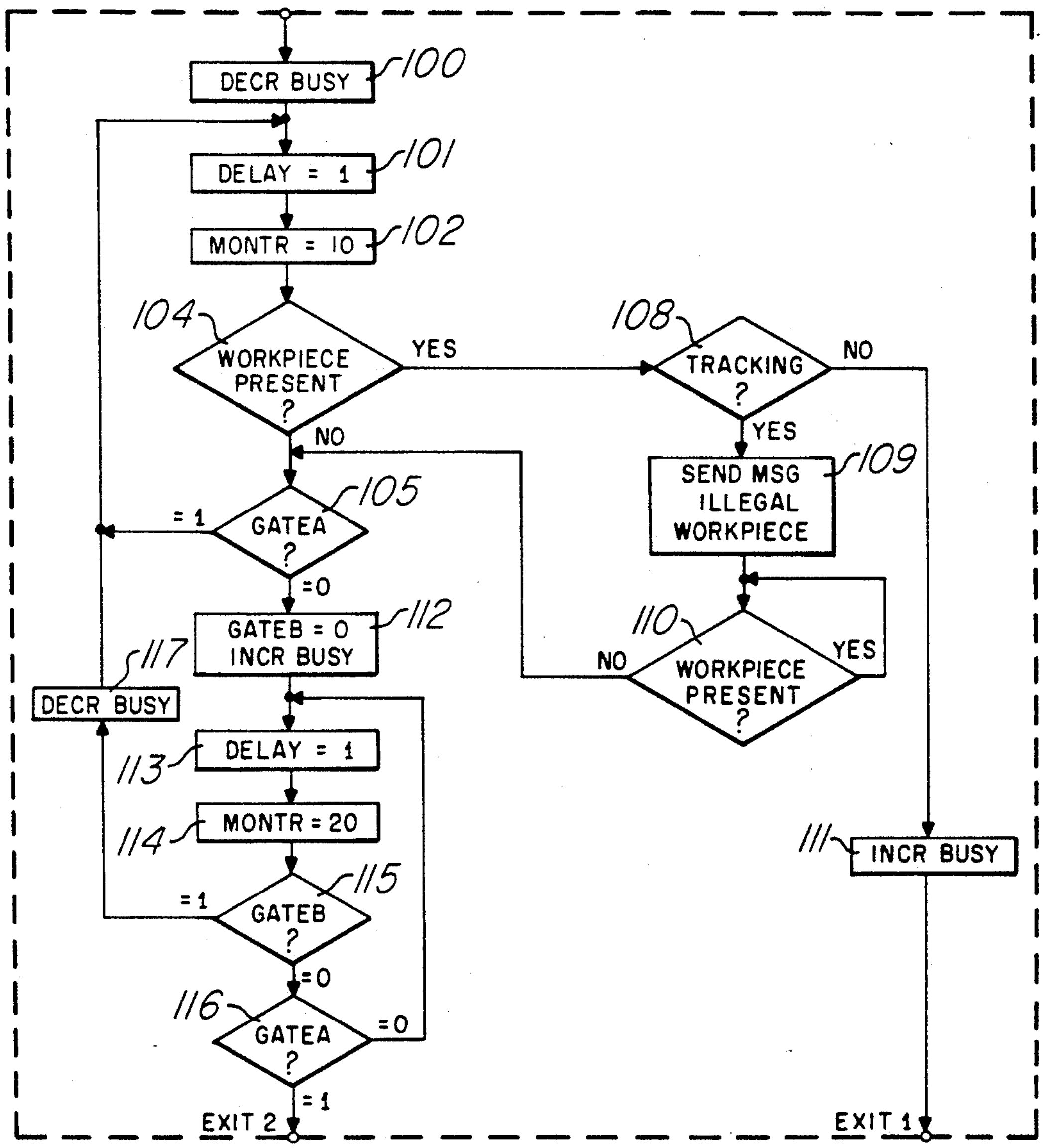
Figure 3D:
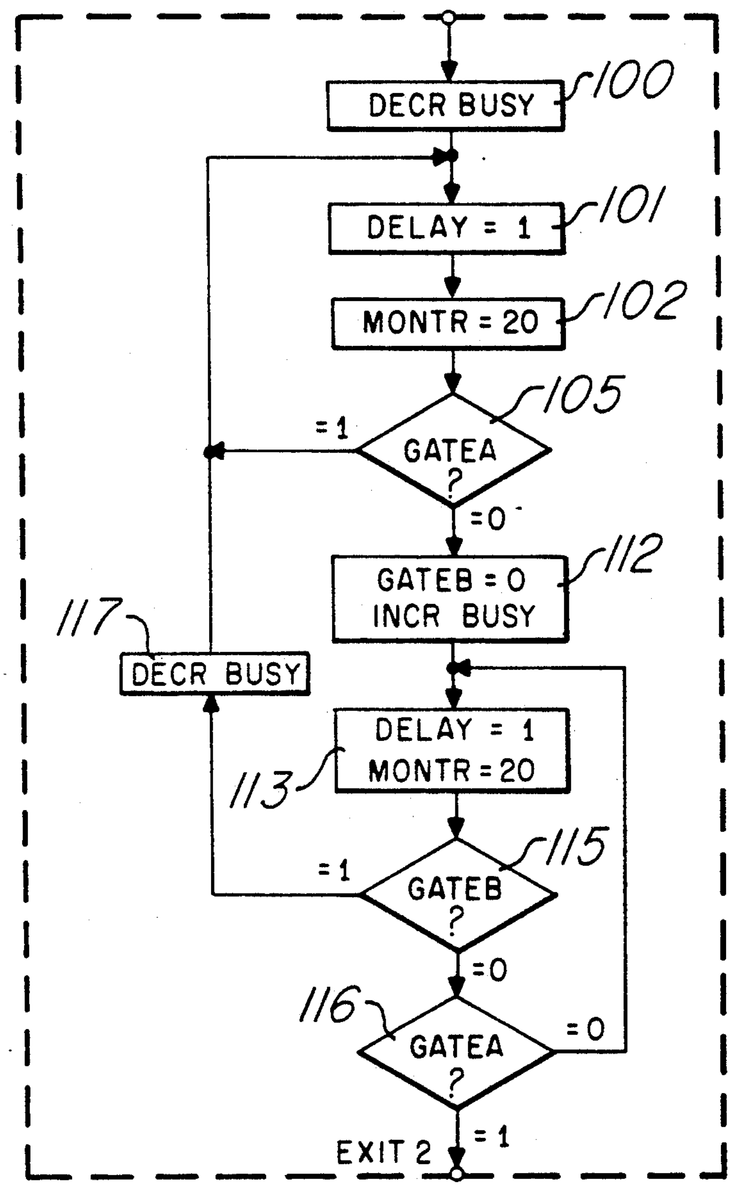

- FIG. 3A Flowchart of request workpiece routine for the first segment with a normal predecessor
- FIG. 3B Flowchart of request workpiece routine for the first segment with an abnormal predecessor
- FIG. 3C Flowchart of request workpiece routine for the second to Nth segment where sensor available
- FIG. 3D Flowchart of request workpiece routine for the second to Nth segment where sensor not available

(I.2) ACKNOWLEDGE RECEIPT OF WORKPIECE ROUTINES

Figure 3E:
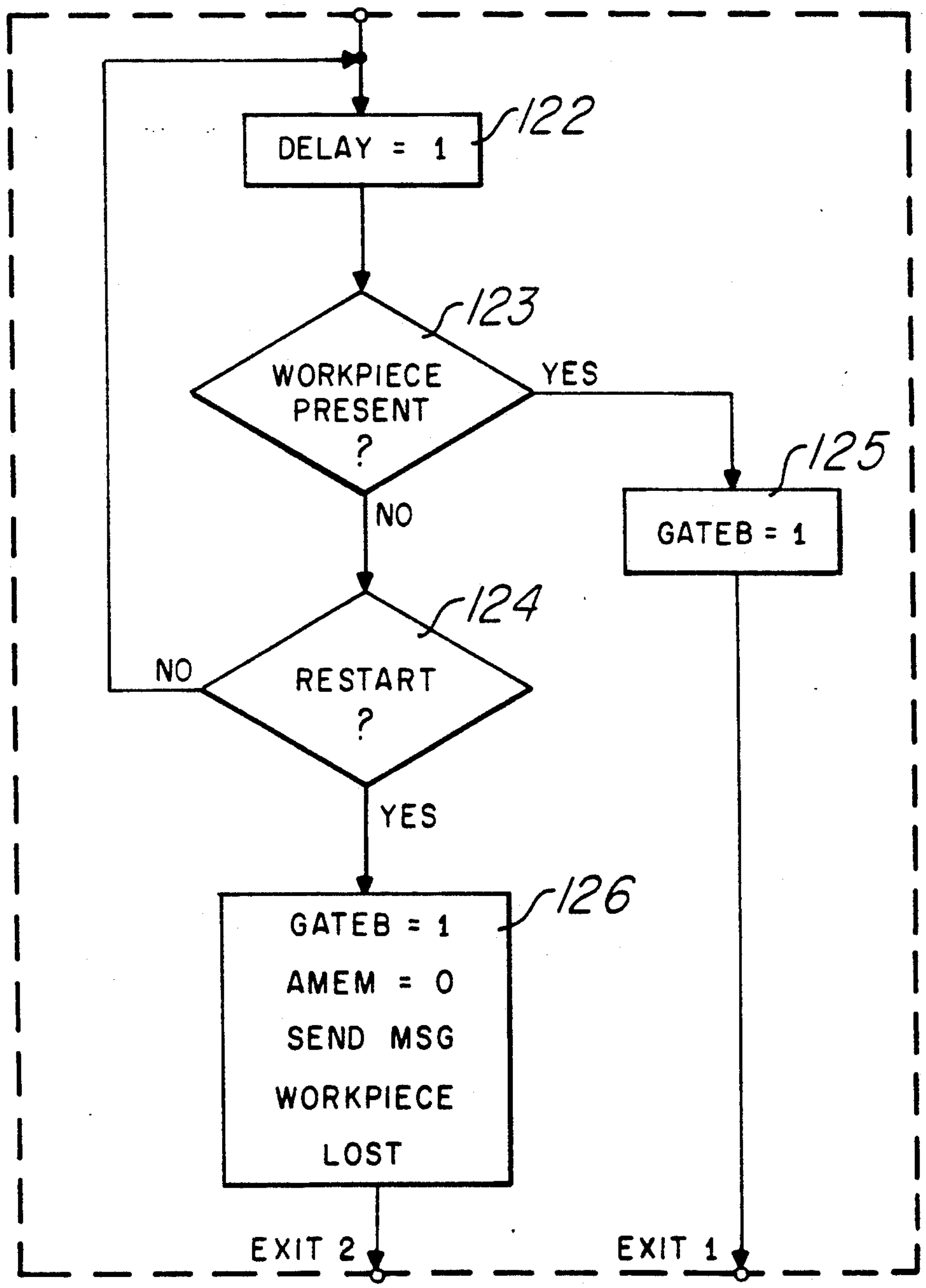
Figure 3F:
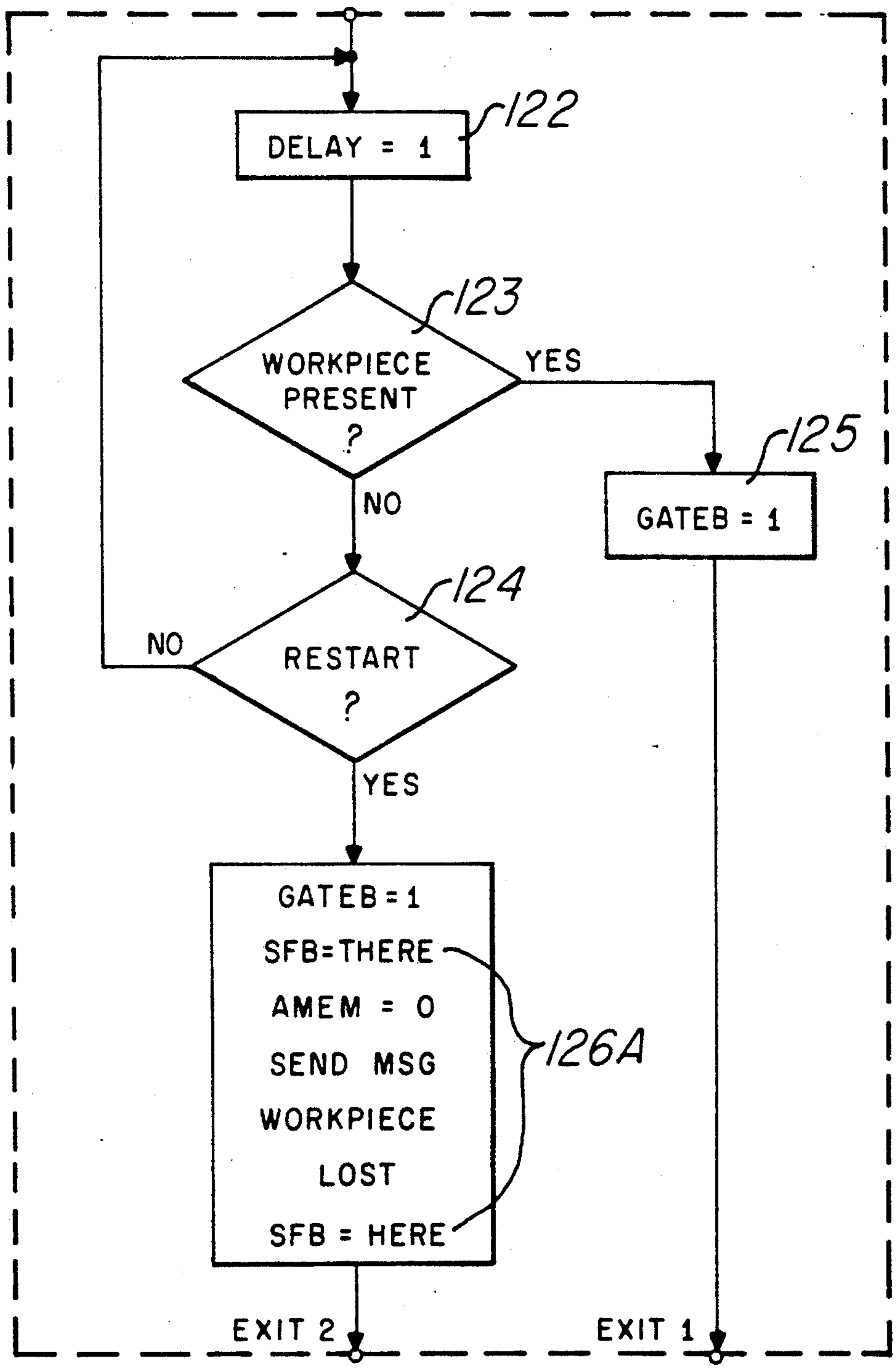
Figure 3G:
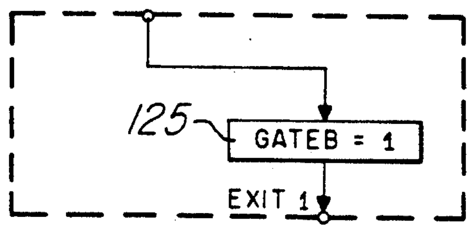

- FIG. 3E Flowchart of acknowledge receipt of workpiece routines for all segments with a normal predecessor
- FIG. 3F Flowchart of acknowledge receipt of workpiece routines for first segment with an abnormal predecessor
- FIG. 3G Flowchart of acknowledge receipt of workpiece routines for second-Nth segments of a processor with no sensor available

(II.1) READY TO RELEASE WORKPIECE ROUTINES

Figure 3H:
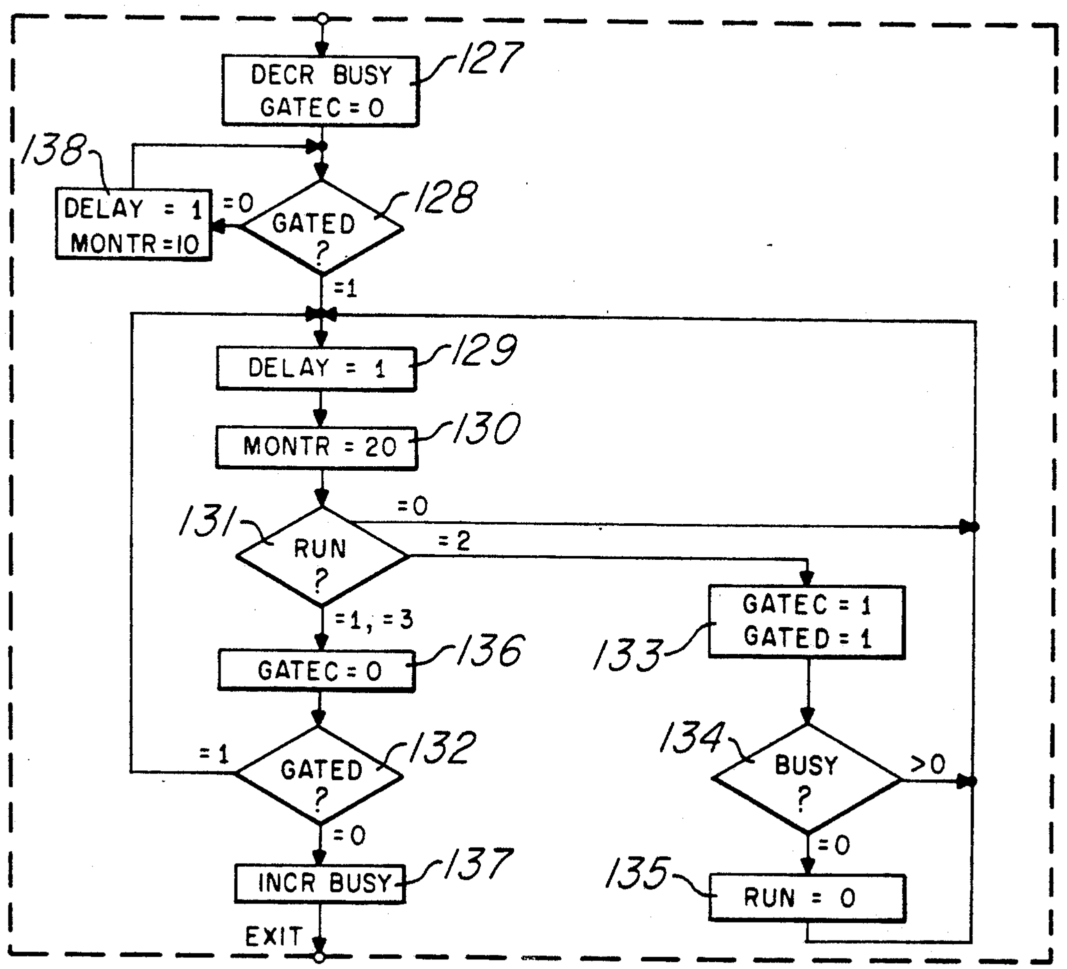
Figure 3I:
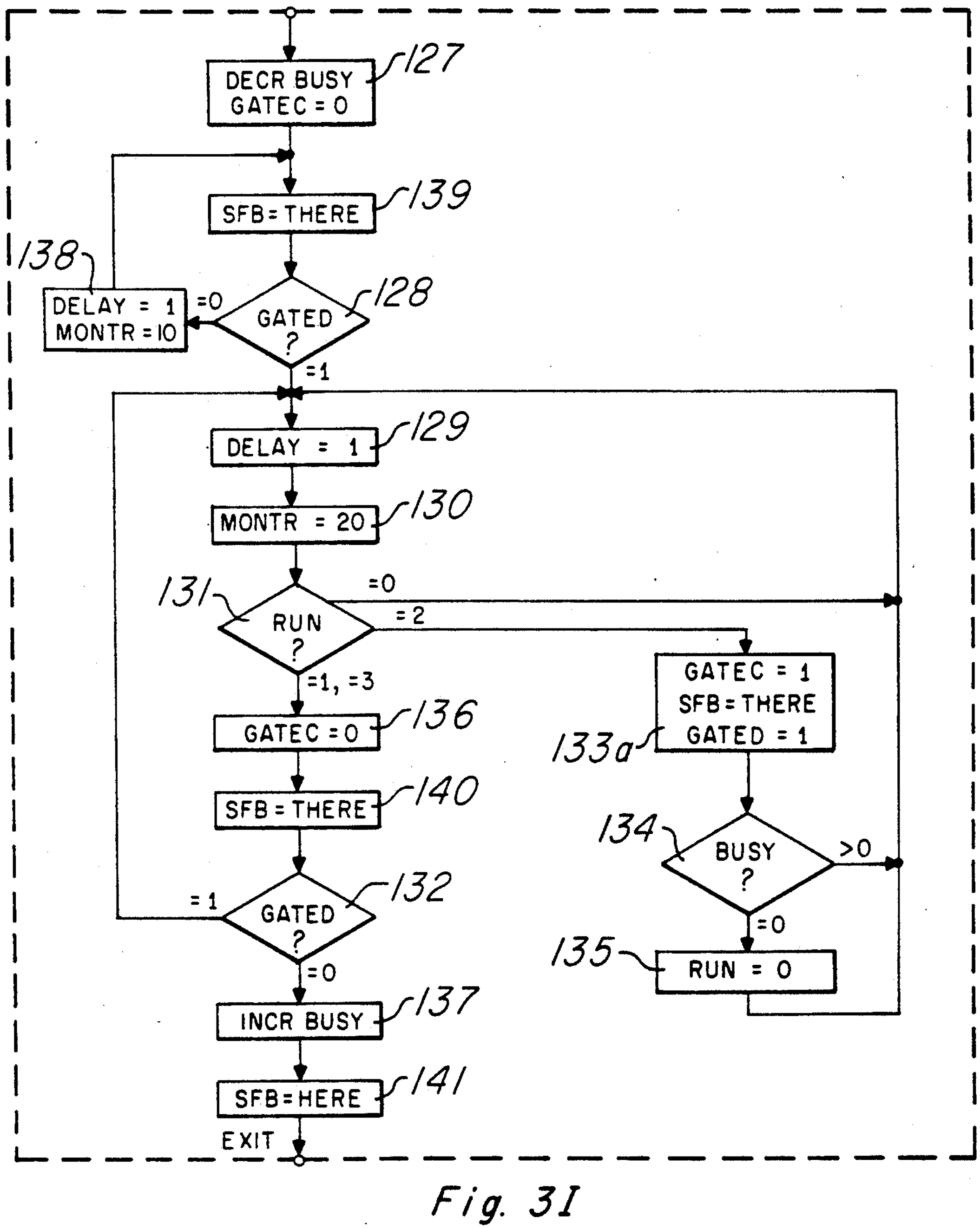
Figure 3J:
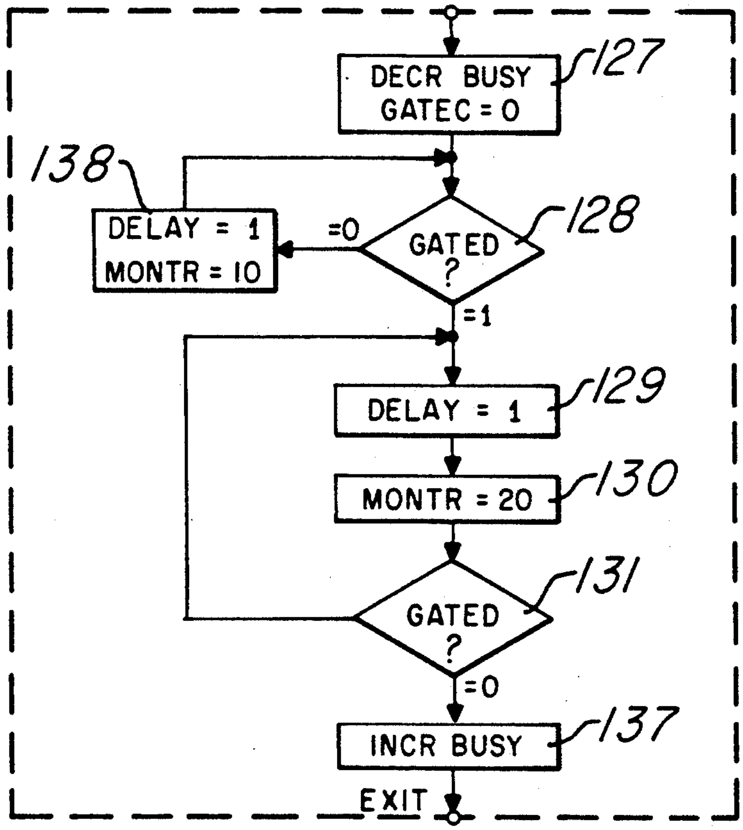
Figure 3K:
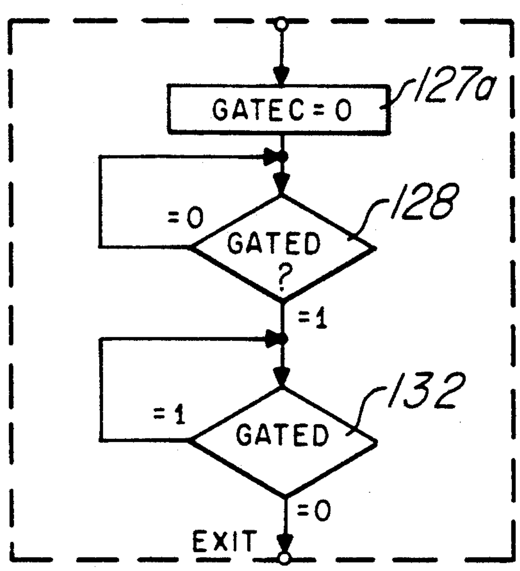
Figure 3L:
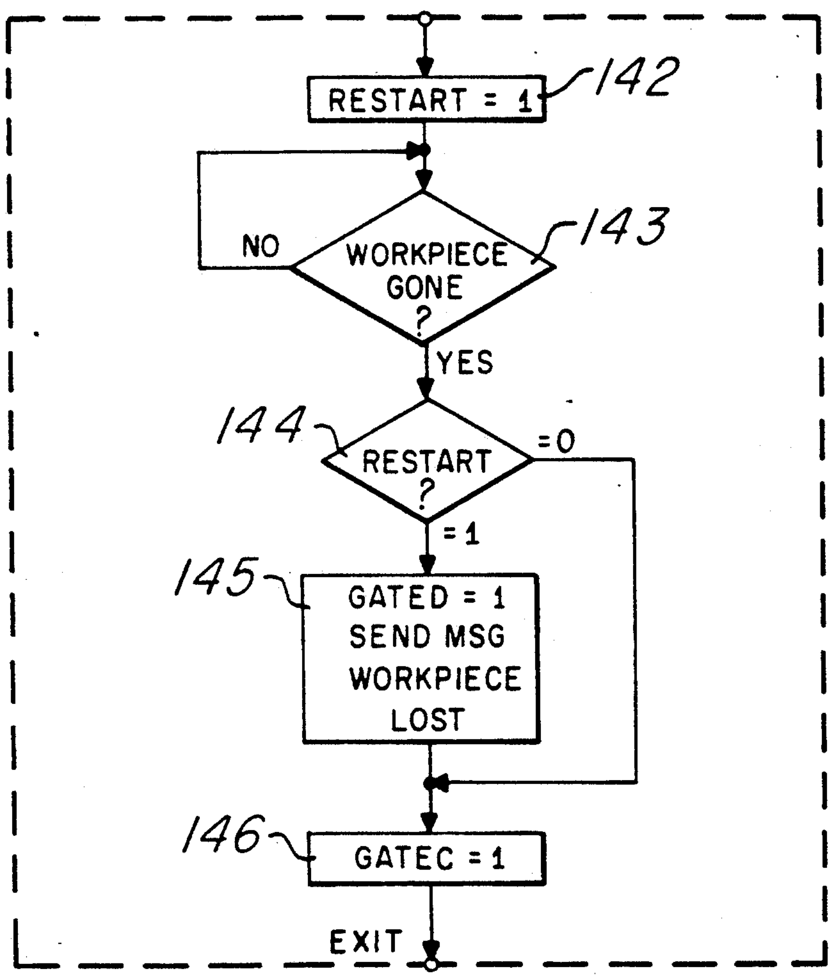
Figure 3M:
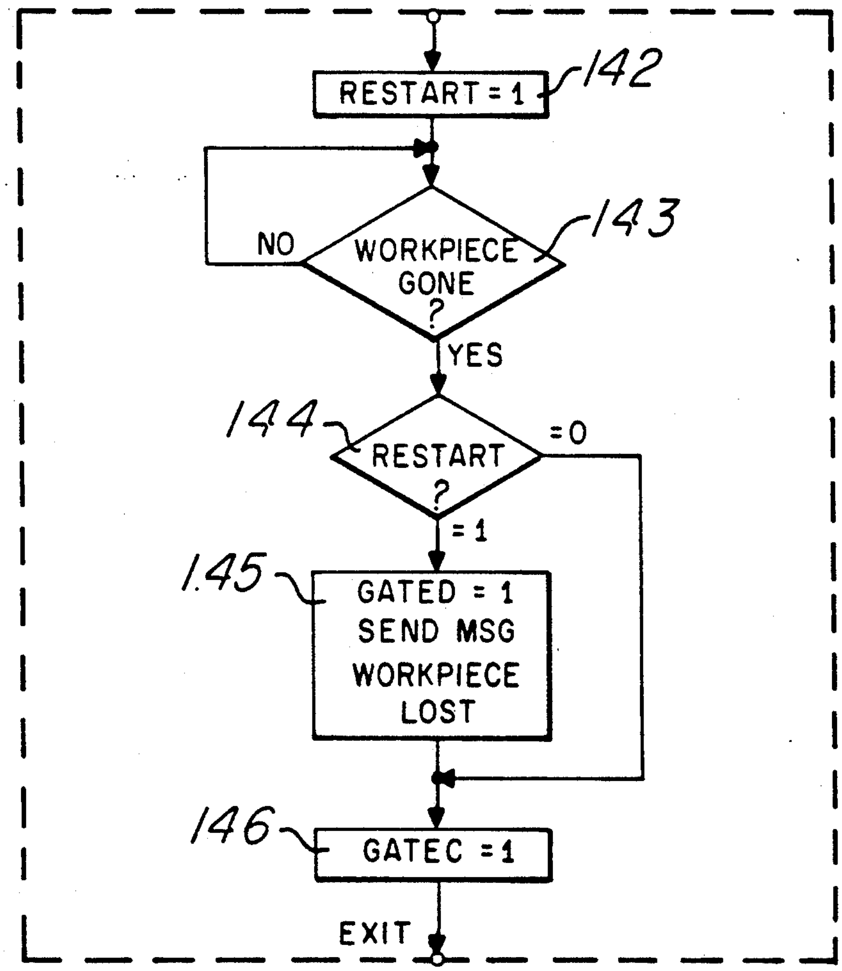
Figure 3N:
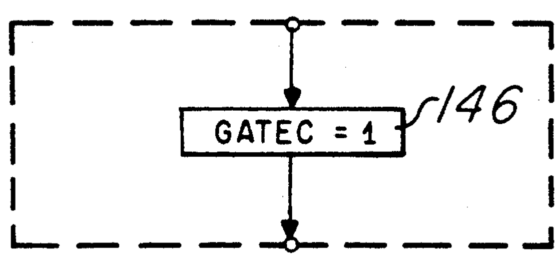

- FIG. 3H Flowchart of ready to release routine for Nth segment with a normal successor
- FIG. 3I Flowchart of ready to release routine for Nth segment with an abnormal successor
- FIG. 3J Flowchart of ready to release routine for the first to (N-1)th safe segment
- FIG. 3K Flowchart of ready to release routine for the first to (N-1)th unsafe segment (II.2) ASSURE EXIT OF WORKPIECE ROUTINES FIG. 3L Flowchart of all segments with a normal successor FIG. 3M Flowchart of Nth segment with an abnormal successor FIG. 3N Flowchart of first to (N-1)th segment where workpiece sensor is not available

GENERAL OPERATING PROCEDURE FLOWCHART

FIG. 1 Supra

GLOBAL SUBROUTINES INTERFACE WITH MODULE SERVICE

Figure 4A:
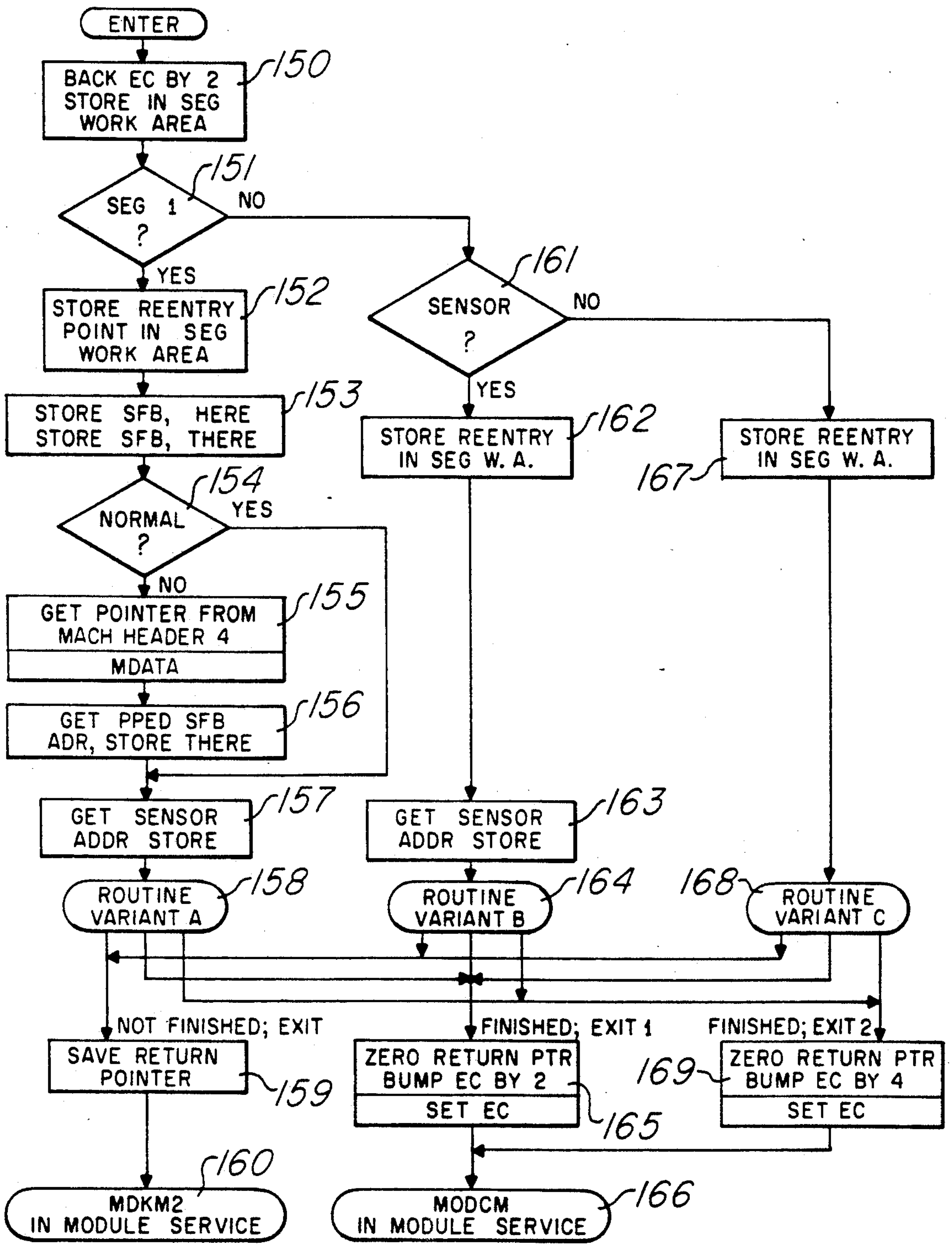
Figure 4B:
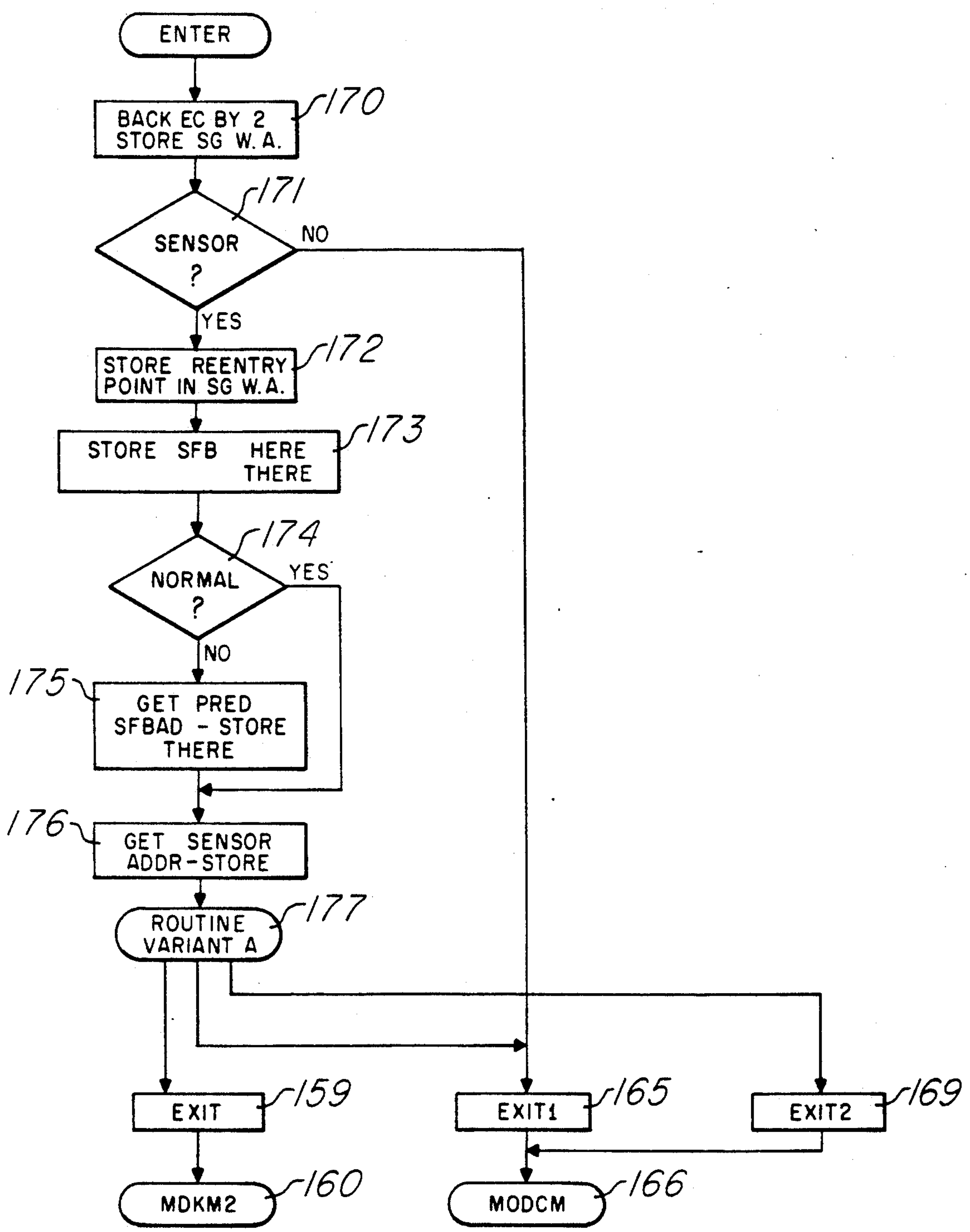
Figure 4C:
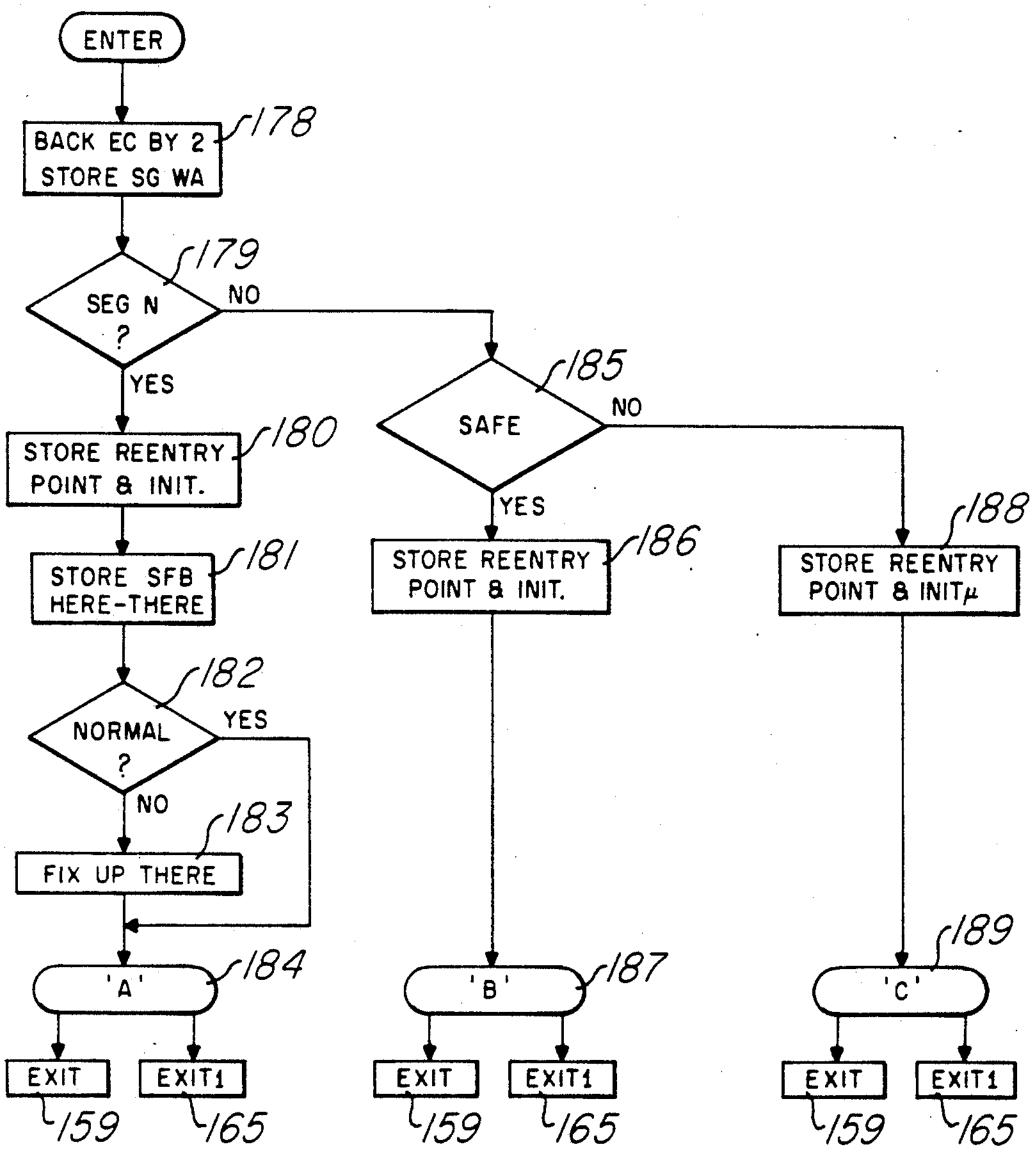
Figure 4D:
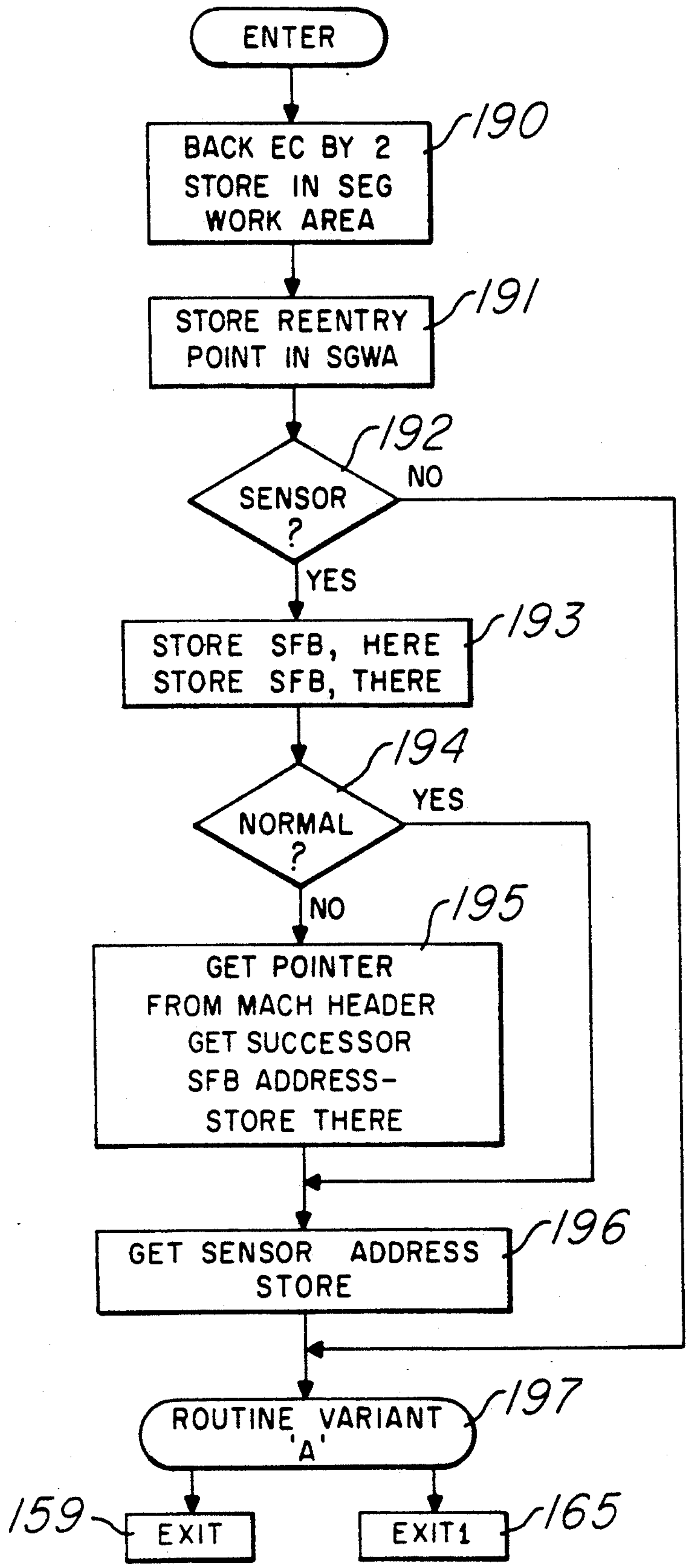

FIG. 4A Flowchart showing the program steps for the control sequence of REQUEST WORKPIECE FIG. 4B Flowchart showing the program steps for the control sequence of ACKNOWLEDGE WORKPIECE FIG. 4C Flowchart showing the program steps for the control sequence of READY TO RELEASE FIG. 4D Flowchart showing the program steps for the control sequence of ASSURE EXIT

COMPUTER CONTROL OF AN ASSEMBLY LINE MODULE

MODULE MACHINE SERVICE PROGRAM

Figure 5A:
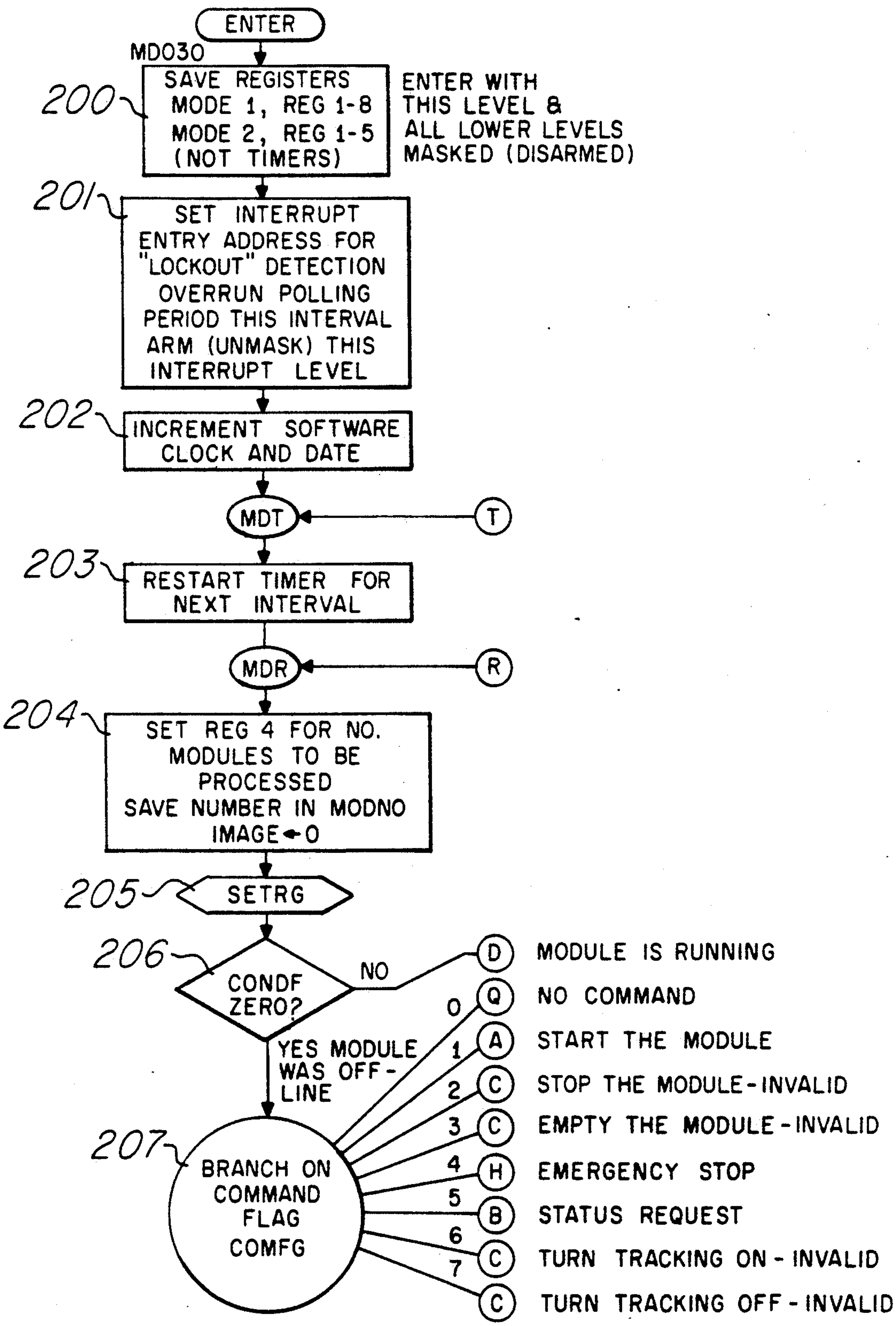

FIG. 5A Flowchart of the program procedure of MODULE SERVICE

Figure 5B:
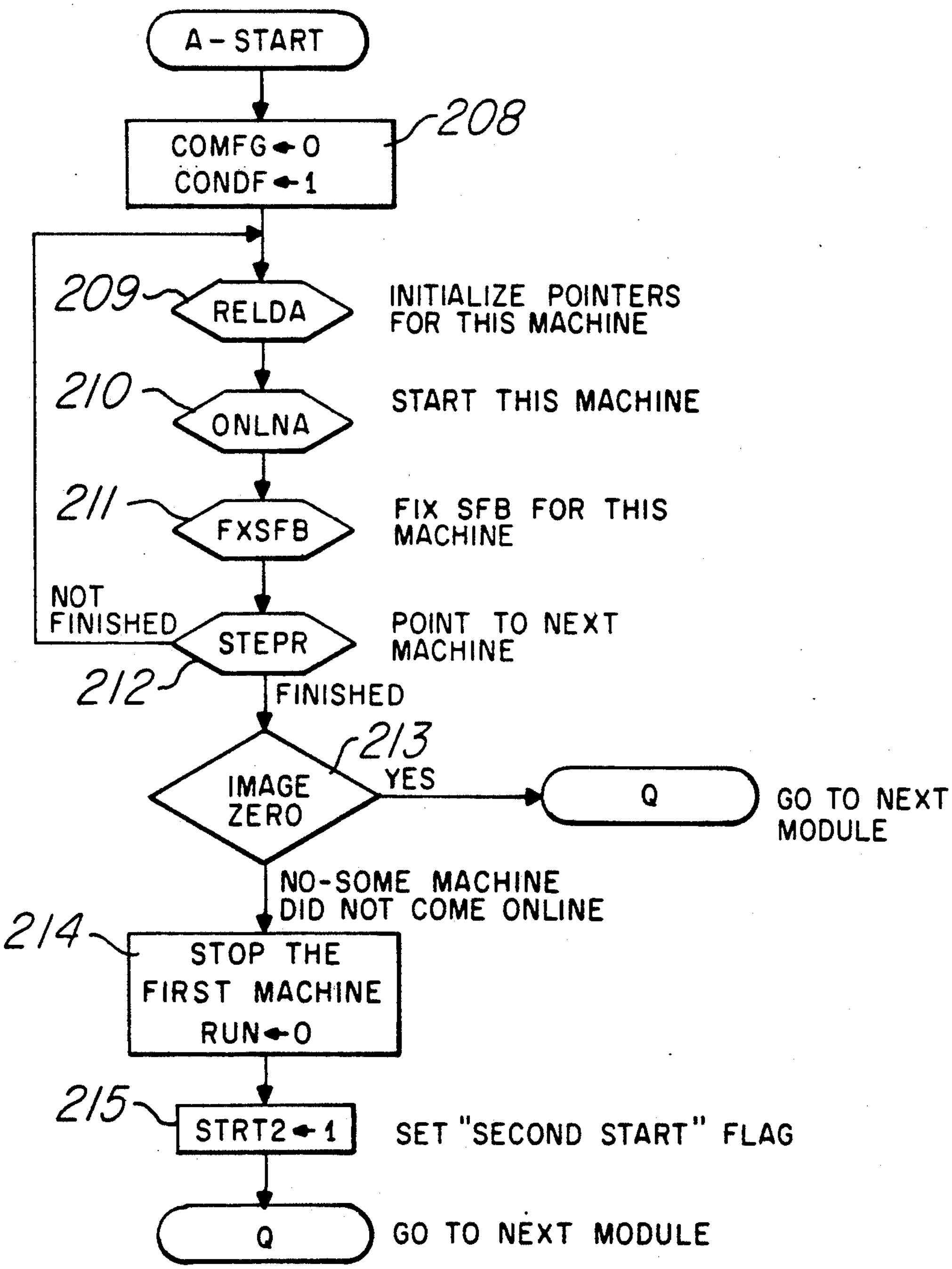

FIG. 5B Flowchart of the program procedure in response to a START command flag

Figure 5C:
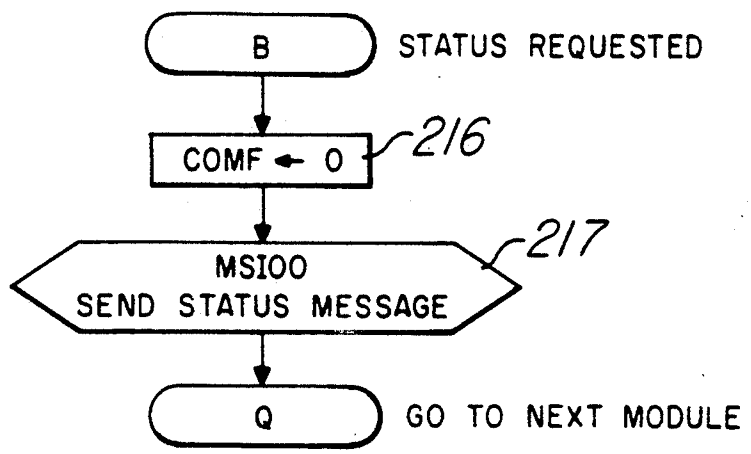
Figure 5D:
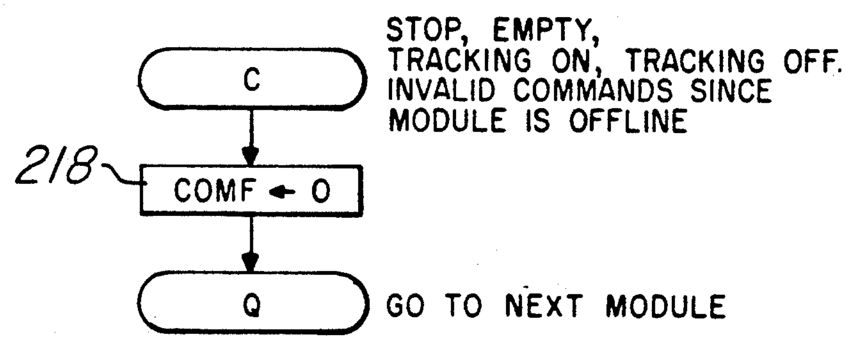
Figure 5E:
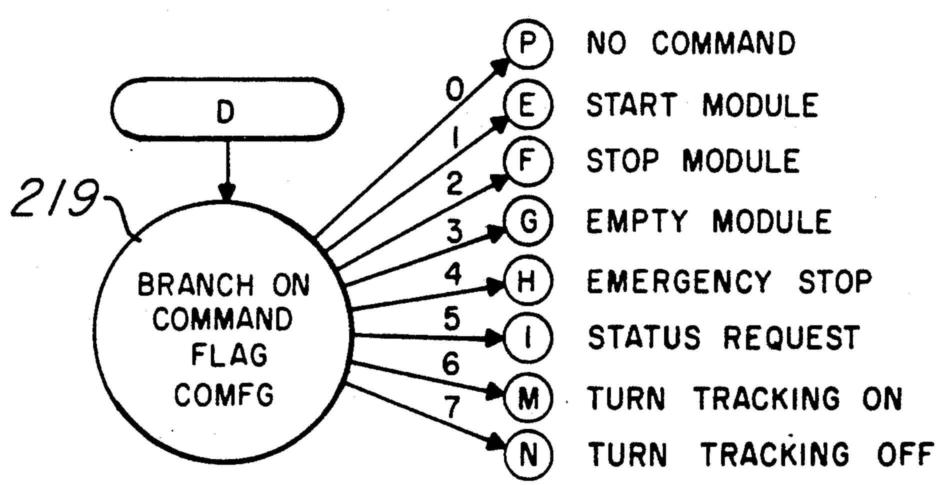
Figures 1, 5E:
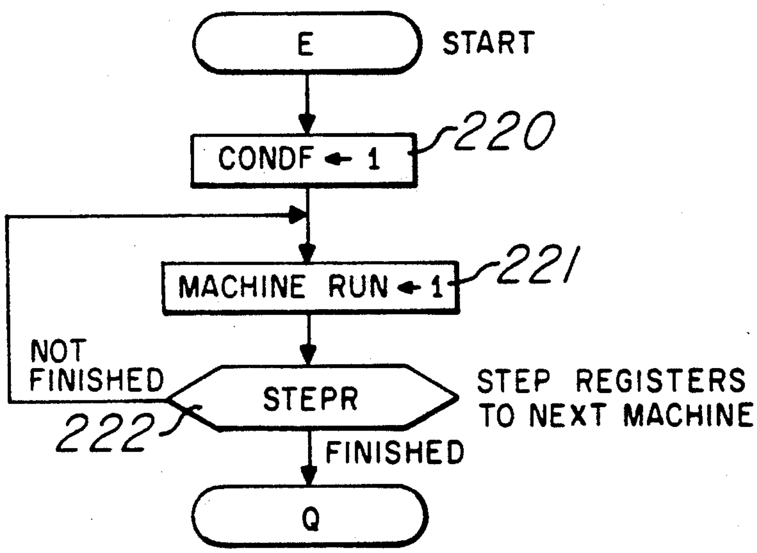
Figures 2, 5E:
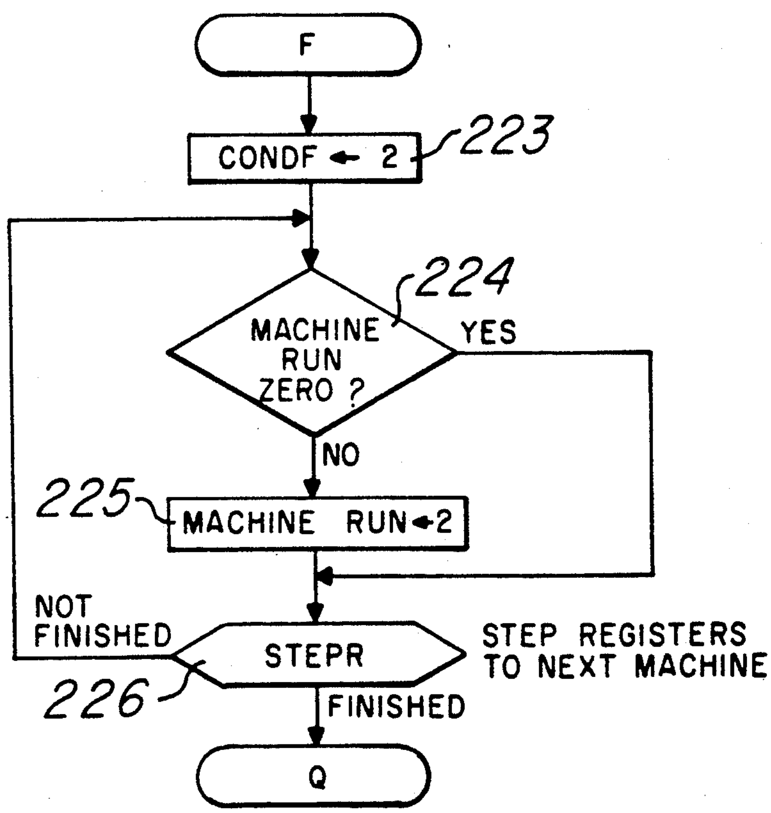
Figure 5F:
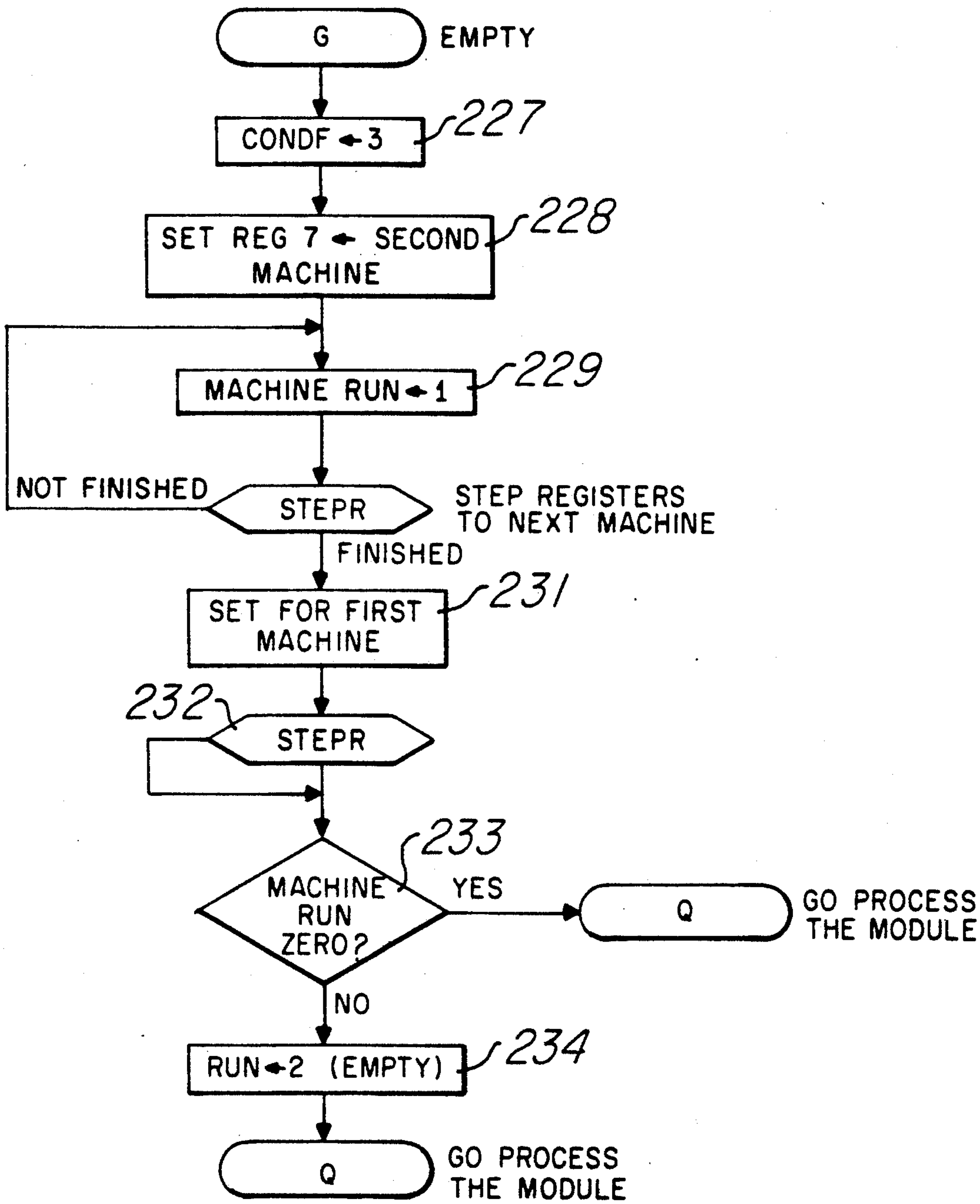
Figure 5G:
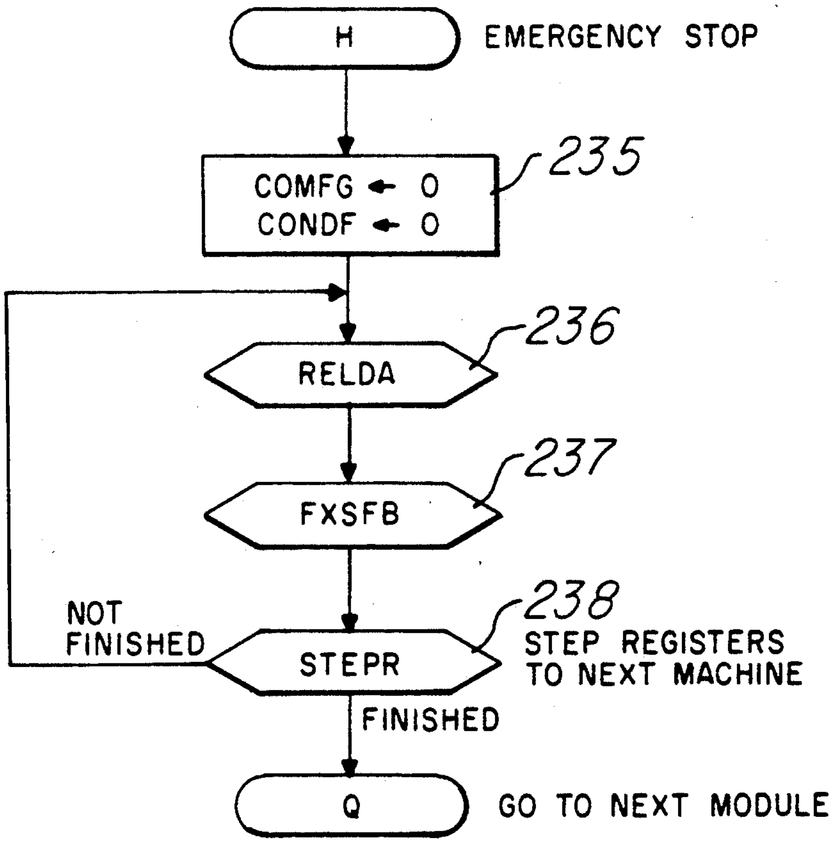
Figure 5H:
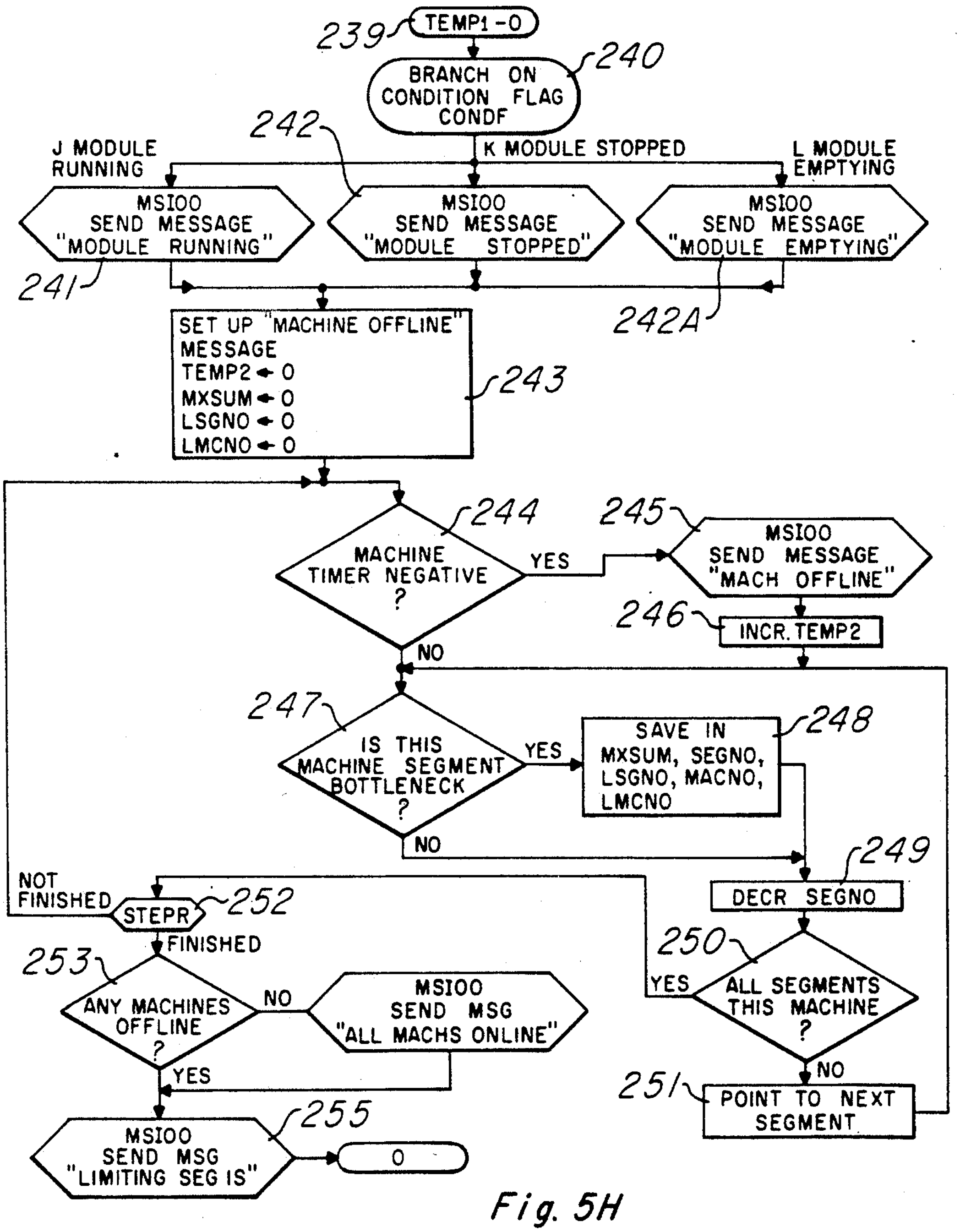
Figures 1, 5I:
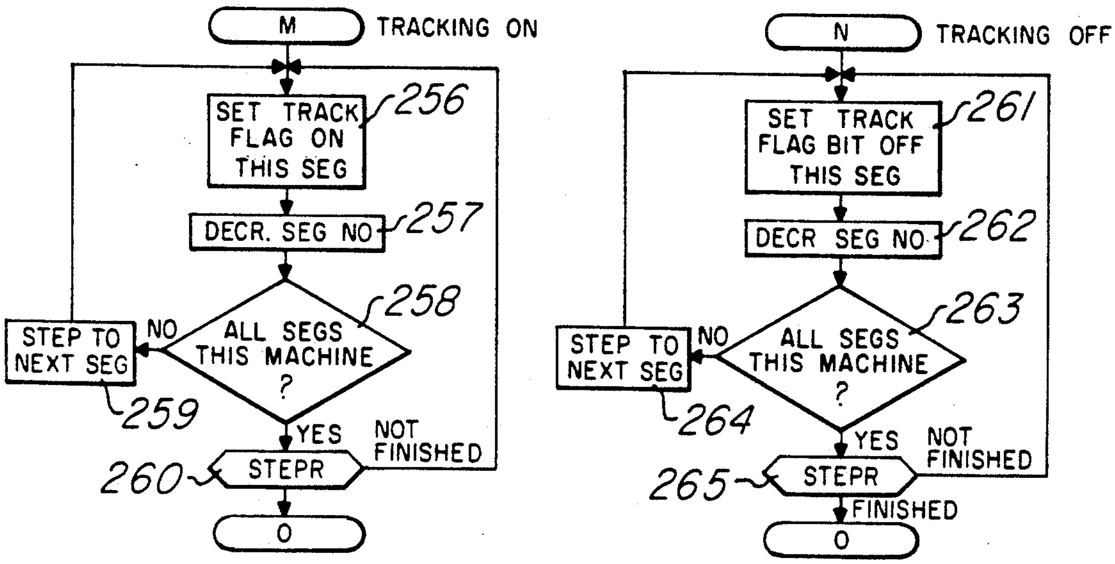
Figures 2, 5I:
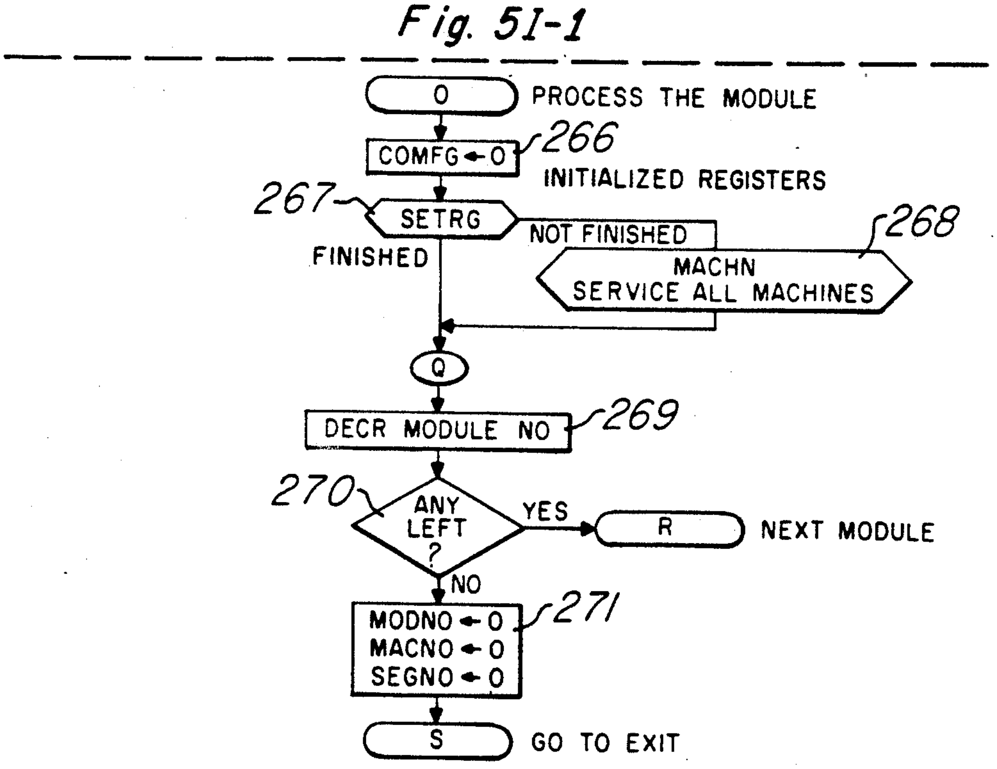
Figure 5J:
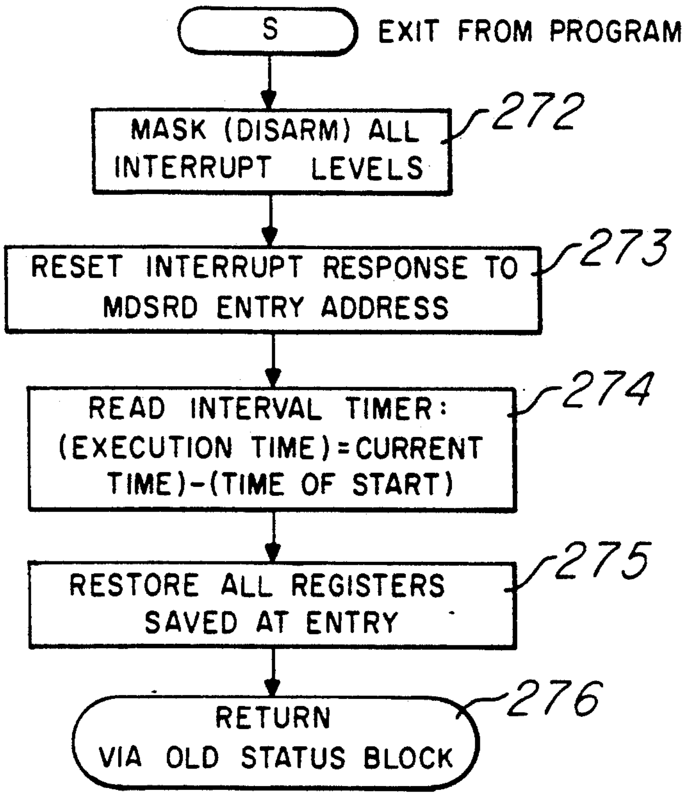
Figure 5K:
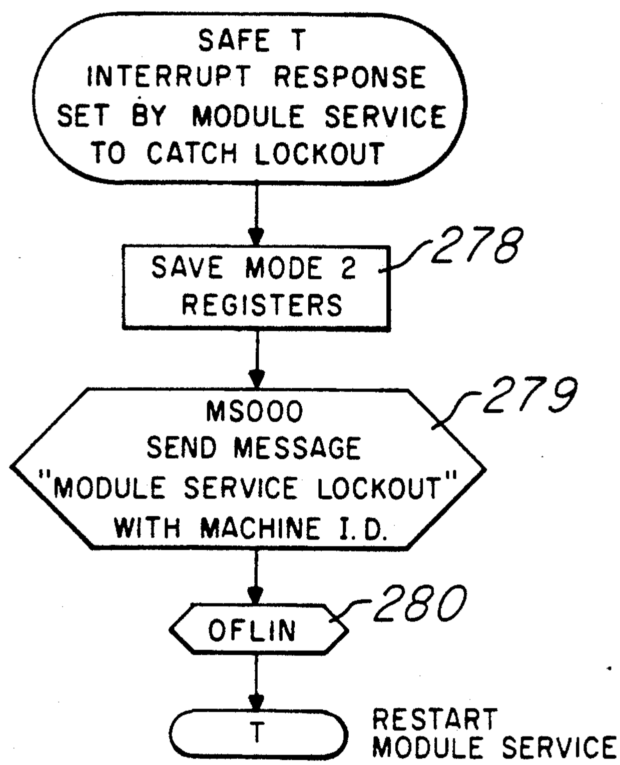
Figure 5L:
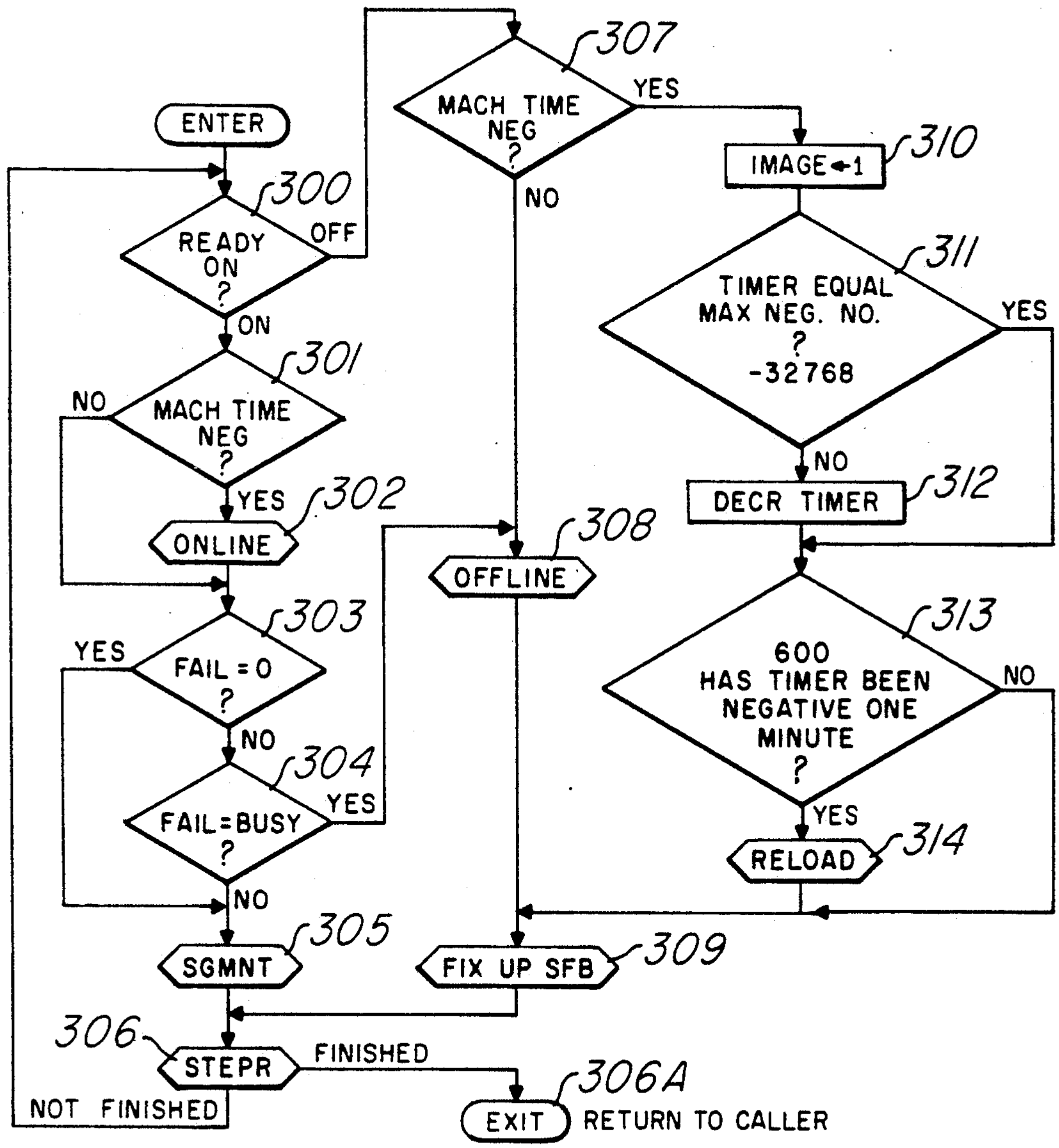
Figure 5M:
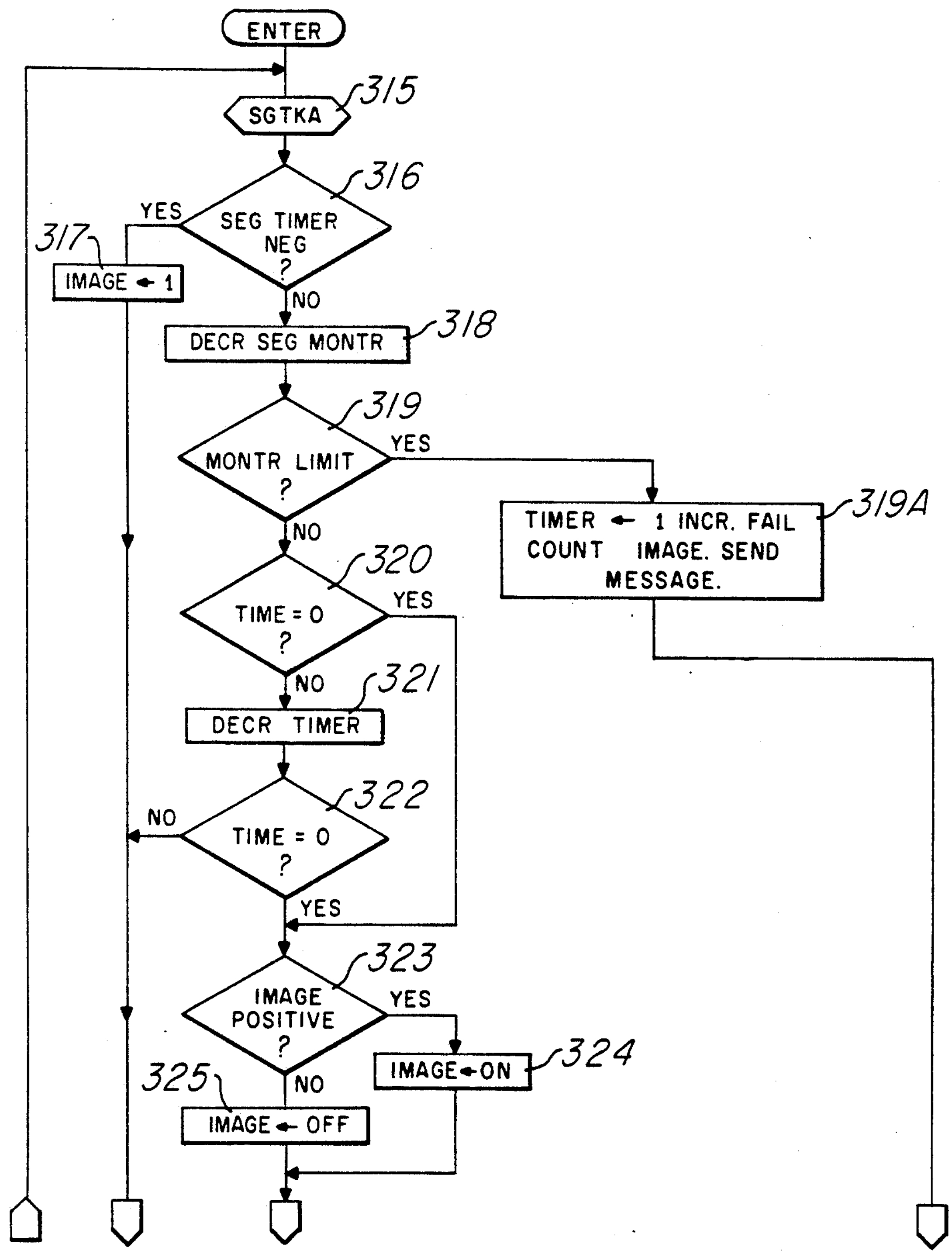
Figures 1, 5M:
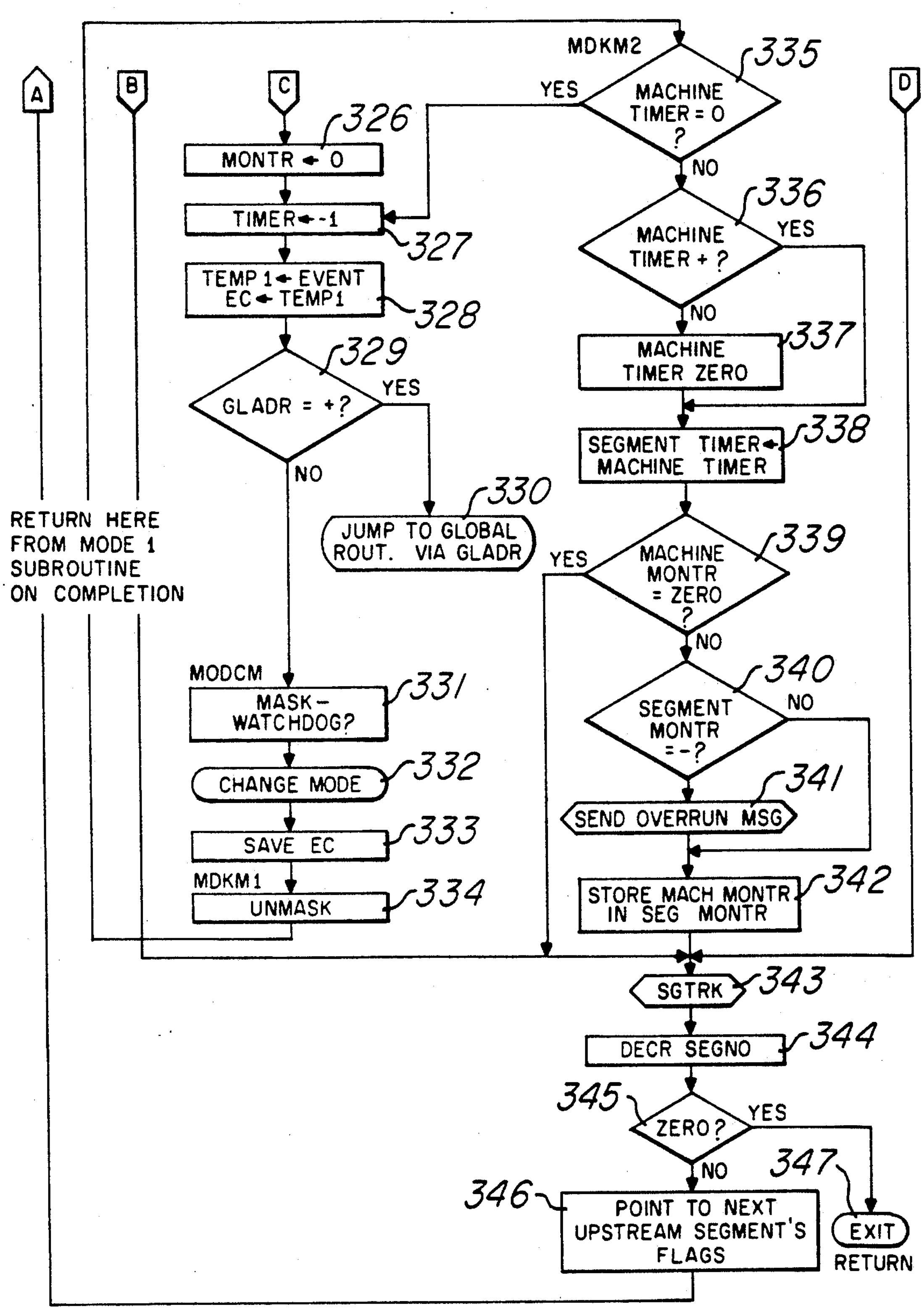
Figure 5N:
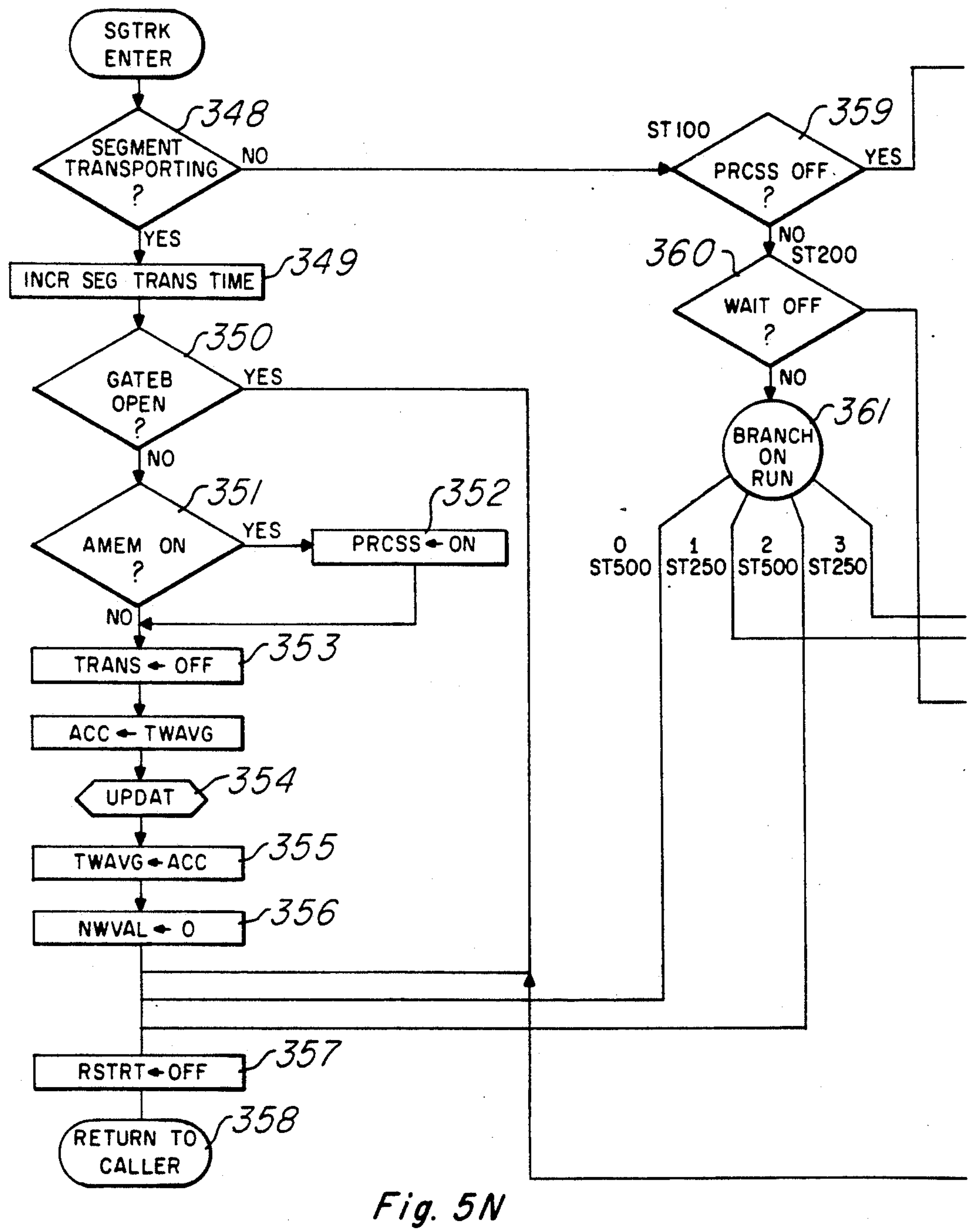
Figures 1, 5N:
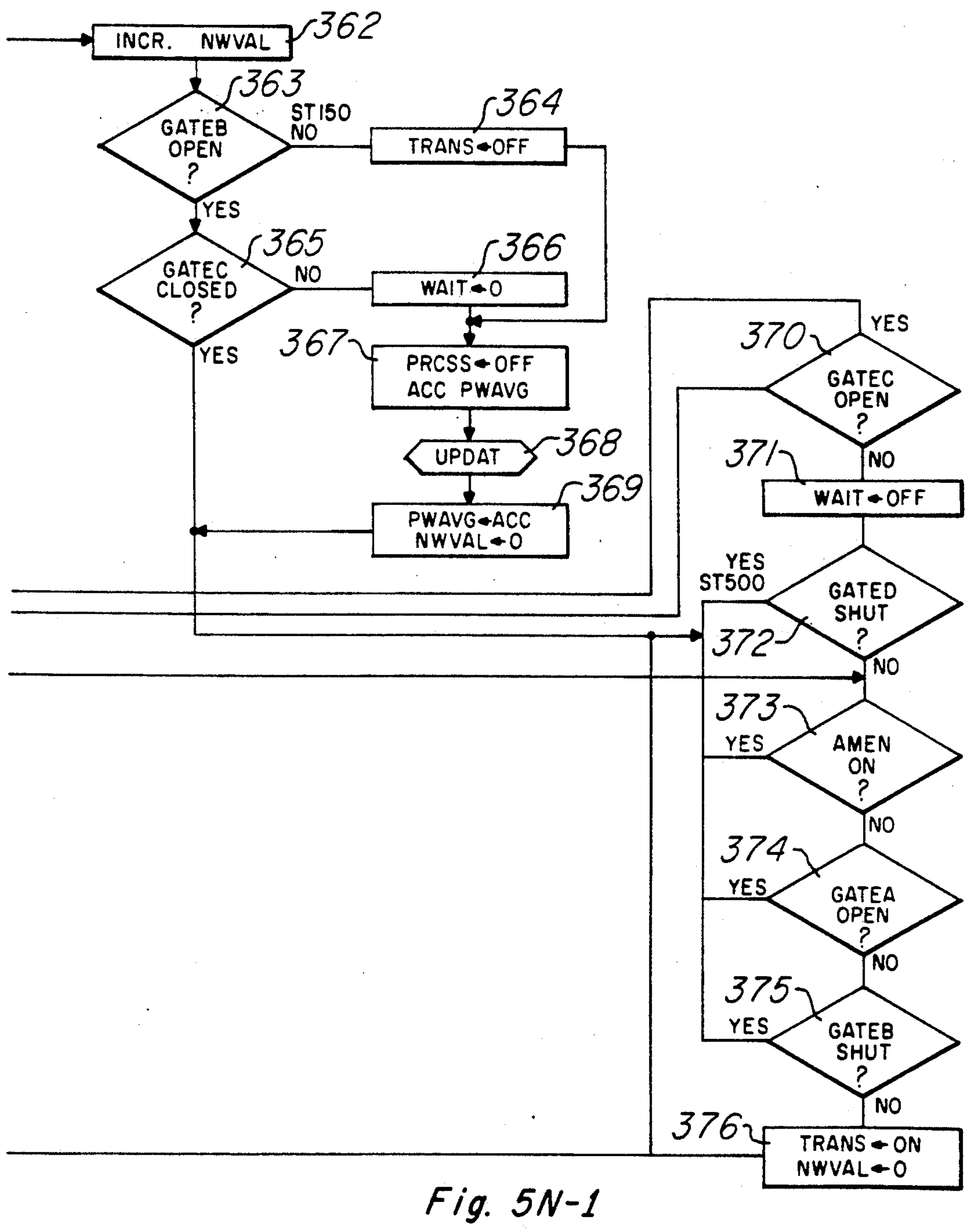
Figure 5P:
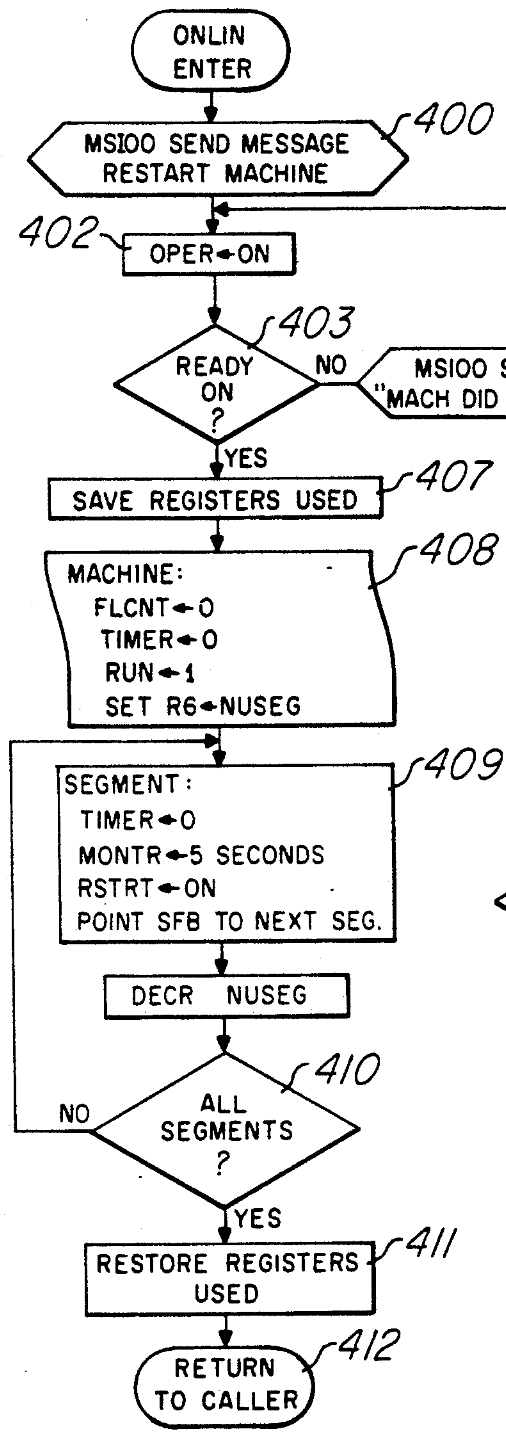
Figure 5O:
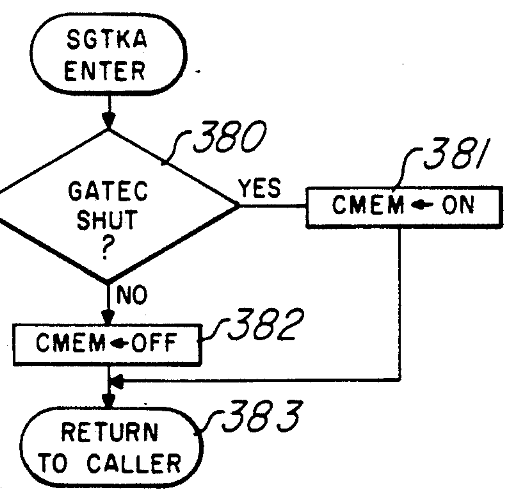
Figures 1, 5Q:
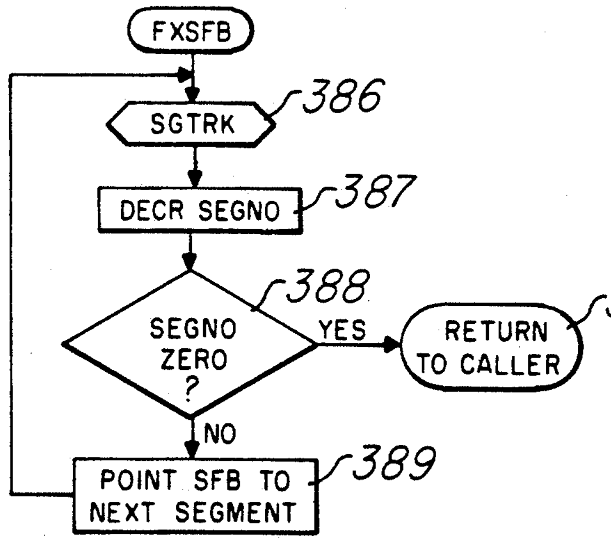
Figures 2, 5Q:
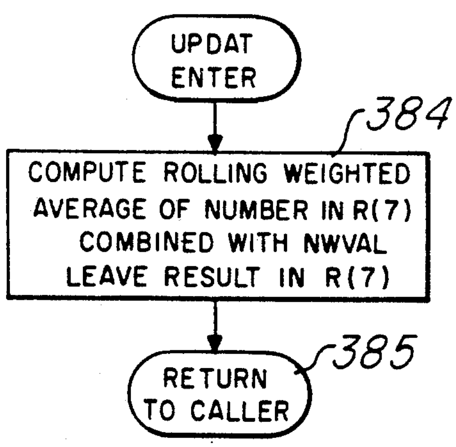
Figures 3, 5Q:
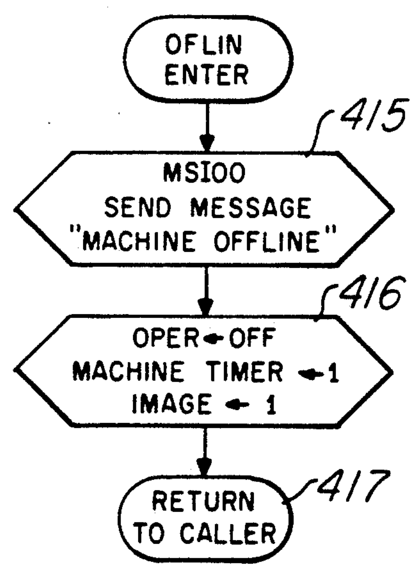
Figure 5R:
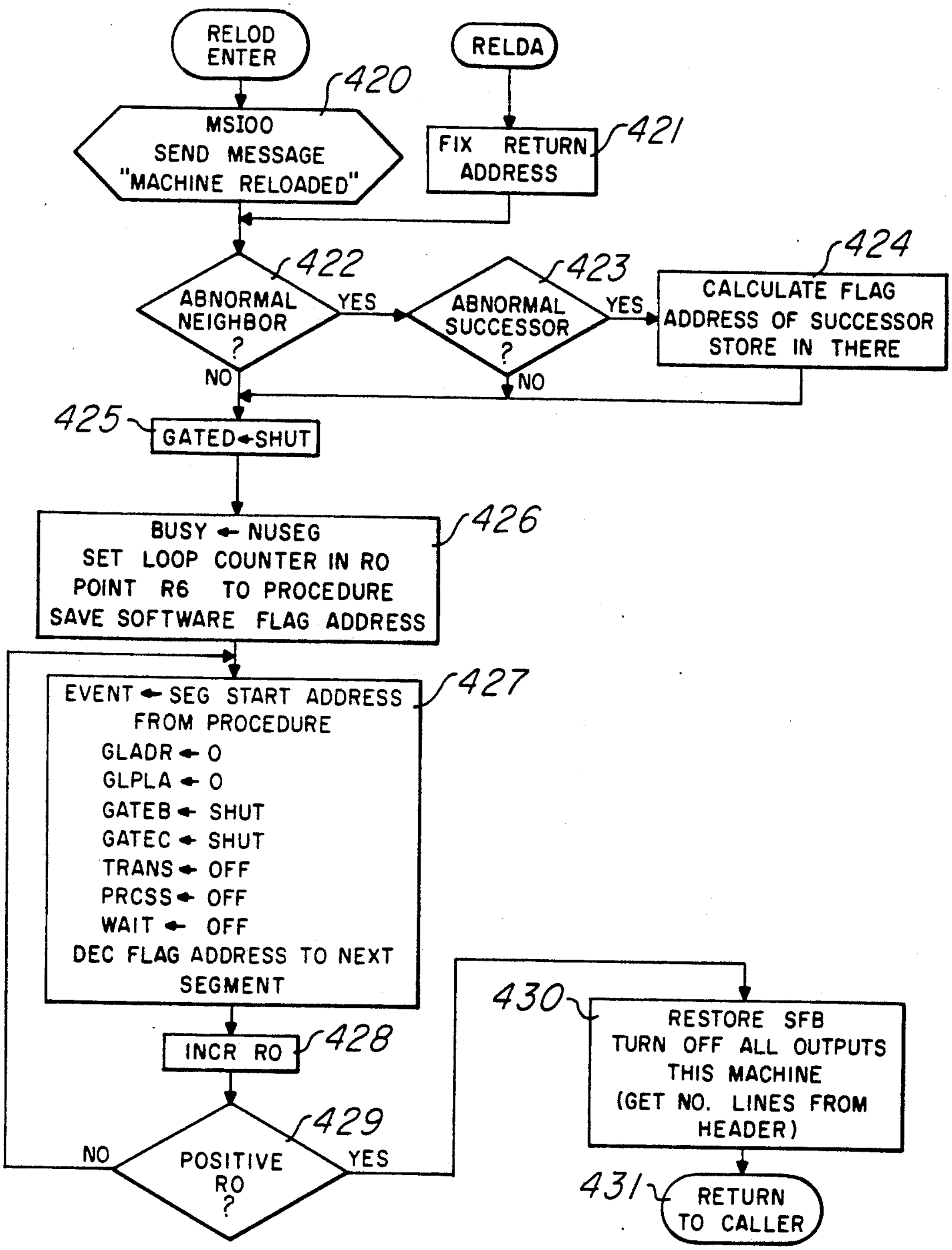
Figure 5S:
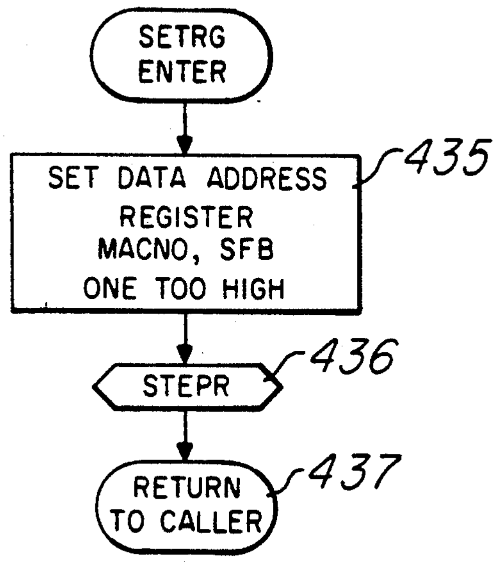
Figures 1, 5S:
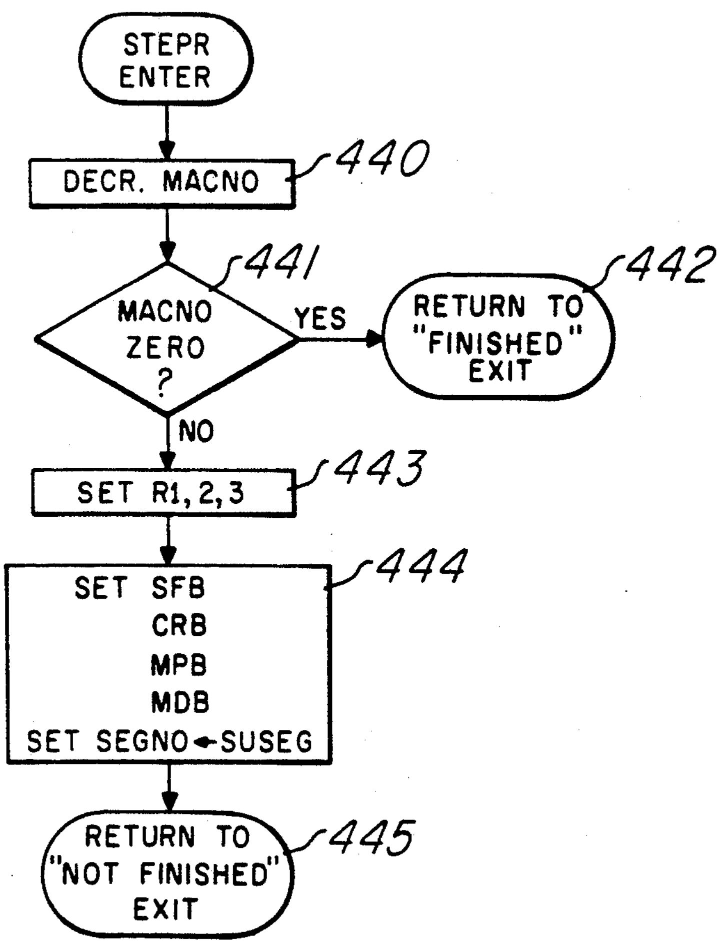

FIG. 5C Flowchart of the program procedure in response to a STATUS REQUEST command FIG. 5D Flowchart of the program procedure for illegal offline commands FIG. 5E, 5E-1, 5E-2 Flowchart of the program procedure if the module being controlled is running FIG. 5F Flowchart of the program procedure in response to a command of EMPTY FIG. 5G Flowchart of the program procedure in response to an EMERGENCY STOP command FIG. 5H Flowchart of the continued MODULE SERVICE program procedure FIG. 5I1, 5I2 Flowchart of the program procedure in response to a TRACKING command FIG. 5J-K Flowchart showing the EXIT steps from the MODULE SERVICE program FIG. 5L Flowchart showing the program steps of the MACHN subroutine FIG. 5M, 5M1 Flowchart showing the program steps of the SFMNT subroutine FIG. 5N, 5N1 Flowchart showing the program steps of the SGTRK subroutine FIG. 5Q Flowchart showing the program steps of the SGTKA subroutine FIG. 5P Flowchart of the program steps of the ONLIN subroutine FIG. 5Q, 5Q-1, 5Q-2, 5Q-3 Flowchart of the program steps of the OFLIN subroutine FIG. 5R Flowchart of the program steps of the RELOD subroutine FIG. 5S, 5S1 Flowchart of the program steps of the SETRG and STEPR subroutines TABLE IXa Description of the CONDITION flag words for representation of machine states TABLE IXb Description of the COMMAND flags for changing states

MAINLINE PROGRAM MANEA

FIGS. 6A-6C, 6C-1 Flowcharts of the MANEA program

Figure 6A:
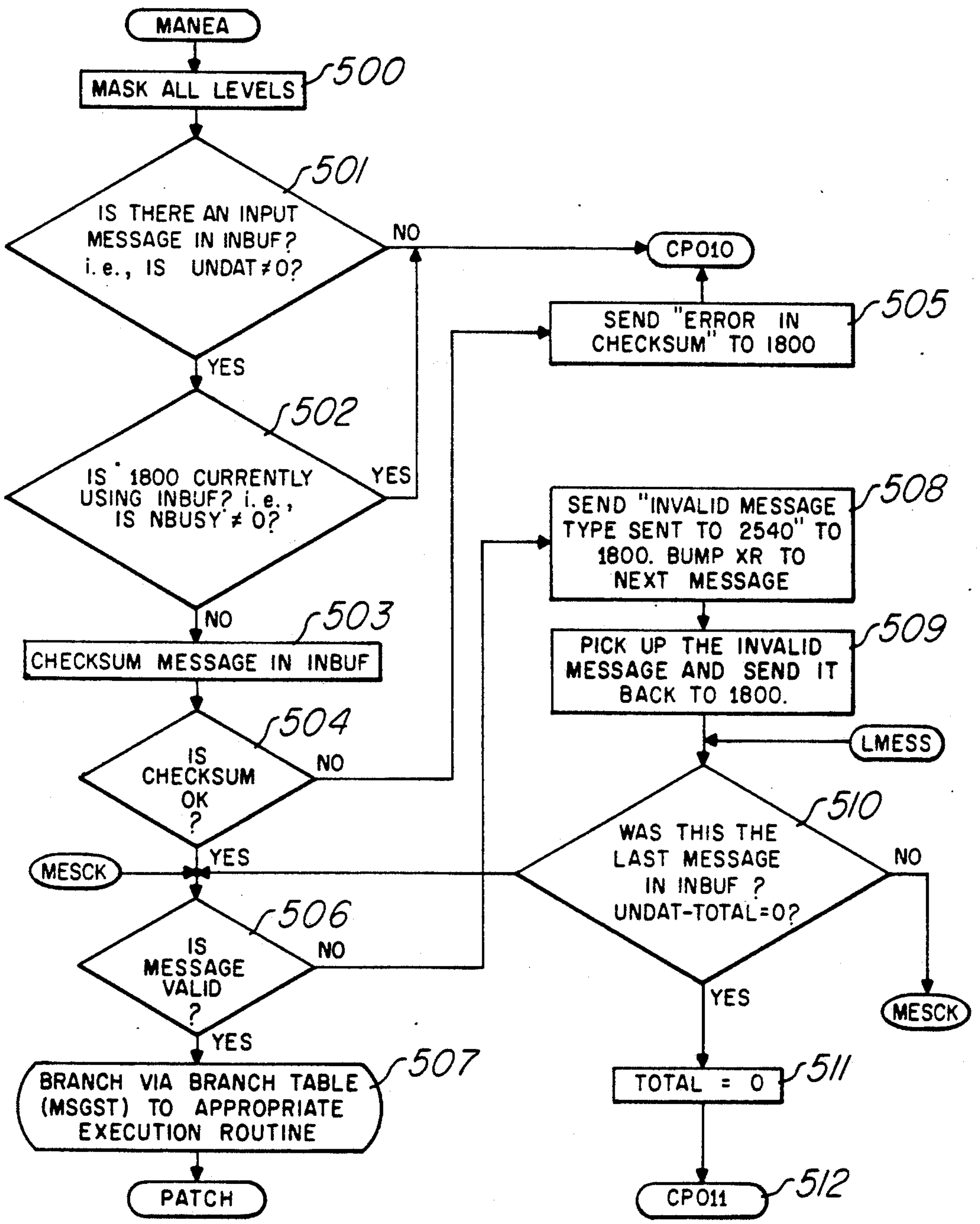
Figure 6B:
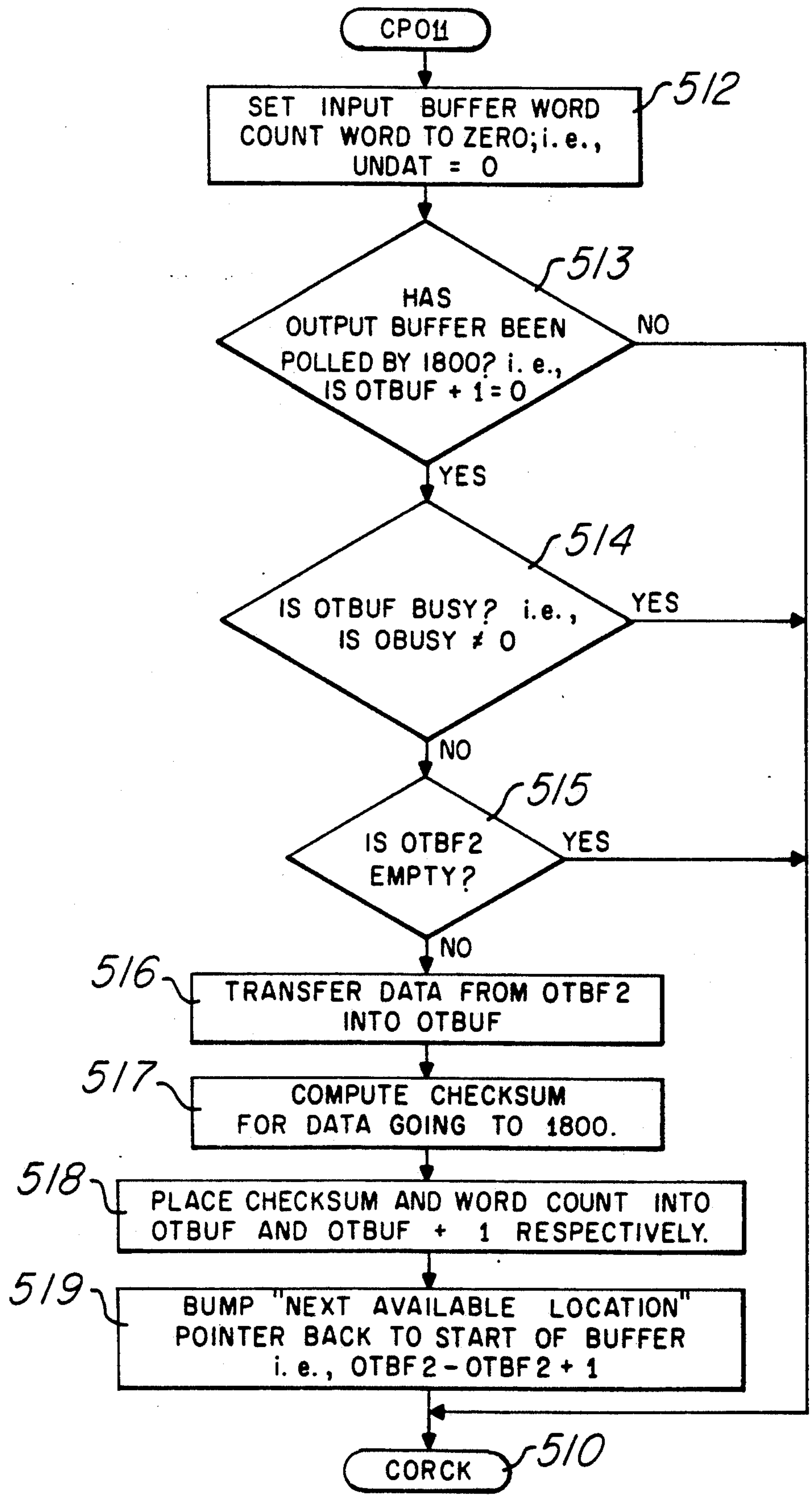
Figure 6C:
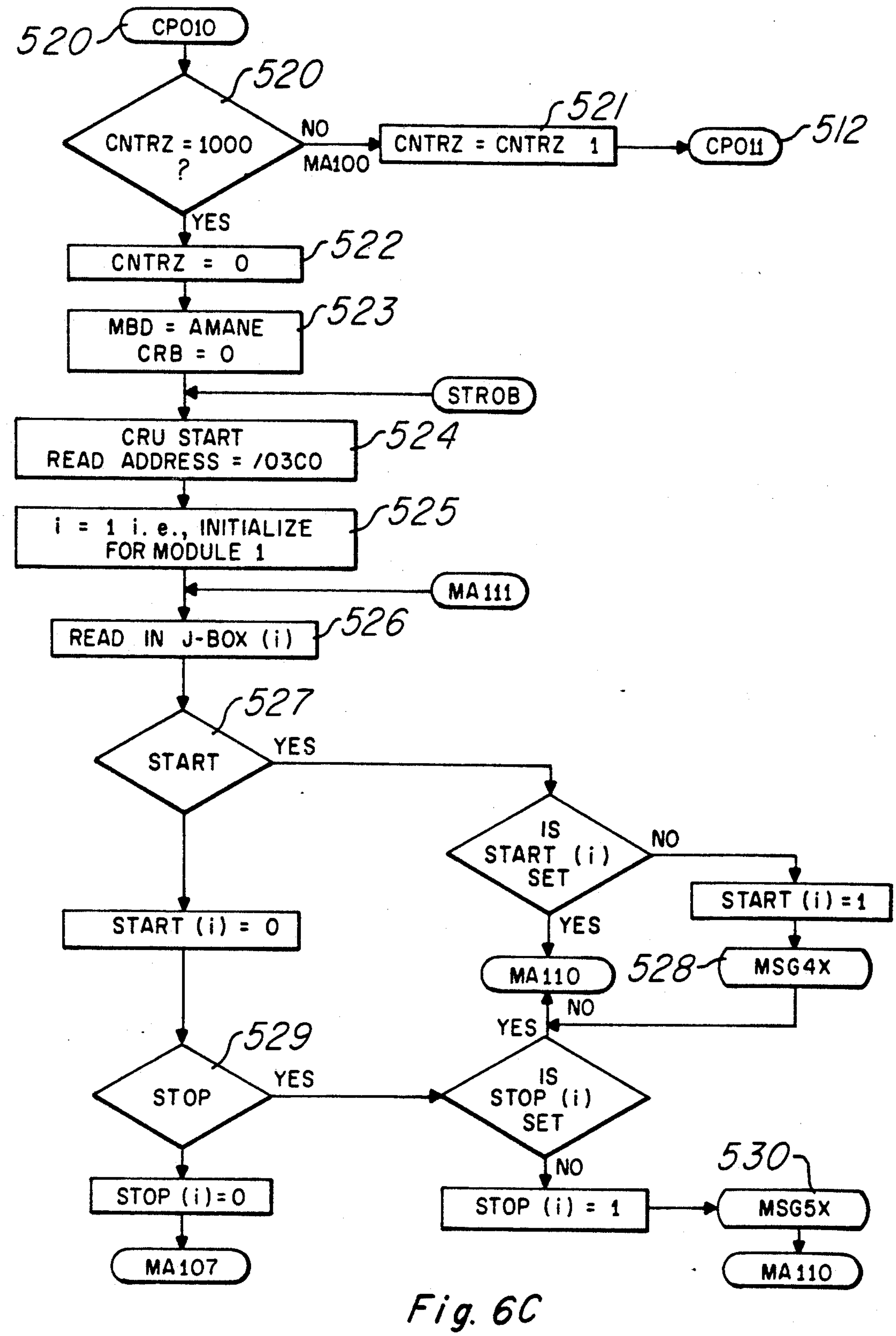
Figures 1, 6C:
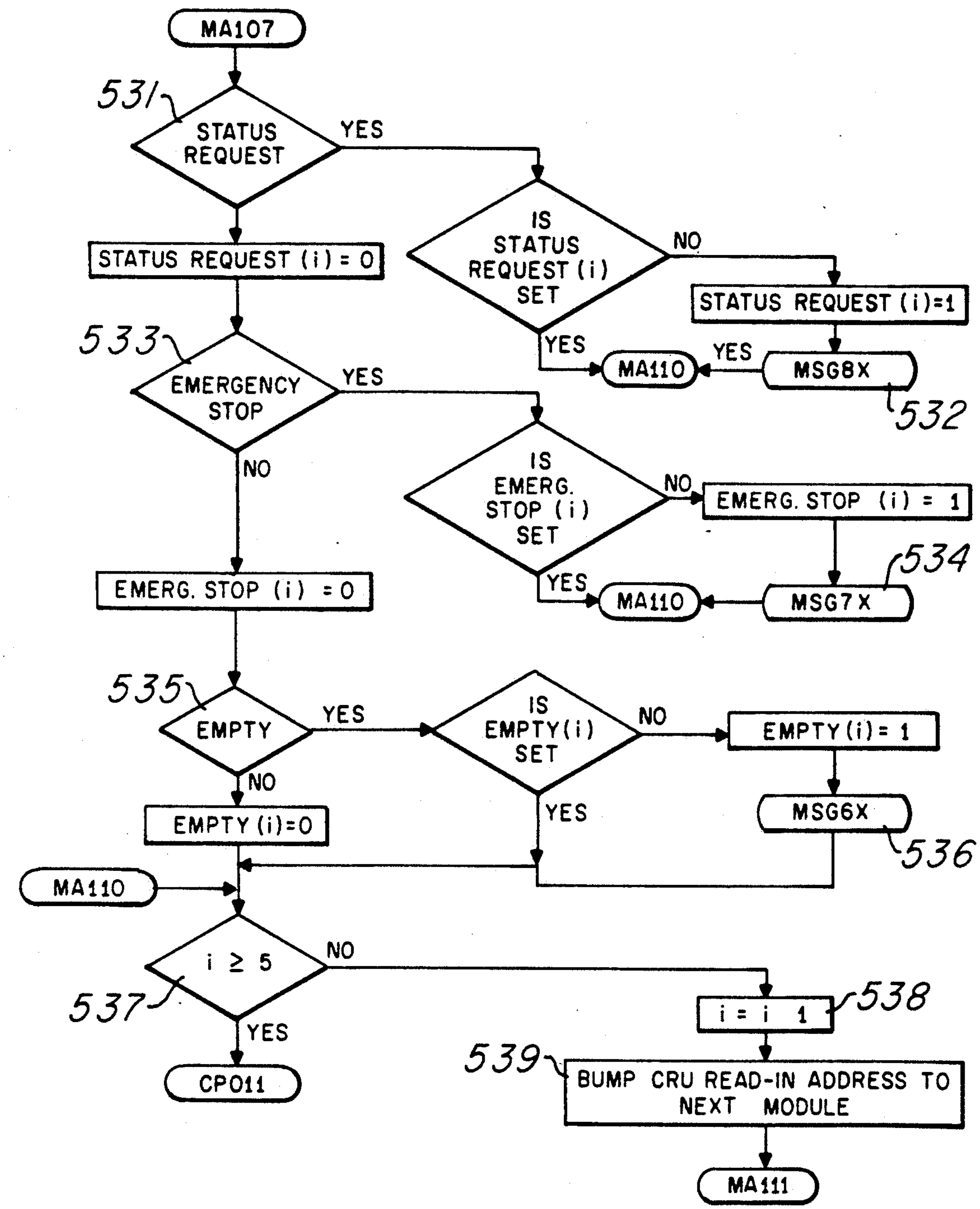
Figure 6D:
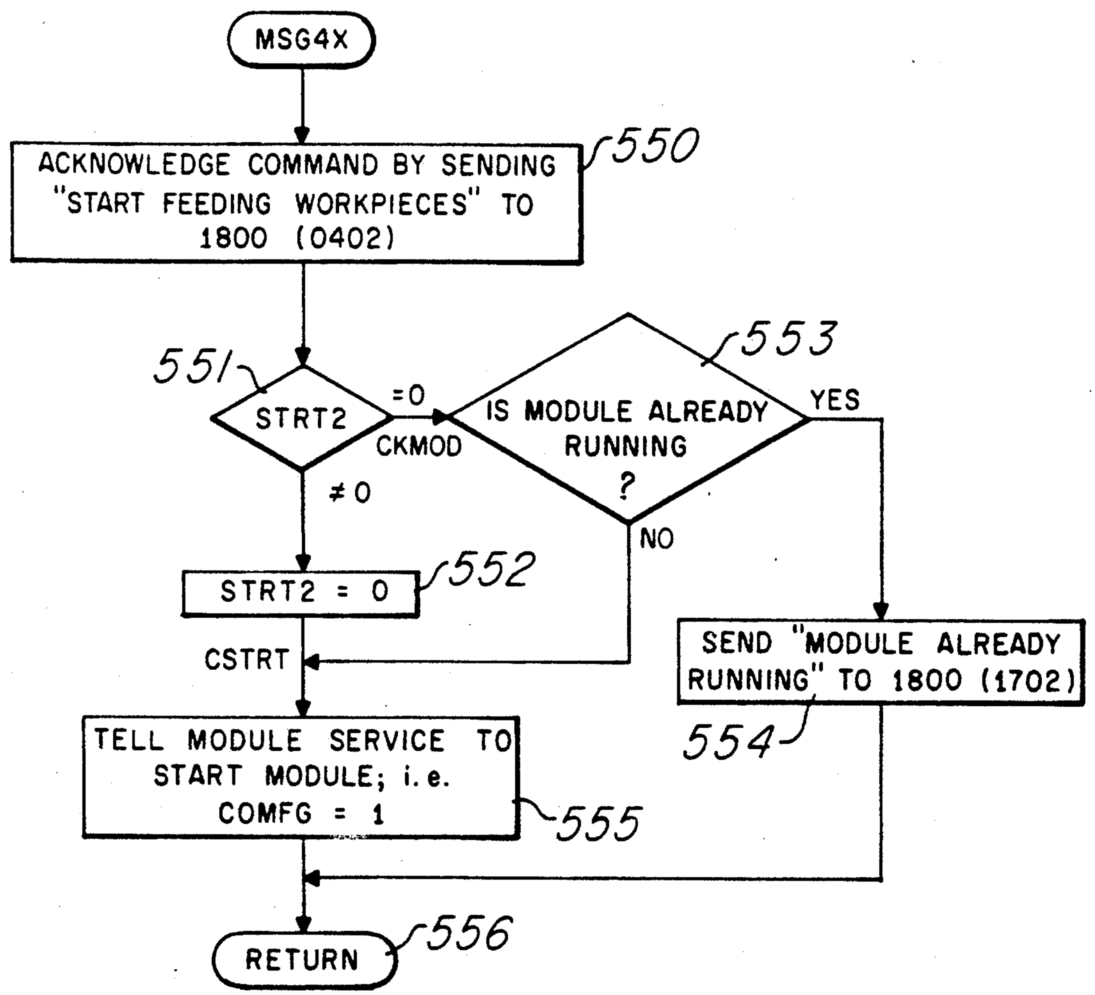

FIG. 6D Flowchart of the program steps of the MSG4X subroutine

Figure 6E:
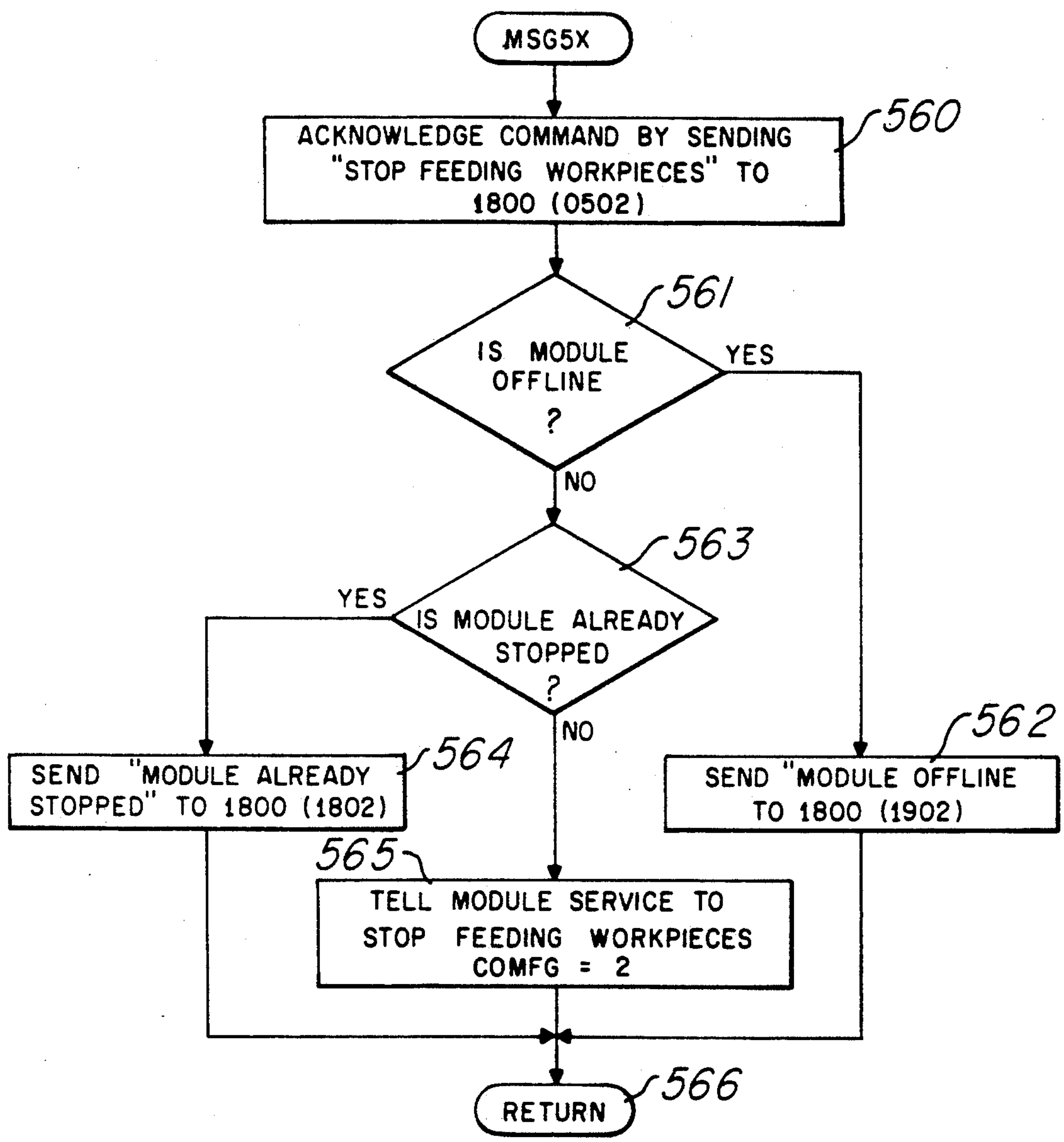

FIG. 6E Flowchart of the program steps of the MSG5X subroutine

Figure 6F:
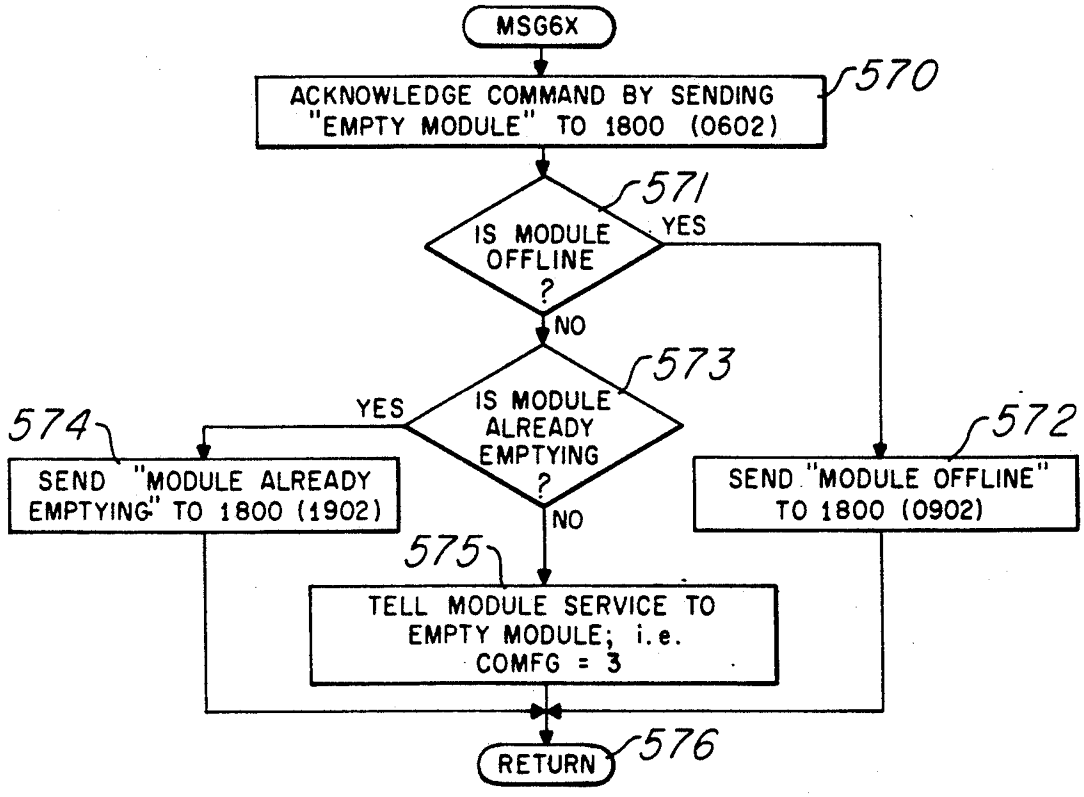
Figures 1, 6F:
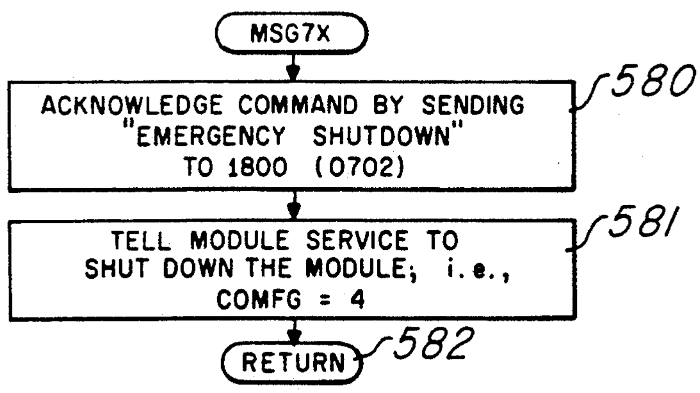

FIG. 6F, 6F-1 Flowchart of the program steps of the MSG6X subroutine

FIG. 6G Flowchart of the program steps of the MSG7X subroutine

Figure 6H:
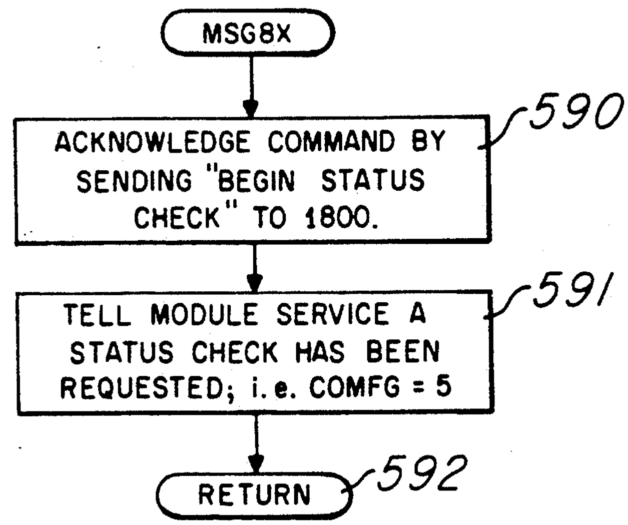
Figures 1, 6H:
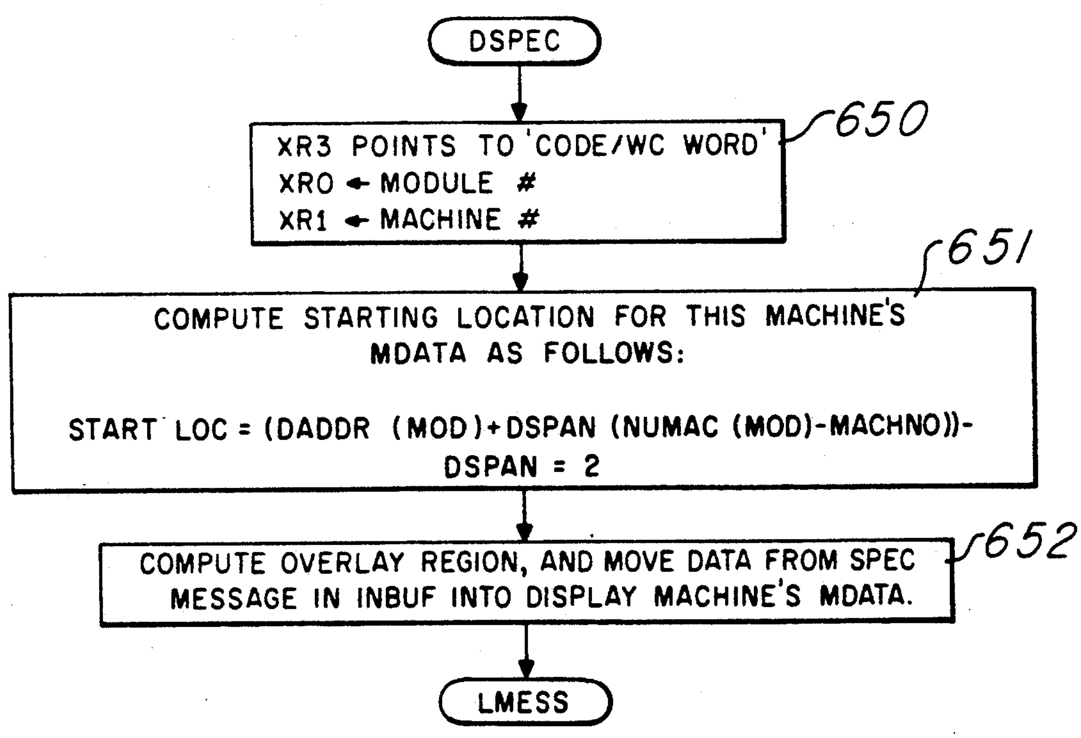

FIG. 6H, 6H-1 Flowchart of the program steps of the MSG8X subroutine

Figure 6J:
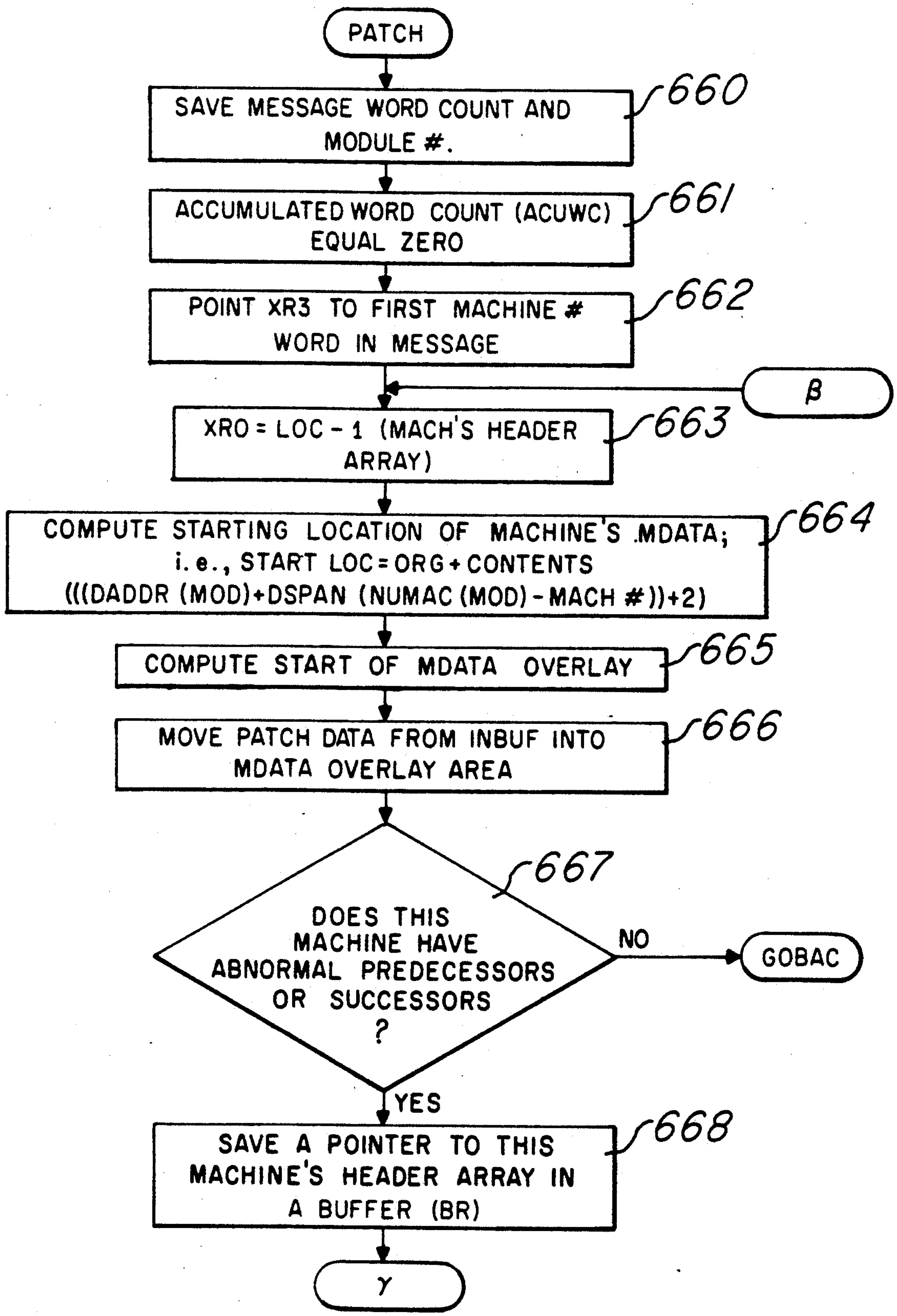
Figures 1, 6J:
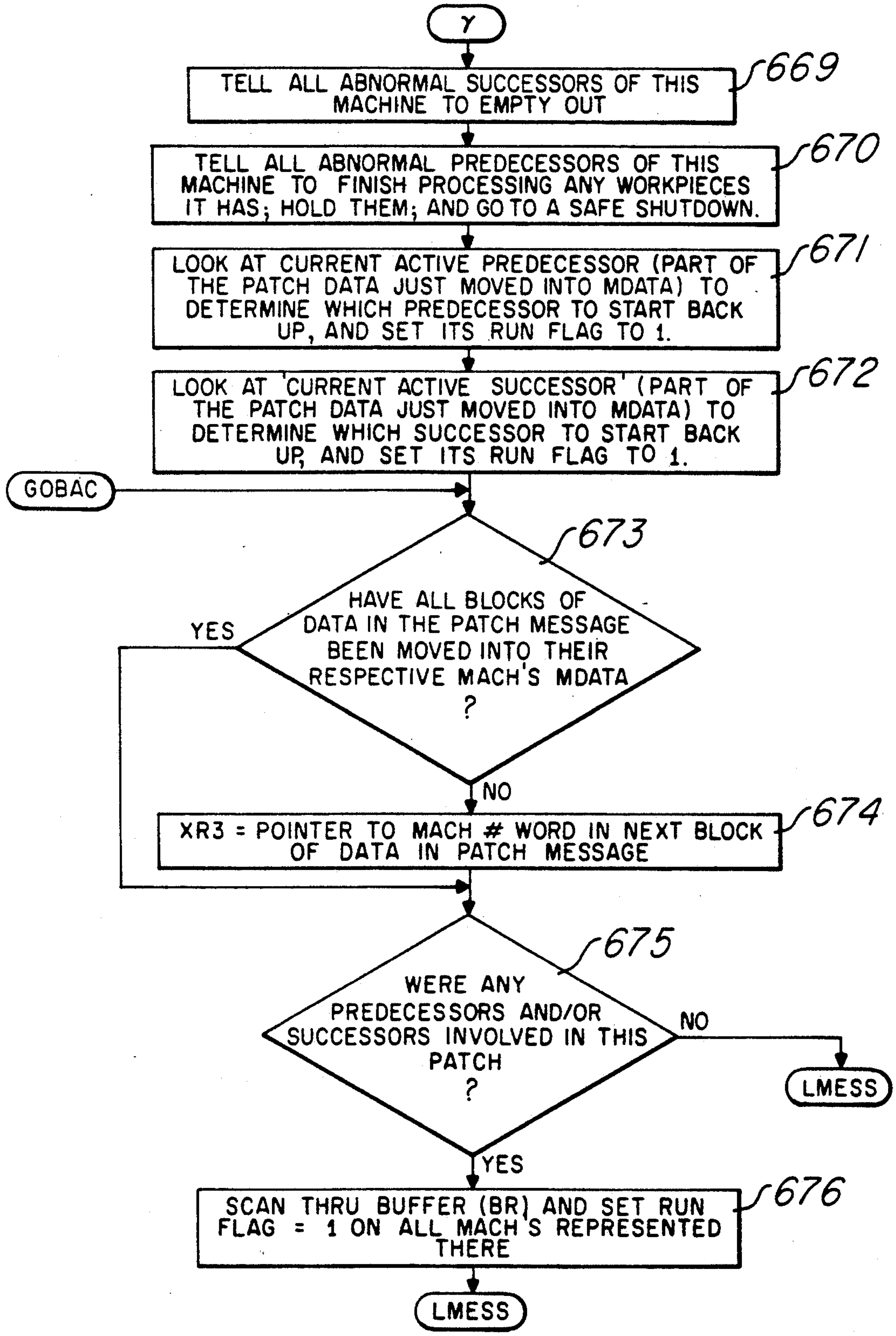
Figure 6L:
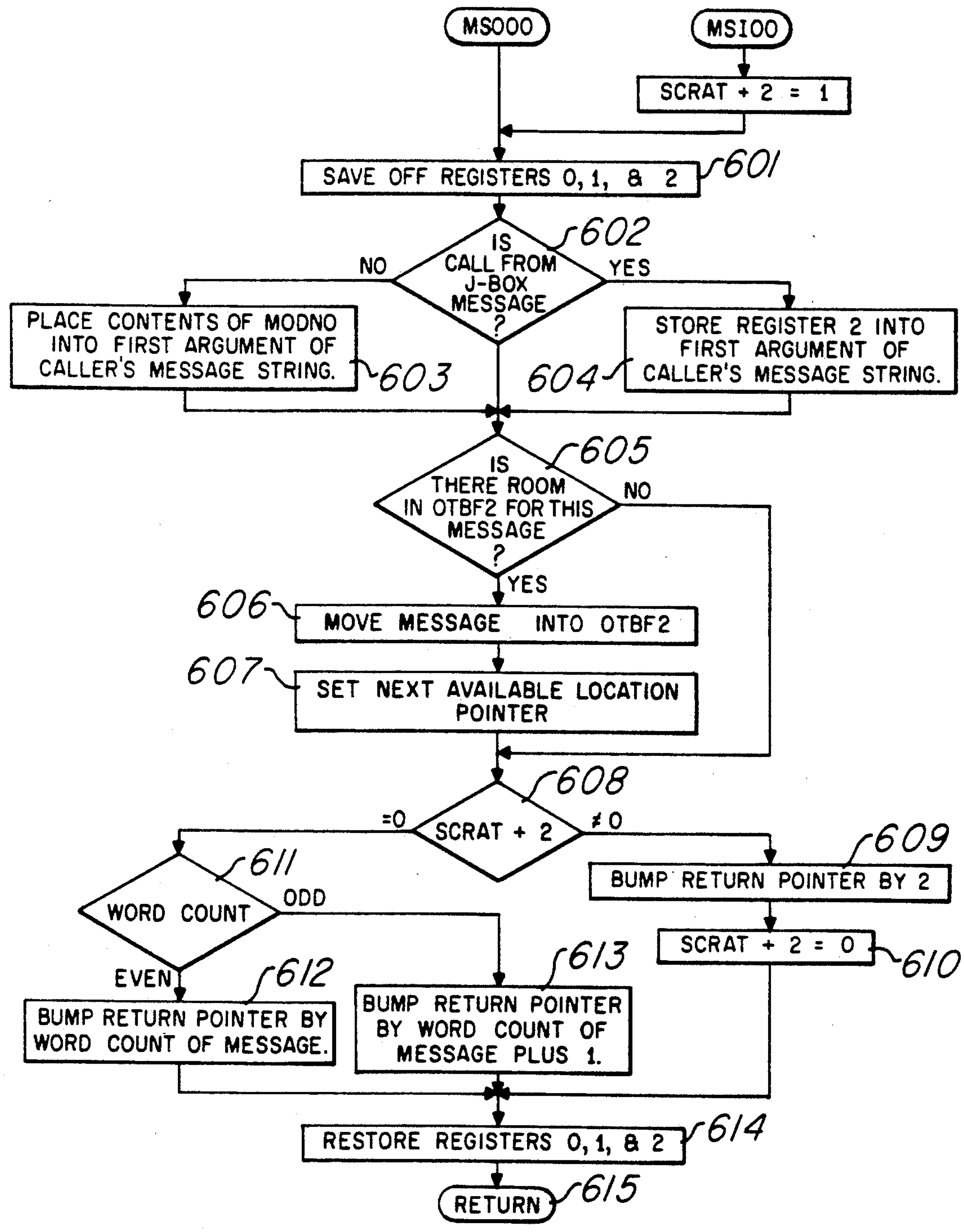

FIG. 6L Flowchart of the program steps of the MESSAGE HANDLER subroutine

MESSAGES FROM THE GENERAL PURPOSE (1800) HOST COMPUTER

FIG. 6I Flowchart of the program steps of the DSPEC subroutine

FIG. 6J-6J1 Flowchart of the program steps of the PATCH subroutine

FIG. 6K Flowchart of the program steps for abnormal successors and predecessors

FIG. 6M Flowchart of the program steps after all blocks of data in the message area have been moved TABLE Xa Description of superimposed list word information for a parity check of data transfers TABLE Xb Description of CRU interrupt status card used with LEVEL 1 to permit masking and status saving

LEVEL 1

Figure 7A:
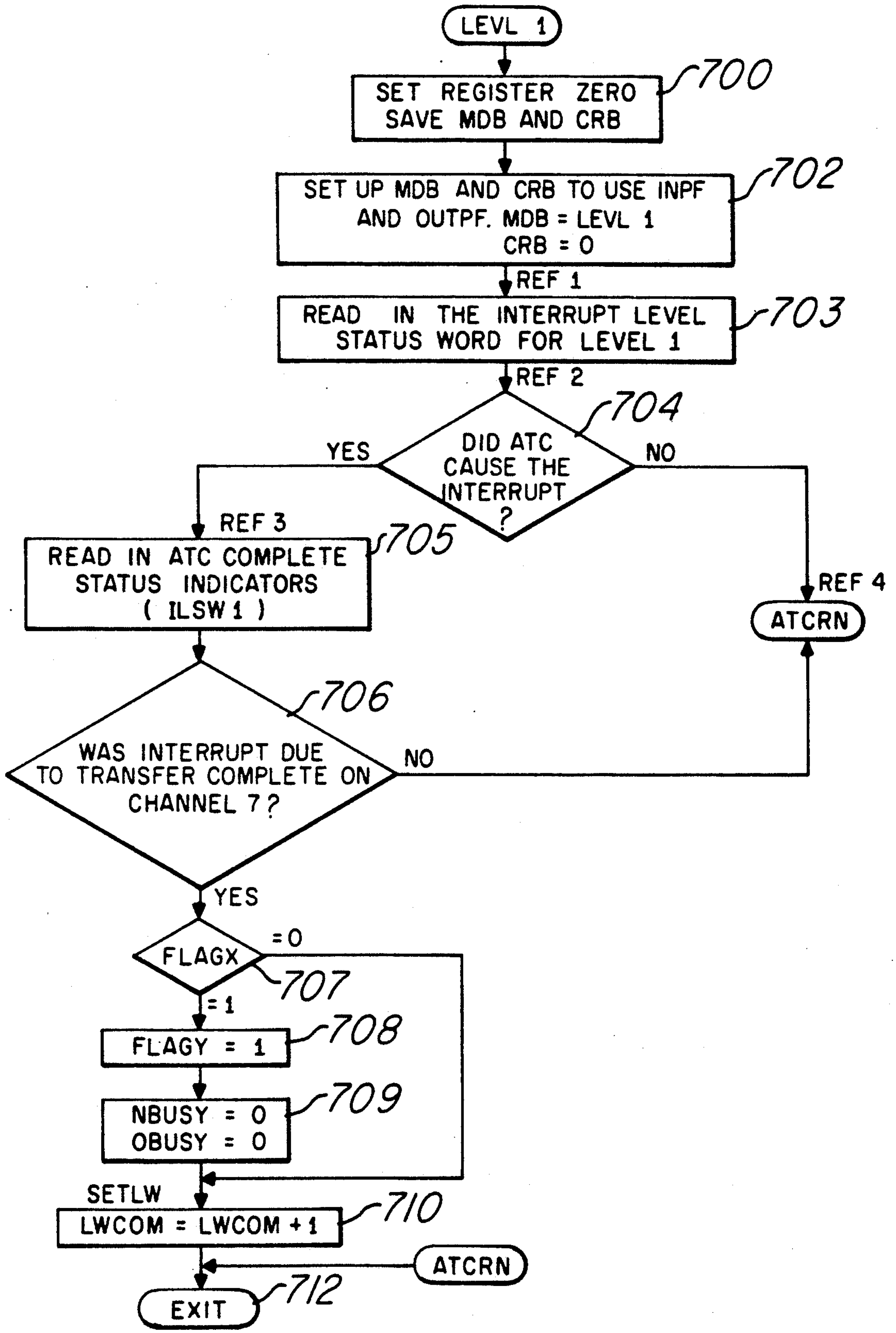

FIG. 7A Flowchart of the program steps involved in the LEVL1 interrupt routine

LEVEL 4

Figure 7B:
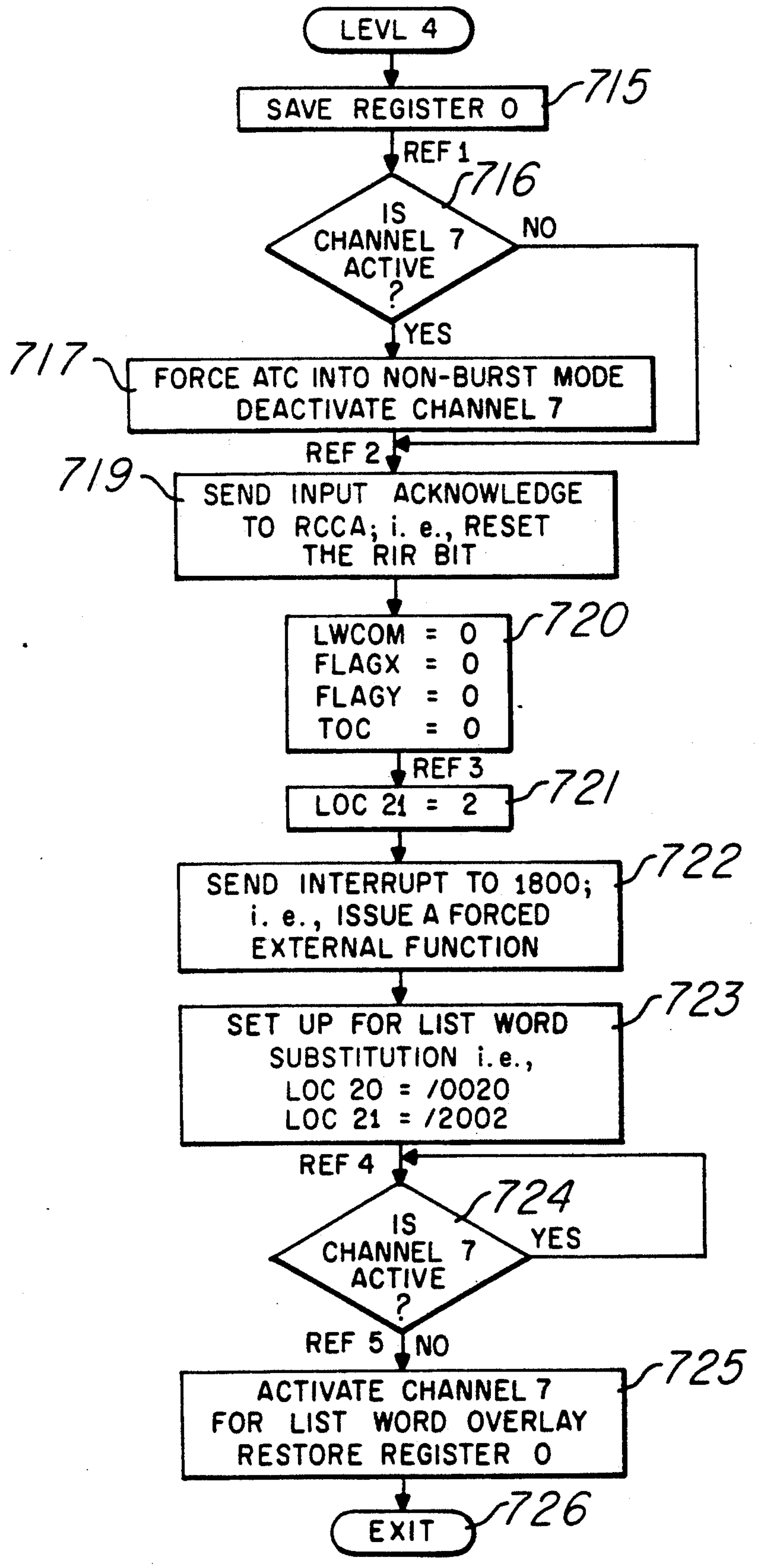

FIG. 7B Flowchart of the program steps involved in the LEVL4 routine

LEVEL 3

Figure 7C:
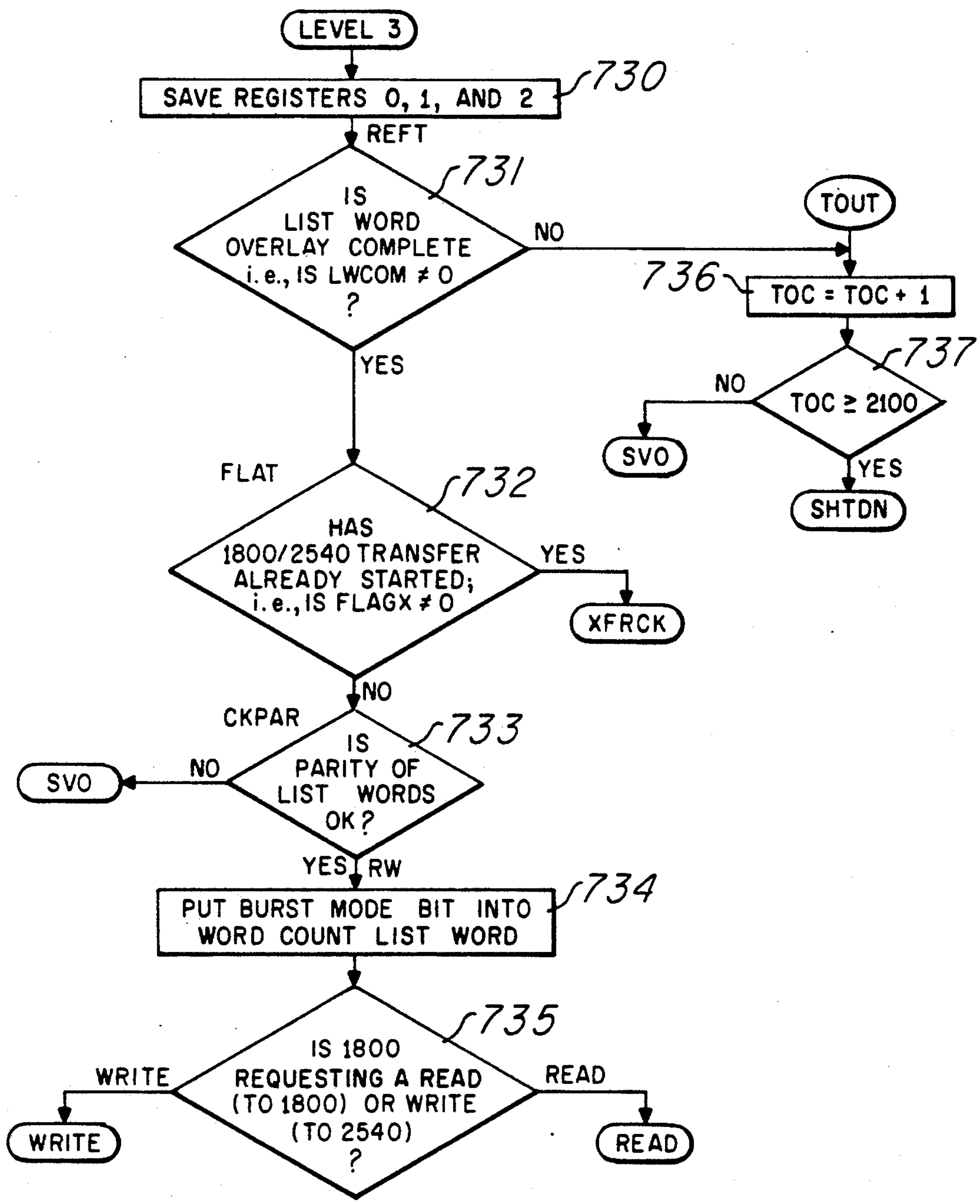

FIG. 7C Flowchart of the program steps involved in the LEVL3 routine

Figure 7D:
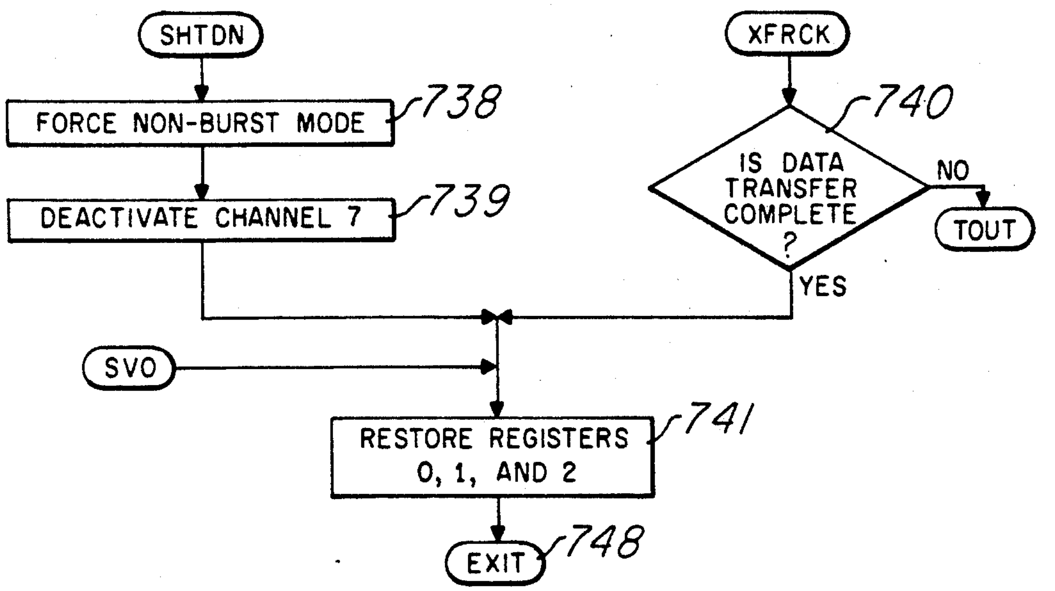
Figures 1, 7D:
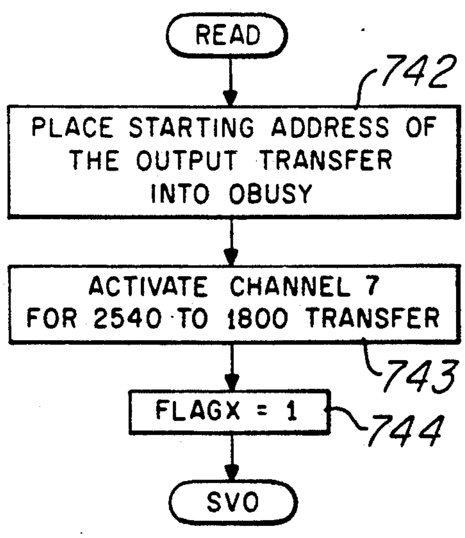
Figures 2, 7D:
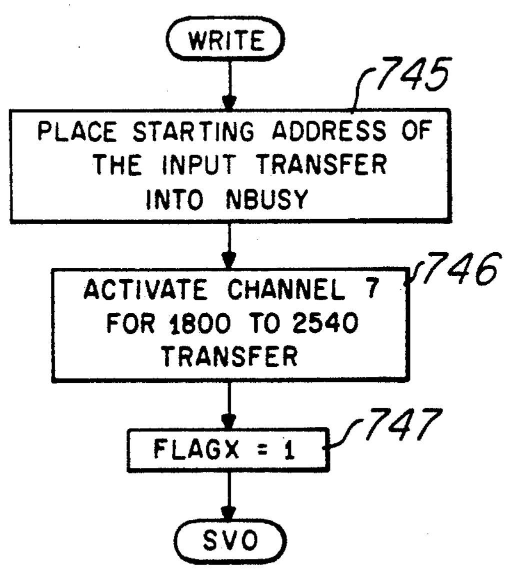

FIG. 7D Flowchart of the program steps for a shutdown or abortion of the data transfer FIG. 7E Flowchart of the program steps for a READ function

THE COMPUTER CONTROL SYSTEM

SOURCE LANGUAGE INSTRUCTION SET

REPRESENTATION OF THE 2540M COMPUTER MEMORY LAYOUT

TABLE XI Description of the 2540M computer's memory layout for the method of the present embodiment

INTERRUPT LEVEL ASSIGNMENTS

TABLE XII Description of the 16 priority interrupt levels of the 2540M computer in conjunction with the present embodiment

PROGRAMMING OF THE 2540M COMPUTER

SPECIAL (BASIC) INSTRUCTIONS

Figure 8A:
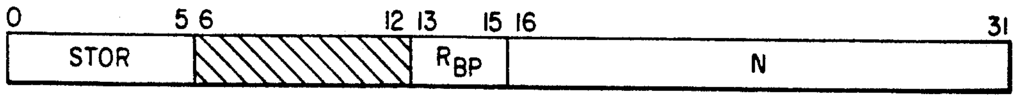
Figure 8B:
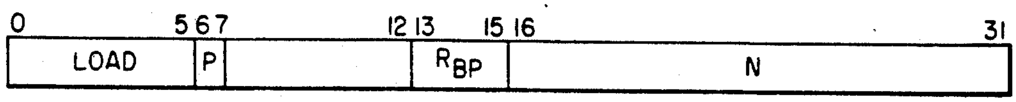
Figure 8C:
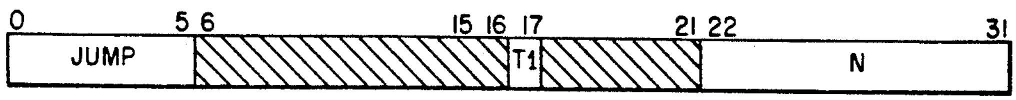
Figure 8D:
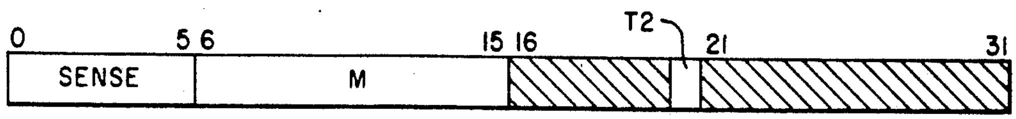
Figure 8E:
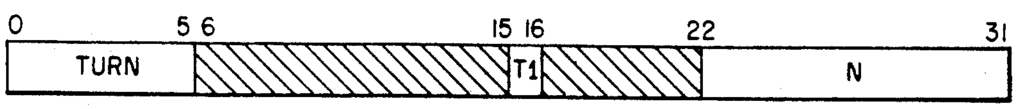
Figure 8F:
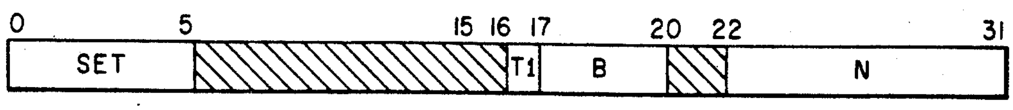
Figure 8G:
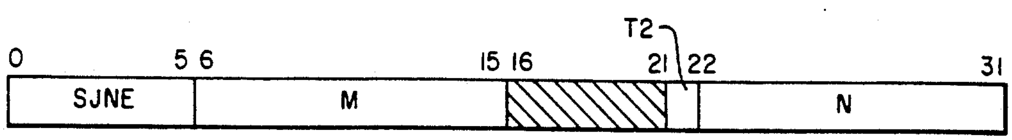
Figure 8H:
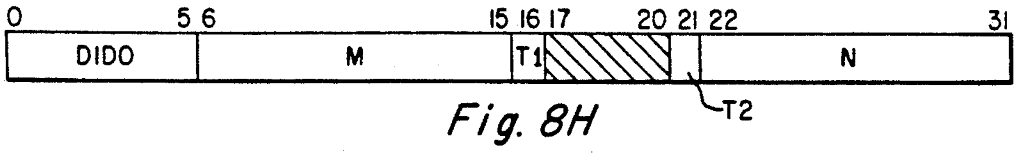
Figure 8I:
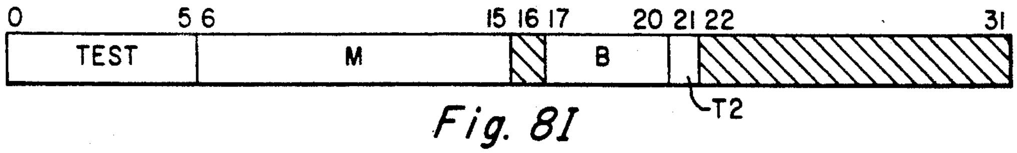
Figure 8J:
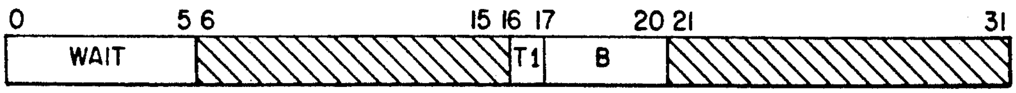
Figure 8K:
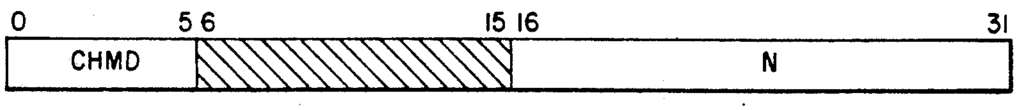
Figure 8L:
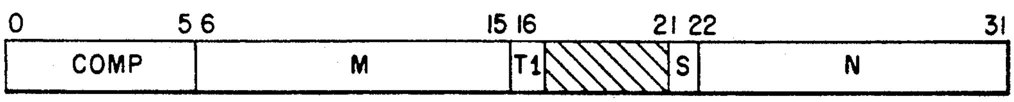
Figure 8M:
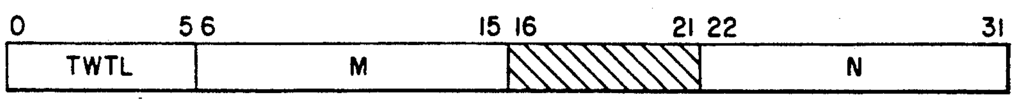
Figure 8N:
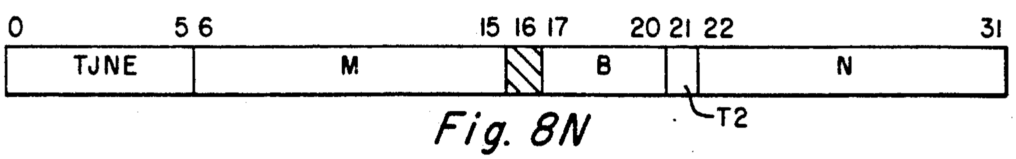
Figure 8O:
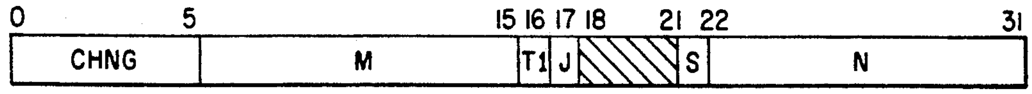
Figure 8P:
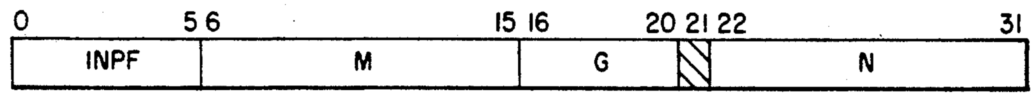
Figure 8Q:
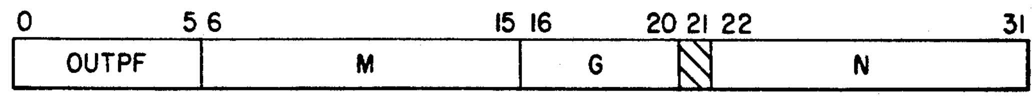
Figure 8R:
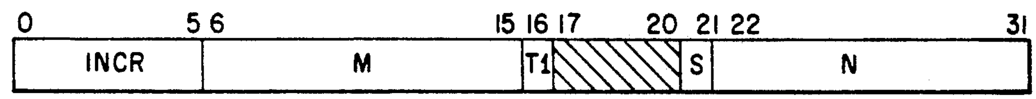

TABLE XIII Description of MODE 1 and MODE 2 instruction set for the 2540M computer TABLE XIIIa Description of the notation for the description of special instruction executions
FIG. 8A Block diagram of the Store Register
FIG. 8B Block diagram of the Load Register
FIG. 8C Block diagram of the Unconditional Jump Register
FIG. 8D Block diagram of the Test Digital Input Register
FIG. 8E Block diagram of the Digital Output Register
FIG. 8F Block diagram of the Set Software Flag Register
FIG. 8G Block diagram of the Digital Input Comparison/Conditional Jump Register
FIG. 8H Block diagram of the Digital Input Comparison/Conditional Digital Output Register
FIG. 8I Block diagram of the Test Software Flag Register
FIG. 8J Block diagram of the Wait for NO-OP Register
FIG. 8K Block diagram of the Change Mode Register
FIG. 8L Block diagram of the Compare Data Register
FIG. 8M Block diagram of the Test Within Two Limits Register
FIG. 8N Block diagram of the Software Flag Comparison/Conditional Jump Register
FIG. 8O Block diagram of the Change Memory Location Register
FIG. 8P Block diagram of the Input Fixed Number of Bits Register
FIG. 8Q Block diagram of the Output A Field Register
FIG. 8R Block diagram of the Increment Memory Location Register

VARIABLE FIELD SYNTAX FOR SPECIAL (BASIC) INSTRUCTIONS

SUPPLEMENTARY 2540 COMPUTER INSTRUCTIONS

Figure 9A:
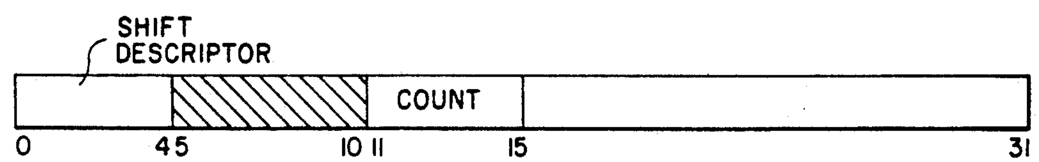
Figure 9B:
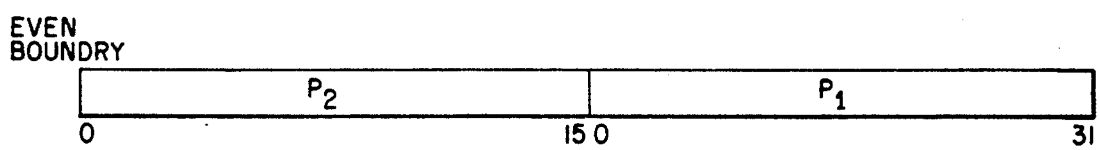
Figure 9C:
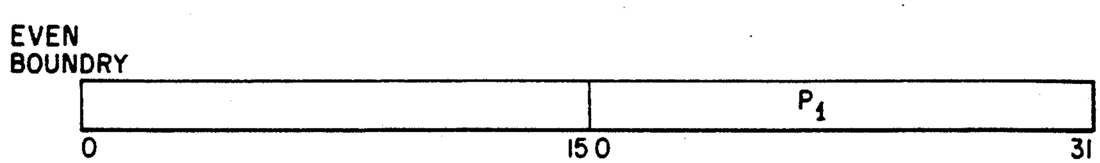

TABLE XIV Description of the supplementary 2540 computer instructions
TABLE XIVa Description of the notations for Operand derivation and Instruction execution
FIG. 9A Block diagram of the Shift Register
FIG. 9B Block diagram of the Exchange Status Word Register
FIG. 9C Block diagram of the Load Status Word Register

VARIABLE FIELD SYNTAX OF THE SUPPLEMENTAL INSTRUCTIONS

SIMULATION OF THE 1800 GENERAL PURPOSE COMPUTER BY THE 2540M COMPUTER

TABLE XV Description of the instruction set of the 2540M which simulates the 1800 computer operations

VARIABLE FIELD SYNTAX FOR SIMULATION

SPECIAL IMPLEMENTATION OF INSTRUCTIONS

TABLE XVI Special purpose functions

WRITING PROCEDURES FOR CONTROL OF SPECIFIC MACHINES

INSTRUCTIONS DEALING WITH INPUT/OUTPUT BIT LINES

INSTRUCTIONS DEALING WITH SOFTWARE BIT FLAGS

EXAMPLE OF THE OPERATION OF A SPECIFIC MACHINE

FIG. 10 Isometric drawing of a loader machine
TABLE XVa Description of the program steps of the first segment of the LOADER
TABLE XVb Description of the program steps of the second segment of the LOADER
TABLE XVc Description of the program steps of the third segment of the LOADER
TABLE XVd Description of the program steps of the fourth segment of the LOADER
TABLE XVe Description of the program steps of the subroutine CHECKAIR

PARTITIONING

FIGS. 11A-F Flowcharts showing the alteration of the GLOBAL subroutines REQUEST and ACKNOWLEDGE
FIGS. 3A-F Supra

UNSAFE MACHINES WITHOUT SAFE POSITIONS

Figure 12:
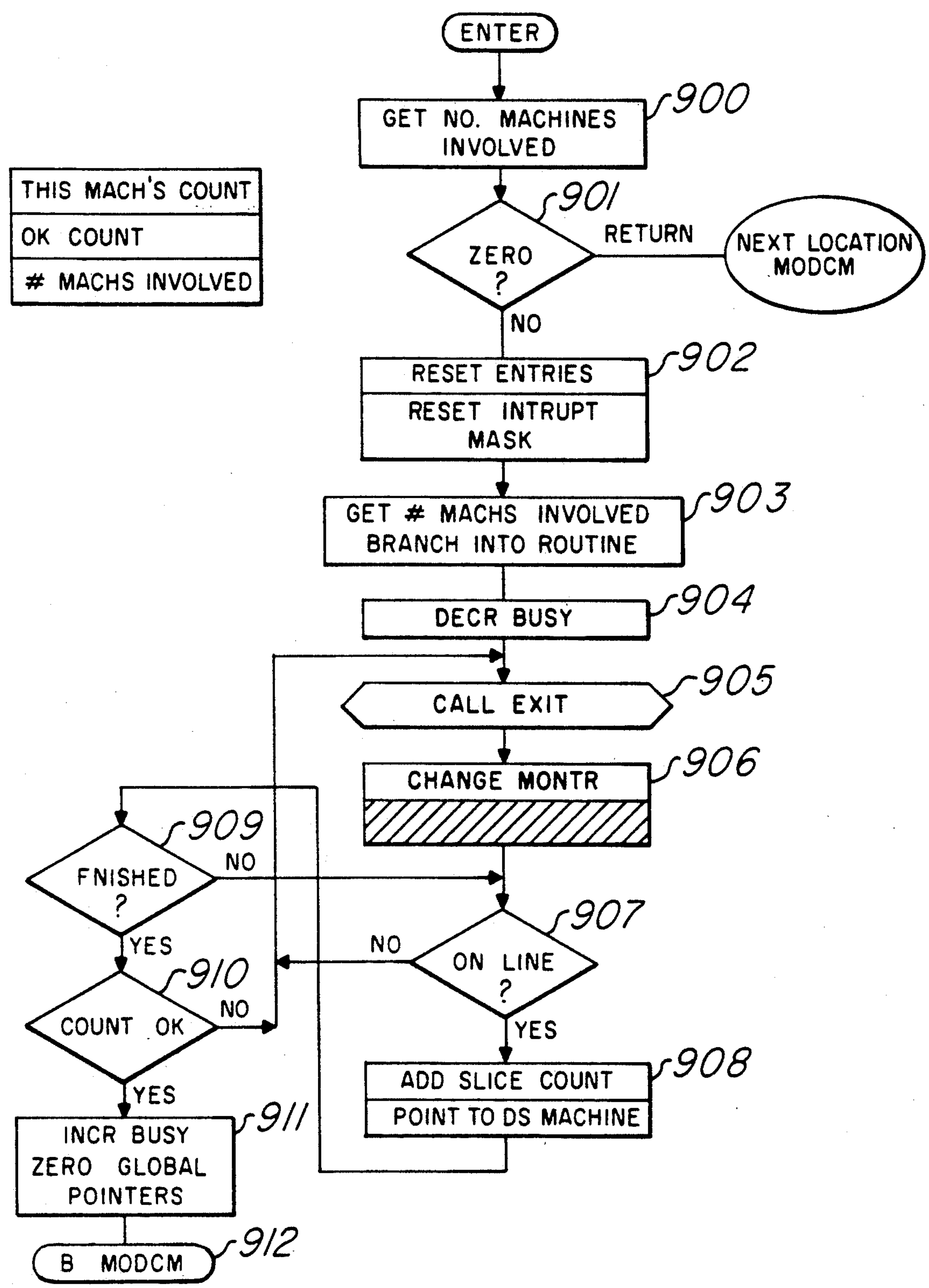

FIG. 12 Flowchart illustrating the procedural steps of the special program taken for modules containing UNSAFE machines

ASSEMBLER DEFINITION

FILE PREPARATION

SYMBOL TABLE BUILD

Figure 13:
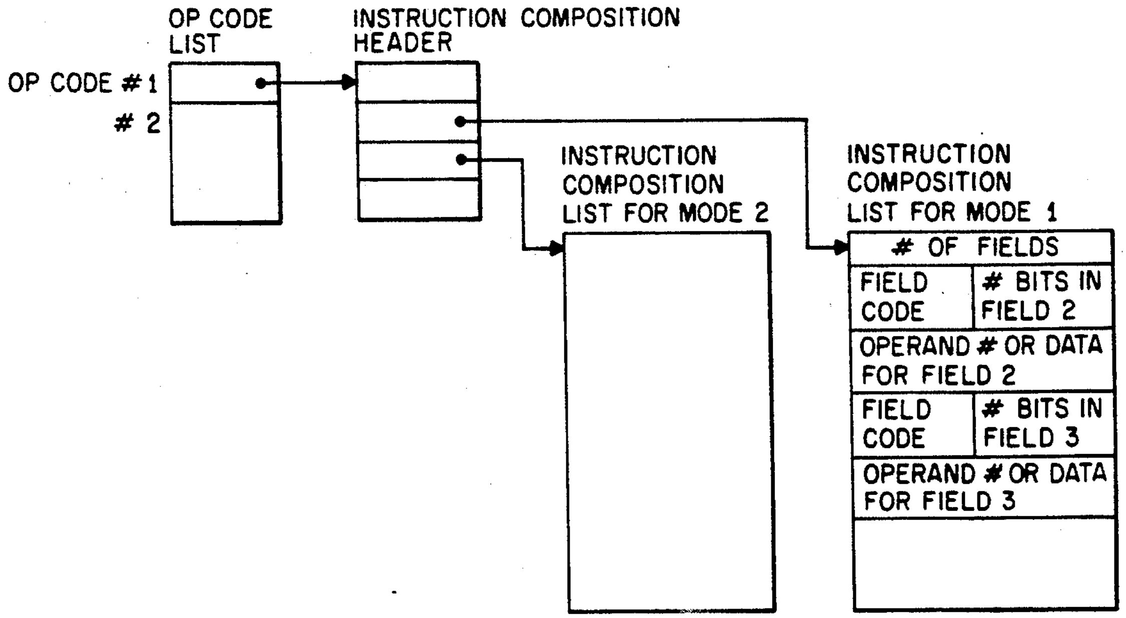
Figure 14:
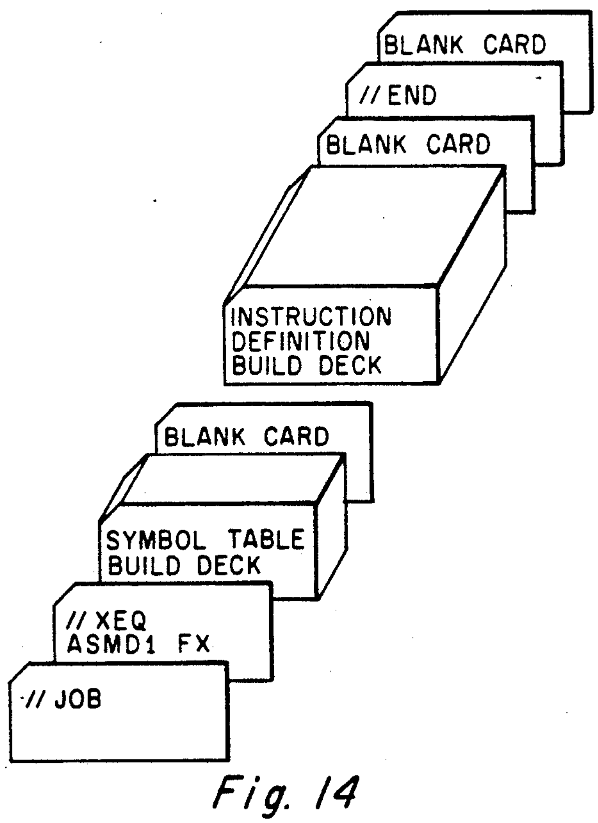

TABLE XVI Description of the assignments generated internally by the ASSEMBLER
FIG. 13 Diagram of the process producing the linked list data structure by the ASSEMBLER
FIG. 14 Isometric drawing showing the composition of the ASSEMBLER card deck

MULTIPLE SYMBOL TABLES

ASSEMBLER USAGE

Figure 15A:
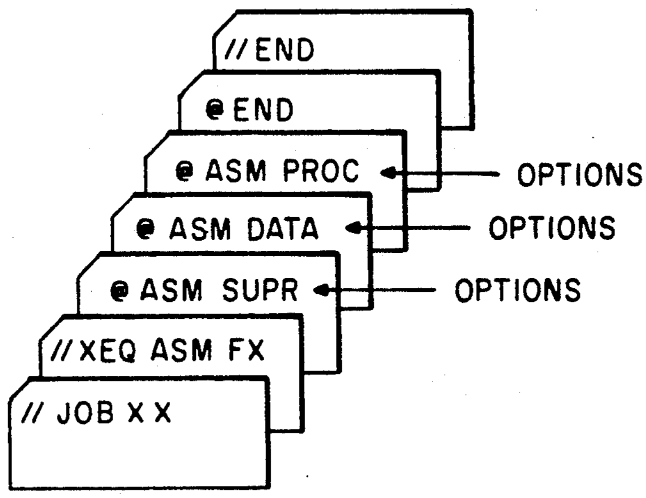
Figure 15B:
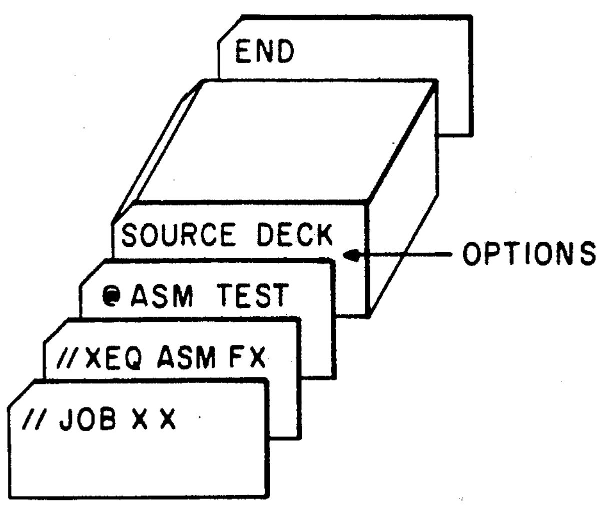

FIG. 15A Isometric drawing showing the composition of a card deck for PROC, DATA and SUPRA
FIG. 15B Isometric drawing showing the composition of a card deck for TEST

THE ASSEMBLER

Figure 16:
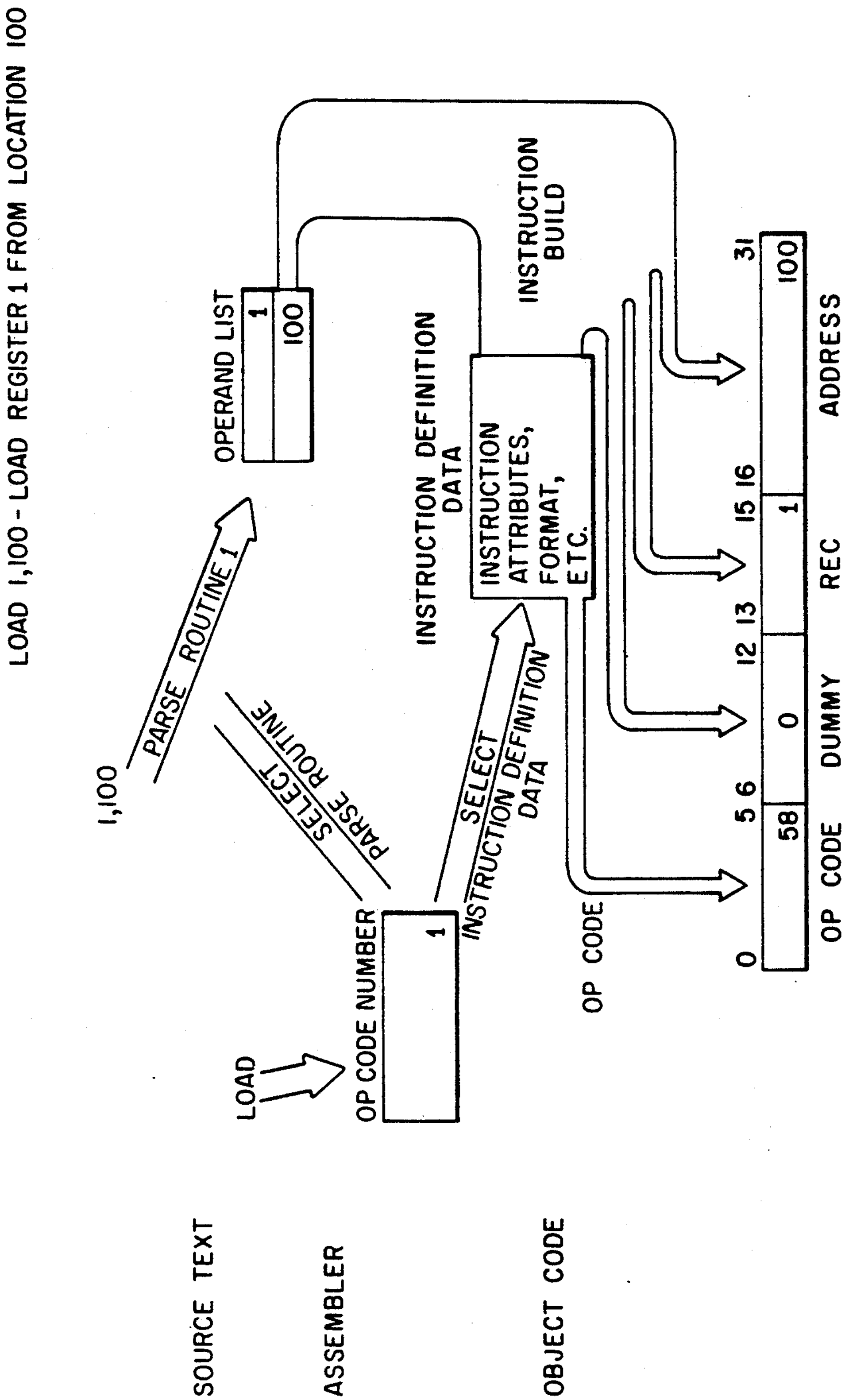

FIG. 16 Block diagram representing the translation of the instruction LOAD 1,100 by the ASSEMBLER

ASSEMBLER DEFINITION MODE

CORE LOAD CHAIN FOR ASSEMBLER DEFINITION

TABLE XVII Description of the core load chain for assembler definition

1. EXECUTION OF ASSEMBLER DEFINITION

TABLE XVIIIa Description of the ASSEMBLER procedure for ASMD
TABLE XVIIIb Description of the ASSEMBLER procedure for KEYAD TABLE XVIIIc Description of the ASSEMBLER procedure for LOAD3

TABLE XVIIId Description of the ASSEMBLER procedure for ASM2

TABLE XVIIIe Description of the ASSEMBLER procedure for ASM2A

TABLE XVIIIf Description of the ASSEMBLER procedure for INTZL

TABLE XVIIIg Description of the ASSEMBLER procedure for ZROP

TABLE XVIIIh Description of the ASSEMBLER procedure for ASM31

TABLE XVIIIi Description of the ASSEMBLER procedure for CHECK

TABLE XVIIIj Description of the ASSEMBLER procedure for BLDHD

TABLE XVIIIk Description of the ASSEMBLER procedure for ASM32

TABLE XVIIIl Description of the ASSEMBLER procedure for ALBCD

TABLE XVIIIm Description of the ASSEMBLER procedure for ISIT

TABLE XVIIIn Description of the ASSEMBLER procedure for FINT

USER OPERATION MODE

CORE LOAD CHAIN FOR NORMAL ASSEMBLY

TABLE XIX Description of the core load chain for normal assembly

2. EXECUTION OF ANALYZER

TABLE XXa Description of the ASSEMBLER procedure for ASMF

TABLE XXb Description of the ASSEMBLER procedure for OPTNS

TABLE XXc Description of the ASSEMBLER procedure for FETFA

TABLE XXd Description of the ASSEMBLER procedure for FIEND

TABLE XXe Description of the ASSEMBLER procedure for FINDN

TABLE XXf Description of the ASSEMBLER procedure for DFALT

3. EXECUTION OF PROLOG (PASS ONE)

4. EXECUTION OF PASS ONE

TABLE XXIa Description of the ASSEMBLER procedure for PROLI

TABLE XXIb Description of the ASSEMBLER procedure for PIDIR

TABLE XXIc Description of the ASSEMBLER procedure for FRAM1/FRA1

TABLE XXId Description of the ASSEMBLER procedure for UPDAT

TABLE XXIe Description of the ASSEMBLER procedure for LABPR

TABLE XXIf Description of the ASSEMBLER procedure for OPCD1

TABLE XXIg Description of the ASSEMBLER procedure for NCODE

TABLE XXIh Description of the ASSEMBLER procedure for MOD1

TABLE XXIi Description of the ASSEMBLER procedure for ORG1/EQV1

TABLE XXIj Description of the ASSEMBLER procedure for DC1

TABLE XXIk Description of the ASSEMBLER procedure for HDNG/LIST1

TABLE XXIl Description of the ASSEMBLER procedure for BSS1/BES1/BSEE1/BSSO1

TABLE XXIm Description of the ASSEMBLER procedure for ABS1

TABLE XXIn Description of the ASSEMBLER procedure for ENT1

TABLE XXIo Description of the ASSEMBLER procedure for MDAT1

TABLE XXIp Description of the ASSEMBLER procedure for CALL1/REF1

TABLE XXIq Description of the ASSEMBLER procedure for MDUM1/END1

TABLE XXIr Description of the ASSEMBLER procedure for DEF1

TABLE XXIs Description of the ASSEMBLER procedure for DMES1

TABLE XXIt Description of the ASSEMBLER procedure for WOFF

TABLE XXIu Description of the ASSEMBLER procedure for PASON

5. EXECUTION OF PASS TWO

TABLE XXIIa Description of the ASSEMBLER procedure for INIP2

TABLE XXIIb Description of the ASSEMBLER procedure for INOBJ

TABLE XXIIc Description of the ASSEMBLER procedure for P2FRM

TABLE XXIId Description of the ASSEMBLER procedure for P2STT

TABLE XXIIe Description of the ASSEMBLER procedure for LIST1

TABLE XXIIf Description of the ASSEMBLER procedure for HDNG2

TABLE XXIIg Description of the ASSEMBLER procedure for LIST2

TABLE XXIIh Description of the ASSEMBLER procedure for ABS2, ENT2, DEF2

TABLE XXIIj Description of the ASSEMBLER procedure for DC2

TABLE XXIIk Description of the ASSEMBLER procedure for CALL2

TABLE XXIIl Description of the ASSEMBLER procedure for PARSE

TABLE XXIIm Description of the ASSEMBLER procedure for LILR, LILR2

TABLE XXIIn Description of the ASSEMBLER procedure for OPERA

TABLE XXIIo Description of the ASSEMBLER procedure INDX,IN,IN3

TABLE XXIIp Description of the ASSEMBLER procedure for REG

TABLE XXIIq Description of the ASSEMBLER procedure for CSAV2

TABLE XXIIr Description of the ASSEMBLER procedure for INDR2

TABLE XXIIs Description of the ASSEMBLER procedure for WOBJC

TABLE XXIIt Description of the ASSEMBLER procedure for SRABS

TABLE XXIIu Description of the ASSEMBLER procedure for SRREL

TABLE XXIIv Description of the ASSEMBLER procedure for SRCAL

TABLE XXIIw Description of the ASSEMBLER procedure for TLOCA

TABLE XXIIx Description of the ASSEMBLER procedure for INSCD

TABLE XXIIy Description of the ASSEMBLER procedure for WRAPO

6. EXECUTION OF EPILOG

TABLE XXIIIa Description of the ASSEMBLER procedure for EPLOG

TABLE XXIIIb Description of the ASSEMBLER procedure for PRINT

TABLE XXIIIc Description of the ASSEMBLER procedure for CROSR

TABLE XXIIId Description of the ASSEMBLER procedure for ORDER

TABLE XXIIIe Description of the ASSEMBLER procedure for RVRSL

TABLE XXIIIf Description of the ASSEMBLER procedure for PNCHO

TABLE XXIIIg Description of the ASSEMBLER procedure for TBLOC

TABLE XXIIIh Description of the ASSEMBLER procedure for CINSP

TABLE XXIIIi Description of the ASSEMBLER procedure for CONPC

TABLE XXIIIj Description of the ASSEMBLER procedure for STOBJ

TABLE XXIIIk Description of the ASSEMBLER procedure for EROUT

TABLE XXIIIl Description of the ASSEMBLER procedure for WRFL

UTILITIES

TABLE XXIVa Description of the procedure for PSHRA/POPRA

TABLE XXIVb Description of the procedure for TOKEN

TABLE XXIVc Description of the procedure for READC

TABLE XXIVd Description of the procedure for EXPRN

TABLE XXIVe Description of the procedure for EX1

TABLE XXIVf Description of the procedure for GENRA

TABLE XXIVg Description of the procedure for INSP2

TABLE XXIVh Description of the procedure for WRTP2

TABLE XXIVi Description of the procedure for ERRIN

TABLE XXIVj Description of the procedure for NXEDT

TABLE XXIVk Description of the procedure for SAVEC

TABLE XXIVl Description of the procedure for COMPS

TABLE XXIVm Description of the procedure for SPMOC

TABLE XXIVn Description of the procedure for HASH

TABLE XXIVo Description of the procedure for FXHAS

TABLE XXIVp Description of the procedure for INSYM/ERINS

TABLE XXIVq Description of the procedure for REFR

TABLE XXIVr Description of the procedure for TESTL

TABLE XXIVs Description of the procedure for CHEKC

TABLE XXIVt Description of the procedure for GETNF

TABLE XXIVu Description of the procedure for SVEXT

TABLE XXIVv Description of the procedure for MOVE

TABLE XXIVw Description of the procedure for WRTOB

TABLE XXIVx Description of the procedure for FTCH2

TABLE XXIVy Description of the procedure for INS

TABLE XXIVz Description of the procedure for WRFL/WRTFL

TABLE XXVa Description of the procedure for NOTHR

TABLE XXVb Description of the procedure for STRIK

TABLE XXVc Description of the procedure for CUTB

TABLE XXVd Description of the procedure for NEXTH

TABLE XXVe Description of the procedure for FLTSH

TABLE XXVf Description of the procedure for REPK

TABLE XXVg Description of the procedure for RPSVW

TABLE XXVh Description of the procedure for FTCHS

TABLE XXVi Description of the procedure for FTCHE

TABLE XXVj Description of the procedure for MOVER

TABLE XXVk Description of the procedure for EXTRK

I/O DATA FLOW

Figure 17A:
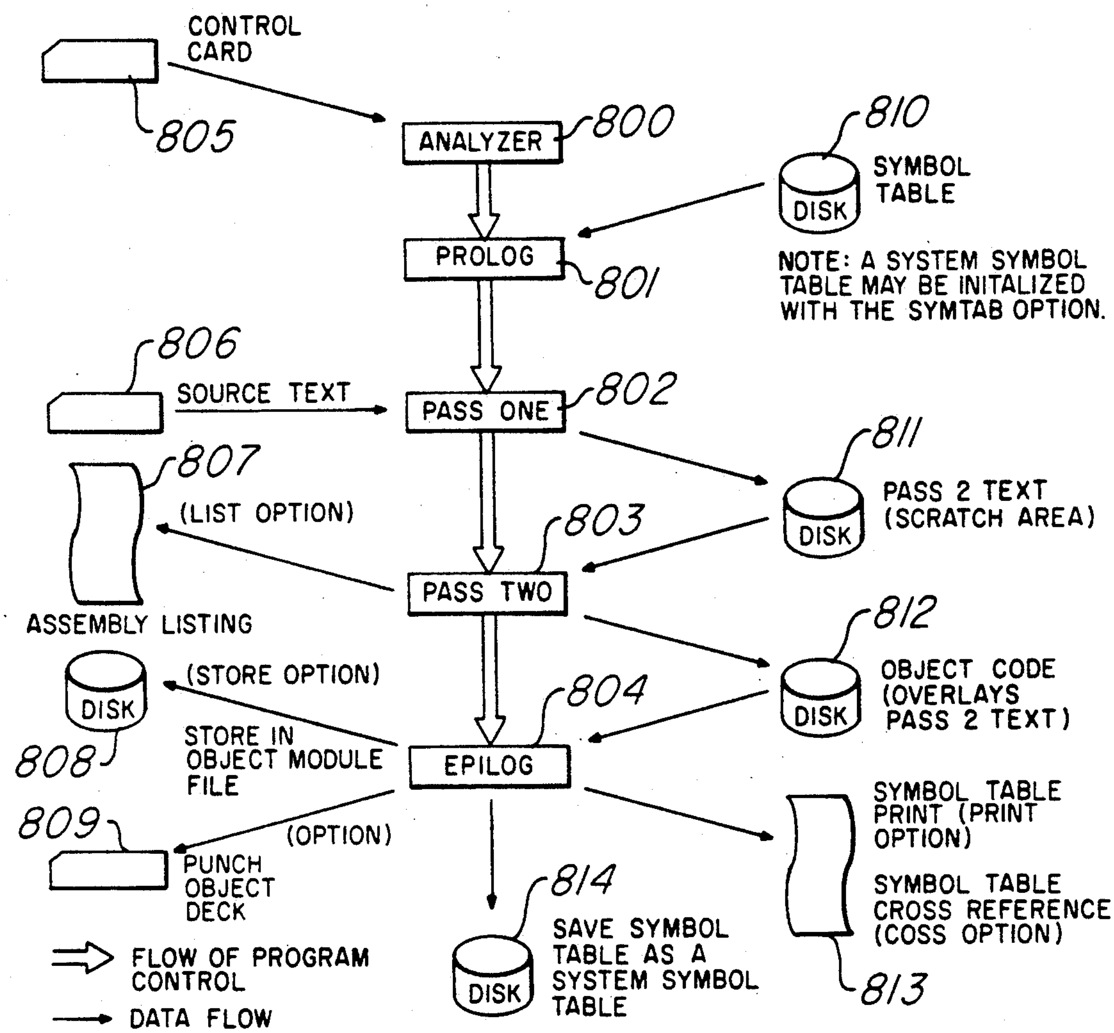

FIG. 17*a* Block diagram of the analyzer section of the ASSEMBLER

Figure 17B:
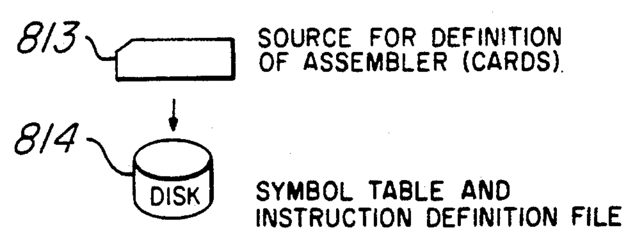

FIG. 17*b* Block diagram of the peripherals used in the instruction options of the ASSEMBLER utilized in the present embodiment

STORAGE ASSIGNMENT AND LAYOUT STRUCTURE

TABLE XXVIa Description of the allocation of variable core

TABLE XXVIb Description of the core allocation for the EDIT function during execution of Pass One.

TABLE XXVIc Description of the symbol table after instruction definition

TABLE XXVId Description of the symbol table after an assembly

TABLE XXVIe Description of the symbol table for Hash Table entries

TABLE XXVIf Description of the symbol table for symbol table entries

TABLE XXVIg Description of the symbol table for reference entries

TABLE XXVIh Description of the header for each instruction

TABLE XXVIi-j Description of the Instruction Composition List

RETURN ADDRESS STACK

TABLE XXVIk Description of the return address stack

FLAG TABLE

TABLE XXVIl Description of the flag table

TABLE XXVIm-n Description of the bit assignments for the flags CONTL, MACHF and OBJCT

CARD BUFFER

TABLE XXVIo Description of the card buffer

TABLE XXVIp Description of the Pass Two text

TABLE XXVIq Description of the IDISK, ODISK and EDISK buffers

TABLE XXVIr Description of the WDISK buffer

TABLE XXVIs Description of the page header buffer

TABLE XXVIt Description of the printing buffer

TABLES XXVIu-v Description of the error list buffer

TABLES XXVIw-x Description of the parse stack

TABLE XXVIy Description of pseudo accumulator maintained in conjunction with parse stack TABLE XXVIz Description of symbol table for operand list TABLE XXVIIa Description of external reference list TABLE XXVIIb Description of edit vector TABLE XXVIIc Description of the object module for relocatable programs TABLE XXVIId Description of the object module for absolute programs TABLE XXVIIe Description of the OBJ Module Program Type TABLE XXVIIf Description of the Data Block (Header and Data)

TABLE XXVIIg List of Error Codes utilized in the present embodiment for assembly errors

CORE LOAD BUILDER

PROGRAM OPERATION

PROCESSING ENTRIES AND REFERENCES

PROGRAMS

TABLE XXVIIIa Description of the procedure for CONL

TABLE XXVIIIb Description of the procedure for LOADR

TABLE XXVIIIc Description of the procedure for FIND1

TABLE XXVIIId Description of the procedure for PENT1

TABLE XXVIIIe Description of the procedure for PREF1

TABLE XXVIIIf Description of the procedure for CMAP

TABLE XXVIIIg Description of the procedure for ILEVA

TABLE XXVIIIh Description of the procedure for MARKL

TABLE XXVIIIi Description of the procedure for ERDEF

TABLE XXVIIIj Description of the procedure for LOAD

TABLE XXVIIIk Description of the procedure for RLD

TABLE XXVIIIl Description of the procedure for MOVEW

TABLE XXVIIIm Description of the procedure for TSTBF

TABLE XXIVl Supra

TABLE XXIVm Supra

TABLE XXVIIn Description of the procedure for WRTCD

MOVEMENT OF DATA

TABLE XXIX Description of the movement of data from the object module to core load

LOAD MATRIX DESCRIPTION

TABLES XXXa-d Description of the LOAD MATRIX

SEGMENTED CORE LOAD BUILDER

TABLE XXXIa Description of the procedure for SEGCL

DATA BASE BUILDER

TABLE XXXIb Description of the procedure for DATBX

ACCESS LOGICAL FILE

TABLE XXXIc Description of the procedure for MACLF

2540 BOOTSTRAP

TABLE XXXId Description of the procedure for the 2540 BOOTSTRAP

LOAD 2540

TABLE XXXIe Description of the procedure for LDWARB

CONCLUSION

INTRODUCTION

In accordance with the present invention, machines are operated by computer control. This is accomplished by generating individual machine control programs or procedures which are organized into modular segments, with the segments in a one-to-one correspondence with physical work stations in the machine, and operating each work station independently with respect to all other work stations by executing each segment of each control program independently of all others.

This method of operation is particularly useful where assembly lines or portions of assembly lines are comprised of machines placed side by side in a row. Manufacturing or processing takes place by transporting a workpiece from work station to work station and from machine to machine. The workpiece is stopped at the various work stations of each machine and operations are performed on the workpiece. The workpiece is then transported to another work station of the same machine or the next machine in the line.

Different manufacturing or processing can take place on a single assembly line by varying or bypassing altogether an individual machine's operation or by skipping some of the machines and hence some of the steps in the assembly line or by repeatedly passing a workpiece through the same machines to perform similar steps. This represents a departure from the uni-directional flow of the normal assembly line from upstream to downstream. The dilemma is resolved in accordance with an embodiment of the invention by implementing a forked line. A given machine may have more than one exit path or more than one input path where one path is designated as normal and any additional paths would be considered abnormal. Between any two machines or work stations, the flow of workpieces is still from upstream to downstream. regardless of the path. Material tracking of the workpieces from work station to work station becomes very desirable to insure that a workpiece is processed appropriately and to insure that the workpiece follows its proper path down the assembly line. Since each machine may have one or more work stations, the machines would have a respective number of independent control program segments so that each work station of the assembly line operates independently with respect to the other work stations. This independent operation permits any number of workpieces desired to be present in the assembly line. In addition, with asynchronous operation, a workpiece may be processed at each work station regardless of the status of any workpiece or work station in the line.

"Asynchronous" in this context refers to the appearance of simultaneous (though unrelated) operation of all the machines under control of a single computer. In fact, a typical digital computer can do but one thing at a time; it is capable of performing only one instruction at a time and sequentially obtaining the instructions from its own memory, unless the sequence is altered by response to interrupt stimuli or execution of certain instructions, widely known as "branch" instructions.

In controlling electromechanical devices, a relatively "large" amount of time (in seconds) is required for mechanical motion while a computer may process data and make decisions in micro seconds. For example, suppose a typewriter is to type a sentence under computer control. The appropriate program in the computer might present a single character to the typewriter with the command to type. Electronic circuitry then accesses the character presented, closing the circuit corresponding to the correct key, triggering a solenoid whose magnetic field forces the key to strike the typewriter ribbon against paper, leaving the correct character impression. Meanwhile, the programs in the computer have been doing other things. An interrupt may be used to signal the computer that the character has been typed and the typewriter is ready to receive another character. Responding to the interrupt, the computer may briefly reexecute the appropriate program to present another character and again command to type.

This same concept; that is, requiring the computer only to start an activity, and then briefly at intervals continue the activity, leads to simultaneous activity among all devices attached to a given computer.

The combination of asynchronous operation with segmented program organization and operation describes the segmented asynchronous operation of an assembly line.

Manufacturing or processing in many industries involves steps which are considered unsafe for one reason or another. For example, steps involving extreme heat or extreme pressures or movement of large mechanical bodies or noxious chemicals may damage the workpiece or the machine or any operators in the area unless they are carried to completion. Detection of malfunction or abnormal condition is an essential part of computer control of machines as is providing operator messages in the event of such detection and taking corrective action to bring a malfunctioning machine to a safe condition. In computer control of machines, several states are recognized. For instance, the machine may be operational or not. The machine which is operational and under computer control is often called on-line, although the machine may be empty or not, as it may contain workpieces in any state. The machine may be in a safe condition or an unsafe condition. The workpiece or machine itself or any nearby humans may be in danger unless the machine finishes some or all of its work. In accordance with the invention, segmented operation allows these states to be carried down to the level of a work station. A multi-work station machine may have failure or malfunction in any one work station. Depending on the particular machine involved, it may be important to known which work station has malfunctioned. For example, if one work station should malfunction while another in the same machine is in an unsafe condition, the malfunctioning work stations causes an alarm to the machine operators, if there are any, and processing on the station stops. However, for the work station in the unsafe condition, processing continues until a safe state is reached. Then, entire machine causes an alarm and operation discontinues.

Workpiece movement between two adjacent work stations is accompanied by software segment communication using software gate flags. Each work station program segment has its own set of gate flags and, in particular, an input gate flag and an output gate flag. Other software flags might be used to keep track of various status of machine devices such as: Up-Down, Left-Right, In-Out, Light-Dark, Top-Bottom, Open-Shut, or any other two valued functions. When the gate flags are open between work station segments, a workpiece is passed between the work stations. The gate flags are closed as the workpiece clears the upstream work station and enters the downstream work station. Opening and closing of software gate flags and detection of workpiece movement is identical from work station to work station. These operations are incorporated into program subroutines called GLOBAL SUBROUTINES. The GLOBAL SUBROUTINES are shared by all work station program segments to control workpiece movement.

The global subroutines control workpiece movement using the gate flags, depending on the state of the work station or machine. There are four global subroutines in the present embodiment of the invention. The first two, known as REQUEST WORKPIECE and ACKNOWLEDGE RECEIPT, are used in the program segment to obtain a workpiece from an upstream work station. The other two, called READY RELEASE and ASSURE EXIT, are used in the program segment to transmit a workpiece to a downstream work station. TABLES 1A-B show the normal sequence of events when a workpiece moves from work station to work station. A guideline, or general flow chart of one work station program showing the interleaving of segment execution with global subroutines, is shown in FIG. 1. This one work station program segment, shown in FIG. 1, controls the transfer of workpieces and workpiece processing for a single work station. There is a separate work station program segment for each work station, and two work station program segments control the transfer of workpieces between two corresponding adjacent work stations.

FIG. 10 shows a loader machine utilized to load semiconductor slices into a carrier. The loader machine is a multi-work station machine having four work stations and four corresponding work station program segments. The loader machine will be described in detail later in the description; however, for the purposes of this immediate description, the first three work stations 1000, 1001, and 1008 will be referred to briefly. The first two work stations 1000 and and 1001 are queues, each comprising a bed section 1002 large enough to hold a workpiece 1003, a photocell sensor 1004 for detecting the workpiece presence, a brake 1005 for keeping the workpiece in place, and a pneumatic transport mechanism 1006.

The third work station is comprised of a workpiece carrier platform 1007 which can be moved vertically up and down, a tongue extension 1008 on the bed section on which the workpiece travels with a brake 1009 at the tongue to stop and position a workpiece precisely in a carrier 1010, the shared pneumatic transport mechanism 1006 and photocell sensors.

The workpieces 1003 are semiconductor slices. Work station 1000 is the upstream neighbor work station to work station 1001, work station 1001 is the downstream neighbor work station of work station 1000, work station 1001 is the upstream neighbor work station of work station 1008, and work station 1008 is the downstream work station to work station 1001. The workpieces 1003 are transferred to work station 1000, then to work station 1001, then to work station 1008. A processing operation is carried out in each workpiece at each work station. The processing operation carried out in the loader shown in FIG. 10 is a queue of wait at work stations 1000 and 1001, and a load at work stations 1008. Other machines can carry out varied work processes at their work stations.

Three work station program segments correspond to the three work stations 1000, 1001 and 1008.

There is a work station program segment as shown in FIG. 1 for each of the work stations 1000, 1001 and 1008.

In the work station program segment shown in FIG. 1, the two global subroutine calls REQUEST WORKPIECE 22 and ACKNOWLEDGE RECEIPT 24 handle the request and receipt of a workpiece from an upstream neighbor work station. Under abnormal conditions, as when a workpiece is entered manually at the work station, provision is made in REQUEST WORKPIECE 22 to proceed directly to PROCESS WORKPIECE 28. The REQUEST WORKPIECE subroutine 22 in a work station program segment corresponding to work station 1001 will request a workpiece from the upstream neighbor work station 1000. The processing performed is the work to be performed on the workpiece 1003 at work station 1001 (a queue operation). If, for some reason, the upstream neighbor work station such as work station 1000 fails to send the workpiece 1003, as in a machine failure, the work station program segment can recover by special exit from ACKNOWLEDGE RECEIPT 24 and WAIT FOR A NEW TRANSACTION.

The two subroutine calls READY RELEASE 29 and ASSURE EXIT 31 in a workpiece program segment corresponding to work station 1001 control the transfer of a finished workpiece such as workpiece 1003 to a downstream neighbor work station 1008. The work station program segments corresponding to work stations 1000 and 1008 control the transfer of workpieces to and from those work stations and the processing of workpieces at those work stations in the same manner as the work station program segment for work station 1001.

The normal sequence of transmitting workpieces between work stations through use of program segments is shown in Table IA and Table IB.

The use of work station program segments to control the transfer of workpieces between work stations and to control process operations on the workpieces at work stations has been briefly described. The following description will describe this in more detail.

TABLE IA

Normal sequence of workpiece transfer between adjacent work stations using program segments.

1. All gates between the work station program segments closed.
2. Upstream work station program segment - workpiece processing finished. Open outgate of upstream work station program segment by READY RELEASE - From upstream work station program segment.
3. Downstream work station program segment. Open ingate of downstream work station program segment by REQUEST WORKPIECE - From downstream work station program segment.
4. Upstream work station program segment - workpiece clears station (PC sensor senses workpiece has exited). Close outgate of upstream work station program segment by ASSURE EXIT from upstream work station program segment.
5. Downstream work station program segment Close ingate of downstream work station program segment - by ACKNOWLEDGE RECEIPT from downstream work station program segment. Wait for arrival. (PC sensor senses workpiece has arrived).
6. All gates between work station program segments closed again.

Time sequence of workpiece transfer between adjacent work stations using program segments.

TABLE IB

| Time | Upstream Work Station Program Segment | Downstream Work Station Program Segment |
|---|---|---|
| | | Enter REQUEST SLICE, wait for upstream work station program segment out gate to open. |
| | Finish workpiece processing, then enter READY RELEASE, open my out gate, wait for downstream work station segment to open its in gate. | |
| | | Upstream work station program segment opened, open my in gate, return to my work station program |

TABLE IB-continued

| Time | Upstream Work Station Program Segment | Downstream Work Station Program Segment |
|---|---|---|
| | | segment, set utilities to receive workpiece, enter ACKNOWLEDGE RECEIPT, wait for upstream work station program segment out gate to close. |
| | Downstream work station program segment in gate opened, go back to my work station program segment, release the workpiece by setting output utilities, enter ASSURE EXIT, wait for workpiece (allow N seconds) to clear my PC sensor. | |
| | Workpiece clears my PC sensor, close my out gate, go back to my work station program segment and allow time for workpiece to clear before setting output utilities and enter REQUEST SLICE to request new workpiece. | Upstream work station program segment out gate closed, allow N seconds for workpiece to arrive at my PC sensor. |
| | | Workpiece arrives, return to my work station program segment for processing. |

In one embodiment, the assembly line is organized into modules representing major process steps. Each module or portion of the assembly line is comprised of machines placed side by side in a row. In such an embodiment, major process steps are performed sequentially on the workpiece as it proceeds from module to module through the assembly line until a finished product is produced at the end of the assembly line. Each machine in a module performs some necessary step to the workpiece at each work station in the machine by stopping the workpiece at the particular work station long enough to perform the necessary work.

Referring to FIG. 1, one computer system utilized to operate an assembly line of this type is functionally comprised of one or more bit pusher computers 10 and one general purpose digital computer 11. The general purpose digital computer 11 is called the "host computer" or "supervisory computer" and the bit pusher computers 10 are called "worker computers".

In this embodiment, each computer 10 controls a group of machines 12 corresponding to a major process step by executing each segment of each machine control program when a workpiece is present at the corresponding work station 14 of the machine 12 (although the group of machines 12 may be the entire assembly line). Where the machines 12 are grouped to perform a single major process step to the workpiece, the group is called a module 13. However, in accordance with the invention, each computer 10 has the capability to control more than one module 13 such that each module controlled by a computer 10 operates asynchronously and independently with respect to the other modules controlled by the same computer. Machines 12 comprising a module 13 are individually connected to a communications register unit (CRU) forming part of the respective bit pusher computer 10.

General purpose computer 11 in this system performs all "host" functions, or support functions, for computers 10. Program assembly for computers 10 and preliminary testing is done on general purpose computer 11. Copies of the control programs for each computer 10 and a copy in core image form of the memory contents of each computer 10 in an initialized state are kept on general purpose computer 11.

A communications network 15 permits communication between any computer 10 and computer 11. This linkage is used routinely for alarm and other message traffic, and for initial startup of each computer 10. It should be noted that communications are necessary only for utilization of the entire system, illustrated in FIG. 2; however, any one of computers 10 in the system is "autonomous" and will operate without communications as will computer 11.

BIT PUSHER COMPUTER 10

A bit pusher computer is one which is provided with bit processor means for control through input/output channels of external machine processes. One such computer is known as the 960, manufactured and sold by Texas Instruments Incorporated, Dallas, Tex. Another such computer is known as the 2540M computer, also manufactured and sold by Texas Instruments Incorporated, Dallas, Tex. The bit processor computers are described in detail in copending patent application Ser. No. 84,614, filed Jul. 22, 1969 by George P. Shuraym and assigned to the assignee of the present invention. Patent application Ser. No. 843,614 is hereby incorporated by reference.

Although both the 960 computer and the 2540M computer are well-suited for application as the "worker" computer in the present system, only the 2540M computer is discussed with respect to the present embodiment. Basically, the 2540M is typical of stored program digital computers with the addition of having two modes of operation, called MODE 1 and MODE 2. In MODE 1 operation, it offers the same features as many other digital computers; that is, arithmetical capability, hardware interrupts to respond to external stimuli, and an instruction set slanted toward computer word operations. It operates under control of a supervisory software system, containing an executive routine, interrupt service routines, peripheral device drivers, message queuing routines and the like. However, MODE 2 operation involves a separate group of instructions which are slanted toward machine control. In particular, the input and output functions reference the CRU of the 2540M, and are not word-oriented, but rather bit-oriented. The machine control function is best implemented in this mode, because machine-computer interface is more often in terms of bits (representing single wire connections) than in terms of computer words (representing a prescribed number of bits, such as sixteen). The result of this simplified interface is the segregation of computer-related functions from machine control-related functions in the system.

Another feature of the bit pusher computers is the use of base register file. The instruction set permits referencing of any of the base registers and permits a combination of displacement plus the contents of one of the registers. From the standpoint of MODE 2 operation, the machine control function is very conveniently implemented by dedicating some of the base registers. One register is designated as the Communications Base Register or CRB. Another register is designated as the Flag Base Register or SFB. Instructions utilizing bitwise displacements can reference these two registers for bit input/output I/O and for bit flag manipulation. Two registers, designated Machine Procedure Base Register or MPB and Machine Data Base Register or MDB utilize displacements which are word-oriented with one register set to the beginning address of a control procedure program, another register set to the beginning address of the data block for a given machine, and another register set to the beginning I/O bit for the machine and another register set to permit segment communication by use of bit flags. The programmer's job becomes very easy, as he can forget the problems of interfacing the machine or program to the rest of the system and concentrate on the sequence of instructions necessary to operate the machine. Also, a job of exercising supervisory control over the machines becomes very easy for the programmer because, in switching control from one machine to another, means are provided so that it is necessary simply to switch the contents of these base registers to the appropriate settings for another machine.

In the 2540M computer, eight registers are dedicated for MODE 2 operation; four of them are dedicated as described above, the MPB, MDB, SFB and CRB. Of the other four registers, one is used as an event or displacement counter for instructions within a procedure and the remaining three as programmable timers. These timers are set by loading the appropriate registers. They are automatically decremented and provide an interrupt stimulus when the amount of time represented by the number loaded into them has been reached. Instruction execution involves the registers without their being specified as part of the instruction bit pattern. That is, the appropriate instruction is automatically referenced based on an operation code (OP code) for the instruction. Separation of functions along these lines, in particular separation of the instructions which are encoded in the procedure and separation of operating variables which are delegated to machine data, make it possible to write reentrant machine control programs in a very convenient manner. The advantage of the reentrant program is an efficient usage of core memory in the computer.

Hardware Reentrancy - Reentrancy is utilized in the present embodiment. Reentrancy in the context of this embodiment means a program or group of instructions which is capable of being utilized simultaneously by any number of users or machines with no interactionor interference.

A distinction is made between a 'Procedure' which contains only instructions of what to do and how to do it; and 'Data' which contains only the status of a particular user during his execution of the 'Procedure'. With this distinction made, and with each user keeping track of his own 'Data', it is obvious that the same Procedure can be shared by many users, simultaneously with no interference.

Reentrant programs can be written for many different types of computers, but in most computers reentrancy is accomplished only at the cost of much shuffling of temporary locations and intermediate values in order to keep the changing Data separate from the unchanging Procedure.

In the 2540M, reentrancy is accomplished by the use of four of the special MODE 2 registers. These registers are automatically referenced in execution by the MODE 2 subset of instructions. The MODE 2 user is thus relieved of the problem of reentrant coding. The four MODE 2 registers are:

| | |
|---|---|
| 1. Machine Procedure Base Register | (MPB), for instruction |
| 2. Machine Data Base Register | (MDB), for data |
| 3. Machine Flag Base Register | (SFB), for software bit flags |
| 4. Machine Communications Base Register | (CRB), for I/O lines. |

The four MODE 2 registers are shown in TABLE IIa.

TABLE IIa

2540 MODE 2 OPERATION

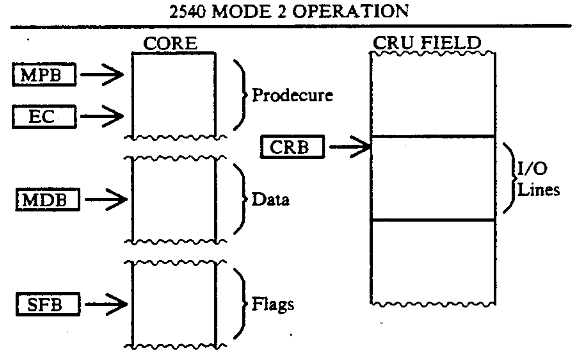

| | |
|---|---|
| MPB | Machine Procedure Base Register |
| EC | Event Counter (MODE 2 Program Counter) |
| MDB | Machine Data Base Register |
| SFB | Software Flag Base Register |
| CRB | Communications (I/O) Base Register |

Machine Procedure - Instructions needed to operate a machine type. No changes are made in the procedure code during execution (no local storage of data) so that the procedure is reentrant and can be used by any number of machines at once.

Machine Data - Data area needed by each machine. All temporary or permanent data unique to a given machine is kept in this area.

Machine Flags - Software bit flags used by a given machine.

Machine Communications (I/O) - Input and output lines connecting a given machine and a given computer.

The other four MODE 2 registers are:

| | |
|---|---|
| 5. Event counter | (EC), for procedure instruction counter |
| 6. Programmable timer | (TIME1), for Module/Machine Service intervals |
| 7. Programmable timer | (TIME2), for general purpose computer communications |
| 8. Programmable timer | (TIME3), for workpiece identification interval timing. |

Programming Conventions - Certain conventions have been established as to the 2540M computer utilized in the present embodiment for its proper operation and for proper operation of the machines which it controls. These conventions are discussed below.

Interrupt Masking - Each interrupt service routine establishes independently the interrupt mask under which the system will operate during its execution. The convention established here is that each interrupt level will mask itself and all lower levels. For example, during servicing of a level 1 interrupt, the only interrupt that would then be honored would be an interrupt on level 0. All other interrupts would remain pending until the servicing of the level 1 interrupt was complete.

CONVENTION: Each interrupt level masks itself and all lower levels.

Status Work Order - The 2540M uses two status words for processing of interrupts. The term 'status word' is somewhat misleading since each 'status word' consists of four consecutive 16 bit words, starting on some even valued core address. The contents of these four words, in order, are:

1. Program counter
2. Condition code and overflow bit
3. Interrupt mask
4. Not used.

When an interrupt is entered through an XSW (Exchange Status Word) instruction, the operand field of the XSW contains the address of a two word status word pointer set. The first of these two words contains the address of the new status word to be used during the interrupt processing, and the second word contains the address of the old status word where the current status of the machine is to be saved during the interrupt processing. The 2540M hardware allows these three blocks to be disjoint, but the convention established for their use is that they be contiguous. The order is the pointer block followed by the new status word block followed by the old status word block.

TABLE II illustrates this order.

Since each interrupt routine can establish independently the mask status of the system, some form of coordination must be used to insure that the mask convention discussed is followed. This coordination is accomplished by the cold start routine which calculates the system mask based on the interrupt routines actually in core and then inserts the proper mask into each interrupt routine status block. If, for some special reason, a routine requires a mask different from that supplied by the routine, the required mask can be specified by the programmer at assembly time. This will not be changed at execution time since the initialization routine will insert the calculated mask only if the new mask word is zero.

CONVENTION: To use the calculated mask specify zero for the new interrupt mask at assembly time. At execution time the calculated mask will be inserted.

To use a non-standard mask specify the desired mask at assembly time. At execution time it will not be changed.

TABLE II

2540M STATUS WORD CONVENTIONS

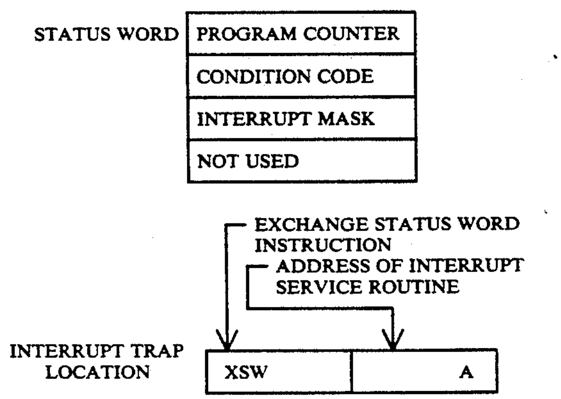

INTERRUPT SERVICE ROUTINE

| | | | |
|---|---|---|---|
| The first 10 words of the interrupt service routine are the status word pointers and the status words in order shown. | A | D C B | Address of new status word |
| | | D C C | Address of old status word |
| | * | | |
| | B | D C D | New PC value |
| | | D C *—* | New condition code |
| | | D C *—* | New interrupt mask |
| | | D C *—* | Not used |
| | * | | |
| | C | D C *—* | Old PC value |
| | | D C *—* | Old condition code |
| | | D C *—* | Old interrupt mask |
| | | D C *—* | Not used |
| | * | | |
| | D | | First instruction of service routine |

Interrupt Structure and Response - Priority assignments, if any, are assigned by the user. All of the interrupt lines are routed through the CRU in the 2540M and interrupt assignments are made there. Currently the interrupt levels and their assignments are described in TABLE III.

Data Structure - One of the most important steps in obtaining a clear understanding of any computer/software system is to develop a clear understanding of the way that the system data is structured. 'Data' here is used in the broad sense to include the entire content of the computer core.

The 2540M has its total available core split into four major areas. These four areas are:

1. MODE 1 Programs and Data
2. MODE 2 Programs and Data
3. Unused core
4. BOOTSTRAP LOADER These four areas are assigned sequentially in core with the MODE 1 area starting at core location /0000. See TABLE IV.

MODE 1 Structure - TABLE V shows the structure used by the MODE 1 programs and data. The first 48 words of the 2540M core memory are dedicated by hardware to certain special machine functions. From /0000 to /001F are reserved for the 16 interrupt levels trap addresses. Level 0 has as its trap address /0000; Level 1 has as its trap address /0002; Level 2 has as its trap address /0004; etc. An XSW (Exchange Status Word) instruction is placed in the trap address for each interrupt level that is in use. Levels that are not in use have a NOP (No Operation) code placed in their trap locations.

TABLE III

| Level | Trap Address | Function |
|---|---|---|
| 0 | /0000 | Power Down |
| 1 | /0002 | ATC Transfer Complete |
| 2 | /0004 | Internal Fualt |
| 3 | /0006 | Real Time Clock - 2 ms period |
| 4 | /0008 | List Word Transfer Controller |
| 5 | /000A | Not Used |
| 6 | /000C | Not Used |
| 7 | /000E | Not Used |
| 8 | /0010 | Timer1 - Module Service 100 ms period |
| 9 | /0012 | Timer2 - TTY Message Controller - Optional |
| 10 | /00014 | Timer3 - Workpiece Reader Service 5 ms period |
| 11 | /0016 | Not Used |
| 12 | /0018 | Not Used |
| 13 | /001A | Not Used |
| 14 | /001C | Not Used |
| 15 | /001E | TTY Controller - Optional |

TABLE IV

2540M CORE MAP

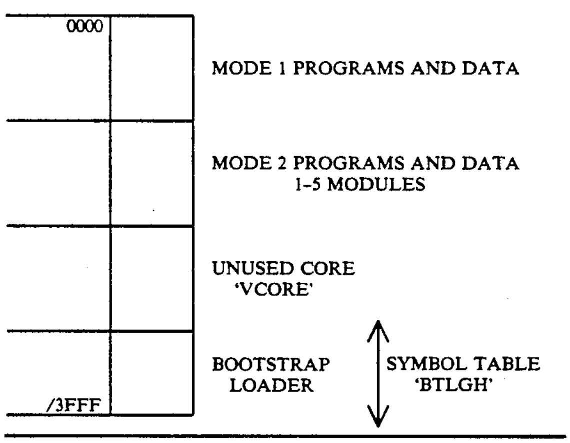

TABLE V

2540 CORE MAP-SEGMENTED OPERATION

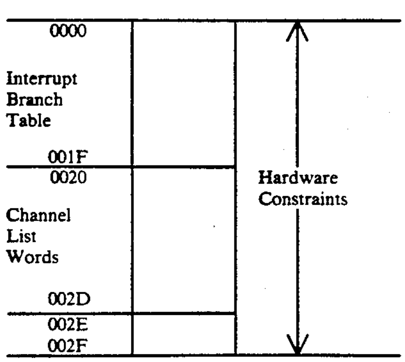

TABLE V-continued

2540 CORE MAP-SEGMENTED OPERATION

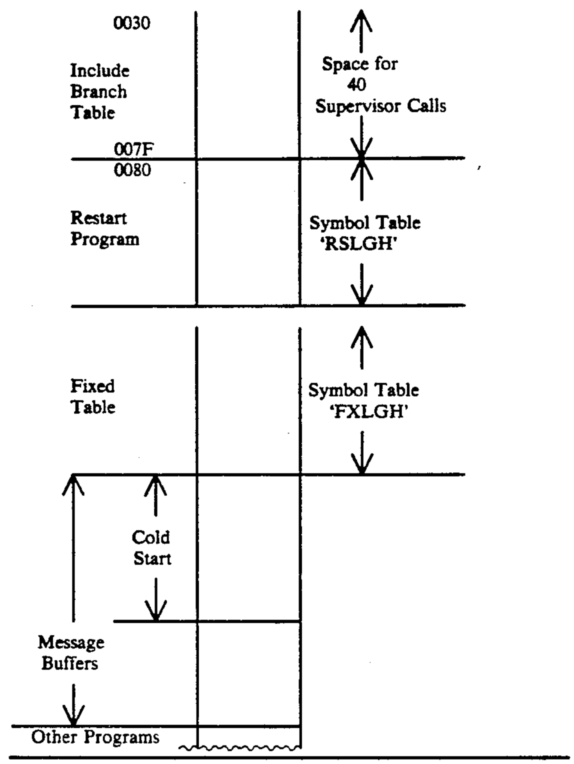

Core addresses from /0020 to /002D are reserved for the channel list words for the seven data channels under the control of the Autonomous Transfer Controller (ATC). One of these channels is used for communications with the general purpose computer 11 and one for the optional card reader. The other channels are unused at present. Details of the intercomputer communications system will be discussed later.

Core address /002E is the trap address which is activated by the front panel stop/reset button. Addresses /002E and /002F contain a branch to the beginning of the Cold Start (or initialization) Program.

Core addresses from /0030 to /007F make up a special table called the 'Include Branch Table' which at present contains room enough for 40 entries. This table contains branch instructions to a special group of MODE 1 programs that are to be included in the MODE 1 Core Load Build even though they are not called by name in any of the other MODE 1 programs. These programs are called 'Supervisor Calls' because they provide a special linkage with the MODE 2 programs. The details of this special linkage will be discussed later.

Starting at core address /0080 is the Cold Start or initialization program. This program provides all the operations necessary to put the system in a known state immediately after an initial program load (IPL). Embedded in the program are five functionally independent areas, which in some cases occupy the same core space.

A large part of the work done by the Cold Start Program needs to be done only one time, at IPL. A much smaller part need be done whenever the system is reset and then restarted.

Restart Program - The part of the program that is executed every time the system is reset and restarted is called the Restart Program. It reinitializes the three programmable timers, unmasks interrupts, the branches to the mainline program. Entry to the restart program is through a two instruction test to see if this is the first time the program has been executed since IPL. If it is the first time, the Cold Start portion is executed. If not the first time, only the Restart portion is executed.

Cold Start Program - This part of the program is executed only once, and immediately after IPL. Since this block of the program is to be used only one time, it is located in an area of core which will later be used as the input and output message buffers. When used as a message buffer area, of course, the original program is destroyed.

The Cold Start Program calculates the system interrupt mask and the required mask for each interrupt level, and inserts the correct mask into the new status word for each level. It initializes the data table discussed later, zeros all CRU output lines and initializes the pointers for the Core Allocator Program. Having done these functions, it sets the flag to indicate that it is no longer the first time and then branches to the Restart portion of the program.

Fixed Table - The Fixed Table is a dedicated area of core in the 2540M that is used in common by many of the MODE 1 programs and by the host in building core loads for the 2540 and in communicating with it.

Inbuffer - This section of core follows immediately after the fixed table and is used to receive messages from the 1800.

Outbuffer - This section of core follows immediately after the inbuffer and is used to transmit messages to the 1800.

The core space allocated for the Inbuffer and Outbuffer is also used by the one-time-only portion of the Cold Start Program. After its initial execution, it is destroyed by the subsequent normal message traffic.

MODE 2 Structure - TABLE VI shows the structure used by the MODE 2 programs and data. The basic unit in the MODE 2 structure is that block of code that is used to service one module. A module is defined as a group of machines that perform a series of related tasks to accomplish one process step. The present system allows up to five modules to be handled at once.

Within each module area there are five major subdivisions. These are:

1. Machine Header Array
2. Machine Procedures
3. Machine Data
4. Abnormal Neighbor Pointers (if any)
5. Software Bit Flags The basic structure of each subdivision is shown in TABLE VIIa-e and is discussed below.

Machine Header Array - The first word in this array contains the number of individual machines in the module. Following this machine count word is the header array itself, eight words for each machine in the module. Each machine header contains information necessary for the supervisor, or MODE 1 programs to set up the needed registers for the MODE 2 programs and for certain other supervisory functions. The eight words and their functions are discussed below.

Word One - Procedure Location - This word contains the address of the first word in the procedure used to run the machine. Remember that several machines may share the same procedure.

Word Two - Data Location - This word contains the address of the first word in the data set for the machine. This data set is unique to this machine and is used by no others.

TABLE VI

2540 CORE MAP - MODE 2

| | | |
|---|---|---|
| | MACHINE HEADER ARRAY | MODULE ONE |
| | MACHINE PROCEDURES<br>ONE FOR EACH MACHINE TYPE | |
| | MACHINE DATA<br>ONE FOR EACH MACHINE | |
| | ABNORMAL NEIGHBOR POINTERS<br>(IF ANY) | |
| | SOFTWARE BIT FLAGS | |
| | SAME STRUCTURE AS ABOVE | MODULE TWO |

TABLE VIIa

MACHINE HEADER ARRAY

| | |
|---|---|
| No. Machines | Procedure Location |
| | Data Location |
| | I/O ADDR-1 |
| | Number of Outputs |
| | Number of Segments |
| | Size of Common |
| | Abnormal Neighbor List Location |
| | Spare |

TABLE VIIb

BIT FLAGS

| | |
|---|---|
| 0 | GATEB |
| 1 | GATEC |
| 2 | TRACKING |
| 3 | IMAGE |
| 4 | CMEM |
| 5 | RESTART |

TABLE VIIb-continued

BIT FLAGS

| | |
|---|---|
| 6 | TRANS |
| 7 | PRCSS |
| 8 | WAIT |
| 9 | IDLE |
| 10 11 12 13 14 15 | RESERVED FOR PROCEDURE |

TABLE VIIc

PROCEDURE

```
        DC      SEG1
        DC      SEG2
        DC      SEG3
SEG1
          ⇣
        JUMP    SEG1
SEG2
          ⇣
        JUMP    SEG2
SEG3
          ⇣
        JUMP    SEG3
        MDUMY
        BSS     HWMM+3*HWMS
          ⇣
        END
```

TABLE VIId

MACHINE DATA

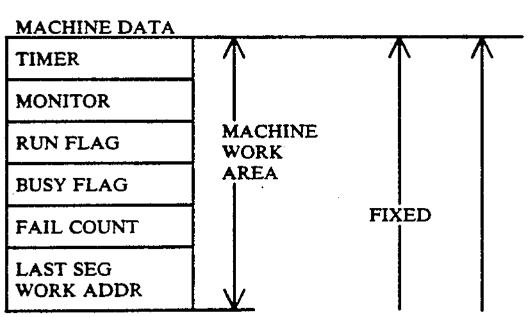

TABLE VIId-continued

MACHINE DATA

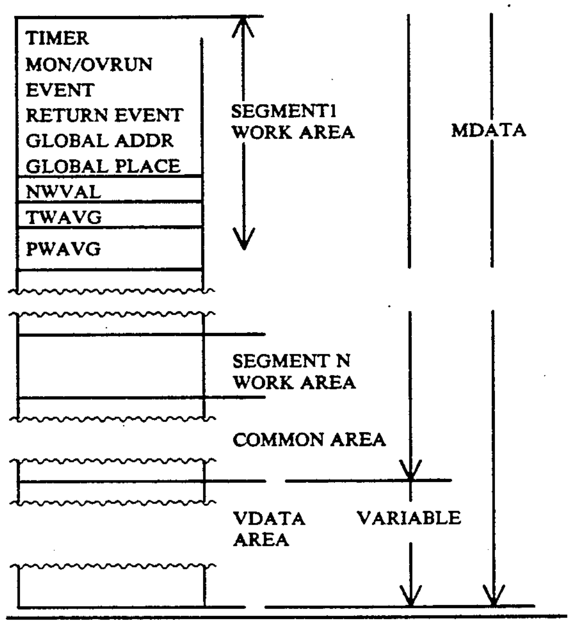

TABLE VIIe

ABNORMAL NEIGHBOR LIST

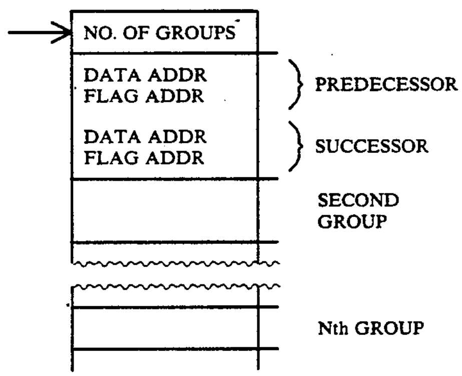

FOR THIS CASE FIRST TWO WORDS OF VDATA ARE DEDICATED.
NON-APPLICABLE WORDS IN BOTH ABNORMAL NEIGHBOR LIST AND VDATA SET EQUAL TO ZERO.

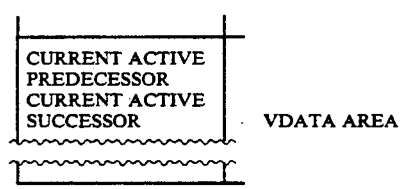

Word Three - I/O Address-1 - This word contains the address of that line in the CRU field that is one before the first input/output line for the machine. The offset of one line is supplied so that the displacement of the I/O lines need not be zero; the lowest numbered I/O line in the procedure is 1.

Word Four - Number of Outputs - This word contains the number of output lines connected to the machine. The number of output lines may or may not be equal to the number of input lines.

Word Five - Number of Segments - This word contains the number of segments of the machine procedure. The number of segments is the number of parts of the machine procedure that run simultaneously. This number is usually but now always equal to the number of work stations in the machine.

Word Six - Size of Common - This word specifies the size of an area in the machine data beyond the machine work area and the segment work areas that will not be altered by specification changes that apply to the machine. By convention, such a change will only affect any remaining data words, referred to as Variable Data.

Word Seven - Abnormal Neighbor List Location - This word contains the address of a list which specifies any abnormal neighbors which the machine may have. If the machine has no abnormal neighbors this word contains a zero.

Word Eight - Spare - This word has no assigned function at present.

Machine Procedures - This section of core contains all of the different machine procedures needed to run the module. There will be a separate procedure for each machine type in the line (machines of the same type use the same procedure).

It was mentioned earlier that the number of segments in the procedure is specified in the machine header. The procedure itself specifies the entry points to each segment.

2540M PROGRAMS

The organization of programs in the 2540M computers 10 follows the organization of the two mode operation of the computer. Supervisory functions are implemented by programs which execute in MODE 1. Machine control functions are implemented by programs which execute in MODE 2. The programs are all written in assembly language. The assembly language is subdivided into two categories, reflecting again the two mode operation. A special control language has been developed to facilitate writing machine control programs for execution on the 2540M. This language highlights the bit-oriented instructions of the 2540M MODE 2 subgroup. In practice, it makes machine 12 control programs possible which are not available in conventional computer systems. Programs for machine control are called procedures and are written using this group of instructions and operate under control of the MODE 1 supervisory program.

An important feature of the MODE 2 programs is the separation of instructions and data. Many machines 12 of the same type can use the same procedure program but may vary in their individual control parameters. Data blocks or programs are segregated from procedure blocks or programs in the 2540M. The procedures contain the actual instructions for the machine's control and some invariant data. Any variable data or operating parameter is allocated to the data block for a particular machine 12. Due to this separation, only one procedure is required for identical machines. For example, if four identical machines 12 are connected to one 2540M computer 10, the computer 10 contains four data blocks, one for each machine 12 and one procedure shared by all of them. The machines may or may not perform identical functions, depending on the parameters specified in the individual data blocks.

PROCEDURE SEGMENTS

A feature of the MODE 2 procedure is the segmented organization. Since the physical machine 12 on the assembly line represents one or more work stations 14 in a process, the data block and procedures for a given machine also reflect a work station segmentation of the machine. At a single work station 14 or segment, the work to be done is characterized by three features. It is cyclic in nature; it involves workpiece movement; and it involves the specific work that station is to perform on the workpiece. The segments of a procedure imitate this organization; that is, each segment performs three functions. The first function is to obtain workpieces from the upstream neighbor or work station; the second is to perform the necessary work on the workpiece at that station; the third is to pass the workpiece to the downstream neighbor or work station. Workpiece movement is controlled by the segment utilizing global subroutines.

These global subroutines are implemented as MODE 1 programs on the 2540M computers 10. Each global subroutine is shared by all of the procedures which use that subroutine function. Special instructions are available in the special control language to link the segment to these subroutines. Some auxiliary data is required for control of an entire module 13 by a computer 10. Additional data blocks called machine headers contain this additional information. Headers are arrayed in the computer 10 memory in the same way the machines 12 themselves are physically aligned in a module 13; that is, in the order of workpiece flow. The headers contain the memory address of the procedure of a particular machine's control; the memory address of the data block for that machine's control; the number of segments represented in that machine; and some additional words for any abnormalities in the physical order of the module. For instance, a work station may feed two downstream machines or may be fed by two upstream machines one at a time. The header of the machine containing such a work station references a special list pointing to the data blocks and a flags for the machines so arranged.

CONTEXT SWITCHING

In operation, the MODE 1 supervisory programs switch into MODE 2 operation and pass control to the MODE 2 control programs in much the same manner that a time-sharing computer executive program switches control to user programs on a demand or need basis. This mode switching occurs on every segment of every procedure. Overhead data is incurred by this continuous switching from MODE 1 to MODE 2 operation in the 2540's. Any necessary upkeep or overhead data is assigned to the data block for each segment and, additionally, some for each machine 12 separate from its segments. The procedures switch from MODE 2 back to MODE 1 at the completion of the work that they require. They also switch back to MODE 1 to enter and perform work in global subroutines and some other special functions which are implemented by MODE 1 subroutines. This continual switching back and forth between MODE 1 and MODE 2 allows the supervisory programs to perform diagnostic checks on every individual work station 14. This permits extremely rapid identification and operator alarm in case of malfunction or abnormalities on the assembly line. This context switching also allows the supervisory program to discontinue operation of any work station 14 of any machine 12 in case of malfunction. If a work station 14 is declared inoperative, the other work stations of the same machine may continue their work function until workpieces in them are brought to a safe condition. When the workpieces are in a safe condition in all of the work stations 14 of the machine 12, the machine is declared inoperative and an operator will be alarmed so that the machine can be repaired and returned to service without damaging any workpieces other than possibly the one workpiece in the failed segment. Judicious choice of alarm messages in many cases isolates a particular machine component which caused the failure, thereby making repair or replacement a very fast means of restoring the machine 12 to service.

SUPERVISORY PROGRAMS

The supervisory functions to be performed by the computer are reflected in the organization of the programs. There is one program which performs supervision of all machines 12 in a module 13 and all modules 13 connected to a computer 10. Other programs perform the communication function with the general purpose host computer 11.

The module supervisor program (Module Service) in a 2540M computer 10 operates on a polling basis. An interval timer assigned to an interrupt level creates a pulse which causes execution of this program at specified intervals. Each time the program is executed, it searches the list structure of headers corresponding to each machine connected to the computer and switches to the appropriate place in the machine's procedure for those of machines 12 which require attention during the present interval in MODE 2 for entry and re-entry to the procedure, or MODE 1 in the case of GLOBAL SUBROUTINES. Each of the machine procedures (for GLOBAL SUBROUTINES) that require attention then switch back to MODE 1 and return to the Module Service program at the completion of the steps that are required during the present interval. When the entire list has been searched and serviced, execution of this program is suspended until the next interval.

One of the functions of the supervisory programs is to set properly the MODE 2 registers. The MPB contains the address of the first word in the machine procedure to be executed, the MDB contains the address of the first word in the machine data area, the SFB contains the address of the software bit flags assigned to the machine, the CRB contains the address of the I/O field of the CRU assigned to the machine, and the EC contains the number of the next instruction to be executed.

Once these registers are properly set, execution of the procedure may begin. The hardware of the 2540M is such that any references by the procedure to I/O lines, data, or software flags is automatically directed to the proper area as defined by the appropriate base register. The normally messy part of re-entrant programming is thus taken care of very simply and the user can execute the procedure as if he were the only one using it.

A very substantial savings of core storage is achieved using this technique since the procedure required to operate a machine type need appear in core only once. The only items then that are private to a given machine are its Data, its Flags, and its I/O field. The total core requirements for the Data and Flag areas are generally much smaller than that required for the procedure, resulting in a net saving of core.

When a 2540M computer 10 is started, a bootstrap loading program is stored into it to make it operable. Then communication between host computer 11 and the 2540M computer 10 are established. This communication link is used to load the memory of the 2540M computer 10 through communications network 15. Once the 2540M computer 10 is loaded in this fashion, it is fully operational and is ready to command and control the assembly line modules 13 which are connected to it. All further communication with the host computer 11 is in the form of messages. The 2540M computer 10 may recognize abnormalities or machine malfunctions and send alarm messages back to computer 11 where they are decoded or printed out on a special typewriter 20 for operator attention. Computer 11 may send information to a 2540M computer 10 for slight alterations in line operation or module operation and also for operator inquiry and response through peripheral equipment connected to the 2540M computer 10 such as a CRT display unit. Through this unit, an operator can request and will see in response some of the operating variable parameters, such as temperature settings, which are required for operation of a particular module. Such peripheral equipment can be implemented as an additional machine in the module; that is, it may be controlled by a procedure and have data for display passed through its data block.

THE GENERAL PURPOSE COMPUTER 11

Almost any general purpose digital computer can be adapted for use in the present system. For example a computer known as the 980 computer, manufactured and sold by Texas Instruments Incorporated, is suitable for this purpose. Another computer known as the 1800 computer, manufactured and sold by the International Business Machines Corporation (IBM) is also suitable for use as the general purpose computer 11, and is the general purpose computer utilized in the present embodiment.

The 1800 computer operates under control of TSX, which is an IBM supplied operating system. The TSX system supports Fortran and ALC programming languages on the 1800 computer. All of the programs in the present embodiment which perform user functions are written in these two programming languages. The TSX system on the 1800 computer supports catalogued disk files where user programs or data blocks may be stored by name for recall when needed.

The function which general computer 11 performs for the worker computers 10 is implemented by execution of user programs under the TSX system. These functions are: (1) create data files and store descriptive information lists regarding each 2540M computer 10; (2) assemble MODE 1 and MODE 2 programs for the 2540M computers 10. A group of programs known collectively as the ASSEMBLER performs this function; (3) integrate the MODE 1 programs or supervisory programs intended for a particular 2540M computer 10 into a single block. A group of programs collectively called the CORE LOAD BUILDER performs this function; (4) integrate the MODE 2 program machine control procedures and data blocks intended for a particular assembly line module 13 connected to a particular 2540M computer 10 into a single list structure called a data base. A program called DATA BASE BUILDER performs this function; (5) integrate the MODE 1 programs block and MODE 2 data base blocks for a particular 2540M computer to into a single block called a segmented core load. A program known as SEGMENTED CORE LOAD BUILDER performs this function; (6) transmit a segmented core load to a particular 2540M computer 10 through the communications network. A program known as the 2540M SEGMENTED LOADER performs this function.

Note that the order of these functions is the order utilized to implement a module as part of the total system; that is, the steps are sequential, and each step is executed in order, to add a module to the overall system. Also, the steps are independent of each other, and may be executed on the basis of convenience.

An advantage of this sequential organization is that minor changes may be quickly incorporated. For instance, modification of an operating parameter for a particular machine 12 on a particular module 13 is the most frequent task encountered in the operating assembly line. This requires changing only the data block for that machine; then the steps of building the data base, the segmented core load build, and reloading the particular computer are executed. No other machine 12 and no other computer 10 is affected. Changing the supervisory programs, and the MODE 1 core load build, are bypassed.

As illustrated in FIG. 2, the general purpose computer utilized in the present embodiment employs peripheral equipment such as disk storage unit 16, tape storage 17, card reader 18, line printer 19, and a typewriter 20.

GLOBAL SOFTWARE SUBROUTINES

In accordance with the present invention, a separate procedure for each machine in the assembly line module executes under control of a supervisor program. A single machine procedure may have one or more segments, corresponding to each work station, or position in the assembly line module where a workpiece may appear. Workpiece movement between two adjacent stations is accompanied by a segment communication in the form of software flags or gates. Each segment has its own set of gate and other flags (bits) in a computer word. To allow one segment to reach the flags of another segment, the flag words are assigned in consecutive order in memory, one computer word for each segment. One segment is allowed to look at the flags for its upstream and downstream neighbors (a special case is an abnormal configuration where a fork in the line of machines occurs) simply by looking at the bits in the preceding or succeeding memory words. When the gates (flags) are "open" between the segments, a workpiece is passed between the work stations. The gates are closed when the workpiece clears the upstream station. Communication between segments can be made using bit flags. The flags for a given machine are assigned contiguously in core memory with the first (upstream) segment occupying the lowest core address. The SFB register points to the flag word before the flag word for a given segment and handles positive displacement. Hence, if a bit flag is to be used for intersegment communication, it is assigned to be within the range of flag words that can be reached by the farthest downstream segment. Further, each segment uses a different displacement, or equated label, to reach the desired bit. Each machine has a single set of MDATA and each segment has access to all of the MDATA block so that different segments can communicate with each other through MDATA words if desired. The MDATA structure has a common block used by the supervisory program and procedure for certain functions; a separate work area used by the supervisory program for handling each separate segment; and a variable data area. Descriptive labels are used to describe these blocks, as follows:

A RUN flag is a combination communication and status word used jointly by Module Service and by a machine procedure. Its various values are:

RUN=0
: The machine is on-line but not processing. (Safe state shutdown). There may or may not be workpieces present in the machine.

RUN=1
: The machine in on-line in normal processing.

RUN=2
: Command to machine to complete processing any workpiece it has, hold them, and to go to safe state shutdown. Machine sets RUN=0 when it has complied with this command.

RUN=3
: Command to machine to empty itself. No new workpieces are accepted. Processing of existing workpieces is completed and they are released.

A MONITOR flag MONTR is used to detect malfunctions of any work station. The monitor for every work station program segment is decremented by Module Service at every servicing interval. If it falls below preset limits, a warning message is output, but the work station program segment and hence the respective work station continues to be serviced, and the monitor decremented. If it should fall below an additional set of limits, the work station is declared inoperative and is removed from service with an accompanying message.

This reflects the very practical situation that an electro-mechanical machine most often degraded in performance, by slowing down, before failing completely. A series of repeated warning messages, indicating such a slowdown, permit maintenance attention to be directed to the machine before failure creates a breakdown in the assembly line module.

The monitor is analogous to an alarm clock that must be continually reset to keep it from going off. If it ever goes off, something has gone wrong.

At the beginning of the processing step, the segment sets a value into the monitor flag word corresponding to a reasonable time for completion of processing. In workpiece movement steps, the monitor flag word is set appropriately by the GLOBAL SUBROUTINES.

In addition to decrementing the monitor flag for each segment, each machine's status is tested by Module Service at each servicing interval. Failures in a machine's hardware or electronic components, or circuit overloads may cause the machine to be inoperative, or an operator may wish to remove a machine from computer control. Two lines for each machine serve this purpose.

The first output line for each machine is an "operate" line, referenced by label OPER. The first input line for reach machine is a "READY" line, referenced by label READY. Pushbutton and toggle switches on each machine allow an operator or technician to remove a machine from computer control by changing the state of the READY line to the computers and restore the machine to computer control by restoring the state of the READY line. Conversely, the computer assumes control of a machine by detecting a READY signal in response to an "OPERATE" output, and removes a machine from service by changing the state of the "OPERATE" output.

A TIMER word is used to specify the number of intervals which are to elapse before a segment again requires attention. This is particularly useful where long periods are required for mechanical motion. This word may be set to a value corresponding to a reasonable time for the work station to respond and will be decremented by one until it reaches zero zero by Module Service, once each interval, before re-entering the procedure segment.

A BUSY flag is utilized to allow an orderly shutdown of a multi-work station machine in case of failure of a work station. The value of the BUSY flag ranges from zero to the number of work stations in a machine. Each program segment increments the BUSY flag when it is entering a portion of its procedure which is not to be interrupted. When it reaches a portion of the procedure where an interruption is permissible, it decrements the BUSY flag. Module Service shuts a machine down when the count of failed work stations equals the value of the BUSY flag. Usually the global subroutines handle all BUSY flag operation.

A TRACKING flag is a bit flag set by Module Service to indicate whether the module is in a workpiece tracking mode or not. Normal operation will be tracking, and in that mode workpieces are introduced only at the beginning machine of an assembly line module. This would be quite inconvenient during initial checkout, so tracking can be disabled to allow workpiece insertion anywhere.

Each work station is treated by Module Service almost as if it was a separate machine. Each program segment corresponding to a work station has its own set of bit flags, its own event counter, its own delay word and its own monitor, etc. With this mode of operation, it is quite possible for one work station of a multi-work station machine to fail while the other work stations are still operating normally. It is, however, not always possible to shut down only a portion of a machine; if, for example, each machine has only a single OPERATE bit and a single READY bit. In such case, the BUSY flag, discussed earlier, provides for an orderly shutdown. When it is permissible for Module Service to shut down a machine with one or more failed work stations, it does so by dropping the OPERATE bit. All other outputs are left unchanged. This action immediately takes the machine off-line and turns on a read warning light. All outputs from the computer 10 are disabled by local gating at the machine even though they are unchanged by the computer 10 itself. Module Service also saves the current value of the event counter for each program segment of the machine taken off line. The machine then remains off-line until human action is taken to restore it to service. When whatever condition that caused the machine to fail has been corrected and the machine returned to the state it was in when it failed, the operator pushes the READY button and Module Service then reactivates the machine. Each segment procedure is re-entered at the point where it was when the machine failed, and whatever output conditions existed at that time are restored. Module Service also sets a bit flag for each program segment to indicate that the machine is in a restart transient. This restart bit is turned on when a machine restarts from a failure, and remains on for exactly one polling interval for each work station of the machine. The use of this restart bit is discussed in more detail with the global subroutine description below, and normally all testing of the restart bit is done by these global routines. If it is necessary, however, for machines with complex workpiece processing requirements to know whether or not they are in a restart condition, this bit is available for that purpose.

In some configurations, the 2540M computer is required to handle an assembly line module that contains a machine from which a workpiece has two possible exits. Since a computer core is essentially a one dimensional linear array, this means that it is not possible, in general, for a machine to know which machines are upstream and downstream from it merely by being adjacent to them in core. Explicit, rather than implicit, pointers are required.

A core organization is utilized for the general cases such that under normal conditions a machine can make use of its implicit knowledge of its neighbors for communicating with them. Abnormal conditions exist when this is not possible and explicit pointers are then used. The normal and abnormal predecessors and successors referred to below are these normal and abnormal conditions.

Each segment has its own input gate and output gate flags. The labels used to reference these gates are GATEB and GATEC, respectively. In addition, GATEA is used by a segment to reference the output gate flag of its upstream neighbor, and GATED is used to reference the input gate flag of its downstream neighbor.

The global subroutines for workpiece handling into and out of a work station form a hierarchal structure. The two major groupings are for workpieces entering a work station and for workpieces leaving a work station. There are two subgroups under each major group and several variants under each subgroup. TABLE VIII below summarizes the relations between the various subroutines which are next described in detail.

TABLE VIII

I. Workpiece Entering Work Station Routines

1. Request Workpiece Routines
   a. Segment 1-Normal Predecessor
   b. Segment 1-Abnormal Predecessor
   c. Segments 2-N-Workpiece Sensor Available
   d. Segments 2-N-Workpiece Sensor Not Available
2. Acknowledge Workpiece Routines
   a. All Segments-Normal Predecessor
   b. Segment 1-Abnormal Predecessor
   c. Segments 2-N-Workpiece Sensor Not Available II. Workpiece Leaving Work Station Routines 1. Ready to Release Workpiece Routines
   a. Segment N-Normal Successor
   b. Segment N-Abnormal Successor
   c. Segments 1-(N-1)-Safe
   d. Segments 1-(N-1)-Unsafe
2. Assure Exit Routines
   a. All Segments-Normal Successor
   b. Segment N-Abnormal Successor
   c. Segments 1-(N-1)-Workpiece Sensor Not Available Of this total group of subroutines listed in TABLE VIII, however, only four different program calls are used. The routines themselves, through use of data available to them from Module Service, and the arguments passed to them, will determine the proper section to use. These four calls are (I.1) REQUEST WORKPIECE; (I.2) ACKNOWLEDGE RECEIPT; (II.1) READY TO RELEASE; and (II.2) ASSURE EXIT. All four calls require one argument to be passed to them. For three of the four, the argument is the address of a workpiece sensor used to determine whether or not a workpiece is present at the work station using the call. The subroutines assume that all workpiece sensors produce a logical "1" when a workpiece is present. For the work stations that have no workpiece sensor an address of zero is passed, thereby indicating to the subroutine that there is no sensor to be checked.

The fourth call argument passes information as to whether the work station is a safe or unsafe station, and the Ready to Release routine takes appropriate action.

(I.1) Request Workpiece Routines

The four routines associated with this group differ only slightly. Therefore, only the normal processor routine (I.1.a) will be discussed in detail and the differences between the normal processor routine and the others (I.1.b-d) will be appropriately pointed out. All four are reached with a single call, and have the same exit conditions.

The call for this group is:

| | |
|---|---|
| REQST | SLICE (PC). |

Here PC is the important sensor argument, and SLICE (meaning workpiece) is included only as an aid to legibility.

Referring to FIG. 3A, upon entering the routine, the BUSY flag is decremented 100 to indicate that this segment is prepared for a shutdown, and the routine then enters a loop that comprises delay 101 of 100 ms, setting 1002 of the segment monitor, a check 103 of the RUN flag, a check 104 on the presence of workpiece, a check 105 on GATEA, and then back to the delay 100. The check 103 on the RUN flag allows a traverse of the complete loop only if the RUN flag is one. If it is two, a shorter loop is entered which sets 106 the RUN flag to zero as soon as the machine becomes 107, not BUSY. If the RUN flag is zero or three, a short loop is entered which essentially deactivates the segment. No workpieces are accepted unless the RUN flag is one.

While in the full loop 100–105, a check 104 on the workpiece present is made since it is not legal for a workpiece to be present here if the module is in its workpiece tracking mode. If a workpiece appears, then a check 108 is made to see if the module is in a tracking mode. If so, the routine sends 109 a message that there is an illegal workpiece present and locks 110 itself into a test loop. If the workpiece is removed before the monitor is timed out, the routine resumes its normal loop. If not, it fails in that test. If the module is not in a tracking mode, however, the workpiece is accepted 111 and the subroutine returns control to the procedure via EXIT 1.

Under normal conditions, the subroutine stays in the full loop 100–105 described above until the upstream machine/segment signals that it is ready to send a workpiece by setting GATEA to zero. The subroutine then responds 112 by setting GATEB to zero and incrementing BUSY. It then enters a loop that consists of a delay 113 of 100 ms, setting 114 the monitor, and a check 115 on GATE B and then 116 on GATEA. Normal operation then would be for the upstream work station segment to indicate that the workpiece is on its way by setting GATEA back to one. In the event that the workpiece is lost by the upstream work station, or that it is directed to hold it by the RUN flag, it sets both GATEB and GATEA back to one. Since the subroutine checks GATEB before it checks GATEA, this action tells it that the upstream work station segment has changed its mind. It then decrements 117 BUST and returns to the first idling loop at 101. If the setting of GATEA and GATEB indicate that a workpiece is on the way, the routine returns control to the procedure via EXIT 2.

EXIT 1 from the routine returns control to the operating program procedure at the first instruction following the subroutine call. Since this exit is taken when there is an unexpected but legal workpiece present, the first instruction following the routine call should be a JUMP to the workpiece processing part of the procedure. EXIT 2 from the subroutine returns control to the procedure at the second instruction following the subroutine call. This exit is taken when a workpiece is on the way from the upstream work station segment and the instructions beginning here should be to prepare for the workpiece arrival.

Referring to FIG. 1*a*, EXIT 1 returns control to the calling segment of the procedure at step 26 for processing. EXIT 2 returns control at step 23.

Referring to FIG. 3B, if the machine has an abnormal predecessor, the MODE 1 program determines the address of the indicated upstream workstation's bit flag word and makes this address available to the subroutine. The action of the subroutine now is the same as just described, except that the subroutine sets the SFB to point 119 and 121 to the current machine work station/-segment when testing or setting GATEB, and to point 118 and 120 to the indicated predecessor when testing GATEA.

For segments 2-N, the action of the subroutine is the same as for the normal case above, except that no check 103 is made on the RUN flag. This check must be omitted from these segments or else the command to empty the machine (RUN=3) would be ineffective, as illustrated in FIG. 3C.

For work stations that have no workpiece sensor available, the subroutine action is as described above, except that no check 104 on workpiece presence is made, and the subroutine always returns control to the procedure via EXIT 2, as illustrated in FIG. 3D.

(I.2) Acknowledge Workpiece Routines

Of this group of routines, only level (I.2.a) will be discussed in detail. The differences in the others (I.2.b-c) will be pointed out. A single call is used for access to all of these subroutines and the same exit conditions exist for all.

The call for this group is:

| | |
|---|---|
| ACKN | RECPT (PC) |

Here, PC is the important sensor argument and RECPT is included as an aid to legibility.

Referring to FIG. 3E, upon entering the subroutine, a loop is entered comprising a delay 122 of 100 ms, a check 123 for workpiece presence, and a check 124 of the RESTART bit, and back to the delay 122. Since this subroutine is entered only when there is definite knowledge that a workpiece is on the way, the monitor is not set in this loop. The workpiece must arrive within the proper time or this segment will fail. The previous global subroutine, REQUEST SLICE, will have set a monitor value of two seconds before returning for normal workpiece transport. For those machines where two seconds is not sufficient, the monitor is properly set in the machine operating program by the normal procedure as part of its preparation for the workpiece arrival.

If the workpiece arrives at the sensor within the prescribed time, as is normal, the routine sets 125 GATEB to one to indicate that the workpiece arrived as expected, and returns control to the procedure via EXIT 1.

If the workpiece does not arrive, the machine will fail in this loop and human intervention is called for. One of two different actions is taken by the human operator, depending on the condition of the workpiece that failed to arrive. If the workpiece is OK and just got stuck somewhere between the two segments transporting it, the required action is to place the workpiece at the sensor that was expecting it and to restart the machine. Upon restarting, the first instruction executed is to check the sensor to see if the workpiece is now present. Since it is, all is well and the routine makes a normal exit via EXIT 1.

If, however, the workpiece is somehow defective, the human operator removes it from the line, and then restarts the machine. The first instruction is executed as above, but this time the workpiece present test fails and the routine goes on to test the RESTART bit. This bit is on during the first polling interval following a restart. Since this is still the first period, the RESTART bit is still one and the test is answered true. This condition conveys the information that the workpiece was lost or destroyed in transit. The routine then 126 sets GATEB to one and AMEM (a bit flag used by the tracking supervisor) to zero; this simultaneous action informing the tracking supervisor that the workpiece is lost, sends a message that the workpiece is lost and the particulars concerning it, and returns control to the procedure via EXIT 2.

EXIT 1 from the subroutine returns control to the machine procedure at the first instruction following the subroutine call. This is the exit taken when a workpiece arrives normally and the instruction there should be a JUMP to the processing part of the procedure.

EXIT 2 from the subroutine returns control to the machine procedure at the second instruction following the subroutine call. Since this exit is taken when the expected workpiece has been lost, the instructions beginning here should be to reset the preparations made for the workpiece, and then return to the beginning of the procedure to get another workpiece.

Referring to FIG. 1, EXIT 1 returns control to the calling segment at step 26 for processing. EXIT 2 returns control at step 25.

Referring to FIG. 3F, if the machine has an abnormal predecessor, the subroutine action is the same as above except that the SFB is set 126*a* to point to the proper machine as described with reference to FIG. 3B.

If the machine/segment has not workpiece sensor, the only action the subroutine can take is to assume that the workpiece arrived properly, set GATEB to one, and return to the procedure via EXIT 1, as illustrated in FIG. 3G.

(II.1) Ready to Release Routines

The call for this group of routines is:

| | | |
|---|---|---|
| READY | SAFE | RELEASE |
| READY | UNSAF | RELEASE |

Here, the important argument is SAFE and UNSAF, indicating whether the work station is a safe one for the workpiece to stay in or not. The term RELEASE is treated as a comment.

Referring to FIG. 3H, the detailed discussion is of level (II.1.a) which is of the last work station in a machine with a normal successor.

Referring to FIG. 3H, upon entering the subroutine the BUSY flag is decremented 127 and GATEC set to zero, indicating that the routine is ready to send a workpiece to the next work station. It then checks 128 for GATED to be one. GATED will normally be one at this point, and the check is made to assure that only one workpiece will be passed between two work stations for each complete cycle of the segment gates. If GATED is not one at this time, the routine loops 138 until it is, and then enters a waiting loop comprising a delay 129 of 100 ms, setting 130 the monitor, and then checking 131 the RUN flag and checking 132 GATED for a zero.

As long as the RUN flag is 1, indicating normal operation; or 3, indicating that the work station is empty, the routine stays in this wait loop checking 132 on GATED. If the RUN flag becomes 2, the routine ceases to check on GATED and sets 133 GATEC and GATED both to 1. Setting of GATED is necessary here in case the RUN flag and GATED both changed state within the same polling period. The simultaneous closing of GATEC and GATED indicates to the downstream work station that the workpiece is not coming, even if it has just requested it. The routine then waits 134 until the work station is not BUSY and sets 135 the RUN flag to zero. It then stays in a short loop until Module Service tells it to go again by setting the RUN flag back to 1 or 3. When it received this command, it sets 136 GATEC open (=0) again and resumes the loop checking 132 on GATED. When GATED becomes zero, indicating that the downstream work station is ready for the workpiece, the routine increments BUSY and returns control to the calling procedure at the first instruction following the call. Only one EXIT is used for the READY TO RELEASE routines.

When the procedure regains control at this point, it goes through the action of releasing the workpiece it has to the downstream work station.

Referring to FIG. 1, control returns to the calling segment at step 30.

Operation of the subroutine with abnormal successors is similar to the operation described earlier for abnormal predecessors. Here the action of the subroutine is the same except for the explicit setting 139-141 and 133*a* of the SFB to point to the right machine at the right time, as illustrated in FIG. 3I.

For the remainder of machine work stations 1-(N-1), a distinction is made between safe and unsafe work stations.

For safe work stations that are not the last work station, no check 131 need be made on the RUN flag, as illustrated in FIG. 3J but, except for this omission, the subroutine operation is the same as just described.

For unsafe work stations (by definition the last work station is not considered to be unsafe) the subroutine operation is illustrated in FIG. 3K. The BUSY flag is not decremented since the machine is not in an interruptable state, GATEC is set 127a to zero, and the routine loops checking 128 and 132 on GATED to each to proper state indicating that the downstream work station is ready for the workpiece. The monitor is not set in the unsafe release routine, since the work station must get rid of its workpiece within its prescribed time, or fail.

(II.2) Assure Exit Routines

| ASSUR | EXIT (PC) |
|---|---|

Here, the important sensor argument is PC, indicating the sensor to be used in checking on workpiece presence. EXIT is included as an aid to legibility.

The ASSURE EXIT subroutine is called immediately upon completion of the release workpiece action, before the workpiece has had an opportunity to leave the position where the workpiece sensor can see it.

Referring to FIG. 3L, upon entering the subroutine, the first instruction sets 142 the RESTART bit ON, and then it immediately checks 143 to see if the workpiece is still at the sensor. Taking this action allows the routine to detect a workpiece that somehow disappeared during normal workpiece processing. Providing that the routine is called immediately as described above, the workpiece will not have had time to leave the sensor, so that the first test to see if the workpiece left will fail. The RESTART bit 144 is on for only one polling interval (Module Service resets the bit after each interval) so that by the time the workpiece does leave the RESTART bit is reset. When the workpiece leaves normally, then the routine sets 146 GATEC to one, indicating that the workpiece left, and then returns control to the procedure at the next instruction following the subroutine call.

Referring to FIG. 1, control returns to the calling segment at step 32.

The procedure then allows sufficient time for the workpiece to clear the work station, and return the work station to a quiescent state.

If the workpiece is gone on the first test 143 of workpiece presence, with the RESTART bit on 144, then the workpiece is declared lost, a message is sent to that effect and GATED and GATEC are closed (=1) simultaneously 145 and 146. This simultaneous closing tells the downstream work station not to expect a workpiece. Without this knowledge, it would expect the workpiece and would fail when it did not arrive.

One further possibility is that the workpiece will not leave the sensing station. If this happens, then the work station and hence the machine will fail waiting for the workpiece to leave, and human intervention is required. One of two alternatives is open to the operator. If the workpiece is just stuck, but otherwise OK, then the operator will free it and leave it at the station, at the sensor, where the machine failed. Upon restarting the actions described above are taken and the computer can tell whether the workpiece is still there and OK or if it has been removed from the line. If the workpiece is damaged or otherwise unusable then the operator removes it from the work station before restarting.

If the work station has abnormal successors, then the SFB is set 145a to the proper work station as the subroutine goes through its steps, illustrated in FIG. 3M; otherwise, the action is as described above.

If the work station has no sensor, indicated by passing an argument of zero, then the routine sets 146 GATEC to one, and hopes that everything works as it should. This is shown in FIG. 3N.

General Operating Procedural Segment Flow Chart

The use of the global subroutines for handling the various overhead functions required for proper operation of the line simplifies the writing of specific segment operating procedures. As described above, there are four global subroutine calls, and in the general segment procedure, each one is used once.

Again referring to FIG. 1, for the general work station, with no complicating factors, the first step in the procedure after entry 21 is to call REQUEST SLICE 22, indicating the photocell or sensor to be used. If the routine returns through EXIT 1, a JUMP passes control to the processing part of the procedure steps 26, 27, 28. Step 28 (processing) may be skipped on the basis of a machine data word labeled BYPAS. If it returns through EXIT 2, then do whatever is necessary to prepare for the workpiece 23 and then call ACKNOWLEDGE RECEIPT 24. If it returns through EXIT 2, then restore whatever preparations 25 were made for the workpiece and JUMP to REQUEST SLICE(-WORKPIECE)22.

In the processing section of the procedure, the monitor should be set 26, the input utilities reset 26, and a test of the BYPASS flag 27 should be made. Then process 28 or BYPASS to 29, depending on the results of the test.

Then call READY TO RELEASE 29, indicating SAFE or UNSAFE conditions. When the routine returns control, release the workpiece 30 and call ASSURE EXIT 31, indicating the proper sensor. When that routine returns control, wait long enough for the workpiece to clear the work station 32, reset the output utilities 33, and jump back to REQUEST SLICE(-WORKPIECE)22.

GLOBAL SUBROUTINES INTERFACE WITH MODULE SERVICE

Since the GLOBAL SUBROUTINES are called from a segment routine, it is convenient to have direct interface between the GLOBAL SUBROUTINES and the MODULE SERVICE program at the work station segment service level. In practice, the GLOBAL SUBROUTINES are reentered repeatedly before workpiece movement is accomplished. The logic of decoding an argument and saving it, selecting an appropriate variant, and the setting of the type of return to MODULE SERVICE which is accomplished for the GLOBAL SUBROUTINES is illustrated in FIGS. 4A-D.

Referring to FIG. 4A, the steps involved with the control sequence for REQUESTS are: save the instruction counter according to the instructions that call this subroutine 150 by storing it in the segment work area; determine if the present work station is the first work station of a machine 151; if not, jump to step 161, otherwise store reentry point in segment work area 152 and store the SFB in location HERE and location THERE 153 and determine if this machine has a normal predecessor or not 154. If not, get the address of the explicit software flag address 155 and store the SFB address for the predecessor machine 156 in THERE. If the machine is normal, get the sensor address and store it 157; then enter 158 routine variant A. If the present work station is not the first work station 151, then a determination 161 is made as to whether the work station has a sensor. If the work station has a sensor, the reentry point is stored 162 in a segment work area. The sensor address is obtained and stored 163. Then, at 164 routine variant B is entered. If the work station does not have a sensor, as determined at 161, the reentry point is stored 167 in the segment work area and routine variant C is entered at 168. These returns are provided from routine variants A, B, and C. If the subroutine function is not finished, return is made to point EXIT where the return pointer is saved 159 and control is passed 160 to MODULE SERVICE at point MDKM2. If the subroutine function is completed and the first exit path is taken, then return is made to point EXIT 1. Then at 165 the return pointer is zeroed (the event counter is incremented by 2), the event counter is set and control is returned to 166 MODULE SERVICE at point MODCM. The third return point from the subroutine variants is at point EXIT 2 which is the second exit pass on completion of the subroutine function. From EXIT 2, at 169, the return pointer is zeroed, the event counter is incremented by four and the event counter is set. Control is returned 166 to MODULE SERVICE at point MODCM.

The control sequence for ACKNOWLEDGE GLOBAL SUBROUTINES are illustrate in FIG. 4B. The first step 170 in this segment is to decrement the event counter by 2 and store the results in the segment work area. A determination is made as to whether the work station has a sensor 171. If the work station does have a sensor, the reentry point is stored 172 in segment work area, the SFB is stored 173 in location HERE and location THERE and at 174 a determination is made as to whether the work station has a normal predecessor. If the work station does not, the predecessor software flag base address is obtained and stored in THERE at 175. Whether the work station has a normal predecessor or not, the next step 176 is to obtain the sensor address and store it. Then, a variant (A) 176 is entered at routine 177. Three exits are provided from the variant A routine. The first exit is taken when the subroutine function is not completed and control is returned to the subroutine at the next polling interval. This exit point is led to at 159 and control is returned to MODULE SERVICE 160 at point MDKM2. In the event that the subroutine's function is completed or the work station has no sensor, EXIT 1 is taken which is the exit taken when the subroutine has been completed normally and control is then returned 166 to MODULE SERVICE at point MODCM. The third exit is labeled EXIT 2 and is taken when the subroutine function has been aborted. The point 169 is labeled EXIT 2 and control is returned 166 to MODULE SERVICE at point MODCM.

Referring now to FIG. 4C, the control sequence required for the READY RELEASE SUBROUTINE is presented. The first step is to decrement the EC (event counter by 2 and store it 178 in the segment work area; then a determination is made 179 as to whether the present work station is the last work station of a machine. If the work station is the last work station, the appropriate reentry point is stored 180 and the SFB is stored 181 in location HERE and location THERE. Then at 182 a determination is made as to whether the work station has a normal successor. If it has an abnormal successor, then location THERE is set 182 to the software flag base address for the abnormal successor. Whether the work station is normal or not, the routine variant A is entered 184. If the present segment is not the last segment of the work station 179, a determination is made 185 as to whether the argument passed to the subroutine indicates a safe or unsafe machine. If it is safe, the reentry point is stored 186; and routine variant B is entered at 187. If the machine is unsafe 185, the reentry point is stored 188 and routine variant C entered at 189. The same return points EXIT and EXIT 1 described previously are used by this subroutine. In the event that the subroutine function is not completed, control returns 159 to the point labeled EXIT. When the subroutine function is completed, control is returned 165 to point EXIT 1.

Referring to FIG. 4D, the control sequence for GLOBAL SUBROUTINE ASSURE EXIT is described. The first step is to decrement the EC register by 2 and store 190 the results in the segment work area; then, the reentry point is stored 191 in the segment work area. Next, a determination is made as to whether the argument passed indicates this work station has a sensor 192. If the work station has a sensor, the SFB is stored 193 in location HERE and location THERE. A determination is then made 194 as to whether the work station has a normal successor or an abnormal successor. If the work station has an abnormal successor, the pointer from the machine header is obtained and location THERE is set to the software flag base address for the abnormal successor at 195. Whether the work station is normal or not, the sensor address is obtained and stored 196; then variant A (which is the only variant implemented) routine is entered 197 in this routine. The same return points EXIT and EXIT 1 are provided, as described earlier. Point EXIT is taken 159 when the subroutine function is not completed and control is to return to this subroutine at the next interval. Point EXIT 1 is taken 165 when the subroutine function is completed.

COMPUTER CONTROL OF A MODULE

After a 2540M bit pusher computer 10 is loaded and is started into execution, it is in an idle condition, doing only three things: (1) program MANEA is repeatedly monitoring a pushbutton control box for each module; (2) communications with the 1800 is periodically executed on the basis of interrupt response programs which interrupt program MANEA; and (3) the module machine service program is periodically instituted in response to interval timer interrupts. All modules and all machines are off-line.

When an operator pushes one of the pushbuttons on the box, it is sensed by program MANEA and the COMMAND FLAG is set appropriately. An alternative method is for a programmer to manually set this flag word through the programmer's operation of the computer. At the next interval, MODULE SERVICE responds to the numerical volume in the COMMAND FLAG and executes the appropriate action with all the machines in the module. Program MANEA continues to monitor the pushbutton box during the timer period in which no interrupts are being serviced.

Messages are produced by MODULE SERVICE in response to pushbutton commands and to abnormal conditions relating to machine performance. These messages are buffered by subroutines. When the 1800 computer queries the 2540M and the message happens to be in a buffer, the interrupt response to the 1800 general purpose computer query transmits the buffer contents and resets it to an empty condition. Messages communicated from the 1800 computer are treated in the same manner; that is, interrupt response subroutines put the messages in buffers and transfer execution to whatever response program is required to handle the particular message.

Once a module is commanded to do something, it stays in the commanded state until it is commanded to do something else.

MODULE MACHINE SERVICE PROGRAM

The MODULE MACHINE SERVICE program is entered in response to interval inter interrupt with its level and all lower level interrupt masks are disarmed. Referring to FIG. 5A, the first step of the routine is to save 200 all registers, MODE 1 registers 1–8; MODE 2 registers 1–5, not the timers. The program then sets 201 the interrupt entry address for lockout detection or to a condition of overrun of the polling period for this interval and disarms or unmasks the interrupt level. Next, the software clock and date are incremented 202 and the timer is restarted for the next interval 203. Register 4 MODE 1 is set to the number of modules to be processed and this number of modules is saved 204 in MODNO and the module image flat set to zero.

Subroutine SETRG is called to initialize the MODE 2 registers for the first module requiring service 205. Then the condition flag CONDF is tested to see if the module is off-line 206; that is, CONDF=0. If the module is not off-line, control is passed to step 219. If the condition flag is zero, step 207 is a branch on the contents of the COMMAND flag, so that the program goes to step 269 or 208 or 218 or 235 or 216 or 218 or 218, depending on the value of the command flags 0–7. In response to a START COMMAND flag value step, a COMMAND flag is set to zero and the condition flag is set 208 to 1 as illustrated in FIG. 5B. Subroutine RELDA is called 209 to initialize pointers for this machine. Subroutine ONLNA 210 is called to start the machine; subroutine FXSFB is called 211 to fix the SFB for this machine. Subroutine STEPR is called 212 to point to the next machine. Control returns to step 209 until all the machines are finished. Then, the IMAGE flag is tested to see if it was zero 213 and control passes to step 214, if not, or step 269 if it was zero. The IMAGE flag is one if some machine did not come on-line, in which case the first machine is stopped 214 by setting run to zero and the flag STRT2 is set 215 to 1. Control then passes to step 269.

Referring to FIG. 5C, if the command was STATUS REQUEST, the command flag COMFG is set to zero 216 and subroutine MSIOO is called 217 to send a status message. Control passes to step 269.

Referring to FIG. 5D, commands stop, empty, tracking on, tracking off are invalid if the module is off-line. A COMMAND flag is set to zero 218. Control passes to step 269 effectively ignoring the commands.

Referring to FIG. 5E (including FIG. 5E-1) if the module is running, a branch on the command flag numerical value is executed 219. Control passes to step 267 or 220 or 223 or 227 or 235 or 239 or 256 or 261, depending on the numerical value of the command flag 0–7. In response to start command, a CONDITION flag is set 220 to 1; a machine run flag is set 221 to 1; and subroutine STEPR is called 222 to set the registers to the next machine in the module. Control returns to step 221 until all the machines are finished, in which case control is passed to step 269. In response to stop command, the condition flag CONDF is set 223 to 2; the machine run flag is checked for zero 224 and if zero, control is passed to step 226; if not zero, the machine RUN flag is set 225 to 2 and subroutine STEPR is called 226 to step the registers to the next machine in the module. Control returns to step 224 until all the machines are finished, in which case, control passes to step 269.

Referring to FIG. 5F, in response to a command of empty, the condition flag is set 227 to 3; register 7 is set to the second machine in the module 228; the machine run flag is set 229 to 1; and subroutine STEPR is called 230 to step the registers to point to the next machine. Control returns to step 229 until all machines are finished, in which case pointers are set for the first machine 231 and subroutine STEPR is called 232 to set the registers appropriately. The machine RUN flag is tested for zero 233. If the RUN flag is equal to zero, control passes to step 266. If not, the RUN flag is set to 2, indicating an empty condition 234 and control passes to step 269. Referring to FIG. 5G, in response to a command of the EMERGENCY STOP, a COMMAND flag and CONDITION flag are set to zero 235, subroutine RELDA is called 236 to reload the machine registers to zero; subroutine FXSFB is called 237 to set the software flag base for the next machine; subroutine STEPR is called 238 to step register to the next machine in the module; and control returns to step 236 until all machines in the module are finished. Then control passes to step 269.

Referring to FIG. 5H, in response to status request, FLAG word TEMP 1 is set to zero 239 and the conditional branch is executed on the contents of the condition flag CONDF 240. Control passes to step 241 or step 242 or step 242A, depending on the value of the command flag. In response to a condition of module running, subroutine MSIOO is called 241 to send a message that the module is running. In response to condition of module stopped, subroutine MSIOO is called 242 to send message module stopped. In response to a condition of module emptying, subroutine MSIOO is called 242A to send a message "module emptying". Then, the machine off-line message is set up and some data words are zeroed 243, the machine timer is integrated to determine whether it is negative 244 and control passes to step 245 or to 247, depending on whether it is negative or not negative, respectively. If the timer is negative, subroutine MSI00 is called 245 and to send a message machine off-line and data words TEMP 2 is incremented 246. Control passes to step 247, where the comparison is made to determine "Is this machine segment a bottleneck?" If the answer is yes, control passes to step 248. If the answer is no, control passes to step 249. At step 248, the bottleneck data words are saved and 248 the segment number is decremented 249. Then, if all segments of the machine have been examined, control passes to step 252. If not, control passes to step 251 which points registers to the next segment, and passes control back to step 247. At step 252, subroutine STEPR is called to increment the registers to point to the next machine. If all machines have not been examine, control returns to step 244. When all the machines are examined, control passes to step 253 and the comparison is made to determine "Are any machines off-line". If the answer is no, control passes to step 254, If the answer is yes, control passes to step 255. At step 254, subroutine MSI00 is called to send the message "All machines on line". Subroutine MSI00 is called to send 255 a message "limiting segment is XX" and control passes to step 266.

Referring to FIG. 5 (including FIGS. 5I-1 and 5I-2) in response to tracking on command the TRACKING flag bit for this segment is set on to 56 and the segmented number is decremented 257 and a comparison is made to determine is that all segments for this machine" 258. If the answer is no, control passes to step 259. If the answer is yes, control passes to stel 260. At step 259, a register is stepped to point to the next segment and control passes back to step 256. When all segments have been examined, subroutine STEPR is called 260 to step the registers to the next machine in the module. Until all machines in the module are examined, control returns to step 256 when all the machines have been examined, control passes to step 266. In response to the tracking off command, the TRACKING bit is set off for this segment 261, a segment is decremented 262, and the comparison is made to determine "Is that all segments for this machine?" 263. If the answer is yes, control passes to step 265. If the answer is no, control passes to step 264. A step 264, the registers are stepped to the next segment and control returns to step 261. When all segments of the machine have been examined, subroutine STEPR is called 265. Until all machines in the module have been examined, control returns to step 261. When all machines have been examined, control passes to step 266. When conditions are such that a module is to be processed, the COMMAND flag is set to zero 266 and a subroutine SETRG is called 267 to initialize registers for the first machine to be processed which is the last machine in the module. Until the last machine is reached, control passes to step 268. When the last machine is reached, control passes to step 269. Subroutine MACHN is called 268 to service all machines in the module. Then the module number is decremented 269 and if any machines are left 270, control passes to 204. If any modules are left, the module number, machine number and segment number are zeroed 271 and control passes to step 272 for program exit.

Referring to FIG. 5J-K to exit normally from the program, all interrupt levels are masked or disarmed 272. The interrupt response entry address is reset to the normal program entry point 273, disabling the lockout trap. The interval timer is read 274 and execution time is calculated at the current time minus the starting time. All registers are restored 275 and the program returns to the one which was interrupted by replacing the old status block of information 276. If the interval timer should run down and cause an interrupt before module service can exit normally, the MODE 2 registers are received 278 and subroutine MSOOO is called 279 to send the message "module service lockout" with the responsible machine's identification. Subroutine OFLIN is called 280 to remove the machine from further operation, set its status words appropriately and declare the machine inoperative. Then control is returned to step 203 to resume servicing for this next interval.

Referring to FIG. 5L, subroutine MACHN is described, which does all machine level processing for the module service program. On entry, the READY line is sensed 300. If it is on, control passes to step 301. If the READY line is off, control passes to step 307. This READY line indicates whether or not the machine is under computer control. The machine timer is queried to see if it is negative 301. If the machine timer is negative, indicating that the machine has exceeded the normal time limit for operation, subroutine ONLIN is called 302 to set the status of the machine accordingly. If the machine timer is not negative, control passes to step 303 where the FAIL flag is queried. If the FAIL flag contains a yes, control passes to step 305. If not, the fail count is compared to the BUSY segment counter during step 304. If they are equal, control passes to step 308. If they are not equal, control passes to step 305. Subroutine SGMNT is called during step 305 to process the segments of this machine and subroutine STEPR is called 306 on return from subroutine SGMNT. Control returns to step 300 until all machines in the module are finished. Then the program exits 306A by returning to the caller, At step 307, a machine timer is queried to determine whether it is negative. If it is negative, control passes to step 310. If it is not negative, control passes to step 308, where subroutine OFLIN is called to set the machine off-line. Then control passes to step 309 where subroutine FXSFB is called to set the software flag base register for the next machine and control passes to step 306. At step 310 the IMAGE flag is set to 1 and the timer is compared 311 to the maximum negative number, −32768. If they are equal, control passes to step 313; if not, control passes to step 312, where the timer is decremented and control goes to step 313. At step 313, the timer is compared to a value of one minute. If it has been a minute since the machine went off-line, the answer is yes, and control passes to step 314. Subroutine RELOD is called to reinitialize the machine to empty and Cold Start condition. Then control passes to step 309.

Referring to FIG. 5M (including FIG. 5M-1), subroutine SGMNT is described. On entry, subroutine SGTKA is called 315 to monitor the segments downstream gate. Then the segment timer is queried 316 for a negative value. If it is negative, control passes to step 317 where the IMAGE flag is set to 1 and control then passes to step 343. If the segment timer is not negative, control passes to step 318 where the segment monitor is decremented and compared 319 to preset limits. If the number is out of the present limits, control passes to step 319a where the timer is set to −1. FAIL count is incremented, IMAGE value is set to 1 and the message is sent that the segment failed. Control passes to step 343. If the monitor is within limits, the timer is compared 320 to a value of zero. If it is equal to zero, control passes to step 323; if not, control passes to step 343. At step 323 the image value is tested for a positive value. If it is positive, control passes to step 324 where the image bit flag IMAGF is set on and control goes to step 326. If IMAGE is not positive, control passes to step 325 where the image bit flag IMAGF is set off and control goes to step 326. At step 326, the monitor for the segment is set to zero. The timer is set to −1 327, the temporary value TEMP1 is set to the event and the event counter is loaded 328 from location TEMP1. The global address data word is tested 329 for a positive value. If it is positive, control passes to step 330, and an indirect branch is taken into the appropriate global subroutine 330. If the global address word is not positive, control passes to step 331 labeled MODCM which is also the return point for MODE 1 subroutines into this program. The mask for interrupt levels is set to indicate the lockout trap active 331 and a change mode instruction is executed 332 carrying control to the appropriate procedure for execution. Upon return from MODE 2, the event counter is saved 333 and control passes to step 334 which is labeled MDKM1 and is the unfinished MODE 1 subroutine return point. The original mask is restored and control passes to step 335 labeled MDKM2 which is the operation complete return for global subroutines. The machine timer is tested for zero 335. If the timer is equal to zero, control passes back to step 327; if not, a machine timer is tested 336 for a positive value. If the machine timer is a positive value, control passes to step 338. If the machine timer is not positive, the machine timer is set to zero 337 and control passes to step 338. A segment timer is set to equal the machine timer 338 and the machine monitor is tested for zero 339. If the machine monitor is equal to zero, control passes to step 343; if not, the segment monitor is tested 340 for a minus. If not a minus, control passes to step 342. If it is a minus, subroutine MSOOO is called 341 to send a message that a "segment overran". Control passes to step 342 where the machine monitor is stored in the segment monitor. Subroutine SGTRK is called 343 to monitor the segment performance. A segment number is decremented 344 and tested for zero 345. If it is equal to zero, control returns to the caller 348; if not, the registers are pointed to the next upstream segment flags 346 and control returns to step 315.

Referring to FIG. 5N (including FIG. N-1) subroutine SGTRK, which is the segment tracking subroutine or segment performance monitor, is described. On entry to subroutine SGTRK the TRANSPORTING bit flag is tested 348. If the flag is equal to "yes", control passes to step 349. If it is equal to "no", control passes to step 359. At step 349, the segment transport time is incremented and the gate is tested to determine if it is open 350. If it is open, control passes to step 357; if it is closed, the A memory bit AMEM is tested for an "on" condition at step 351. If it is "off", control passes to step 353; if it is "on", control passes to step 352 where a process bit flag PRCSS is turned on and control passes to step 353 where the transport bit flag TRANS is set off. The accumulator register is set to the value in the TWAVG register. Subroutine UPDAT is called 354 to calculate the average transport time and the average transport time is returned in the accumulator register. The accumulator is stored in data word TWAVG 355 and word NWVAL is set to zero 356 for a new accumulation. The restart bit RSTRT is set off 357 and control returns to the caller. A step 359, the process bit flag PRCSS is queried for an "off" condition. If it is in the "off" condition, control passes to step 362. If it is in the "on" condition, control passes to 360 where the wait bit is tested for an "off" condition. If it is in the "off" condition, control passes to step 373 if not, an indirect branch is executed 361 on the RUN flag contents and control passes to step 357 or 370 or 357 or 370, depending on the numerical value of the RUN flag 0-3. At step 362, a data word NWVAL is incremented and GATEB is tested for an "open" condition 363. If it is "closed", control passes to step 364. If it is "open", control passes to step 365 where GATEC is tested for a "closed" condition. If GATEC is "closed", control passes to step 357; if GATEC is "open", control passes to step 366, where the WAIT bit is tested for the "on" condition and control passes to step 367. At step 364, the transport bit TRANS is tested for an "off" condition 365. At step 367, the process bit PRCSS is set to the "off" condition and the data word PWAVG is set in the accumulator register. Subroutine UPDAT is called 368 to calculate the average process time which is returned in the accumulator register. The accumulator is stored in data word PWAVG, and word NWVAL is set to zero 369. Control then passes to step 357. At step 370, GATEC is tested for an "open" condition. If GATEC is "open", control passes to step 357; if GATEC is "closed", the WAIT bit is set to "off" 371 and GATED is queried for the "closed" condition 372. If GATED is "closed", control passes to step 357. If GATED is "open", the A memory bit AMEM is tested to determine if it is in the "on" condition 373. If "on", control passes to step 357; if "on", GATEA is queried for an "open" condition 374. If GATEA is "open", control passes to step 357; if not, GATEB is queried for a "closed" condition 375. If GATEB is "closed", control passes to step 357; if not, the transport bit TRANS is set "on" and the NWVAL data word is set 376 to zero and control passes to step 377.

Referring to FIG. 5O, the subroutine SGTKA is represented. GATEC is queried for a "closed" condition 380. If it is "closed", control passes to step 381 where CMEM is tested for an "on" condition and control passes to step 383. If GATEC is "open", C memory bit CMEM is set "off" 382 and control passes to step 383, where control returns to the calling program. Subroutine UPDAT on entry computed the rolling weighted average of the number in the accumulator register seven combined with the data word NWVAL and leaves the results in register seven 384. Then control returns to the caller 385. Subroutine FXFSB sets the software flag base register for a particular segment. On entry, subroutine SGTRK is called 386 to monitor the performance of the segment. A segment number is decremented 387 and tested for a zero condition 388. If it is equal to zero, control passes to the caller 390; if not, the SFB register is pointed to the next segment 390 and control returns to step 386.

Referring to FIG. 5P, subroutine ONLIN is illustrated. On entry to this subroutine, MSIOO is called 400 to send the message to restart the machine. Control passes to step 402. On entry to a secondary entry point ONLNA, the return address is fixed up, step 401 and control passes to step 402 where the operate bit OPER is set "on". This is a CRU output and is a command to the machine. The READY line is sensed for on 403. If it is "on", control passes to step 407. If the READY line is "off", subroutine MSIOO is called 404 to send the message "machine doe not start". Subroutine OFLIN is called 405 to remove the machine from service, set its pointers appropriately, set its data appropriately, and declare the machine inoperative. Control returns to the caller program 406. At step 407, a register is used or saved and the machine FAIL COUNT, TIMER and RUN flag are initialized and Register Six is set to contain the number of segments for the machine. Then a segment timer is set to zero; the segment monitor is set for five seconds; the restart bit RSTRT is set "on" and the SFB is pointed to the next segment 409. The number of segments is decremented until all segments are processed. The control returns to step 409. When all segments in the machine have been examined, the registers are restored 411 and control returns to the caller program 412.

Referring to FIG. 5Q (including FIGS. 5Q-1 and 5Q-3) subroutine OFLIN is described. On entry, subroutine MSIOO is called 415 to send the message "Machine is off line". Then the operate output line is set to the "off" condition to disconnect the machine from computer control; the machine's timer is set to $-1$ and the image is set 416 to $-1$. Control returns program 417.

Referring to FIG. 5R, subroutine RELOD is described. On entry, subroutine MSIOO is called 420 to send the message "machine loaded" and control passes to step 422. A secondary entry point, RELDA on entry the return address is set 4212 and control passes to stel 422 where the data word indicating abnormal neighbor is queried. If the machine has an abnormal neighbor indicated by a non zero data word, control passes to step 423. If the data word is zero, indicating that there is no abnormal neighbor, control passes to step 425. At step 423 a data word is queried to see if it is an abnormal successor or predecessor. If it is not an abnormal successor, control passes to step 425. If it is an abnormal successor, control passes to step 424 where a flag address of the successor is calculated and stored in data word THERE. Control passes to step 425 where GATED is "closed". Then, the busy data word BUSY is set 426 to equal the number of segments. A loop counter is established Register Zero. Register Six is pointed to the procedure and the software flag address is saved 426. At step 427, the segment starting address is set into the EVENT word. The global address GLADR is set to 0. The global place GLPLA is set to 0. Gate B is "closed". GATE C is "closed", transport flag TRANS is set to the "off" condition, process bit flag PRESS is set to the "off" condition, the wait flag WAIT is set to the "off" condition and the flag address for the next segment is decremented. Register Zero is incremented 428 and tested for a positive value 429. If it is not a positive value, control returns to step 427 for the next segment. If it is a positive value, control passes to step 430 where the SFB register is restored. All outputs to this machine are turned "off" and control returns 431 to the caller.

Referring to FIG. 5S (including FIG. 5S-1) subroutines set register SETRG and step register STEPR are described. On entry into subroutine SETRG the data address register is set; the machine number and the software flag base register are set one higher than required 435, subroutine STEPR is called 436 to point the registers to the appropriate machine. On return, control is returned to the caller 437. On entry to subroutine STEPR, the machine number is decremented 440 and queried for zero 441. If it is equal to zero, control returns to the finished exit 442 which is the all machines serviced exit. If the machine number is not zero, control passes to step 443 where Registers 1, 2, and 3 are set. At step 444, the SFB, CRB, MPB, MDB registers are set for this machine. The segment number is set to the number of segments for the machine. Then, control is returned to the not finished exit 445 which means there are more machines to be processed.

MODULE CONTROL FLAGS

To provide operator control of the assembly line modules, recognition of machine states is provided. The states are indicated by condition flag words as shown in TABLE IXa. A pushbutton box connected to the CRU of the 2540M computer is monitored by program MANEA. A command flag COMFG is set to correspond to the appropriate button whenever it is pushed. Commands to change state are recognized as shown in TABLE IXb.

TABLE IXa

| | |
|---|---|
| OFFLINE (all machines) | CONDF = 0 |
| STARTED (all machines) | CONDF = 1 |
| STOPPED (all machines) | CONDF = 2 |
| EMPTYING (all machines) | CONDF = 3 |

TABLE IXb

| COMMAND | As Indicated Command Flag | Module/ Machine Service Acknowledgement |
|---|---|---|
| NO COMMAND | COMFG = 0 | |
| START MODULE | COMFG = 1 | COMFG = 0, CONDF = 1 |
| STOP MODULE | COMFG = 2 | COMFG = 0, CONDF = 2 |
| EMPTY MODULE | COMFG = 3 | COMFG = 0, CONDF = 3 |
| EMERGENCY STOP | COMFG = 4 | COMFG = 0, CONDF = 0 |
| STATUS REQUEST | COMFG = 5 | COMFG = 0 |
| TURN TRACKING ON | COMFG = 6 | COMFG = 0 |
| TURN TRACKING OFF | COMFG = 7 | COMFG = 0 |

The command flag COMFG and condition flag CONDF are in the FIXED TABLE in the 2540M computer and are manually changed through the programmer's console. A module is switchable to any state except when the module is OFFLINE; then, only START, EMERGENCY STOP, and STATUS REQUEST COMMANDS are utilized.

MODULE/MACHINE SERVICE

The Module/Machine Service program is an interrupt response program. It is assigned to an interrupt level in the 2540M computer to which an interval timer is connected. The timer is loaded initially with a value by an instruction in the Cold Start program. When the value is decremented to zero, an interrupt stimulus is energized in the computer. If the level is unmasked (armed), the interrupt is honored, and reset, by execution of an instruction in a particular memory location. An XSW (Exchange Status Word) instruction is used to save the current program counter, status of various indicators, and insert a new program counter value and interrupt status mask. The new program counter value is the entry address of the Module/Machine Service program. The timer is then reloaded for the next interval.

The program searches the machine header list for each module connected to it and services those machines which require servicing. Normally servicing is completed, and control returns to the program which was interrupted (usually program MANEA) until the remainder of the interval passes.

To detect the abnormal case (LOCKOUT) where the amount of work required for servicing is longer than the interval, a special subroutine is employed. The interrupt entry address is changed to cause entry and execution of the special subroutine when the Module/Machine Service program is entered. Just prior to exit, the address is restored to cause entry to the Module/Machine Service program proper. In the abnormal case, the special subroutine is entered with registers pointing to the machine being serviced. This machine is disabled and declared inoperative. Servicing then resumes.

MAINLINE PROGRAM MANEA

Functions performed by the Mainline Program called MANEA are: communication with the general purpose host computer; inputs from the host computer are in the form of display data where the display is a particular machine and patches which affect a configuration or operation of a module by changing the data for a certain machine or machines. Another function of MANEA is J-BOX control of a module, or pushbutton box control for such operations as START, STOP, STATUS REQUEST, EMPTY and EMERGENCY STOP.

MANEA operates in a fully masked mode during all of its cyclic execution except above six instructions, where interrupts are allowed according to the system mask. It should be noted that both entries to the message handler portion of MANEA, MSOOO AND MSIOO provide interrupt protection by disarming all levels. Because MANEA executes on the mainline, it does not maintain the integrity of any of the registers it uses. On the other hand, MSOOO and MSIOO do maintain the integrity of all registers they use, since they execute at times as subroutine extensions of various interrupt levels. MANEA handles incoming line functions such as patches or display data subroutines. It also provides the mechanics for readying messages for output to the general purpose host computer or optionally to a teletype. Once during each thousand passes through MANEA, the CRU is strobed for inputs calling for START, STOP, STATUS REQUEST, EMERGENCY STOP or EMPTY action on the module. MANEA currently looks at CRU addresses 03C0 through 03D8 and interprets findings as requests regarding the five possible modules represented in these CRU addresses. Findings are passed to Module Service program through a command flag COMFG for each module to inform Module Service program of the request. COMFG is set as indicated in TABLE IXb.

Response messages are sent back to the general purpose host computer on each request. The module number is tacked on to any such messages.

Buffer OTBUF is the focal point of message traffic from the 2540M computer to the general purpose host computer. A second buffer OTBF2 is managed primarily by the Message Handler MSIOO and MSOOO entry points. A call to the Message Handler results in a message being inserted into buffer OTBF2. The contents of OTBF2 are then moved into buffer OTBUF by MANEA. Buffer OTBUF is polled in the present embodiment by the host computer once a second. Buffer INBUF is used for messages from the host computer to the 2540M computer.

Each of the buffers utilized is 200 words in length. This length is controlled by the term CMLGH in the MODE 1 system symbol table for segmented operation. Buffers INBUF and OUTBUF contain as the first word a check sum, as the second word a word count, and then the remainder of the buffer words contain data. The check sum is computed as the sum, with overflow discarded, of all input data words and the word count. A checksum word is compared on transmissions against the value set form the host computer, or in the host computer, against the value sent from the 2540M computer. The word count word is a count of all the data words in the buffer. Buffer OTBF2 uses its first word as a pointer and the remainder for data. The first word or pointer points to the next available location which MSOOO or MSIOO may insert messages.

DISCUSSION OF THE FLOW CHARTS FOR MANEA AND SUBROUTINES

Referring to FIG. 6A, program MANEA is entered and all interrupt levels are masked 500. The input buffer word count is looked at 501 to determine presence of input commands. If it is non-zero, INBUF is tested for BUSY 502. A checksum check is made 503, and if it matches the host generated checksum, 504 the validity of the message is tested 506. If validity is established, a branch to the appropriate routine 501 to handle the input message is taken. If the checksum is bad, the entire buffer of input messages is discarded. In this case, the checksum error message is sent back to the host computer 505 and control passes to step 520. If an invalid message is input 506, it is ignored but it is sent back to the host computer for printout 508. Remaining messages in INBUF are processed 510 in spite of the invalid one. Then the total counter TOTAL 511 is reset to zero.

Referring to FIG. 6B, the INBUF word count word is set to zero 512. A check is made to see if the host has polled the output buffer OTBUF 513; if not, control passes to 510. If the bus flag OBUSY is active 514 or if OTBF2 is empty 515, control passes to step 510. If the output buffer is not busy and OTBF2 is not empty, data is transferred from OTBF2 into OTBUF 516. The checksum is computed on the buffer contents 517; the checksum and word count are placed in OTBUF 518. The next available location pointer of OTBF2 is reset 519 to indicate empty. Control passes to step 510.

Referring to FIG. 6C (including FIG. 6C-1), a counter CNTRZ is incremented 521 once per pass through MANEA until 520 in the present embodiment it reaches 1,000. Then it is set to zero 522 and the MDB and CRB registers are set 523. Pushbutton control box or J-BOX for the first module is set 524 at 03C0. A counter is initialized to point to the first module 525. The J-BOX for that module is read 526. If the START button was pushed 527, subroutine MSG4X is called 528 and control passes to step 537. If the STOP button was pushed 529, subroutine MSG5X is called 530 and control passes to step 537. If the STATUS REQUEST button was pushed 531, subroutine MSG8X is called 532 and control passes to step 537. If the EMERGENCY STOP button was pushed 533, subroutine MSG7X is called 534 and control passes to step 537. If the EMPTY pushbotton was pushed 535, subroutine MSG6X is called 536 and control passes to step 537. At step 537, a counter is tested to see if each module's pushbutton box has been examined. If the counter is greater than or equal to five, control passes to step 512. If not, the counter is incremented 538 the CRU address is incremented to the next module's J-BOX 539 and control passes to step 526.

Referring to FIG. 6D, subroutine MSG4X is described. On entry, the command is acknowledged by sending message "start feeding workpieces" to the host 550 and the flag STRT2 is queried 551. If the flag is zero, control passes to step 553. If the flag is not zero, control passes to step 552 where the STRT2 is set to zero and the command flag COMFG is set 555 to 1. At step 553, the question is asked "Is the module already running?". If not, control passes to step 555. If so, the message "module already running" is sent back to the host computer 554 and control passes to step 556, where control returns to the caller.

Referring to FIG. 6E, subroutine MSG5X is described which responds to STOP command. On entry, the command is acknowledged by the message "Stop feeding workpieces" sent to the host. The module is tested for offline status 561. If the module is not offline, control passes to step 563. If it is already online, control passes to step 562 where the message "module offline" is returned to the host and control passes to step 566. At step 563, if the module is already stopped, the message "module already stopped" is returned to the host computer 564 and control passes to step 566 or if the module is not already stopped, a command flag is set to 2 to Command Module Service to stop feeding workpieces 565. At step 566 control is returned to the caller.

Referring to FIG. 6F (including FIG. 6F-1) subroutine MSG6X is described which is called to empty a module. On entry, the command is acknowledged by the message "Empty Module" being returned to the host 570. The module is queried for offline 571. If it is not offline, control passes to 573. If it is already offline, the message "Module Offline" is returned to the host computer 572 and control passes to step 576. At step 573, if the module is already emptying, the message "Module Already Emptying" is returned to the host computer 574 and control passes to step 576. If the module is not already emptying, the command flag is set to 3 to tell Module Service to empty the module 575. At step 576, control returns to the caller.

Referring to FIG. 6G, subroutine MSG7Z is described, which responds to the EMERGENCY STOP command. On entry, the command is acknowledged by the message "Emergency Shutdown" going to the host computer 580 and the command flag set to 4 to tell Module Service to shut down the module 581. Control is then returned to the caller 582.

Referring to FIG. 6H (including FIG. 6H-1) subroutine MSG8X is described which responds to the STATUS CHECK command. On entry, the command is acknowledged by the message "Begin Status Check" going to the host computer 590 and the command flag is set to 5 to tell Module Service a status request has been entered 591. Control returns to the caller at step 592.

The message handler subroutines serve the purpose of picking up messages from a user on his request and inserting them into buffer OTBF2. Two entries are provided MSOOO and MSIoo to accommodate two different arguments. Subroutine call MSOOO is accompanied by three following arguments, the first of which is the code number for the message type code and word count of the message; subsequent arguments depend on the message type. The other entry, MSIOO is provided for the case where one argument follows the call to the subroutine which points to the address where the message is described with the same three arguments; that is, a message type and word count argument and other arguments depending on the type of message. To distinguish between messages from normal users and messages in relation to the pushbutton J-BOX control, an alternate mode of calling the subroutine is provided. Calls from within the MANEA program itself relating to a J-BOX command acknowledgment use a BLM instruction with an R field of one and an immediate address of MSOOO entry point. The R field of one distinguishes between those messages related to J-BOX and if this field is zero, as in a normal call, the messages are sensed to be from a normal user.

Referring to FIG. 6L, the message handler subroutine is described. On entry through entry point MSIOO, an indicator is set 600 at location SCRAT+2. Control passes to the same point as the entry from MSOOO where registers 0, 1 and 2 are saved 601. Then the argument is tested 602 to see if the call is from a J-BOX. If so, register 2 contains the module number for this message and is saved as the first argument 604. Control then goes to step 605. If the call is not from a J-BOX 602, the contents of word MODNO set by Module Service are set as the first argument of the message 603. Outbuffer OTBF2 is tested 605 to see if there is room for the message. If not, then the message is ignored and control passes to step 608. If there is room in the buffer, the message is moved into OTBF2 606 and the next available location pointer is moved to accommodate the message 607. At step 608, the indicator at location SCRAT+2 is tested. If the indicator is zero, the buffer word count is tested 611 to determine if it is even or odd. If it is even, the return address is incremented by the word count of the message so that return to the caller may be set appropriately. If the word count is odd 611, the return pointer is incremented by the word count of the message and one more 613. Control then passes to step 614. If the indicator was not zero 608, the return address is incremented by 2 609 and the indicator at location SCRAT+2 is set to zero 610. Control goes to step 614 where registers 0, 1 and 2 are restored and control returns to the caller 615.

MESSAGES FROM THE GENERAL PURPOSE HOST COMPUTER

In the present embodiment there are two messages recognized by the program MANEA. These are display and patch. The display message refers to data which is to be displayed on a particular device. The patch message refers to one or more sets of input data for machines in a module. In both cases, the current input data block for the machine or machines is overlaid with the new data. As a result, the next execution of the machine's data contains new information.

Referring to FIG. 6I, subroutine DSPEC is described. This subroutine is called to respond to display message. On entry, registers 0, 1 and 3 are set to arguments needed 650. The starting location for the machine's MDATA is computed 651. The region of the MDATA to be overlaid is computed and data moved from the message to the machine's MDATA area 652. Control then returns to MANEA.

Referring to FIG. 6J (including FIG. 6J-1) subroutine PATCH responds to patch messages. On entry, the message word count and module number are saved 660. The accumulated word count variable ACUWC is set to zero 661. Register 3 is pointed to the first word in the message 662. Register zero is set to the machine's header array 663. The starting location of the machine's MDATA is computed 664. A start of the overlay is computed 665. PATCH data is moved from the INBUF message into the MDATA overlay area 666 and the question is asked "Does this machine have an abnormal neighbor?" 667. If not, control passes to step 673. If it does have an abnormal neighbor, the pointer to this machine's header is saved 668.

Referring to FIG. 6K, the abnormal successors for this machine are set to indicate empty commands 669. The abnormal predecessors of the machine are set to go to shutdown 670. The current active predecessor is determined and its run flag set 671 to 1. The current active successor's run flag is set 672 to 1. When all blocks of data in the message area have been moved into their respective machine's MDATA 673, control passes to step 675, FIG. 6M, If any data blocks remain in the message, register 3 is pointed to the next machine number 674 and control returns to step 663. At step 675, if any machines with abnormal neighbors were involved, the run flags for all predecessor and successor machines are set back to 1 676 and control then returns to MANEA.

The purpose of LEVEL1, LEVEL3 and LEVEL4 (the communication package) is to provide communication between the host and a 2540 on a cycle steal basis. This exchange of data is of course handled through the REMOTE COMPUTER COMMUNICATIONS ADAPTER in a manner which minimizes interference with 2540 process programs.

The basic philosophy of communications is that the 2540 acts in response to requests from the 1800. Communications does not initiate with the 2540.

The three interrupt routines of the communications package work together in transferring data between 2540 and host. As a result, there is heavy dependence of each one on the others. This interface between LEVL1, LEVL3, and LEVL4 is carried out through four flags: TOC, FLAGX, LWCOM, and FLAGY.

FLAGX—1800/2540-data-transfer-started flag
FLAGY—1800/2540-data-transfer-complete flag
LWCOM—list-word-overlay-complete flag
TOC—1800/2540-data-transfer-timeout counter Because parity checking is not done between the RCIU (REMOTE COMPUTER INTERFACE UNIT) and the 2540, a parity check is run on the list words. Odd parity is maintained.

Due to the requirements of the RCCA all data transfers are done in burst mode.

Superimposed list word information is shown in TABLE Xa.

TABLE Xa

| | 0 | 1 → 15 | | |
|---|---|---|---|---|
| LOC 20 | P | REMOTE ADDRESS | | |
| | 0 | 1 | 2 | 3 → 15 |
| LOC 21 | P | R/W | B/M | WORD COUNT |

Parity is generated and inserted into bit zero of both words by the host.

Bit 1 of location 21 is used to inform the 2540 whether the transfer is a read or write.

1=READ
0=WRITE

Bit 2 of location 21 is used to inform the AUTONOMOUS TRANSFER CONTROLLER (ATC) of the mode of the transfer. This bit is put in by 2540 and is set for burst mode.

1=BURST MODE
0=WORD MODE

CRU interrupt status card (starting address of 03F0) is used with LEVL1 to permit masking and status saving on the associated interrupt level. This is shown in TABLE Xb.

TABLE Xb

| | Bit | |
|---|---|---|
| 03F0→ | 0 | ATC COMPLETE |
| | 1 | |
| | 2 | |
| | 3 | |
| | 4 | |
| | 5 | |
| | 6 | |
| | 7 | |
| | 8 | |
| | 9 | |
| | 10 | |
| | 11 | |
| | 12 | |
| | 13 | |
| | 14 | |
| | 15 | |

Bits 0 is used for the ATC COMPLETE interrupt.
ILSW1 refers to bits 0 through 3 of the above card.
The first 8 bits on the card are masked by the second 8 bits.

TABLE Xb-continued

For LEVEL1 only bits 0 and 8 are utilized.
ILSW2 refers to bits 8 through 10.
The bits are sensed and reset by LEVEL1.

LEVL1-LEVEL ONE INTERRUPT ROUTINE

LEVL1 serves the basic function of determining when list word transfer is complete, and also to determine when the subsequent data transfer is complete. The method comprises saying that the first level one ATC channel interrupt after activating channel 7 indicates completion of list word transfer; and the second such interrupt means the data transfer is complete.

Referring to FIG. 7A, execution starts at LEVL1 where register 0, the MDB, and the CRB are saved 700. The MDB and CRB are saved off because LEVL1 executes INPUT FIELD and OUTPUT FIELD instructions. To further comply with the needs of INPF and OUTPF instructions the MDR is set equal to the starting location of LEVL1, and the CRB is set to zero 702.

An interrupt status card for LEVL2 is read into memory 703.

A test is made to see if the ATC caused the interrupt 704. If so, the ATC TRANSFER COMPLETE STATUS REGISTER is looked at 765 to determine if the interrupt was due to channel 7 ATC complete 706.

If the ATC complete interrupt was not due to channel 7, or the ATC did not cause the interrupt, execution proceeds to step 711 where preparation is made to return control to the mainline.

After transfer of list words FLAGX should be zero 707. LWCOM would be set non-zero to indicate completion of list word transfer 710. LWCOM tells level 3 of the arrival of list words.

At the start of data transfer (other than list words) FLAGX is set to a one by LEVL3. Hence, on completion of transfer 707, FLAGY is set to one 708, indicating completion of LEVL3.

NBUSY or OBUSY was set to the starting I/O address by LEVL3. These are intended for use by MANEA, and are non-zero only during actual transfer interval. It is here in LEVL1 that they are reset to zero 709.

At ATCRN register 0, MDB, CRB and interrupt mask are restored to their value before LEVL1 execution 711. Control returns to the interrupted program (usually MANEA) 712.

It should be noted that FLAGX, FLAGY, and LWCOM are zeroed by LEVL4 on the initial response to an interrupt from the 1800 general purpose computer.

LEVL4

LEVL4 provides the initial response to an interrupt from the host. Its purpose is to initialize list words, initialize communication package interface flags, and to handle interface with RCCA to affect list word transfer.

When the host wants to talk to a 2540 it sets a bit in the REMOTE INTERRUPT REGISTER in the RCCA. This results in an interrupt on interrupt level 4.

Referring to FIG. 7B, on entry register 0 is saved 715. A test is made to determine the state of channel 7 716. If it is active, it is shut off 717.

The RIR bit is reset by issuing an INPUT ACKNOWLEDGE 719.

Communication interface flags LWCOM, FLAGX, FLAGY, and TOC are zeroed here before start of data transfers 720.

Because of constraints imposed by hardware mechanization of the external function with force, location 21 is set to 2 721 before the interrupt response is sent back to the host 722.

The list words are set up 723. Location 21 indicates two word transfer (list words) in the burst mode.

Because EXTERNAL FUNCTION WITH FORCE and channel 7 activities utilize common hardware, it is necessary to check for completion of EXTERNAL FUNCTION 724 before activating channel 7 725. Control returns to the interrupted program 726.

LEVL3

LEVL3 serves several functions for 1800/2540 communications.

1. Activate channel 7 for read or write.
2. Check list words for odd parity.
3. Deactivate channel 7 in case a transfer is not complete within 4.2 seconds.
4. Pass I/O address to MANEA.

LEVL3 is run off the REAL TIME CLOCK which ticks at two milliseconds intervals.

Under quiescent conditions between communications transfers LWCOM, FLAGX, and FLAGY would be non-zero.

During a transfer of data the program tests list word complete. After list word overlay is complete, as indicated by LWCOM being set non-zero by LEVL1, execution proceeds to parity check. If list word parity is odd, the burst mode bit is OR'ed into the address list word. A one bit indicates read. (Date to the 1800).

For read the I/O starting address is put into OBUSY; for write, into NBUSY. Then channel 7 is activated.

FLAGX is set to 1 to indicate the start of data transfer, and to tell LEVL1 to interpret the next level 1 interrupt as completion of data transfer.

The time out function gives the transfer a total of 4.2 seconds to complete. Time starts on first pass through LEVL3 after channel 7 is activated for list word overlay, and continues until transfer is complete or 4.2 second limit is reached.

Referring to FIG. 7C, on entry to subroutine LEVL3, registers 0, 1 and 2 are saved 730. List word overlay complete is tested 731. If not complete, the time out counter TOC is incremented 736 and compared to a time interval of 4.2 seconds 737. If the time counter is less than the maximum time allowed (4.2 seconds) control passes to step 741. If it is more than allowed, control passes to step 738. When list word overlay is complete 731, the flag x word FLAGX is queried to see if transfer has already started 732. If it has, transfer passes to step 740. If not, control passes to step 733 where a parity of words is checked. If parity is bad or wrong, control passes to step 741. If parity is correct, a burst mode bit is inserted into the word count list word 734 and the 1800 read or write indicator is queried 735. If the function is read, control passes to step 742. If the function is write, control passes to step 745.

Referring to FIG. 7D (including FIG. 7D-1 and 7D-2) a shutdown or abortion of the transfer is performed by forcing a non-burst mode 738, deactivated channel 7 739 and proceeding to exit at step 741. If the transfer has been started, a transfer check is made or data transfer complete text is made at step 740. Data transfer incomplete passes control to step 736. When data transfer is complete, control passes to step 741 where registers 0, 1 and 2 are restored and the program exits at step 748.

Referring to FIG. 7E, a read function is accomplished by placing the start address of the output transfer into word OBUSY 742. Channel 7 is activated 743 and FLAGX set to 1, 744. Control passes to step 741 for exit. The write function is accomplished by placing the start address of the input transfer into NBUSY 745. The Channel 7 is activated for transfer 746 and FLAGX is set to 1, 747. Control is passed to step 741 for exit.

THE COMPUTER CONTROL SYSTEM

The first part of the following sections describes the total computer control system and identifies each major component. It describes the major components of software and shows how these components fit together to serve the purposes of the total system. On completion of this portion of the document, the reader should have a thorough understanding of the total system, the major equipment components comprising it, the functional software program components which are used to operate the system, the purpose and method of use of each component, and some insight into the job of operating the total system.

The remaining sections are devoted to detailed descriptions, including logical flow charts (a widely accepted method for describing programs) of all the programs and subroutines which comprise the software for this control system. These sections are organized by category where the categories represent system functions, as described in the first part of the following sections.

The COMPUTER CONTROL SYSTEM is the worker and host computers, together with all of the software programs which help make the worker computers control modules. The primary purpose of the worker computers is to control the individual machines which make up the modules, and also to control the module.

The primary purpose of the host computer is to build "core loads" for the worker computers. "Core load" has two meanings. Related to the worker computers, a core load means an image of the memory contents (instructions and data) containing all the programs needed to operate the worker computer, the module machines attached to it, and any attached peripherals (communication with the host is in this category).

A secondary purpose of the host computer is to allow communication of all of the computers with each other. The communication takes two forms:

(1) Starting a worker computer (loading its core load into it and beginning execution) is quickly and easily accomplished by having direct communication between the host and worker; and (2) After the worker is loaded and in operation, messages keep the host informed of the status of every machine, every module, and workpiece movement throughout the assembly line. It can exercise "supervisory" control over the assembly line based on this information and pass any desired information back to the worker computers.

The COMPUTER CONTROL SYSTEM offers a good mix of practical features. Starting with the general purpose computer (in this embodiment, an IBM 1800) and an IBM supplied operating system (TSX) having a number of tested utility programs and testing features, support programs are described in the following sections.

The primary consideration in a software design is the convenience of the system user. Fast response to changing requirements necessitated a modular and logical system which the user could be made to understand easily.

Program development time was compressed by careful planning, by an insistence on organizational simplicity, and by exacting test procedures. Usage of punched cards as the software development media proved very convenient and time-saving.

Features of the software implemented in the system are:

(1) Separation of instructions and data. This permits the process control requirements of the controlled machines to be parametrically and uniquely expressed via the one-to-one correspondence of data blocks and machines; and (2) List control operations as the media for data structure definition and content manipulation. This makes it possible flexibly to define and manipulate lists relating the physical assembly line to the data required to operate each machine.

In accordance with the methods of the present invention, it becomes a simple matter to imitate in a software description the type and degree of organization of the assembly line. Imitation of the physical assembly line in software allows modification that it logically equivalent and therefore a simple to understand and manipulate.

The user performs the following steps to bring a module under computer control:

Create data areas for storage of:

1. Each machine PROCEDURE
2. Each machine data block MDATA
3. Each machine INFO list
4. Each module configuration CONFIG
5. Each computer
6. Each supervisory program SUPR I. Use MACLF program to create all files on 2311 disk and to store contents of INFO, CONFIG and COMPUTER list. Non-process job executed via control cards.

II. Use ASSEMBLER to store object modules for PROCEDURE and MDATA blocks and all SPUR supervisory programs, interrupt service subroutines and other general purpose subroutines. Non-process job executed via control cards.

III. Use CORE LOAD BUILDER to build the MODE 1 portion of a core load to be executed in a particular 2540 computer. The programs required are converted to absolute addressing if they are relocatable. Memory mapping and allocation are managed by the CORE LOAD BUILDER. Non-process job executed by control cards.

IV. Use the DATA BASE BUILDER to build the MODE 2 portion of a core load to be executed in a particular 2450 computer. Headers are created and initialized for all machines in each module controlled by that 2540 computer, and the required MDATA blocks and PROCEDUREs are included. Non-process job executed by control cards.

V. Use SEGMENTED CORE LOAD BUILDER to integrate the MODE 1 and MODE 2 portions into a single core load. Addresses required in machine headers are computed and stored in the headers. A few addresses required to link the MODE 1 and MODE 2 portions together are stored in a fixed table referenced by the supervisory MODE 1 programs. The resulting core load is fully initialized and ready for execution in a 2540 computer. It is saved on disk storage. Executed by console data switch entry and pushbutton interrupt or recognized by entry of keywords on typewriter.

VI. Load the 2540 computer. Use the 2540 segmented loader to load an operational 2540 computer. To be operational, the 2540 must be capable of communication with the host computer. The 2540 BOOTSTRAP LOADER must be executing, or normal communications programs from some previous core load. Executed by console data switch entry and pushbutton interrupt, or recognized by entry of keywords on typewriter.

An alternative method of loading is to punch cards with the core load contents from the 1800. The 2540 may be initialized with a card reader program, have a card reader attached to it, and the punched card deck read into its memory. Paper tape equipment is also available, and is, in fact, the medium for introducing the card reader program into the computer.

SOURCE LANGUAGE INSTRUCTION SET

SOURCE LANGUAGE is a set of computer instructions where the instruction as written down on the coding form is meaningful to the programmer and represents some specific action which he wishes the computer to take. There is a one-to-one correspondence between the instruction codes written by the programmer and the instructions executed by the machine 12.

The lines of code written by the programmer fall into three major categories; comments, assembler directives, and instructions.

Comments-Any line of code with an asterisk in Column 1 is treated as a comment. Comments are used to improve legibility and clarity of the program as written. Comment lines are printed by the assembler but no further action is taken on them.

Assembler Directives-An assembler directive tells the assembler to take some specific action needful or helpful for the assembly process, but it does not result in a machine instruction. One example of an assembler directive is the "END" statement that informs the assembler that there are no more cards to be processed in a given assembly. Other examples will be given later.

Instructions-Instructions are those lines of code which result in a specific instruction for the computer to take some action.

CODING CONVENTIONS

In writing programs to be executed by the computer, certain conventions are established. Except for comment cards, which have any format past the required initial asterisk, each line of code contains four major fields; label field, operation code field, operand field, and comment field.

Label Field-The label field is optional. If there is no need for a particular statement to be labeled, the label field is left blank. If used, the label is left justified in the field and consists of any combination of from one to five letters and numerals, except that the first character must be a letter. A given label is used only once in a given assembly. Once a statement has been labeled, all references to that statement are made by name. For the ASSEMBLER, the label field starts in Column 1.

Operation Code Field-The op code field contains either an assembler directive or a machine instruction.

It is a directive of "what to do". Only a limited number of operation codes have been defined and only these predetermined codes are used. Any valid op code may be used as many times as necessary and, except for a few special cases, in any desired sequence. For the ASSEMBLER, the op code field starts in Column 10.

Operand Field-The operand field contains either the data to be acted upon or the location of the data to be acted upon. Where the label field and the op code field are restricted to a fixed syntax, a variable syntax is permitted in the operand field. There are 1, 2, 3 or 4 parts to this field or it is blank, depending on the op code. These four parts are delimited by parentheses or commas and, except in one special case, do not contain embedded blanks. For the ASSEMBLER, the operand field starts in Column 16.

Comment Field-Any unused part of the card up to Columns 72 may be used for comments to aid in understanding of the program. At least one blank is used to separate the end of the operand field from the beginning of the comment field. The content of the comment field has no effect on the assembly.

CODING FORMS

No special coding forms are required, since the ASSEMBLER accepts free form inputs. For convenience, the following punched card format is used for both MODE 1 and MODE 2 programming:

| | |
|---|---|
| Columns 1-5 | Label, if any |
| Columns 6-9 | Blank |
| Columns 10-14 | Mnemonic for instruction or assembler directive |
| Column 15 | Blank |
| Columns 16-72 | Variable field; operands separated by commas, or in some cases, parentheses |
| Columns 35-72 | Comments field used extensively where variable field does not exceed Column 33 |
| Columns 73-80 | Ignored by ASSEMBLER; may be used for sequencing or comments if desired. |

REPRESENTATION OF 2540 COMPUTER MEMORY LAYOUT

This representation depicts the memory layout of 2540 computers as implemented in the COMPUTER CONTROL SYSTEM.

Also indicted are the preparatory steps required to build and load such a 2540 computer from prestored programs on the host computer of the system.

This representation may be used as a guide to the operation of the computer in control of an assembly line module (or modules).

This representation is parametrically described in the symbol tables SGTAB (for MODE 1 supervisory programs, interrupt response, and special inclusion subroutines) and SGMD2 (for MODE 2 procedures and MDATA blocks). In general, the programmer need not worry about specific address or bit assignments, as he may symbolically reference these values through use of the appropriate symbol table.

The 2540 COMPUTER MEMORY LAYOUT is summarized in TABLE XI.

TABLE XI

2540 COMPUTER MEMORY LAYOUT

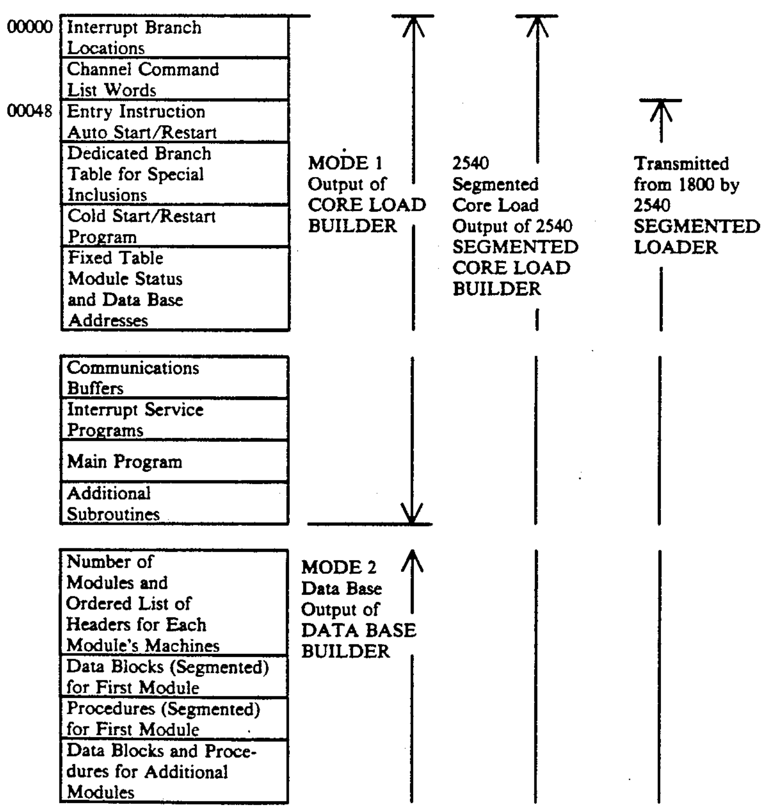

TABLE XI-continued

2540 COMPUTER MEMORY LAYOUT

| | |
|---|---|
| | Bit Flag Area for All Machines by Module (One computer word assigned per segment) |
| | Unused |
| | 2540 BOOTSTRAP LOADER |
| 16383 | Unused |

Entered into 2540 by Automatic Paper Tape BOOTSTRAP Feature or Equivalent

INTERRUPT LEVEL ASSIGNMENTS

The 2540 computers have 16 priority interrupt levels designated 0, 1, 2, . . . , 15, which reference core addresses 00000, 0002, 0004, . . . . , 00030, respectively. The assignments in use in the described embodiment are shown in Table XII.

TABLE XII

| Interrupt Level | Program Function | |
|---|---|---|
| 0 | Power Failure | |
| 1 | ATC Complete (any channel, 4-7) | |
| 2 | Arithmetic Fault and Internal Errors | |
| 3 | Real Time Clock (interval timer) | |
| 4 | I/O Channel 7 - RCCA Communications Network | |
| 5 | I/O Channel 6 - Unused | |
| 6 | I/O Channel 5 - Unused | |
| 7 | I/O Channel 4 - Card Reader (alternative initial load) | |
| 8 | Interval Timer 1 - Module/Machine Service | |
| 9 | Interval Timer 2 - 1800-RCCA Polling | |
| 10 | Interval Timer 3 - Workpiece Reader | |
| 11 | Unused | |
| 12 | Unused | |
| 13 | Unused - Core Parity Failure | |
| 14 | TTY Attention | Alternative Alarm |
| 15 | TTY Data Transfer Complete | Message Output |

MODE 1 programs are generated for response to each of these interrupts. They are mentioned by name on control cards recognized by the CORE LOAD BUILDER; otherwise, they are not included in a core load.

PROGRAMMING THE 2540 COMPUTER

In the COMPUTER CONTROL SYSTEM, the emphasis is on speed of program development including program testing. This is facilitated by the use of punched cards as the program media by extensive use of de-bugging facilities and the program assembler and by extensive use of de-bugging facilities on the 2540 itself.

The design of the programming system and the modularity which is inherent in this design contributes to successful program development. Since it is easy to isolate functionally the requirements of control, it is possible to organize programs to imitate logically these functions.

The programmer's responsibility is to utilize the tools offered in this programming system to describe the functions required.

The tools available to the programmer are:

1. The instruction set implemented in the assembler. The instruction set may begrouped as follows:
   a. Special Basic Instructions-This set includes the bit pushing and MODE 2 type instructions. It is used primarily for development of MODE 2 programs.
   b. 2540 MODE 1 Instructions-In this group, the original unmodified 2540 computer instructions are employed and reflect the true architecture of the computer. These instructions supplement the special basic instructions which, in general, are executable in MODE 1. This class of instructions is used primarily for development of supervisory programs in the 2540 computer.
   c. 1800 Computer Instructions-For convenience in converting programs which are operational on the 1800, an extended set of mnemonics is available which imitate the 1800 computer architecture and instruction set.
   d. Special Instruction Simulation-An important feature of the COMPUTER CONTROL SYSTEM is the ability to experimentally write and implement subroutines which imitate hardware instructions prior to implementation in hardware via a programmable ROM in the 2540 computer. A portion of core memory in the 2540 computer is set aside and dedicated as a branch table. Branch instructions in the branch table provide the link to the appropriate subroutine. Special mnemonics are defined as change mode instructions referencing locations in the branch table.
2. Definition of instruction sets. In the event that the programmer discovers a functional relationship not implemented in the instruction set, he may redefine the set to implement best the function he requires.
3. Multiple symbol tables. The ASSEMBLER may be used to support symbol tables tailored specifically to program requirements; for instance, the ASSEMBLER may be used to define a symbol table containing the special basic instruction set and those symbols required to described workpiece transfer between segments and some special functions required to implement special features required by MODE 2 machine control procedures.
4. Assembler Pseudo-Instructions and Keywords-The ASSEMBLER itself recognizes a typical set of pseudo-instructions for definition of program constants, definition of entry points to subroutines, mode declaration statements, and the like. Also, a special group of keywords applicable and architecture of the 2540 computer are implemented in the assembler.

SPECIAL (BASIC) INSTRUCTIONS

The special group of instructions is described on the following pages, These instructions are valid in both MODE 1 and MODE 2 as given in TABLE XII.

TABLE XIII

| MNEMONIC | MODE 1 | MODE 2 | DESCRIPTION |
|---|---|---|---|
| STOR | X | X | Store MODE 2 Register |

TABLE XIII-continued

| MNEMONIC | MODE 1 | MODE 2 | DESCRIPTION |
|---|---|---|---|
| LOAD | X | | Load MODE 2 Register |
| JUMP | | X | Unconditional Jump |
| SENSE | X | X | Test Digital Input |
| TURN | X | X | Digital Output |
| SET | X | X | Set Software Flag |
| SJNE | X | X | Digital Input Compare/ Conditional Jump |
| DIDO | X | X | Digital Input Compare/ Conditional Digital Output |
| TEST | X | X | Test Software Flag |
| WAIT | X | X | Wait |
| CHMD | X | X | Change Mode |
| COMP | X | X | Compare Data |
| TWTL | X | X | Test Within 2 Limits |
| TJNE | X | X | Software Flag Compare/ Conditional Jump |
| CHNG | X | X | Change Memory Location |
| INPF | X | X | Input Fixed Number of Bits |
| OUTPF | X | X | Analog Output |
| DELAY | | X | Time Delay (see CHNG description) |
| LDMP | X | | Load Memory Protect Register (see LOAD description) |
| JUMPI | | X | Jump Indirect (see JUMP description) |
| INCR | X | X | Increment Memory |
| NOOP | | X | No Operation (see WAIT description) |

The basic set of special instructions may be expanded as desired.

The notation for the description of the special instruction executions is given in TABLE XIIIa.

TABLE XIIIa

| | |
|---|---|
| MDB | Machine Data Base Register |
| MPB | Machine Procedure Base Register |
| CRB | Communications Register Base Register |
| SFB | Software Flags Base Register |
| EC | Event Counter (MODE 2) |
| PC | Program Counter (MODE 1) |
| CAR | Communications Address Register |
| DIR | Direction of I/O<br>0 - output from computer<br>1 - input to computer |
| SC | Sequential Bit Counter |
| SR | Sequential Register |
| CDR | Communications Data Register |
| $R_{BP}$ | Bit Pushing Register (MODE 2) |

INSTRUCTION: STORE-Store Register, FIG. 8A.

| INSTRUCTION EXECUTION MODE 1 | MODE 2 |
|---|---|
| $((R_{BP})) \rightarrow ((N))$<br>$(PC) + 2 \rightarrow (PC)$ | $((R_{BP})) \rightarrow ((N)) + (MDB))$<br>$(EC) + 2 \rightarrow (EC)$ |

EXECUTION:

MODE 1

The contents of register $R_{BP}$ is stored into memory location N.

MODE 2

The contents of register $R_{BP}$ is stored into the memory location specified by (N)+(MDB).

In this mode, only the least significant 10 bits of N are utilized.

INSTRUCTION: LOAD-Load Register, FIG. 8B.

| INSTRUCTION EXECUTION | |
|---|---|
| MODE 1 | |
| $(P) = 0$ | $(P) = 1$ |
| $((N)) \rightarrow ((R_{BP}))$ | $((N)) \rightarrow (MPR)$ |
| $(PC) + 2 \rightarrow (PC)$ | $(PC) + 2 \rightarrow (PC)$ |
| MODE 2 | |
| $((N) + (MDB)) \rightarrow ((R_{BP}))$ | |
| $(EC) + 2 \rightarrow (EC)$ | |

EXECUTION:

MODE 1

When P=0, the contents of memory location N is loaded into the register specified by $R_{BP}$.

When P=1, the contents of memory location N is loaded into the Memory Protect Register (MPR).

MODE 2

The contents of memory location (N)+(MDB) is loaded into the register specified by $R_{BP}$.

In this mode only the 10 least significant bits of N are utilized. Either the program counter or the event counter is incremented by two, depending on the mode.

INSTRUCTION: JUMP-Unconditional Jump, FIG. 8C.

| INSTRUCTION EXECUTION MODE 1 | MODE 2 | |
|---|---|---|
| $(N) \rightarrow (PC)$ | $T1 = 1$<br>$(N) \rightarrow (EC)$ | $T1 = 0$<br>$((N) + (MDB)) \rightarrow (EC)$ |

EXECUTION:

MODE 1

Bits 16-31 of the instruction word are loaded in to the program counter.

MODE 2

If (T1)=1 the contents of the N field is loaded into the Event Counter.

If (T1)=0 the contents of the memory location specified by (N)+(MDB) is loaded into the Event Counter.

Special comment is required for JUMP and JUMP1; the ASSEMBLER inserts (T1)=0 for the JUMP1 and (T1)=1 for the JUMP instructions.

INSTRUCTION: SENSE-Test Digital Input, FIG. 8D.

| INSTRUCTION EXECUTION | |
|---|---|
| $(M) + (CRB) \rightarrow (CAR)$ | |
| $1 \rightarrow (DIR)$ | |
| CRU DATA $\rightarrow$ (CDR) | |
| $(T2) = (CDR)$ | $(T2) \neq (CDR)$ |
| MODE 1 $(PC) + 2 \rightarrow (PC)$ | MODE 1 $(PC) + 4 \rightarrow (PC)$ |
| MODE 2 $(EC) + 2 \rightarrow (EC)$ | MODE 2 $(PC) + 2 \rightarrow (PC)$<br>$1 \rightarrow (MODE)$ |

EXECUTION:

The contents of the M field is added algebraically to the contents of the CRB to obtain the effective address of the communications register. An input digital data transfer is initiated (CRU DATA→(CDR)) and the contents of the CDR is compared with the contents of the T2 field. When in MODE 1, if the data are equal the program counter is incremented by two; if not equal, it is incremented by four. When in MODE 2, if the data are equal the event counter is incremented by two; if not equal, the program counter is incremented by two and the operating mode switched to MODE 1.

INSTRUCTION: TURN-Digital Output, FIG. 8E.

| INSTRUCTION EXECUTION | |
|---|---|
| (N) + (CRB) → (CAR) | |
| (T1) → (CDR) | |
| 0 → (DIR) | |
| MODE 1 | (PC) + 2 → (PC) |
| MODE 2 | (EC) + 2 → (EC) |

EXECUTION:

The contents of the N field is added algebraically to the contents of the CRB to obtain the effective address of the communications register. The CDR is loaded with the content of the T1 field and an output digital data transfer is initiated. Either the program counter or the event counter is incremented by two, depending on the mode.

INSTRUCTION: SET-Set Software Flag, FIG. 8F,

| INSTRUCTION EXECUTION | |
|---|---|
| (T1) → ((N) + (SFB))$_{(B)}$ | |
| MODE 1 | (PC) + 2 → (PC) |
| MODE 2 | (EC) + 2 → (EC) |

EXECUTION:

The contents of the N field is added algebraically to the contents of the SFB to obtain the effective address of the memory word containing the bit to be altered. The contents of the T1 field is stored into the memory word at the bit position specified by the contents of the B field, B=0000 indicating bit position '0'. Either the program counter or the event counter is incremented by two, depending on the mode.

INSTRUCTION: SJNE-Digital Input Comparison/-Conditional Jump, FIG. 8G.

| INSTRUCTION EXECUTION | |
|---|---|
| (M) + (CRB) → (CAR) | |
| 1 → (DIR) | |
| CRU DATA → (CDR) | |
| (T2) = (CDR) | (T2) ≠ (CDR) |
| MODE 1 (PC) + 2 → (PC) | MODE 1 (N) → (PC) |
| MODE 2 (EC) + 2 → (EC) | MODE 2 (N) → (EC) |

EXECUTION:

The contents of the M field is added algebraically to the contents of the CRB to obtain the effective address of the communications register. An input digital data transfer is initiated (CRU DATA→(CDR)) and the contents of the CDR is compared with the contents of the T2 field. When in MODE 1, if the data are equal the program counter is incremented by two; if not equal, the program counter is loaded with the contents of the N field. When in MODE 2, if the data are equal the event counter is incremented by two; if not equal, the event counter is loaded with the contents of the N field.

INSTRUCTION: DIDO-Digital Input Comparison/Conditional Digital Output FIG. 8H.

| INSTRUCTION EXECUTION | |
|---|---|
| (M) + (CRB) → (CAR) | |
| 1 → (DIR) | |
| CRU DATA → (CDR) | |
| (T2) = (CDR) | (T2) ≠ (CDR) |
| (N) + (CRB) → (CAR) | MODE 1 (PC) + 4 → (PC) |
| 0 → (DIR) | MODE 2 (PC) + 2 → (PC) |
| (T1) → (CDR) | 1 → (MODE) |
| MODE 1 (PC) + 2 → (PC) | |
| MODE 2 (PC) + 4 → (EC) | |

EXECUTION:

The contents of the M field is added algebraically to the contents of the CRB to obtain the effective address of the communications register. An input digital data transfer is initiated (CRU DATA→(CDR)) and the contents of the CDR is compared with the contents of the T2 field. When in MODE 1, if the data are not equal the program counter is incremented by four; if equal, the CDR is loaded with the content of the T1 field, an output digital data transfer to the communications register at the effective address a specified by the N field and the CRB is initiated, and the program counter is incremented by two. When in MODE 2, if the data are not equal the program counter is incremented by two and the operating mode switched to MODE 1; if equal, the above output digital data transfer is initiated and the event counter is incremented by two.

INSTRUCTION: TEST-Test Software Flag, FIG. 8I.

| INSTRUCTION EXECUTION | |
|---|---|
| ((M) + (SFB))$_{(B)}$ = (T2) | ((M) + (SFB))$_{(B)}$ ≠ (T2) |
| MODE 1 (PC) + 2 → (PC) | MODE 1 (PC) + 4 → (PC) |
| MODE 2 (EC) + 2 → (EC) | MODE 2 (PC) + 2 → (PC) |
| | 1 → (MODE) |

EXECUTION:

The contents of the M field is added algebraically to the contents of the SFB to obtain the effective address of the memory word containing the bit to be tested. The contents of the T2 field is compared with the contents of the memory word at the bit position specified by the contents of the B field, =0000 indicating bit position '0'. When in MODE 1, if the contents are equal, the program counter is incremented by two; if not equal, the program counter is incremented by four. When in MODE 2, if the contents are equal, the event counter is incremented by two; if not equal, the program counter is incremented by two and the operating mode is switched to MODE 1.

INSTRUCTION: WAIT-Wait for NO-OP, FIG. 8J.

| INSTRUCTION EXECUTION | |
|---|---|
| (T1) = 0 + RESUME = 1 | (T1) = 1 · RESUME = 0 |
| MODE 1 (PC) + 2 → (PC) | MODE 1 (PC) + 0 → (PC) |
| MODE 2 (EC) + 2 → (EC) | MODE 2 (EC) + 0 → (EC) |

EXECUTION:

If (T1)=0 this instruction acts as a NO-OP.

If (T1)=1, instruction execution will be repeated until the Resume Switch is depressed. When the Resume Switch is depressed either the program counter or the event counter will be incremented by two, depending on the mode.

INSTRUCTION: CHMD-Change Mode, FIG. 8K.

| INSTRUCTION EXECUTION | |
|---|---|
| MODE 1 → | 0 (MODE) |
| MODE 2 | (N) → (PC) |
| | 1 → (MODE) |

EXECUTION:

The contents of the N field is loaded into the program counter when in MODE 2. The operating mode is changed to the opposite mode.

INSTRUCTION: COMP-Compare Data, FIG. 8L.

| INSTRUCTION EXECUTION | | |
|---|---|---|
| If (T1) = 0 | | |
| ((N) + (MDB)) = test value | | |
| If (T1) = 1 | | |
| $(N)_{signed\ extended}$ = test value | | |
| data value = ((M) + (MDB)) | | |
| If | MODE 1 | MODE 2 |
| data < test value | PC + 2 → PC | EC + 2 → EC |
| data > test value | PC + 4 → PC | EC + 4 → EC |
| data = test value | PC + 6 → PC | EC + 6 → EC |

EXECUTION:

A data word contained in memory is algebraically compared with a test value specified by the instruction, and the counter in control, ether the PC or the EC is incremented to reflect the result of the comparison.

The data word is the contents of the 16 bit memory word at the address given by the sum of the M field of the instruction and the MDB.

The test value may be immediate data (i.e., contained in the instruction itself) or contained in memory. If (T1)=1, then the test value is the 10 bits of the N field with the S field propagated to the left to form a signed 16 bit number. If (T1)=0, then the test value is the 16 bit memory word at the address given by the sum of the N field and the MDB.

The counter in control is incremented to reflect the result of the comparison. In MODE 1, the program counter is incremented; in MODE 2, the event counter is incremented.

If the data value is greater than the test value, the counter in control is incremented by 4. If the data value is equal to the test value, the appropriate counter is incremented by 6. If the data value is less than the test value, the counter is incremented by 2.

INSTRUCTION: TWTL-Test Within Two Limits, FIG. 8M.

| INSTRUCTION EXECUTION | | |
|---|---|---|
| data value = ((M) + (MDB)) | | |
| upper limit = ((N) + (MDB)) odd | | |
| lower limit = ((N) + (MDB)) even | | |
| data < lower limit | PC + 2 → PC | EC + 2 → EC |
| data > upper limit | PC + 4 → PC | EC + 4 → EC |
| lower limit ≦ data ≦ upper limit | PC + 6 → PC | EC + 6 → EC |

EXECUTION:

A data word contained in memory is algebraically compared with two limits in memory, and the counter in control, either the PC or the EC, is incremented to reflect the result of the comparisons.

The data word is the contents of the 16 bit memory word at the address given by the sum of the M field of the instruction and the MDB.

The two limits for the comparison are contained in a consecutive even address-odd address pair of 16 bits words in memory. The address given by the sum of the N field and the MDB is forced even by ignoring the LSB. The 16 bit word at the resulting even address is the lower limit. The contents of the next higher odd addressed word is the upper limit.

The counter in control is incremented to reflect the comparison. In MODE 1, the program counter is incremented; in MODE 2, the event counter is incremented.

If the data word is more positive than the upper limit, the counter in control is incremented by 4. If the data value is equal to or between the limits, the counter is incremented by 6. If the data value is less positive than the lower limit, the counter is incremented by 2.

INSTRUCTION: TJNE-Software Flag Comparison/Conditional Jump, FIG. 8N.

| INSTRUCTION EXECUTION | |
|---|---|
| $(T2) = ((M) + (SFB))_{(B)}$ | $(T2) \neq ((M) + (SFB))_{(B)}$ |
| MODE 1 (PC) + 2 → (PC) | MODE 1 (N) → (PC) |
| MODE 2 (EC) + 2 → (EC) | MODE 2 (N) → (EC) |

EXECUTION:

The contents of the M field is added algebraically to the contents of the SFB to obtain the effective address of the memory word containing the bit to be compared. The contents of the T2 field is compared with the contents of the memory word at the bit position specified by the contents of the B field, B=0000 indicating bit position '0'. When in MODE 1, if the contents are equal, the program counter is incremented by two; if not equal, the program counter is loaded with the contents of the N field. When in MODE 2, if the contents are equal, the event counter is incremented by two; if not equal, the event counter is loaded with the contents of the N field.

INSTRUCTION: CHNG-Change Memory Location, FIG. 8O.

| INSTRUCTION EXECUTION | |
|---|---|
| T1 = 0 | T1 = 1 |
| ((N) + (MDB)) → ((M) + (MDB)) | $(N)_{(SIGNED)}$ → ((M) + (MDB)) |
| (J) = 0 | (J) = 1 |
| MODE 1 (PC) + 2 → (PC) | MODE 1 (PC) + 2 → (PC) |
| MODE 2 (EC) + 2 → (EC) | MODE 2 (PC) + 2 → (PC) |

EXECUTION:

The memory location specified by the algebraic sum of the M field and the MDB is loaded with the contents of the memory location specified by the algebraic sum of the N field and the MDB.

If (T1)=1, then the ten bits of the N field are treated as immediate data, the S field being propagated to the left to provide a signed, 16 bit data word.

When in MODE 1, the program counter is incremented by two,

When in MODE 2, and (J)=0, the event counter is incremented by two; if (J)=1, the program counter and the event counter are each incremented by two and the operating mode switched to MODE 1.

A comment is in order concerning the DELAY instruction. The DELAY is essentially a CHNG with (J)=1 and (T1)=1 with the ASSEMBLER supplying the M field. Thus, there is a dedicated location in each machine data area for the delay count.

INSTRUCTION: INPF-Input Fixed Number of Bits, FIG. 8P.

| INSTRUCTION EXECUTION | |
|---|---|
| (M) + (CRB) ⟶ (CAR) | |
| 1 ⟶ (DIR) | |
| (G (17-20)) ⟶ (SC) | |
| CRU DATA ⟶ (CDR) | This process is |
| (CDR) ⟶ ($SR_{MSB}$) | continued |
| (SC) − 1 ⟶ (SC) | until (SC) = 0 |
| (CAR) − 1 ⟶ (CAR) | |
| 0 ⟶ ($SR_{MSB}$) ← | This process is continued |
| (SC) − 1 ⟶ (SC) | until (SC) = (G (17-20)) |
| (N) + (MDB) ⟶ (JMA) | |
| (SR) ⟶ (JMD) | |
| MODE 1 (PC) + 2 ⟶ (PC) | |
| MODE 2 (EC) + 2 ⟶ (EC) | |

EXECUTION:

The number of bits (up to a maximum of 16) specified by the G field (G=00001 indicating one bit) are transferred sequentially from the CRU. The data from the effective CRU address specified by the algebraic sum of the contents of the M field and the CRB shall be transferred to the core memory word addressed by the algebraic sum of the N field and the MDB. The data from CRU address (M)+(CRB)+1-(G) shall be transferred to bit position 16-(G). Either the program counter or the event counter is incremented by two, depending on the mode.

INSTRUCTION: OUTPF-Output A field, FIG. 8Q.

| INSTRUCTION EXECUTION | | |
|---|---|---|
| G = 0 | G ≠ 0 | |
| $10_{10}$ ⟶ (SC) | (N) + (MDB) ⟶ (JMA) | |
| (N) ⟶ (SR) | (G) —— (SC) | |
| | MEMORY DATA ⟶ (SR) | |
| (M) + (CRB) —— (CAR) | | |
| 0 ⟶ (DIR) ← | | |
| ($SR_{LSB}$) ⟶ (CDR) | | |
| (SC) − 1 ⟶ (SC) | | This process is continued |
| Right Shift ⟶ (SR) | | until |
| (CAR − 1) ⟶ (CAR) | | (SC) = 0 |
| MODE 1 (PC) + 2 ⟶ (PC) | | |

-continued

| INSTRUCTION EXECUTION |
|---|
| MODE 2 (EC) + 2 ⟶ (EC) |

EXECUTION:

The number of bits specified by the G field (G=0001 indicating one bit) are transferred sequentially to the CRU to the a maximum of 16 bits. The data to be transferred is located at the core memory address specified by the algebraic sum of the N field and the MCB. Bit position 15 is transferred to the CRU at CRU address (M)+(MRB). Bit position 16-(G) is transferred to CRU address (M)+(CRB)+1-(G).

If G=00000, then the 10 bits of the N field are treated as immediate data and transferred sequentially, bit 31 to CRU address (M)+(CRB) through bit 22 to CRU address (M)+(CRB)-9.

Either the program counter or the event counter is incremented by two, depending on the mode.

INSTRUCTION: INGR-Increment Memory Location, FIG. 8R.

| INSTRUCTION EXECUTION |
|---|
| T1 = 0 |
| ((N) + (MDB)) + ((M) + (MDB)) → ((M) + (MDB)) |
| T1 = 1 |
| $(N)_{(SIGNED)}$ → ((M) + (MDB)) |
| MODE 1 (PC) + 2 → (PC) |
| MODE 2 (EC) + 2 → (EC) |

EXECUTION:

The memory location specified by the algebraic sum of the M field and the MDB is loaded with the sum of the contents of itself and the contents of the memory location specified by the algebraic sum of the N field and the MDB.

If T1=1, then the 10 bits of the N field are treated as immediate data, the S field being propagated to the left to provide a signed, 16 bit data word.

When in MODE 1, the program counter is incremented by two. When in MODE 2, the event counter is incremented by two.

VARIABLE FIELD SYNTAX

The formal syntax for the special instruction set is somewhat simpler than that of the standard instruction set. The notation used is BNF (Baccus Normal Form).

| | |
|---|---|
| VAR FIELD | ::= <A>\|<R>\|<R>,<A>\|<A>,<A>\|<A> (<V>)\|<A>(<V>),<A,>\|<A>, = <ID> |
| <A> | ::= <CORE ADDRESS>\|<I/O ADDRESS> |
| <R> | ::= <REGISTER NUMBER> |
| <V> | ::= <BIT VALUE>\|<SOFTWARE FLAG VALUE>\|<BIT COUNT> |
| <ID> | ::= <IMMEDIATE DATA> |

Several general rules are applied in forming the variable field:

1. Parentheses are used to group an I/O value with its CRU address.

| Example: | | |
|---|---|---|
| DIDO | 50(0), 100(1) | Send a 1 on CRU output address 100 if CRU input address 50 is 0 |

2. In general, the left to right order reflects the operation taken in the hardware instruction decoding.

| Examples: | | |
|---|---|---|
| SFCJ | 500(1), FALSE | If software flag 500 is 1 continue, else jump to address FALSE |
| TWTL | DATA, LIMIT | Compare the data in location DATA against the two limits given in location LIMIT. Jump to: *+2 < data lower limit *+4 > data upper limit *+6 data within limits |
| DELAY | =500 | Create a time delay of 500 |

3. Immediate data is preceded by an '='.

| Example: | | |
|---|---|---|
| COMP | ADDR, =3 | Compare the contents of ADDR with 3 |

2540 MODE 1 INSTRUCTIONS

This group of instructions supplements the Special (Basic) Instructions and represent the originally implemented 2540 computer's instruction set. These supplementary instructions are given in TABLE XIV.

TABLE XIV

| MNEMONIC | DESCRIPTION |
|---|---|
| AH | Add Half |
| CH | Compare Half |
| DH | Divide Half |
| MH | Multiply Half |
| AMH | Add to Memory Half |
| SH | Subtract Half |
| SFT | Basic Shift Instruction |
| BC | Basic Conditional Branch Instruction |
| BLM | Branch and Link to Memory |
| IOBN | Increment by One and Branch if Negative |
| BAS | Branch and Stop |
| STH | Store Half |
| LH | Load Half |
| LTCH | Load Two's Complement Half |
| LOCH | Load One's Complement Half |
| OH | Or Logical Half |
| RIC | Read Input Command |
| ROC | Read Output Command |
| XSW | Exchange Status Word |
| LSW | Load Status Word |

The notations for Operand derivation and Instruction execution are given in TABLE XIVa.

TABLE XIVa

| NOTATION FOR OPERAND DERIVATION AND INSTRUCTION EXECUTION | |
|---|---|
| MOD = | Modification. |
| PC = | Program Counter Register. |
| DC = | Derived Operand. |
| DA = | Derived Address. |
| IR = | Instruction Register. |
| CA = | Command Address. |
| CR = | Condition Code Register. |
| OFR = | Overflow Register. |

TABLE XIVa-continued

| NOTATION FOR OPERAND DERIVATION AND INSTRUCTION EXECUTION | |
|---|---|
| IM = | Interrupt Mask Register. |
| SW = | Status Word. |
| r = | Content of the R-field of an instruction |
| t = | Content of the T-field of an instruction |
| A = | Content of the A-field of an instruction |
| a = | Register specified by the A-field of an instruction in register modification. |
| (X) = | Content of the memory location X. |
| (r) = | The content of the register r. |
| (r, r + 1) = | The content of the double registers concatenated with r + 1. |
| (t) = | The content of the register specified by the T-field of an instruction. |
| (A)* = | Full memory word specified by the content of the A-field of an instruction. The content of the A-field is forced even by ignoring the least significant bit. |
| [ (A)*] = | Indicates any level of indirect addressing. The final operand is a 16 bit word. |
| [ (A)*]* = | Indicates any level of indirect addressing. The final operand is a 32 bit word. |
| OP = | Operation. |
| (a) = | The content of the register specified by the low order 3 bits of the A-field of an instruction. |
| (A) = | Half memory word specified by the content of the A-field of an instruction. |
| $\overline{X}$ = | The ones complement of X. |

OPERAND DERIVATION 1

Memory Modification Instructions: AMH, STH

| Assembly Code Instruction | Instruction Modification | Derived Address | Comment |
|---|---|---|---|
| IMMEDIATE | | | |
| AMH = r, A | NO MOD | A | |
| AMH = r, A, X(t) | INDEXED | A + (t) | |
| AMH = r, A, C(t) | MASK, CLEAR | A | |
| AMH = r, A, S(t) | MASK, SAVE | A | |
| DIRECT | | | |
| AMH r, A | NO MOD | A | |
| AMH r, A, X(t) | INDEXED | A + (t) | |
| AMH r, A, C(t) | MASK, CLEAR | A | |
| AMH r, A, S(t) | MASK, SAVE | A | |
| INDIRECT | | | |
| AMH r, A, * | NO MOD | [ (A)*] | 1 |
| AMH r, A, X(t), * | INDEXED | [ (A + (t)*] | 1 |

1. The derived operand is the first stage of operand derivation. Operand derivation is reinitiated with A, T, and M-fields obtained from the last derived operand.

INSTRUCTION: AMH, ADD TO MEMORY HALF

| Instruction Modification | Instruction Execution |
|---|---|
| IMMEDIATE | |
| NO MOD | r + (DA) → (DA) |
| INDEXED | r + (DA) → (DA) |
| MASK, CLEAR | [ [ r AND (t)] + [ (DA) AND (t)]] AND (t) → (DA) |
| MASK, SAVE | [ [ [ r AND (t)] + [ (DA) AND (t)]] AND (t)] OR [ (DA) AND (t)] → (DA) |
| DIRECT | |
| NO MOD | r + (DA) → (DA) |
| INDEXED | r + (DA) → (DA) |
| MASK, CLEAR | [ [ (r) AND (t)] + [ (DA) AND (t)]] AND (t) → (DA) |
| MASK, SAVE | [ [ [ (r) AND (t) + (DA) AND (t)]] AND (t)] OR [ (DA) AND (t)] → (DA) |

EXECUTION:

For immediate modifications, the sum of the content of the R-field of the instruction, expanded to 16 bits by left filling with zeros, and the content of the derived address replaces the content of the derived address. For direct modifications the sum of the content of the 16 bits register specified by the R-field of the instructions and the content of the 16 bit derived address replaces the content of the derived address. In the case of MASK, SAVE the unmasked bits of the content of the derived address are not altered.

CONDITION CODE: The condition code register is not altered.

FAULTING: None.

INSTRUCTION: STH, STORE HALF

| Instruction Modification | Instruction Execution |
|---|---|
| IMMEDIATE | |
| NO MOD | r → (DA) |
| INDEXED | r → (DA) |
| MASK, CLEAR | r AND (t) → (DA) |
| MASK, SAVE | [ r AND (t)] OR [ (DA) and ($\bar{t}$)] → (DA) |
| DIRECT | |
| NO MOD | (r) → (DA) |
| INDEXED | (r) → (DA) |
| MASK, CLEAR | (r) AND (t) → (DA) |
| MASK, SAVE | [ (r) AND (t)] OR [ (DA) AND ($\bar{t}$)] → (DA) |

EXECUTION:

For immediate modifications the content of the R-field of the instruction, expanded to 16 bits by left filling with zeros, replaces the content of the derived address. For direct modifications the content of the 16 bit register specified by the R-field of the instruction replaces the content of the derived address. In the case of MASK, SAVE the unmasked bits of the derived address are not altered.

CONDITION CODE: The condition code register is not altered.

FAULTING: None.

OPERAND DERIVATION 2

Arithmetic Instructions: MH, DH
Branch Instructions: BC, BLM, BAS
Input/Output Instructions: RIC, ROC
Loop Instructions: IOBN
Shift Instructions: SFT

| Assembly Code Instruction | Instruction Modification | Derived Operand or Address | Comment |
|---|---|---|---|
| IMMEDIATE | | | |
| M r, =A | NO MOD | A | 1 |
| M r, =A, X(t) | INDEXED | A + (t) | 1 |
| REGISTER | | | |
| M r, R(t) | NO MOD | (a) | 1 |
| DIRECT | | | |
| M r, A | NO MOD | (A) | 1 |
| M r, A, X(t) | INDEXED | (A + (t)) | 1 |
| INDIRECT | | | |
| M r, A, * | NO MOD | [ (A)*] | 2 |
| M r, A, X(t), * | INDEXED | [ (A + (t))*] | 2 |

1. For the Shift Instructions, the five most significant bits of the operand specify the type of shift and the five least significant bits specify the shift count.
2. The derived opeand is the first stage of operand derivation. Operand derivation is reinitiated with A, T and M-fields obtained from the last derived operand.

INSTRUCTION: MH, MULTIPLY HALF

| Instruction Modification | Instruction Execution |
|---|---|
| NO MOD | DO*(r + 1) → (r, r + 1) |
| INDEXED | DO*(r + 1) → (r, r + 1) |

EXECUTION:

The derived operand (multiplicand) is algebraically multiplied by the 16 bit register r+1 (multiplier) specified by the R-field of the instruction and the product is placed into r and r+1. The most significant half of the product is placed in register r and the least significant half in r+1. The signs of r and r+1 are set equal according to the rules for multiplication. Masking is not a defined modification.

CONDITION CODE: 001 Result is greater than zero. 010 Result is equal to zero. 100 Result is less than zero.

FAULTING: Overflow. Caused only by the multiplier and multiplicand combination of $8000_{16}$.$8000_{16}$. the condition code is set to $100_2$ while registers r and r+1 retain their old value.

INSTRUCTIONS: DH, DIVIDE HALF

| Instruction Modification | Instruction Execution |
|---|---|
| NO MOD | (r, r + 1)/DO → (r + 1); REMAINDER → (r) |
| INDEXED | (r, r + 1)/DO → (r + 1); REMAINDER → (r) |

EXECUTION:

The contents of the registers (r,r+1) specified by the R-field of the instruction are divided by the derived operand. The quotient replaces the content of the 16 bit register r+1 and the remainder replaces the content of the 16 bit register r. The sign of the quotient is set according to the rules of division. The sign of the remainder is set equal to the most significant sign of the dividend unless the remainder is all zeros. The sign of the most significant half of the divident (r register) is used as the sign of the dividend. The sign of least significant half of divident (r+1 register) is ignored. Masking is not a defined modification.

CONDITION CODE: 001 Quotient is greater than zero. 010 Quotient is equal to zero. 100 Quotient is less than zero.

FAULTING: Divide Fault: Divide fault occurs when the quotient cannot be represented correctly in 16 bits. A quotient of $8000_{16}$ with a remainder whose absolute value is less than the absolute value of the divisor is representable.

INSTRUCTION: BC, BRANCH ON CONDITION

| Instruction Modification | Instruction Execution |
|---|---|
| NO MOD | If r AND (CR) ≠ 0, then DA → (PC) |
| INDEXED | If r AND (CR) ≠ 0, then DA → (PC) |

EXECUTION:

If the logical AND of the content of the R-field of the instruction and content of the condition code register is not zero, then the derived address replaces the content of the program counter register. If the logical AND is zero, then the next sequential instruction is executed. See TABLE for the extended mnemonics for the branch instruction. CONDITION CODE: The condition code register is not altered.

FAULTING: None.

NOTE: An unconditional transfer ($R=7_8$) is executed in exactly the same manner as described above. Since the condition register always contains a $4_8$,$2_8$, or $1_8$, the branch is always taken.

INSTRUCTION: CLM, BRANCH AND LINK TO MEMORY

| Instruction Modification | Instruction Execution |
|---|---|
| NO MOD | (PC) + 2 → (DA); DA + 2 → (PC) |
| INDEXED | (PC) + 2 → (DA); DA + 2 → (PC) |

EXECUTION:

The content of the program counter register incremented by two replaces the content of the derived address. The derived address incremented by two replaces the content of the program counter register (the (PC) is always even.

CONDITION CODE: The condition code register is not altered.

FAULTING: None.

INSTRUCTION: BAS, BRANCH AND STOP

| Instruction Modification | Instruction Execution |
|---|---|
| NO MOD | If (CR) AND r ≠ 0 then DA → (PC), STOP |
| INDEXED | If (CR) AND r ≠ 0 then DA → (PC), STOP |

EXECUTION:

If the Mode switch on the computer front control panel is in the JUMP STOP mode, and if the logical AND of the content of the R-field of the instruction and the content of the condition code register is not zero, then the derived address replaces the content of the program counter register and the system clock is stopped. If the logical AND is all zeros, then the next sequential instruction is executed. If the Mode switch is not on JUMP STOP, the above results are still valid except the system clock is not stopped.

CONDITION CODE: The condition code is not altered.

FAULTING: None.

INSTRUCTION: RIC, REGISTER INPUT COMMAND

| Instruction Modification | Instruction Execution |
|---|---|
| NO MOD | DA → CA, DATA → (r) |
| INDEXED | DA → CA, DATA → (r) |

EXECUTION:

The 16 bit derived address is furnished to the Command Address (CA) lines to determine what input is enabled. The input data replaces the content of the 16 bit register specified by the R-field of the instruction. Masking is not a defined modification.

CONDITION CODE: The condition code register is always set to $100_2$.

FAULTING: None.

INSTRUCTION: ROC, REGISTER OUTPUT COMMAND

| Instruction Modification | Instruction Execution |
|---|---|
| NO MOD | DA → CA, (r) → OUTPUT |
| INDEXED | DA → CA, (r) → OUTPUT |

EXECUTION:

The 16 bit derived address is furnished to the Command Address (CA) lines to determined what output is enabled, and the content of the 16 bits register specified by the R-field of the instruction is furnished to the I/O. Masking is not a defined modification.

CONDITION CODE: The condition code register is always set to $100_2$.

FAULTING: None.

INSTRUCTION: IOBN, INCREMENT BY ONE AND BRANCH IS NEGATIVE

| Instruction Modification | Instruction Execution |
|---|---|
| NO MOD | (r) + 1 → (r); IF(r) < 0, THEN DA → (PC) |
| INDEXED | (r) + 1 → (r); IF(r) < 0, THEN DA → (PC) |

EXECUTION:

The 16 bit register, r, specified by the R-field of the instruction is incremented by one. If the resulting content of r is negative, the derived address replaces the content of the program counter register. If the resulting content of r is not negative, the next sequential instruction is executed.

CONDITION CODE: The condition code register is not altered.

FAULTING: None.

INSTRUCTION : SFT, SHIFT

EXECUTION:

The derived operand is divided into two fields as illustrated in FIG. 9A. The "shift descriptor" field describes the type of shift to be performed. The "count" field is used to determine how many bit positions are to be shifted. The bits in the shift descriptor field are defined as follows:

| | |
|---|---|
| Bit 0: | = 0; Right shift |
| | = 1; Left shift |
| Bit 1-2: | = 00; Rotate |
| | = 01; Arithmetic shift |
| | = 10; Logical shift |
| Bit 3-4: | = 00; Full word (a 32 bit word is used for rotate and logical shifts when a half word is not indicated). |
| | = 01; Half word |
| | = 11; Double half word |

MASKING: Masking is not a defined modification for any of the shift instructions.

CONDITION CODE: The condition code register is not altered by any of the shift instructions.

FAULTING: Overflow can occur on the arithmetic left shifts (SHL and SLDH).

OPERAND DERIVATION 3

Arithmetic Instructions: LH, LTCH, AH, SH, CH

Logical Instructions:

| Assembly Code Instruction | Instruction Modification | Derived Operand | Comment |
|---|---|---|---|
| IMMEDIATE | | | |
| LH r, = A | NO MOD | A | |
| LH r, = A, X(t) | INDEXED | A + (t) | |
| LH r, = A, C | MASK, CLEAR | A AND (t) | |
| LH r, = A | MASK, SAVE | A AND (t) | |
| REGISTER | | | |
| LH r, R(t) | NO MOD | (a) | |
| LH r, RC(A, t) | MASK, CLEAR | (a) AND (t) | |
| LH r, RS(A, t) | MASK, SAVE | (a) AND (t) | |
| DIRECT | | | |
| LH r, A | NO MOD | (A) | |
| LH r, A, X(t) | INDEXED | (A + (t)) | |
| LH r, A, C(t) | MASK, CLEAR | (A) AND (t) | |
| LH r, A, S(t) | MASK, SAVE | (A) AND (t) | |
| INDIRECT | | | |
| LH r, A, * | NO MOD | [ (A)*] | 1 |
| LH r, A, X(t), * | INDEXED | [ (A + (t))*] | 1 |

1. The derived operand is first stage of operand derivation. Operand derivation is reinitiated with new A, T, and M-fields obtained from the last derived operand.

INSTRUCTION: LH, LOAD HALF

| Instruction Modification | Instruction Execution |
|---|---|
| NO MOD | DO → (r) |
| INDEXED | DO → (r) |
| MASK, CLEAR | DO AND (t) (r) |
| MASK, SAVE | DO OR [ (r) AND (t)] → (r) |

EXECUTION:

The derived operand replaces the content of the 16 bit register specified by the R-field of the instruction. In the case of MASK, SAVE the unmasked bits of the destination register are not altered.

CONDITION CODE: 001 Result is greater than zero. 010 Result is equal to zero. 100 Result is less than zero.

When masking occurs, the condition code is set for masked bits only.

FAULTING: None.

INSTRUCTION: LTCH, LOAD TWO'S COMPLEMENT HALF

| Instruction Modification | Instruction Execution |
|---|---|
| NO MOD | $\overline{\text{DO}}$ + 1 → (r) |
| INDEXED | $\overline{\text{DO}}$ + 1 → (r) |
| MASK, CLEAR | [ $\overline{\text{DO}}$ + 1] AND (t) → (r) |
| MASK, SAVE | [ [ $\overline{\text{DO}}$ + 1] AND (t)] OR [ (r) AND (t)] → (r) |

EXECUTION:

The two's complement of the derived operand replaces the content of the 16 bit register specified by the R-field of the instruction. In the case of MASK, SAVE the unmasked bits of the destination register are not altered.

CONDITION CODE: 001 Result is greater than zero. 010 Result is equal to zero. 100 Result is less than zero.

When masking occurs, the condition code is set for masked bits only.

FAULTING: Overflow. The two's complement of $8000_{16}$ causes overflow.

INSTRUCTION: AH, ADD HALF

| Instruction Modification | Instruction Execution |
|---|---|
| NO MOD | DO + (r) → (r) |
| INDEXED | DO + (r) → (r) |
| MASK, CLEAR | [ DO + (r) AND (t)]] AND (t) → (r) |
| MASK, SAVE | [ [ DO + [ (r) AND (t)]] AND (t)] OR [ (r) AND (t)] → (r) |

EXECUTION:

The algebraic sum of the derived operand and the content of the 16 bit register specified by the R-field of the instruction replaces the content of the 16 bit register specified by the R-field of the instruction. In the case of MASK, SAVE the unmasked bits of the destination register are not altered.

CONDITION CODE: 001 Results are greater than zero. 010 Results are equal to zero. 100 Results are less than zero.

When masking occurs the condition code is set for masked bits only.

FAULTING: Overflow. When two numbers are added whose sum is not representable in a 16 bit word, then overflow is indicated.

INSTRUCTION: SH, SUBTRACT HALF

| Instruction Modification | Instruction Execution |
|---|---|
| NO MOD | (r) − DO → (r) |
| INDEXED | (r) − DO → (r) |
| MASK, CLEAR | [ [(r) AND (t)] − DO] AND (t) → (r) |
| MASK, SAVE | [ [ [ (r) AND (t)] − DO] AND (t)] OR [ (r) AND (t)] → (r) |

EXECUTION:

The algebraic difference between the content of the 16 bit register specified by the R-field of the instruction and the derived operand replaces the content of the 16 bit register specified by the R-field of the instruction. In the case of MASK, SAVE the unmasked bits of the destination register are not altered.

CONDITION CODE: 001 Result is greater than zero. 010 Result is greater than zero. 100 Result is less than zero.

When masking occurs the condition code is set for masked bits only.

FAULTING: Overflow. When two numbers whose difference is not representable in a 16 bit word are subtracted, overflow is indicated.

INSTRUCTION: CH, COMPARE HALF

| Instruction Modification | Instruction Execution |
|---|---|
| NO MOD | DO: (r) |
| INDEXED | DO: (r) |
| MASK, CLEAR | DO: [ (r) AND (t)] |
| MASK, SAVE | DO: [ (r) AND (t)] |

EXECUTION:

The derived operand and the content of the 16 bit register specified by the R-field of the instruction are compared algebraically. When masking occurs, only those bits which are masked are compared.

CONDITION CODE: 001 Content of register is greater. 010 Quantities are equal. 100 Content of register is less, FAULTING: None.

INSTRUCTION: LOCH, LOAD ONE'S COMPLEMENT HALF

| Instruction Modification | Instruction Execution |
|---|---|
| NO MOD | $\overline{DO} \rightarrow (r)$ |
| INDEXED | $\overline{DO} \rightarrow (r)$ |
| MASK, CLEAR | $\overline{DO}$ AND (t) → (r) |
| MASK, SAVE | [ $\overline{DO}$ AND (t)] OR [ (r) AND (t)] → (r) |

EXECUTION:

The one's complement of the derived operand replaces the content of the 16 bit register specified by the R-field of the instruction. In the case of MASK, SAVE the unmasked bits of the destination register are not altered.

CONDITION CODE: 001 Result is mixed ones and zeros. 010 Result is all zeros. 100 Result is all ones.

When masking occurs, the condition code is set by the masked bits only.

FAULTING: None.

INSTRUCTION: OH, OR LOGICAL HALF

| Instruction Modification | Instruction Execution |
|---|---|
| NO MOD | DO OR (r) → (r) |
| INDEXED | DO OR (r) → (r) |
| MASK, CLEAR | [ DO OR (r)] AND (t) → (r) |
| MASK, SAVE | [ [ DO OR (r)] AND (t)] OR [ (r) AND (t)] = DO OR (r) → (r) |

EXECUTION:

The logical sum (OR) of the derived operand and the content of the 16 bit register specified by the R-field of the instruction replaces the content of the 16 bit register specified by the content of the R-field of the instruction. In the case of MASK, SAVE the unmasked bits of the destination register are not altered.

CONDITION CODE: 001 Result is mixed ones and zeros. 010 Result is all zeros. 100 Result is all ones.

When masking occurs, the condition code is set by the masked bits only.

FAULTING: None.

OPERAND DERIVATION 4

Status Word Instructions: XSW, LSW

| Assembly Code Instruction | Instruction Modification | Derived Operand | Comment |
|---|---|---|---|
| DIRECT | | | |
| XSW r, A | NO MOD | (A)* | 1 |
| XSW r, A, X(t) | INDEXED | (A + (t))* | 1 |
| INDIRECT | | | |
| XSW r, A, * | NO MOD | [ (A)*]* | 2 |
| XSW r, A, X(t). * | INDEXED | [ (A + (t))*]* | 2 |

1. The derived operand is two 16 bit words located at [ DA] and [ DA + 1].
2. The derived operand is first stage in operand derivation. Operand derivation is reinitiated with new A, M, and T-fields obtained from the last derived operand.

INSTRUCTION; XSW: EXCHANGE STATUS WORD

EXECUTION:

The derived operand is two 16 bits halfwords which contain two pointers, $P_1$ and $P_2$. $P_2=(DA)$, $P_1=(DA+1)$. $P_2$ must be on an even boundary as illustrated in FIG. 9B.

$P_1$ is used to define where the present SW information is to be stored and $P_2$ is used to define where the new SW information is to be found. The variations for XSW are:

a. r=0

The content of SW, words 1, 2, 3 and 4, replaces the content of the four consecutive memory locations beginning at the memory location defined by $P_1$. The content of the four consecutive locations beginning at the memory location defined by $P_2$ replaces the content of SW, words 1, 2, 3 and 4.

b. r=1

The content of words 1 and 2 of SW replace the content of word 1 and 2 at memory location defined by $P_1$. The content of the two words at the memory location defined by $P_2$ replaces the SW words 1 and 2. Words 3 and 4 are neither stored nor altered.

Masking is not a defined modification.

INSTRUCTION: LSW: LOAD STATUS WORD

EXECUTION:

The derived operand is two 16 bit halfwords which contain a pointer $P_1$ in the second word. The first word must start on an even boundary as illustrated in FIG. 9C.

The $P_1$ pointer is used to define the memory location where the new SW information is to be found. The variations for LSW are:

a. r=0

The content of the four consecutive 16 bit data words beginning at the memory location defined by $P_1$ replaces the content of the SW, words 1 through 4.

b. r=1

The content of the two consecutive words at the memory location defined by $P_1$ replaces the content of the words 1 and 2 of SW. Words 3 and 4 are not altered.

Masking is not a defined modification.

VARIABLE FIELD SYNTAX

The left to right order of the variable field reflects the order in which the 2540 performs the operand fetch and instruction execution.

The formal syntax as specified in BNF is as follows:

| | | |
|---|---|---|
| <VAR FIELD> | ::= | <REG>, <OPERAND> [ ,<MOD>] [ ,<INDIRECT>] |
| <REG> | ::= | destination register number |
| <OPERAND> | ::= | <a> = <a> |
| <MOD> | ::= | X(<t>) C(<t>) S(<t>) RC(<a>, <t>) RS(<a>, <t>) |
| <INDIRECT> | ::= | * |
| <a> | ::= | core location, data, or source register number |
| <t> | ::= | modifying register number |

Where [] implies a syntactic option.

Several basic rules are followed in specifying the variable field.

Consider for the standard instruction set:

1. Commas are used to partition the variable field.

2. The destination register is specified first, the operand second, modifiers third, and indirect addressing fourth. Note that this is the order in which the hardware decodes and executes the instruction.

Example:

| | | |
|---|---|---|
| LD | 1,500 | Load register 1 from location 500 |

3. The following modifiers are generally applicable to the standard instruction set.
   X-Indexed
   C-Mask, Clear
   S-Mask, Save
   R-Register
   RC-Register Mask, Clear
   RS-Register Mask, Save Examples:

| | | |
|---|---|---|
| LD | 1,500, X(2) | Load register 1 from location 500 indexed off register 2 |
| CMP | 1, R(2) | Compare register 1 with register 2 |
| ADD | 1, RC (2, 3) | Add register 2 to register 1 using register 3 as a mask |

4. To specify an indirect operand fetch the '*' is used.

Example:

| | | |
|---|---|---|
| BC | 1, END, X(2), * | Branch if condition code is high to END indexed off register 2 and indirect (reinitiated operand derivation) |

Note (as is also indicated in the syntax) that when indirect indexed is specified, indexing occurs first (preindexing).

Special attention should be given the branch instructions and shift instructions.

| | | | |
|---|---|---|---|
| | BC | 7, =LAB1 | Unconditional branch to LAB1 |
| | BC | 7, LAB1 | Unconditional branch to address contained in LAB1 |
| | IOBN | 2, =LAB2 | Incr. reg. 2 and branch not negative to LAB2 |
| LAB3 | BAS | 7, =* | Unconditional branch to LAB3 and stop |
| LAB4 | BAS | 7, *+2, * | Unconditional indirect branch through LAB 4 + 2 and stop |
| | SFT | 1, DESC | Shift reg. 1 as specified by contents of DESC |
| | SFT | 0, =DUM | Shift immediate reg. 0 |
| DUM | EQU | /A805 | Shift left arithmetic 5 |

SIMULATION OF THE 1800 COMPUTER BY THE 2540 COMPUTER

The COMPUTER CONTROL SYSTEM can be made to look like an 1800 computer by using the following instruction set. The 1800 can be thought of as having the following hardware:

| 1800 | 2540 |
|---|---|
| Accumulator | Reg. 7 |
| Extension | 0 |
| XR1 | 1 |
| XR2 | 2 |
| XR3 | 3 |
| XR4 | 4 |
| XR5 | 5 |

-continued

| 1800 | 2540 |
|---|---|
| XR6 | 6 |

Index registers 4, 5, 6 may or may not be used depending on the desired compatibility with the 1800, which uses only three registers.

| | | |
|---|---|---|
| TRAX | 3 | Transfer A-reg. to index reg. 3 |

Special consideration should be given the conditional branch. The condition tested is the condition code and not the A-register, and the user must be sure to perform an operation on the A-register that sets the condition code before writing a condition branch.

| | |
|---|---|
| A MEMBER | Add contents of member to accumulator and |
| BP EXIT | Branch to EXIT if positive. |

Similarly for condition branch were an index register is implied:

| | | |
|---|---|---|
| MDX | 2,=1 | Add 1 to XR2 and |
| BXZ | EXIT | Branch to EXIT if zero. |

The instructions that set the condition code are as follows:
LD
LDX
A
SUB
M
D

The instruction set of the 1800 computer as simulated on the 2540 computer is shown in TABLE XV.

TABLE XV

| MNEMONIC | INSTRUCTION |
|---|---|
| LD | LOAD ACCUMULATOR |
| LDX | LOAD INDEX |
| STO | STORE ACCUMULATOR |
| STX | STORE INDEX |
| A | ADD |
| SUB | SUBTRACT |
| M | MULTIPLY |
| D | DIVIDE |
| AND | LOGICAL AND |
| OR | LOGICAL OR |
| MDX | MODIFY INDEX |
| MIN | MODIFY CORE LOCATION |
| BSI | BRANCH AND STORE PC |
| B | UNCONDITIONAL BRANCH |
| BE | BRANCH EQUAL |
| BH | BRANCH HIGH |
| BL | BRANCH LOW |
| BM | BRANCH MIXED |
| BN | BRANCH NEGATIVE |
| BNE | BRANCH NOT EQUAL |
| BNH | BRANCH NOT HIGH |
| BNL | BRANCH NOT LOW |
| BNM | BRANCH NOT MIXED |
| BNN | BRANCH NOT NEGATIVE |
| BNO | NOT ALL ONES |
| BNP | BRANCH NOT POSITIVE |
| BNZ | BRANCH NOT ZERO |
| BO | BRANCH ALL ONES |
| BP | BRANCH POSITIVE |
| BZ | BRANCH ZERO |
| BXP | BRANCH INDEX POSITIVE |

TABLE XV-continued

| MNEMONIC | INSTRUCTION |
|---|---|
| BXZ | BRANCH INDEX ZERO |
| BXN | BRANCH INDEX NEGATIVE |
| BXNN | BRANCH INDEX NOT NEGATIVE |
| BXNP | BRANCH INDEX NOT POSITIVE |
| SLA | SHIFT LEFT ACCUMULATOR |
| SLT | SHIFT LEFT ACC AND EXTENSION |
| SRA | SHIFT RIGHT ACCUMULATOR |
| SRT | SHIFT RIGHT ACC AND EXTENSION |
| RTE | ROTATE RIGHT ACC AND EXTENSION |
| NOP | NO OPERATION |
| TRAX | TRANSFER ACCUMULATOR TO INDEX |
| TRXA | TRANSFER INDEX TO ACCUMULATOR |
| LDQ | LOAD ACCUMULATOR EXTENSION |
| STQ | STORE ACCUMULATOR EXTENSION |

VARIABLE FIELD SYNTAX

The pure 2540 syntax rules apply to variable field for the 1800 computer but the interpretation of the various elements in the fields is similar to that of the 1800 computer. This fact may be illustrated through the use of examples:

TABLE

| | | |
|---|---|---|
| LD | LOC | Load A-reg. from LOC |
| LD | LOC,X(1) | Load A-reg. indexed |
| LD | LOC,* | Load A-reg. indirect |
| LD | LOC,X(1),* | Load A-reg. indexed indirect |
| LDX | 1,=1 | Load XR1 immediate with 1 |
| LDX | 1,=LOC | Load XR1 with address of LOC |
| LDX | 1,LOC | Load XR1 with contents of LOC |
| STO | Same as LD | |
| STX | 1,LOC | Store XR1 in LOC |
| STX | 1,LOC,* | Store XR1 indirect |
| A | Same as LD | |
| S | Same as LD | |
| M | Same as LD | |
| D | Same as LD | |
| AND | LOC | 'AND' may not be indexed or indirect |
| OR | Same as LD | |
| IOBN | 1,LOC | Increment XR1 by 1, jump zero to LOC |
| MDX | 1,=1 | Modify XR1 by 1 |
| MIN | LOC,=1 | Modify LOC by 1 allowed values are 1-7 |
| BSI | LOC | Branch and save to LOC |
| BSI | LOC,* | Branch and save to ADDR contained in LOC |
| SLA | 3 | Shift A-reg. left 3 places |
| SLT | Same as SLA | |
| SRA | Same as SLA | |
| SRT | Same as SLA | |
| RTE | Same as SLA | |
| NOP | | No operation |

SPECIAL IMPLEMENTATION OF INSTRUCTIONS

This category of instructions was originally conceived to facilitate simulation of hardware instructions prior to implementation. A dedicated portion of memory serves as a branch table. These special mnemonics are implemented as CHMD instructions (see SPECIAL (BASIC) INSTRUCTIONS), which change modes (to MODE 1) and branch to the appropriate location in the branch table, where a branch instruction transfers control to an appropriate subroutine. The subroutine is generated as a MODE 1 program and must be included in the 2540 core load according to the CORE LOAD BUILDER section.

It should be pointed out that the GLOBAL SUBROUTINES are implemented in this fashion, as well as a number of special purpose functions for specific machines. The mnemonic and purpose are listed in TABLE XVI. All those listed are called from and return to MODE 2 procedures.

TABLE XVI

| MNEMONIC | PURPOSE |
|---|---|
| SUBR | Execution of subroutine local to a procedure. |
| RETRN | Return from subroutine local to a procedure. |
| SEND | Queue a message for output. |
| READ | Read a workpiece identification number. |
| FKEY | Input status of function key on CRT display. |
| WCHR | Write character to CRT display. |
| RCHR | Read character from keyboard of CRT display. |
| REQST | Global subr.-request a workpiece from upstream segment. |
| ACKN | Global subr.-acknowledge receipt of workpiece from upstream segment. |
| READY | Global subr.-notify downstream segment of workpiece is ready to transmit. |
| ASSUR | Global subr.-notify downstream segment workpiece is transmitted clear of this segment. |
| CHKOK | Restrict to a specified maximum the count of workpieces present in a specified number of contiguous segments. |
| HUAMI | Identify the procedure segment currently in execution. |

WRITING PROCEDURES FOR MACHINE CONTROL

The assembler directive "equate":

| | | |
|---|---|---|
| VALVE | EQU | 1 |

This line of code tells the ASSEMBLER to assign the value "1" to the label "VALVE". In generating machine code, the ASSEMBLER inserts the value "1" wherever it encounters the label "VALVE". Other examples of the "equate" directive are given below:

| | | |
|---|---|---|
| PC1 | EQU | 1 |
| MOTOR | EQU | 5 |
| BRAKE | EQU | 3 |

There are some common labels that have been predefined which may be used whenever needed, but must not appear in the label field. These standard labels are listed below:

| | | | |
|---|---|---|---|
| Standard Bit Flags | | | |
| GATEA | EQU | 1 | |
| GATEB | EQU | 16 | |
| GATEC | EQU | 17 | |
| GATED | EQU | 32 | |
| TRACK | EQU | 18 | |
| IMAGF | EQU | 19 | |
| RSTRT | EQU | 21 | |
| PRCSS | EQU | 23 | |
| Standard Machine Data Words | | | |
| TIMER | EQU | 0 | |
| MONTR | EQU | 1 | |
| RUN | EQU | 2 | |
| BUSY | EQU | 3 | |
| States | | | |
| LIGHT | EQU | 0 | |
| DARK | EQU | 1 | |
| OPEN | EQU | 0 | |
| CLOSE | EQU | 1 | |
| OFF | EQU | 0 | |
| ON | EQU | 1 | |
| Global Subroutine Symbols | | | |
| SLICE | EQU | 0 | |
| RECPT | EQU | 0 | |
| SAFE | EQU | 0 | |
| UNSAF | EQU | 1 | |
| EXIT | EQU | 0 | |
| MDATA Standard Labels | | | |
| HWMM | EQU | 6 | Machine work area length |
| HWMS | EQU | 9 | Segment work area length |

INSTRUCTIONS DEALING WITH INPUT OR OUTPUT BIT LINES

| | |
|---|---|
| TURN | MOTOR (ON) |

This line of code instructs the computer to transmit a binary "1" to output line number 5. Note that the same coding is generated by the instruction using absolute values instead of symbols.

| | |
|---|---|
| TURN | 5 (1) |
| SENSE | PC1 (LIGHT) |

This line of code instructs the computer to examine input line 1 and determine if it is a binary "0". If the line is "0", the computer goes on to the next instruction; if it is not "0", the computer returns control to the supervisor or MODE 1 program. After each polling period, the same instruction is executed until the line contains a "0" or the machine monitor runs down.

| | | |
|---|---|---|
| HERE | SJNE | PC1 (LIGHT), THERE |
| THERE | JUMP | HOME |

The SJNE instruction means "sense and jump if not equal". In this case, the computer is to jump to "THERE" if PC1, a photocell sensor, is dark. If PC1 is light, it will continue with the next instruction. Note that in this example the computer will go to "THERE" in any case and then to "HOME".

A special instruction will combine a digital input and a digital output.

| | |
|---|---|
| DIDO | PC1 (LIGHT), MOTOR (ON) |

This instruction means "digital input-digital output" and instructs the computer to wait until PC1 is light and then turn the motor on. As long as PC1 is dark, the same instruction is executed once each polling period and the motor is not turned on.

INSTRUCTIONS DEALING WITH SOFTWARE BIT FLAGS

| | |
|---|---|
| SET | GATEA (ON) |

This instruction is analogous to the "TURN" instruction except that a bit flag is effected instead of an output line.

| | |
|---|---|
| TEST | GATEA (ON) |

This instruction is analogous to the "SENSE" instruction except that a bit flag is examined instead of an input line.

| | |
|---|---|
| TJNE | GATEA (ON), THERE |

The TNJE instruction means "test and jump if not equal" and is analogous to the SNJE instruction, but these instructions deal with I/O lines.

| | |
|---|---|
| TURN | MOTOR (ON) |
| SENSE | PC1 (LIGHT) |
| SJNE | PC1 (LIGHT), THERE |

The following instructions deal with bit flags:

| | |
|---|---|
| SET | GATEA (ON) |
| TEST | GATEA (ON) |
| TJNE | GATEA (ON), THERE |

The instructions dealing with I/O lines and bit flags should not be confused.

The following instructions deal with data manipulation within the computer:

| | |
|---|---|
| CHNG | DATA1, DATA2 |

This instruction tells the computer to move the contents of DATA2 into DATA1. Another form of the instruction is shown below:

| | |
|---|---|
| CHNG | DATA1, = 10 |

This instruction tells the computer to place the value "10" into DATA1.

| | |
|---|---|
| INCR | DATA1, DATA2 |

This instruction tells the computer to add the contents of DATA2 to the contents of DATA1 and place the sum in DATA1. It can also use immediate data.

| | |
|---|---|
| INCR | DATA1, = 10 |

This adds the value "10" to the contents of DATA1.

| | |
|---|---|
| COMP | DATA1, DATA2 |

This instruction tells the computer to compare the contents of DATA1 with the contents of DATA2. This instruction changes the program execution flow depending on the results of the comparison.

If DATA1 is less than DATA2, the next instruction is executed;

If DATA1 is greater than DATA2, one instruction is skipped;

If DATA1 is equal to DATA2, two instructions are skipped.

This instruction can use immediate data.

| | |
|---|---|
| COMP | DATA1, = 10 |

The same comparison results are obtained.

| | |
|---|---|
| DELAY | MTIME |

This instruction introduces a delay in the execution of the program. The length of the delay is determined by the value of MTIME and is an integral number of tenths of a second.

| | |
|---|---|
| DELAY | = 20 SECS |

Immediate data may be specified as above and the keyword "SECS" illustrates the only case in which a blank may be embedded in the operand field. A few other keywords, such as "MSECS" may be used in the same manner.

| | |
|---|---|
| JUMP | THERE |

The "JUMP" instruction has been used above, which causes the proper sequence of program execution to be altered. The next instruction to be executed will be at location "THERE" instead of the next instruction in line.

The next four instructions are the supervisor calls that invoke the global subroutines for workpiece transport between machines and between segments.

| | |
|---|---|
| REQST | SLICE (PC1) |

This call is used when a segment is ready to accept a new workpiece for processing. It also informs the computer that it is to use sensor PC1 to determine when a workpiece is present. Two different returns are used from the subroutine. If an unexpected workpiece appears at the sensor, such as a photocell, the routine returns to the first instruction following the call. If the upstream segment has indicated that it is ready to send a workpiece, the routine returns to the second instruction following the call so that proper preparation may be made for the expected workpiece.

If there is no photocell or other sensor available for sensing the presence of a workpiece, the calling sequence is as follows:

| | |
|---|---|
| REQST | SLICE (0) |
| NOOP | |

Here, the zero indicates to the subroutine that no photocell is available. Since an unexpected workpiece could not be detected even if it was present, the routine will never return to the first instruction following the call. The "NOOP" instruction, which stands for "no operation", provides a dummy instruction for the first return.

| | |
|---|---|
| ACKN | RECPT (PC1) |

This call is used to acknowledge that the expected workpiece has arrived safely. Upon safe arrival, the routine returns to the first instruction following the call. If, however, the upstream segment informs the routine that the workpiece has been lost, the routine returns to the second instruction following the call so that the input preparations can be reset.

"Acknowledge receipt" also uses an argument of zero to indicate that no sensor is available, but its return conventions are not altered.

| | |
|---|---|
| ACKN | RECPT (0) |
| READY | SAFE RELEASE |

This call is used after a workpiece is finished with its processing in a given segment. It informs the downstream segment that a workpiece is waiting for it. The routine returns to the first instruction following the call when the downstream segment indicates that it is ready to accept the workpiece. Preparations to ship the workpiece can then be made.

The "ready safe release" call indicates that the station doing the slice processing is a safe one. The workpiece can wait there after processing as long as necessary with no danger. Some stations, however, are not safe. The workpiece must be released as soon as its processing is finished or it will be damaged. In this case, a different call is used.

| | |
|---|---|
| READY | UNSAF RELEASE |

If the workpiece is not successfully released within the time span provided by the monitor, the machine will fail.

| | |
|---|---|
| ASSUR | EXIT (PC1) |

This routine is used to assure that the workpiece does, in fact, leave normally. After the workpiece has left, the routine returns to the first instruction following the call. If no photocell is available, a zero argument is used.

| ASSUR | EXIT (0) |
|---|---|

The routine now can only assume that the workpiece left properly. It makes this assumption and returns to the calling program.

Mode 2 subroutines may also be used with the following two instructions:

| SUBR | A |
|---|---|

where "A: is the location of the desired subroutine, and

| RETRN |
|---|

This instruction is used to return to the main part of the program at the completion of the subroutine. Subroutines may not be nested - that is, one subroutine may not call another subroutine.

The next instruction is an assembler directive and tells the assembler that the lines of code following it are a template of the machine data.

| MDUMY | HWMM + 2 * HWMS |
|---|---|

It also tells the assembler to reserve a block of core large enough for the machine and segment work areas for a machine with two segments. The number in the operand field is equal to the number of segments.

The data words referenced above are also included.

| | | |
|---|---|---|
| DATA1 | DC | 1 |
| DATA2 | DC | 2 |
| MTIME | DC | 20 SECS |

The last line of code in any program is the assembler directive "END".

EXAMPLE OF THE OPERATION OF A SPECIFIC MACHINE

The Loader machine, utilized, for example, to load semiconductor slices (as the workpieces) into a carrier illustrates a number of diverse features of the present system. It is a multi-work station machine (four work stations with four corresponding work station program segments); it is a terminal machine in a module (there is no downstream neighbor work station for last work station); the pneumatic transport mechanism is common to the machine's work stations (shared among them); and it features a removable workpiece carrier which is manually replaced with an empty.

Referring to FIG. 10, the first two work stations 1000 and 1001 are queues, each comprising a bed section 1002 large enough to hold a workpiece 1003, a photocell and sensor 1004 for detecting workpiece presence, a brake 1005 for keeping the workpiece in place, and pneumatic transport mechanism 1006. A first program segment, shown in TABLE XVa, controls the first work station 1000. A second program segment, shown in TABLE XVb, controls the second work station 1001.

The third work station 1008 is comprised of a workpiece carrier platform 1007 which can be moved vertically up and down, a tongue extension 1019 on the bed section on which the workpiece travels with a brake 1009 at the tongue to stop and position a workpiece precisely in a carrier 1010, the shared pneumatic transport mechanism 1006 and photocell sensors for detection of carrier presence 1011, carrier empty 1012, platform at top position 1013, platform at bottom position 1014, and each incremental position of carrier 1015. Carrier 1010 itself is slotted 1016 so that it holds one workpiece 1003 in each slot. When an empty carrier 1010 is placed on platform 1007, the platform is driven to bottom. As each workpiece is loaded, platform 1007 is raised one increment to the next empty slot. When the carrier is filled, the platform is in the top position. In operation, the queue work stations 1000 and 1001 are normally empty, except when the time required for operator replacement of a full carrier is longer than the time it takes a new workpiece to reach the machine. A third program segment, TABLE XVc, corresponds to this third work station 1008.

A fourth program segment, TABLE XVd, is used to monitor carrier 1010 presence, and receive a new carrier when one is removed. This is a departure from normal practice, since there is no corresponding fourth work station and illustrates the flexibility of the modular functional use of the system components. A light 1017 on the machine is turned on to indicate to the operator that an empty carrier is required.

A subroutine CHECK AIR of TABLE XVe, is used by the first three segments to facilitate use of the shared pneumatic transport mechanism. A data word is incremented by each segment as it turns on the transport, and decremented by calling this subroutine. When all segments are finished with transport, the data word is decremented to zero and the transport mechanism turned off.

The first three segments, TABLES XVa–c, follow the general segment flow chart depicted in FIG. 1. Note that no processing control, TABLE XVa, is required at the first work station, since only workpiece movement is involved. The second segment involves communication with the fourth segment to prevent workpiece movement during carrier replacement, and this requirement is reflected in the flow chart of TABLE XVb. The third work station is a terminal station for an entire module, so that transport of the workpiece out of the work station is not required. Processing in the third segment, TABLE XVc, comprises driving the carrier platform up one notch.

The pneumatic transport mechanism 1006 consists of a plurality of holes in the bed section 1002 of the loader extending from the entry of the loader to the end of the tongue section 1008. The entire pneumatic transport mechanism 1006 is actuated at one time, so that if no brakes were applied along the track bed, a workpiece entering the workpiece entry in the loader will move along the track bed until it reaches a position on the track bed where a brake is applied. The brakes 1005 shown are also pneumatic devices with a suction applied through the holes shown in the track bed. There is sufficient suction to stop and hold a workpiece when the workpiece in the form of a semiconductor slice reaches and covers the air brake holes. The pneumatic transport mechanism and the individual brakes are actuated separately. Thus, for instance, to position a workpiece 1003 at work station 1000, the brake 1005 for the first work station 1000 will be actuated and then the pneumatic transport mechanism 1006 will be actuated.

A workpiece entering the loader will be stopped by the brake 1005 at the first work station. The workpiece at work station 1000 will remain there until the brake 1005 at the first work station is deactivated and the pneumatic transport mechanism actuated. If the brake at the second work station 1001 is activated, the pneumatic transport mechanism will transport the workpiece to the second work station where it will be stopped by the activated brake at that work station.

The pneumatic transport mechanism 1006 is activated by opening an air cylinder. The opening and closing of the air cylinder controlling the pneumatic transport mechanism is controlled by connecting the solenoid input of the air cylinder to a bit position in the communication register in the bit pusher computer. In a corresponding manner, each of the brakes for the work stations 1000, 1001 and 1008 are individually activated to apply a suction to the brakes to hold the workpieces. The solenoids controlling the brakes are also connected to individual bit positions in the communication register. The photocell sensors are also connected to individual bit positions in the communication register where the information indicated by the photocell sensors can be sensed by the program in the computer to determine the control to be applied. The elevator platform 1007 of the loader is moved up and down to position one groove 1016 of the carrier in line with the track bed one position at a time. The elevator platform 1007 is moved by the actuation of a motor to rotate a screw. The photocell sensor 1015 senses one revolution of the screw moving the elevator platform one position up or down. The motor driving the screw which moves the elevator platform 1007 is connected to bit positions in the communication register which are addressed to turn the motor on and off and to move the motor in either forward or reverse position, depending upon the desired movement of the elevator platform 1007.

The bit positions in the communication register are addressed to sense conditions sensed by the photocell sensors and either activate or deactivate the pneumatic transport mechanism, the brakes and the motor to perform the transfer operations and positioning operations desired and controlled by the program.

TABLE XVa
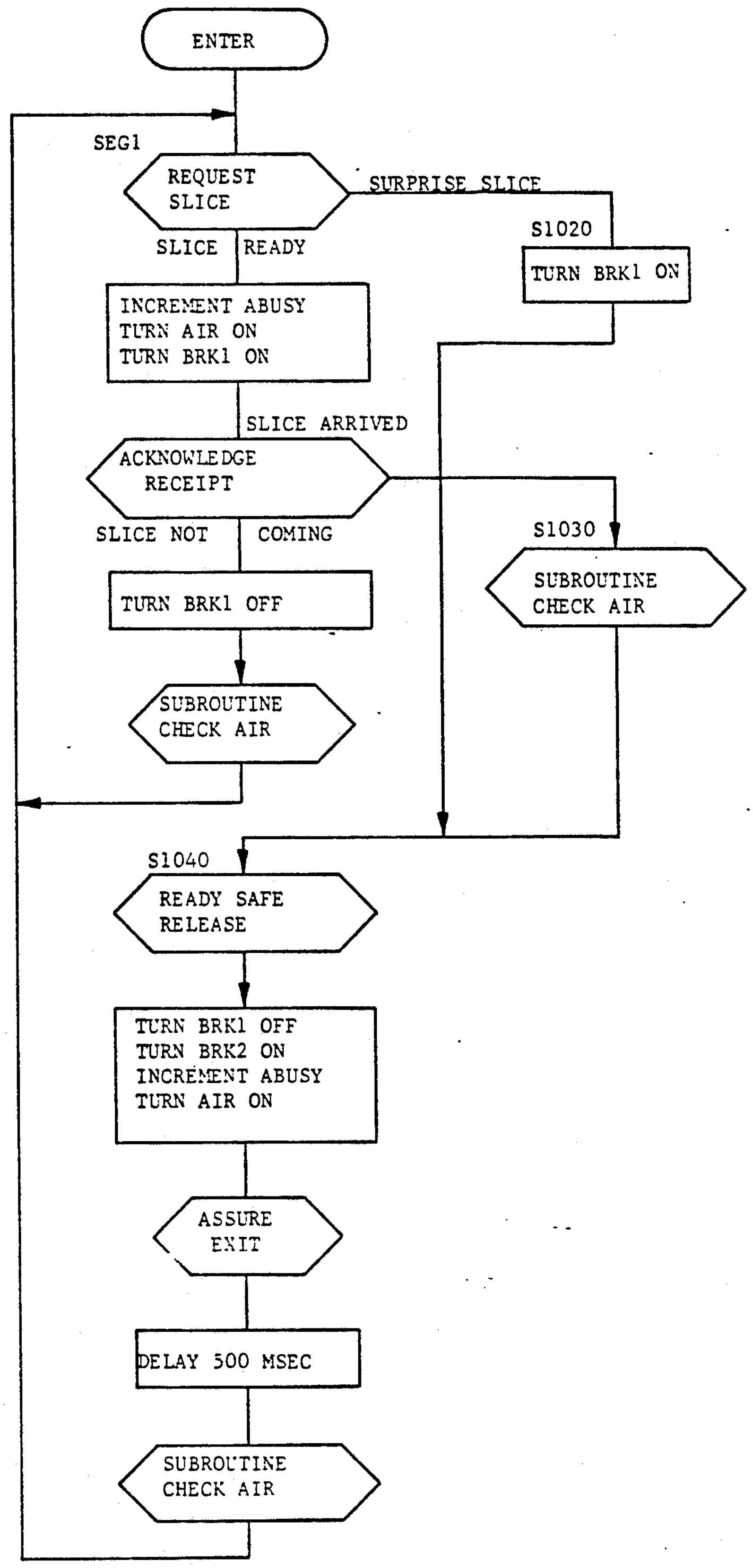

TABLE XVb
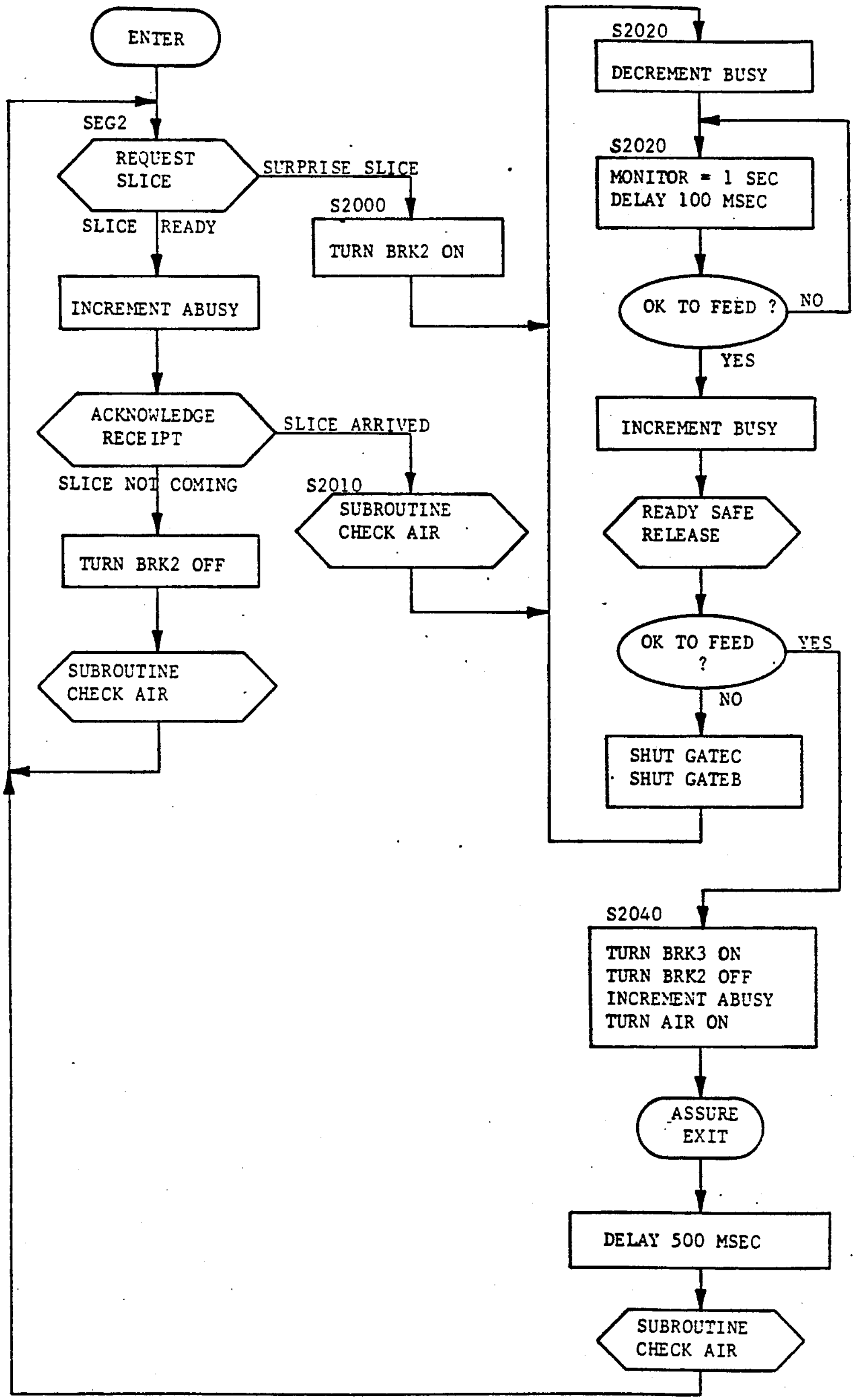

TABLE XVc
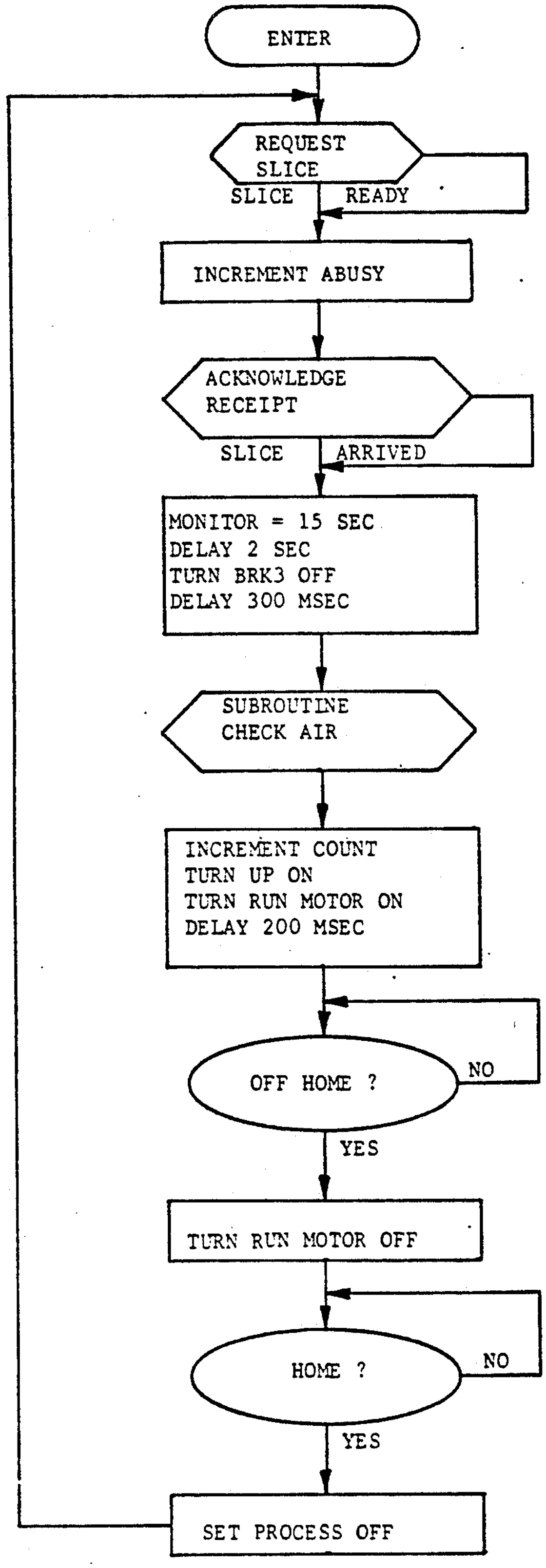

TABLE XVd
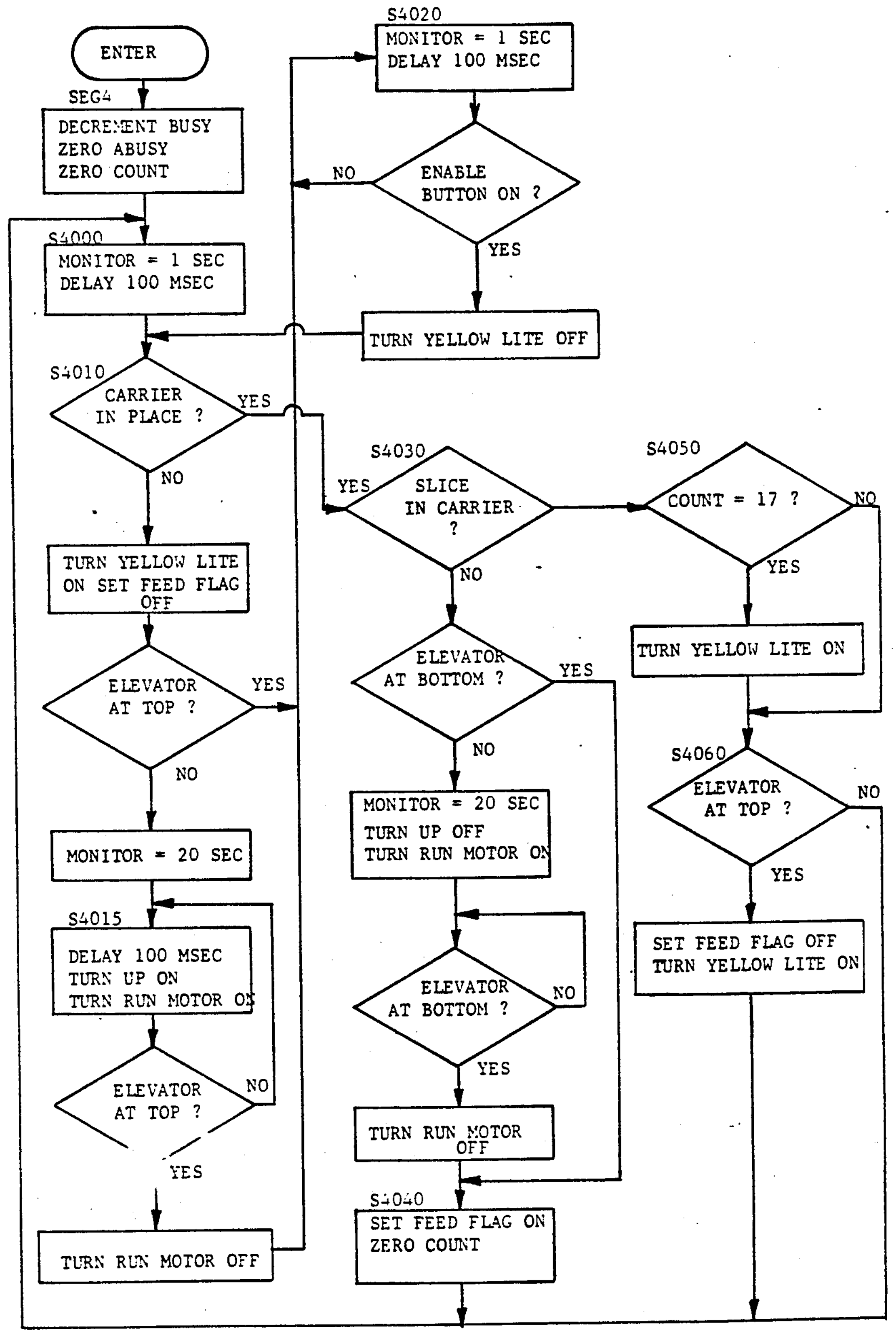

TABLE XVe
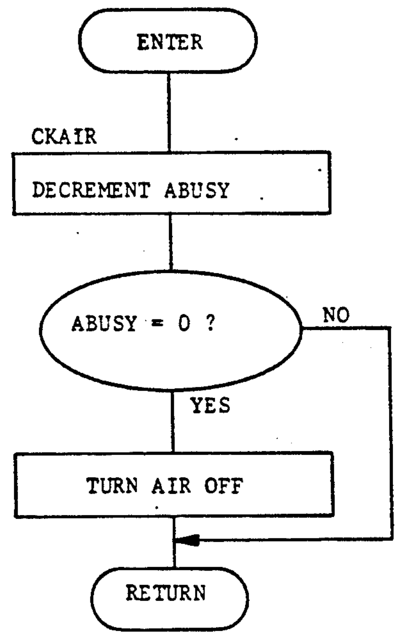

TABLE XVf

BEST AVAILABLE COPY

```
                FOUR SEGMENT LOADER                                                                  PAGE  0001

HLOC  INSTRUCTION LINE  ERR SOURCE TEXT                                                              EVENT

                  0001      *
                  0002      * FOUR SEGMENT LOADER PROCEDURE
                  0003      *
                  0004      *
                  0005      *
                  0006      *
                  0007      *
                  0008      *
                  0009      *
                  0010      *
                  0011      *
                  0012      *
                  0013      * DIGITAL INPUTS
                  0014      *
0000              0015      ENABL    EQU   2          ENABLE SWITCH                                  0000
0000              0016      TOP      EQU   3          ELEVATOR AT TOP                                0000
0000              0017      BOTM     EQU   4          ELEVATOR AT BOTTOM                             0000
0000              0018      HOME     EQU   5          MOTOR HOME (NOT RUNNING)                       0000
0000              0019      CARNP    EQU   6          CARRIER IN PLACE                               0000
0000              0020      SHCAR    EQU   7          SLICE IN CARRIER                               0000
0000              0021      PC1      EQU   8          1ST QUEUE PHOTOCELL                            0000
0000              0022      PC2      EQU   9          2ND QUEUE PHOTOCELL                            0000
                  0023      *                                                                        0000
                  0024      * DIGITAL OUTPUTS                                                        0000
                  0025      *                                                                        0000
0000              0026      UP       EQU   2          ELEVATOR DIRECTION                             0000
0000              0027      RNMTR    EQU   3          RUN MOTOR                                      0000
0000              0028      YELIT    EQU   4          WARNING LIGHT                                  0000
0000              0029      AIR      EQU   5          TRACK AIR                                      0000
0000              0030      BRK1     EQU   6          1ST QUEUE BRAKE                                0000
0000              0031      BRK2     EQU   7          2ND QUEUE BRAKE                                0000
0000              0032      BRK3     EQU   8          TOUNGE BRAKE                                   0000
                  0033      *                                                                        0000
                  0034      * BIT FLAGS                                                              0000
                  0035      *                                                                        0000
0000              0036      FEED2    EQU   58         FEED FLAG SEGMENT 2                            0000
0000              0037      FEED4    EQU   26         FEED FLAG SEGMENT 4                            0000
                  0038      *                                                                        0000
                  0039      * DEFINE ENTRY POINTS                                                    0000
                  0040      *                                                                        0000
0000        0004  0041               DC    SEG1                                                      0000
0001        0030  0042               DC    SEG2                                                      0001
0002        006A  0043               DC    SEG3                                                      0002
0003        003F  0044               DC    SEG4                                                      0003
                  0045      *                                                                        0003
                  0046      * SEGMENT 1 - FIRST QUEUE                                                0003
                  0047      *                                                                        0003
0004  8808004C    0048      SEG1     REQST SLICE(PC1)                                        2       0004
                  0049      *                                                                        0004
0006  8000501B    0050               JUMP  SL020      ONE HERE ALREADY                               0006
0008  F428A001    0051               INCR  ABUSY,=1   PREPARE FOR SLICE                      2       0008
000A  88008005    0052               TURN  AIR(ON)                                                   0010
000C  88008006    0053               TURN  BRK1(ON)   TURN ON BRAKE                          2       0012
```

TABLE XVf (cont).

BEST AVAILABLE COPY

```
  ASSEMBLY     FOUR SEGMENT LOADER                                                      PAGE  0012

HLOC  INSTRUCTION LINE  ERR SOURCE TEXT                                                 EVENT

                  0054      *                                                           0012
000E  B608004E    0055              ACKN   RECPT(PC1)                                   0014
                  0056      *                                                           0014
0010  8000801C    0057              JUMP   S1030          GO PROCESS                    0016
0012  A6000016    0058              TURN   BRK1(OFF)      NOT COMING - TRY AGAIN        0018
0014  B8D80030    0059              SUBR   CKAIR          CHECK AIR                     0020
0016  80008014    0060              JUMP   SEG1                                         0022
                  0061      *                                                           0022
0018  A8008016    0062      S1020   TURN   BRK1(ON)       SURPRIZE SLICE - HOLD IT      0024
001A  8000801E    0063              JUMP   S1040                                        0026
                  0064      *                                                           0026
001C  B8D80030    0065      S1030   SUBR   CKAIR                                        0028
                  0066      *                                                           0028
001E  38000050    0067      S1040   READY  SAFE RELEASE                                 0030
                  0068      *                                                           0030
0020  88000006    0069              TURN   BRK1(OFF)                                    0032
0022  F8005007    0070              TURN   BRK2(ON)       PREPARE SEGMENT 2             0034
0024  F4268001    0071              INCR   ABUSY,=1                                     0036
0026  88060015    0072              TURN   AIR(ON)                                      0038
                  0073      *                                                           0038
0028  F8060052    0074              ASSUR  EXIT(PC1)                                    0040
                  0075      *                                                           0040
002A  AC00C015    0076              DELAY  =5                                           0042
002C  B8D80030    0077              SUBR   CKAIR                                        0044
002E  80008014    0078              JUMP   SEG1                                         0046
                  0079      *                                                           0046
                  0080      * SEGMENT 2 - SECOND QUEUE                                  0046
                  0081      *                                                           0046
0030  B809004C    0082      SEG2    REQST  SLICE(PC2)                                   0048
                  0083      *                                                           0048
0032  80008040    0084              JUMP   S2000          ONE ALREADY HERE              0050
0034  F4268001    0085              INCR   ABUSY,=1       PREPARE - BRAKE ALREADY ON    0052
                  0086      *                                                           0052
0036  B809004E    0087              ACKN   RECPT(PC2)                                   0054
                  0088      *                                                           0054
0038  80008044    0089              JUMP   S2010          GO PROCESS                    0056
003A  88000017    0090              TURN   BRK2(OFF)      NOT COMING                    0058
003C  B8D80030    0091              SUBR   CKAIR                                        0060
003E  80008030    0092              JUMP   SEG2           TRY AGAIN                     0062
                  0093      *                                                           0062
0040  88008017    0094      S2000   TURN   BRK2(ON)       SURPRIZE SLICE - HOLD IT      0064
0042  80008046    0095              JUMP   S2020                                        0066
                  0096      *                                                           0066
0044  B8D80030    0097      S2010   SUBR   CKAIR                                        0068
                  0098      *                                                           0068
0046  F40387FF    0099      S2020   INCR   BUSY,=-1       SET MYSELF NOT BUSY FOR THIS TEST  0070
0048  AC01B01A    0100      S2030   CHNG   MONTR,=10      SEE IF OK TO FEED SLICE       0072
004A  AC00C001    0101              DELAY  =1                                           0074
004C  A403544B    0102              TJMF   FEED2(ON),S2030                              0076
004E  F4038001    0103              INCR   BUSY,=1        THROUGH WITH LOOP-SET BUSY AGAIN  0078
                  0104      *                                                           0078
0050  B8000050    0105              READY  SAFE RELEASE                                 0080
                  0106      *                                                           0080
```

BEST AVAILABLE COPY

TABLE XVf (cont).

```
ASSEMBLY    FOUR SEGMENT LOADER                                                              PAGE  0003

HLOC  INSTRUCTION LINE  ERR SOURCE TEXT                                                      EVENT

0052   A403505A   0107              TIME  FEED2(OFF),S2040  CHECK AGAIN                      0082
0054   94009012   0108              SET   GATED(CLOSE)   TELL SEG3 SLICE NOT COMING NOW      0084
0056   94006901   0109              SET   GATE3(CLOSE)                                        0086
0058   F0008046   0110              JUMP  S2020                                               0088
                  0111      *                                                                 0088
005A   F6008038   0112      S2040   TURN  BRK3(ON)          PREPARE SEG3                      0090
005C   F6000067   0113              TURN  BRK2(OFF)                                           0092
005E   F4200011   0114              INCR  ABUSY,=1                                            0094
0060   F6008005   0115              TURN  AIR(ON)                                             0096
                  0116      *                                                                 0096
0062   B8090052   0117              ASSUR EXIT(PC2)                                           0098
                  0118      *                                                                 0098
0064   AC00C005   0119              DELAY =5                                                  0100
0066   F6080030   0120              SUBR  CKAIR                                               0102
0068   F0008030   0121              JUMP  SEG2              RECYCLE                           0104
                  0122      *                                                                 0104
                  0123      * SEGMENT 3 - ELEVATOR & TOUNGE BRAKE                             0104
                  0124      *                                                                 0104
006A   F600004C   0125      SEG3    REQST SLICE(0)          NO SENSOR AVAILABLE HERE          0106
006C   F0000010   0126              NOOP                                                      0108
006E   F4200001   0127              INCR  ABUSY,=1          PREPARE - BRAKE ALREADY ON        0110
                  0128      *                                                                 0110
0070   9F000045   0129              ACKN  RECPT(0)          NO SENSOR AVAILABLE HERE          0112
0072   F0000010   0130              NOOP                                                      0114
                  0131      *                                                                 0114
0074   AC018016   0132              CHNG  MONTR,=15 SECS                                      0116
0076   AC00C014   0133              DELAY =2 SECS                                             0118
0078   F6000038   0134              TURN  BRK3(OFF)                                           0120
007A   AC00C003   0135              DELAY =3                                                  0122
007C   F6080030   0136              SUBR  CKAIR                                               0124
                  0137      *                                                                 0124
007E   F4200011   0138              INCR  COUNT,=1          ADD SLICE TO COUNT                0126
0080   F6008002   0139              TURN  UP(ON)            STEP ELEVATOR UP                  0128
0082   88008033   0140              TURN  RNMTR(ON)                                           0130
0084   AC00C002   0141              DELAY =2                                                  0132
0086   94050033   0142              DIDO  HOME(OFF),RNMTR(OFF)                                0134
0088   FC050460   0143              SENSE HOME(ON)          WAIT TILL THE STEP IS COMPLETED   0136
008A   94003811   0144              SET   PRCSS(OFF)        TURN OFF PROCESS BIT - RETURN TO IDLE   2   0138
008C   86008064   0145              JUMP  SEG3                                                0140
                  0146      *                                                                 0140
                  0147      * SEGMENT 4 - CARRIER MANAGEMENT                                  0140
                  0148      *                                                                 0140
008E   F403B7FF   0149      SEG4    INCR  BUSY,=-1          SET MYSELF NOT BUSY               0142
0090   AC200000   0150              CHNG  ABUSY,=0          INITIALIZE AIR BUSY               0144
0092   AC270000   0151              CHNG  COUNT,=0          ADD SLICE COUNTER                 0146
                  0152      *                                                                 0146
0094   AC01800A   0153      S4000   CHNG  MONTR,=10         SET MONITOR                       0148
0096   AC00C011   0154              DELAY =1                                                  0150
                  0155      *                                                                 0150
0098   A00600A6   0156      S4010   SJNE  CARRP(OFF),S4030  CHECK ON CARRIER                  0152
009A   F6060014   0157              TURN  YELIT(ON)         CARRIER GONE-TURN ON LIGHT        0154
009C   94005911   0158              SET   FEED4(OFF)        STOP FEEDING                      0156
009E   A0030020   0159              SJNE  TOP(OFF),S4020 SEE IF ELEVATOR IS AT TOP            0158
```

TABLE XVf (cont).

BEST AVAILABLE COPY

```
ASSEMBLY     FOUR SEGMENT LOADER                                                        PAGE  000-

HLOC  INSTRUCTION LINE  ERR SOURCE TEXT                                                    EVENT

0040    7C018028  0160                CHNG  MONTR,=20 SECS ALLOW TIME TO RAISE ELEVATOR     0160
0072    AC00C001  0161        S4015   DELAY =1           KEEP DRIVE ON IN SPITE OF SEG3  1  0162
00A4    B6008012  0162                TURN  UP(ON)                                          0164
00A6    9E008003  0163                TURN  RNMTR(ON)                                       0166
00A8    90030642  0164                SJNE  TOP(ON),S4015                                1  0168
00AA    B6000003  0165                TURN  RNMTR(OFF)                                   1  0170
                  0166         *                                                            0170
00AC    AC016004  0167        S4020   CHNG  MONTR,=10     WAIT FOR BUTTON TO BE PUSHED      0172
00AE    AC00C001  0168                DELAY =1                                              0174
00B0    900204AC  0169                SJNE  ENABL(ON),S4020                                 0176
00B2    B5000014  0170                TURN  YELIT(OFF)                                      0178
00B4    B0008058  0171                JUMP  S4010         SEE IF CARRIER IS THERE           0180
                  0172         *                                                            0180
00B6    90070008  0173        S4030   SJNE  SPCAR(OFF),S4050  SEE IF ANY SLICES IN CARRIER  0182
00B8    9C040032  0174                SJNE  BOTM(OFF),S4040   SEE IF ELEVATOR AT BOTTOM     0184
00BA    AC018008  0175                CHNG  MONTR,=20 SECS ALLOW TIME TO DRIVE DOWN         0186
00BC    B6000012  0176                TURN  UP(OFF)       SET ELEVATOR TO GO DOWN           0188
00BE    B6008003  0177                TURN  RNMTR(ON)                                       0190
00C0    96040613  0178                DJON  BOTM(ON),RNMTR(OFF) STOP DRIVE WHEN             0192
                  0179         *                                                            0192
00C2    9C00001l  0180        S4040   SET   FEED4(ON)     START FEEDING TO CARRIER          0194
00C4    AC2A3000  0181                CHNG  COUNT,=0      ZERO SLICE COUNT                  0196
00C6    B0008044  0182                JUMP  S4000         RECYCLE                           0198
                  0183         *                                                            0198
00C8    9C2A0011  0184        S4050   COMP  COUNT,=17     CHECK ON SLICE COUNT              0200
00CA    BC006000  0185                JUMP  S4060         .LT.                              0202
00CC    BC00E010  0186                JUMP  S4060         .GT.                              0204
00CE    B5006004  0187                TURN  YELIT(ON)     .EQ. TURN WARNING LIGHT ON        0206
                  0188         *                                                            0206
00D0    90030494  0189        S4060   SJNE  TOP(ON),S4000                                   0208
00D2    9C005011  0190                SET   FEED4(OFF)    CARRIER AT TOP - ST - FEEDING     0210
00D4    B5006004  0191                TURN  YELIT(ON)     TURN LIGHT ON ANYWAY              0212
00D6    B0008044  0192                JUMP  S4000         RECYCLE                           0214
                  0193         *                                                            0214
                  0194         * SUBROUTINE CHECK ON AIR TRACK                              0214
                  0195         *                                                            0214
00D8    E42B87FF  0196        CKAIR   INCR  ABUSY,=-1     DECREMENT AIR BUSY FLAG           0216
00DA    F02B8001  0197                COMP  ABUSY,=1      SEE IF AIR IS STILL BUSY          0218
00DC    B4000015  0198                TURN  AIR(OFF)      .LT. NOT BUSY - TURN OFF AIR      0220
00DE    B8000034  0199                RETRN               .GT. EXIT                         0222
00E0    B8000034  0200                RETRN               .EQ. EXIT                         0224
                  0201         *                                                            0224
                  0202         * MACHINE DATA SECTION                                       0224
                  0203         *                                                            0224
002A              0204                DUMMY UNN8+4*NUMS   STANDARD DATA WORDS               0042
002A        0000  0205        COUNT   DC    0             SLICE COUNT IN CARRIER            0042
002B        0000  0206        ABUSY   DC    0             AIR TRACK BUSY FLAG               0043
                  0207         *                                                            0043
002C              0208                END                                                   0044
```

PARTITIONING - GLOBAL SUBROUTINE MODIFICATION FOR SLUGGISH MACHINES

Computer control of machines which are comprised of electromechanical devices depends on the response time required by the devices. In order to allow a longer time interval for more sluggish machines to respond to the computer commands, the global subroutines REQUEST WORKPIECE, illustrated in FIGS. 3A-D, and ACKNOWLEDGE RECEIPT, illustrated in FIGS. 3E and F, are modified. In the modified embodiment, some of the flag testing one in REQUEST WORKPIECE is moved into ACKNOWLEDGE RECEIPT, as illustrated in FIGS. 11A-F, respectively. This allows the segment to issue the commands to prepare for receipt of a workpiece earlier in time than in the normal case. The result is slightly faster and more reliable transport between work stations, due to the earlier time in the transport sequence for commanding the machine's electromechanical devices to prepare for processing.

UNSAFE MACHINES WITHOUT SAFE POSITIONS

Some machines in the assembly line are inherently "unsafe" to the workpieces which enter them for processing if the workpiece remains in the machine for an extended length of time. For example, in a semiconductor wafer manufacturing assembly line, at certain work stations chemical applications on semiconductor slices (workpieces) are heat cured or baked. It is detrimental to the wafer to cure the slice for too long or too short a time. Broke or failed machines downstream may cause workpiece stoppages, for indefinitely long periods and hence if the workpiece had to remain at the curing station for lack of "safe" place to go downstream, it would be damaged.

One method of correcting this situation would be to provide a "safe" position in each "unsafe" machine so that workpieces would have a "safe" place to go if a downstream machine were tied up for an extended period of time. This method is not always practical: firstly, safe stations take up physical space on the assembly line without contributing a positive work step to the workpiece and secondly, the assembly line may be constructed and then at some later date it is realized that a machine which was considered safe at the outset turns out in fact to be an unsafe machine.

In the latter case, correction of the problem may be extremely costly and require disassembly and reassmbly of the entire assembly line.

In accordance with an embodiment of the present invention, a computer routine is utilized to prevent a workpiece from entering an "unsafe" work station until the closest "safe" work station downstream is vacant; the "safe" work station is not necessarily a specifically provided "safe" position as described above. In this manner, the workpiece is processed at the "unsafe" work station for an exact time and then proceeds to the "safe" station regardless of downstream conditions. The "unsafe" station will then remain empty until any bottleneck conditions are removed. The routine fits the organization of the already described system and can be used selectively so that only certain machines need be affected by this special case.

Accordingly, a contiguous string of work stations is defined with "unsafe" followed by "safe" work stations so that the number of "safe" work stations is at lest equal the number of "unsafe" work stations. Each machine procedure accumulates the number of workpieces presently contained in the machine; the Machine's procedure segments may share this task. Before allowing a new workpiece to enter the first "unsafe" station, wait until the number of workpieces in the string is less than the number of "safe" stations.

CONVENTIONS

All machines involved allocate the first three words of MDATA, in the COMMON area (after the last segments work area and before any other common data or variable data).

Word 1 is used to accumulate the machine's current inventory of workpieces (incremented as a workpiece enters the machine, decremented as a workpiece exits the machine).

Word 2 (non zero only for upstream machine in the string) specifies acceptable number of safe stations in the string.

Word 3 (non zero only for upstream machine in the set).

HWMNY specifies the number of machines in the set.

Each segment corresponding to the work stations in the string calls the subroutine before entering REQST WORKPIECE GLOBAL SUBROUTINE (or equivalent).

One segment of each machine counts by sensing the number of workpieces present in the machine. Each segment of the procedure either increments the number on receipt of a workpiece, or decrements on release of a workpiece.

The subroutine does nothing for all calling segments of machines other than the first one in the string, but returns control to the caller through Module Service.

When called from the first machine, it searches the MDATA of downstream machines, according to the number specified, accumulating a total count of workpieces present by summing the number of workpieces in each of the machines. It also checks that each machine is on-line.

If any machine in the string is off-line, or if the total count is greater than or equal to the specified safe number, the program forces a wait condition.

When there is a space to safely introduce a new workpiece, as indicated by all machines on-line and total number of workpieces less than the safe number, control returns to Module Service program and thence to the procedure segment. The procedure segment may safety accept a new workpiece.

Referring to FIG. 12, on entry, the COMMON area data word 3 is obtain 900 and tested for zero 901. If zero, control returns to point MODCM in Module Service for return to the calling procedure segment. If non-zero (indicating the first machine in the string), the segment work area GLADR and GLPLA are set to indicate this subroutine and interrupts are masked 902. The number of machines in the string is retained as a counter and a branch instruction into the subroutine executed 903. The machine BUSY flag is decremented 904 and control goes to point EXIT in Module Service 905. This EXIT returns control to the next step on the next polling interval. The machine's MOMRT is set 906 for a reasonable time and the TIMER tested for negative 907 indicating machine off-line. An off-line condition passes control back to step 905, comprising a delay of one interval. When the machine is on-line 907, the machine's workpiece count is added to a total and the registers are set to the downstream machine 908. The count of machines is incremented and tested 909; until the count is zero control returns to step 907. When all specified machines have been examined 909, the accumulated total is compared to the specified safe number.. If the total is greater than or equal to the safe number, control returns to step 905 for another one interval delay. When the total is less than the safe number, the machine's BUSY flag is incremented, the work areas GLADR and GLPLA are reset to zero 911, and control passes to Module Service at point MODCM 912 for return to the calling procedure segment.

ASSEMBLER DEFINITION FILE PREPARATION

One file consisting of two major parts composes the heat of the ASSEMBLER:

1. Symbol table build area; and
2. Instruction definition area.

This one file contains the ASSEMBLER information pertaining to the specific definition of input source language and output object code. The symbol table prebuild area describes the OP codes and assembler directives recognized by the ASSEMBLER, and a copy of this particular area constitutes a preload of the symbol table at assembly time. The instruction definition area contains information pertaining to syntax and instruction subfield definitions.

The first step toward assembler definition (required only for the first definition) is to allocate space for the ASSEMBLER DEFINITION FILE on the 2310 disc. Use the IBM TSX DUP function 'STOREDATA' to allocate 11 sectors in the fixed area with name 'DEFIL' (see IBM 1800 Time-Sharing Executive System, Operating Procedures, Form C26-3754-3 for specifics). After this task is accomplished, the next step is to prepare the data for assembler definition: i.e., fabricate card decks for 1. Symbol table build; and
2. Instruction definition build.

The symbol table build is required to preload the symbol table with OP code mnemonics and other key words while the instruction definition build provides the data required to 'assemble' each instruction.

SYMBOL TABLE BUILD

The ASSEMBLER uses the concept of a generalized symbol table; i.e., OP codes and assembler directives will reside in the symbol table along with all program symbolic variables and constants. This approach requires only one access method to identify and locate all symbols, and is in contrast to having a separate table (and access method) for labels, another for OP codes, another for references, etc.

The generalized symbol table also fulfills the flexibility requirements imposed upon the ASSEMBLER more easily than the multitable approach. A definition of special symbols such as OP codes mnemonics, assembler directives, etc. merely requires that they reside in the symbol table at the time the assembly is initiated. Thus, a preloading of these 'specidl keywords' into the symbol table provides a flexible recognition scheme. Note that these keywords are not forbidden symbols to the user. At assembly time a preload of the symbol table from disk file DEFIL is executed before processing source text. To build a preload of the symbol table requires for each instruction a mnemonic and a number;

a. OP code number - Maximum length is five (5) alphanumeric characters, the first of which is non-blank alphabetic.

b. OP code number - The OP code number is associated with the user defined mnemonic and must be restricted to a positive non-zero integer in the range 1 OP code number 128 (numbers 128 and greater are reversed for assembler directives). OP code numbers must begin with one (1) and be assigned sequentially.

Since assembler directives are permanently programmed into the ASSEMBLER, the following assignment is generated internally by the ASSEMBLER. The list in TABLE XVI is given as reference.

TABLE XVI

| ASM Direct Mnemonic | Op Code Number | Description |
|---|---|---|
| ORG | 128 | Origin |
| MODE | 129 | Program mode |
| EQU | 130 | Symbolic equate |
| DC | 131 | Define constant |
| LIST | 132 | List control |
| HDNG | 133 | List control |
| BSS | 134 | Block starting storage |
| BES | 135 | Block ending storage |
| BSSE | 136 | Block starting even storage |
| BSSO | 137 | Block starting odd storage |
| END | 138 | End of source text |
| ENT | 139 | Enter point description |
| ABS | 140 | Absolute relocation description |
| MDATA | 141 | Machine data block identification |
| MDUMY | 142 | Machine dummy data block |
| CALL | 143 | MODE 1 subroutine call |
| REF | 152 | Declares a symbol as externally defined |
| DEF | 153 | Declares a symbol as an external definition |
| | | KEY WORDS FOR PARSING |
| R | 144 | Register |
| C | 145 | Mask, clear |
| S | 146 | Mask, save |
| RC | 147 | Register, mask, clear |
| ON | 149 | |
| OFF | 150 | |
| X | 151 | Indexing |

To prepare the card deck for symbol table build, determine all OP code mnemonics that are desired in the source language and assign them sequential numbers starting with 1. Punch the deck according to the following format noting that comments may be appended in columns 21-80 to enhance documentation. Behind this deck place one (1) blank card. Note that the ASSEMBLER checks for the proper sequence of OP code numbers.

| CARD FORMATS FOR SYMBOL TABLE BUILD | | |
|---|---|---|
| Mnemonic | Op Code Number | Comments |
| Cols 1-6 | 8-10 | 21-80 |
| Format A2 | I3 | A2 |
| EXAMPLE OF SYMBOL TABLE BUILD | | |
| (1) | (10) | (21) |
| LOAD | 1 | Load register |
| STORE | 2 | Store register |
| ADD | 3 | Add to register |
| SUB | 4 | Subtract from register |
| BLANK CARD | | |

The above example shows the make-up of a source language of four (4) instructions; load, store, add and subtract. Note the proper sequence of the OP code numbers.

The next step for assembler definition is to prepare the card deck for instruction definition build.

INSTRUCTION DEFINITION BUILD

In the ASSEMBLER flexibility in recognition is accomplished by the generalized symbol table approach. Following recognition machine language instruction must be composed. The information required to 'assemble' the instruction resides in the Instruction Definition Area (IDA).

The IDA is built following symbol table build and remains unchanged until a redefinition is executed. Two types of cards are required to accomplish IDA build:

1. Instruction composition header card; and
2. Instruction composition data card.

The following information appears on the instruction composition header card and will be defined in INSTRUCTIONS FOR COMPOSING CARD DECKS:

a. Mnemonic - The mnemonic must correspond to the one specified in Symbol Table Build.

b. OP code Number - The OP code number must agree with the OP code number specified in the Symbol Table Build.

c. OP Code - This is a positive integer number in the range 0<OP code≦63 which is to be assembled into the instruction as the operation code.

d. Mode Specification - Indicates in which mode the instruction is valid. The valid range is 1≦Mode spec≦3.

e. Relocation Test Type - Specifies relocation type information required to accompany the assembled instruction in a relocatable object module. Valid code ranges 0–1.

f. Instruction Core Allocation - Specifies the number of 16 bit words required by the machine instruction. The valid range is 0–4.

g. P2 Text Flag - Describes the required processing of the instruction in pass 2. The valid range is 0≦P2 TF≦2.

h. Syntactic Type - Specifies a standard syntax type (parse routine number) to which the variable field must conform.

i. Number of Fields in Instruction Composition - This is a count of the number of subfields which make up the instruction. Valid range is 1≦count≦9.

Other information contained in IDA pertains to the format and immediate information to be assembled into the instruction; these parameters belong to the Instruction Composition Data Cards and are listed below:

a. Mode Number - Specifies that the following information is to be used when the instruction is assembled in this mode. Valid range: 1≦mode#≦3.

b. Number of Bits in the Subfield - Valid range: must be less than the number of bits in the instruction. A summation of all subfield lengths plug the OP code field is checked to be equivalent to the instruction core allocation.

c. Field Code - Specifies that the following data is either an operand number or immediate data to be assembled into the instruction. Valid range: 1≦code≦8.

d. Operand Number or Data - A positive non-zero integer constant specifying the operand number, which is the link between the data in the instruction variable field and the format for that field (number of bits in the subfield), or an integer constant to be interpreted as immediate data.

Note the card formats for instruction definition build that follows. A description of the items shown on the card images also follows so as to provide a basis for composing the deck.

CARD FORMATS FOR INSTRUCTION DEFINITION BUILD

INSTRUCTION COMPOSITION HEADER CARD

| Mnemonic | Op Code # | Op Code | Mode Spec | Relocation Test Type | Instr. Core Alloc. | Syntactic Type | # Fields in Instruction Composition |
|---|---|---|---|---|---|---|---|
| Cols 1-6 | 8–10 | 18–20 | 30 | 40 | 50 | 68–70 | 80 |
| Format A2 | I3 | I3 | I1 | I1 | I2 | I3 | I1 |

INSTRUCTION COMPOSITION DATA CARD

| Mode Num | # Bits | Field Code | Data | # BIts | Field Code | Data |
|---|---|---|---|---|---|---|
| Cols 1 | 4–5 | 10 | 11–15 | 19–20 | 25 | 26–30 |
| Format I1 | I2 | I1 | I5 | I2 | I1 | I5 |

Note data groups of three are repeated through columns 75 then continuation to the next card starting in column 5 is valid when more than 5 subfields are described.

INSTRUCTIONS FOR COMPOSING DATA DECKS

The following steps should be followed in composing the card deck for instruction definition build:

Step 1

Fill in mnemonic and OP code number (these two fields are exact copies of the first two fields in symbol table build).

Mnemonic - The mnemonic is the symbol in the source test that is recognized as and translated into the operation code.

OP Code Number - The OP code number is NOT the OP code but is used to provide the link between the mnemonic (in symbol table) and data for generating the object code (in IDA) for that mnemonic.

Step 2

Fill in the OP code, mode specification, relocation test type, instruction core allocation, and P2 text flag.

OP Code - The operation code is specified as a decimal number and is associated with the above mnemonic.

Mode Specification - The mode spec denotes in which mode(s) of operation the instruction is valid. (See discussion of mode under assembler directive MODE in Assembler Usage).

1 instruction valid in MODE 1 only 2 instruction valid in MODE 2 only 3 instruction valid in both MODE 1 and 2.

Relocation Test Type - The relocation test type is used by the object code generator in pass 2. It specifies for MODE 1 relocatable programs what test is to be applied to the instruction to determine whether the operand should be marked as requiring relocation or not requiring relocation.

0 Test relocatable operand flag (set during parsing): If on, mark as relocatable If off, mark as absolute
1 unconditionally mark as absolute trol for the assembly as initialized by the LIST user option and as modified by any LIST ON, LIST OFF assembler directives.

Step 3

Fill in the syntactic type.

Syntactic Type - The syntactic type describes to the ASSEMBLER the syntax to be expected in the variable

| Parse Routine Number | Use | Syntax |
|---|---|---|
| 1 | Special Instructions:<br>DOUT, DIDO, DICJ,<br>SETF, TSFF, TDIN,<br>SFCJ, INPF, LOAD,<br>STOR, TWTL, JUMP,<br>DELAY, AOUT;<br>Extended SFT Mnemonics<br>Super 10 Instructions;<br>SLA, SLT, SRA, SRT,<br>RTE | <D> \| <B>, <B> \| <A> (<V>)\|<br><A> (<V>), <B> \| <A> (<C>), <B> \|<br><A> (<V>), <A> (<V>) \| <D>, <D><br>where<br>A is a bit or I/O flag address<br>V is a binary value to read/write to the address<br>B core address<br>C bit count<br>D data |
| 2 | Special Instructions:<br>CHNG, COMP | <B>, <B> \| <B> <B>, = <D><br>where<br>B is a core address<br>D data<br>= indicates immediate operand |
| 3 | No operand.<br>Special Instructions:<br>CHMD, WAIT<br>Super 10 Instructions:<br>NOP<br>Parse routines 4-7 are used with the standard instruction set. | |
| 4 | 2540 Instructions:<br>AMH, STH<br>Super 10 Instructions:<br>MIN | Valid instruction modification<br>IMMEDIATE<br>NO MOD<br>INDEXED<br>MASK, CLEAR<br>MASK, SAVE<br>DIRECT<br>NO MOD<br>INDEXED<br>MASK, CLEAR<br>MASK, SAVE<br>INDIRECT<br>NO MOD<br>INDEXED |

Instruction Core Allocation - A decimal integer is given specifying the number of 16 bit words the assembled instruction requires. A maximum value of four (4) is valid.

P2 Text Flag - The pass 2 text flag specifies how the instruction is to be processed in pass 2.

0 Statement requires processing by the P2 statement process and also is to be printed.
1 The statement is to be printed only, it requires no processing in pass 2.
2 Statement requires pass 2 processing but is not to be printed.

Note most statements have a code of 0; also printing is conditional upon the current status of the list flag. The list flag provides list confield; the syntactic type, moreover, actually represents the number of a parse routine to be called for analysis of the variable field. Determining the proper routine to parse the variable field is perhaps the most subjective portion in the assembler description because it is not only closely related to the actual hardware operand derivation but also contingent on individual preference.

The following description pertain to the specific ASSEMBLER implementation. The standard routines may be augmented or revised as needed (see documentation under Assembler Description).

Eight standard parse routines are available. Routines 1-3 are used with the special bit pushing instruction, 4-7 with 2540 standard instruction set, and 8 and 9 with the super 10 instruction set.

| | | |
|---|---|---|
| Examples | | |
| AMH | =1,LOC | Memory increment location by 1 |
| AMH | 1, LOC | Add Reg 1 to LOC, save in LOC |
| AMH | 1, LOC,* | Add Reg 1 indirect turh LOC, save indirect thru LOC |
| 6 | 2540 Instructions:<br>MH, DH, BC, BLM<br>BAS, RIC, ROC, IDBN<br>SFT<br>Super 10 Instructions:<br>LDX, STX | Valid instruction modification<br>IMMEDIATE<br>NO MOD<br>INDEXED<br>REGISTER<br>NO MOD<br>INDEXED |

-continued

| | | |
|---|---|---|
| | | INDIRECT<br>NO MOD<br>INDEXED |
| Examples: | | |
| BC | 7,=LABEL | Branch to Label |
| BC | 7,LABEL | Branch to address contained in Label |
| BC | 7,R(2) | Branch to address contained in Reg 2 |
| BC | 7,LABEL,* | Go to double word LABEL and reinitiate the operand derivation and branch to derived address |
| SFT | 1,=/A805 | Shift left arithmetic Reg 1 five places |
| SFT | 1,5 | Shift according to the shift description in LOC 5 |
| 6 | 2540 Instructions:<br>LH, LTCH, AH, SH<br>CH, LOCH, OH<br>Super 10 Instructions:<br>MDK | Valid instruction modification<br>IMMEDIATE<br>NO MOD<br>INDEXED<br>MASK, CLEAR<br>MASK, SAVE<br>REGISTER<br>NO MOD<br>MASK, CLEAR<br>MASK, SAVE<br>DIRECT<br>NO MOD<br>INDEXED<br>MASK, CLEAR<br>MASK, SAVE<br>INDIRECT<br>NO MOD<br>INDEXED |
| Examples: | | |
| LH | 1,=15 | Load Reg 1 with 15 |
| LH | 1,LOC,C(1) | Load Reg 1 using Reg 1 as a mask |

The above two instructions achieve a logical AND of /000F with the contents of LOC with the result left in Register 1.

| | | |
|---|---|---|
| LH | 1,RC(5,6) | Load Reg 1 from 5 with mask and clear operation through Reg 6 |
| 7 | 2540 Instructions:<br>XSW, LSW | Valid instruction modification<br>DIRECT<br>NO MOD<br>INDEXED<br>INDIRECT<br>NO MOD<br>INDEXED |
| 8 | Super 10 Instructions:<br>Extended BC Mnemonics | IMMEDIATE<br>NO MOD<br>INDEXED<br>DIRECT<br>NO MOD<br>INDEXED |
| 9 | Super 10 Instructions:<br>STO, STQ, A, SUB,<br>M, D, AND, OR | DIRECT<br>NO MOD<br>INDEXED<br>INDIRECT<br>NO MOD<br>INDEXED |

Step 4

Complete the instruction composition header card by indicating how many fields there are in the instruction.

Number of Fields in Instruction Composition - This positive non-zero integer indicates the number of fields in the instruction. This number minus one is the number of fields to be read from the succeeding instruction composition data cards. Note that any bits not used in the instruction should be included as a field and loaded with zeros.

Step 5

Fill out instruction composition data cards to complete the assembler definition. The OP code field is not to be included when describing the instruction fields because it is specified (the OP code) in the header card.

Mode Number - The mode number indicates for which mode the following instruction composition data applies. If the instruction is valid and has the same format in both modes, the instruction composition data need not be repeated.

1 data for MODE 1

2 data for MODE 2

3 data is to be used for both modes.

Number of Bits - This positive non-zero integer defines the field size into which the indicated operand or immediate data is to be placed. Subfields must be specified in the same order as the left to right order in which they appear in the instruction. The data to be placed in this field is checked to be in the range: $0 \leq data \leq 2$ (num of bits)$-1$.

Field Code - As the information is extracted from the variable field of the instructions by the parse routines, it is placed in an operand list. Left to right order is preserved in the list such that operand #1 is the information extracted from the leftmost partition in the instruction variable field, etc.

The field code is interpreted as follows:

1 Data is to be taken directly from the operand as specified by the operand number.

2 Treat as immediate data.

3 Data is the non-negative quotient of the operand specified by the operand number divided by 16. (operand 16).

4 Data is the remainder of the operand specified by the operand number divided by 16. (operand module 16).

5 Data is the logical OR of the left byte of the data itself with operand whose operand number resides in the right byte of the data.

6 Data is the value (operand #)+value (operand #+1)−1.

7 Data is non-negative

8 Data is in range $-2^N \leq \text{Data} \leq 2^{N-1}-1$.

Operand Number or Data - This word is interpreted by the ASSEMBLER as specified by the field code; i.e., it is either a number to be used as an index into the operand list or immediate data word to be inserted directly into the instruction, etc.

The number of triples (#Bits, field code, data) is repeated on the instruction composition data cards until the instruction has been fully defined.

The process may be visualized as producing the linked list data structure illustrated in FIG. 13.

EXAMPLE OF INSTRUCTION DEFINITION BUILD

The following example is the completion of the 'LOAD' instruction given in the Example of Symbol Table Build.

INSTRUCTION COMPOSITION HEADER CARD

| (1) | (10) | (20) | (30) | (40) | (50) | (60) | (70) | (80) |
|---|---|---|---|---|---|---|---|---|
| LOAD | 1 | 58 | 3 | 1 | 2 | 0 | 1 | 4 |

| | | |
|---|---|---|
| Mnemonic | LOAD | |
| Op Code Num | 1 | first mnemonic defined in Symbol Table Build |
| Op Code | 58 | operation code |
| Mode Spec | 3 | valid in MODE 1 and 2 |
| Rel Test Type | 1 | always absolute |
| Instr Core Alloc | 2 | two 16 bit words |
| P2 Text Flag | 0 | require P2 process; also list |
| Syntactic Type | 4 | 3 field will be described in instruction composition data |

INSTRUCTION COMPOSITION DATA CARD

| (1) | (5) | (10) | (15) | (20) | (25) | (30) | (35) | (40) | (45) |
|---|---|---|---|---|---|---|---|---|---|
| 3 | 7 | 2 | 0 | 3 | 1 | 1 | 16 | 1 | 2 |

| | | |
|---|---|---|
| Mode Num | 3 | This data is usd for both MODE 1 and 2 |
| Num of Bits | 7 | First field is a dummy |
| Field Code | 2 | take data as immediate |
| Data | 0 | zero the 7 bits |
| Num of Bits | 3 | Second field is for register number |
| Field Code | 1 | use data as an operand number |
| Data | 1 | extract data for this field from operand #1 |
| Num of Bits | 16 | Third field is for the core address |
| Field Code | 1 | use data as an operand number |
| Data | 2 | extract data for this field from operand #2 |

Note that three fields are described.

ASSEMBLER DEFINITION DECK COMPOSITION

Composition of the ASSEMBLER card deck is illustrated in FIG. 14.

After the decks have been prepared, call for an assembly definition //XEQ ASMD1 FX followed by the decks just composed.

As the definition proceeds, a listing is produced. If, by chance, errors are made in the assembler definition, appropriate diagnostics are inserted into the listing. A list of error codes and errors follows for convenience of reference.

Following the listing several statistics are listed concerning storage required, etc. Upon successful completion of the assembler definition phase, the ASSEMBLER is ready for use in the user mode.

ERROR CODES AND ERRORS

| ASSEMBLER DEFINITION ERRORS | |
|---|---|
| | PART I |
| D1 | OP CODE NUM TOO LARGE |
| D2 | OP CODE NUM MUST APPEAR SEQN MONOTONE INCREASING |
| D3 | MNEMONIC MULTIPLY DEFINED |
| D14 | MNEMONIC MORE THEN FIVE CHARACTERS |
| | PART II |
| D4 | NUM OF INSTRUCTIONS DEFINED NOT EQUAL NUM OF MNEMONICS IN SYMBOL TABLE BUILD |
| D5 | MNEMONIC UNDEFINED IN SYMBOL TABLE BUILD |
| D6 | OP CODE NUM DOES NOT MATCH THAT OF SAME MNEMONIC IN SYMBOL TABLE BUILD |
| D7 | ILLEGAL OP CODE VALUE SPECIFIED |
| D8 | ILLEGAL SYNTAX TYPE SPECIFIED |
| D9 | ILLEGAL INSTRUCTION CORE ALLOCATION SPECIFIED |
| D10 | ILLEGAL MODE SPECIFIED |
| D11 | ILLEGAL MODE NUMBER |
| D12 | ILLEGAL FIELD CODE |
| D13 | INSTRUCTION SUBFIELDS DO NOT SUM TO NUM OF BITS IN INSTRUCTION CORE ALLOCATION |

MULTIPLE-SYMBOL TABLES

Three steps lead to creation of a symbol table. First, a disk data area is created and named using the TSX dup function * STORE DATA. Second, the default symbol table, DEFIL, used by the ASSEMBLER, is initialized to the desired instruction set. Third, a program is assembled using the ASSEMBLER to add the desired symbols to the instruction set and store the result in the defined area by name. When these steps are accomplished, this symbol table may be referenced on the assembly control card by name and the desired symbols references in the program or programs being assembled.

Symbol Table SGTAB - This symbol table was created for ease of generating MODE 1 programs, in particular, the module machine service interrupt response program for segmented asynchronous operation.

Symbol Table SGMD2 - This symbol table was created for ease of assembling MODE 2 programs, in particular, segmented procedures and MDATA data blocks for segmented asynchronous operation.

ASSEMBLER USAGE

JOB CONTROL AND USER OPTIONS

An assortment of facilities is available in the ASSEMBLER. One control card must precede each assembly and contains the following fields:

| | |
|---|---|
| cols 1-4 | Assembler control |
| cols 6-9 | I/O information and assembly type |
| cols 11-20 | Name |
| cols 21-30 | Name |
| cols 31-40 | Name |
| cols 41-80 | User options |

The ASSEMBLER control field must contain one of the following directives:

| | |
|---|---|
| @ASM | indicates an assembly control card |
| @END | indicates end of all assemblies |

The I/O information and assembly type field must contain one of the following:

| | |
|---|---|
| PROC | Mode 2 machine program |
| DATA | Mode 2 machine data |
| SUPR | Supervisor or Mode 1 program |
| TEST | Any other program not requiring disk storage |

PROC, DATA, SUPR assume disk space is required for program storage, while TEST does not. TEST is used as a de-bugging facility or as support for an off-line since the only output obtainable is a program listing and a punched binary deck.

The Name fields are used to indicate file references within the spec system.

```
(1)   (6)   (11)
@ASM  PROC  NAME1
            |
            L-----------------> Procedure Name

(1)  (6)    (11)   (21)   (31)
@ASM DATA   NAME1  NAME2  NAME3
            |      |      |
            |      |      L-> Module Name
            |      |
            |      L--------> Individual Machine
            |                 Name
            L---------------> Data Type

@ASM  SUPR  NAME1
                              Mode 1 program
                              name

@ASM  TEST
                              No names are
                              required
```

When assembling PROC, DATA, SUPR the assembly control cards may be stacked in any order and terminated by a @END, an example of which is illustrated in FIG. 15 A.

When using TEST, only one program is assembled per execution of the ASSEMBLER as illustrated in FIG. 15 B.

The options field is free form with the options separated by commas. The following assembly options may be chosen:

| | |
|---|---|
| TEST | |
| LIST | LIST PROGRAM |
| CROSS | CROSS REFERENCE SYMBOLS |
| PRINT | PRINT SYMBOL TABLE |
| *SAVE NAME1 | SAVE SYMBOL TABLE AS SYSTEM SYMBOL TABLE WITH NAME 'NAME1' |
| *SYMTB NAME1 | PRELOAD SYSTEM SYMBOL TABLE 'NAME1' |
| PUNCH | PUNCH OBJECT DECK |
| *The system symbol table name is optional. If no name is specified the default is to 'DEFIL'. The user may create as many files on the 2310 disk as is desired for use as multiple system symbol tables. Each file should be 3520 words long; further, it is the user's responsibility to assure that a save to the system symbol table has been executed before it is used. | |
| PROC, DATA, SUPR | |
| Same options as under TEST | |
| STORE | STORE OBJECT MODULE |
| EDIT | ASSEMBLE AND EDIT SOURCE TEXT AND STORE OBJECT MODULE |

PROGRAM INPUT

Source text is input from disk if PROC, DATA or SUPR assembly types are specified, while the card reader is used as the input device if the TEST is specified. If the EDIT function is used, the update source text is read from cards and merged with the original source text from disk.

PROGRAM OUTPUT

The assembler produces three optional forms of hard-copy:

(a) Program listing - The source text is listed together with the assembled code, location counter is hexadecimal and decimal, and line number is decimal. Included in the listing is time and date.

(b) Symbol table - The final state of the symbol table is produced with symbols appearing alphabetically. Also with each symbol is its defining core location and attribute (A-absolute, R-relocatable, X-external, E-entry point, U-undefined, and M-multiple defined).

(c) Cross reference - Each symbol is listed alphabetically with the line number where it is defined. A list of all the line numbers where the symbol is referenced follows. Any external or undefined symbols are so indicated.

EDIT FUNCTION

The edit feature may be used only when source text inputs is from disk (PROC, DATA, SUPR). The update deck is read from the card reader and consists of both edit directives and source statements. An edit directive card is distinguished by an — (minus) in column 1. Three basic edit features are supported:

(a) Insert - The source cards are inserted following the line number specified on the edit directive card.

(b) Delete - The source statements inclusive of the line numbers specified on the edit directive are removed.

(c) Delete/Insert - The source statements inclusive of the line numbers specified are deleted, and the source attachments that follow are inserted.

Consider the following example:

```
//JOB     X  X
//XEQ     ASM      FX
@ASM      SUPR     EXAMP       EDIT,LIST
-10
          LH       1,LOC
-15,20
-30,40
          STH      1,LOC
          OR       1,=MASK
          STH      1,LOC + 1
-END
@END
//END
```

Note that this is an assembly of a MODE 1 program with name EXAMP. User options are EDIT and LIST.

The update deck begins with the card containing -10 and ends with the edit terminator -END.

The first edit function is to insert the load half instruction after line number 10. The second function specifies delete lines 15 through 20 (if any source cards had followed, it would have been a delete/insert function). The third function is a delete/insert. The -END terminates the edit function.

The @ END specifies that no more assemblies are required while the //END terminates the TSX Non Process Monitor.

Several rules apply to the edit function. First, all references are made by line number; these line numbers reference the original source test, not the new text that is being created. Second, the referencing of line numbers must be in ascending order; i.e., there can be no 'backup' over the source text to edit a portion of the source text that has already been processed.

SYNTAX

CHARACTER SET

The allowable character set recognized by the ASSEMBLER is as follows:

| | |
|---|---|
| Numeric | 0–9 |
| Alpha (Special) | A–Z, &, $, #, @ |
| Operators Delimiters | ., „ +, −, *, (,), /,' |

DATA TYPES

Four data types are utilized in the ASSEMBLER:

1 decimal
2 hexadecimal
3 symbolic
4 character

A decimal data type is represented by any combination of numeric characters (which may be preceded by sign) in the range of $-32768 \leqq \text{range} \leqq +32768$.

A hexadecimal data type is represented by any combination of four (4) or less numb numeric or alphanumeric subset (A, B, C, D, E, F) characters preceded by a slash (/). If less than four characters appear the datum is right justified.

A symbolic data type is five (5) or less alphanumeric characters, the first of which being alpha (special). As used in this discussion, the word symbol is used synonomously with the word identifier. A special case of symbolic data recognized by the ASSEMBLER is the '*', which is used to denote the current value of the location counter. The location counter always contains the address of the current instruction; i.e., it is incremented after the instruction is assembled.

A character data type is represented by two or less characters enclosed in quotes ('). The data type causes two ASCII characters per word to be generated, and in the case that less than two characters are specified the word is filled on the right with ASCII blanks. Note that a code of zero (0) is inserted for # and @. Care is used when including the quote(') as character data.

For example:

| | |
|---|---|
| '' yields | b̸b̸ |
| ' '' yields | b̸ |
| '''' yields | '' |
| ''+' yields | '+ |
| '' ' yields | b̸b̸ [The quote is treated as a comment]. |

OPERATORS

The following binary operations are valid in the ASSEMBLER:

| | |
|---|---|
| + | addition |
| − | subtraction |
| * | multiplication |
| / | division |

In addition, + and − may be used as unary operators. Note that exponentiation is undefined.

REWRITING RULES

Expressions are formed using data types, operators, and a set of rewriting rules. These rules are given below in BNF notation.

```
<E>   = <T> | <E> + <T> | <E> − <T>
<T>   = <P> | <T> * <P> | <T> / <P>
<P>   = <λ> | <μ> <λ> | (<E>) | μ (<E>)where
                      λ denotes any data type
                      μ denotes any unary operator
                      P denotes a prime
                      T denotes a term
                      E denotes an expression
                      | denotes the connective OR
```

EXPRESSION EVALUATION

Expression evaluation is left canonical; i.e., 1 all terms are evaluated from left to right
2 a running total of evaluated terms is maintained to yield the expression evaluation.

EXAMPLES OF VALID EXPRESSIONS

The following are examples of legal expressions:

| Example | Interpretation |
|---|---|
| /100 | $100_{16}$ |
| 100//100 | $100_{10}/100_{16}$ |
| 10 * /10 | $10_{10} * 10_{16}$ |
| 10 ** | 10 * LOC CNTR |
| 10 + −5 | 10 + (−5) = 10−5 |

Parentheses may be nested to any level (until a table in the ASSEMBLER overflows). Four levels of partntheses can be handled adequately in most cases.

| | |
|---|---|
| 4 − (((5))) | 4−5 |
| LABL1−2*(*−3) | LABL1 minus twice the value of the location counter minus 3 |

EXPRESSION RELOCATION PROPERTIES

Expressions must be classified by type: either relocatable or absolute. The user must be certain that there is no ambiguity as to type. The following rules are used to evaluate expression type. Any alteration from these rules will be flagged as a relocation error by the ASSEMBLER.

The following operations are unconditional errors: where

A - absolute
R - relocatable
(1) A/R
(2) R/A
(3) R*R
(4) R/R

The following is a description of the results of valid operations:

(1) $R \pm A \rightarrow R$
(2) $aR \pm R \rightarrow (a \pm 1)R$
(3) $A*R \rightarrow aR$ where a denotes an absolute coefficient In general the end result of an expression evaluation must yield aR where a=1, valid relocatable expression
a=0, valid absolute expression
a>1, relocation error
a<0, relocation error The * when used to denote the location counter assumes the relocation property of the assembly itself.

A symbol that has been equated to an expression (by means of the EQU assembler directive) assumes the same relocation property as that of the expression.

Decimal or hexadecimal integers assume absolute properties.

INSTRUCTION FORMAT

The instruction format of the ASSEMBLER is free form.

| Label Field | Op Code Field | Variable Field | Comment Field |
|---|---|---|---|

If a label is present it must appear in column 1. Thereafter fields are delimited by one or more blanks. In a left to right scan the ASSEMBLER assumes that the first blank terminates field; thus, there can be no embedded blanks within a field. Continuation of a statement onto succeeding cards is not supported.

The op code and variable fields are required, while the comment field is optional. For most statements the label field is optional, but statements (assembler directives) which require a label or absence of a label will be noted appropriately throughout the discussion of assembler directives.

ADDRESSING

Addressing may take one of two forms in the ASSEMBLER - direct or relative. Once an instruction has been named by placing a symbol in its label field, it is possible for other statements to refer to that instruction by using the same symbol in their variable fields; i.e., direct addressing. It is often convenient, moreover, to reference instructions preceding or following the instruction named by indicating their position relative to that instruction; i.e., relative addressing. A very useful special case of relative addressing is addressing relative to the current value of the location counter (*+10). Note that a relative address is one explicit example of an expression.

ASSEMBLER DIRECTIVES

Assembler directives are non-executable statements that direct the ASSEMBLER to perform a special task. For example, the ASSEMBLER can definic constants, allocate storage, equate symbols, control the listing, etc. The following sections describe the specific facilities of the ASSEMBLER available to the user as directives.

MODE REQUIREMENTS

Programs to be assembled by the ASSEMBLER fall into two major categories:

(1) MODE 1 or supervisory programs (2) MODE 2 or machine procedures

Since certain instructions and assembler directives are not valid in both modes, the mode must be specified to the ASSEMBLER as the first statement (only comments and list control statements may precede it).

MODE - Mode description: to specify a MODE 1 program, for example, the user would write in the OP code and Variable fields respectively:

| | |
|---|---|
| MODE | 1 |

The 'MODE' assembler directive may not be labeled. If a label is present, a non-terminating error message is generated and the label discarded.

A default to MODE 2 is performed if the mode is not the first statement or if an error is made in the instruction.

RELOCATION REQUIREMENTS

The second piece of information the ASSEMBLER requires is program relocation property. Several directives are available for this purpose:

(1) ABS - absolute (2) MDATA - absolute (3) ENT - relocatable/absolute

ABS - Absolute relocation property: The ABS statement is used only in MODE 1. Its function is to identify the program as absolute and also to provide the program name. The program name may be five characters in length.

| | |
|---|---|
| ABS | NAME |

Only one ABS statement is allowed per program, and labels are not allowed.

MDATA - Machine data description: The MDATA statement is used only in MODE 2. Its sole purpose is to identify a program as machine data. The MDATA statement may not be labeled but all statements thereafter (excluding the END statement) require labels. Only one MDATA statement may appear per program; further, it must follow immediately the MODE statement (excluding comments and list control statements).

ENT - Entry point specification: The ENT statement is used in MODE 1 only to denote a relocatable assembly and also to identify the entry points. Up to 10 entry points may be defined per program.

OTHER DIRECTIVES

ORG - Origin: The location counter is set to the value of the expression in the variable field if the values resides within a specified core size. ORG is valid only in MODE 1, and labels are not allowed.

EQU - Equate: The label is equated to the value of the expression in the variable field. The label assumes the same relocation property as that of the expression. The variable field must not contain forward references. A label is required.

DC - Define Constant: The ASSEMBLER defines a 16 bit constant as specified by the expression in the variable field. Labels are optional.

LIST - List Control: If the variable field contains 'ON' the listing is turned on, if 'OFF' the listing is turned off. Labels are not allowed.

HDNG - Heading: Slew listing to top of page and print the card image as a page heading. Labels are not allowed.

BSS - Block Starting Storage: The number of 16 bit words as specified by the expression in the variable field is allocated. The label, if any, is assigned to the first word in the block.

BES - Block Ending Storage: Same as BSS, but the label, if any, is assigned to the first word immediately following the block.

BSSE - Block Starting Even Storage: Same as BSS but first word of the block is slewed to the next even address.

BSSO - Block Starting Odd Storage: Same as BSS but first word of the block is slewed to the next odd address.

END - End: The END directive denotes the end of the assembly. It must appear as the last statement of all assemblies and may not be labeled. The variable field is not scanned.

MDUMY - Machine Dummy Data: The MDUMY statement indicates the beginning of a machine dummy data block. Similar to the MDATA, which specifies an actual machine data block, all statements (except the END statement) require labels. MDUMY is valid only in MODE 2.

CALL - Call Subroutine: The CALL statement is valid only in MODE 1 relocatable programs. The variable field contains the subroutine name, which may be the same as an internal symbol.

REF - External Symbol Reference: The REF statement is valid only in MODE 1 relocatable programs. The variable field contains a symbol which is to be treated as being defined external to this assembly. The loader will fix up the address to the eternally defined symbol.

DEF - Define Symbol External: The DEF statement is valid only in MODE 1 relocatable programs. The variable field contains the name of an internally defined symbol which is to be known external to this assembly. The loader will use the external symbol to satisfy REF's in other assemblies.

The comment is denoted by placing an * in column 1. The resulting effect is to have the card image listed; no further assembler processing is performed on the card.

THE ASSEMBLER

The ASSEMBLER is a two-pass ASSEMBLER. It is designed to permit changing the instruction set on which it operates. It is designed to execute on an IBM 1800 computer with TSX operating system. It may be executed as a stand-alone program (non-process program).

The functions of the ASSEMBLER are:

1. (Option) Accept as input the description of all instructions to be recognized by the ASSEMBLER.
2. Convert instruction mnemonics to machine language.
3. Assign addresses to statement labels.
4. Decode and convert operand field entries according to the instruction definition. (description)
5. Generate object code composed of machine operation code and subfields according to the instruction definition.
6. Diagnose errors.

To disassociate the ASSEMBLER itself from the source language and object code it is to produce is a departure from standard ASSEMBLER implementation practice. The technique used is to describe both source and object texts to the ASSEMBLER through a linked list data structure (which can be easily modified). Two problems are thus posed to the ASSEMBLER:

1. Recognition in source language, and
2. After recognition, translation through the appropriate data structure to output object code.

Only ASSEMBLER directives are implemented in the conventional "recognition-subroutine call" approach.

PROGRAM ORGANIZATION

The ASSEMBLER is organized in five parts; an assembler definition, a control record analyzer, pass one, pass two, and an epilog.

The assembler definition generates and saves on disk a symbol table describing the instruction set to be implemented by the ASSEMBLER. This is a terminal path through the ASSEMBLER, control is passed back to the operating system.

The control record analyzer builds a control vector specifying the options selected on control cards and passes control to Prolog.

Pass One beings with a Prolog which initializes core memory for a normal assembly. Optionally, it will compose an edit file from the card reader. This edit file will be merged with the original source text file.

The remainder of Pass One adds all new symbols encountered to the symbol table. It reads in source text and scans each card image for labels and op codes. It enters each symbol in the symbol table, assigns addresses for each lavel, allocates core storage for each instruction, and generates and saves "Pass two text". Optionally, it will add, delete or replace source text as specified in the edit file. It passes control to Pass Two. At the completion of Pass One in the symbol table is completely defined.

Pass Two reads in "Pass Two Text" and continues the scan of the card image for operands. It builds each instruction by combining the op code and operands, according to the description contained in the symbol table (instruction defined), and generates and saves on disk an object module. Optionally, it will write source text to disk (2311). It passes control to the Epilog.

The Epilog prints error messages for any errors which occurred during assembly. Optionally, it will print the symbols (labels) encountered during assembly, print a cross reference table for labels, and save the generate symbol table as the system symbol table. Execution of the Epilog terminates the assembly; control is passed back to the operating system.

The elementary programs (implemented as subroutines) which perform tasks for the five parts of the ASSEMBLER are described in a section on UTILITIES.

PROGRAM OPERATION

The ASSEMBLER operates basically in two modes:

1. Assembler definition mode, where both the source language and ASSEMBLER machine instructions are described to the ASSEMBLER, and 2. User operation mode, where source language programs are assembled.

In both categories, the input device is, in the described embodiment, restricted to a card reader (disk input not permitted) and the job must be executed as a non-process batch job.

Translation of the instruction: Load-1,100 by the ASSEMBLER is illustrated in FIG. 16.

ASSEMBLER DEFINITION MODE

CORE LOAD CHAIN FOR ASSEMBLER DEFINITION

The core load for ASSEMBLER definition is shown in TABLE XVII below.

TABLE XVII

| CORE LOAD NAME | MAINLINE RELOCATABLE NAME |
|---|---|
| ASMD1 | ASMD |
| ↓ | |
| ASMD2 | ASM2 |
| ↓ | |
| ASMD3 | ASM2A |
| ↓ | |
| ASMD4 | INTZL |
| ↓ | |
| ASM3B | ASM31 |
| ↓ | |
| ASMD3A | ASM32 |
| ↓ | |
| FINISH | FINT |
| ↓ | |
| EXIT to non process monitor | |

1. Execution of Assembler Definition (chain of core loads beginning with ASMD1)

The "assembler definition" is a collection of programs which perform the following functions.

a) Zero the tables, flags and counters which describe the symbol table.

b) Enter pre-defined keywords and ASSEMBLER directives as symbol table entries. The algorithm for entering symbols is described in TABLE STRUCTURE, A. Symbol Table B. Has Table Entries.

c) Read a card defining an instruction (by mnemonic).

d) Test the mnemonic for five characters or less.

e) Test the associated op code number to be monotone sequential increasing, not to exceed 128.

f) Enter the mnemonic as a symbol table entry, return to c) until blank card is encountered.

g) Save the upper boundary of space allocated for the symbols now in the symbol table and save the count of the number of mnemonics defined.

h) Allocate storage for an op code list (a list of pointers, one for each op code to be defined (number of mnemonics entered).

i) Perform error checking on each of the following:
   1. Multiple entries.
   2. Sequential, monotone increasing input identical to order of mnemonics (already input).
   3. Op code within limits.
   4. Syntax type within limits.
   5. Core allocation within limits.

j) Enter the "instruction header" in the next available space in the symbol table and enter the address of the first header word in the op code list.

k) Read card(s) (for each allowable mode of this instruction) describing for each field of the instruction the number of bits (field width), and field code number and data word (field composition).

l) Allocate and build an instruction composition list for the allowable mode(s) and set pointers for both modes in the instruction header (0 if not an allowable mode).

m) Return to i) until blank card is detected (mode=0).

n) If no errors were detected, set the upper boundary of the symbol table and save it in disk storage.

o) Terminate program execution.

When assembler definition is successfully completed (no errors), the symbol table contains: 1) a table of pointer linking "similar " symbol entries into chains (see entry algorithm description); 2) entries for each keyword and assembler directive to be recognized by the ASSEMBLER; 3) a list of pointers to the instruction definition for each operation code to be implemented by the ASSEMBLER; and finally 4) entries describing the fields and subfields required, for each instruction.

| ASMD | |
|---|---|
| Type | FORTRAN Mainline |
| Function | Initialize the symbol and calls for the preloading of the assembler key words. |
| Availability | Relocatable area. |
| Use | XEQ ASMD1 FX which is the core load name of which ASMD is the mainline. |
| Subprogram called | KEYAD |
| Core loads called | ASMD2 |
| Remarks | Core load ASMD1 is the first core load of a chain of core loads which performs the assembly definition. The core load is called by the non-process monitor. |
| FLOW CHART | Described in TABLE XVIIIa. |

TABLE XVIIIa

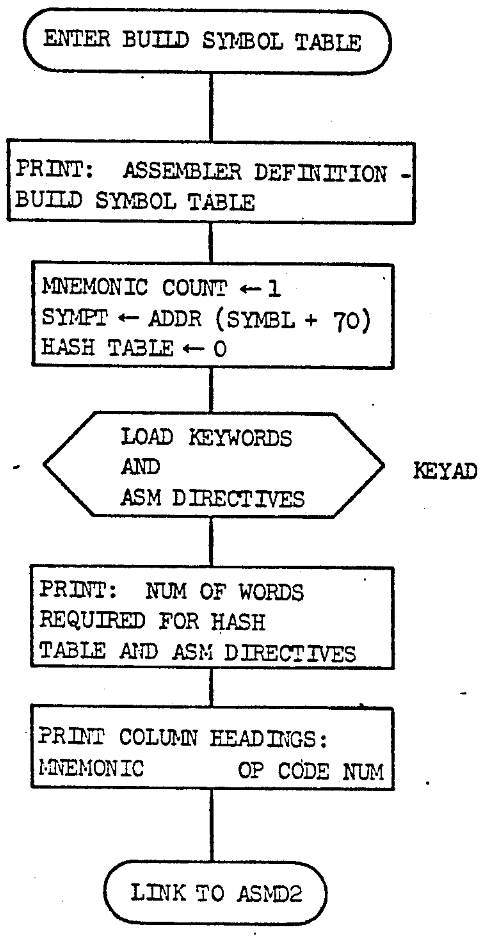

KEYAD

| | |
|---|---|
| Type | FORTRAN Subroutine |
| Function | Adds key words to the symbol table |
| Availability | Relocatable area |
| Use | Call KEYAD |
| Subprogram called | LOAD3 |
| Remarks | To add new keywords to the ASSEMBLER requires that a data statement containing the mnemonic be added, the array IRAY increased by three words per key word, and the upper limit on the DO loop increased so as to load the whole array IRAY. Also, |

provisions must be added to pass 1 frame and pass 2 frame

Flow Chart — Described in TABLE XVIIIb

LOAD 3

| | |
|---|---|
| Type | Nonrecursive Subroutine |
| Function | Converts symbol to name code, creates a symbol table entry and inserts the op code number into the TYPE field of the attribute word. |
| Availability | Relocatable area. |
| Use | CALL LOAD3 (ARRAY, INDEX, OPCODE, NUM) |
| Subprogram called | COMPS, HASH, FXHAS, INSYM, PRNTN |
| Remarks | ARRAY and INDEX point to the keyword to be inserted into the symbol table. The OPCODE NUM is inserted into the TYPE field of the attribute word. Multiply defined symbols are detected here during ASSEMBLER definition. |
| Flow Chart | Described in TABLE XVIIIc |

TABLE XVIIIb
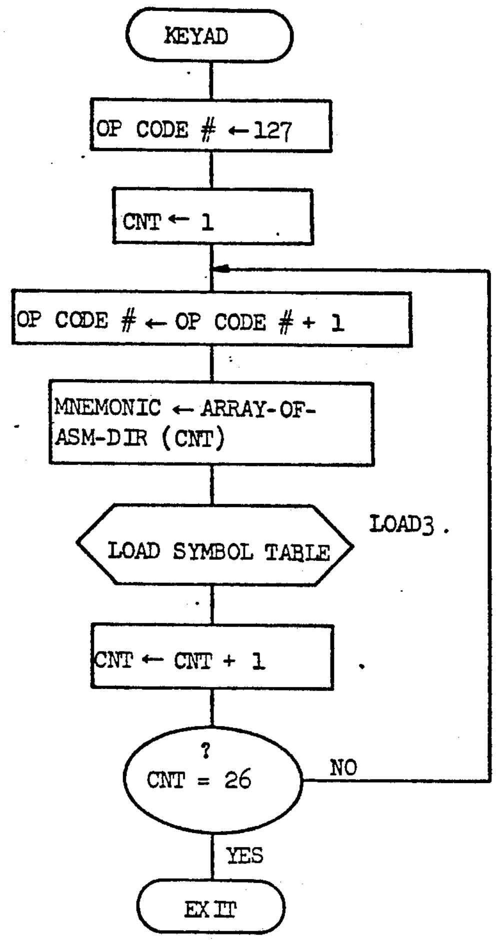

TABLE XVIIIc
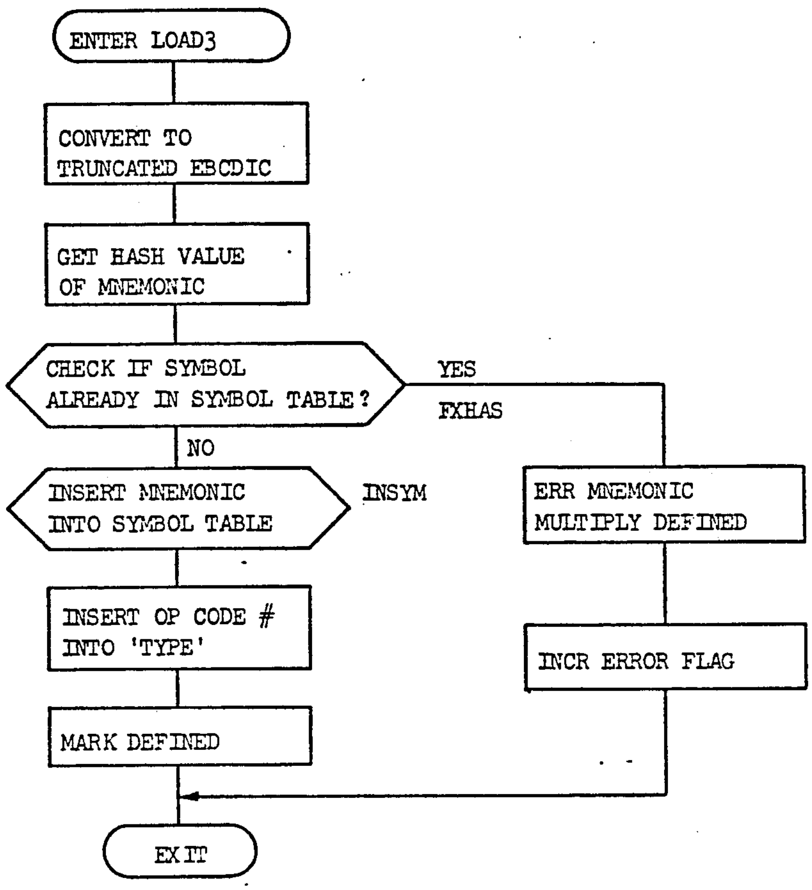
ASM2
| | |
|---|---|
| Type | FORTRAN mainline |
| Function | Initiates building of the symbol table as defined by the user. |
| Availability | Relocatable area. |
| Use | CALL LINK(ASMD2) is executed in ASMD1. ASMD2 is the core load name of which ASM2 is the mainline routine. |
| Subprograms called | IAND, LOAD3. |
| Core Loads Called | ASMD3 |

Remarks

ASMD2 is the second core load in the chain. The first core load, ASMD1, loads the symbol table with the fixed key words and symbols. ASMD2 reads the symbol table build section of the user's deck, adds the symbols, and produces the listing of the symbol added. Error checking includes mnemonics greater than 5 characters, improper value for op code and non-sequential op code number. A count of the number of mnemonics read is maintained so that a subsequent core load can allocate storage for the op code list.

Flow Chart

Described in TABLE XVIIId

TABLE XVIIId
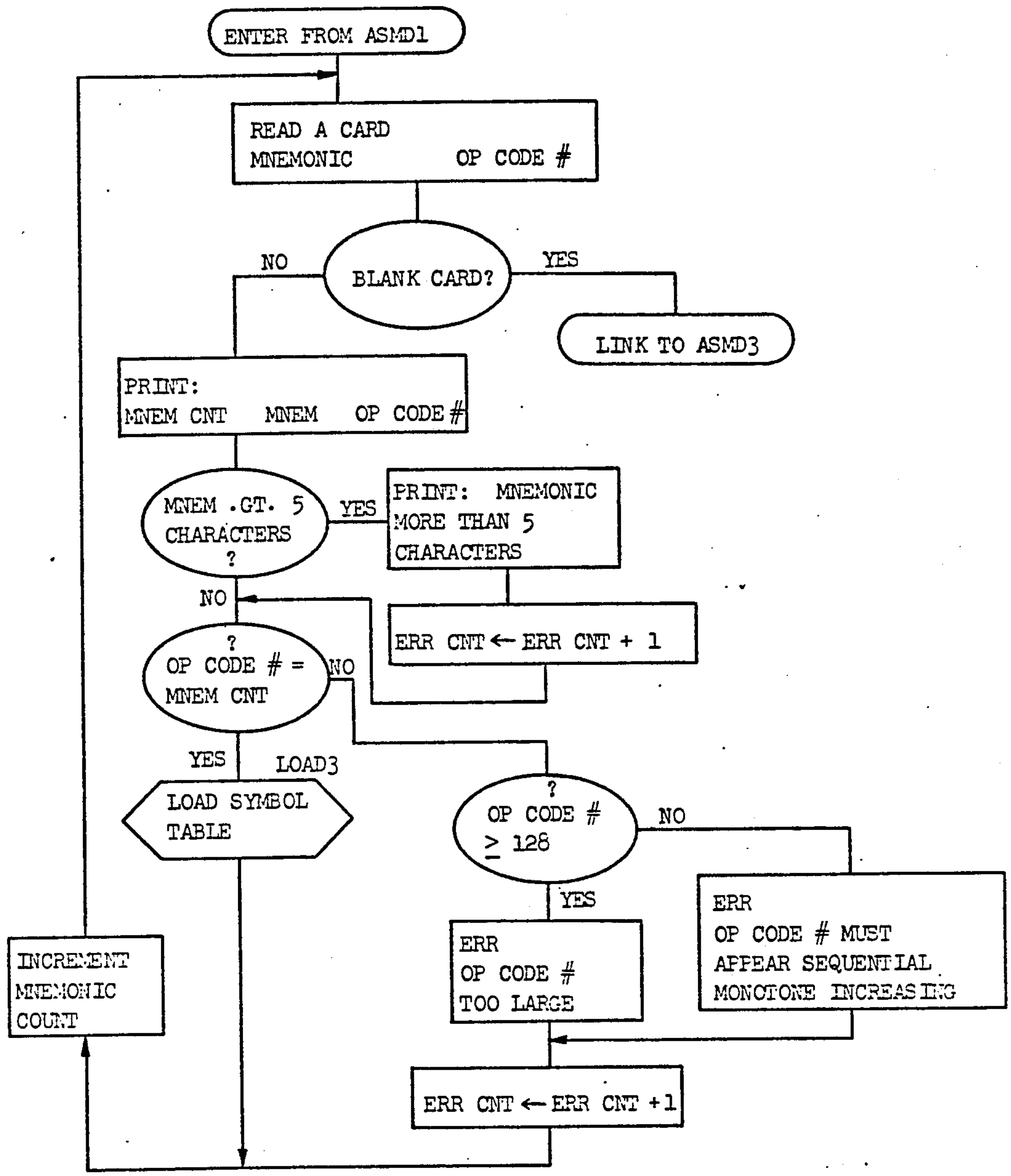
ASM2A
| | |
|---|---|
| Type | FORTRAN Mainline |
| Function | Wrap up of loading of the symbol table |
| Availability | Relocatable area |
| Use | CALL, LINK(ASMD3) is executed in core load ASMD2. |

Subprograms called None

Core Loads Called ASMD4

Remarks A test is made to determine if any errors occurred during the symbol table build, and a termination of the assembler definition occurs if errors were made. Finally, a pointer is set at the end of the symbol table so that instruction composition build may begin.

Flow Chart Described in TABLE XVIIIe.

TABLE XVIIIe

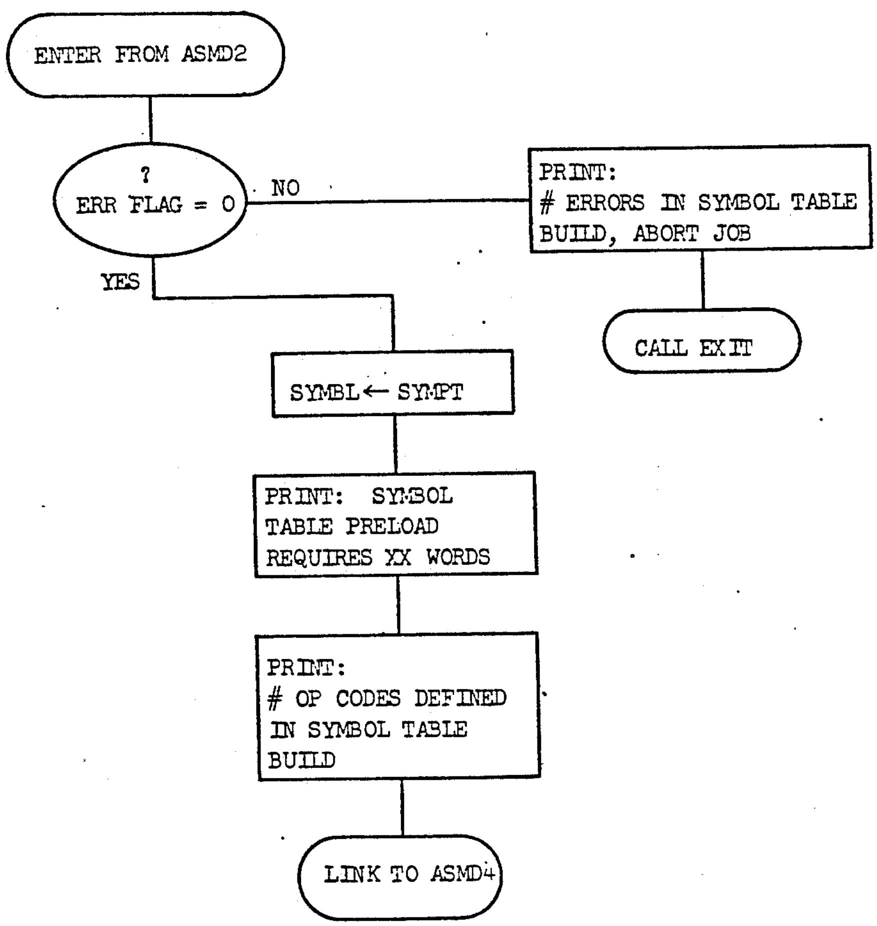

INTZL

| | |
|---|---|
| Type | FORTRAN mainline |
| Function | Prepares for instruction composition build. |
| Availability | Relocatable area. |
| Use | CALL, LINK(ASMD4) is executed in core load ASMD3. |
| Subprograms Called | ZROP |
| Core Loads Called | ASM3A |
| Remarks | INTZL prints headings and calls for the zeroing of the op code list. |
| Flow Chart | Described in TABLE XVIIIf |

ZROP

| | |
|---|---|
| Type | Nonrecursive Subroutine |
| Function | Zeros the op code list |
| Availability | Relocatable area |
| Use | CALL ZROP |
| Subprogram Called | None |
| Flow Chart | Described in TABLE XVIIIg |

TABLE XVIIIf
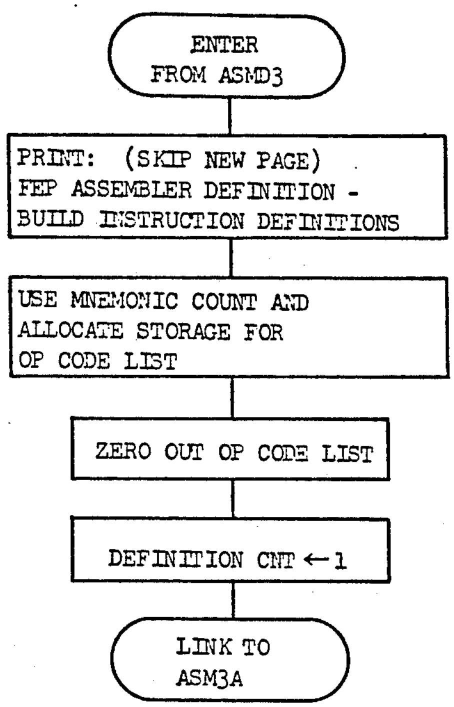
TABLE XVIIIg
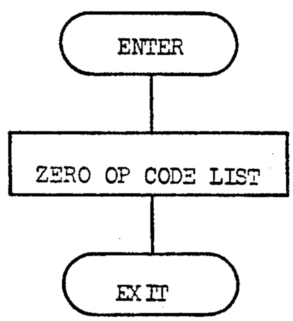

ASM31

| | |
|---|---|
| Type | FORTRAN Mainline |
| Function | Reads instruction definition header cards, prints header card information, checks for errors and calls for the header to be built. |
| Availability | Relocatable area |
| Use | CALL LINK (ASM3A)<br>ASM3A is the core load name |
| Subprograms called | CHECK, ISIT, BLDHD |
| Core Loads Called | FINSH |
| Flow Chart | Described in TABLE XVIIIh |

TABLE XVIIIh
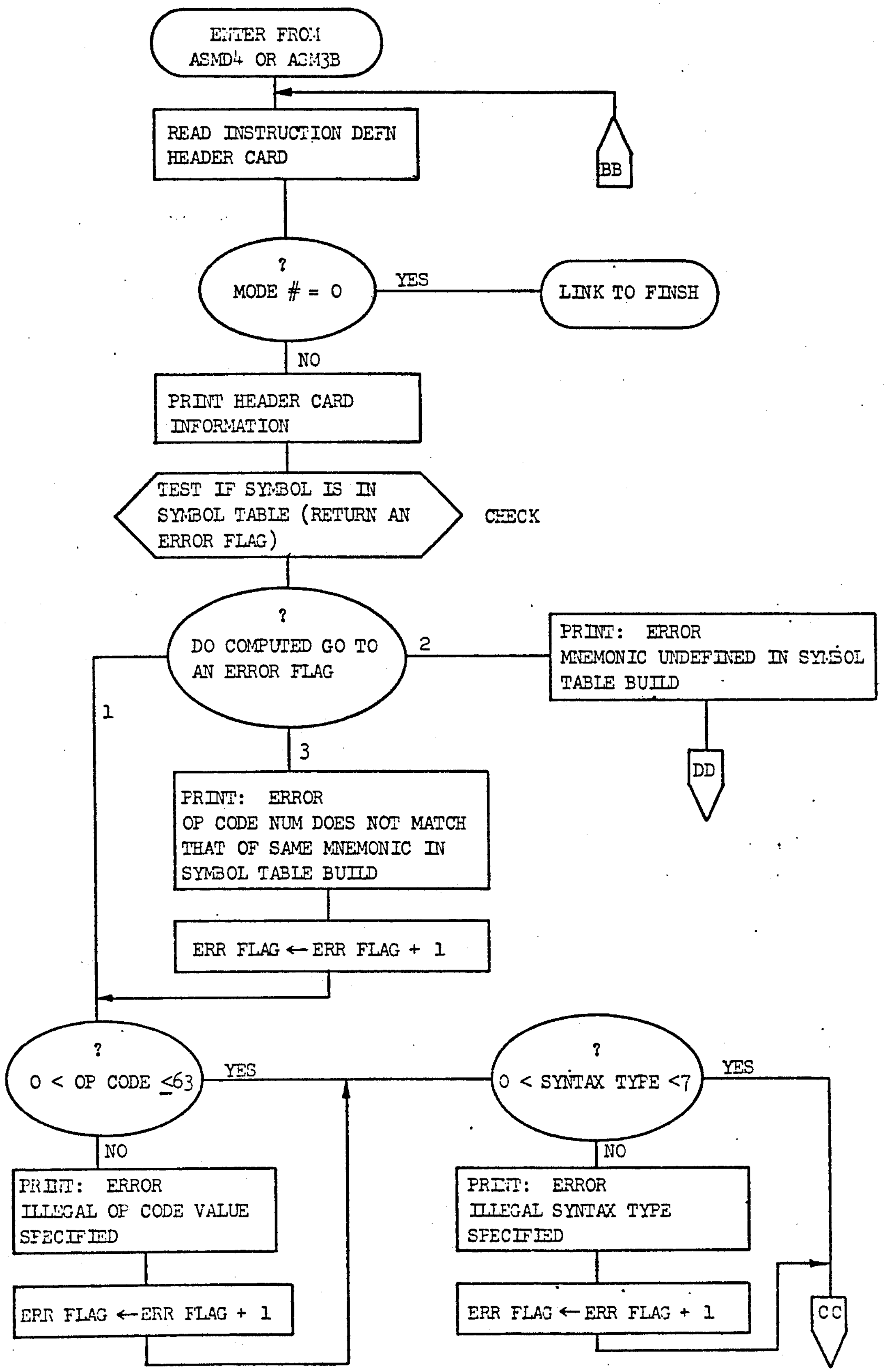

TABLE XVIIIh (cont'd)
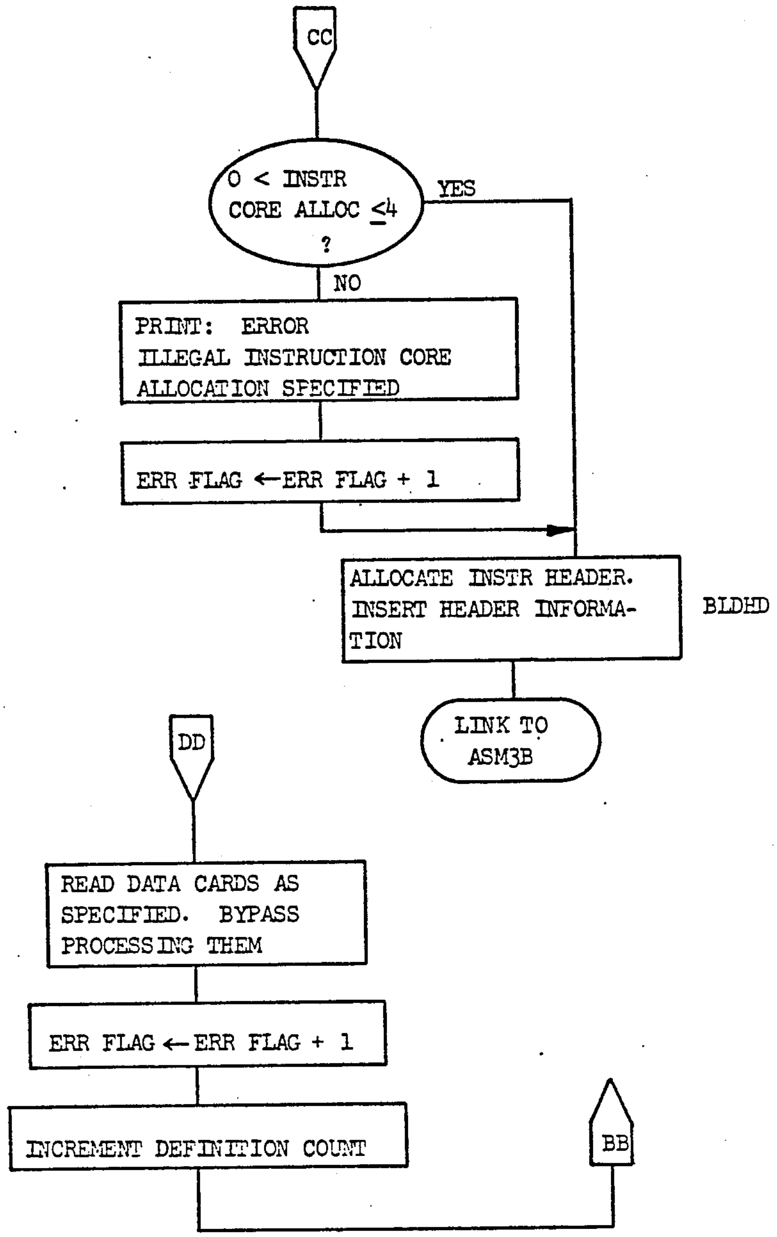

CHECK

| | |
|---|---|
| Type | Nonrecursive Subroutine |
| Function | Checks if mnemonic is already in symbol table. |
| Availability | Relocatable area. |
| Use | CALL CHECK (Mnemonic, op code number, IGOOD |
| Subprograms Called | COMPS, HASH, FXHAS |
| Remarks | IGOOD is returned 1 if symbol already present<br>2 if symbol not present<br>3 if symbol present but types not equal |
| Flow Chart | Described in TABLE XVIIIi |

BLDHD

| | |
|---|---|
| Type | Nonrecursive Subroutine |
| Function | Allocates storage for the instruction definition header and formats and inserts data into the header. |
| Availability | Relocatable area. |
| Use | CALL BLDHD (Op code number, op code, relocation test type, syntactic type, core allocation, P2 text flag, base address of op code list, address of instruction header. |
| Flow Chart | Described in TABLE XVIIIj |

TABLE XVIIIi
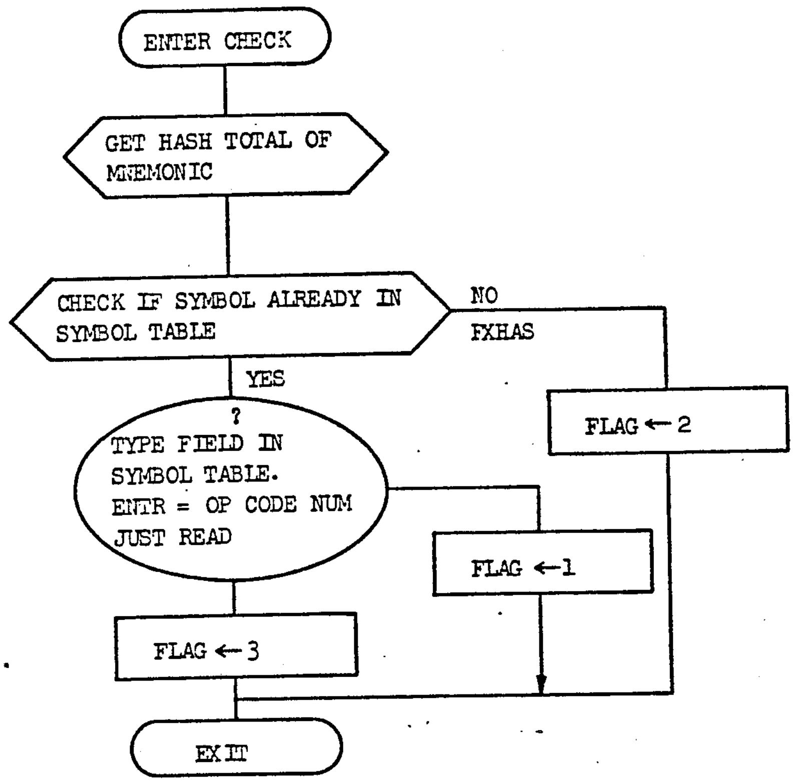
TABLE XVIIIj
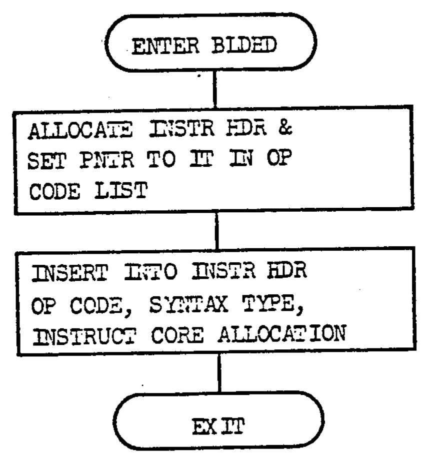

ASM32

| | |
|---|---|
| Type | FORTRAN Mainline |
| Function | Reads and prints instruction composition cards and calls for the instruction composition list to be created. |
| Availability | Relocatable area |
| Use | CALL LINK (ASM3B)<br>ASM3B is the core load name. |
| Subprograms Called | ALBLD |
| Core Loads Called | ASM3A |
| Remarks | ASM3A links to ASM3B which links back to ASM3A. Both core loads compose the heart of the assembler definition. ASM3A builds the instruction composition header, then links to ASM3B where the instruction composition list is composed. A link back to ASM3A is executed to process the next instruction. |
| Flow Chart | Described in TABLE XVIIIk |

TABLE XVIIIk
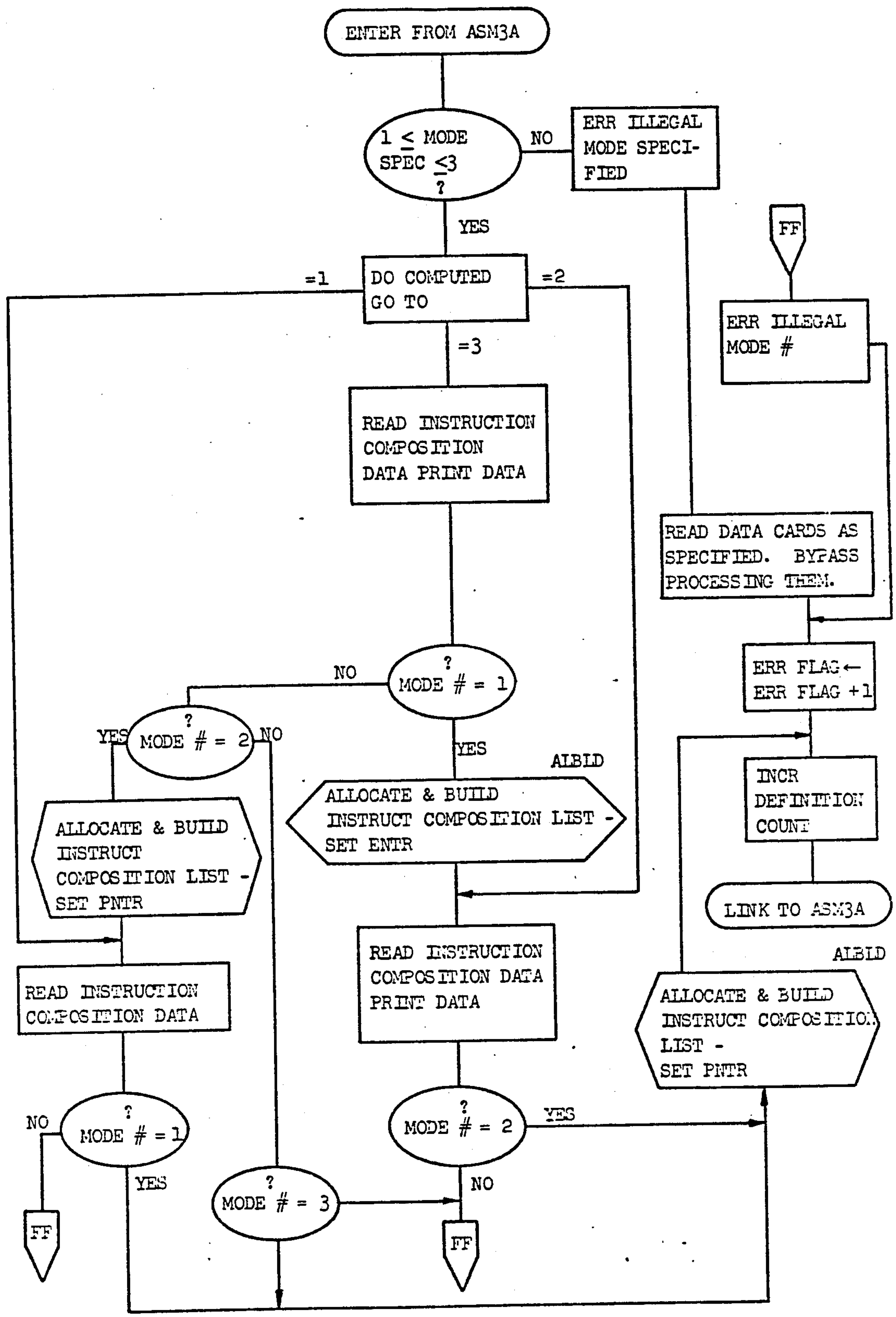

ALBLD

| | |
|---|---|
| Type | Nonrecursive Subroutine |
| Function | Allocates storage for the Instruction Composition List, formats and inserts the data into the list, and sets pointers in the instruction header to the composition lists. |
| Availability | Relocatable Area |
| Use | CALL ALBLD (Number of fields, list of number of bits in each field, list of field codes, list of data, address of instruction header, core allocation required, mode number). |
| Subprograms Called | PRNTN |
| Flow Chart | Described in TABLE XVIIIl |

ISIT

| | |
|---|---|
| Type | Nonrecursive Subroutine |
| Function | Determines type of card read |
| Availability | Relocatable area |
| Use | CALL ISIT (MNEMONIC, INK) |
| Subprograms Called | None |
| Remarks | INK is returned 1 if numeric data<br>2 if blank (end) card<br>3 alpha data |
| Flow Chart | Described in TABLE XVIIIm |

TABLE XVIIII
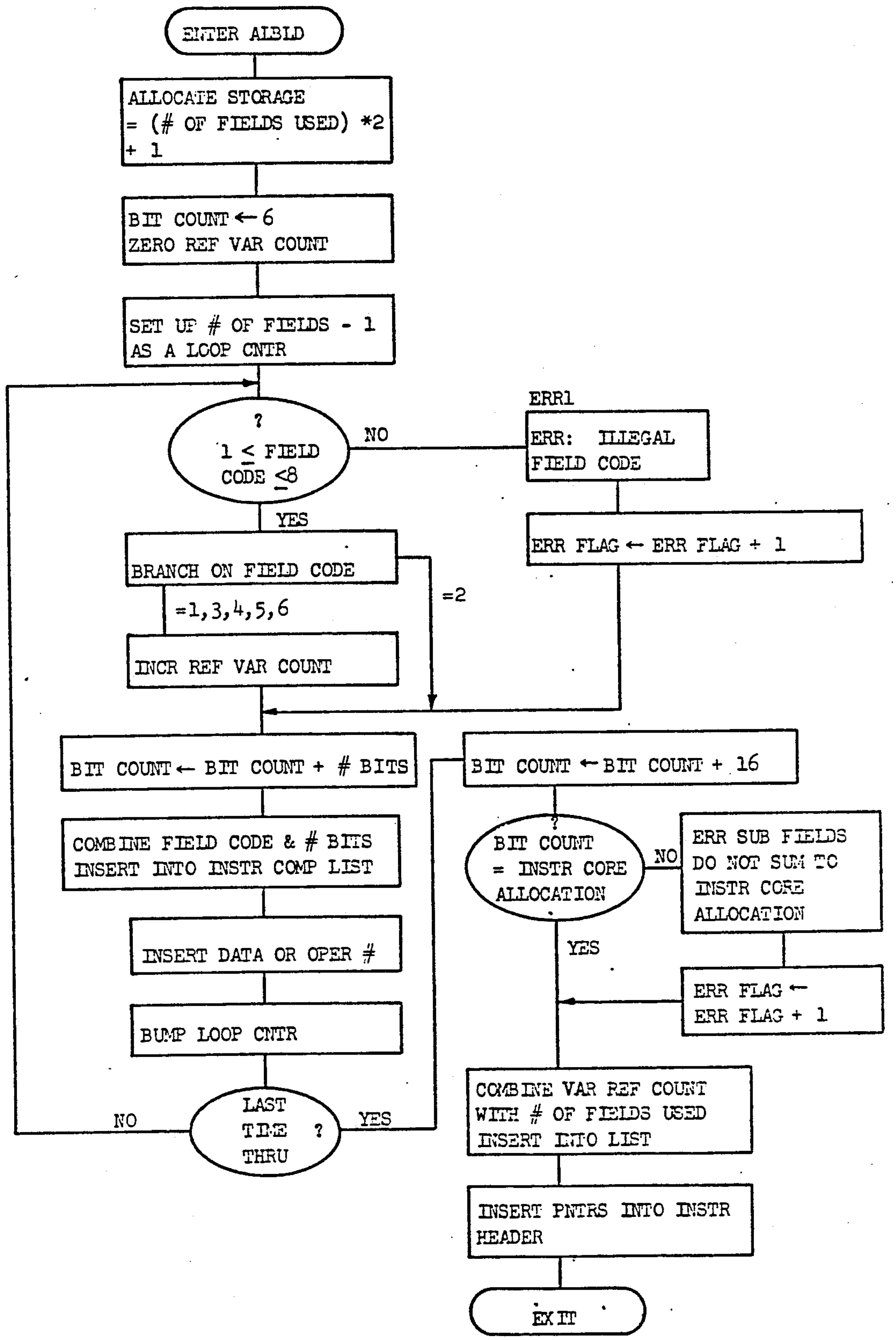

TABLE XVIIIm
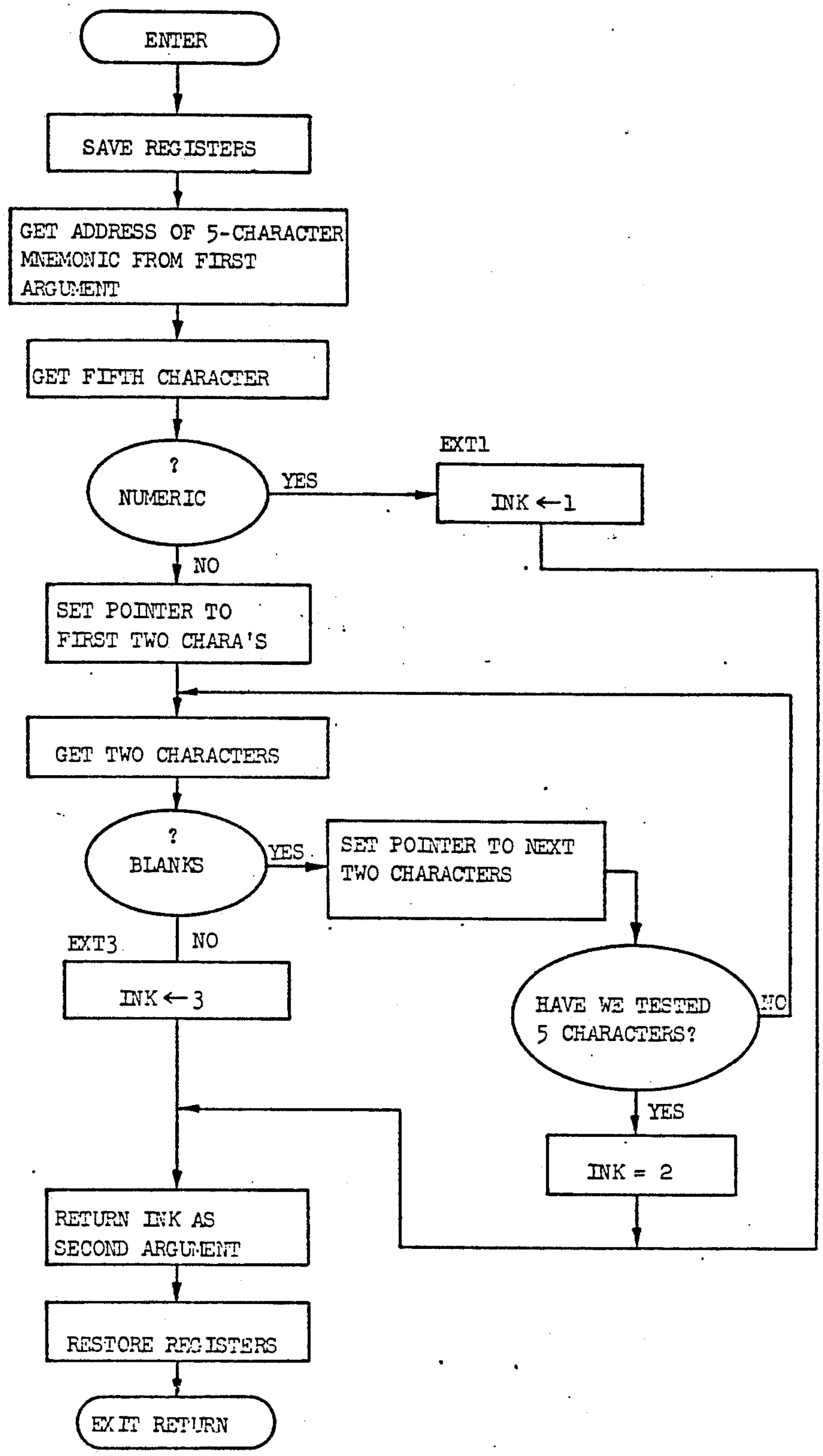

FINT

| | |
|---|---|
| Type | FORTRAN Mainline |
| Function | Wraps up assembler definition |
| Availability | Relocatable area |
| Use | CALL LINK (FINSH) |
| | FINSH is the core load name |
| Subprograms Called | WRTFL |
| Remarks | Routine checks if any errors have occurred and if so aborts the definition; it prints statistics concerning core requirements; finally it calls for the symbol table to be written to the 2310 disk file DEFIL. FINSH is called by core load ASM3A. |
| Flow Chart | Described in TABLE XVIIIn |

TABLE XVIIIn
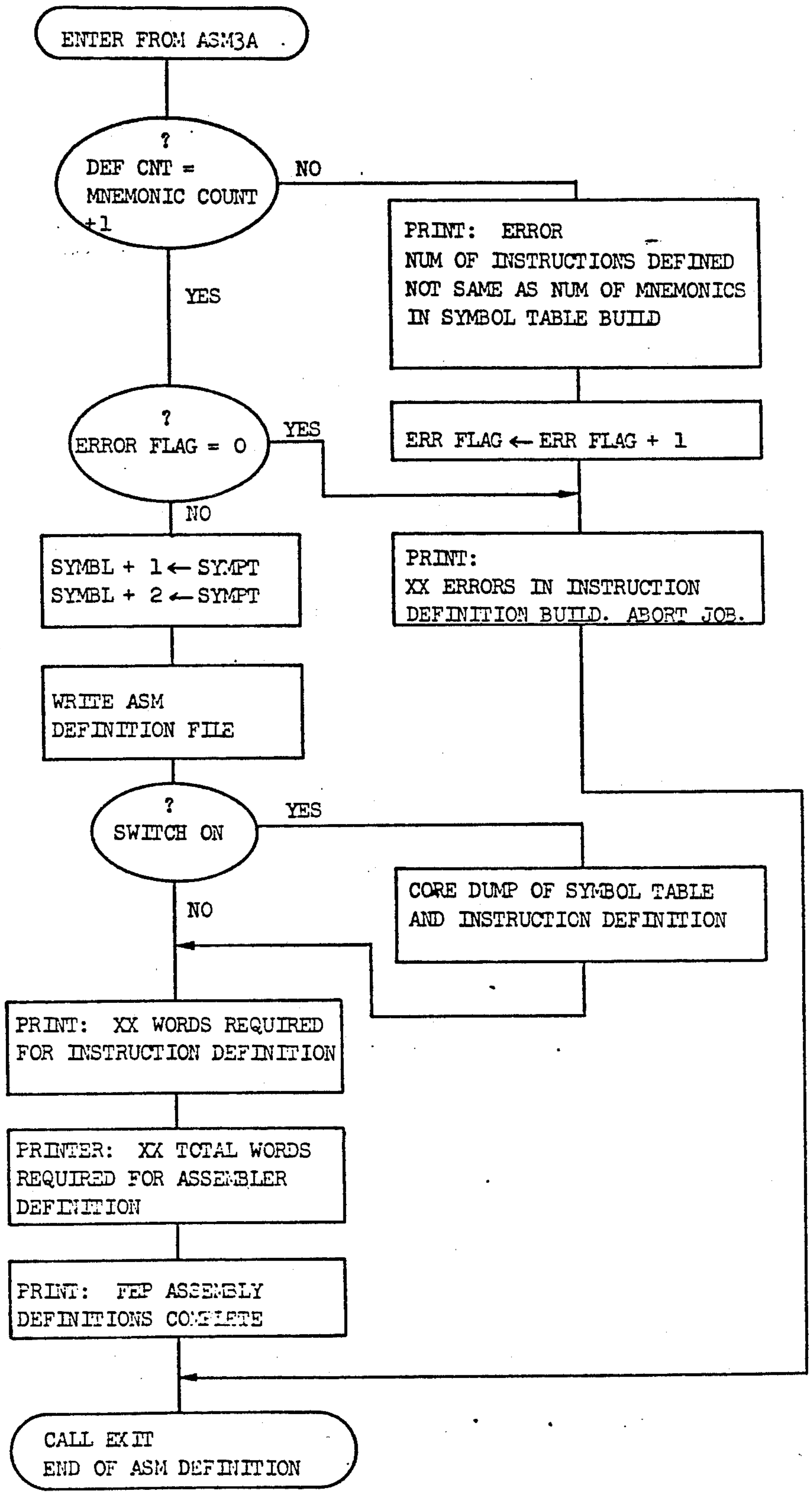

USER OPERATION MODE

CORE LOAD CHAIN FOR NORMAL ASSEMBLY USING THE ASSEMBLER

The Core load chain for normal assembly is shown in TABLE XIX below.

TABLE XIX

| CORE LOAD NAME | MAINLINE RELOCATABLE NAME |
|---|---|
| MASM ↓ | ASMF |
| PASS1 ↓ | PRQL1 |
| ASMP2 ↓ | INIP2 |
| ASP2A ↓ | P2FRM |
| EPLOG | EPLG |

2. Execution of Analyzer

The Analyzer reads a control card and builds a control vector specifying options for the ASSEMBLER. The options are as follows:

1. card input
2. disk input
3. listing
4. use system symbol table
5. save symbol table
6. punch cards (object deck)
7. punch tape (object deck) - Not implemented
8. name the program being assembled
9. store the program on disk
10. edit source text and assemble

CONTROL RECORD ANALYZER

ASMF

| | |
|---|---|
| Type | Mainline Program (FORTRAN) |
| Function | The program reads, prints and analyzes control cards for assemblies. Detection of |

"@END" card, or other than "@ASM" will be scanned to pick out program type, program name(s), and options. The four program types accepted are procedure (PROC), data (DATA), supervisory (SUPR), and test (TEST). For procedure, data, and supervisory types, the program calls subroutine FETFA to find disk file and record of source and object code for the named program. Subprogram OPTNS is called to build a control vector describing which options are specified for the assembly. The program exits to Pass 1 if no fatal errors are detected.

Availability — Relocatable program area.

Use — The program is entered either via // XEQ card (non-process monitor), or via link from the EPILOG of the ASSEMBLER.

Subprograms called — Call FETFA (IFLAG, NAM3(6), NAM2(6), NAM1(6), IERR)

where IFLAG = 1, 2, 3 or 4, indicating procedure, data, supervisory or test program type, respectively; NAM1(6), NAM2(6), NAM3(6) each point to arrays containing some (10 characters, A2 format, in reverse array order) read from the control card;

IERR is an error indicator returned by the subprogram.

Call OPTNS (IFLAG, IOPTN, IERR)

where IFLAG, IERR are described above;

IOPTN is an array containing the option list read from the control card.
Core Loads Called: PASS 1
Remarks: EPILOG links to this program to permit batching of assemblies in a job stream.
Flow Chart: Described in TABLE XXa
TABLE XXa
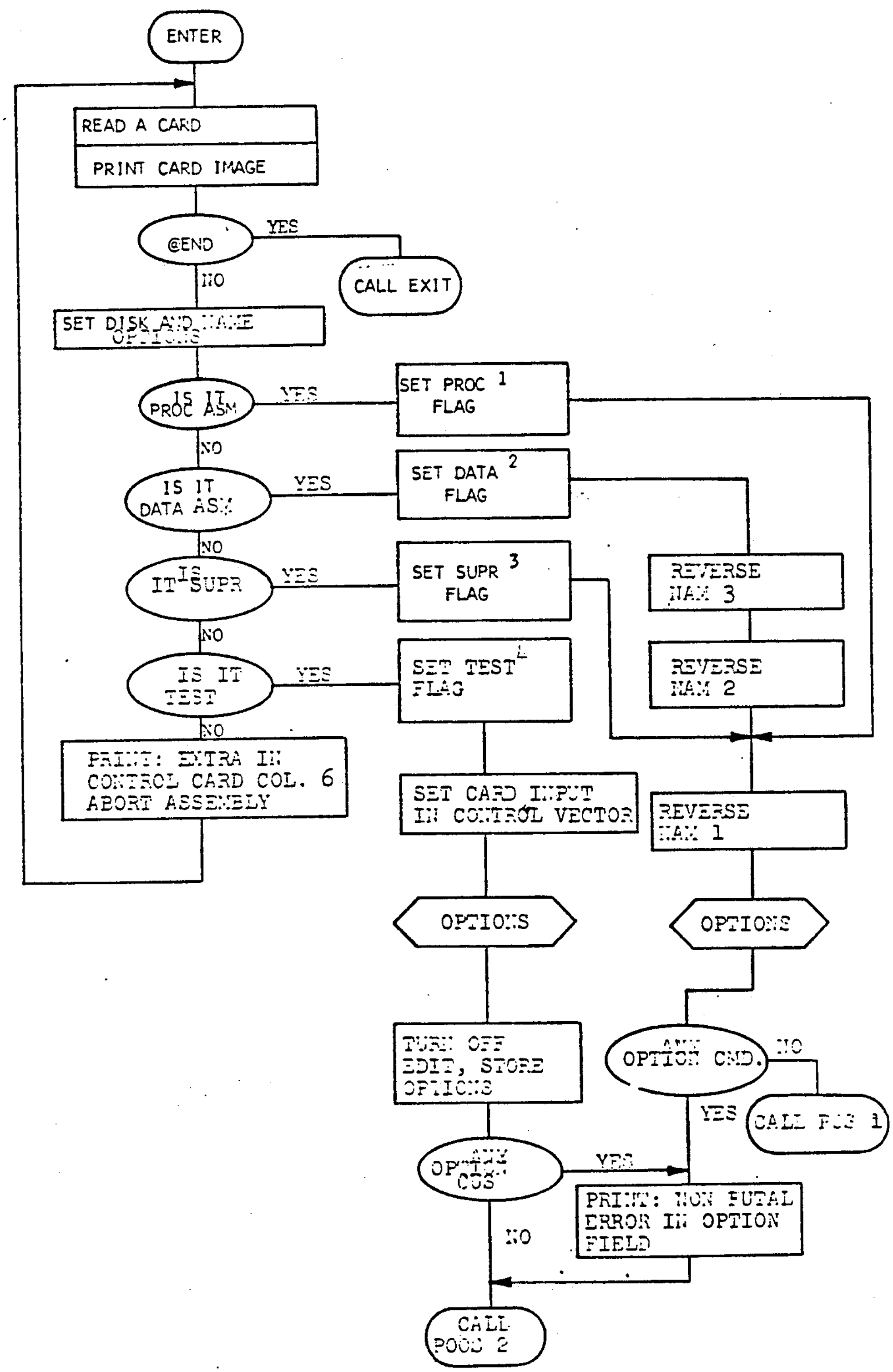

OPTNS

Type Nonrecursive Subroutine (FORTRAN)

Function The subroutine scans an array of options read from a control card. The options are in A2 format, separated by commas, and the option field ends with a blank character. The program builds the control vector CONTL used by the ASSEMBLER by setting bits corresponding to each option in the option list. If system symbol table options appear in the list, the program calls subprogram FINDN to find the file and record number corresponding to the symbol table name designated in the option list. Error conditions detected cause the subroutine to return an error flag to the calling program.

Availability Relocatable program area.

Use The calling sequence is

Call OPTNS (IFLAG, IOPTN, IERR)

where IFLAG = 1, 2, 3 or 4, indicating procedure, data, supervisory or test program type;

IOPTN is an array containing the option list;

IERR is an error i- ator eturned by the subroutine.

Subprograms called Call COMPS (NAME(3), XNAME)

where NAME is an array containing the disk file name "DEFIL" and XNAME is returned as the truncated packed EBCDIC equivalent.

Call FLISH (XNAME, IDAT(3))

where XNAME is described above, and IDAT is the three word FLET entry corresponding to XNAME.

Call FINDN (IOPTN, I, IWCV, ISAV)

where IOPTN is described above; I points to a symbol table named in the option list; IWCV and ISAV are the word count and sector address returned by FINDN, corresponding to the symbol table named in the option list.
Limitations The option list is limited to 40 characters.
Flow Chart Described in TABLE XXb
T · · XXb
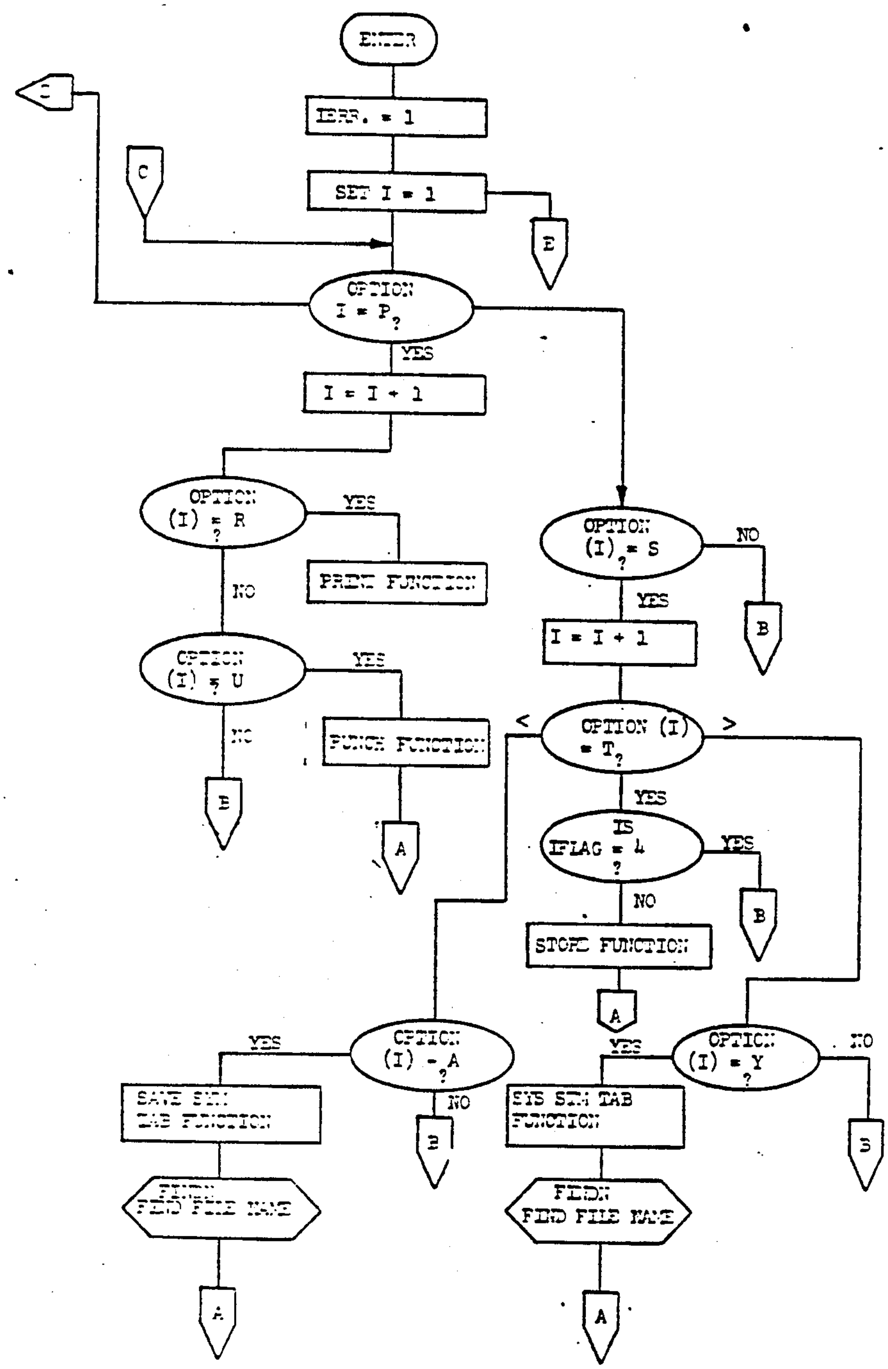

TA: ...
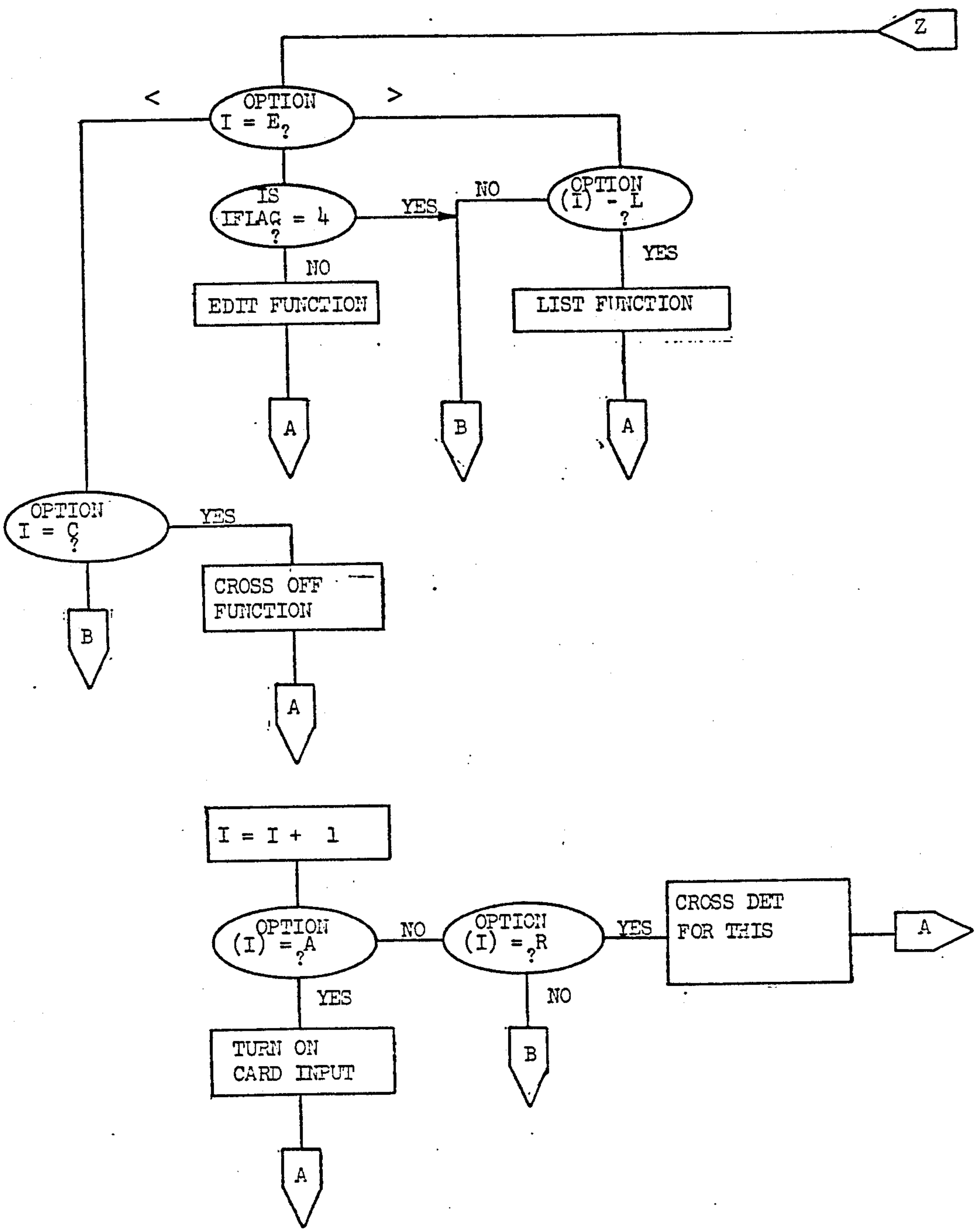

TABLE XXb (cont'd)

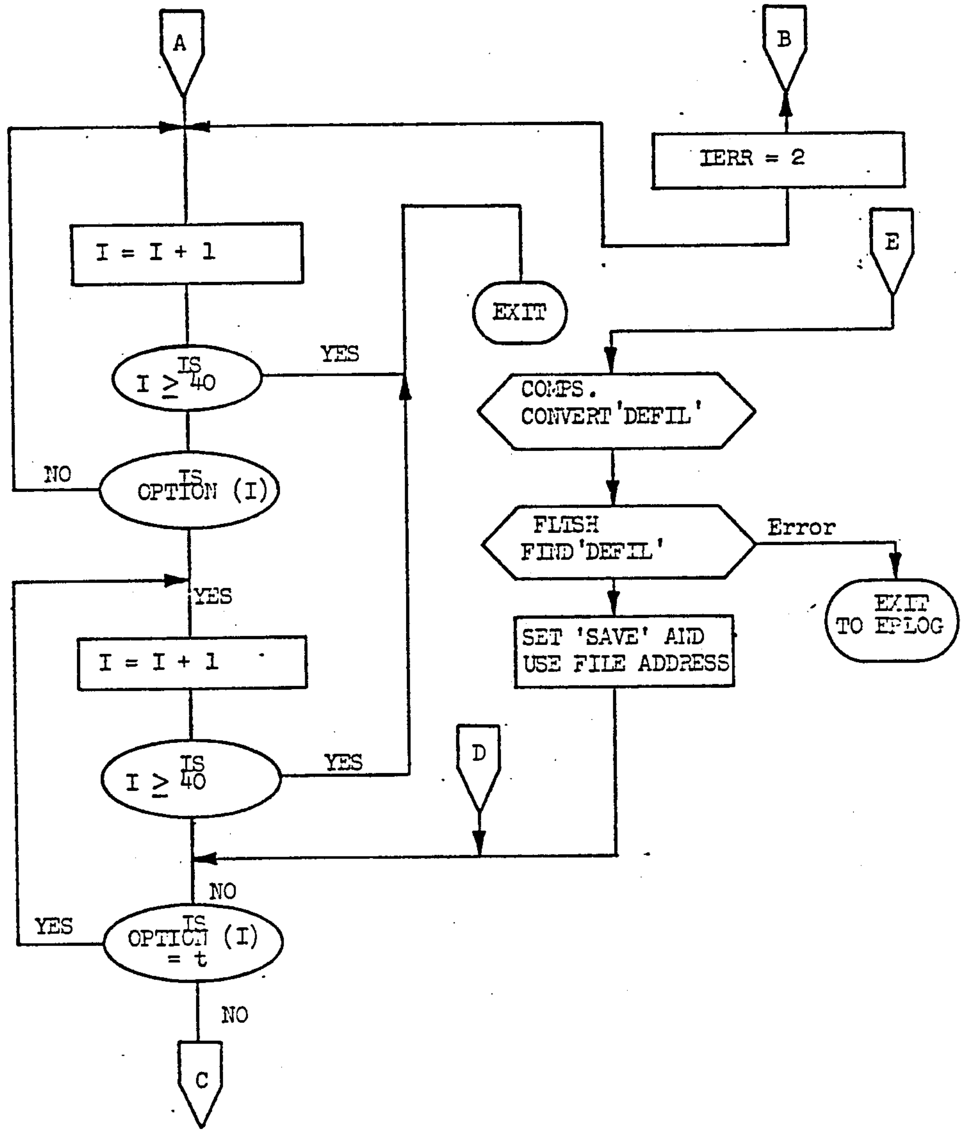

FETFA

Type — Nonrecursive Subroutine

Function — The subroutine searches the 2311 file access system to obtain the file and record number of source text and object code for programs named in the calling sequence. The file and record numbers, as well as the program name, are stored in a fixed area in INSKEL/COMMON. Error messages are typed and an error indicator returned when errors are detected.

| | |
|---|---|
| Availability | Relocatable program area. |
| Use | Call FETFA, (IFLAG, NAM3(6), NAM2(6), NAM1(6), IERR) |
| | where IFLAG = 1, 2, 3 or 4 for procedure, data, supervisory, or test program type, respectively; NAM1, NAM2, NAM3 are arrays containing program names (A2 format, 10 characters, reversed order, plus one word); IERR is an error indicator returned by the subroutine. |

Subprograms called

| | | |
|---|---|---|
| CALL | ISRCH | |
| DC | PNTR | location of index block |
| DC | BLOCK | points to index block to search |
| DC | ENTRY | desired entry in block |
| DC | F | file number of entry |
| DC | R | record number of entry |
| CALL | RDRC | |
| DC | LIST | identification of disk I/O area |
| DC | F | file number |
| DC | R | record number |
| CALL | KDISK | |
| DC | LIST | identification of disk I/O area |

returns value in A-register; zero for busy, negative for error.

| | |
|---|---|
| Remarks | For information regarding file structure see 2311 FILE ACCESS SYSTEM. (Barbour/Fox) For information regarding FLOPS list structures, see FLOPS. (Barbour/Fox). |
| Limitations | The subroutine is intended for use with the 2311 FILE ACCESS SYSTEM, using lists compatible with FLOPS. |
| Flow Chart | Described in TABLE XXc |

TABLE XXc
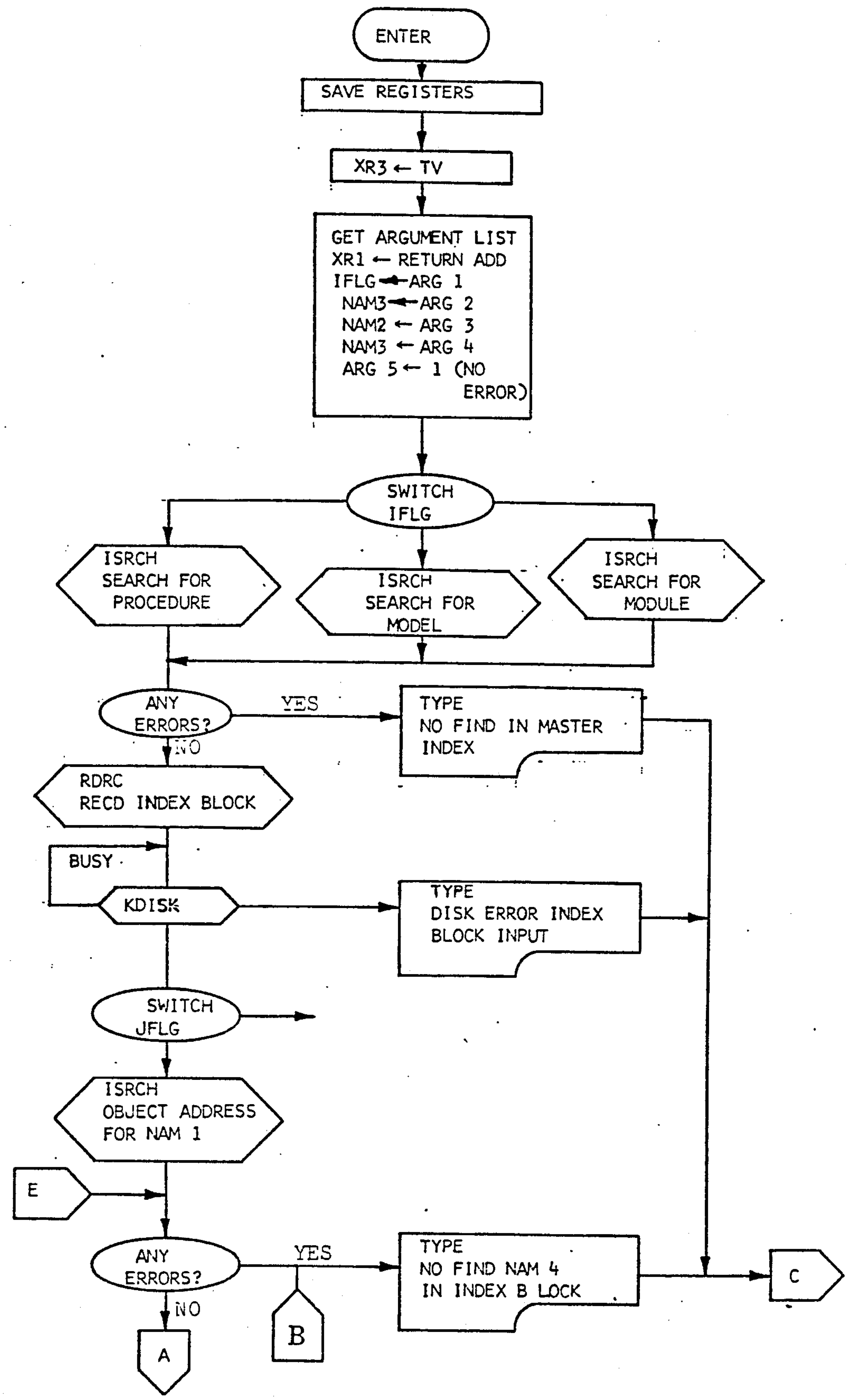

TABLE XXc (cont'd)
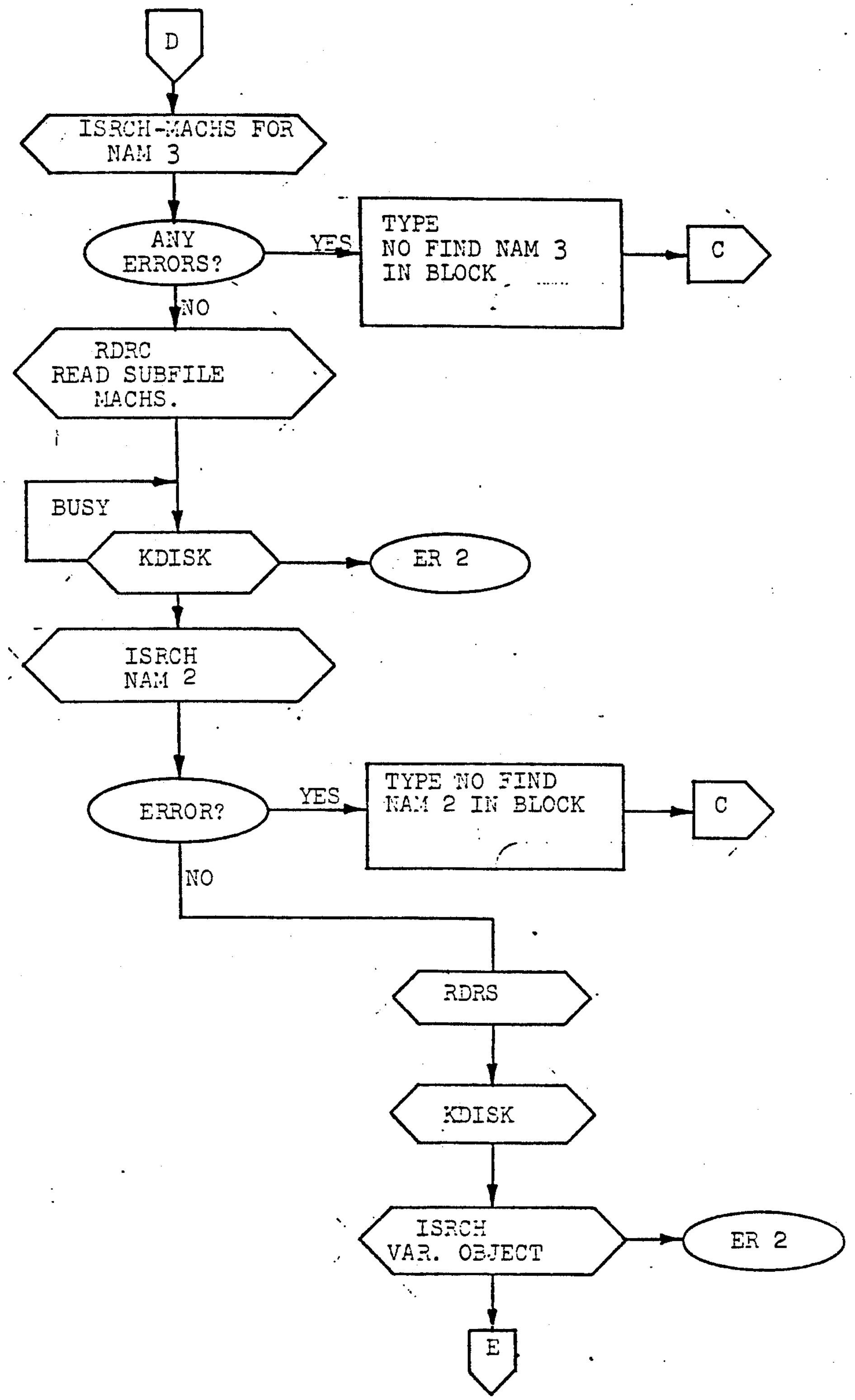

TABLE XXc (cont'd)
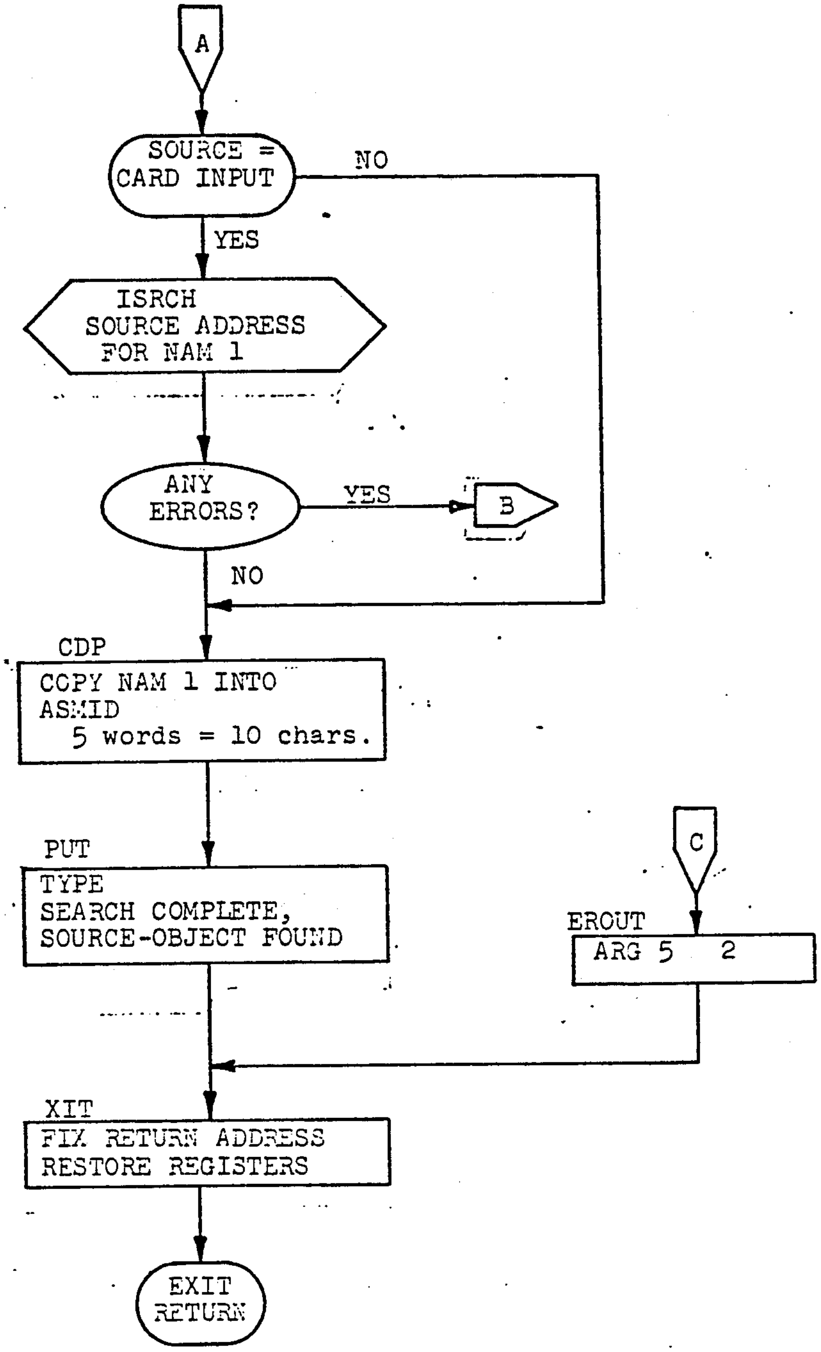

FIEND (DFALT)

| | |
|---|---|
| Type | Nonrecursive Subroutine. |
| Function | To find the word count and sector address named in the calling sequence. If the named file cannot be found in FLET, the program defaults to the word count and sector address for "DEFIL". |
| Availability | Relocatable program area. |
| Use | CALL FIEND (IBUFR(5), IWC, ISA)<br>where IBUFR is an array containing the name of a file to be found in FLET (A1 format, five characters);<br>IWC is the word count for the file;<br>ISA is the sector address for the file<br>or (Alternate Entry Point)<br>CALL DFALT (IBUFR(5), IWC, ISA)<br>where IWC, ISA are returned with the word count and sector address for "DEFIL". |
| Subprograms Called | CALL COMPS (NAME1, NAME2)<br>where NAME1 is a five character name in A2 format NAME2 is returned as the truncated packed EBCDIC equivalent of the name.<br>CALL FLTSH (NAME, DSA)<br>where NAME contains a FLET entry (truncated packed EBCIDC)<br>and DSA is returned as the three word FLET entry for NAME |
| Flow Chart | Described in TABLE XXd |

TABLE XXd
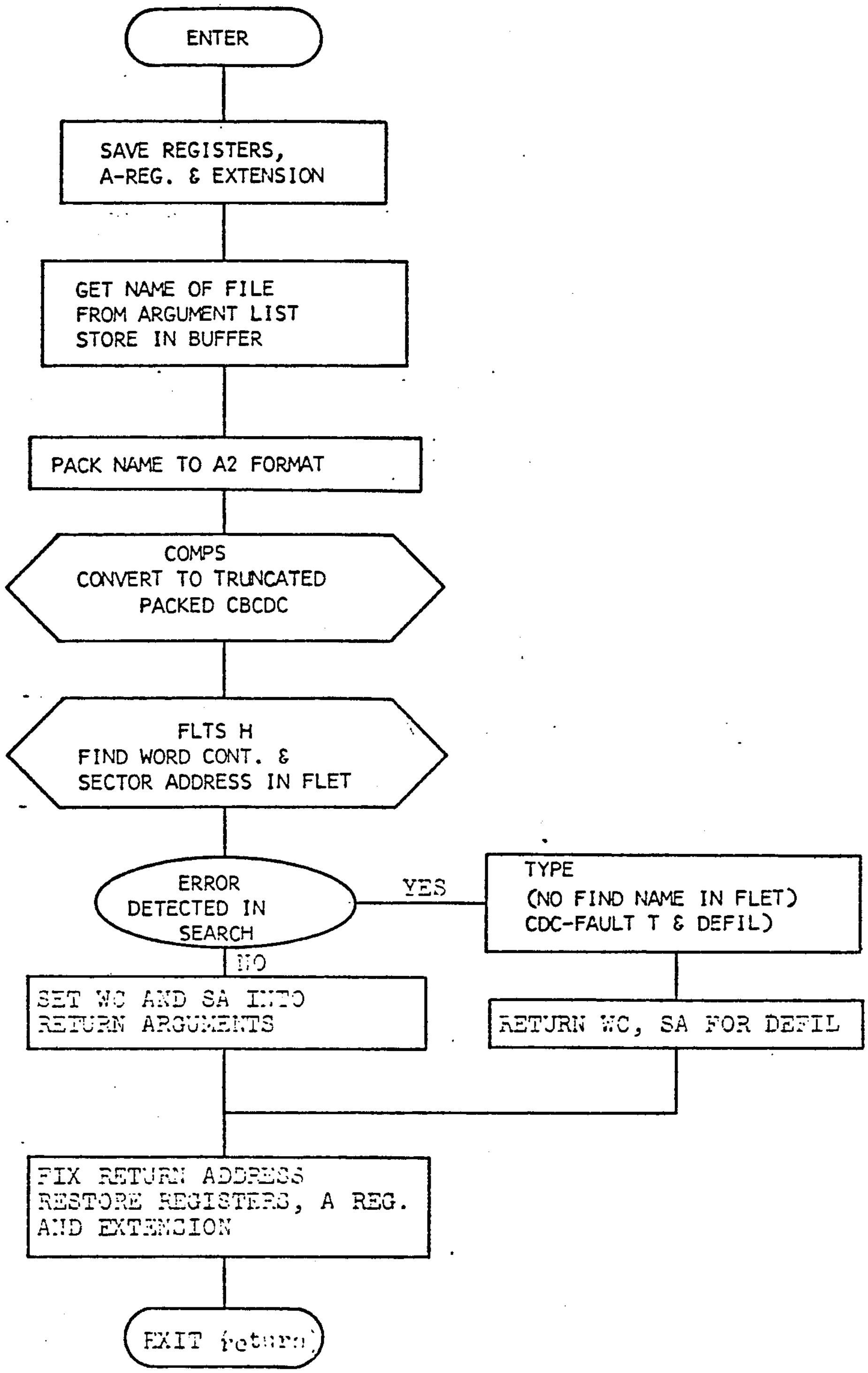

FINDN

| | |
|---|---|
| Type | Nonrecursive subroutine (FORTRAN) |
| Function | The subroutine finds and returns a word count and sector address for a program named in an option list. The address of the option list (array) and a pointer (array subscript) to the name appear in the calling sequence. The pointer points to either a "SAVE" or "SYMTAB" and the program looks for a name, a comma (no name mentioned), or the end of the array. If no name is found, the program defaults to the symbol table named "DEFIL". |
| Availability | Relocatable program area. |
| Use | CALL FINDN (IOPTN, I, IWC, ISA)<br>where IOPTN is the array containing the option list;<br>I is the array subscript denoting the symbol table option specified;<br>IWC, ISA are the word count and sector address corresponding to the designated symbol table file. |
| Subprograms Called | CALL FIEND (IBUFR(5), IWC, ISA)<br>where IBUFR is an array containing the name of a symbol table file;<br>IWC, ISA are the word count and sector address corresponding to the file.<br>CALL DFALT, (IBUFR(5), IWC, ISA)<br>where IBUFR, IWC, ISA are described above. |
| Flow Chart | Described in TABLE XXe |

TABLE XXe
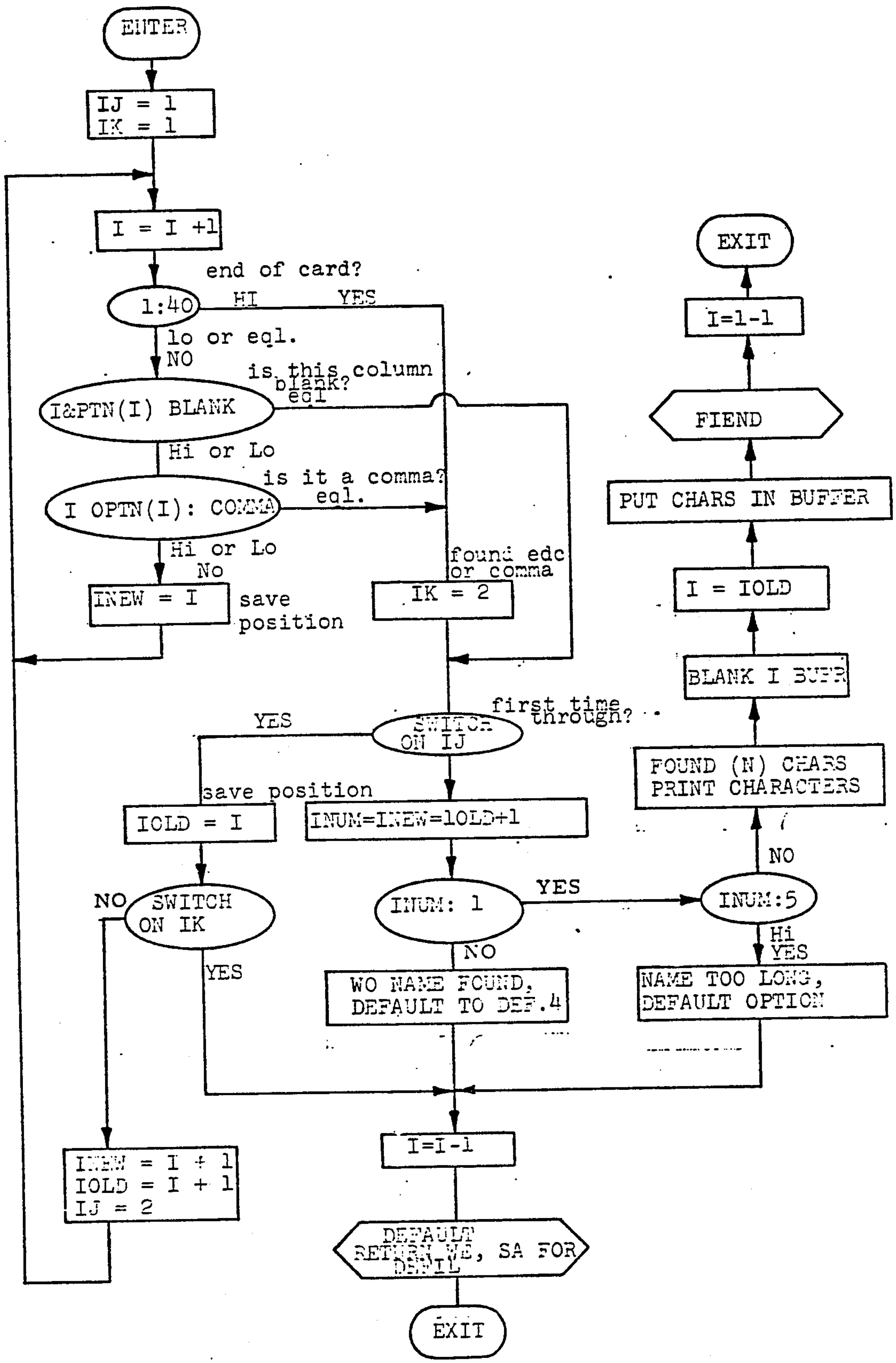

TABLE XXf

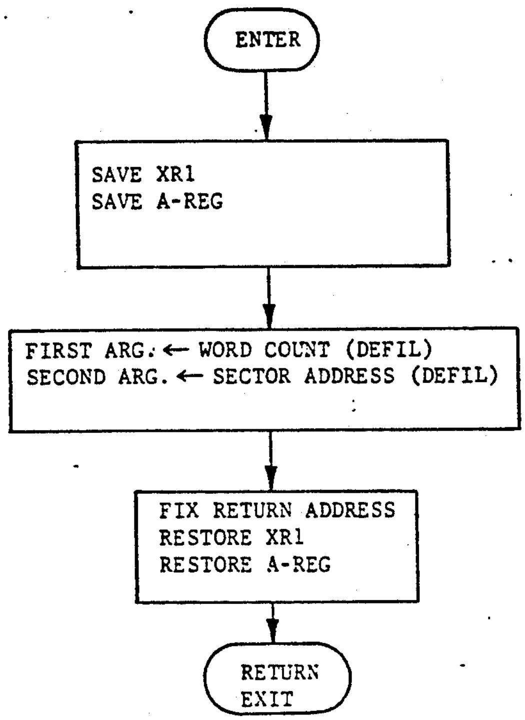

DFALT

| | |
|---|---|
| Type | Nonrecursive Subroutine |
| Function | Gets the file and sector address of the DEFIL symbol table. |
| Availability | Relocatable area |
| Use | CALL DFALT |
| Remarks | DEFIL is used as default option, if no symbol table is specified in ASSEMBLER control cards. |
| Flow Chart | Described in TABLE XXf |

3. Execution of Prolog (Pass One)

The Prolog is entered from the Analyzer. It performs the following functions:

a) Read in the initialized symbol table from disk (restricted to key-words and instruction definitions, plus system symbols if requested).

b) Zero the flags, stacks and pointers used by PASS 1 and PASS 2.

c) Initialize the Pass 2 text buffer (maintained by Pass 1).

d) If Edit option was specified, read control and data records from cards, build an edit file, and initialize the edit control vector.

e) Transfer control to PIDIR, the Pass 1 directive program.

4. Execution of Pass One

Pass One is a collection of programs which perform the following functions:

a) Read and process each card image (one at a time from card stream, disk source file, or edit file as specified.

b) Scan to the first field on the card image (ignore leading blanks). This field may be a label or an asterisk, if the field begins in column one of the card; or the op code, in which case it must begin after column one.

c) If the first field encountered is a label, enter it in the symbol table, assigning the next available location to it, and scan to the next field on the card image.

d) Test for op code or assembler directive. Process appropriately, as described below. Error detection results generally in no further processing of the card. The following assembler directives are processed in Pass One:

1) MODE n

This should be the first non-list-control card. Set Mode 1 or 2 as specified. If no mode is specified, default to Mode 2. Er Error condition detected: Illegal mode specified.

2) ENT and DEF

Set program type to relocatable, if Mode 1. Increment the number of entries.

Error condition detected: Permitted only in Mode 1; conflict in type specification; exceeds maximum number of entries.

3) ABS

Set program type absolute.

Error conditions detected; Permitted only in Mode 1. conflict in type specification.

4) MDATA

Set flag: all further statements must be labelled, up to END statement.

Error conditions detected: Permitted only in Mode 2; conflict in type specification.

5) END

Set END flag to terminate Pass One.

6) HDNG

No processing, set flag for Pass Two processing.

7) LIST

No processing, set flag for Pass Two processing.

8) BSS, BES, BSSE, BSSO

Update location assignment as specified.

Error conditions detected: Variable field syntax error; relocation type error.

9) EQU

Evaluate operand field and assign value to label.

No forward reference allowed.

Error conditions detected: Statement must be labelled; relocation error.

10) ORG

Evaluate operand field and set location counter as specified.

No forward reference allowed.

Error conditions detected: Permitted in Mode 1 only; relocation error due to specified origin; Negative location due to specified origin.

11) DC

No processing, set flag for Pass Two processing.

12) MDUMY n

Evaluate operand field and assign to location counter.

Set flag that all further statements must be labelled data statements, up to END statement.

Error conditions detected: Permitted only in Mode 2; only one MDUMY statement per assembly; relocation error on specified origin; negative location due to specified origin.

13) CALL AND REF

Evaluate operand field and enter symbol in variable field in the symbol table. Mark as defined, external symbol. Save external reference in external reference list. Error conditions detected: Permitted only in Mode 1, relocatable programs; variable field syntax error.

Note that no further processing is required for MODE, MDATA, BSS, BES, BSSE, BSSO, EQU, ORG statements.

14) instructions

For all op codes, allocate the next available core location(s) beginning on an even address as specified in the instruction definition from the symbol table. Error conditions detected: Unrecognizable op code; op code not allowed in this mode.

e) Build the "Pass Two Text" by combining current values of

1) Location assignment counter

2) Error indicator

3) Op code number (or assembler directive number).

4) "Pass Two Text flag", specifying type of processing required in Pass Two.

5) Pointer to the next column to be scanned in the source record (for card scan).

6) Source text (card image, alpa humeric string).

f) Write the "Pass Two text" to disk non-process work storage.

g) Transfer control to Pass Two.

PROLI

| | |
|---|---|
| Type | Mainline |
| Function | Initializes tables, pointers, stacks, flags, etc. for assembly. |
| Availability | Relocatable area. |
| Use | Call LINK (PROLI) |
| Subprograms Called | DISKN, CUTB, STRIK, UPDAT, RDBIN, READC, UPDAT, PIDIR, TYPEN. |
| Remarks | PROLI is called from the control record analyzer. After initialization, Pass 1 processing begins by calling PIDIR. Control never returns to PROLI. |
| Flow Chart | Described in TABLE XXIa |

PIDIR

| | |
|---|---|
| Type | Nonrecursive Subroutine |
| Function | Routine absorbs initial assembler directives MODE, ENT, MDATA, ABS. It also processes any initial comments or list control directi ves. |
| Availability | Relocatable area. |
| Use | Call PIDIR |
| Subprograms Called | NCODE, MOD1, INSP2, WRTP2, READC, ENT1, ABS1, MDAT1, ERRIN, FRAM1. |
| Flow Chart | Described in TABLE XXIb |

TABLE XXIa
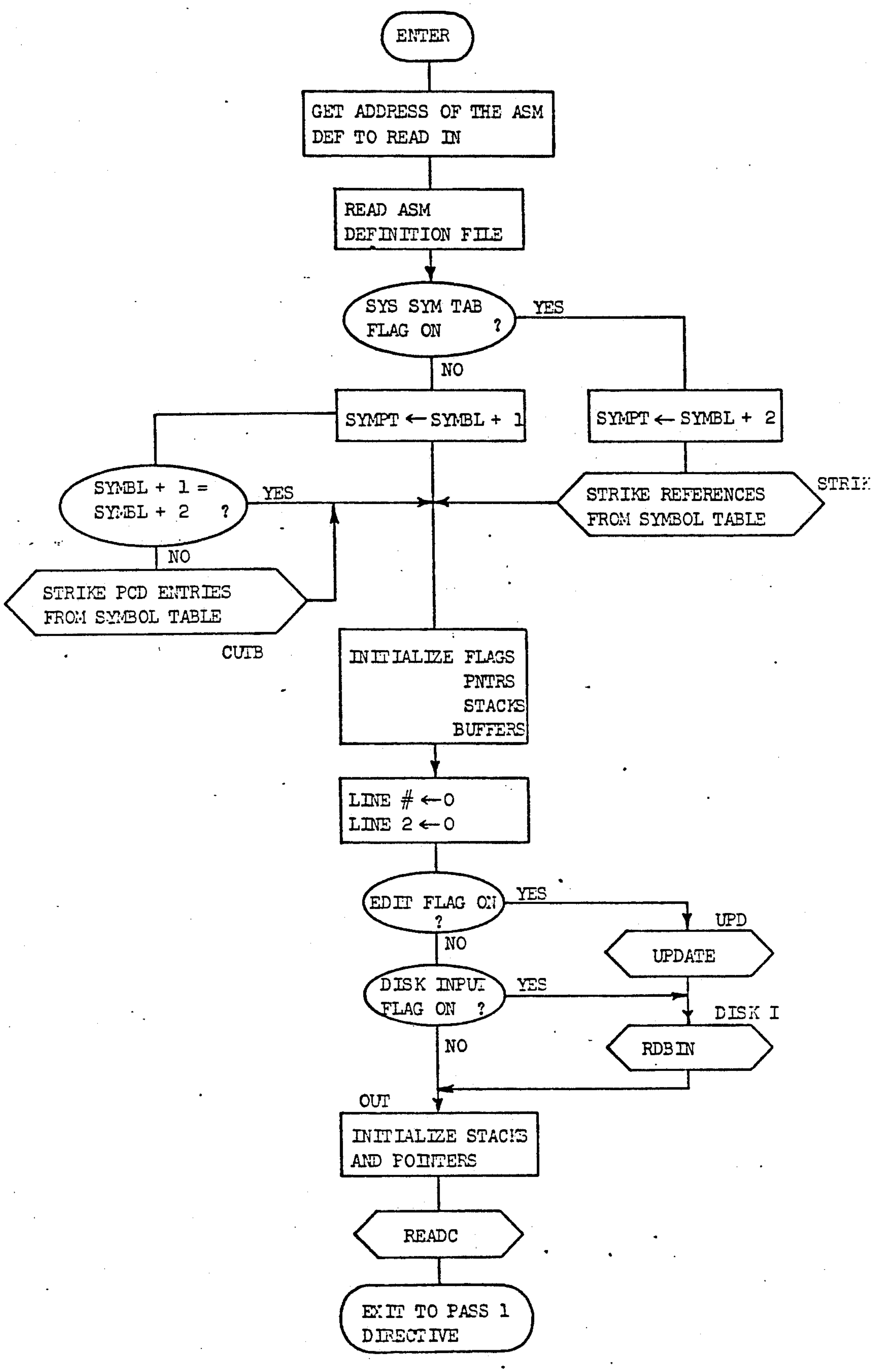

TABLE XXIb
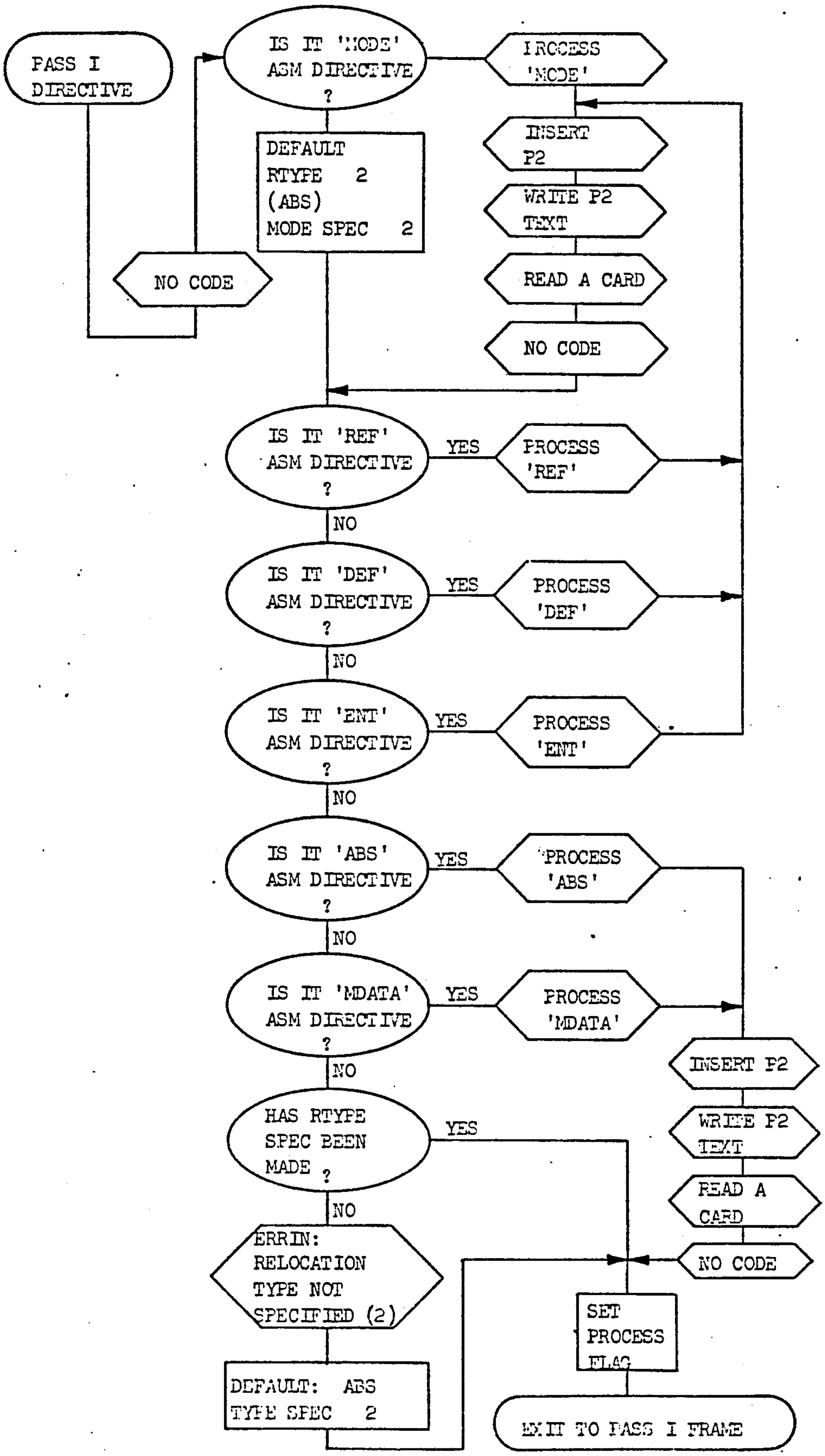

FRAM1/FRA1

| | |
|---|---|
| Type | Nonrecursive Co-routine |
| Function | Basic framework for Pass 1. |
| Use | Call FRAM1 or Call FRA1 |
| Co-routines Called | ORG1, EQU1, DC1, LIST1, HDNG1, BSS1, BES1, BSSE1, BSSO1, END1, MDUMI1, CALL1, OPCD1. |
| Subprograms Called | LABPR, INSP2, WRTP2, READC, DISKN, ERRIN, CHEKC, GETNF. |
| Core Loads Called | ASMP2 |
| Remarks | FRAM1 is the primary loop comprising Pass 1. From here service routines such as the label processor (LABPR), assembler directives, op code processor (OPCD1) process the source text. On detecting an end card, a call to Pass 2 (ASMP2) is executed. FRA1 is the entry point by the service routines to re-enter the Pass 1 frame. |
| Flow Chart | Described in TABLE XXIc |

UPDAT

| | |
|---|---|
| Type | Nonrecursive Subroutine |
| Function | Reads and formats the edit source text. |
| Availability | Relocatable area. |
| Use | Call UPDAT |
| Subprograms Called | SAVEC, CARDN, HOLEB, TOKEN, ERRIN, DISKN, FTCHE, NXEDT. |
| Core Loads Called | EPLOG |
| Remarks | If errors are detected in the edit source text or if the edit file overflows, a call to EPLOG is executed. An edit code is inserted as a header with each edit directive card. Also a From and Thru address is inserted as specified on each edit directive card. |
| Flow Chart | Described in TABLE XXId |

TABLE XXIc
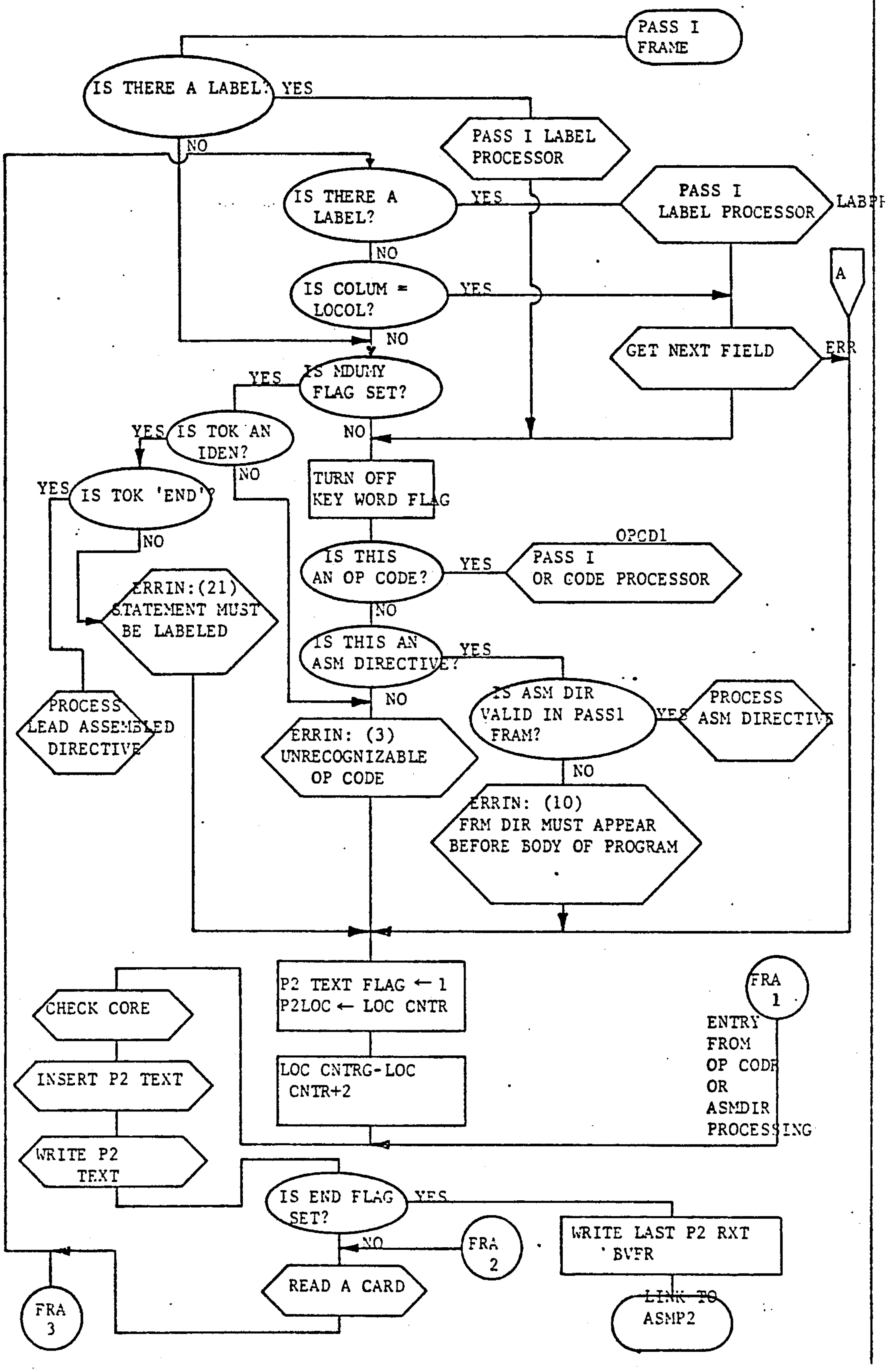

TABLE XXId
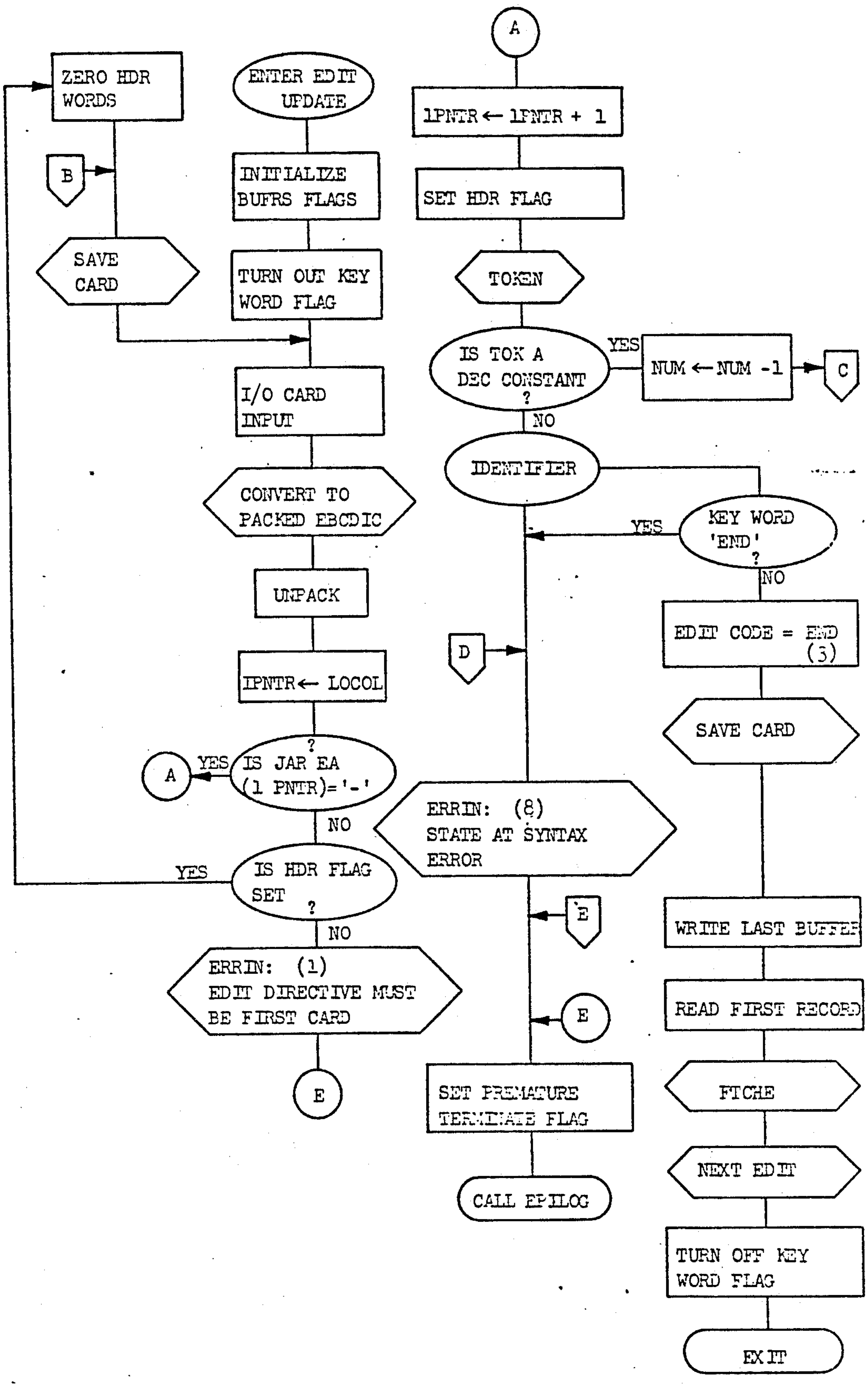

TABLE XXId (cont'd)
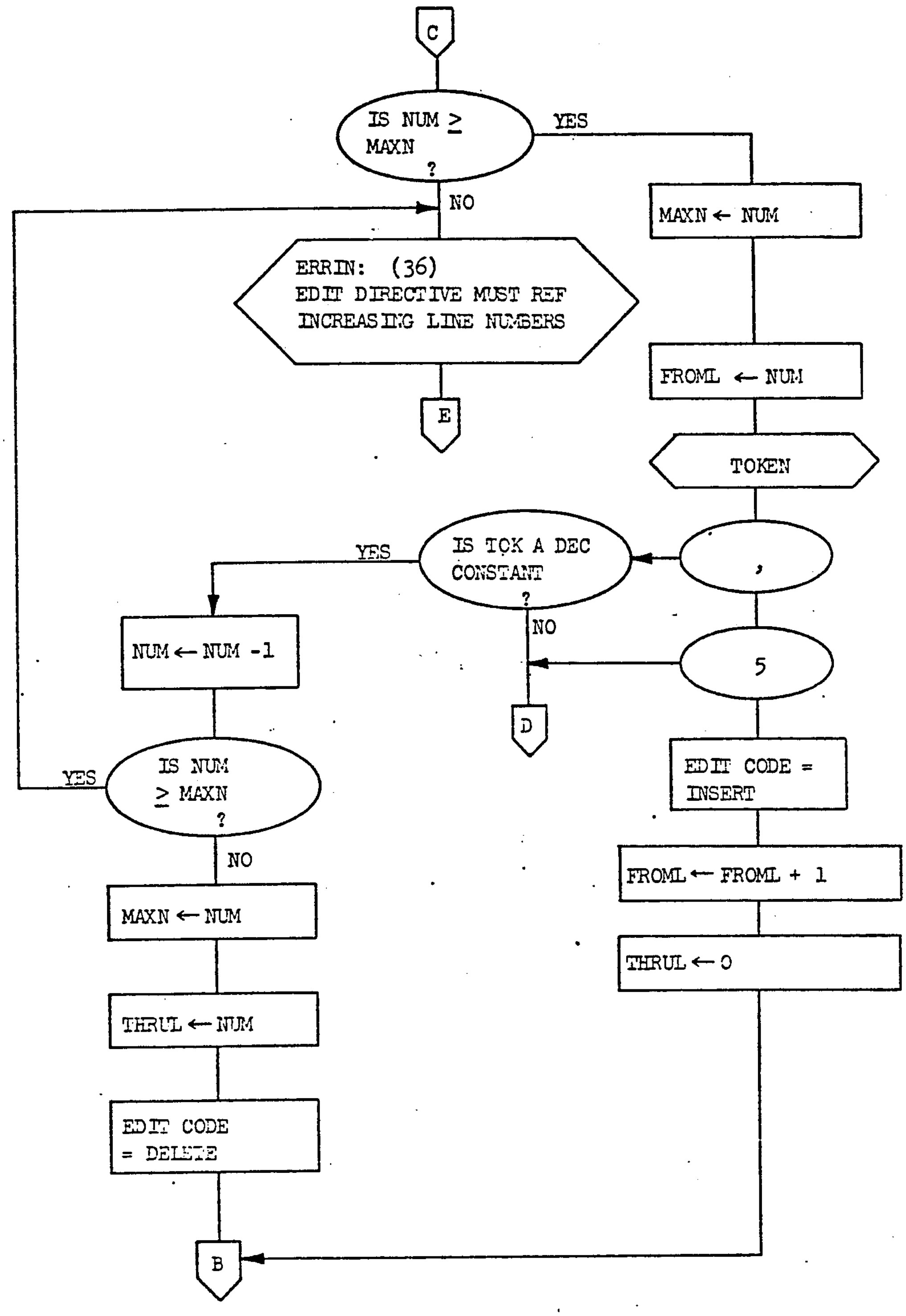

LABPR

| | |
|---|---|
| Type | Nonrecursive Subroutine |
| Function | Provides Pass 1 label processing. It marks the attribute and guarantees the definition reference is at the end of the reference chain. |
| Availability | Relocatable area. |
| Use | Call LABPR |
| Subprograms Called | MOVER, ERRIN |
| Flow Chart | Described in TABLE XXIe |

OPCD1

| | |
|---|---|
| Type | Nonrecursive Co-routine |
| Function | Pass 1 processing of op codes |
| Availability | Relocatable area. |
| Use | Call OPCD1 |
| Subprograms Called | ERRIN |
| Co-routines Called | FRA1 |
| Remarks | Instructions are placed on even boundaries |
| Flow Chart | Described in TABLE XXIf |

NCODE

| | |
|---|---|
| Type | Nonrecursive Subroutine |
| Function | Calls for processing of comments and list control assembler directives HDNG and LIST |
| Availability | Relocatable area |
| Use | Call NCODE |
| Subprograms Called | GETNF, HDNG1, LIST1, INSP2, WRTP2, READC, ERRIN |
| Flow Chart | Described in TABLE XXIg |

TABLE XXIe
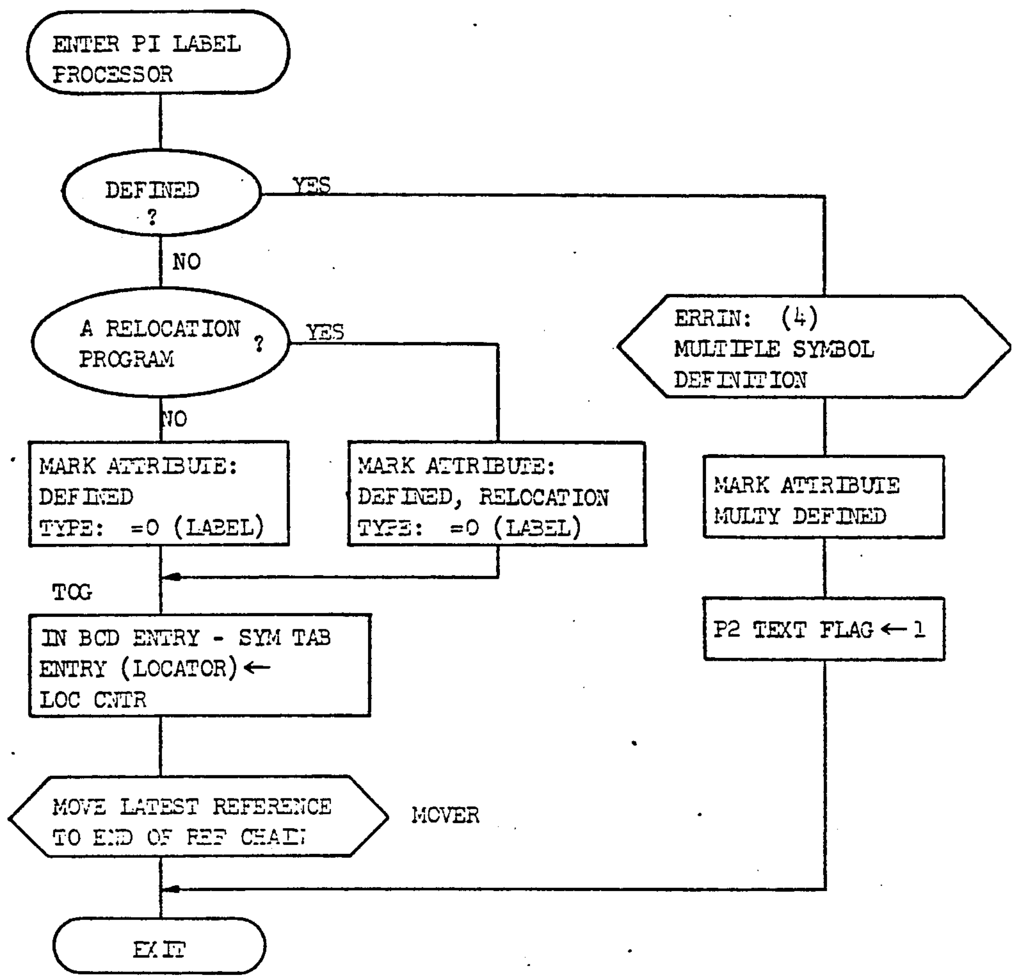

TABLE XXIf
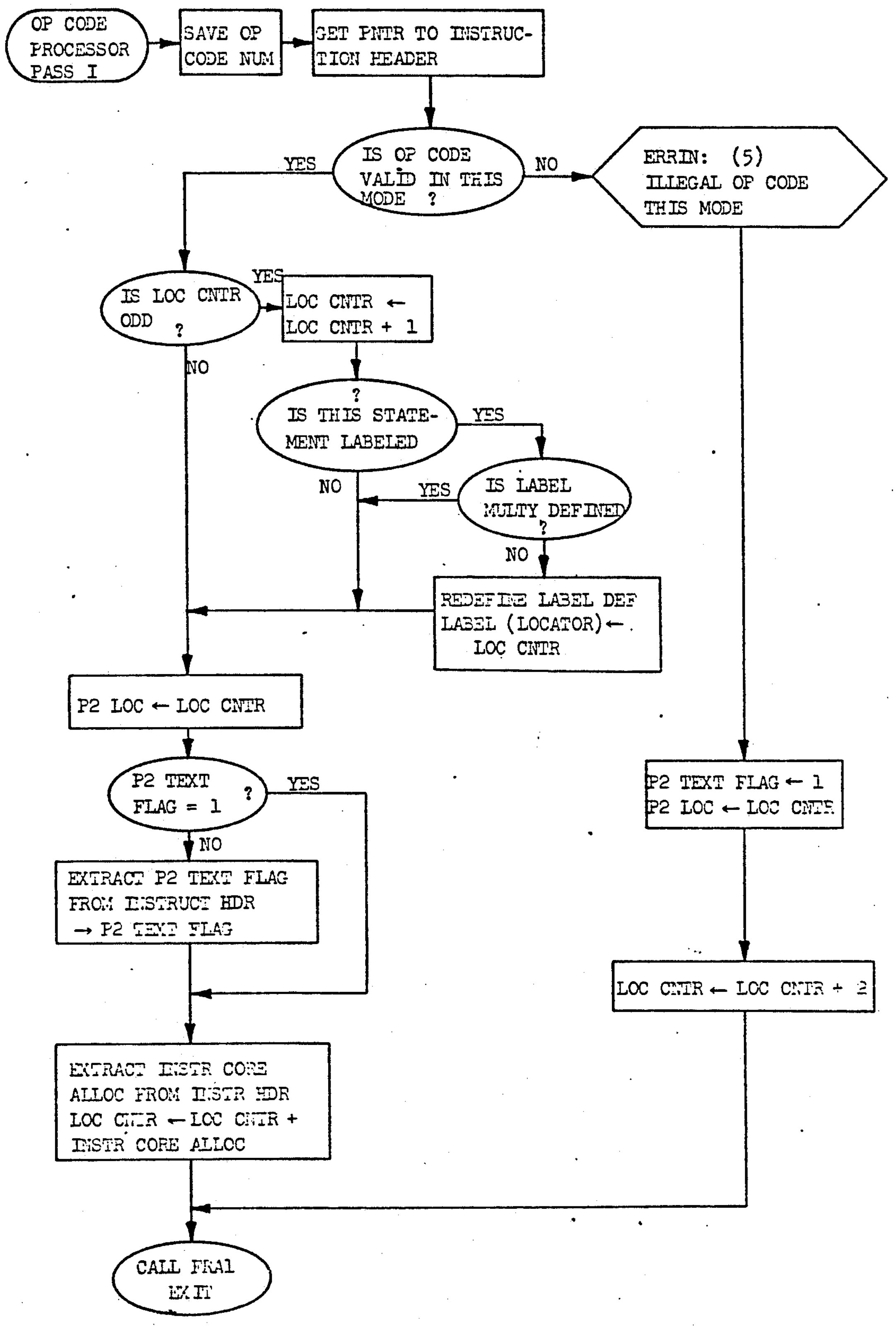

TABLE XXIg
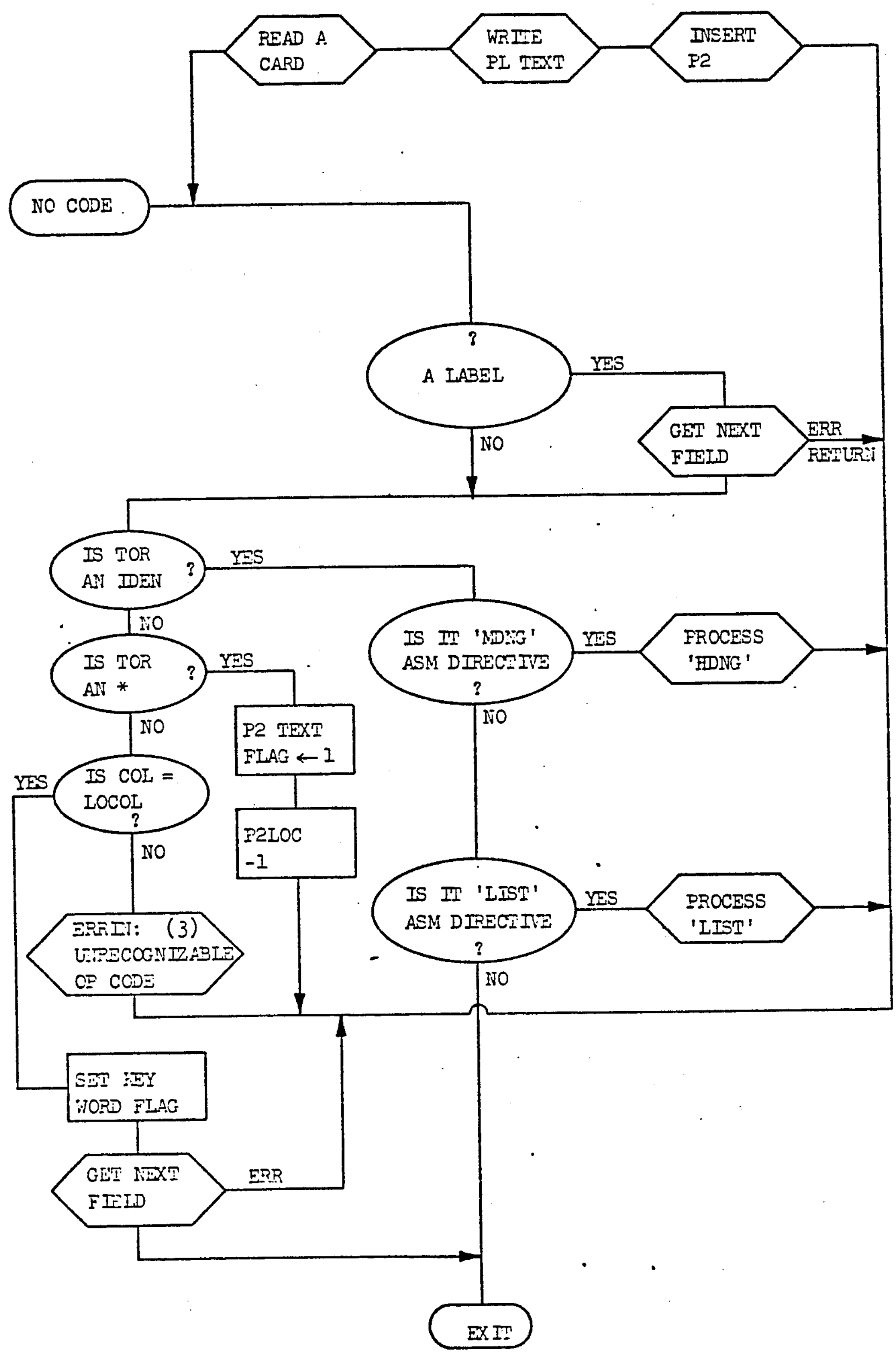

MOD1

| | |
|---|---|
| Type | Nonrecursive Subroutine |
| Function | Pass 1 processing of MODE assembler directive. |
| Availability | Relocatable area |
| Use | Call MOD1. |
| Subprograms Called | TESTL, GETNF, ERRIN |
| Remarks | MODE is originally processed by PIDIR. No registers are saved. |
| Flow Chart | Described in TABLE XXIh |

ORG1/EQU1

| | |
|---|---|
| Type | Nonrecursive Co-routine |
| Function | Pass 1 processing of ORG and EQU assembler directives. |
| Use | Call ORG1 or Call EQU1 |
| Subprograms Called | ERRIN, GETNF, EXPRN |
| Co-Routine Called | FRA1 |
| Remarks | ORG and EQU allow no forward references. |
| Flowchart | Described in TABLE XXIi |

DC1

| | |
|---|---|
| Type | Nonrecursive Co-routine |
| Function | Provides Pass 1 processing of the DC assembler directives. |
| Availability | Relocatable area. |
| Use | Call DC1 |
| Subprograms Called | Home |
| Co-routine Called | FRA1 |
| Remarks | The token pointer is saved for Pass 2. No registers are saved. |
| Flow Chart | Described in TABLE XXIj |

TABLE XXIh
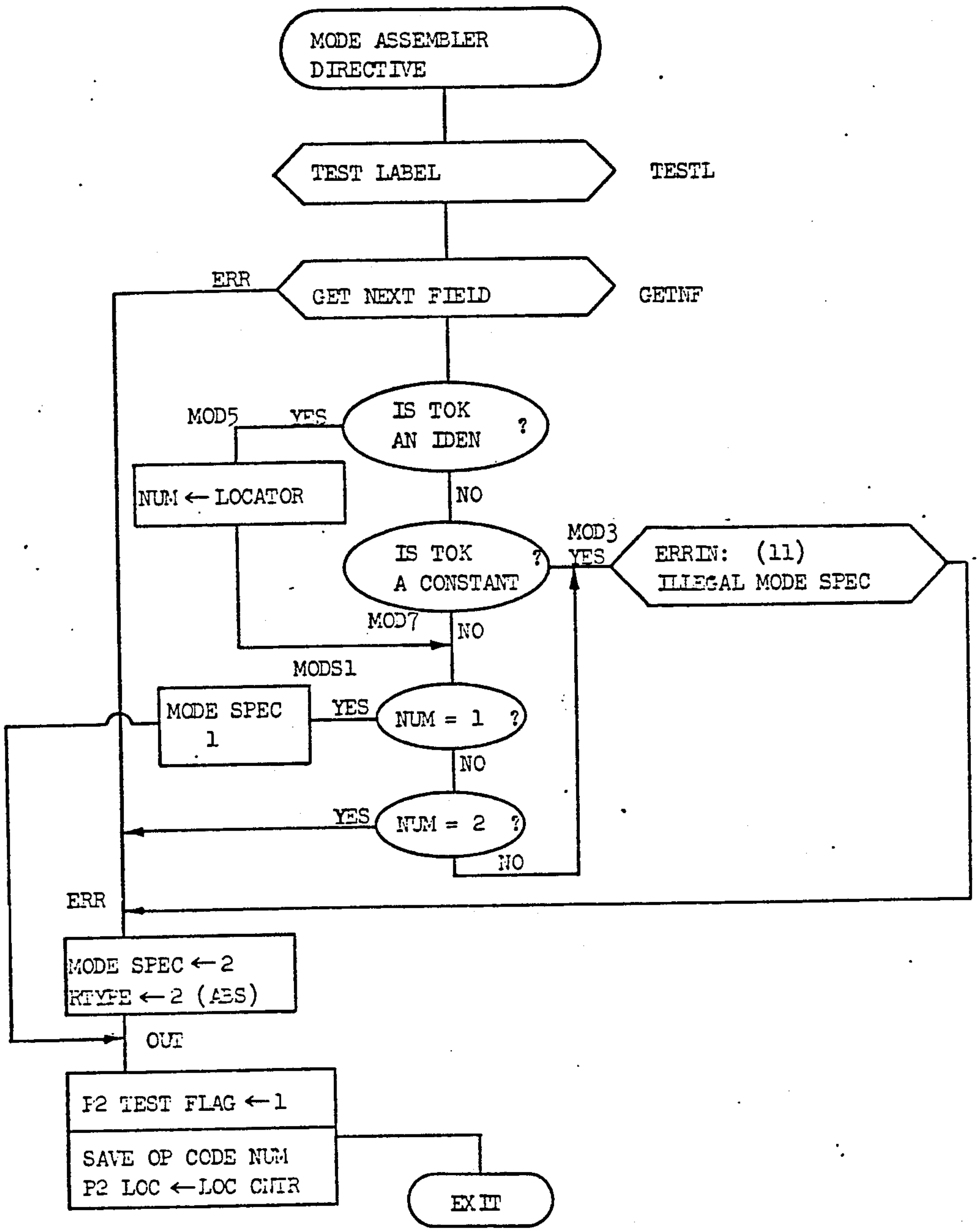

TABLE XXII
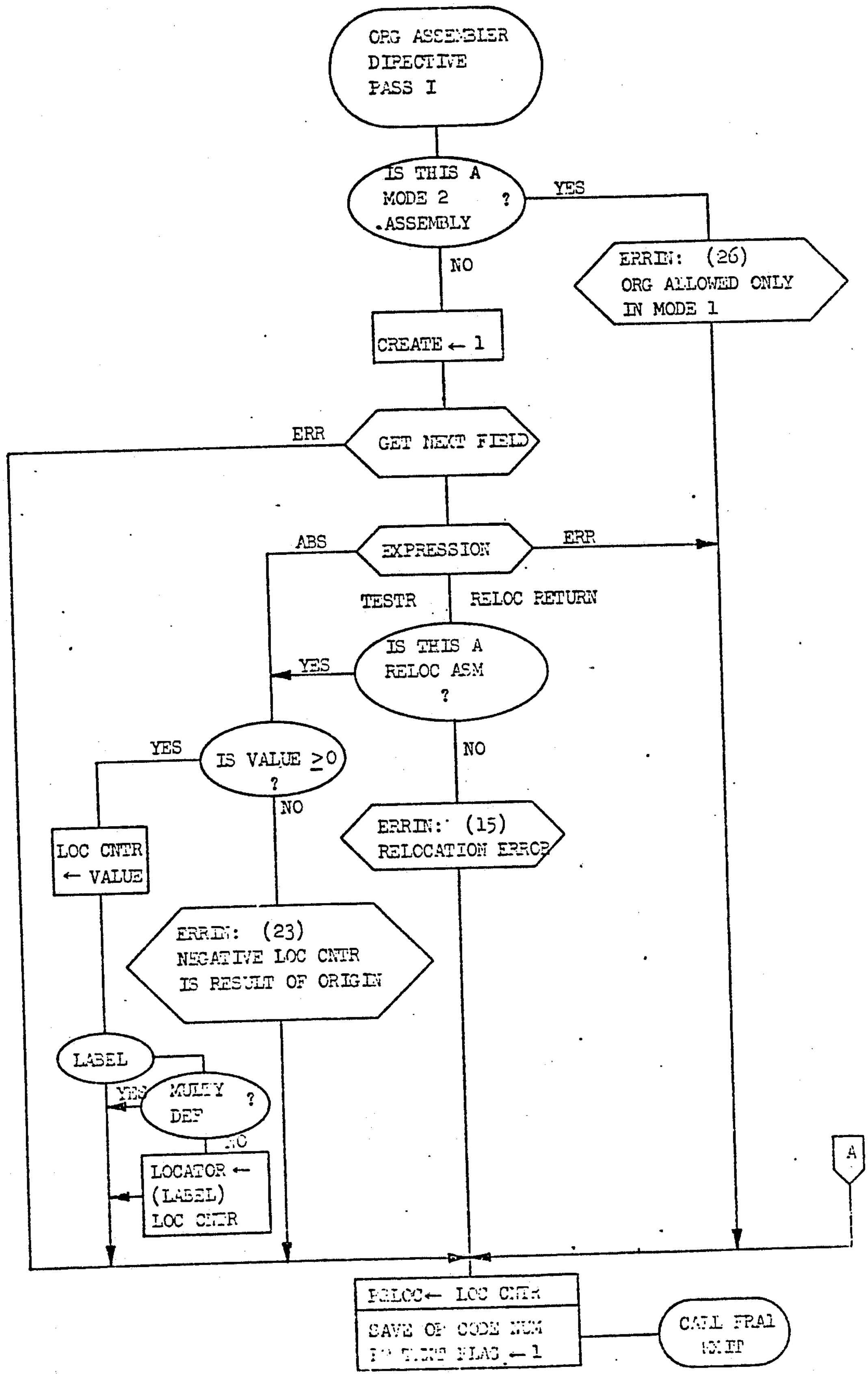

TABLE XXII (cont'd)
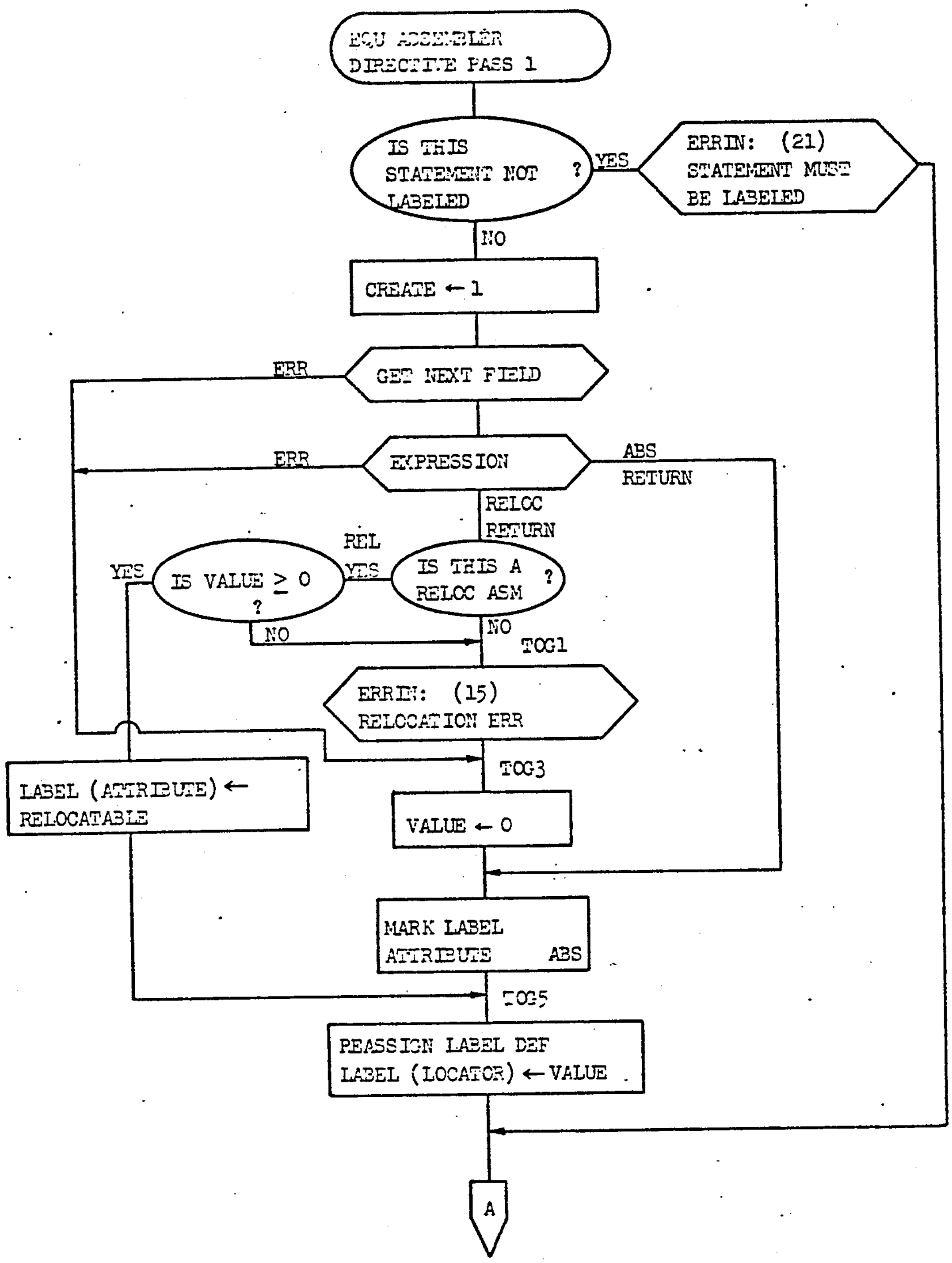

TABLE XXIj
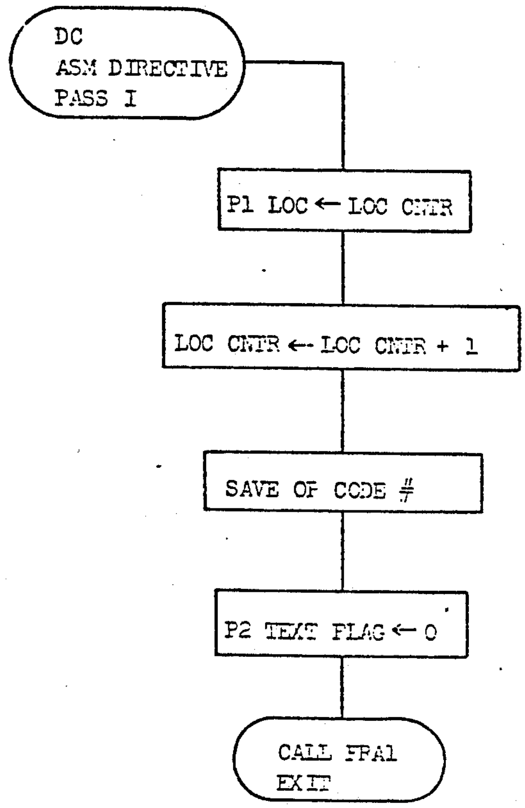

IIDNG/LIST1

| | |
|---|---|
| Type | Nonrecursive Co-routine |
| Function | Provide Pass 1 processing of list control directives HDNG1 AND LIST1 |
| Availability | Relocatable area. |
| Use | Call HDNG1 and Call LIST1 |
| Subprograms Called | TESTL |
| Co-routines Called | FRA1 |
| Remarks | No registers are saved |
| Flow Chart | Described in TABLE XXIk |

BSS1/BES1/BSSE1/BSSO1

| | |
|---|---|
| Type | Recursive Co-routines |
| Function | Provide Pass 1 processing for assembler directives<br>BSS block starting storage<br>BES block ending storage<br>BSSE block starting storage even<br>BSSO block starting storage odd |
| Availability | Relocatable area. |
| Use | Call BSS1, BES1, BSSE1, BSSO1 |
| Subprograms Called | PSHRA, GETNF, EXPRN, POPRA |
| Co-routines Called | FRA1 |
| Remarks | This set of assember directives is processed by a tightly knit package. These directives are totally processed in Pass 1 where core allocation is made. No registers are saved. |
| Flow Chart | Described in TABLE XXIl |

TABLE XXIk
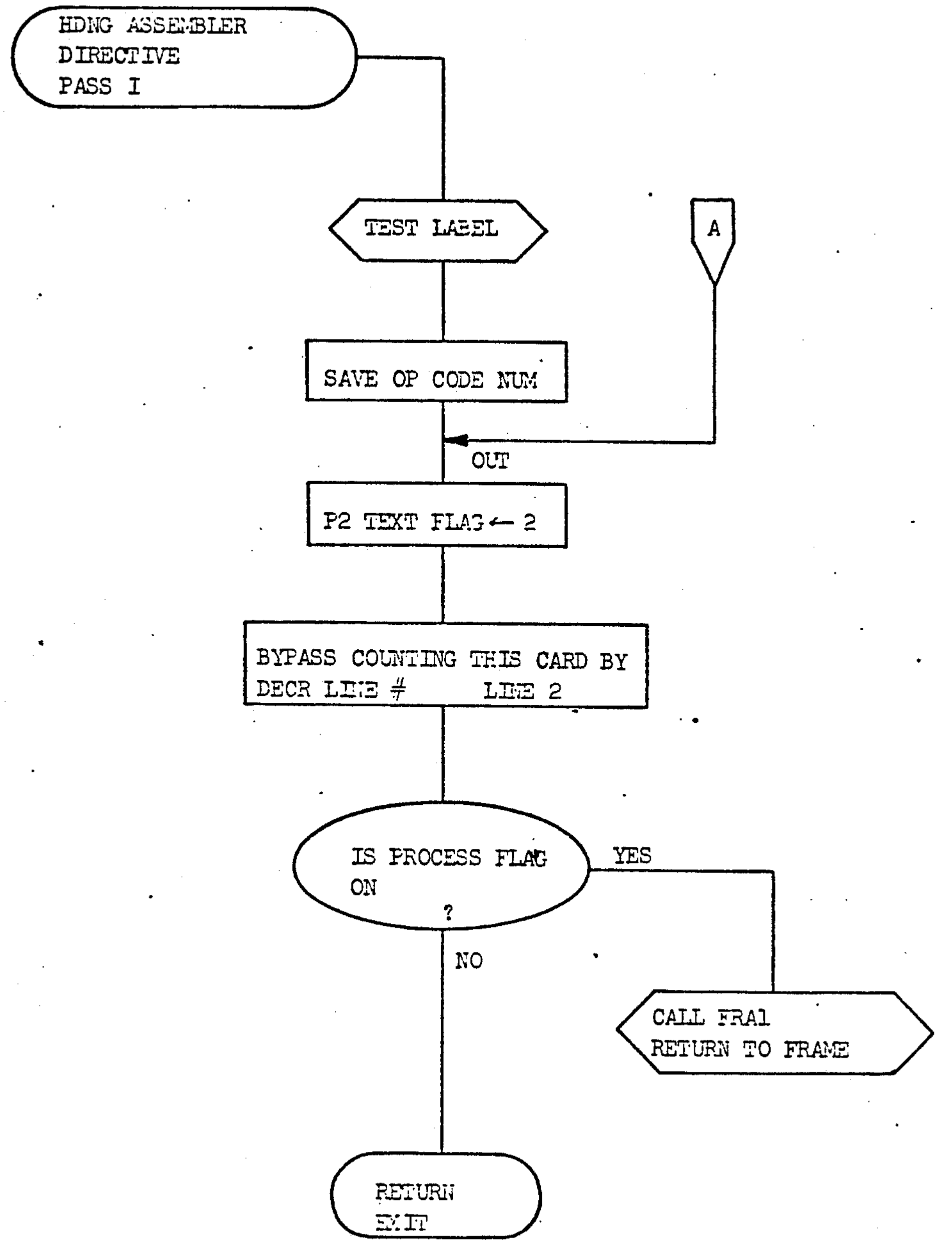

TABLE XXIk (cont'd)
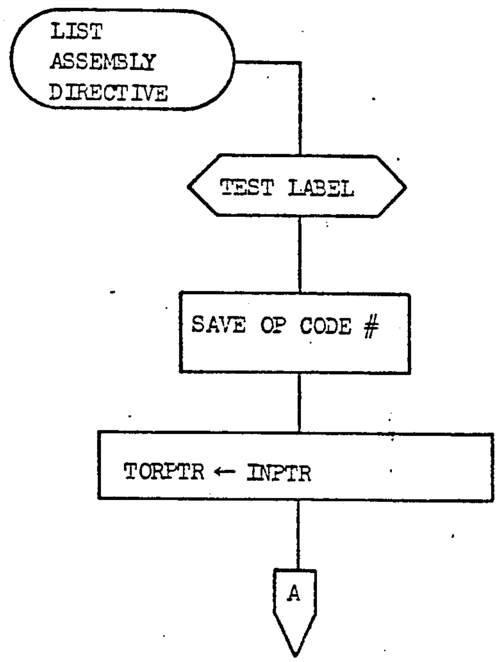

TABLE XXII
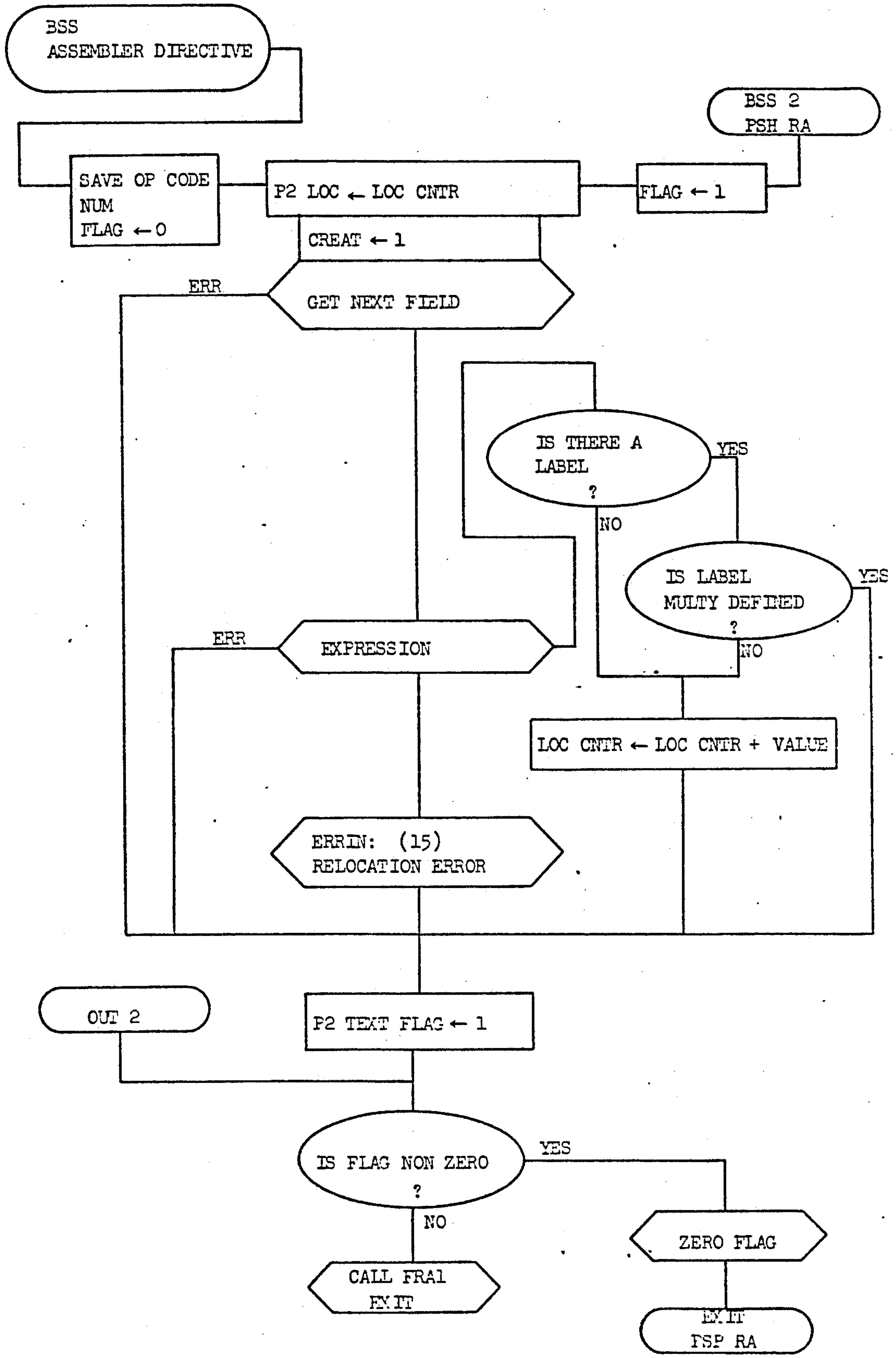

TABLE XXII (cont'd)
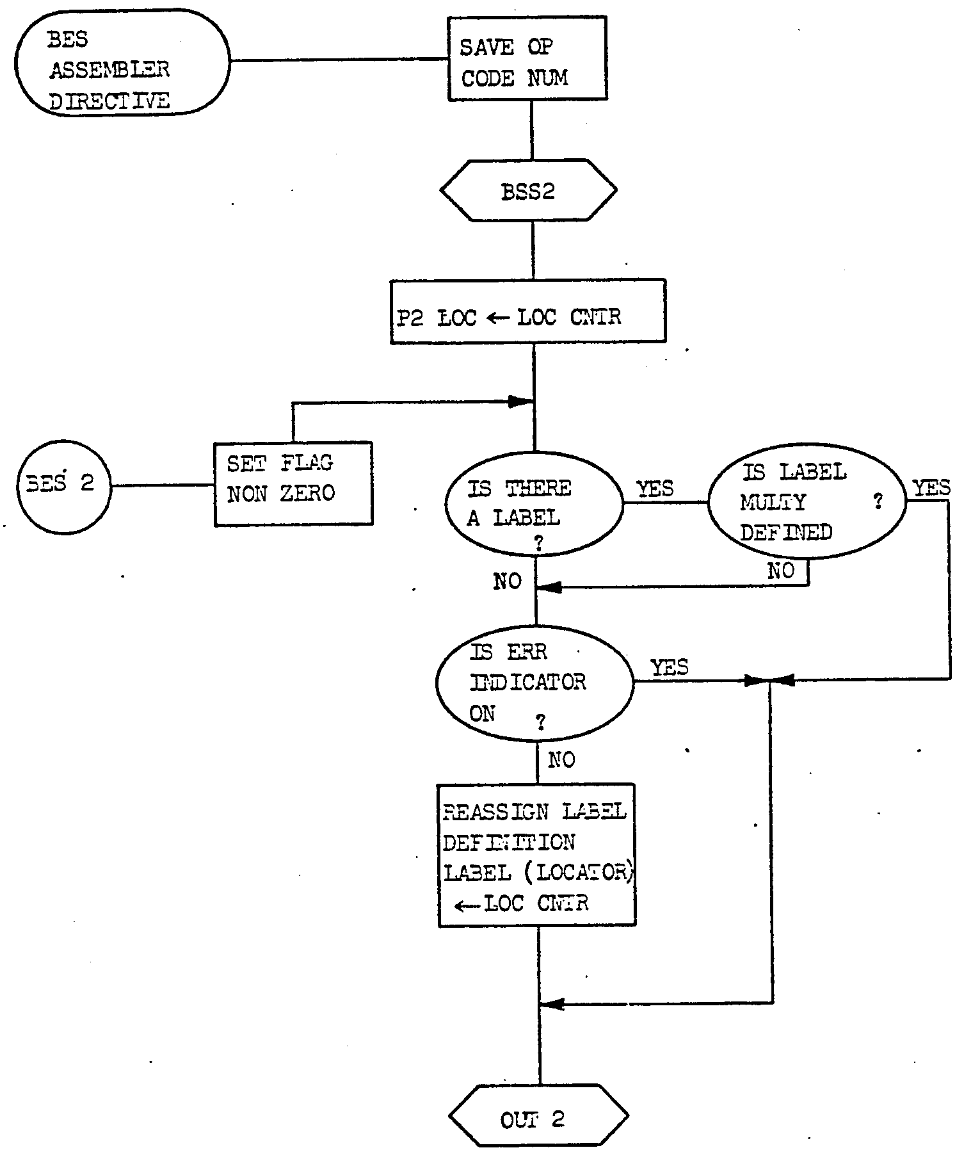

TABLE XXII (cont'd)
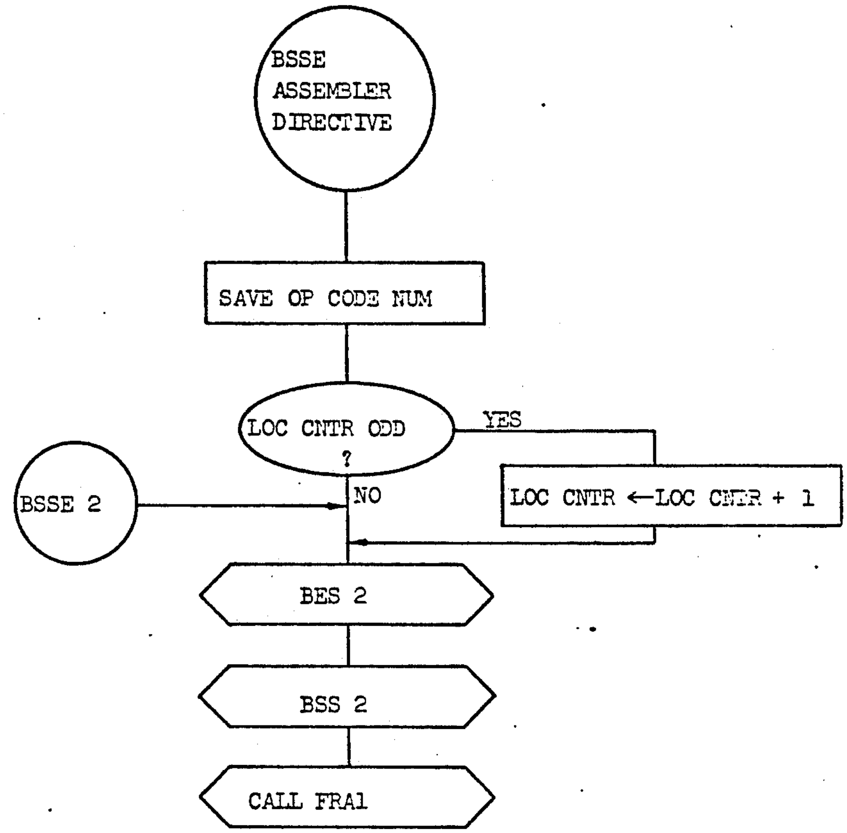

TABLE XXII (cont'd)
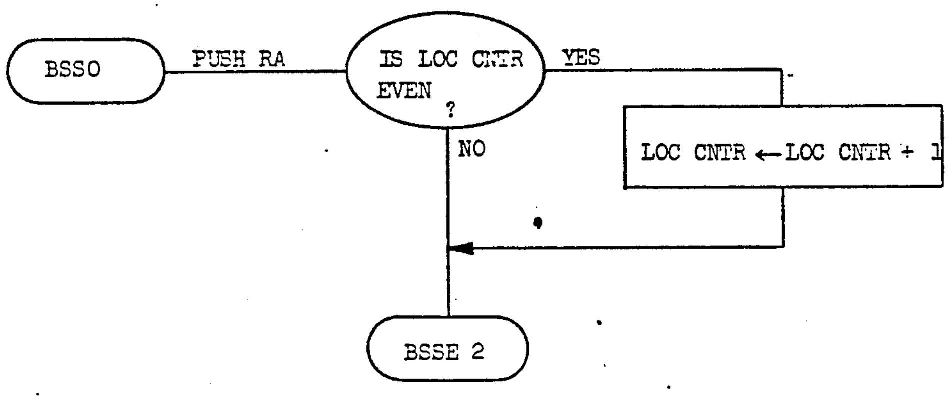

ABS1

| | |
|---|---|
| Type | Nonrecursive Subroutine |
| Function | Provides Pass 1 processing of ABS assembler Directive. |
| Availability | Relocatable area. |
| Use | Call ABS1 |
| Subprograms Called | TESTL, ERRIN |
| Remarks | ABS is originally processed by PIDIR. No registers are saved. |
| Flow Chart | Described in TABLE XXIm |

ENT1

| | |
|---|---|
| Type | Nonrecursive Subroutine |
| Function | Provides Pass 1 processing of ENT assembler directive. |
| Availability | Relocatable area. |
| Use | Call ENT1 |
| Subprograms Called | TESTL, ERRIN |
| Remarks | ENT is originally processed by PIDIR. No registers are saved. |
| Flow Chart | Described in TABLE XXIn |

TABLE XXIm
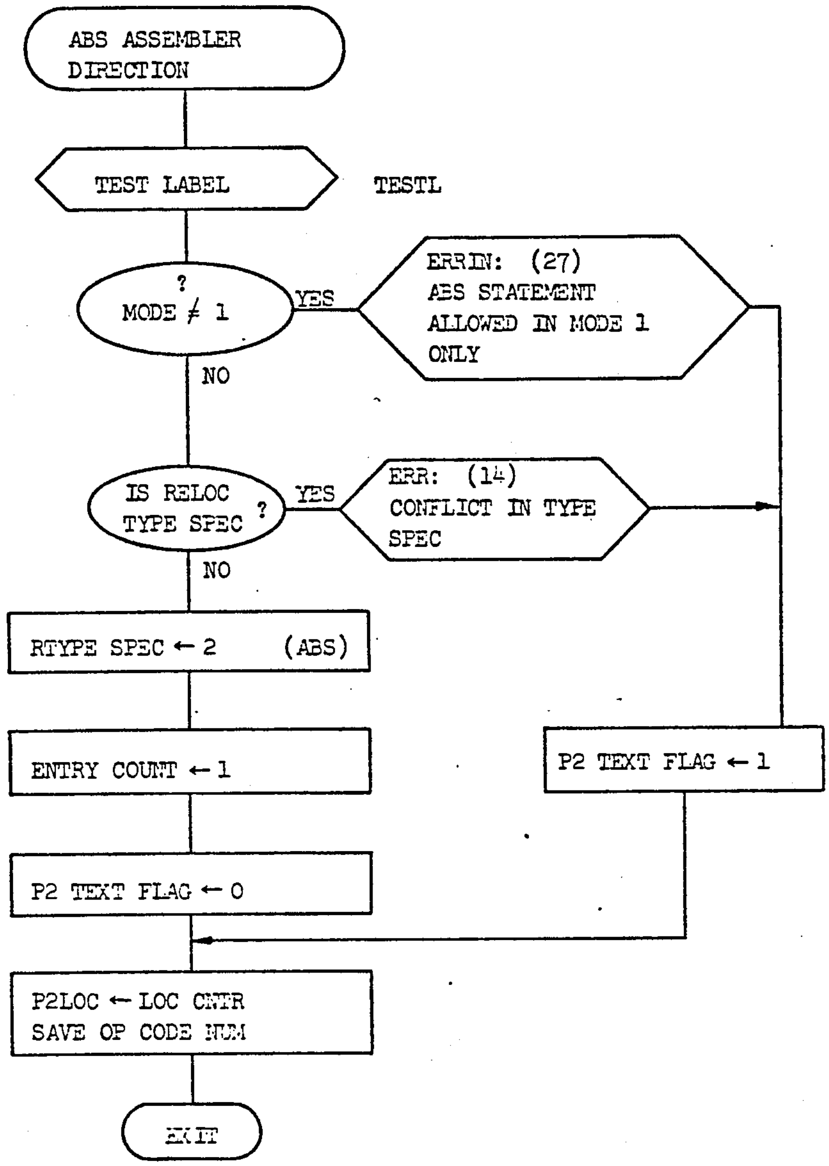

TABLE XXIn
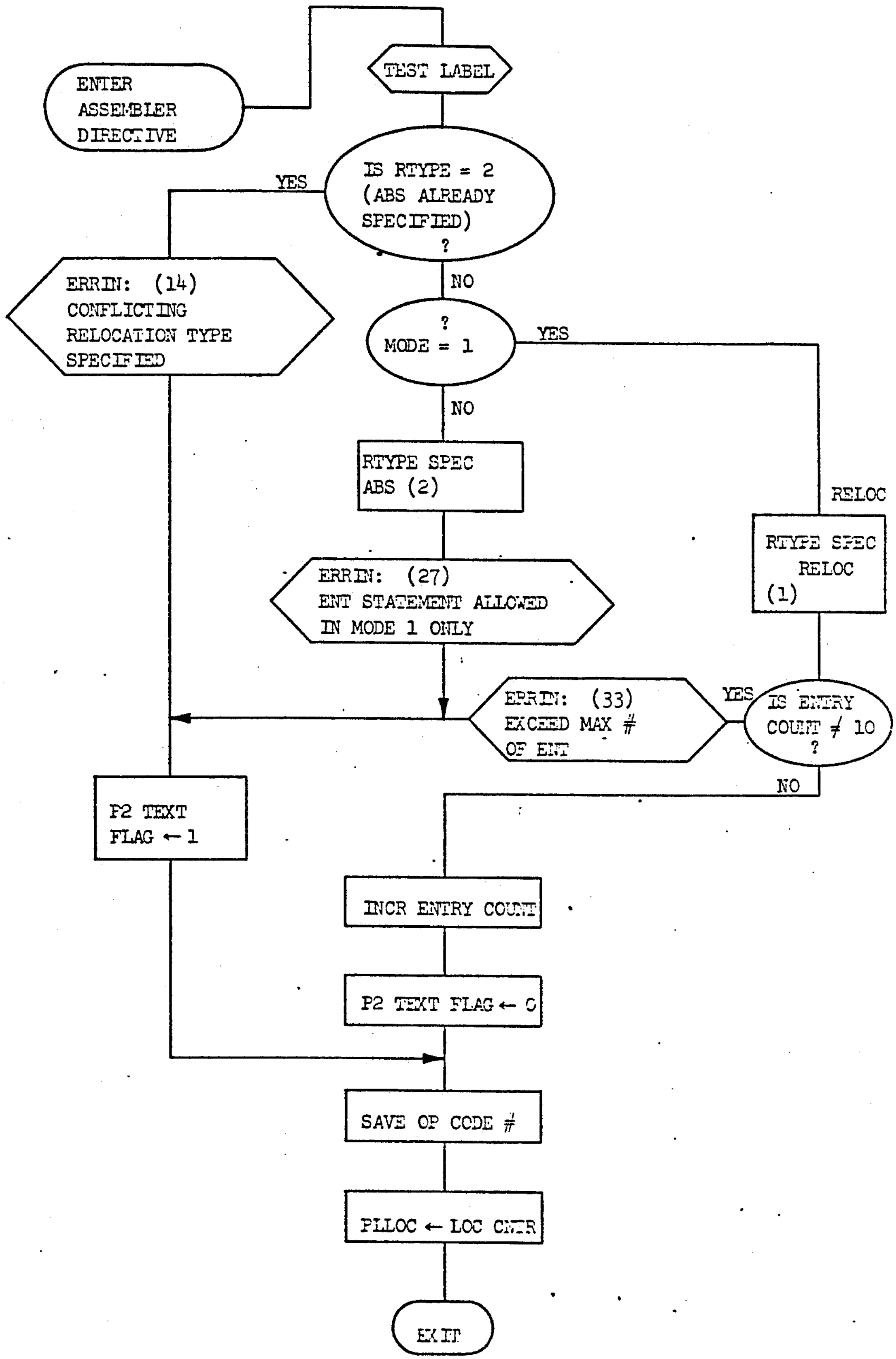

MDAT1

| | |
|---|---|
| Type | Nonrecursive Subroutine |
| Function | Provides Pass 1 processing of MDATA assembler directive. |
| Use | Call MDAT1 |
| Subprograms Called | TESTL, ERRIN |
| Remarks | There is no Pass 2 processing of this directive. No registers are saved. |
| Flow Chart | Described in TABLE XXIo |

CALL1/REF1

| | |
|---|---|
| Type | Nonrecursive Co-routine, Subroutine |
| Function | Provides Pass 1 processing of the CALL and REF assembler directives. |
| Use | CALL CALL1 or CALL REF1 |
| Subprograms Called | ERRIN, GETNF, SVEXT |
| Co-routines Called | FRA1 |
| Remarks | Routine calls SVEXT to accumulate all external references. No registers are saved. Both assembler directives are processed essentially alike. Different error checks are made and REF executes a subroutine exit, whereas CALL exhibits the co-routine characteristics. |
| Flow Chart | Described in TABLE XXIp |

TABLE XXIo
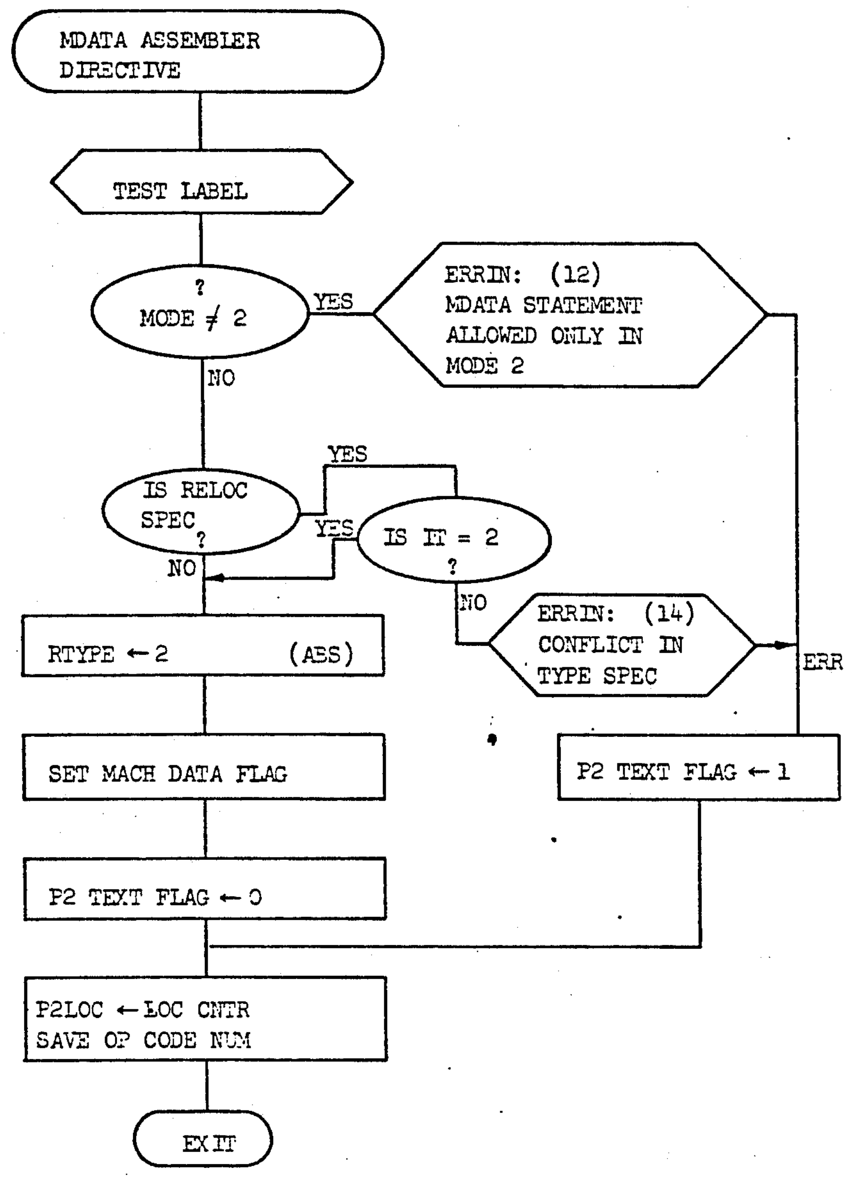

TABLE XXIp
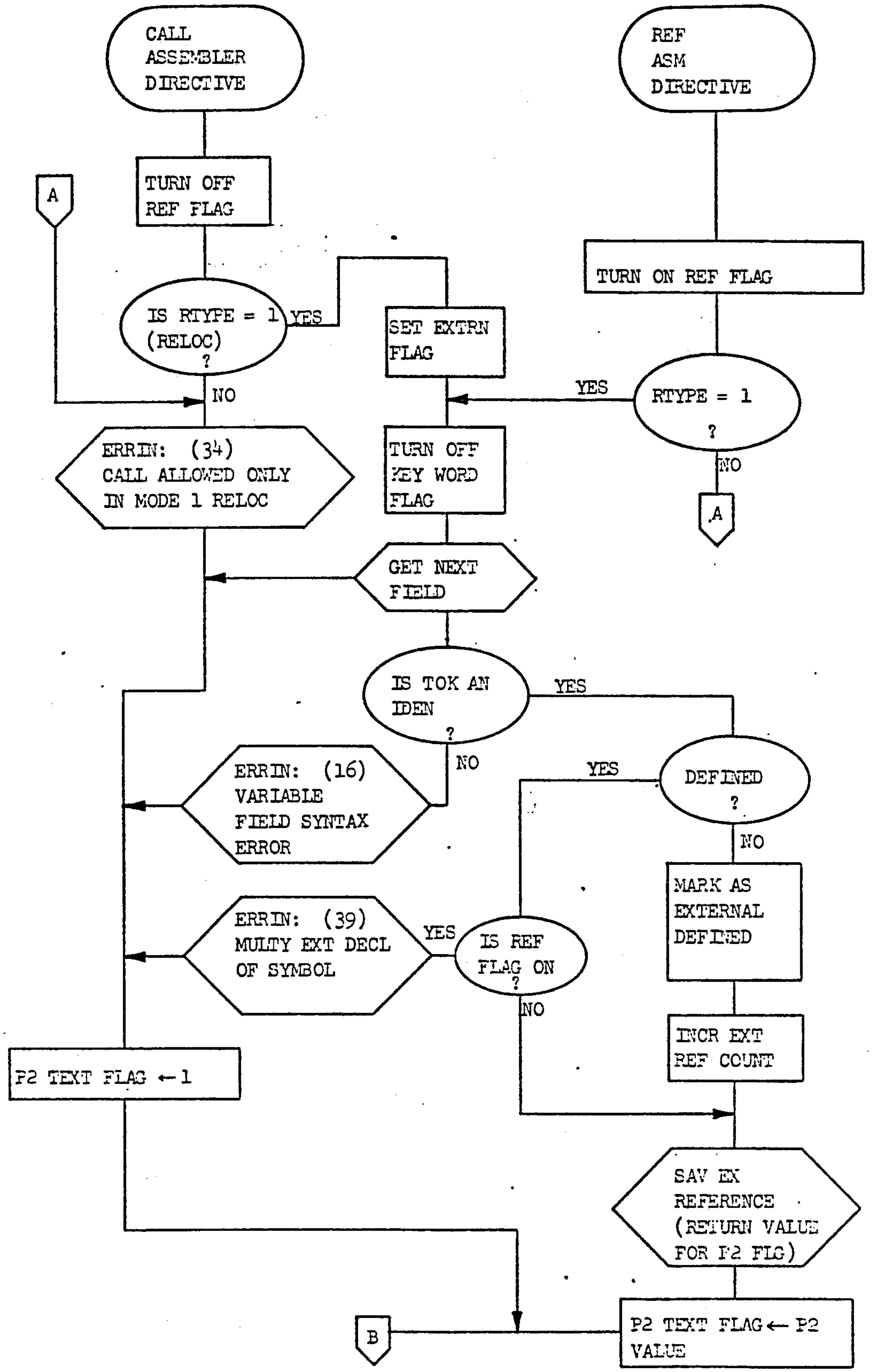

TABLE XXIp (cont'd)
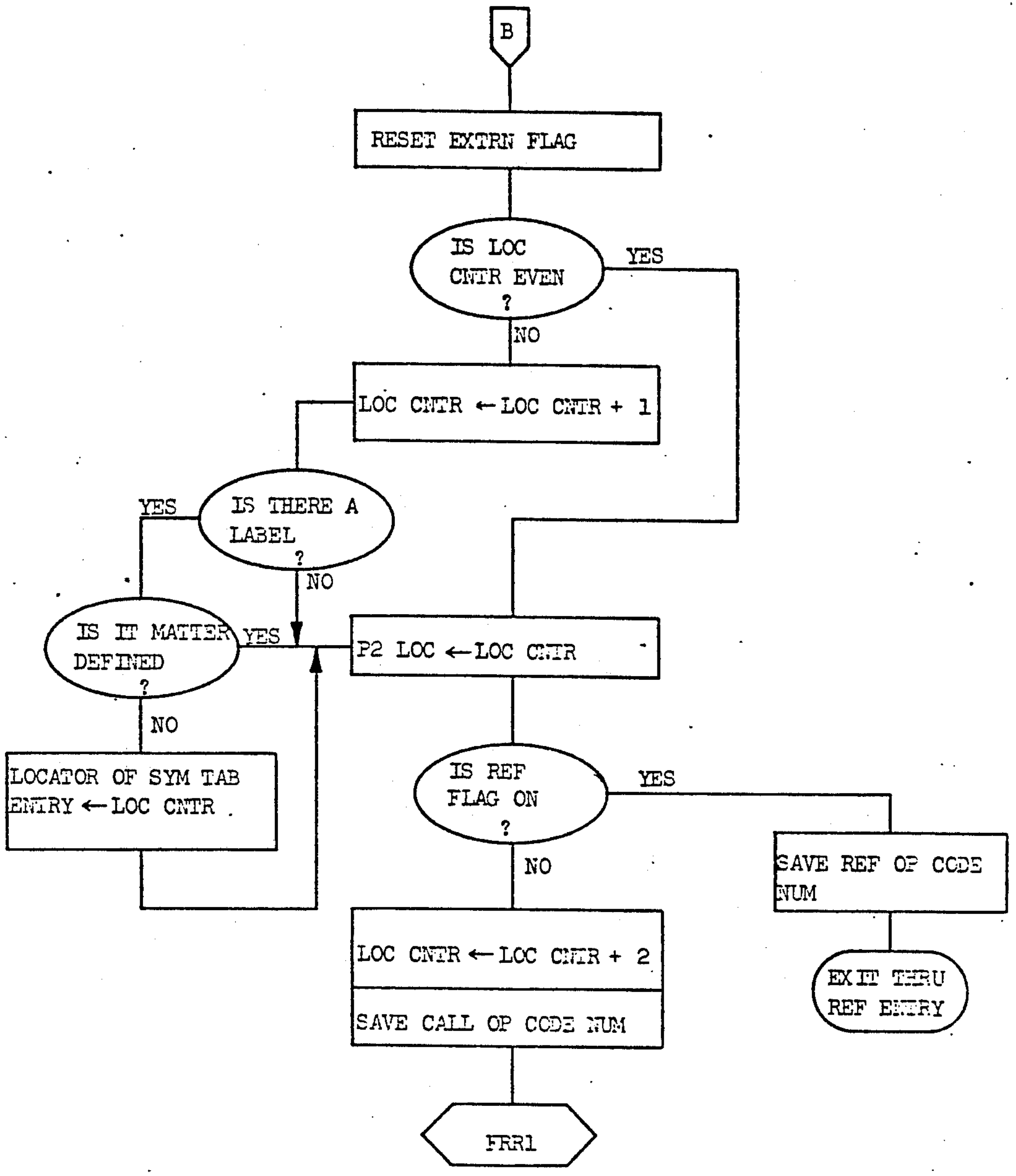

MDUM1/END1

| | |
|---|---|
| Type | Nonrecursive Co-routine |
| Function | Provides Pass 1 processing of MDUMY and END assembler directives. |
| Availability | Relocatable area. |
| Use | Call MDUM1 and Call END1 |
| Subprograms Called | TESTL, ERRIN, GETNF, EXPRN |
| Co-routines Called | FRA1 |
| Remarks | END terminates Pass 1 processing by setting the end flag. FRAM1 tests this flag and when set calls for Pass 2 execution. MDUMY causes the MDUMY flag to be set after which every statement (except the END) is expected to be labelled. |
| Flow Chart | Described in TABLE XXIq |

DEF1

| | |
|---|---|
| Type | Nonrecursive Subroutine |
| Function | Provides Pass 1 processing of DEF assembler directive. |
| Availability | Relocatable area. |
| Use | Call DEF1 |
| Subprograms Called | ENT1 |
| Remarks | The DEF statemenf is processed in Pass 1 precisely as the ENT statement. |
| Flow Chart | Described in TABLE XXIr |

TABLE XXIq
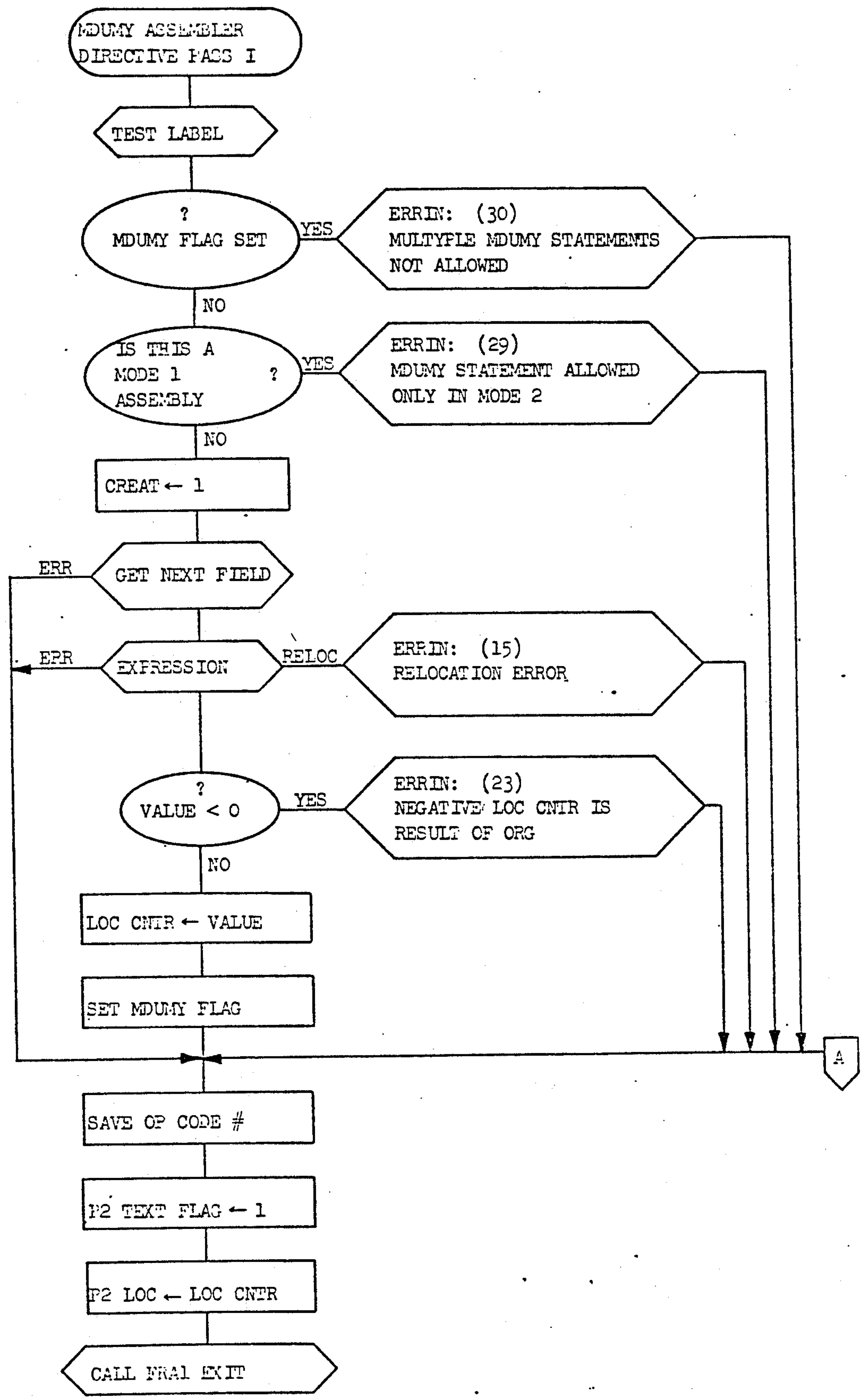

TABLE XXIq (cont'd)
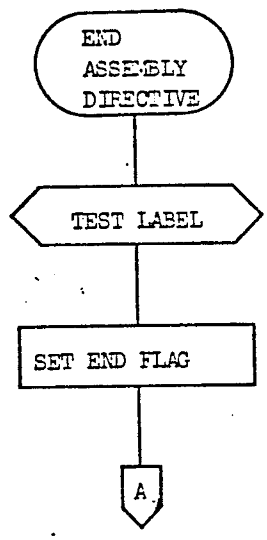

TABLE XXIr
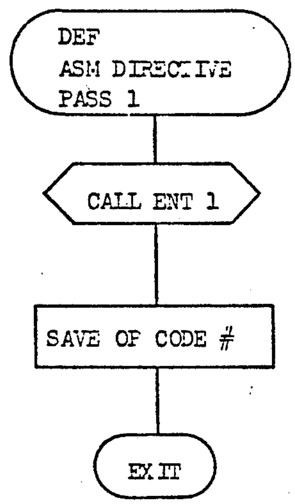

DMES1

| | |
|---|---|
| Type | Nonrecursive subroutine |
| Function | Decodes DMES statement text into DC instructions, two characters (ASC1) per DC instruction. If number of text characters is odd, a blank character is added to end the last DC Instruction. |
| Availability | Relocatable area. |
| Subprograms called | WOFF, TOK1, ERRIN, RGADC, PASON, CHEKC, FRA2. |
| Remarks | Program exits to FRA2. READC is called for continuation of DMES onto another card. Illegal character, missing or incorrect control characters, missing or incorrect continuation are detected and error message printed by ERRIN subroutine. |
| Limitations | Intended for use with PASON and WOFF subroutines to decode DMES statements into DC statements. |
| Flow Chart | Described in TABLE XXIs |

TABLE XXIs
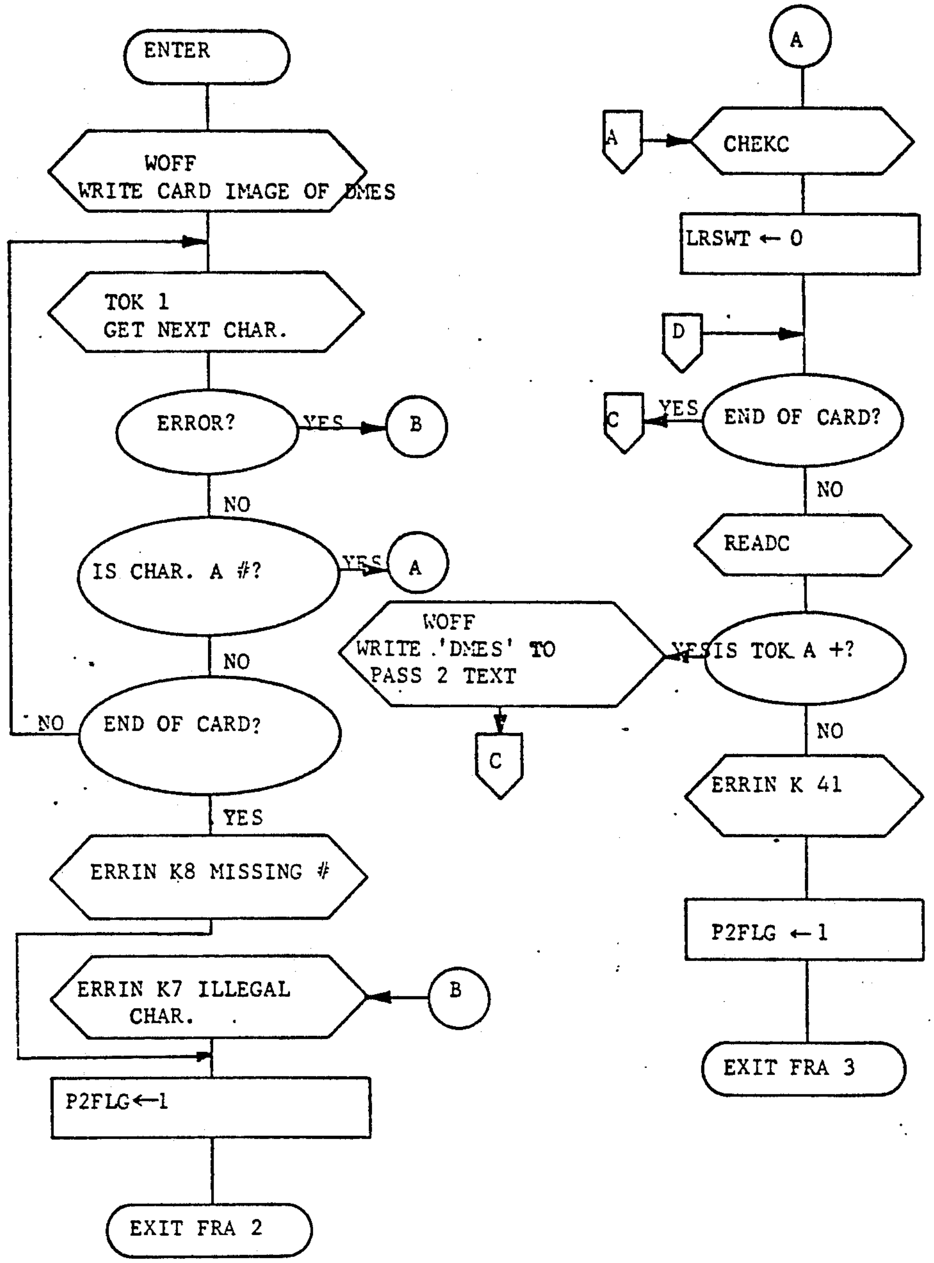

TABLE XXIs (cont'd)
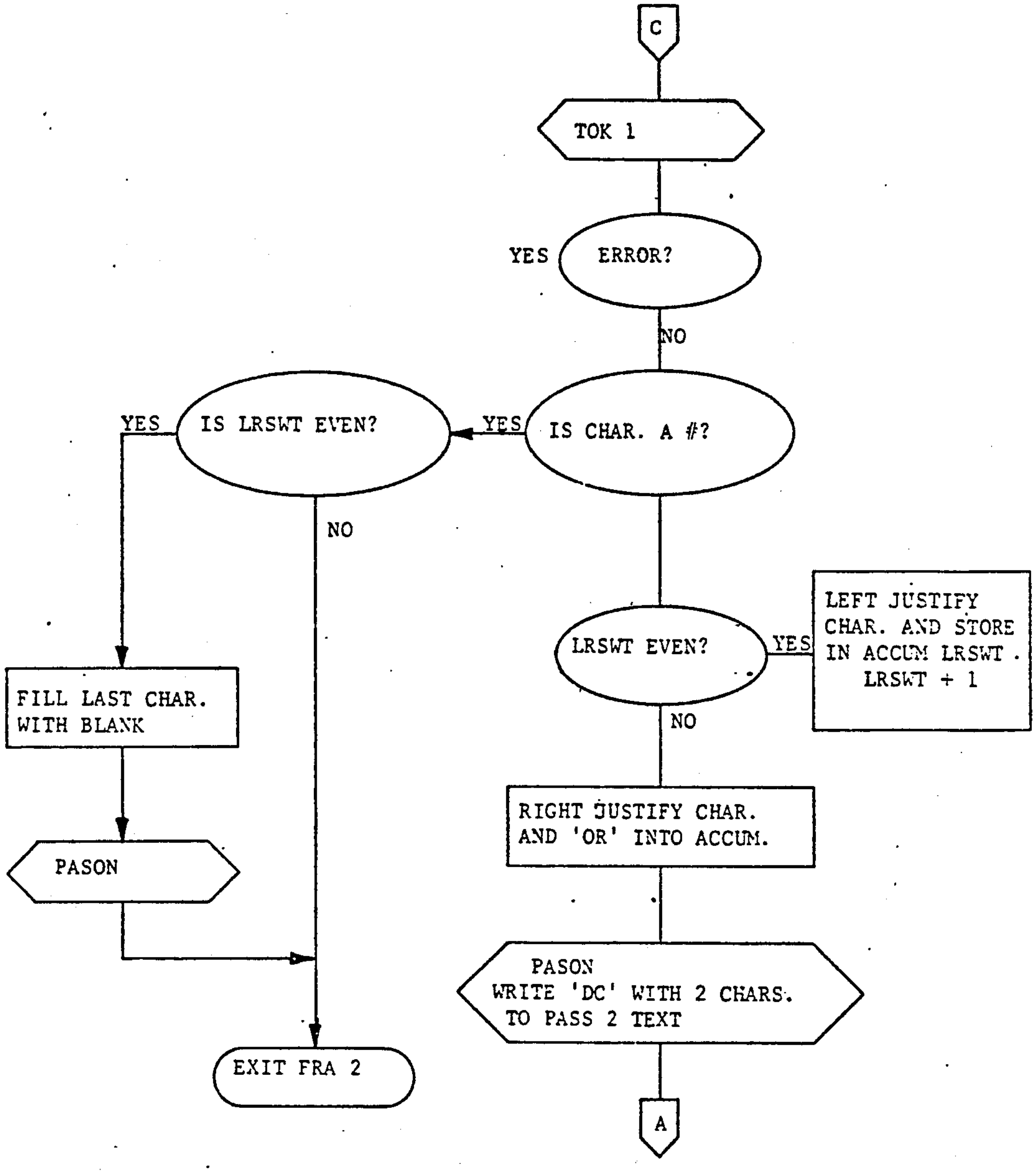

WOFF

| | |
|---|---|
| Type | Nonrecursive subroutine |
| Function | Writes Pass 2 text to disk (Non Process Working Storage) of header and card image of DMES instruction. Moves the unpacked card image to SAVE area for decomposition into DC instructions. |
| Availability | Relocatable area. |
| Subprograms Called | INSP2, WRTP2, MOVE, UNPAC |
| Remarks | The Pass Two text header (P2LOC, OPCDN, P2FLG) is initialized for DMES instruction. The save area is a buffer in COMMON area. |
| Limitations | Intended for use with DMES1 and PASON subroutines to decode DMES directive. |
| Flow Chart | Described in TABLE XXIt |

TABLE XXIt
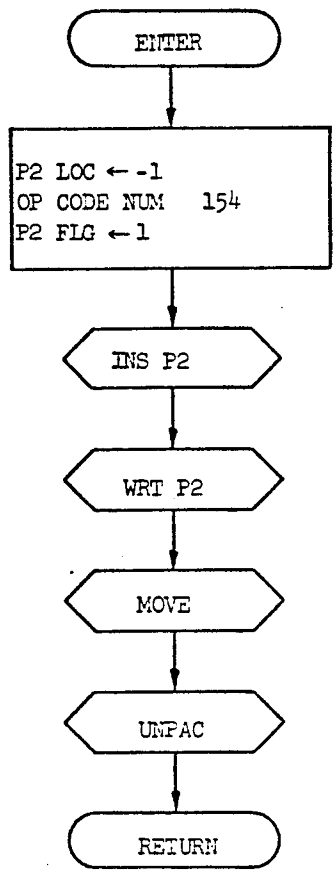

PASON

| | |
|---|---|
| Type | Nonrecursive subroutine |
| Function | Inserts "DMES EXPANSION" into the DC statements resulting from decomposition of a DMES statement. This keys the PASS TWO list option to suppress printing of the DC statements, printing only the DMES statement. Writes each DC instruction Pass Two text to disk (Nonprocess Working Storage). |
| Availability | Relocatable area. |
| Subprograms called | MOVE, UNPAC, INSP2, WRTP2. |
| Remarks | The Pass Two Text header (P2LOC, OPCDN, P2FLG) is initialized for DC instruction, plus column pointer for Pass Two scan of expansion text. |
| Limitations | Intended for use with DMES1 and WOFF subroutines to decode DMES directive. |
| Flow Chart | Described in TABLE XXIu |

TABLE XXIu
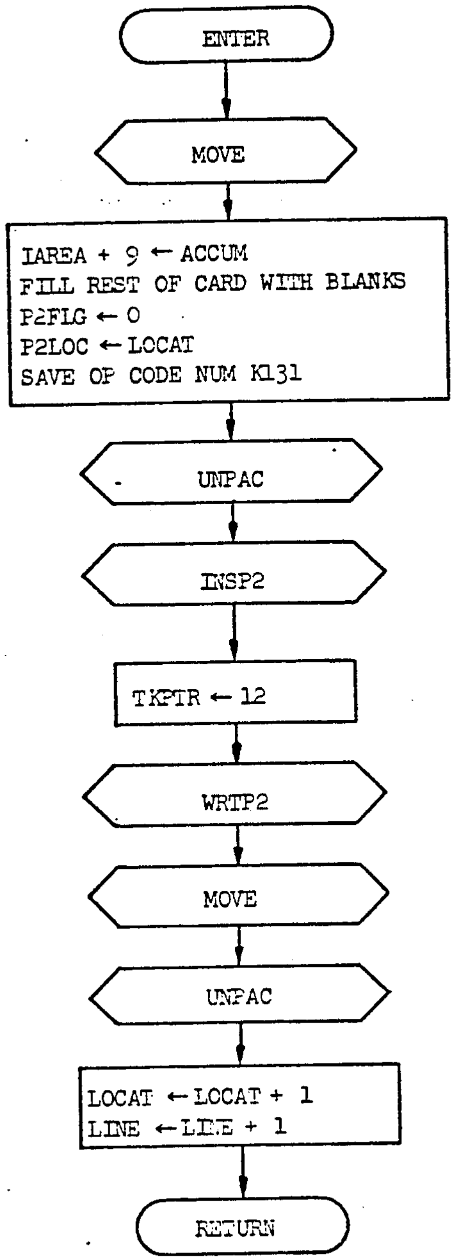

5. Execution of Pass Two

Pass Two is a collection of programs which perform the following functions:

a) Zero the flags, pointers and buffers used by Pass Two.

b) Fetch records (Pass Two Text) from disk, one at a time.

Note: Pass Two Text consists of a three-word header and the source card image truncated to the first 74 columns. The three-word header contains location assignment, error indicator, op code number, Pass Two text flag and last card column scanned in Pass One.

c) Process the record according to the Pass Two Text Flag.

| Value of Pass Two Text Flag | Requires Processing | Produces Object Code | (Option) May be Listed |
|---|---|---|---|
| 0 | Yes | Yes | Yes |
| 1 | No | No | Yes |
| 2 | Yes | Yes | No |

In certain noted instances the value of the flag may be altered during processing.

If no processing is required, skip to k).

d) If processing is required, determine if the op code number indicates an assembler directive of instruction. Of the sixteen assembler directives recognized by the assembler, eight are processed completely in Pass One. The other eight require processing in Pass Two; a separate subroutine is provided to process each of the eight as follows:

1) HDNG

If list option specified, move source text into heading buffer and cause printer to skip to top of new page. This will cause the listing subprogram to print the contents of the heading buffer, with data, time and page number. Ignore if list option is not set.

2) LIST

Set list option if "ON" is specified; reset list option if "OFF" is specified.

3) ABS )
ENT ) (pname)
DEF )

Mark (pname) in the symbol table as an external entry point (except for DEF which is marked external) for the program. Set Pass Two Text Flag to one.

Error conditions detected: Variable field syntax, if (pname) missing or incorrect; undefined symbol; multiple external declaration of symbol.

Note: The Pass Two Text Flag is altered for these directives; the effect is to suppress printing of generated object code when list option is specified (the other fields will still be listed).

4) DC

The operand field is interpreted as an expression.

5) CALL) (xname)
REF )

Extract the external name called or referenced from the symbol table and store it as the object code for the instruction. Update the external reference list pointer to the next entry. Set Pass Two Text Flag to one.

Note: The Pass Two Text Flag is altered for these assembler directives; the effect is to suppress printing of generated object code when list option is specified (the other fields will still be listed).

All assembler directives skip to k).

e) If the op code number indicates an instruction, the instruction definition (for specif ied mode) in the symbol table is accessed.

f) The syntax type is used to transfer control to a particular parsing subroutine, one for each syntax type. The subroutine "parses" the operand field of the record by continuation of scanning from the last card column scanned in Pass One. The column is the first one after the op code which is the last field detected in Pass One. Operands are detected by recognition of keywords, commas, and parantheses as special delimiters. Scanning is ended when a blank column is detected. Parsing is terminated when a syntax error, relocation type error, or record overrun is detected. Control passes to step i).

g) Each field is inserted into an operand list by the parse subroutine.

h) Each instruction is built according to its definition in the Instruction Definition Area. Data from the operand list is inserted in the proper subfield of the instruction as specified in the instruction composition list.

i) Finally the op code is added to complete the instruction code.

j) The completed instruction is added to an object code buffer which is written to disk when full or when a discontinuity in program core allocation is detected.

k) The program line number, assigned core location, generated op code source text and appropriate error indication may be listed optionally.

l) As an option (STORE or EDIT) the source text may be written back to disk storage (in particular, if editing is performed on the source text, it is desirable to update the source file to agree with the edited results). In this case the Pass Two Text is modified by moving the three-word header to the last three words (corresponding to columns 75-80) of the card image. This modified record (source text followed by header) is written into the source file reserved for the program.

m) Fetch the next record from disk. If not an END record, return to c).

n) When an END instruction is encountered, control is passed to EPILOG.

PASS TWO

INIP2

| | |
|---|---|
| Type | Main program (core load name ASMP2) |
| Function | The program performs initialization for Pass Two of the ASSEMBLER. If zeroes flags and resets buffer pointers used in Pass Two, initializes page and line counters for listings and sets up the first page heading. It reads the first record of Pass Two Text to initialize the Pass Two Text buffer. |
| Availability | Relocatable program area (INIP2) or core load area (ASMP2). |
| Use | The program is entered via LINK from core load PASS1. |
| Subprograms Called | CALL WRBIN to initialize write source text back |
| | CALL FITCH2 to get Pass Two Text records |
| | CALL REPK to pack source text in A2 format |
| | CALL RPSVW to write source text to disk file |
| | CALL CALEN to obtain date |
| | CALL RDTIM to obtain time of day |
| | CALL LSTI to print page heading |
| Core Loads Called | ASP2A |
| Limitations | The program assumes a "common" area as described in ASSEMBLER DESCRIPTION. |
| Flow Chart | Described in TABLE XXIIa |

TABLE XXIIa
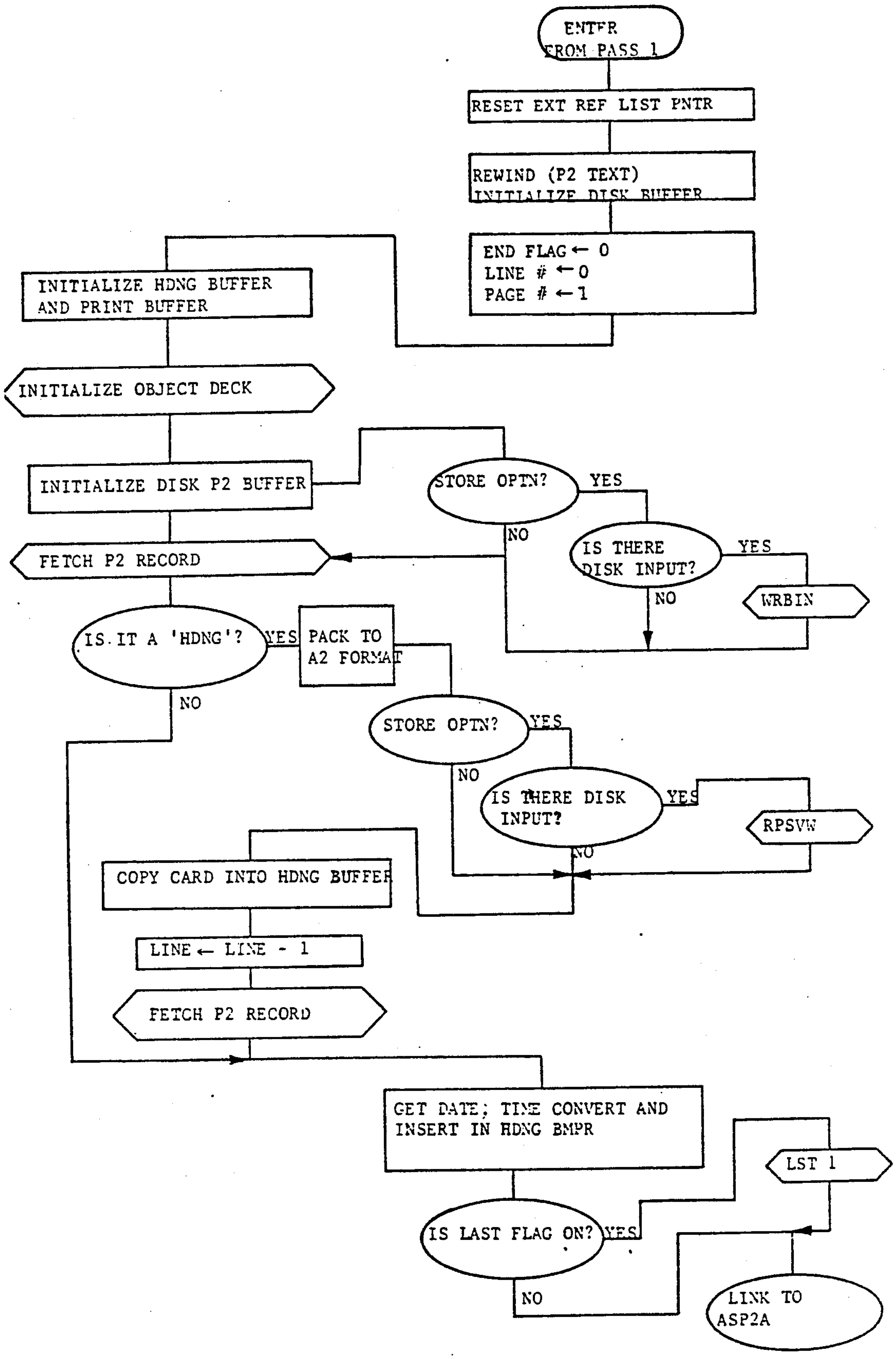

INOBJ

| | |
|---|---|
| Type | Nonrecursive Subroutine |
| Function | To initialize object module header |
| Availability | Relocatable area |
| Use | CALL INOBJ |
| Subprograms Called | ERRIN |
| Remarks | This program initializes the object module by setting the number of entries, external references, program type, binary core allocated in the header. It also copies the names of external references from EXLST into the header and checks to avoid any possible duplication. Pointers to be used by WOBJC are set. An error message is inserted if a name is not specified for Mode 2 programs. The object code buffer and object module buffer can be dumped with SSW 3 on. |
| Flow Chart | Described in TABLE XXIIb |

TABLE XXIIb
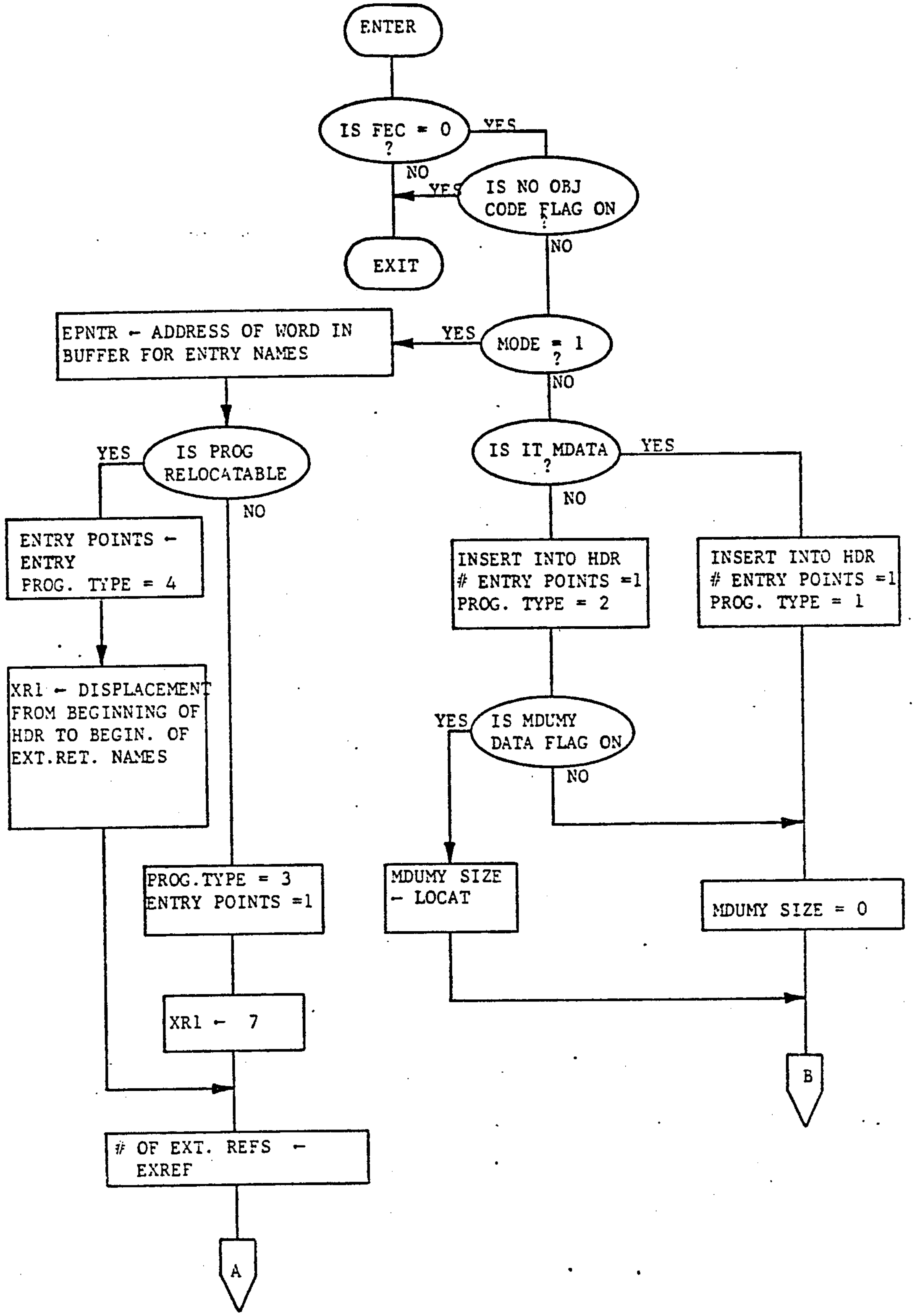

TABLE XXIIb (cont'd)
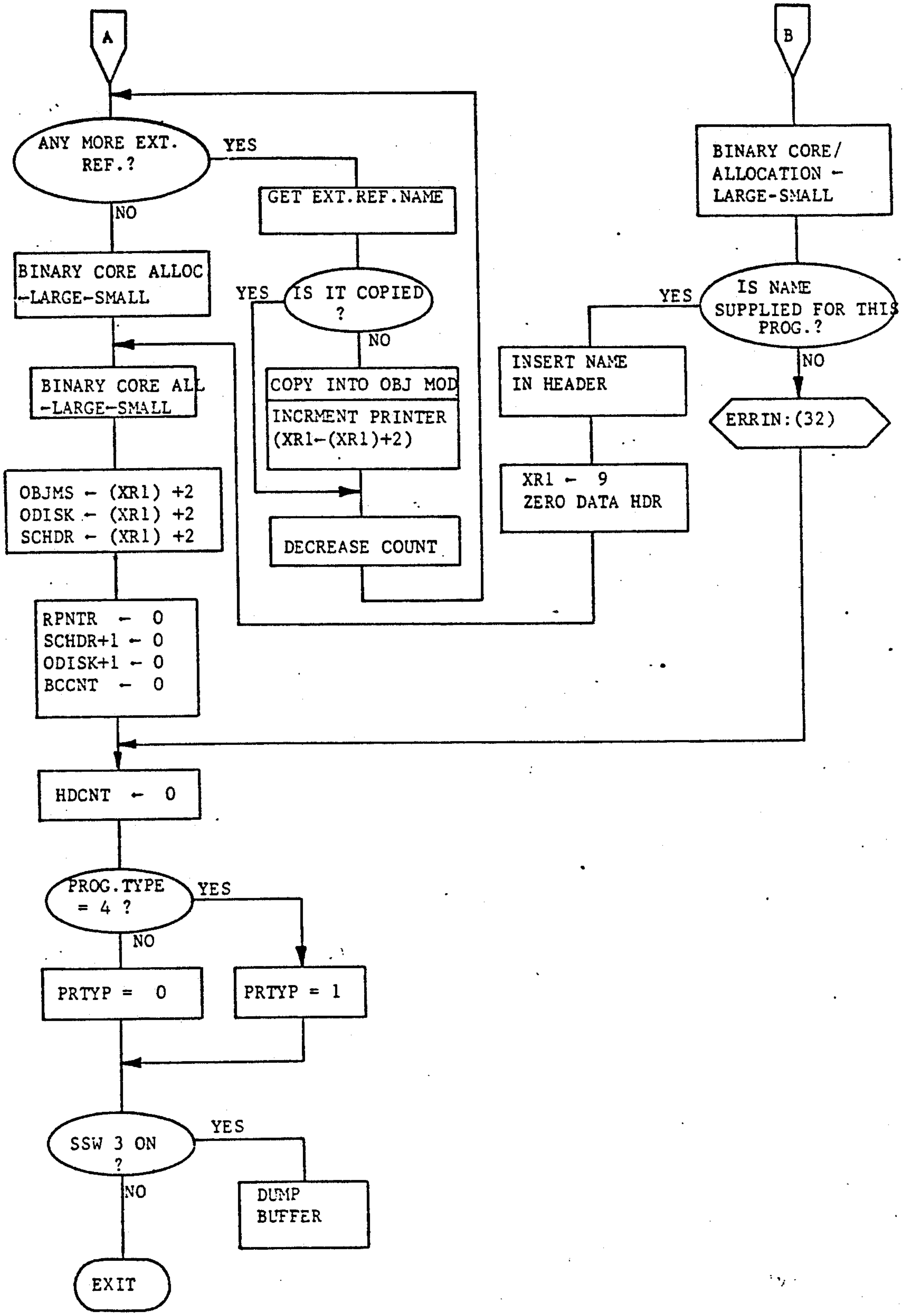

P2FRM

| | |
|---|---|
| Type | Main Program (core load name ASP2A) |
| Function | The program determines the type of processing required for each card image on the basis of the Pass Two Text Flag assigned to Pass One. If required, the program calls subroutines to process the card image operand field and generate object code corresponding to the card image, and also to write the object code to disk. Optionally, the program will li st the card image and/or store source text back on disk. |
| Availability | Relocatable program area (P2FRM) or core load area (ASP2A). |
| Use | The program is entered via LINK from core load ASMP2. |

Subprograms Called

| | | |
|---|---|---|
| CALL | P2STT | to process operand field of card image and produce object code. |
| CALL | WOJBC | to add generated object code to object module on disk |
| CALL | LISTI | to print card image |
| CALL | REPK | to pack source text in A2 format |
| CALL | RPSVW | to write source text back to disk file |
| CALL | FTCH2 | to obtain the next Pass Two text record from disk |
| CALL | WRBUF | To write the last source record back to disk file |

| | |
|---|---|
| Limitations | The program assumes a "common" area as described with respect to the ASSEMBLER DESCRIPTIOI |
| Flow Chart | Described in TABLE XXIIc |

TABLE XXIIc
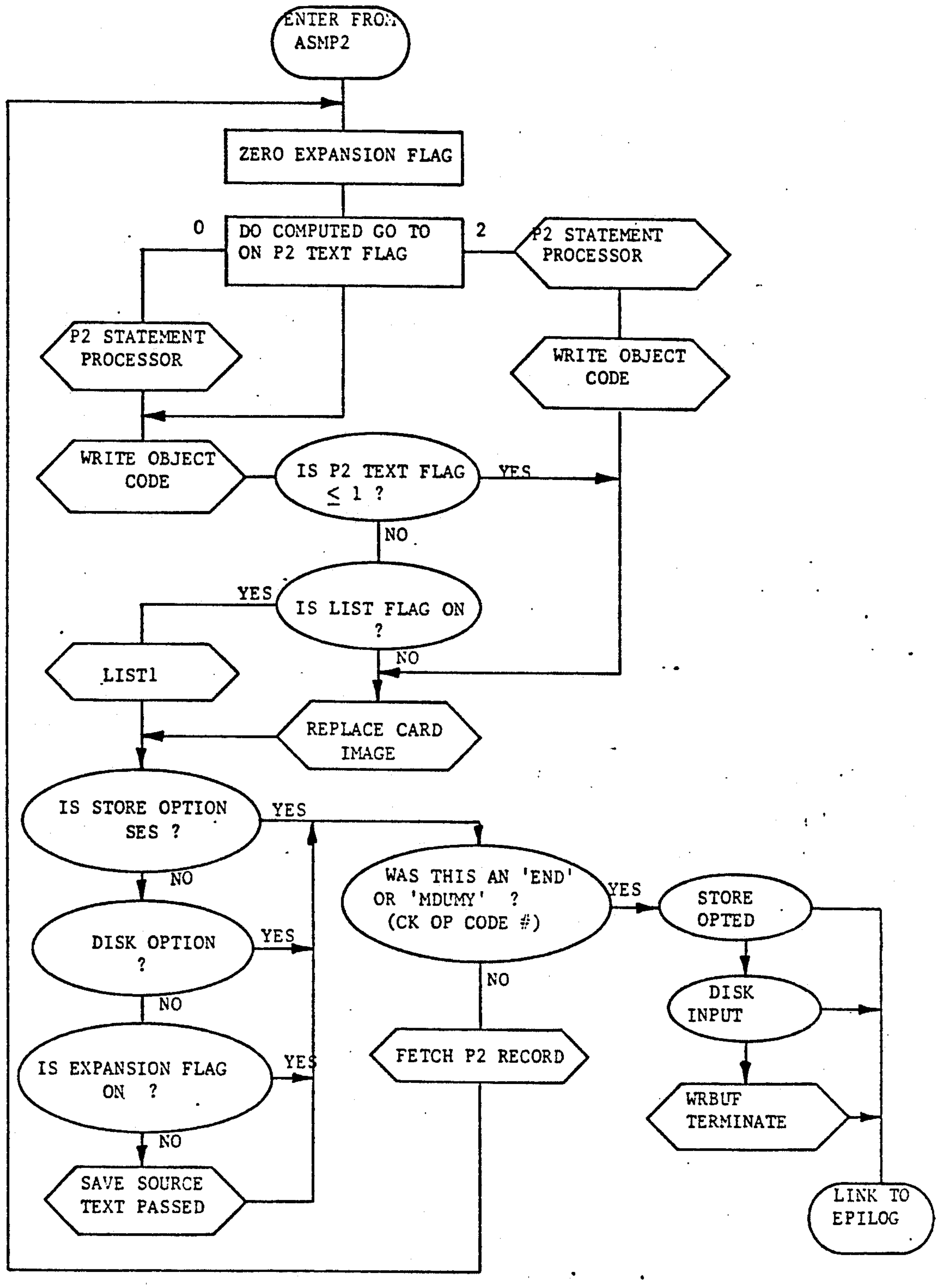

Type: Recursive Subroutine

Function: The subroutine is called to proce image that contains an operand fi special subroutine to process eac directive. For normal instructi( from the instruction definition the (parse type) and branches to a pa1 (which builds a list of operands fr field). On return from the parse the values from the operand list a: the subject code for the instructio1 in the instruction composition list instruction. Error checking inclı number of values in the list, apprc value depending on field width, and instruction in the specified prograr of the subroutine is object code for described on the card image being ] errors are detected, an instruction operands is produced). The instru in a "common" variable area.

Availability: Relocatable program area.

Use: The subroutine is entered by a CAL No arguments are required; the suk assumes the input card image (Pass located in buffer IAREA.

Additional Entry Points: CALL SFAIL
CALL VFAIL
CALL RFAIL
CALL EFAIL

Subprograms Called

| | | |
|---|---|---|
| CALL | DC2 | to process "DC" directive |
| CALL | LIST2 | to process "LIST" directive |
| CALL | HDNG2 | to process "HDNG" directive |
| CALL | ASBS2 | to process "ABS" directive |
| CALL | ENT2 | to process "ENT" directive |
| CALL | CALL2 | to process "CALL directive |
| CALL | PSHRA | to save return address |
| CALL | POPRA | to return to calling program |
| CALL | SFAIL | to generate "variable field syntax error" message. |
| CALL | ERRIN | to generate various error messages |
| CALL | P2RS1 | to parse for syntax type 1 |
| CALL | P2RS2 | to parse for syntax type 2 |
| CALL | P2RS3 | to parse for syntax type 3 |
| CALL | P2RS4 | to parse for syntax type 4 |
| CALL | P2RS5 | to parse for syntax type 5 |
| CALL | P2RS6 | to parse for syntax type 6 |
| CALL | P2RS7 | to parse for syntax type 7 |
| CALL | P2RS8 | to parse for syntax type 8 |
| CALL | P2RS9 | to parse for syntax type 9 |
| CALL | PRS10 | to parse for syntax type 10 |

Remarks

The subroutine has five entry points;

P2STT - normal entry

VFAIL - error entry, illegal value in variable field

SFAIL - error entry, variable field syntax error

RFAIL - error entry, invalid relocatable variable in variable field.

EFAIL - error entry, invalid expression in variable field.

Limitations

Arguments are assumed to be in a "common" area. See ASSEMBLER DESCRIPTION for a description of the common area. .

Flow Chart

Described in TABLE XXIId

TABLE XXIId
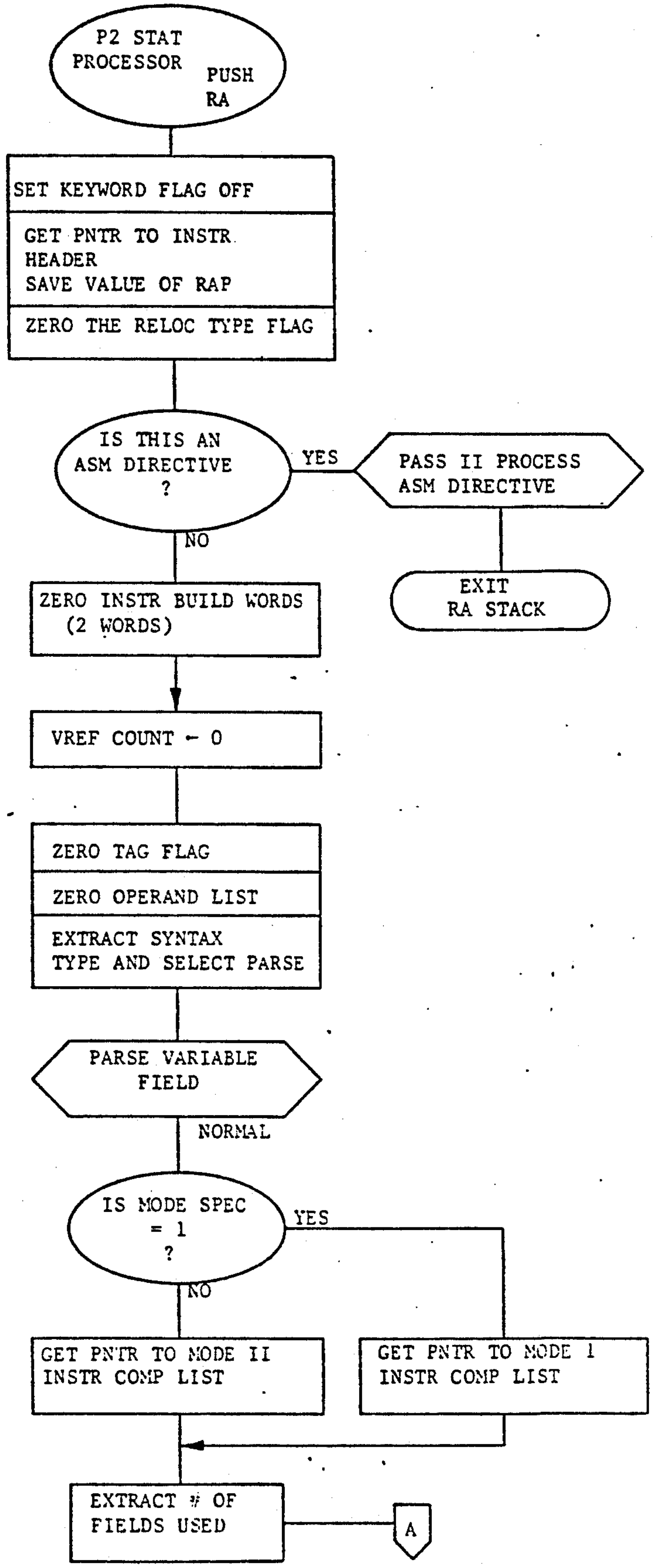

TABLE XXIId (cont'd)
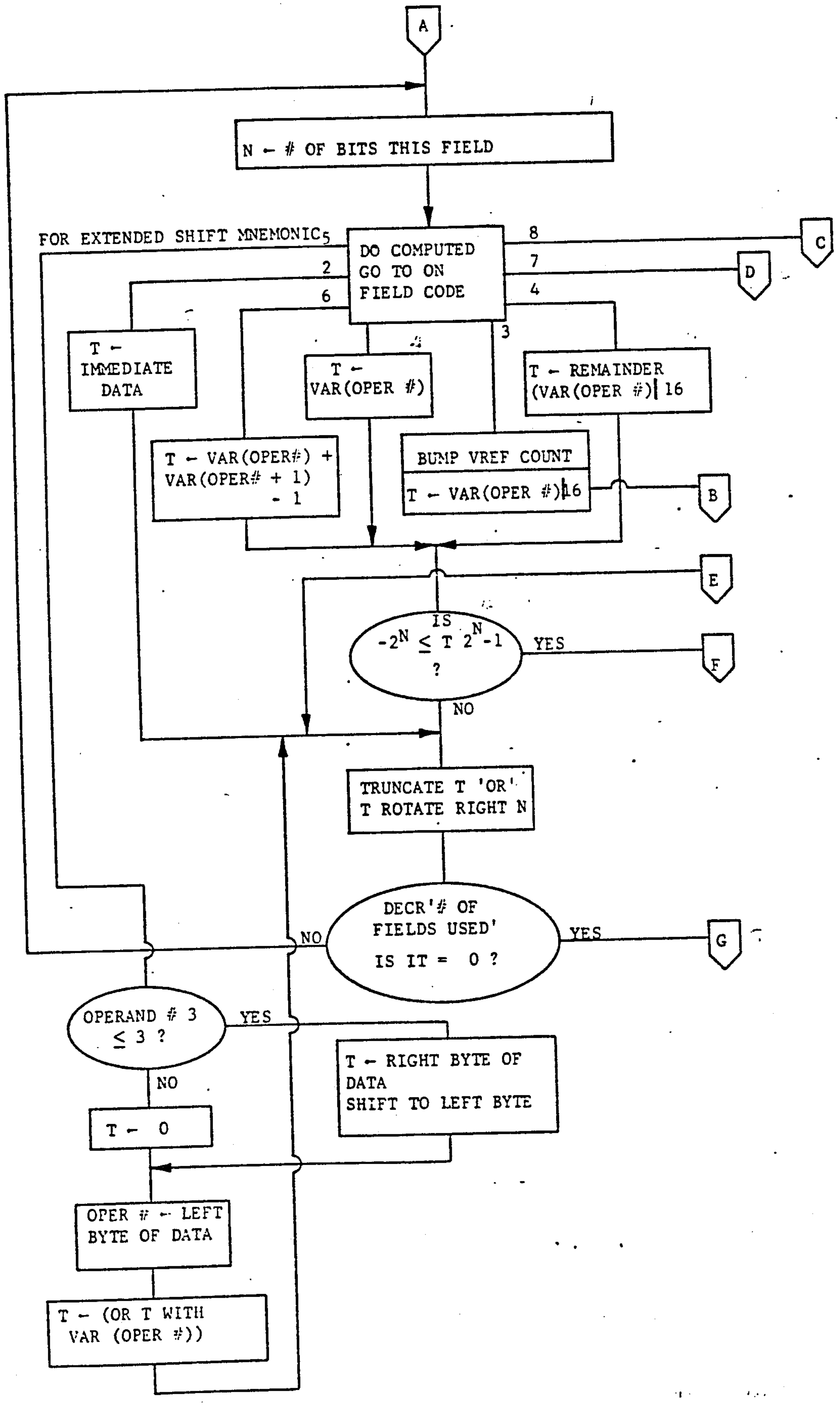

TABLE XXIId (cont'd)
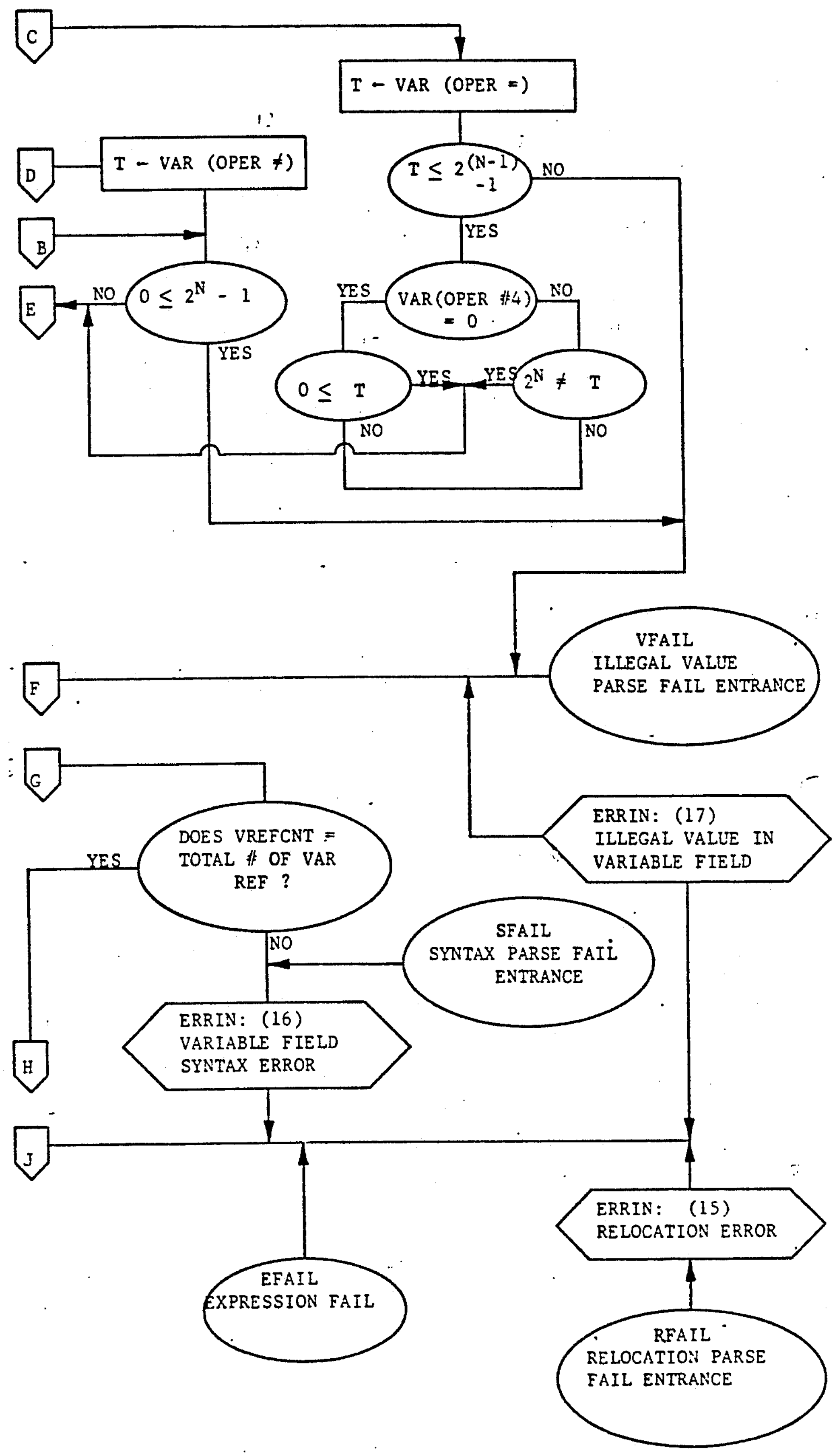

TABLE XXIId (cont'd)
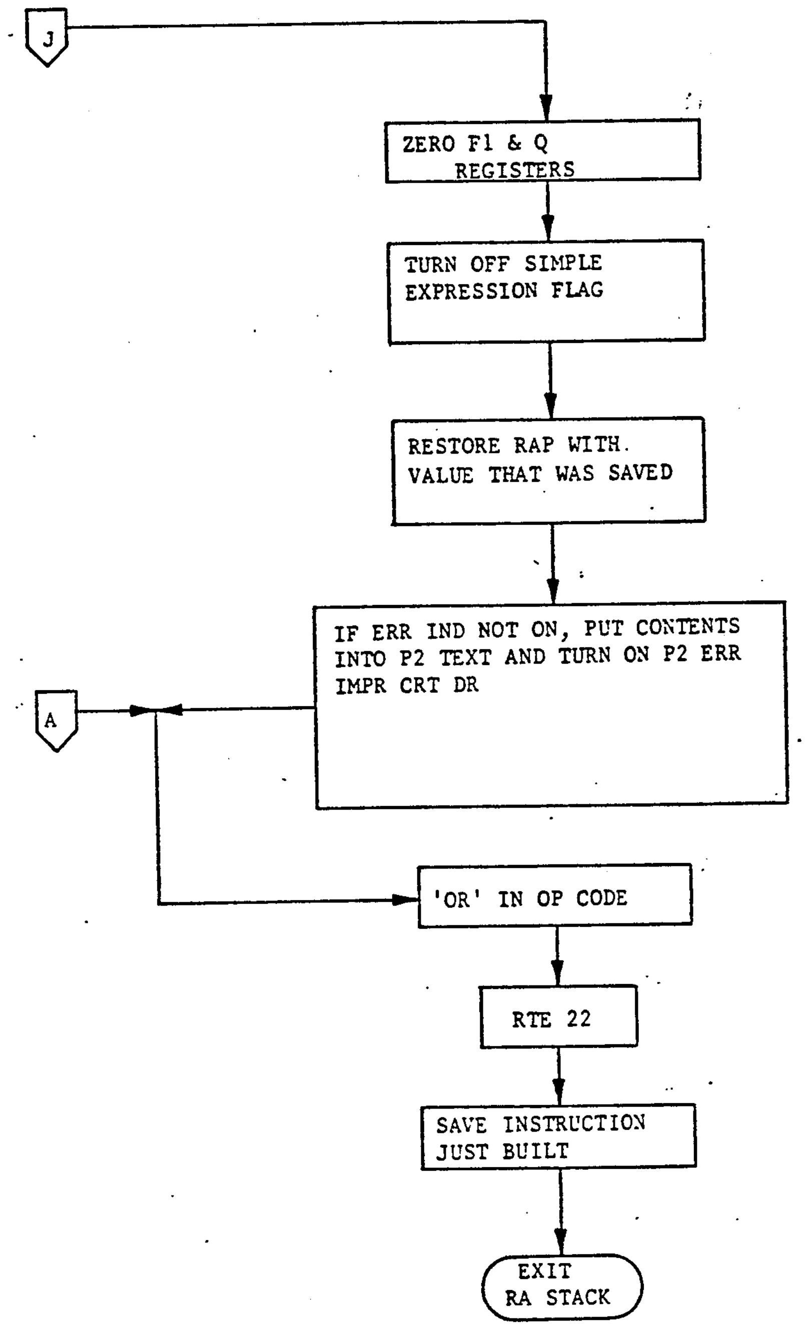

LISTI

| | |
|---|---|
| Type | Recursive Subroutine |
| Function | The subroutine prints a card image on the system printer, along with the corresponding object code for the instruction and the assigned location, an error flag (two asterisks) and column marker (dollar sign) when errors are detected, plus a line count and page headings when bottom of page is encountered. See ASSEMBLER DESCRIPTION for description of line and heading formats. |
| Availability | Relocatable program area. |
| Use | The subroutine is entered by CALL LISTI. Additional entry points: CALL LSTI No arguments are required; the card impage (Pass Two Text) to be printed is assumed to be in buffer IAREA. |
| Subprograms Called | CALL PSHRA to save return address<br>CALL POPRA to return to calling program<br>CALL REPK to repack card image to A2 format<br>CALL LSTI to print heading on new page. |
| System Subprograms Called | PRNTN, BINDC, HOLPR, BINHX |
| Remarks | The subroutine has two entry points.<br>CALL LISTI - normal entry point<br>CALL LSTI - to print heading on new page |
| Limitations | Arguments used are assumed to be in a "common" area. See ASSEMBLER DESCRIPTION for a description of the common area. |
| Flow Chart | Described in TABLE XXIIe |

TABLE XXIIe
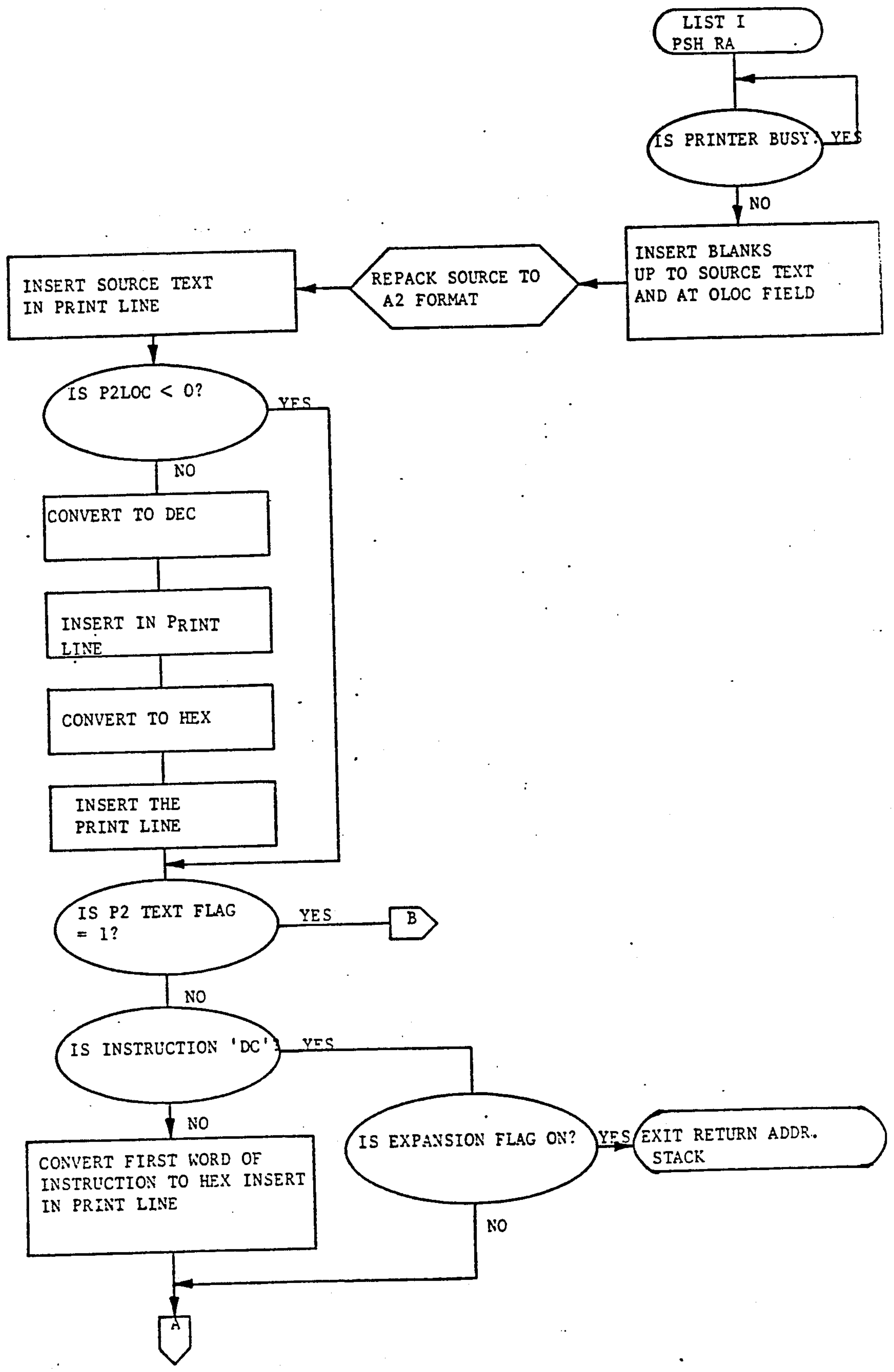

TABLE XXIIe (cont'd)
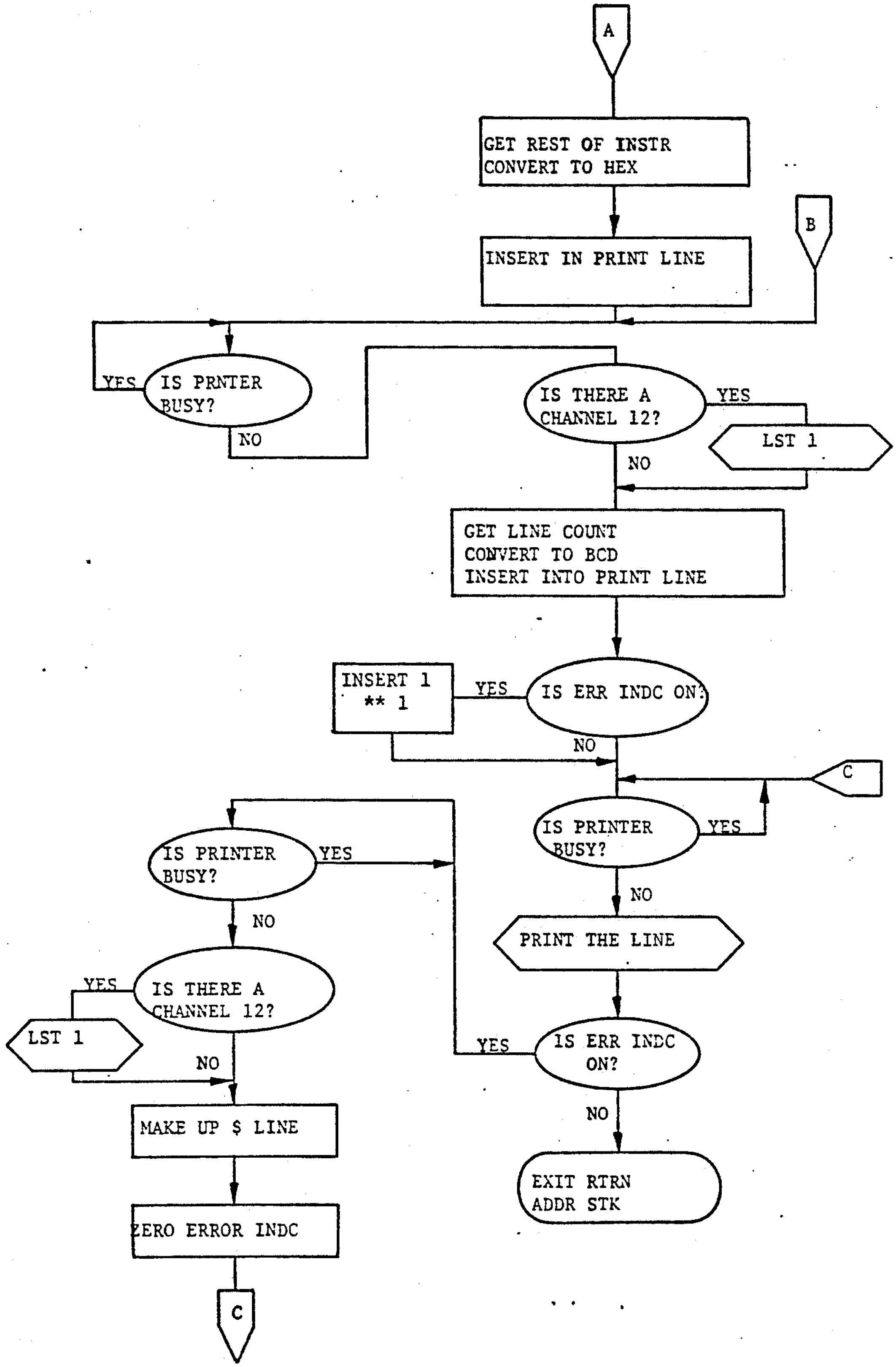

TABLE XXIIe (cont'd)
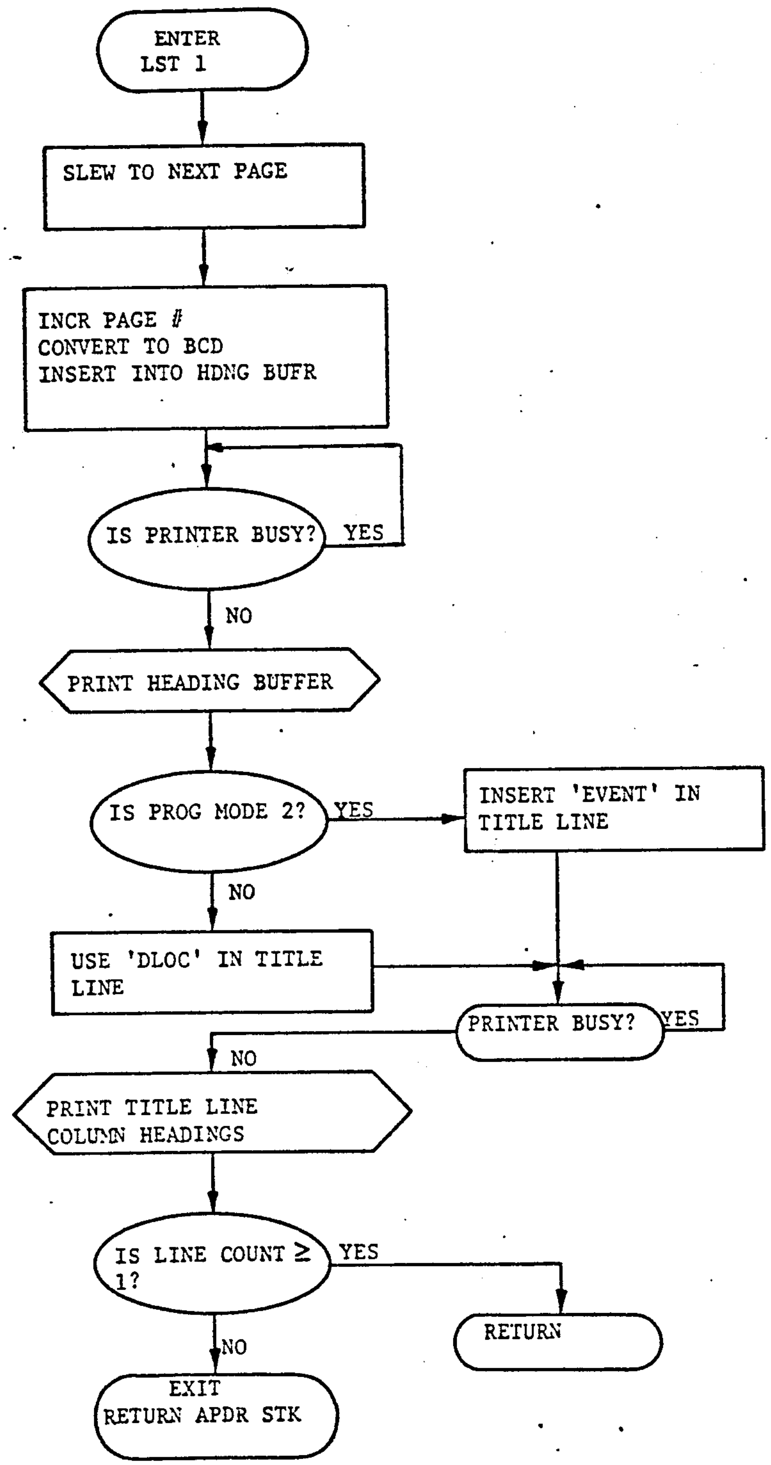

HDNG2

| | |
|---|---|
| Type | Nonrecursive Subroutine |
| Function | To process HDNG assembler directive in Pass 2 to print heading on each page of listing. |
| Availability | Relocatable area. |
| Use | CALL HDNG2 |
| Subprograms Called | REPK |
| Remarks | If the list flag is on, the next 61 characters after HDNG are picked up, converted and stored in heading buffer and the heading is printed. Otherwise, the program just exits. |
| Limitations | Only 61 characters will be printed. |
| Flow Chart | Described in TABLE XXIIf |

LIST2

| | |
|---|---|
| Type | Nonrecursive Subroutine |
| Function | To process LIST assembler directive in Pass 2 to start or stop listing of the programs r |
| Availability | Relocatable area. |
| Use | CALL LIST2 |
| Subprograms Called | GETNF |
| Remarks | This checks the variable field of the LIST card and accordingly turns off the list flag or sets the list flag on and sets no object code flag. |
| Flow Chart | Described in TABLE XXIIg |

TABLE XXIIf
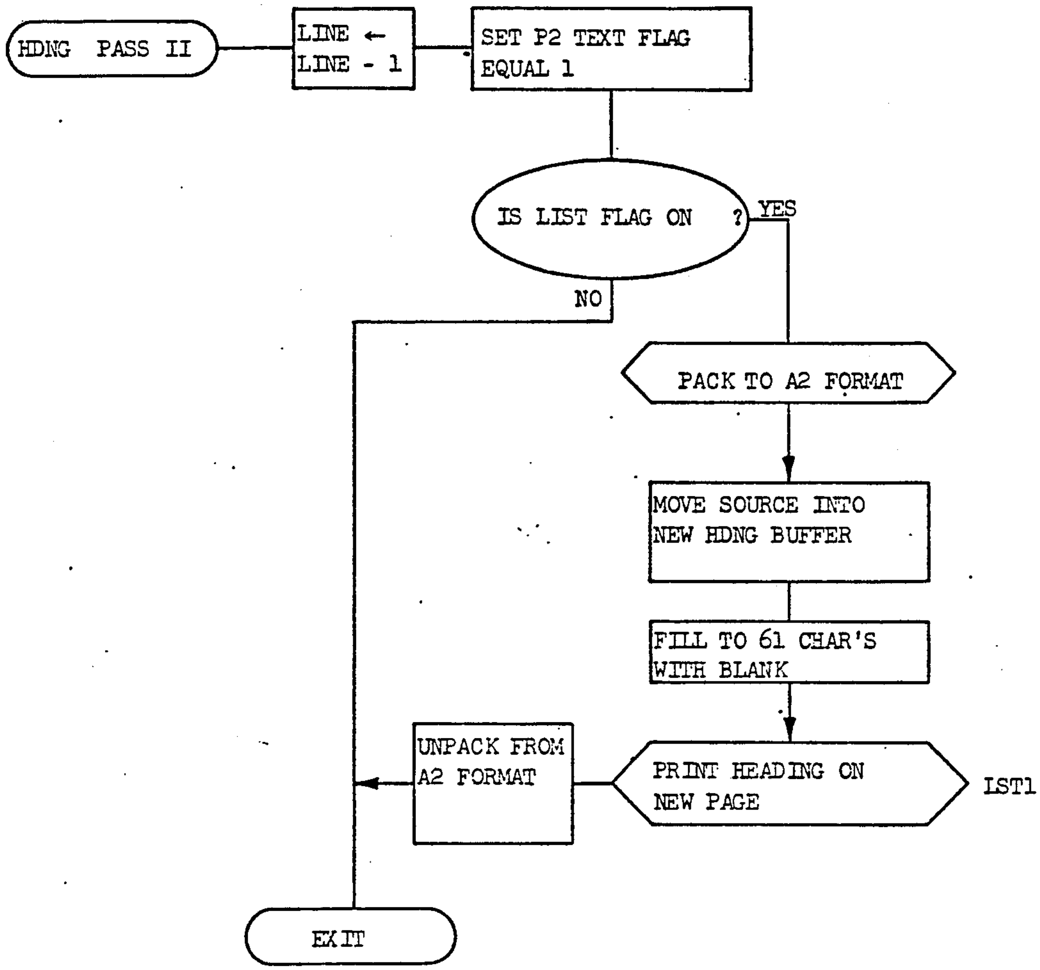

TABLE XXIIg
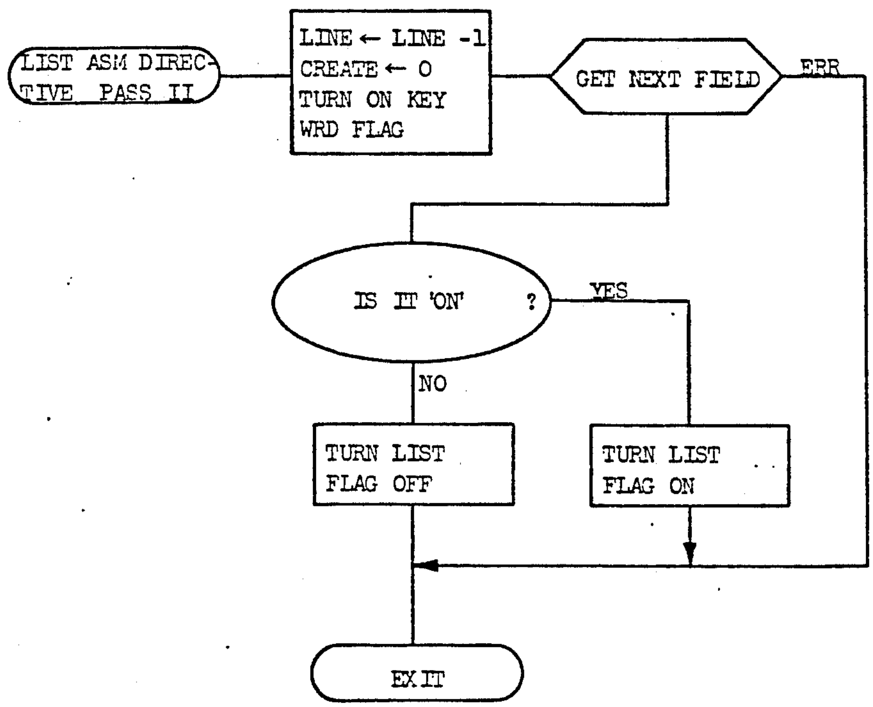

ABS2, ENT2, DEF2

| | |
|---|---|
| Type | Nonrecursive Subroutine |
| Function | To process 'ABS and 'ENT' and 'DEF' assembler directives in Pass 2 |
| Availability | Relocatable area. |
| Use | CALL ABS2<br>or<br>CALL ENT2<br>or<br>CALL DEF2 |
| Subprograms Called | GETNF, ERRIN |
| Remarks | This has three entry points but they are the same. This checks if 'TOK' is an identifier and if the symbol is defined. If not an error message is set up. This also sets the P2 text flag. |
| Flow Chart | Described in TABLE XXIIh |

DC2

| | |
|---|---|
| Type | Nonrecursive Subroutine |
| Function | To process 'DC' Assembler directive in Pass 2 |
| Availability | Relocatable area. |
| Use | Call DC2 |
| Subprograms Called | GETNF, EXPRN |
| Remarks | This calls GETNF and EXPRN to get the value of the constant in the variable field and puts in INSBL. If there is an error it returns back to the error return, stores zero for value. |
| Flow Chart | Described in TABLE XXIIj |

TABLE XXIIh
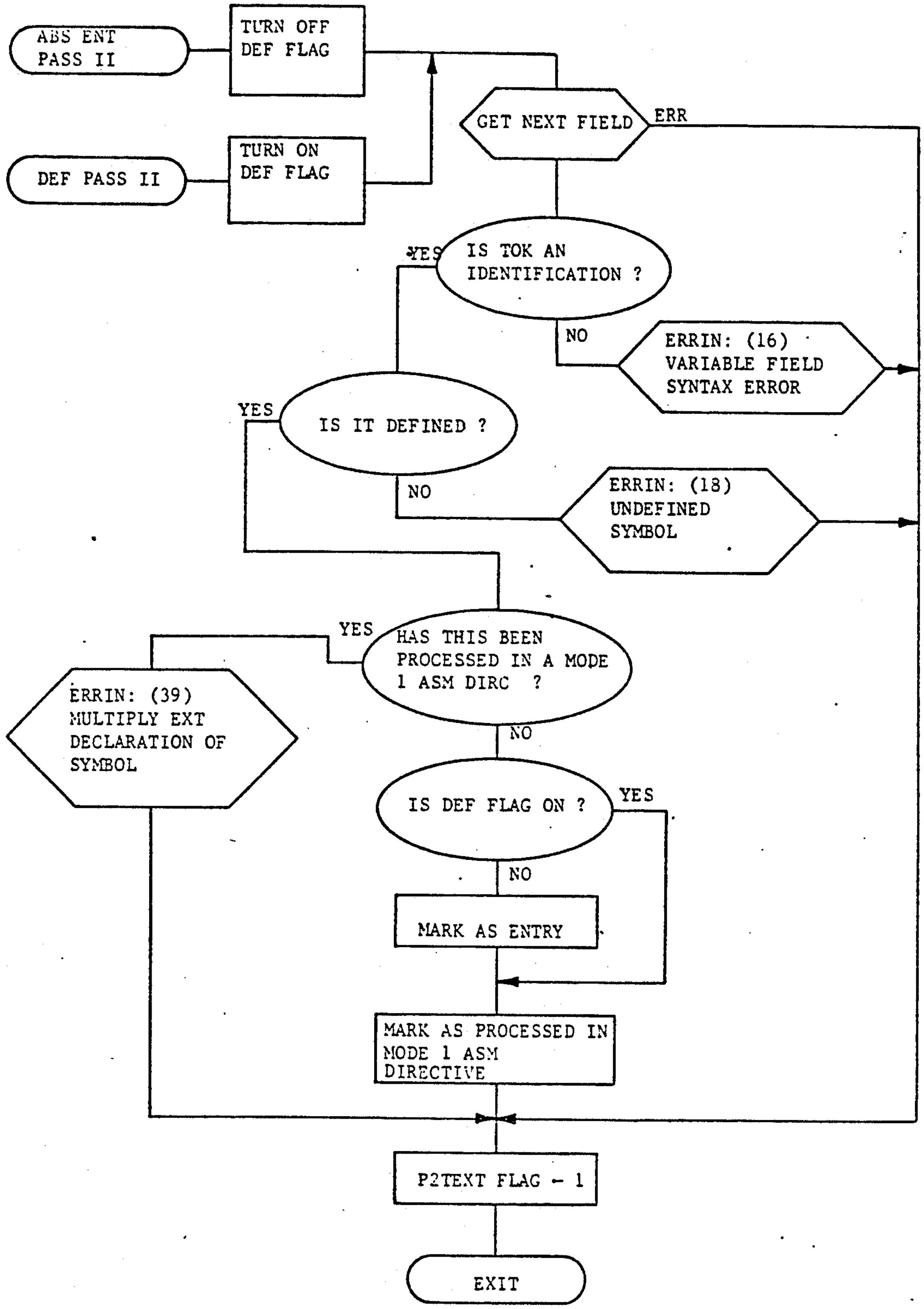

T. ... XXIIj
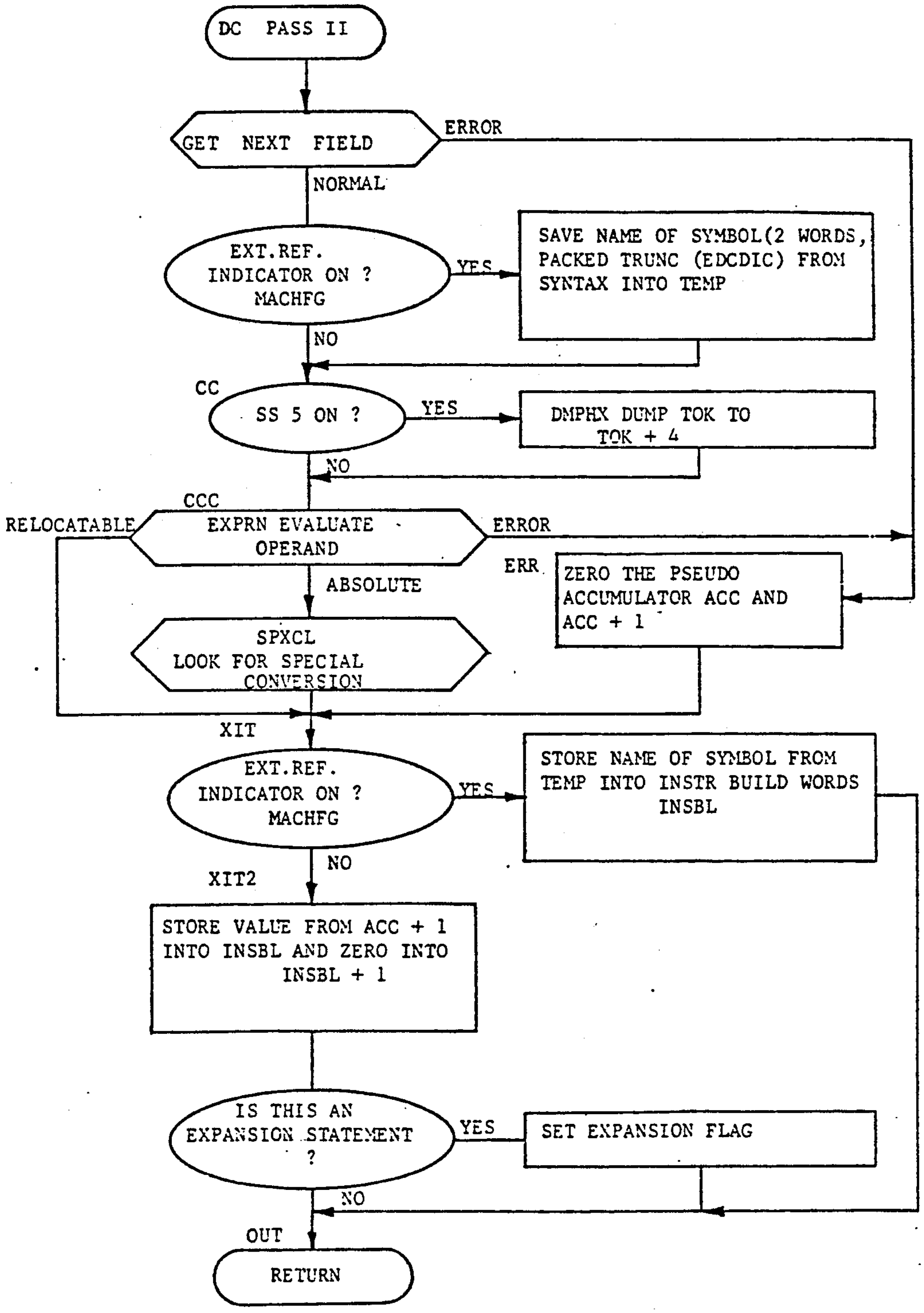

CALL2

| | |
|---|---|
| Type | Nonrecursive Subroutine |
| Function | To process CALL op code in Pass 2 by extracting the ALPHA name of external entry and storing in INSBL for later processing to generate object module. This also sets P2 text flag =1 to prevent print of instruction field in listing. |
| Availability | Relocatable area. |
| Use | CALL CALL2 |
| Subprograms Called | None |
| Remarks | Pointed in EXLST is reset. |
| Flow Chart | Described in TABLE XXIIk |

TABLE XXIIk
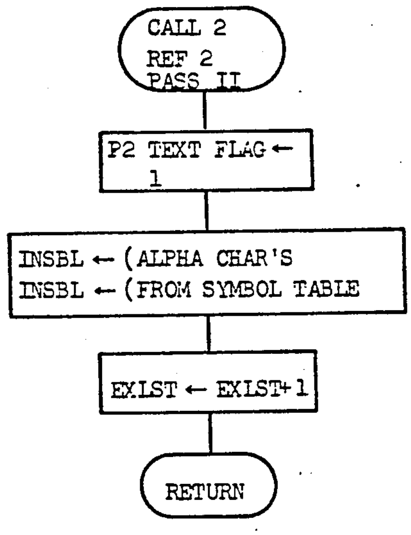

Parse Subroutines

| | |
|---|---|
| Type | Recursive Subroutines |
| Function | The parse subroutines generate a list of operands. The operands are found by scanning the operand field of a card image. Parentheses and commas are used to separate the operands, and a blank indicates the end of the field. Each parse subroutine expects a certain order and number of operands. The order and number of operands determine the syntax type (parse type) of the instruction on the card image. See User's Manual for description of each syntax tape. |
| Availability | Relocatable program area. |
| Use | There are presently nine parse subroutines<br>CALL P2SR1 - parse syntax type 1<br>CALL P2SR2 - parse syntax type 2<br>CALL P2SR3 - parse syntax type 3<br>CALL P2SR4 - parse syntax type 4<br>CALL P2SR5 - parse syntax type 5<br>CALL P2SR6 - parse syntax type 6<br>CALL P2SR7 - parse syntax type 7<br>CALL P2SR8 - parse syntax type 8<br>CALL P2SR9 - parse syntax type 9 |
| Subprograms Called | These subroutines are called by all the parse subroutines.<br>CALL PSHRA to save return address<br>CALL POPRA to return to calling program |

These subprograms are called by at least one of the parse subroutines

| | | |
|---|---|---|
| CALL | TOKEN | to find the next character on the card image. |
| CALL | GETNF | to find the next non-blank character on the card image. |
| CALL | EXPRN | to evaluate a variable expression on the card image. |
| CALL | INS2 | to insert an operand in the next available space in an operand list. |
| CALL | EFAIL | when expression error is detected. |
| CALL | SFAIL | when syntax error is detected |
| CALL | RFAIL | when relocation error is detected |
| CALL | VFAIL | ) when illegal variable is detected |
| CALL | LILR | ) to find and insert "r" in operand |
| or CALL | LILR2 | ) list |
| CALL | OPERA | ) to find and inert "address" and |
| or CALL | OPERA2 | ) "M" field in operand list. |
| CALL | INDX | ) to find and insert "index register" in operand list. |

CALL CSAV ) to find "mask, clear" or "mask
or CALL CSAV2) save" operands and appropriately
) modify "M field" and "T field"
) operands CALL INDR ) to find "indirect addressing"
or CALL INDR2) operand and appropriately
) modify "M field" operand.

CALL REG ) to find "register-to-register"
or CALL REG2 ) operands and appropriately
) modify "T field" and "address
) field" operands.

Remarks

The parse subroutines provide a flexible way to separate operands in an operand list, where a "free-form" type of operand description is used. Various types of operand lists may be separated and decoded by adding new parse subroutines or modifying one of these.

Limitiations

The card image to be scanned, the operand list to be generated and various flags and pointers are assumed to be in a "common" area described in ASSEMBLER DESCRIPTION.

Flow Chart

Described in TABLE XXIII

TABLE XXIII
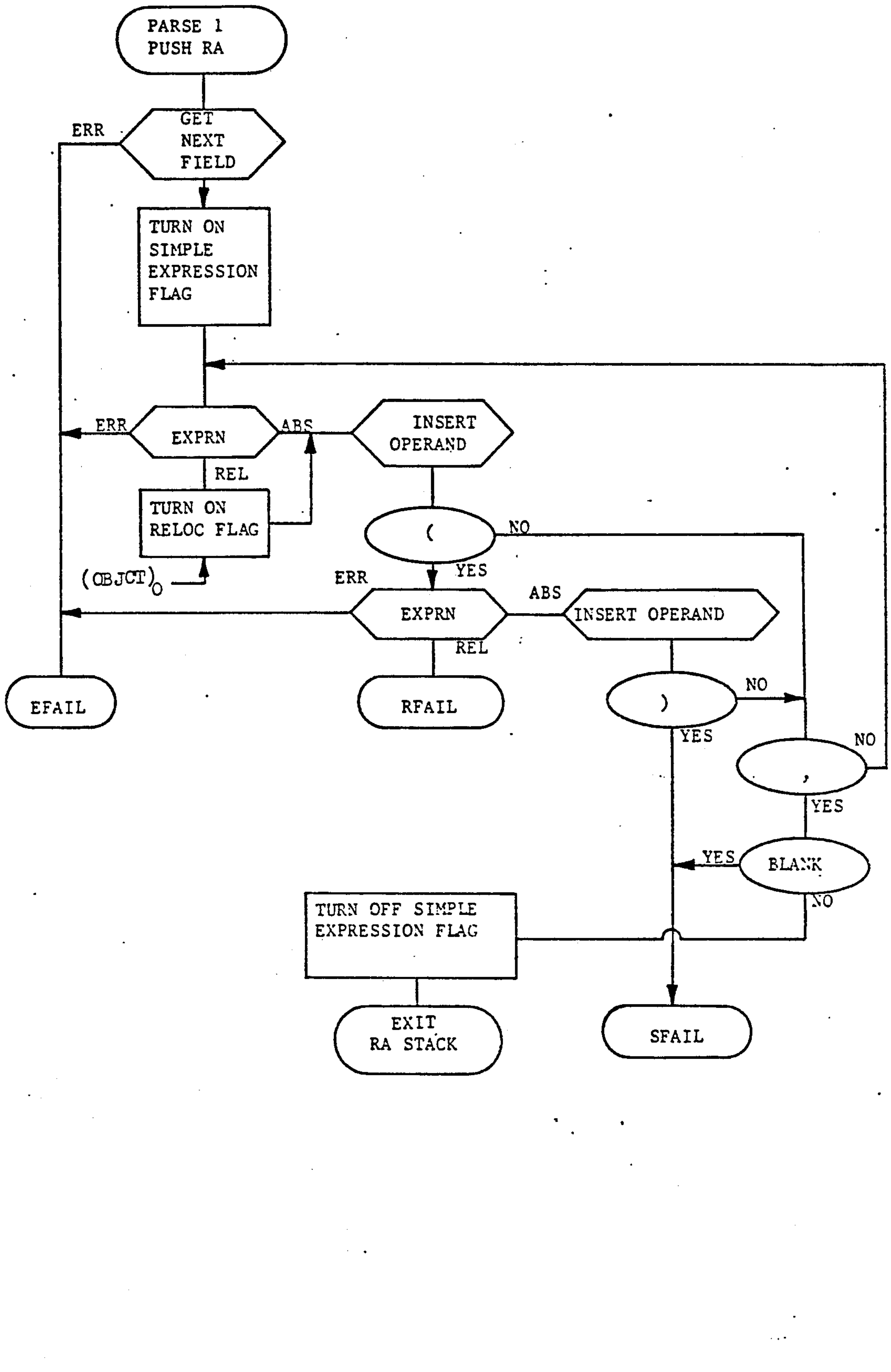

TABLE XXIII (cont'd)
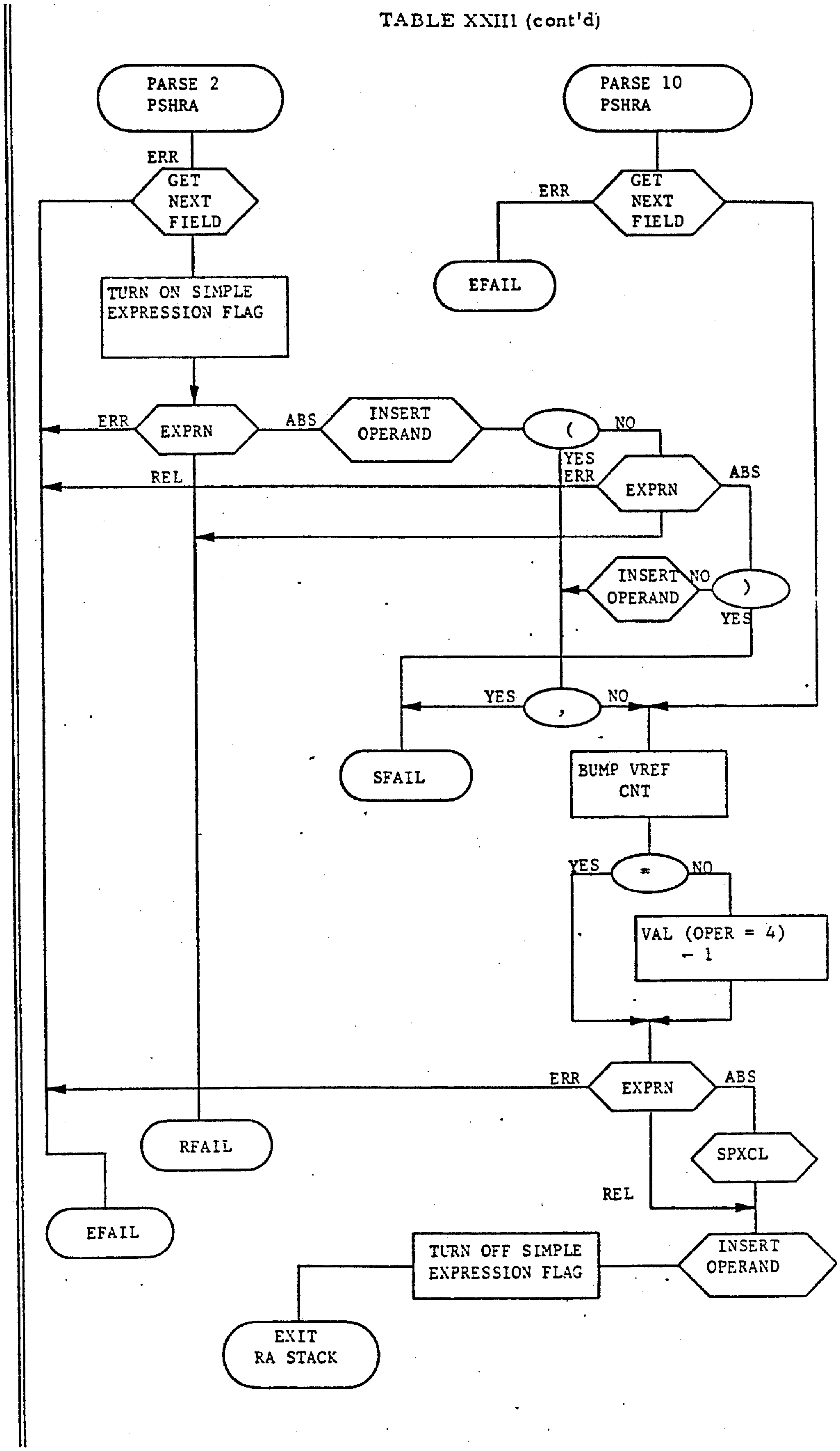

TABLE XXIII (cont'd)
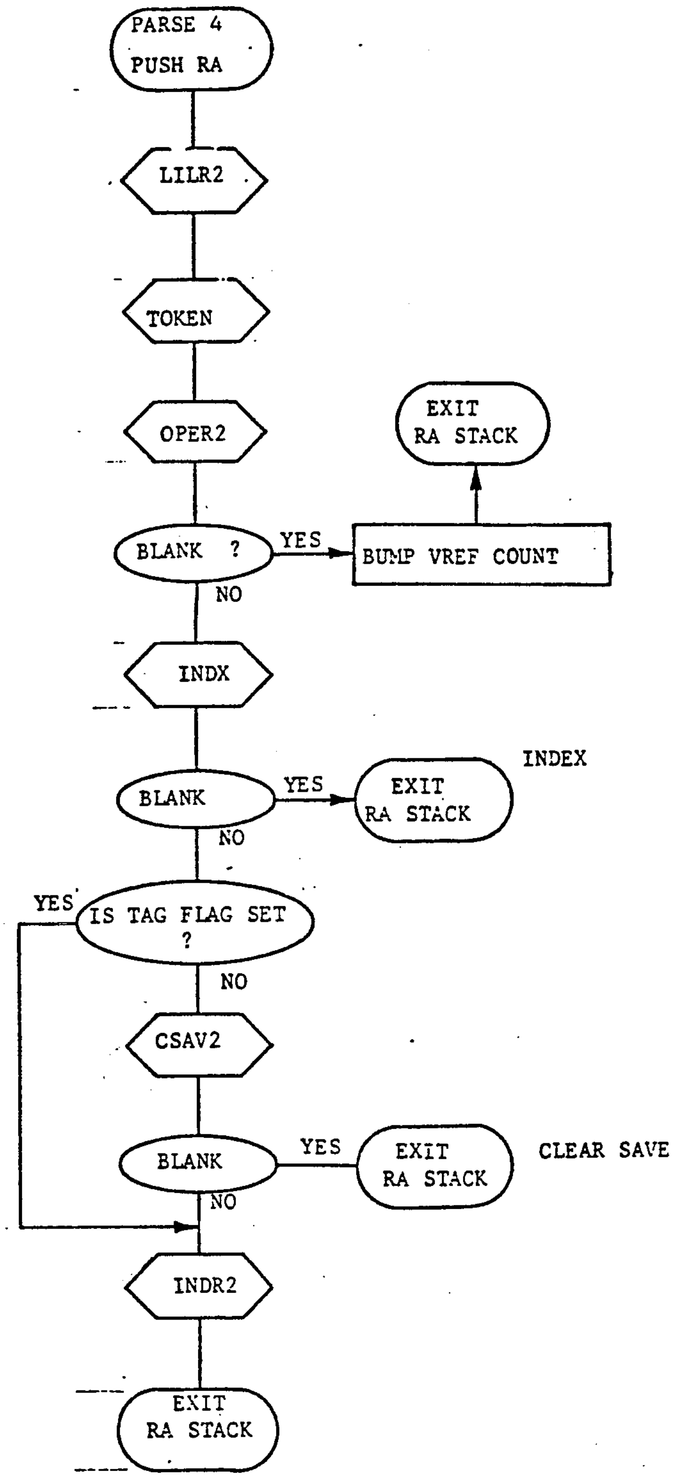

TABLE XXIII (cont'd)
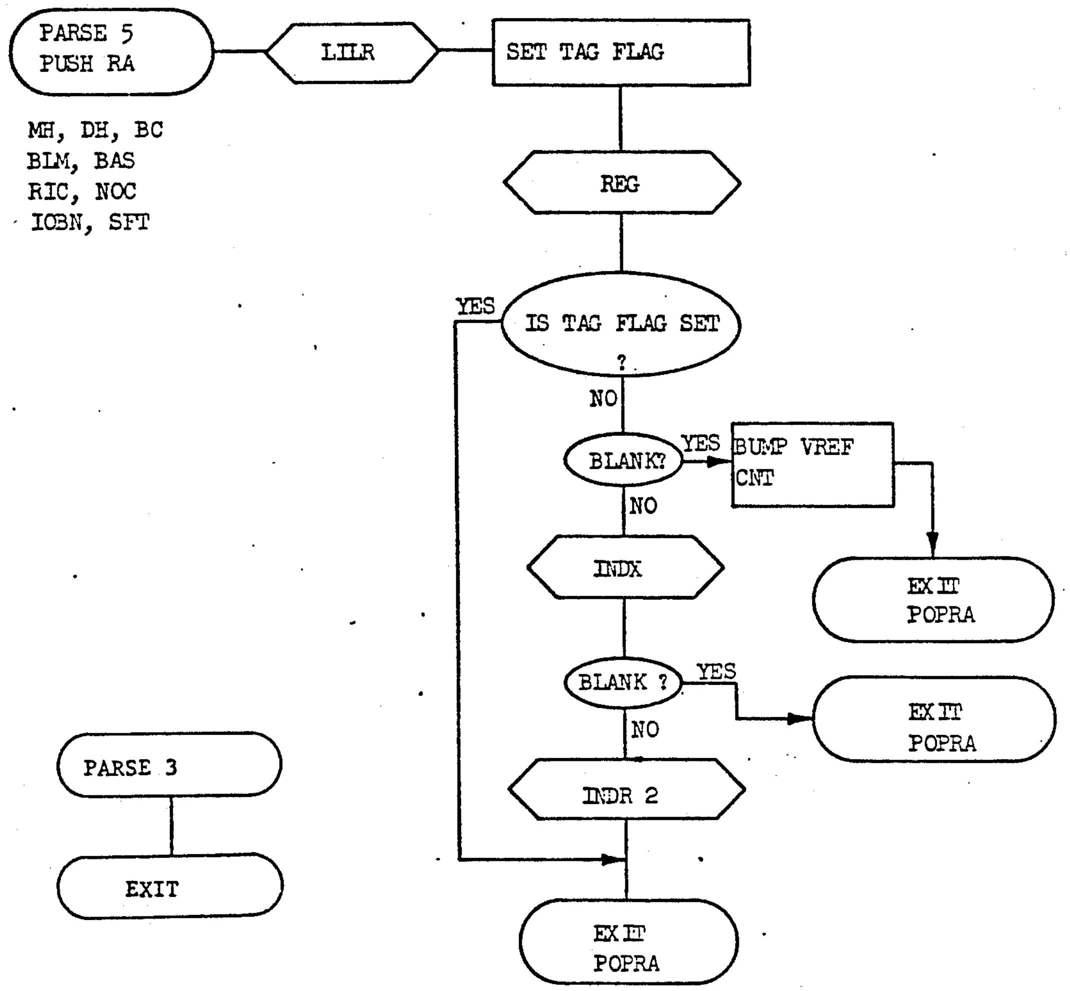

TABLE XXIII (cont'd)
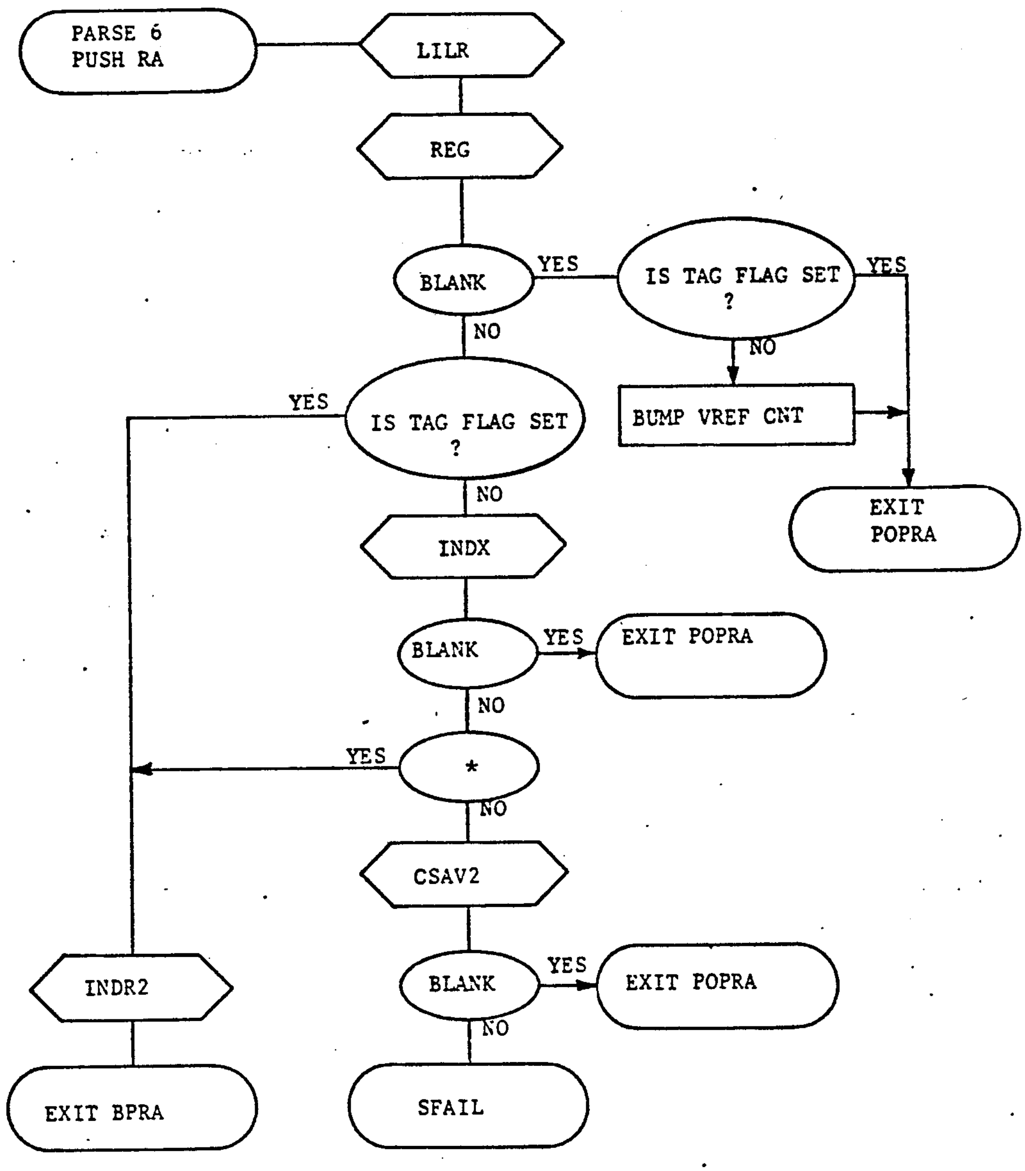

TABLE XXIII (cont'd)
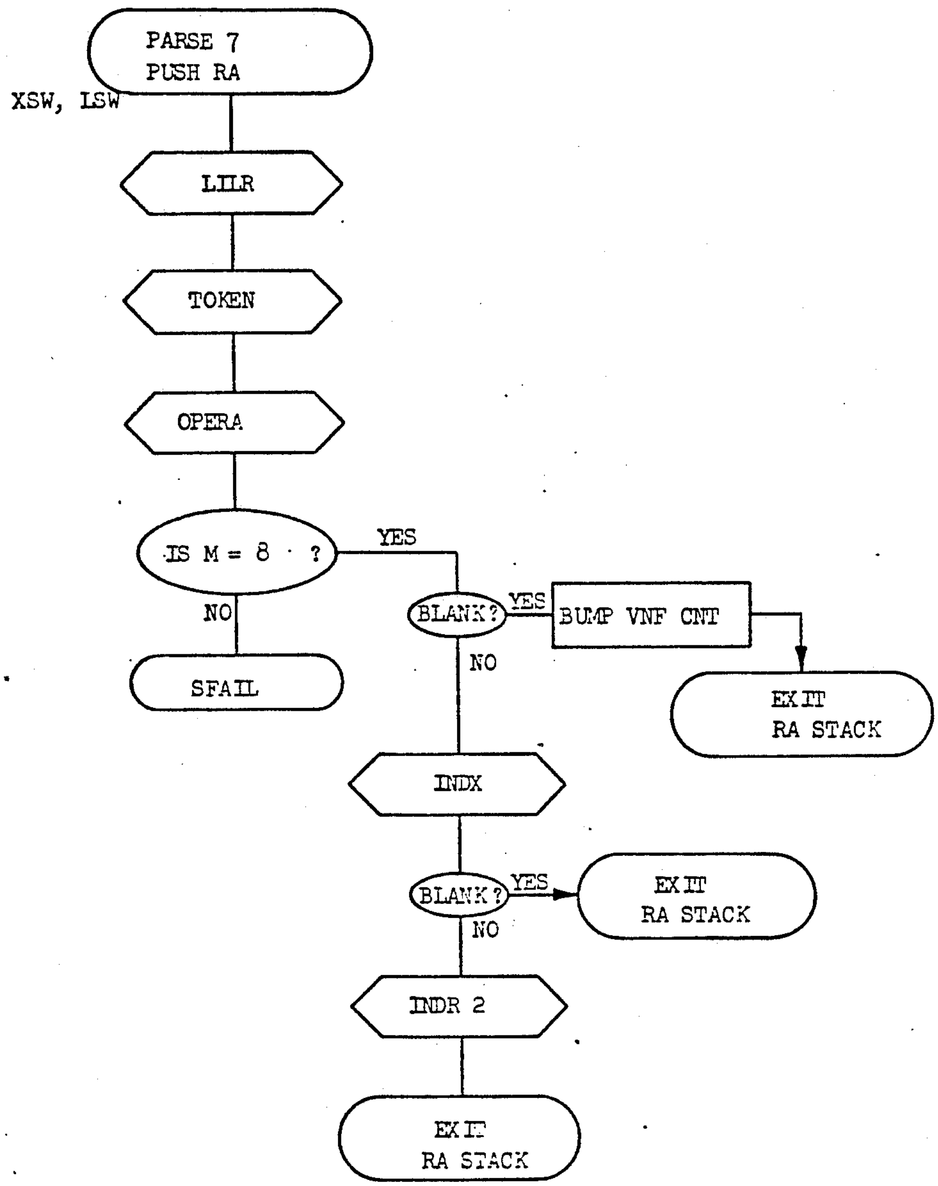

TABLE XXIII (cont'd)
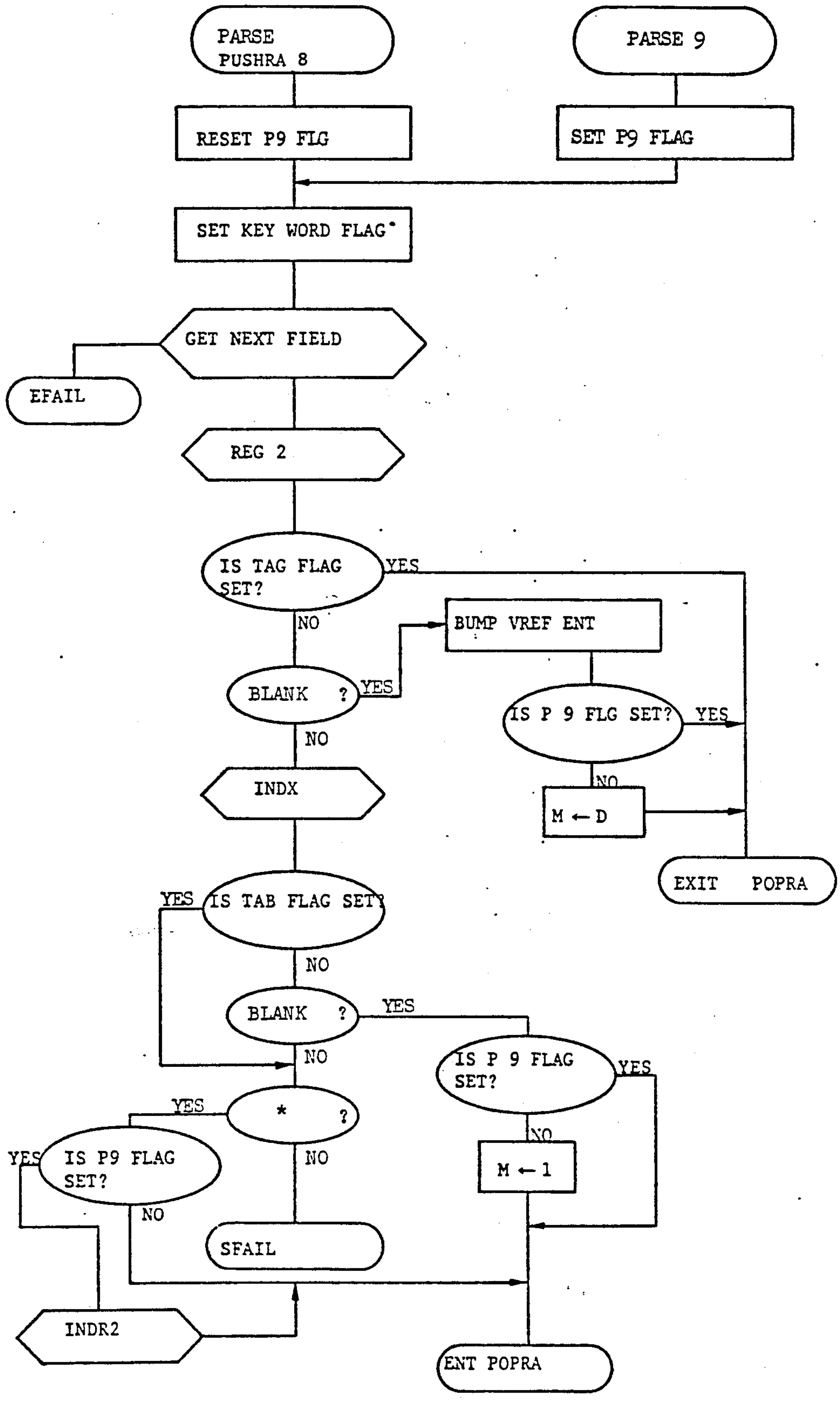

LILR, LILR2

| | |
|---|---|
| Type | Subroutine |
| Function | To get "little R" in processing regular op codes in Pass 2. |
| Availability | Relocatable area |
| Use | CALL LILR or CALL LILR2 |
| Subprograms Called | PSHRA, EXPRN, GETNF, TOKEN, POPRA |
| Remarks | This has two entry points LILR and LILR2. This exits through different routines depending on the conditions detected. If no errors -- exits through POPRA. If there is a relocation error or other errors in variable field, the exit is through RFAIL, EFAIL or SFAIL of P2STT. |
| Flow Chart | Described in TABLE XXIIm |

TABLE XXIIm
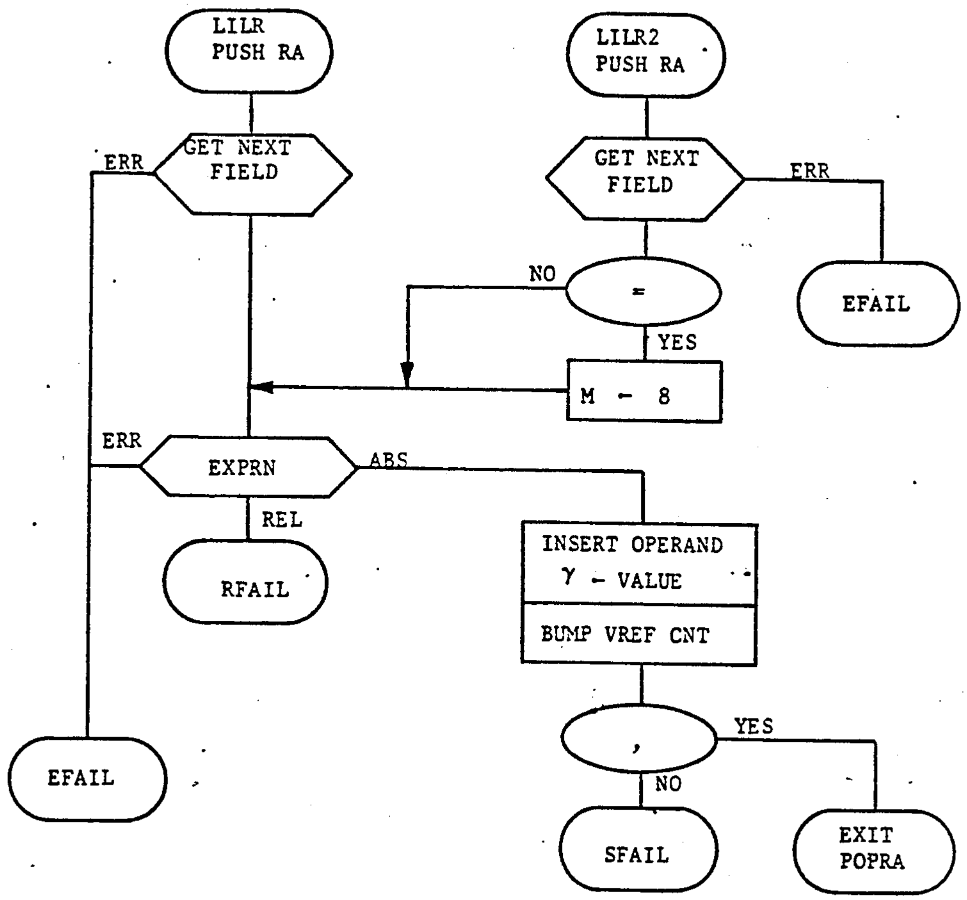

OPERA

| | |
|---|---|
| Type | Recursive Subroutine |
| Function | The subroutine scans the operand field of a card image to find and evaluate the address referenced by the instruction on the card image. If an address is found it is inserted in an operand list. The M-field operand is initialized to indicate "immediate" or "direct" addressing. |
| Availability | Relocatable program area. |
| Use | The subroutine is called by CALL OPERA.<br>Additional entry point: CALL OPER2<br>No arguments are required in the calling sequence. |
| Subprograms Called | CALL PSHRA to save return address.<br>CALL POPRA to return to calling program.<br>CALL EXPRN to evaluate the address.<br>CALL EFAIL when invalid expression is detected.<br>CALL SFAIL when syntax error is detected. |
| Remarks | The program has two entry points.<br>CALL OPERA<br>CALL OPER2 |
| Limitations | Arguments are assumed to be in a "common" area described in ASSEMBLER DESCRIPTION. |
| Flow Chart | Described in TABLE XXIIn |

TABLE XXIIn
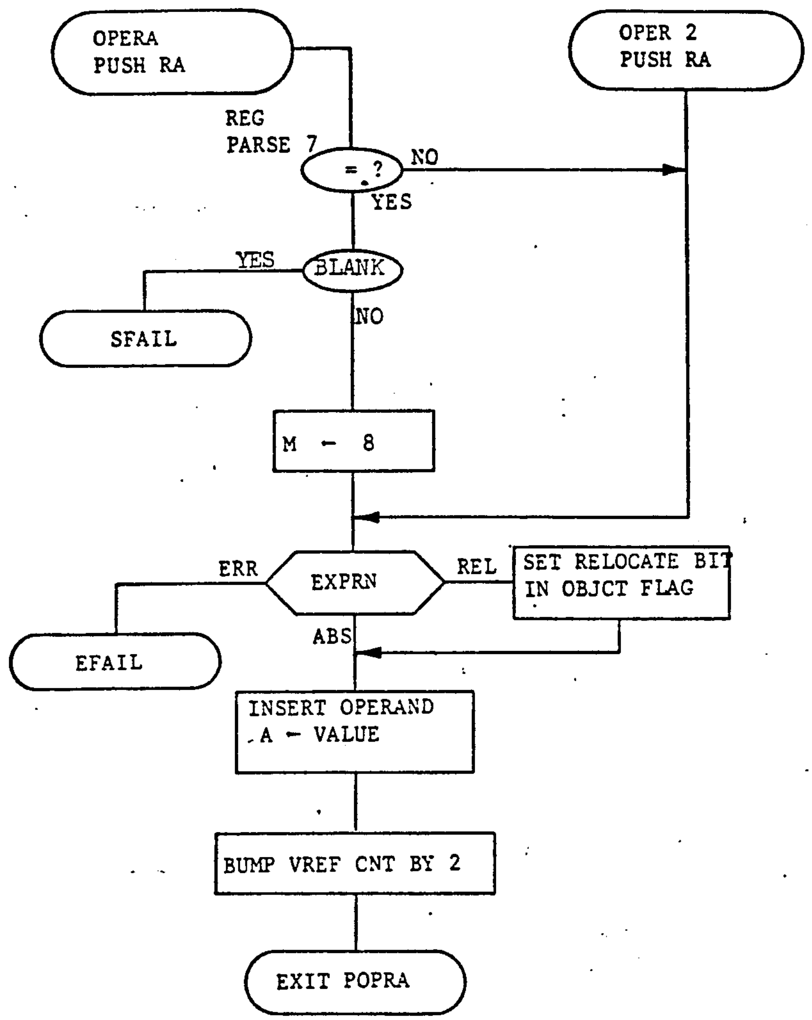

INDX, IN, IN3

| | |
|---|---|
| Type | Subroutine |
| Function | To handle indexing in Pass 2 |
| Availability | Relocatable area. |
| Use | CALL INDX or CALL IN or CALL IN3 |
| Subprograms Called | PSHRA, TOKEN, POPRA and EFAIL, RFAIL, SFAIL, VFAIL in P2STT. |
| Remarks | This has three different entry points. Each checks for different values of TOK like ',', 'C', and 'X'. The normal exit is through RA stack (POPRA) and the four different error exits are into P2STT. |
| Flow Chart | Described in TABLE XXIIo |

TABLE XXIIo
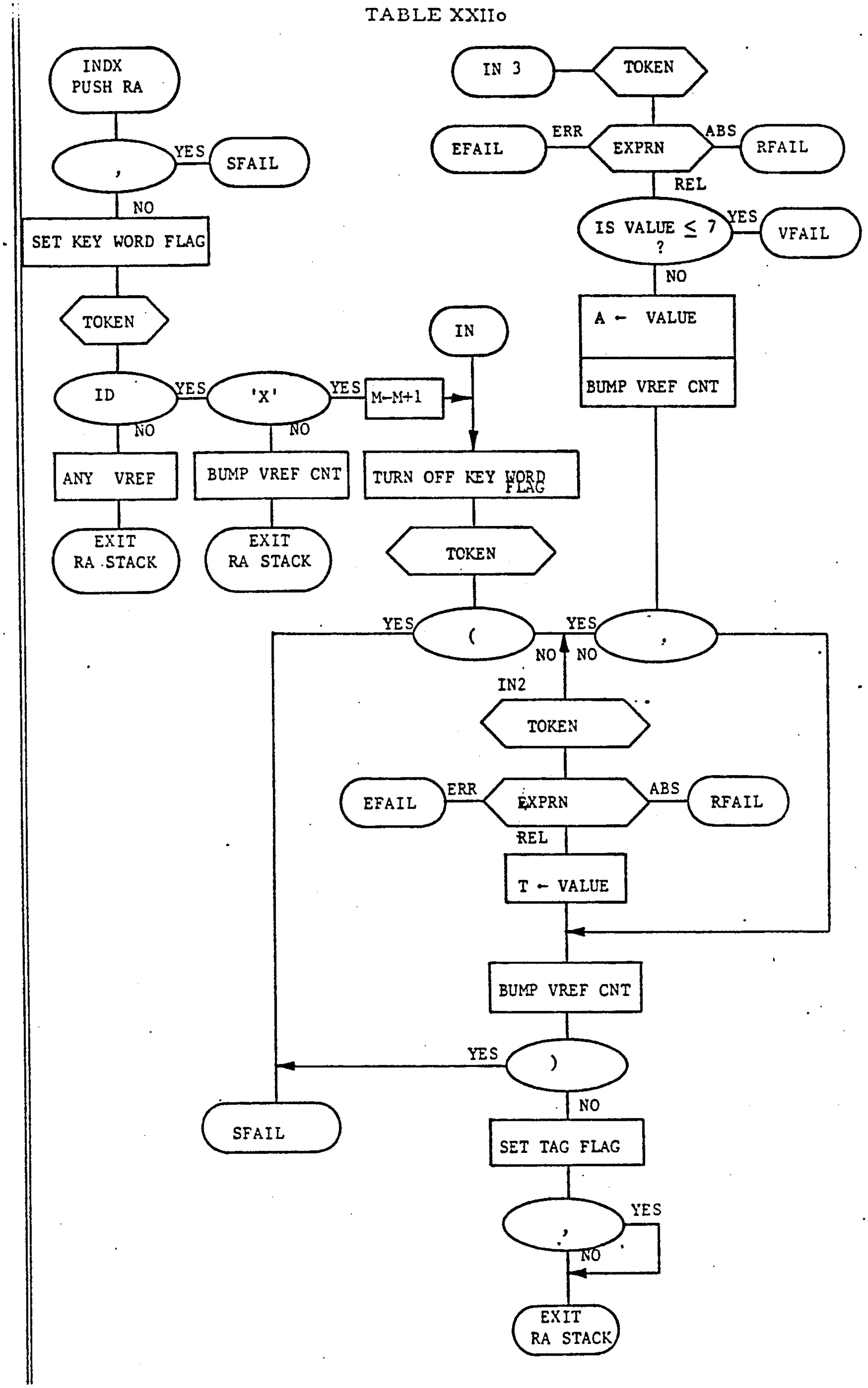

REG

| | |
|---|---|
| Type | Recursive Subroutine |
| Function | The subroutine scans the operand field of a card image to determine if register-to-register, register mask and clear, or register mask and save options are specified. If so, the M-field operand is modified accordingly and the specified register is inserted in the operand list. The keywords which specify these options are R, RC, and RS, respectively. |
| Availability | Relocatable program area. |
| Use | The subroutine is called by CALL REG.<br>Additional entry point: CALL REG2.<br>No arguments are required in the calling sequence. |
| Subprograms Called | CALL PSHRA to save return address<br>CALL POPRA to return to calling program<br>CALL TOKEN to find keywords R, RC or RS<br>CALL IN3 to find specified register and insert it in operand list.<br>CALL OPERA if no register option specified. |
| Remarks | The program has two entry points:<br>CALL REG<br>CALL REG2 |
| Limitations | Arguments used are assumed to be in a "common" area described in ASSEMBLER DESCRIPTION. |
| Flow Chart | Described in TABLE XXIIp |

TABLE XXIIp
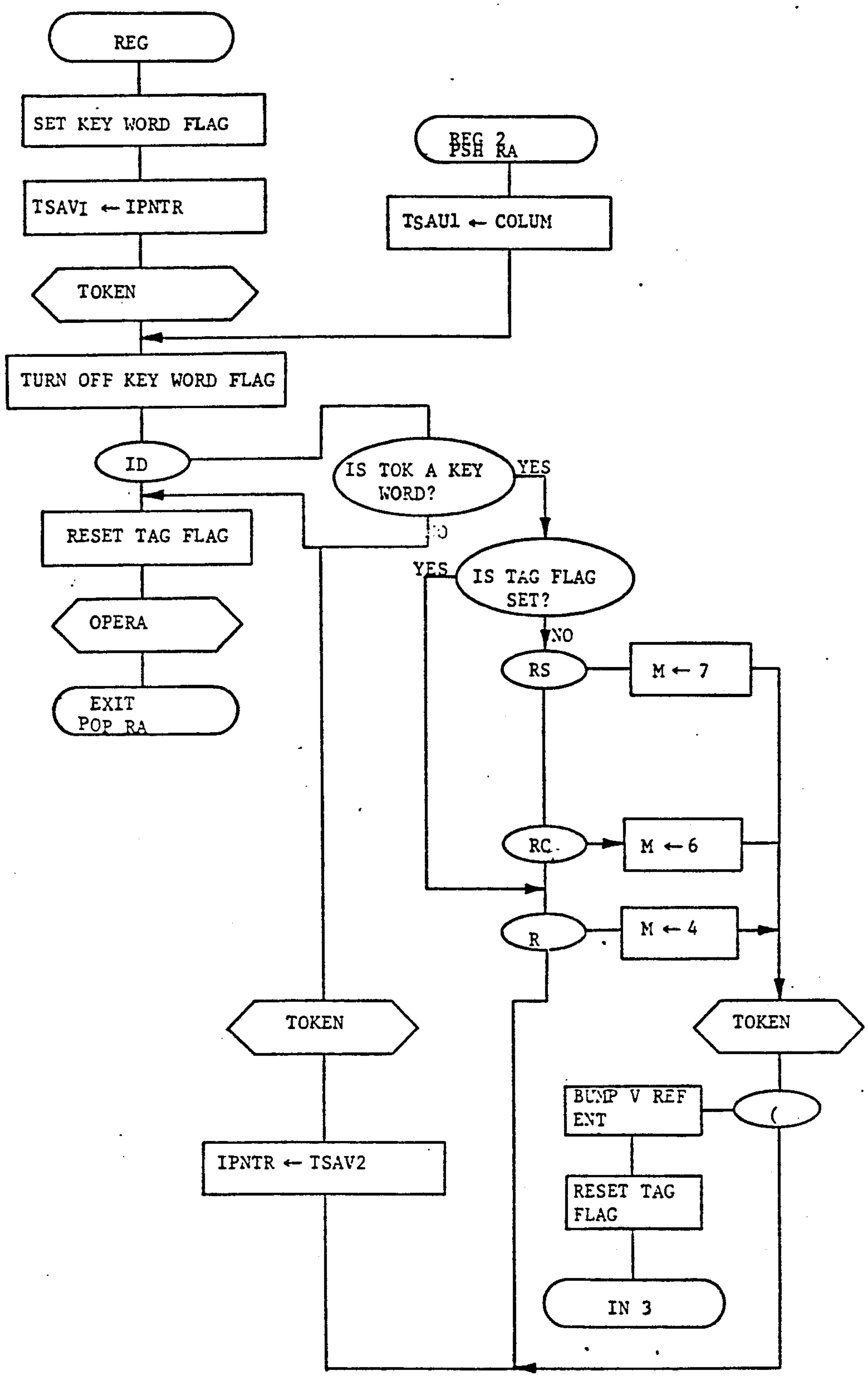

CSAV2

| | |
|---|---|
| Type | Subroutine |
| Function | To handle 'C' and 'S' in variable field. |
| Availability | Relocatable area. |
| Use | CALL CSAV2 |
| Subprograms Called | PSHRA, IN, SFAIL, POPRA. |
| Remarks | This handles 'C' and 'S' in variable field by testing identifiers, 'C' and 'S'. There are 3 different exits.<br>If Identifier (TOK - 17) and 'C' or 'S' -- IN<br>If Identifier (TOK = 17) but not 'C' or 'S' -- SFAIL<br>If not an identifier -- POPRA |
| Flow Chart | Described in TABLE XXIIq |

INDR2

| | |
|---|---|
| Type | Subroutine |
| Function | To handle indirect addressing by testing for Asterisk and Blank. |
| Availability | Relocatable area. |
| Use | CALL INDR2 |
| Subprograms Called | PSHRA, TOKEN, POPRA, SFAIL. |
| Remarks | This takes two exits depending on TOK and '*' or ',' in operand field.<br>If TOK = 6 and OPRND + 2 = 8 or 9 and TOK = 1 after calling TOKEN it exits to POPRA else to SFAIL. |
| Flow Chart | Described in TABLE XXIIr |

TABLE XXIIq
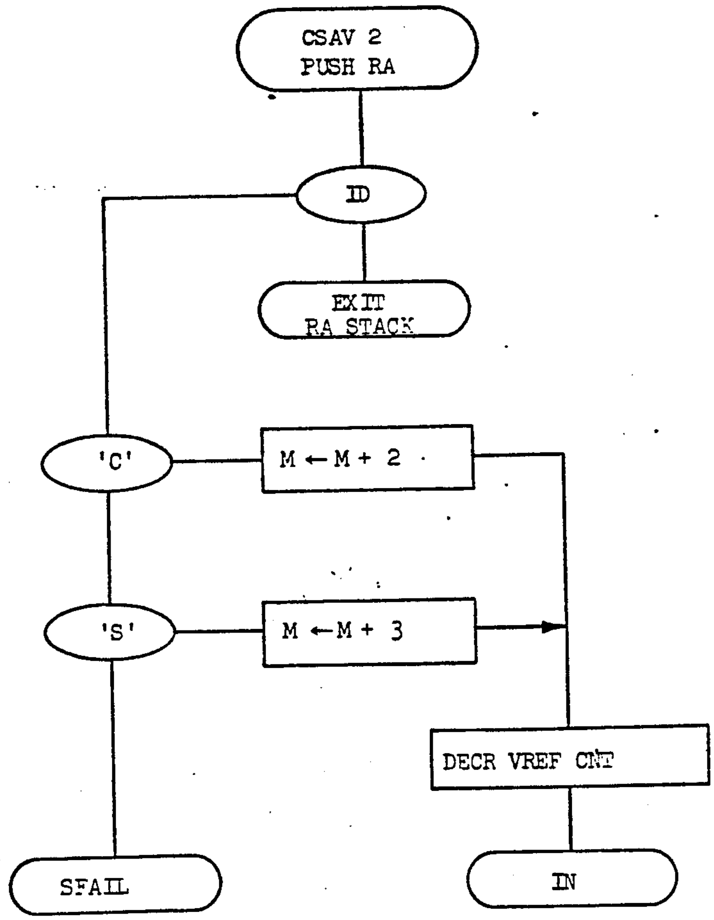

TABLE XXIIr
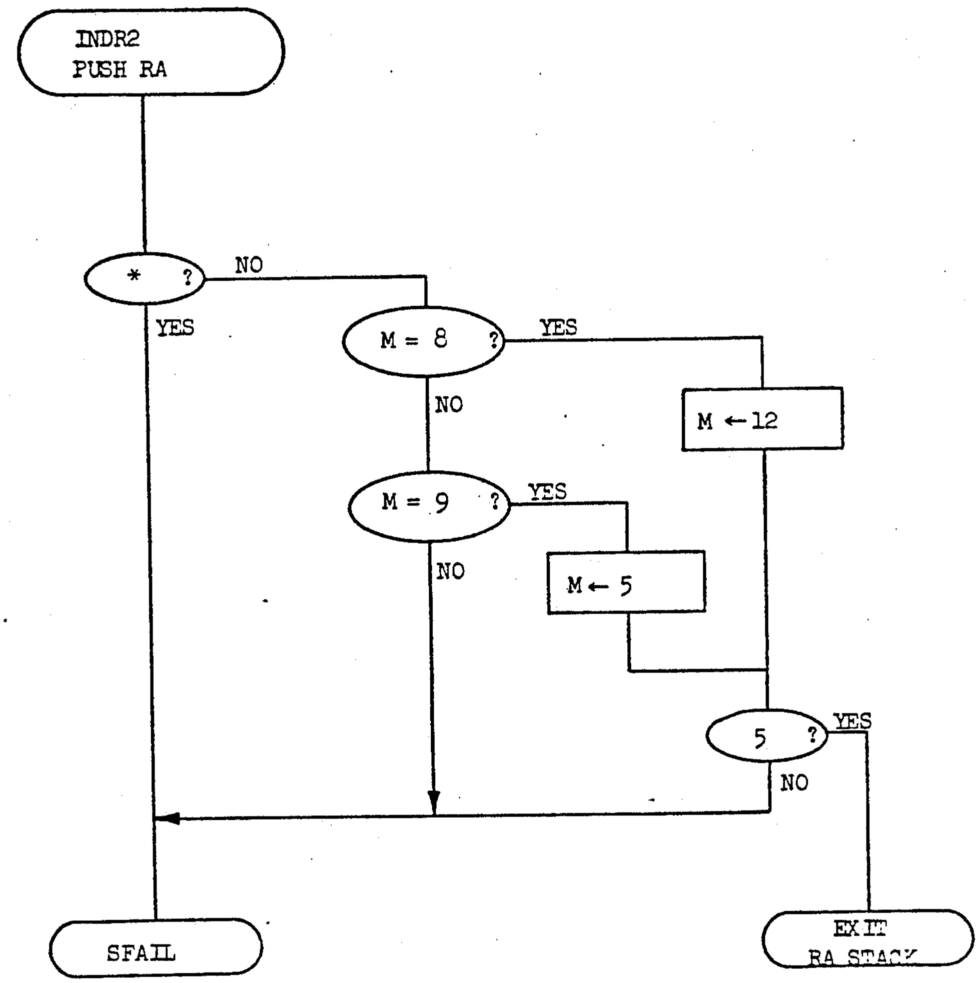

WOBJC

| | |
|---|---|
| Type | Subroutine |
| Function | Writes object code into buffer. |
| Availability | Relocatable area. |
| Use | Call WOBJC |
| Subprograms Called | TLOCA, SRABS, SRREL, SRCAL, INSCD |
| Remarks | This program inserts code, or external name or entry name for one instruction, also calling appropriate routines to set relocation bits. This takes care of blocking the object module and increments the pointers also. This is called for processing ENTRY, CALL, DC or regular op code. |
| Limitations | None except system symbols. |
| Flow Chart | Described in TABLE XXIIs |

SRABS

| | |
|---|---|
| Type | Nonrecursive Subroutine |
| Function | Sets relocation bits in relocation word to absolute during assembly. |
| Availability | Relocatable area. |
| Subprograms Called | CALL SRABS |
| Remarks | This sets the relocation bits in the relocation word of the object code buffer BFW8 to absolute. One call sets the bits for one word of code. If the buffer is full, it is copied to ODISK and the relocation word and pointer to data word are reset. This is not used during absolute assembly. |
| Flow Chart | Described in TABLE XXIIt |

TABLE XXIIs
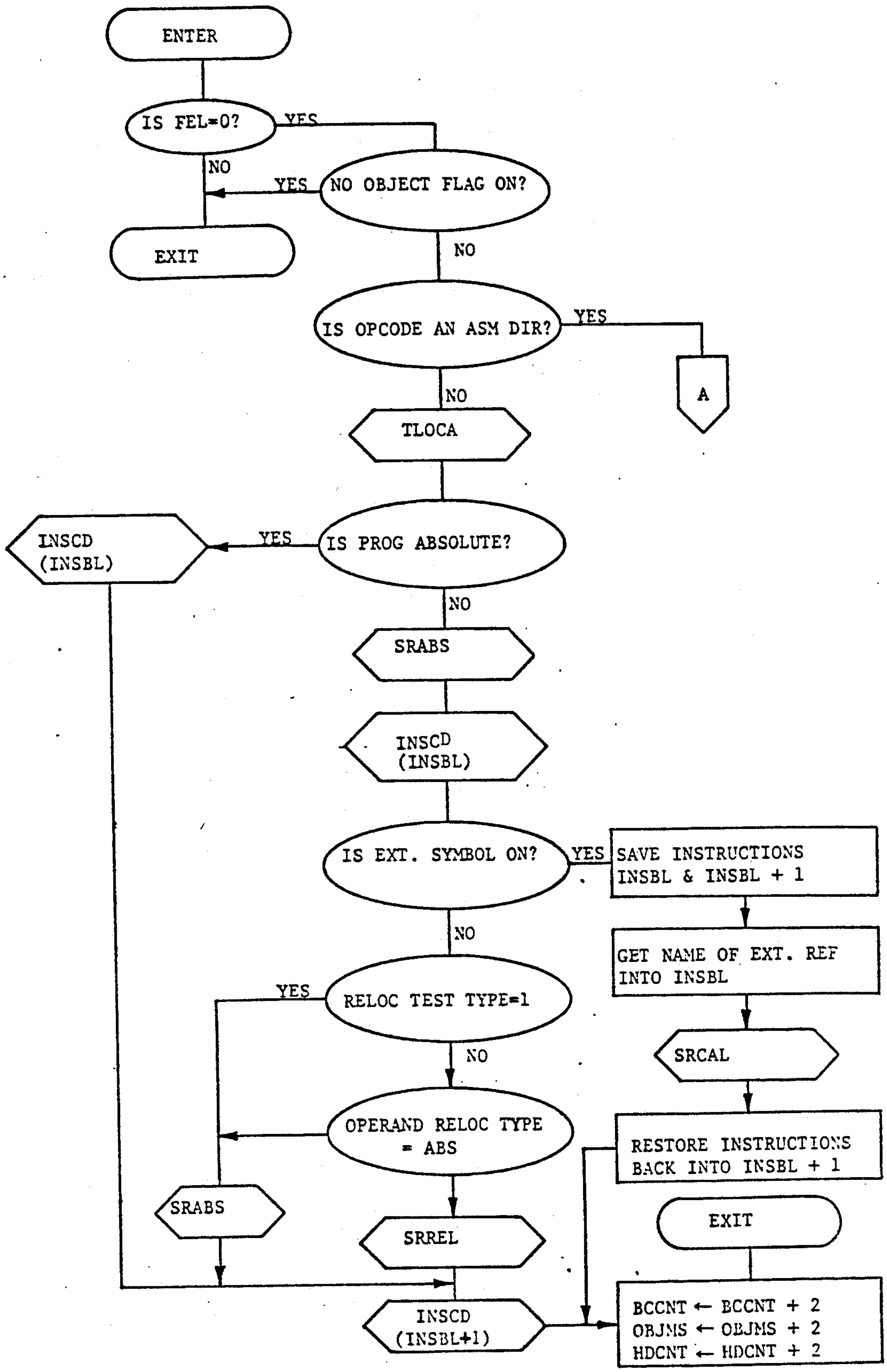

TABLE XXIIs (cont'd)
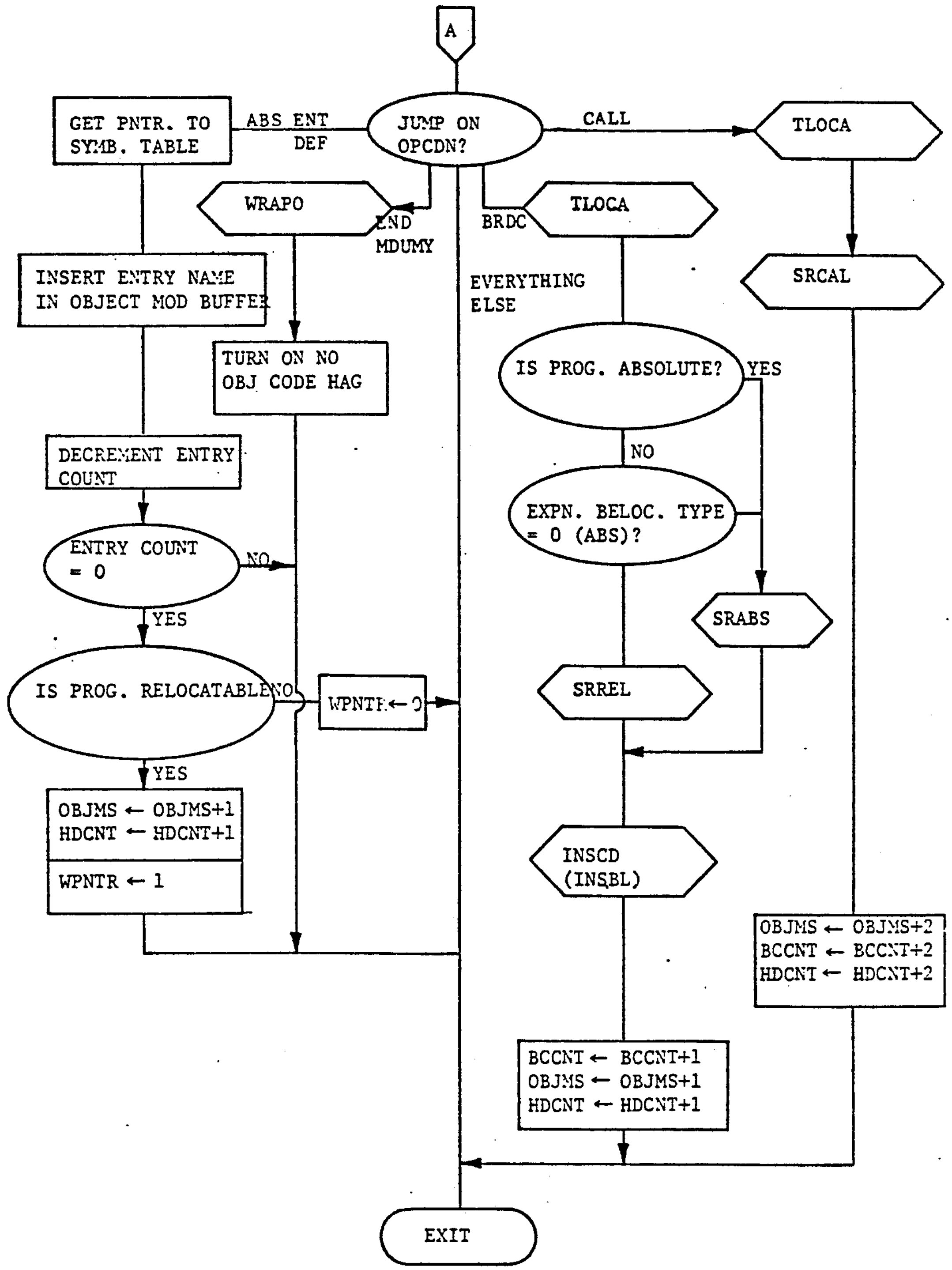

TABLE XXIIt
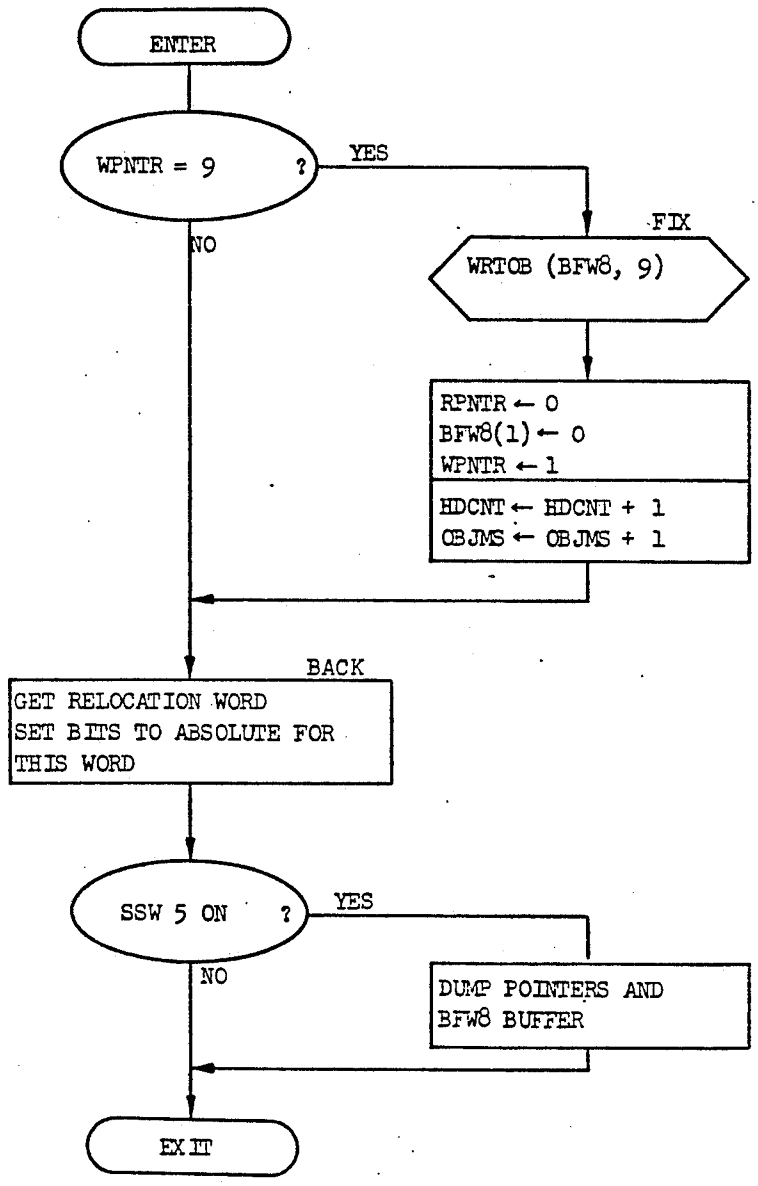

SRREL

Type — Nonrecursive Subroutine

Function — Sets relocation bits in relocation word to relocatable during assembly.

Availability — Relocatable area.

Subprograms Called — WRTOB

Use — CALL SRREL

Remarks — This sets the relocation bits in the relocation word of the object code buffer BFW8 to relocatable. One call sets the bits for one word of code. If the buffer is full, it is transferred to ODISK and the relocation word and pointer to data word are reset. This is not used during absolute assembly.

Flow Chart — Described in TABLE XXIIu

SRCAL

Type — Nonrecursive Subroutine

Function — Set relocation bits in relocation word to call and insert # of external name Availability — Relocatable area.

Use — Call SRCAL

Subprograms Called — WRTOB

Remarks — This program scans the names of external references in the header and gets the number of the currently referenced external name and inserts that in the object code buffer in addition to setting relocation bits. The buffer is checked for the availability of space and emptied if full by calling WRTOB. The external name is referenced by INSBL. Object code buffer can be dumped with SSW 5 on.

Flow Chart — Described in TABLE XXIIv

TABLE XXIIu
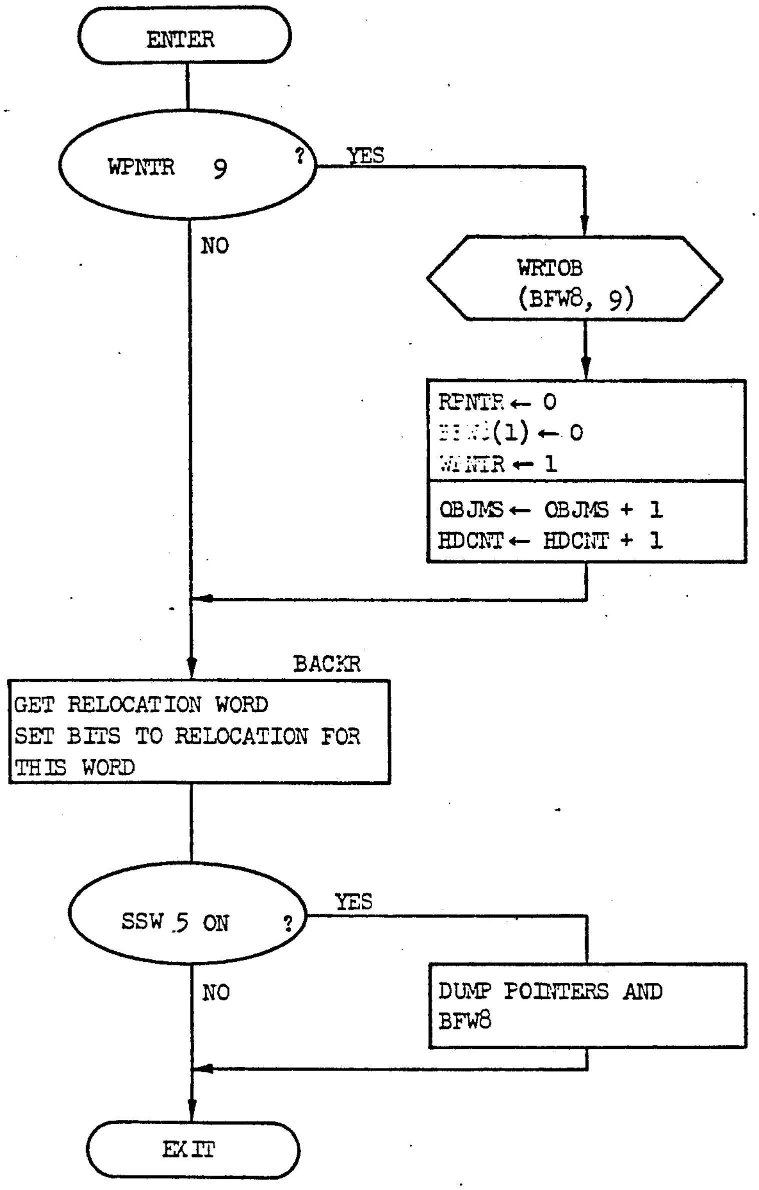

TABLE XXIIv
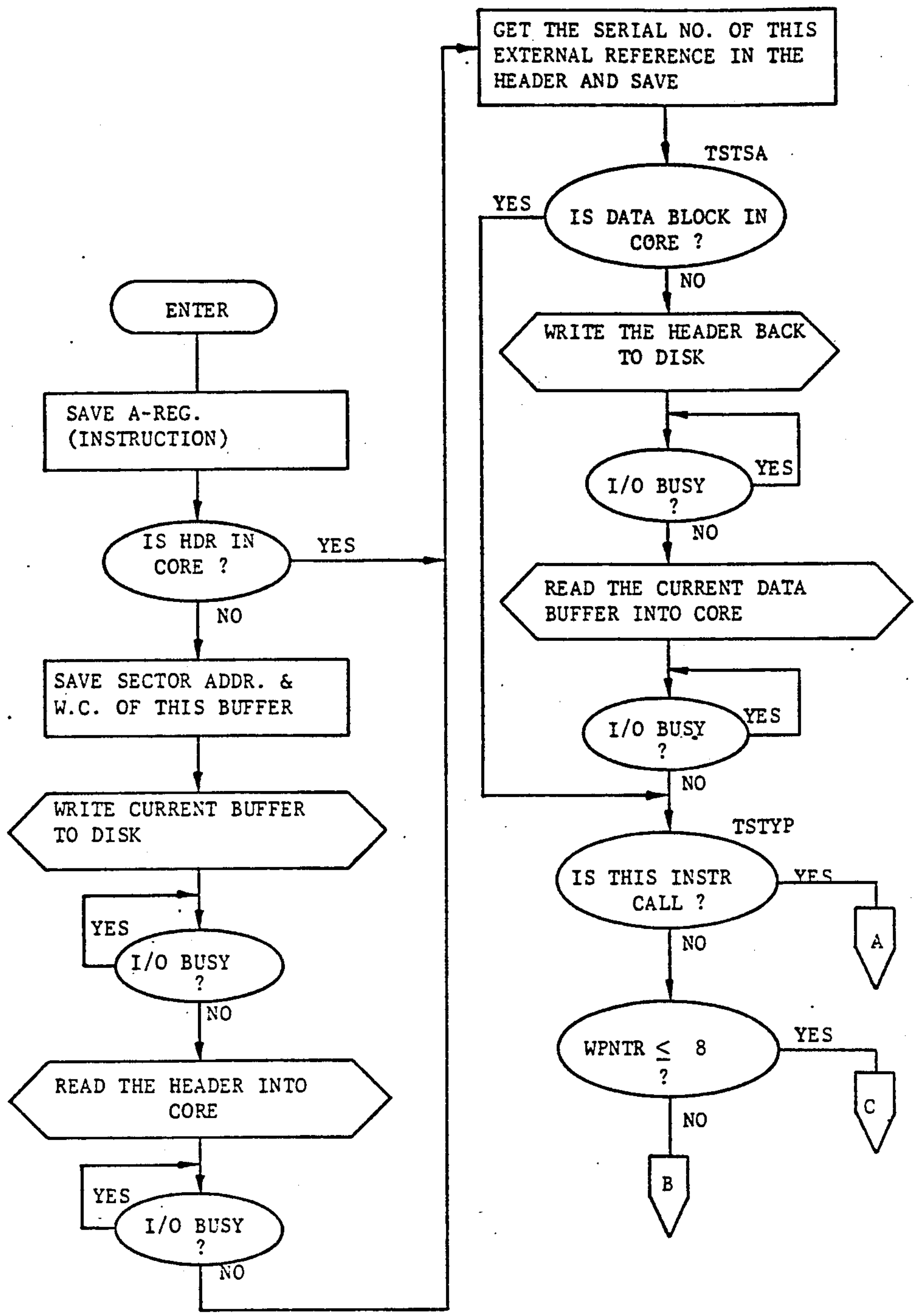

TABLE XXIIv (cont'd)
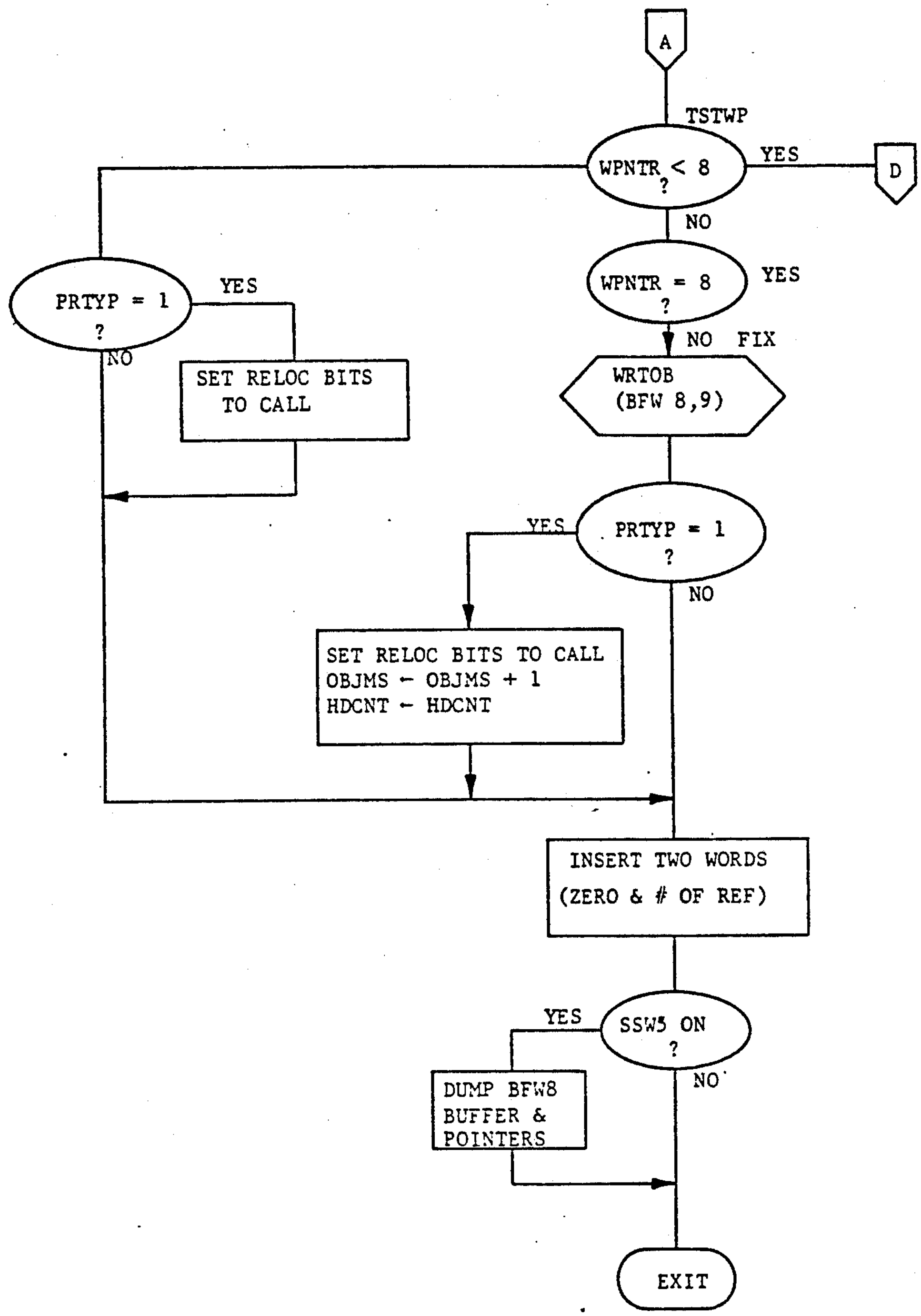

TABLE XXIIv (cont'd)
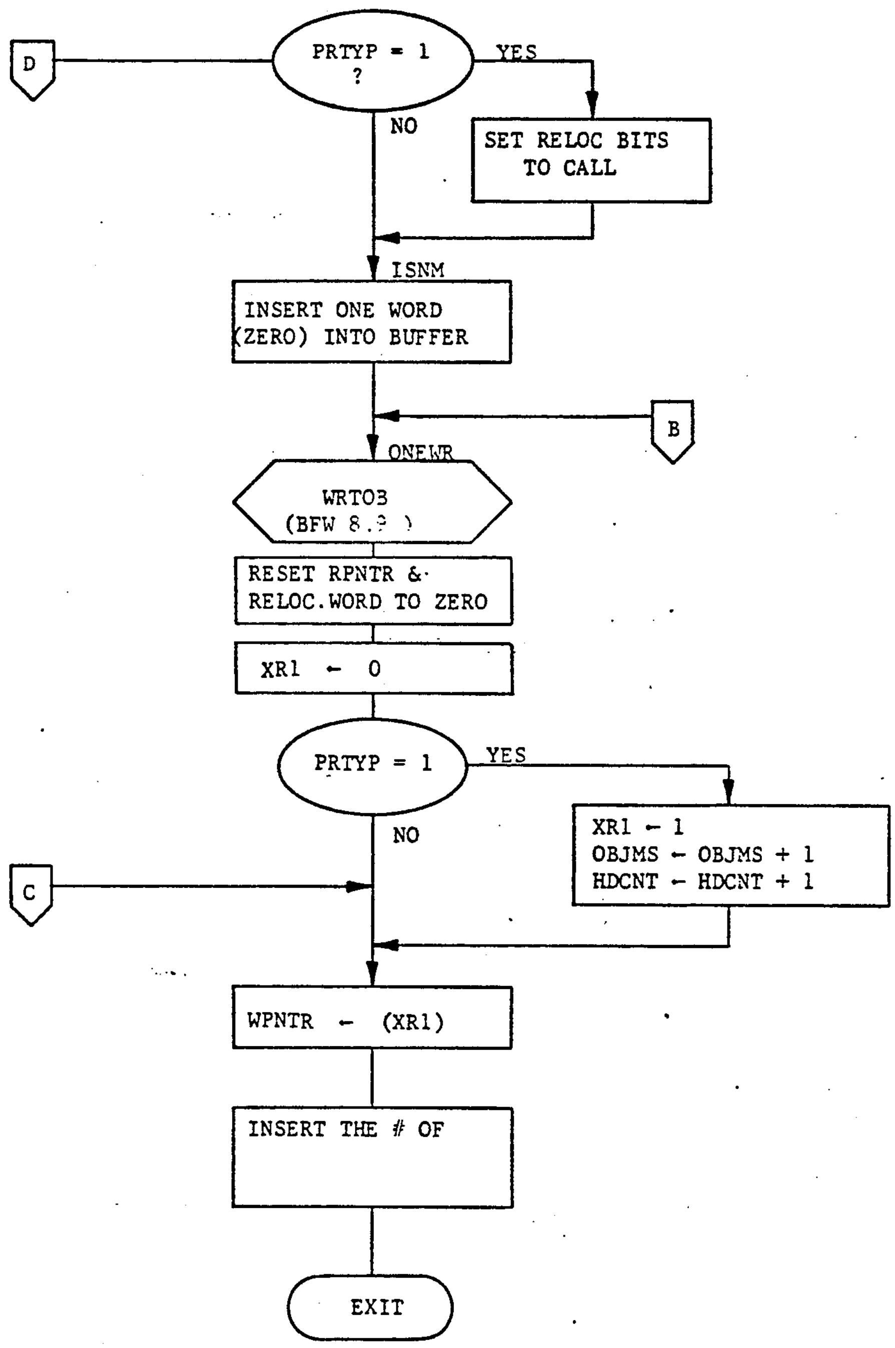

TLOCA

| | |
|---|---|
| Type | Subroutine |
| Function | To test location assignment and start a new block for object code if necessary |
| Availability | Relocatable area. |
| Use | CALL TLOCA |
| Subprograms Called | None |
| Remarks | If the binary core counter and location assigned are not the same, the block in the object module is wrapped up and a new block is started, inserting proper counts. The buffer is written to disk if necessary. Buffers and counters can be dumped with SSW 2 on. |
| Flow Chart | Described in TABLE XXIIw |

INSCD

| | |
|---|---|
| Type | Nonrecursive Subroutine |
| Function | Builds object code in an intermediate buffer prior to being transferred to the main object module buffer. |
| Availability | Relocatable area. |
| Use | ACC has object code (1 word) CALL INSCD |
| Subprograms Called | WRTOB |
| Remarks | The routine is called by 'Write Object Code' and transfers one 16 bit word of object code per call. The intermediate buffer is used because a relocation word must be added for each eight object code words in relocatable assemblies. No registers are saved. |
| Flow Chart | Described in TABLE XXIIx |

TABLE XXIIw
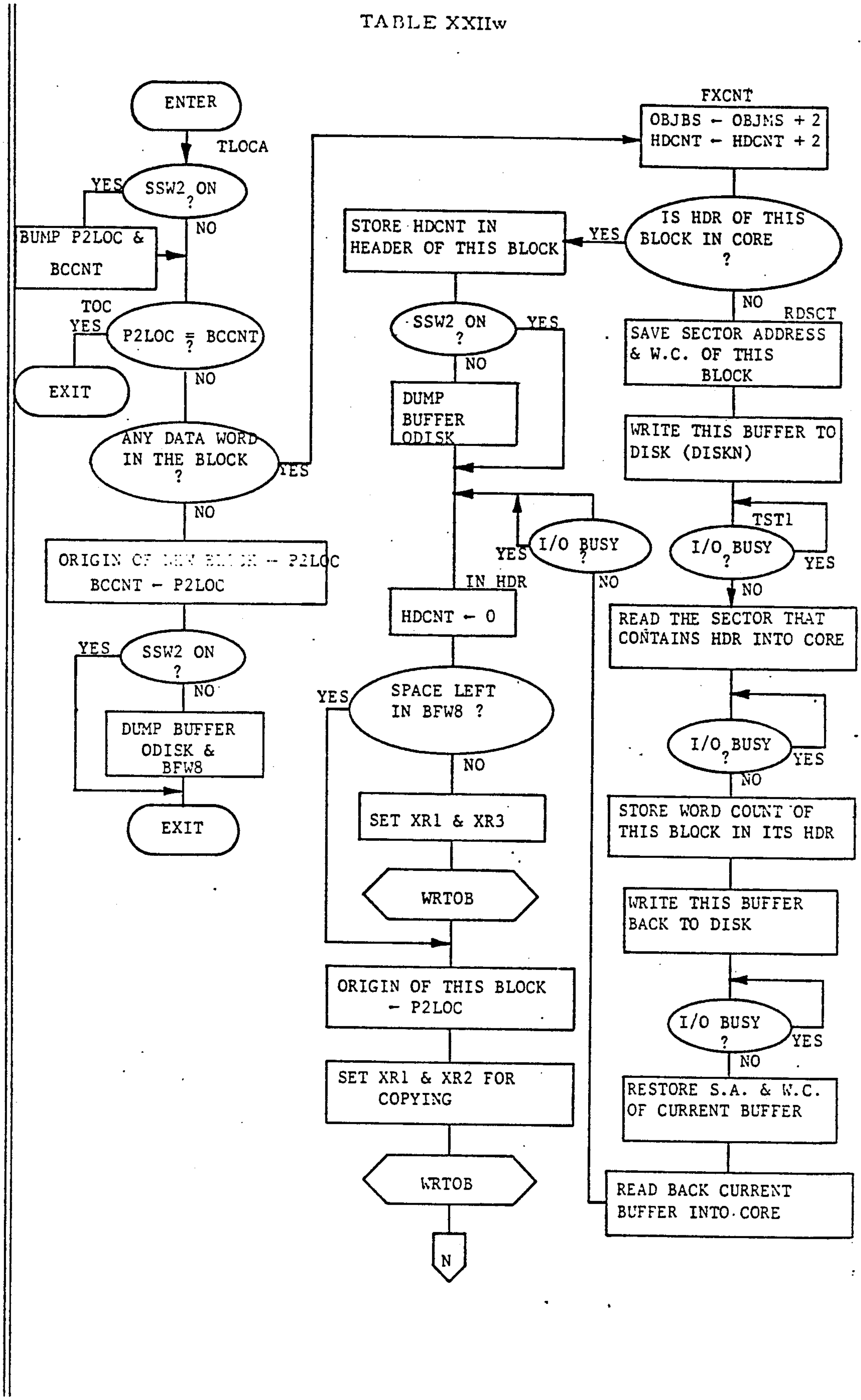

TABLE XXIIw (cont'd)
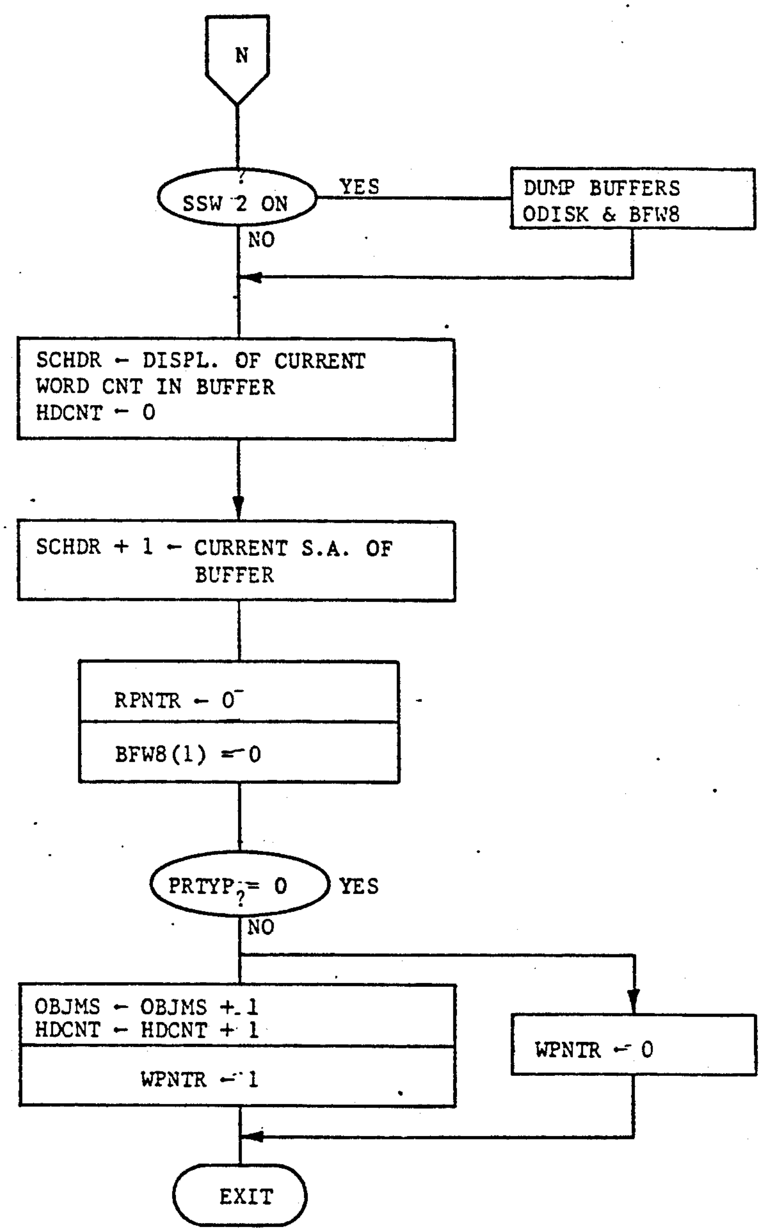

TABLE XXIIx
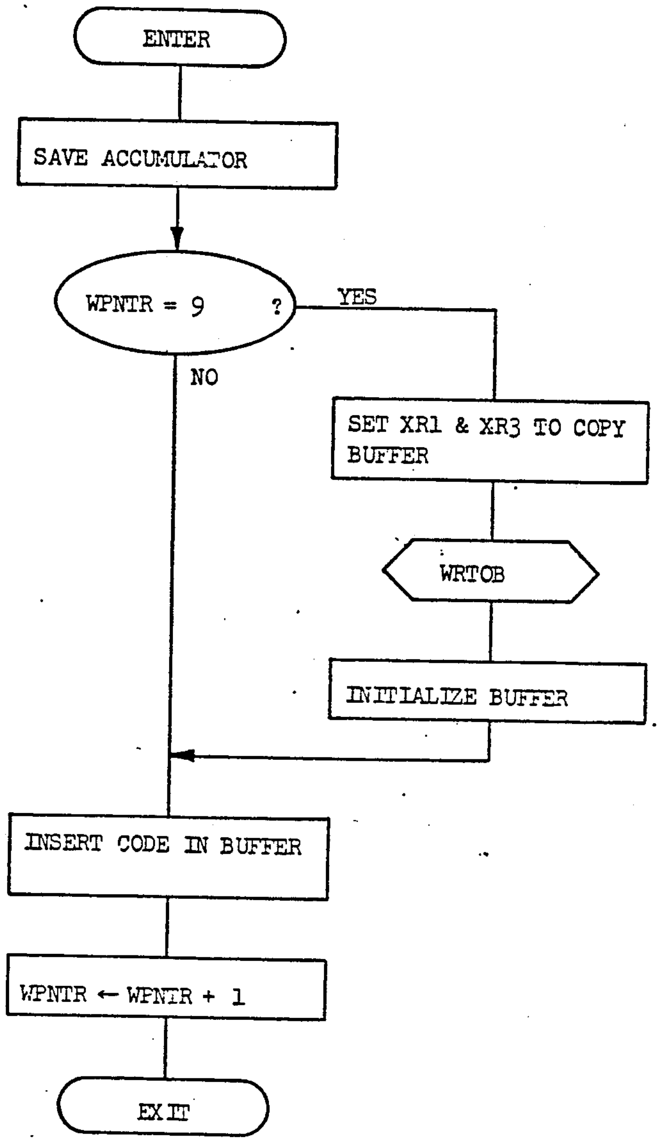

WRAPO

| | |
|---|---|
| Type | Subroutine |
| Function | To wrap up object module |
| Availability | Relocatable area. |
| Use | CALL WRAPO |
| Subprograms Called | INSCD |
| Remarks | This wraps up the object module by inserting the origin and zero for word count of next block and the word count for current block and also the total size of module in the header. First and last sectors of object module can be dumped with SSW 3 on. |
| Flow Chart | Described in TABLE XXIIy |

6. Execution of Epilog

Epilog is a collection of programs which perform the following functions:

a) if save symbol table requested, reset the boundary of the symbol table and save the whole symbol table on disk.

b) if printing of symbol table or cross reference table is requested, merge the symbol table into an alphabetical chain, purging keyword and directive symbols, and print either or both as requested.

c) Print the number of errors detected during assembly.

d) Test an indicative flag to cause suppression of output if any fatal errors occurred (fatal errors are errors which might cause the computer to lose program sequence control, thereby endangering real-time process control). If no fatal errors occurred, store the object module generated by the assembly.

e) If disk input was specified, return program control to the control record analyzer for possible further assemblies.

f) If card input was specified, return control to the operating system (non-process monitor).

TABLE XXIIy
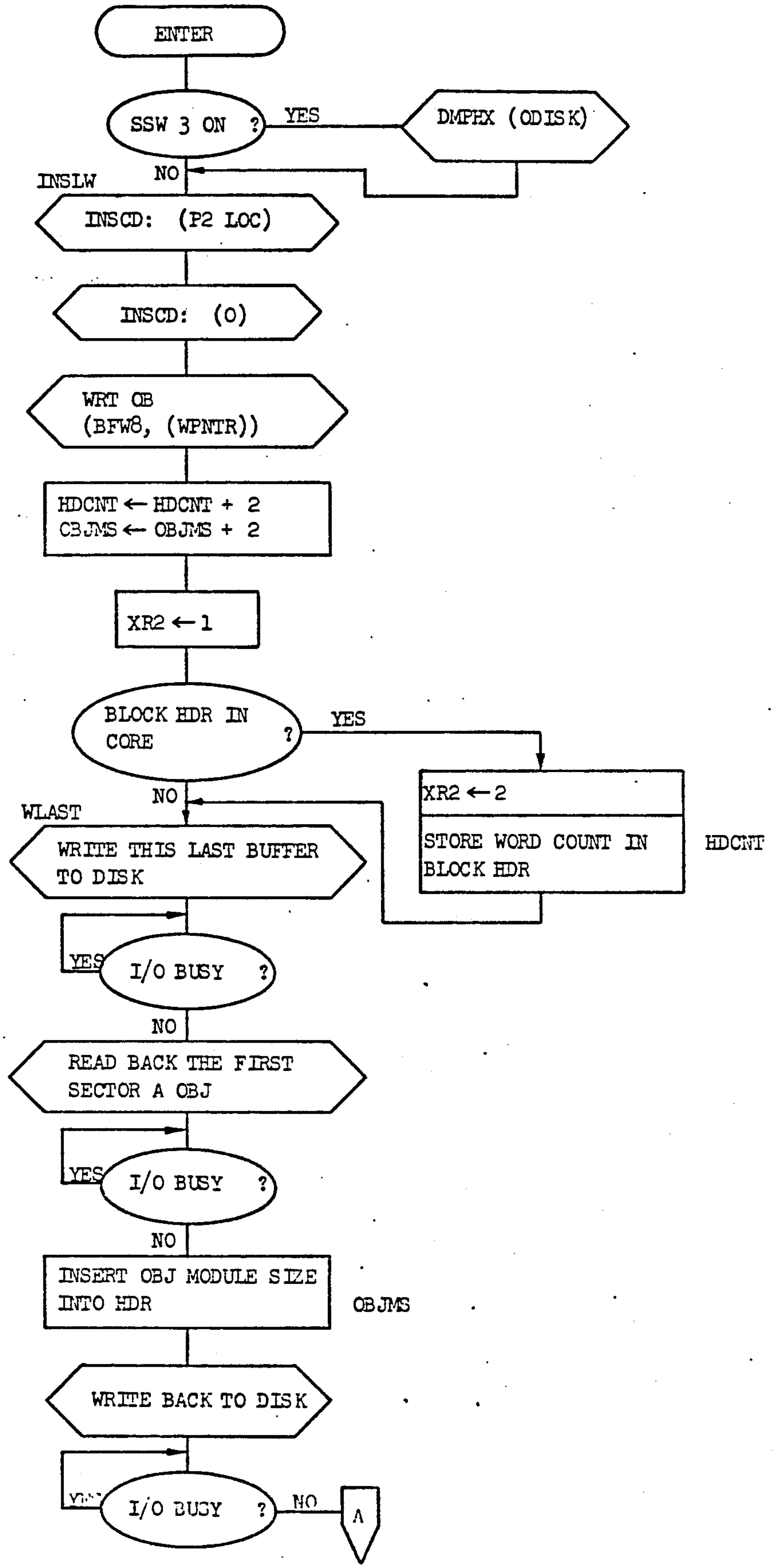

TABLE XXIIy (cont'd)
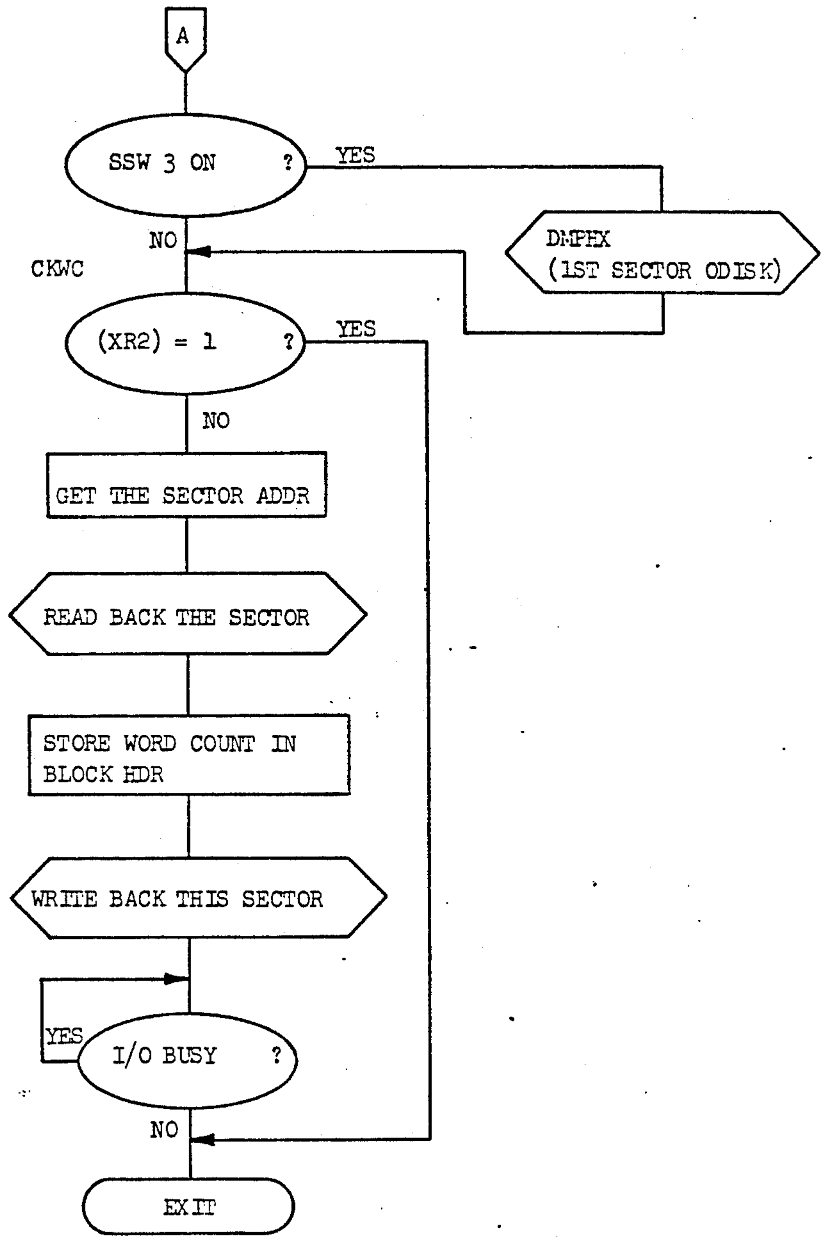

EPILOG

EPLOG

| | |
|---|---|
| Type | Main Program (Core Load) |
| Function | The purpose of this program is to<br>(1) Save symbol table<br>(2) Print symbol table, and<br>(3) Print cross reference table when these options are specified by the Assembler Control Cards for the Assembly.<br>The Main Program tests for the option to save symbol table and if it is specified, checks if it is Absolute Assembly. If it is, then it saves the symbol table or else aborts to save function. Next it checks for print symbol table option and prints out the symbol table with the appropriate attribute preceding the symbol table and the location in HEX following the symbol (seven per line).<br>The cross reference table print option is checked and printed if specified. The line number of the symbol, the symbol and the references are printed. Depending on the errors, a flag is sent to load or abort the assembly and prints appropriate message. |
| Availability | Main Program of coreload EPLOG (called by Pass 2 of the ASSEMBLER). |
| Subprogram Called | PRINT, CROSR, WRTFL, ORDER. |
| Remarks | (a) This is a part of the ASSEMBLER<br>(b) This uses information stored by Pass 1 and Flags RTYPE, IFLAG. |

Use — CALL LINK called by link

CALL EPLOG

Limitations — This program expects the hash links to be in alphabetical order.

Flow Chart — Described in TABLE XXIIIa

PRINT

Type — Nonrecursive Subroutine

Function — To print out the symbol table with proper attribute and the Hex location (seven symbols per line).

Availability — Relocatable program (PRINT) in LET

Use — CALL PRINT

Remarks — (a) It is a subroutine used by core load EPLOG (b) It uses information contained in Hash Table to get hash links and the information in hash links.

Flow Chart — Described in TABLE XXIIIb

TABLE XXIIIa
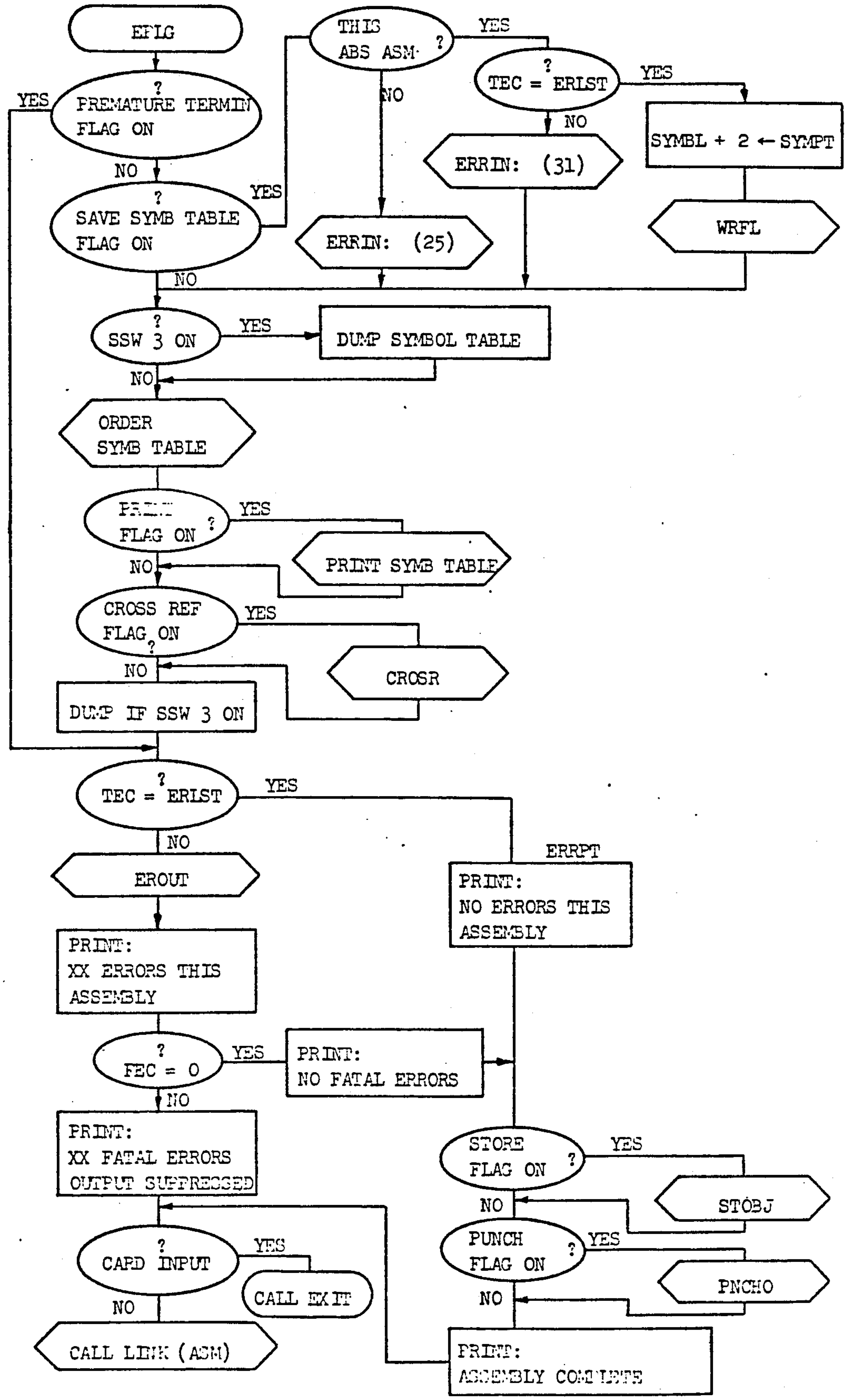

TABLE XXIIIb
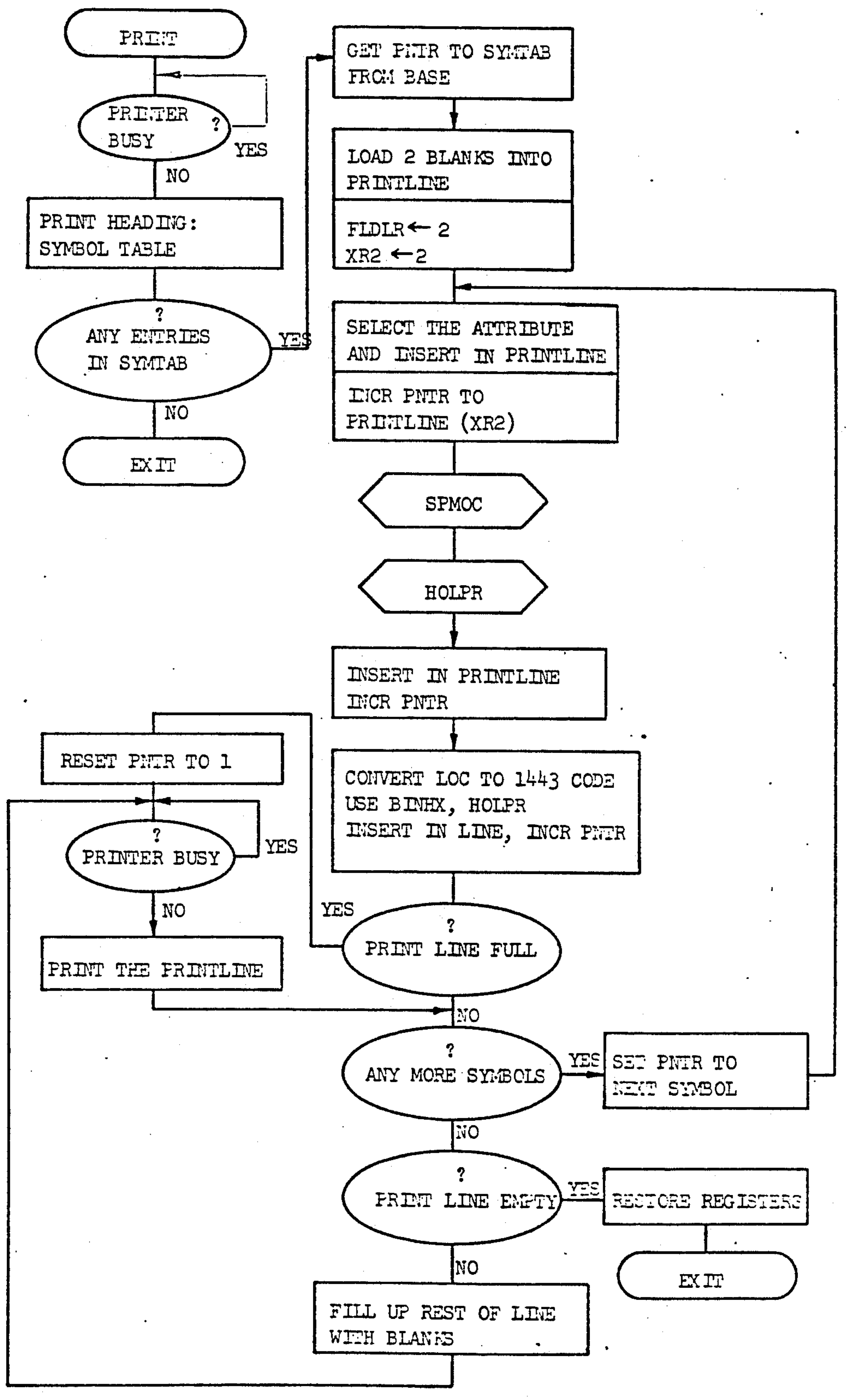

CROSR

| | |
|---|---|
| Type | Nonrecursive Subroutine |
| Function | To print the cross reference table with the definition (line no. of the symbol), symbol and the references. Conversion from packed EBCDIC to 1443 code is done. |
| Availability | Relocatable program (LET) on Drive 0 |
| Use | Call CROSR |
| Subprogram Called | RVRSL |
| Remarks | (a) It is a part of the EPLOG core load (ASSEMBLER)<br>(b) It uses information in hash chain and reference chains.<br>(c) A zero pointer to next hash link means end of chain. |
| Flow Chart | Described in TABLE XXIIIc |

TABLE XXIIIc
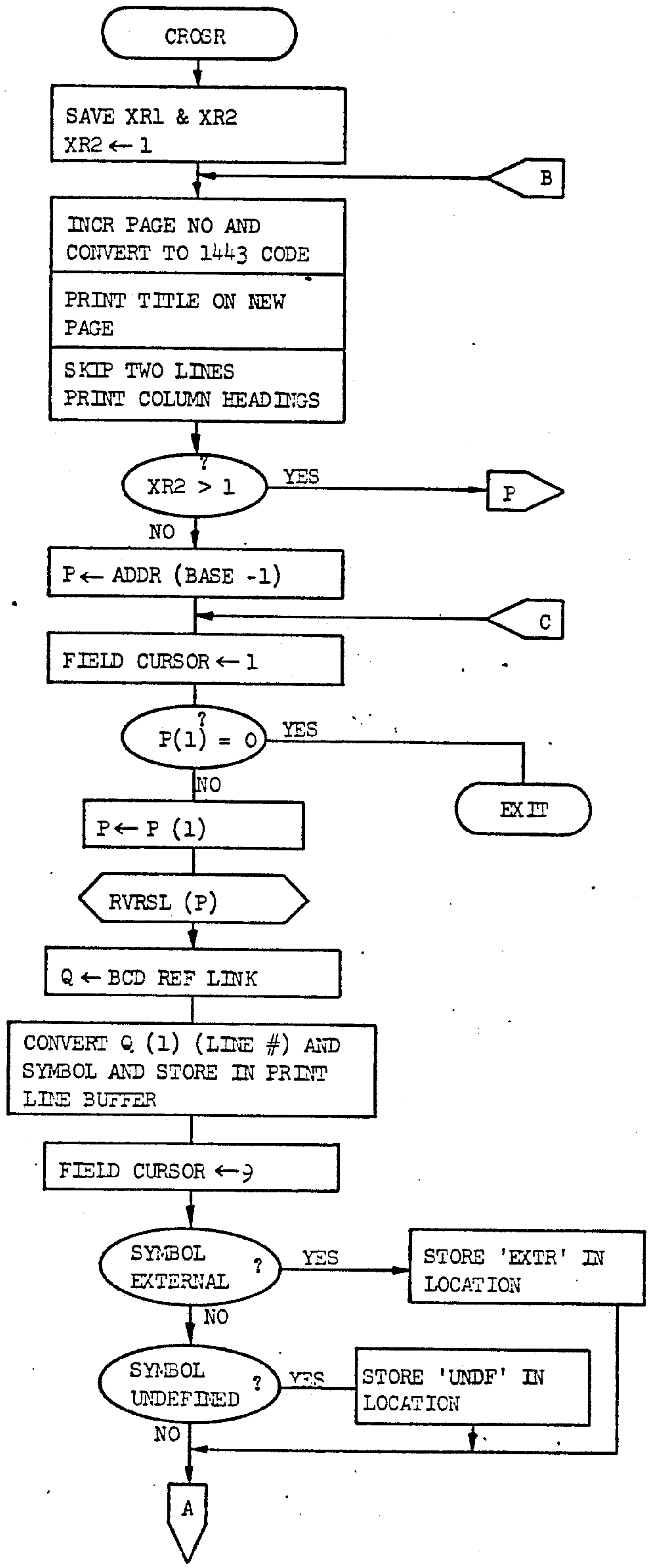

TABLE XXIIIc (cont'd)
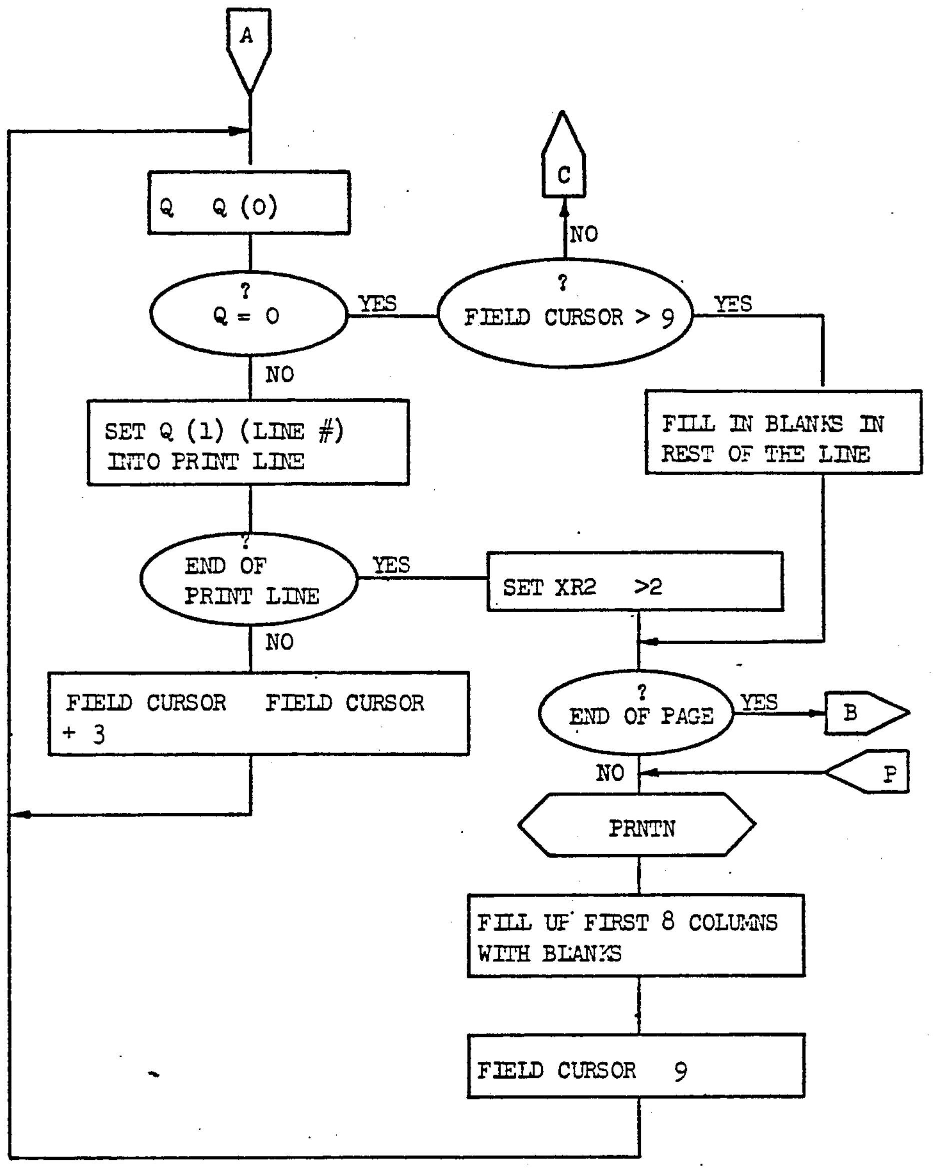

ORDER

| | |
|---|---|
| Type | Nonrecursive Subroutine |
| Function | This subroutine merges hash chains in the symbol table into an alphabetical linear chain. With the symbol table thus organized, printing the symbol table and generating a cross reference is made easier.<br>This uses two subroutines (1) NEXTH to find the next non zero hash chain pointer and (2) FINDE (secondary entry point in FXHAS routine) to find the hash link prceding the one where the entry has to be inserted. |
| Availability | Relocatable subprogram (LET) and part of the Core Load EPLOG. |
| Use | CALL ORDER<br>no arguments, data referenced through global symbols. |
| Subroutines Called | NEXTH, FINDE |
| Remarks | This gets the necessary pointers through global symbols in system symbol table. |
| Limitations | This assumes that the hash chains are in alphabetical order. |
| Flow Chart | Described in TABLE XXIIId |

TABLE XXIIId
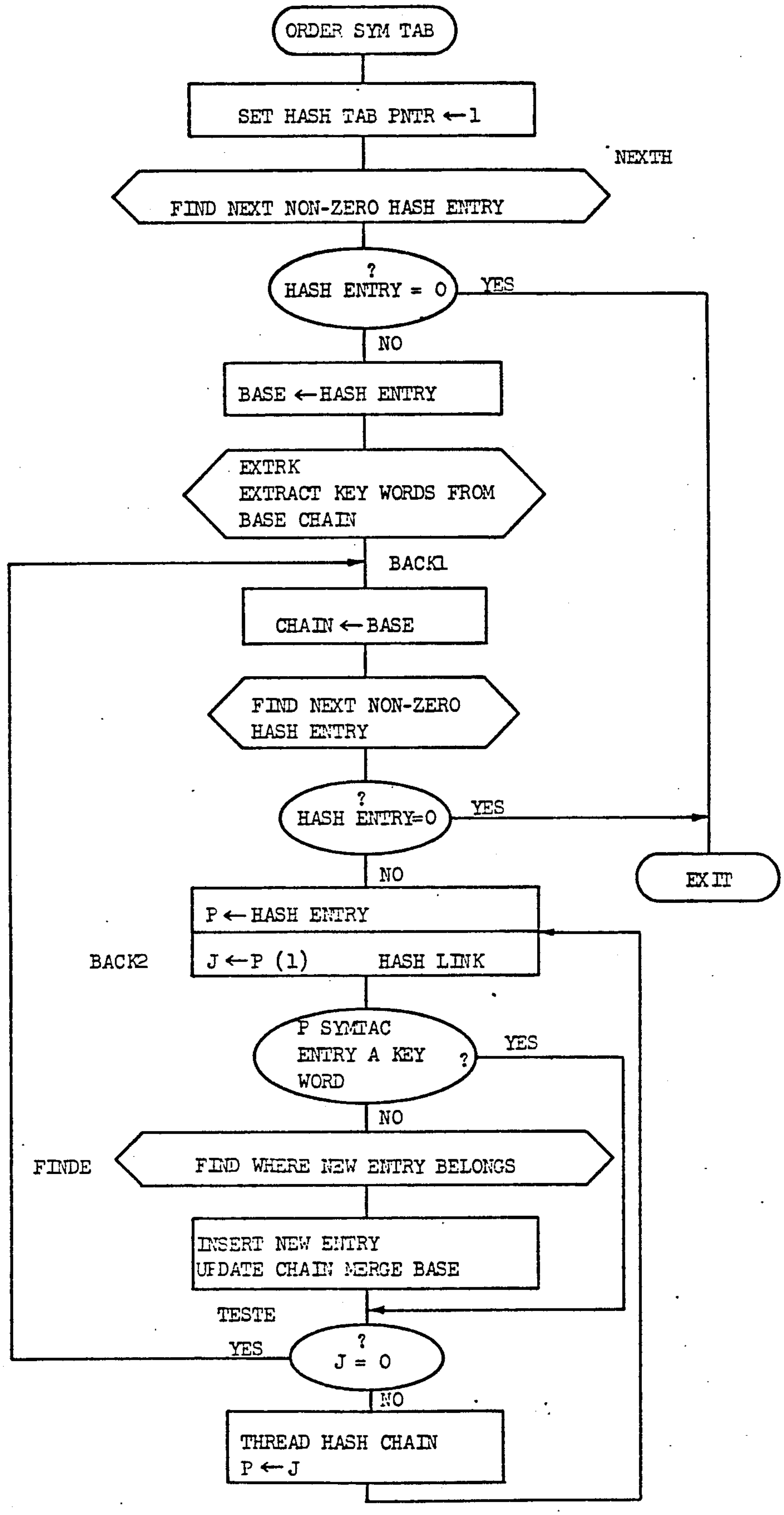

RVRSL

| | |
|---|---|
| Type | Nonrecursive Subroutine |
| Function | To reverse the order of the reference chain from descending to ascending order of line numbers. The reference chain contains the entries in descending order with the definition in the last and zero pointer to next link which is the end of the chain. This subroutine reverses that order and gets the definition to the beginning. Here 'definition' means line number where symbol is defined. |
| Availability | Relocatable subprogram (LET) |
| Use | CALL RVRSL<br>DC P where P is the location that contains pointer to first reference link. |
| Remarks | This uses the reference links created by Pass 1 and changes the pointers to links to get them in reverse order without actually moving the information. |
| Flow Chart | Described in TABLE XXIIIe |

TABLE XXIIIe
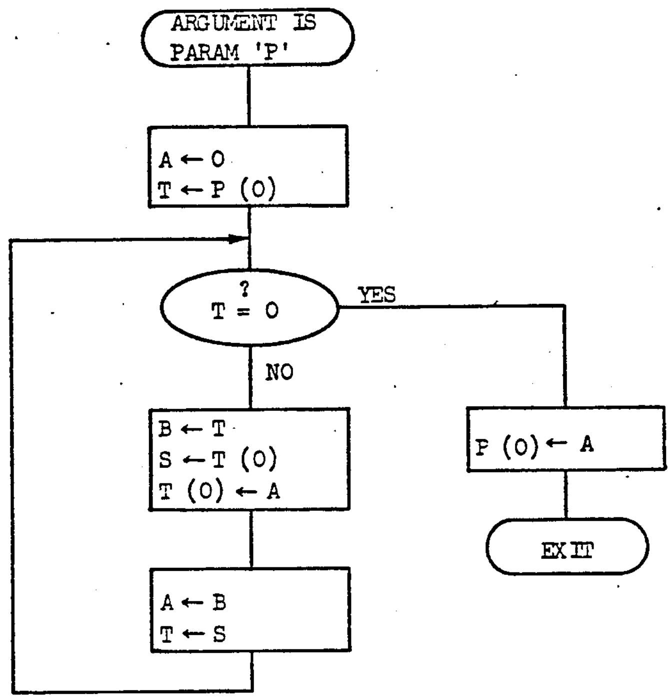

PNCHO

| | |
|---|---|
| Type | Nonrecursive Subroutine |
| Function | Punches an object deck for an absolute assembly in the ASSEMBLER. |
| Availability | Relocatable area. |
| Use | CALL PNCHO |
| Subprograms Called | SPMOC, TBLOC, CINSP, CONPC |
| Remarks | This is part of Core Load EPLOG of ASSEMBLER. This punches object deck from the object module of an absolute assembly that is in non process working storage of 2310. If a non-blank card is read for punching it loops around and has to be manually interrupted to get out of loop. |
| Limitations | The object deck can be punched only along with an assembly. |
| Flow Chart | Described in TABLE XXIIIf |

TBLOC

| | |
|---|---|
| Type | Nonrecursive Subroutine |
| Function | Tests if any more data words are in the buffer ODISK (data is the object module) |
| Availability | Relocatable area. |
| Use | Call TBLOC |
| Remarks | If there are no more data words in the buffer, the next sector of the object module (from the non process working storage) is read and the pointer to the data word is set. |
| Flow Chart | Described in TABLE XXIIIg |

TABLE XXIIIf
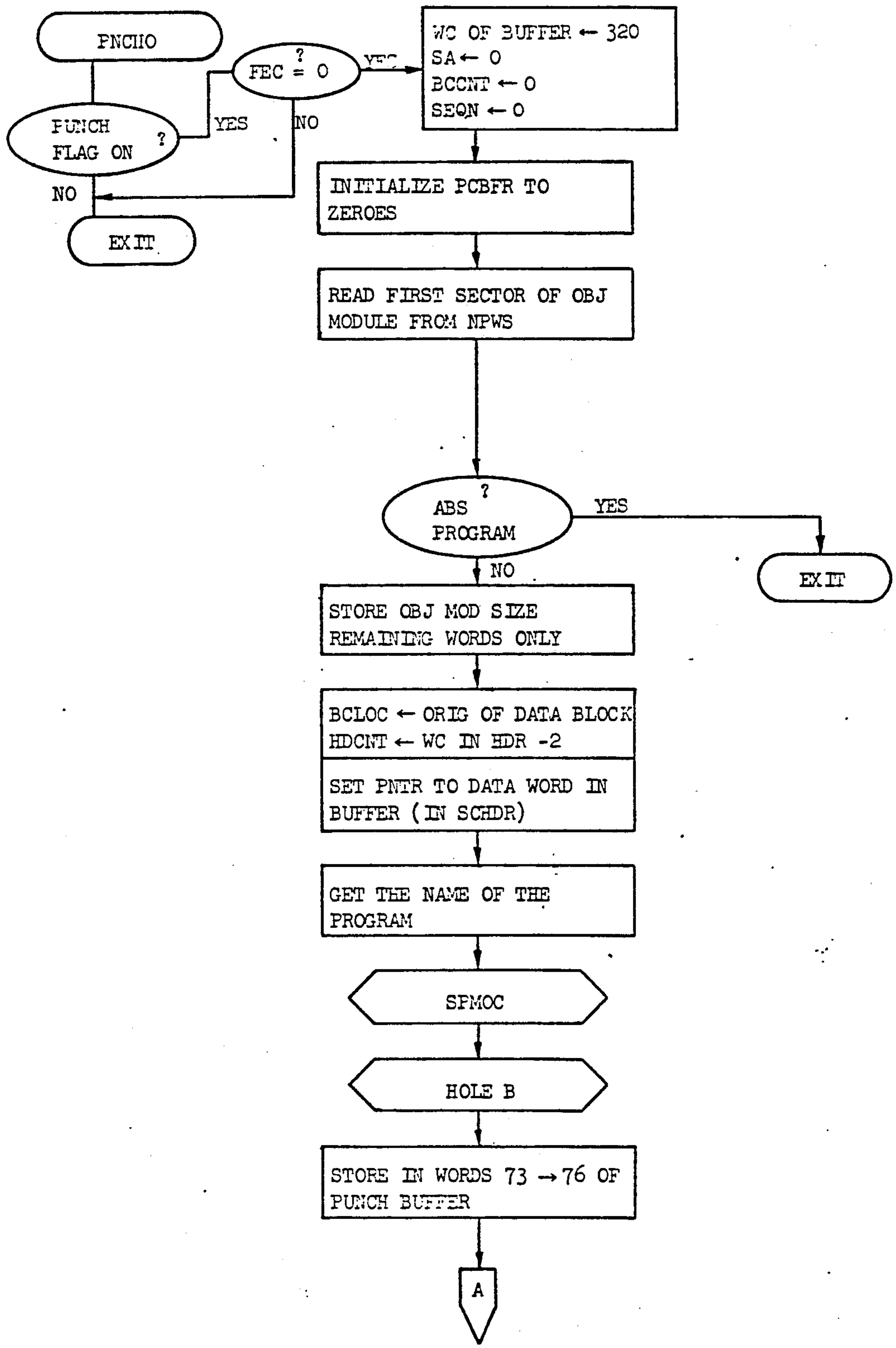

TABLE XXIIIf (cont'd)
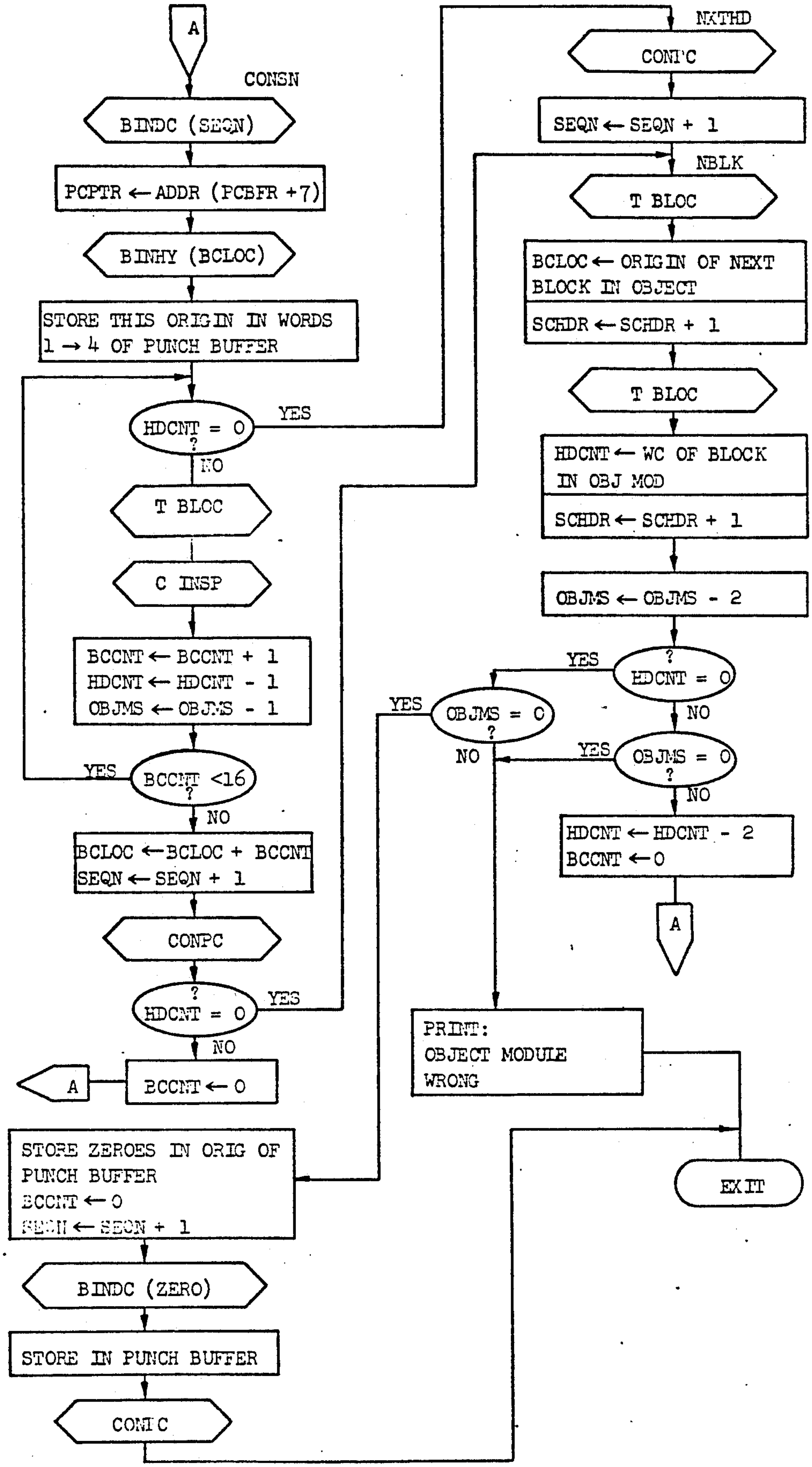

TABLE XXIIIg
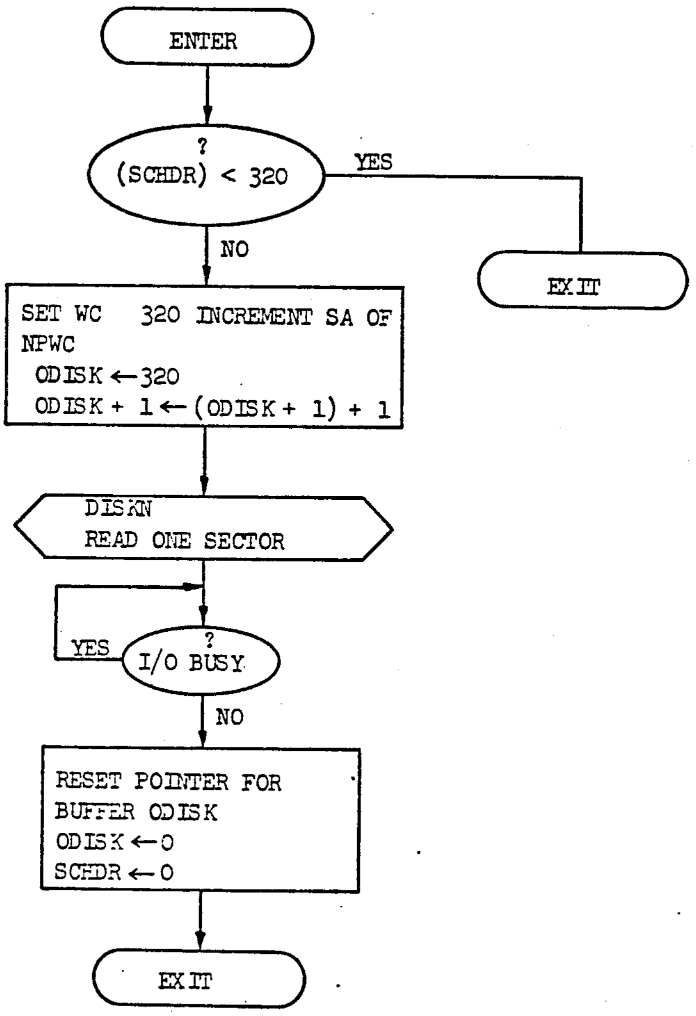

CINSP

| | |
|---|---|
| Type | Nonrecursive Subroutine |
| Function | Convert one word of Binary Code into HEX and insert in Buffer |
| Availability | Relocatable area. |
| Use | Call CINSP |
| Remarks | This picks up one binary word of code from next word of ODISK Buffer, converts it into 4 words of card code HEX and inserts into the next 4 words of punch buffer pointed by the buffer pointer. |
| Limitations | The availability of space in punch buffer has to be checked before this is called. |
| Flow Chart | Described in TABLE XXIIIh |

CONPC

| | |
|---|---|
| Type | Nonrecursive Subroutine. |
| Function | Inserts the word count into the punch buffer and punches the card. |
| Availability | Relocatable area. |
| Use | Call CONPC |
| Remarks | This checks if the card is blank before punching the card from punch buffer data and if it is non-blank a dynamic wait situation results. A dump of data can be obtained with the SSW 4 on. |
| Flow Chart | Described in TABLE XXIIIi |

TABLE XXIIIh
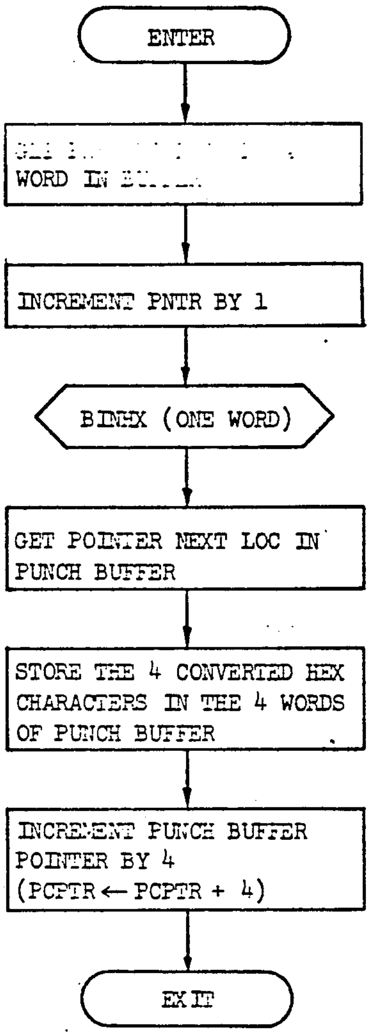

TABLE XXIIIi
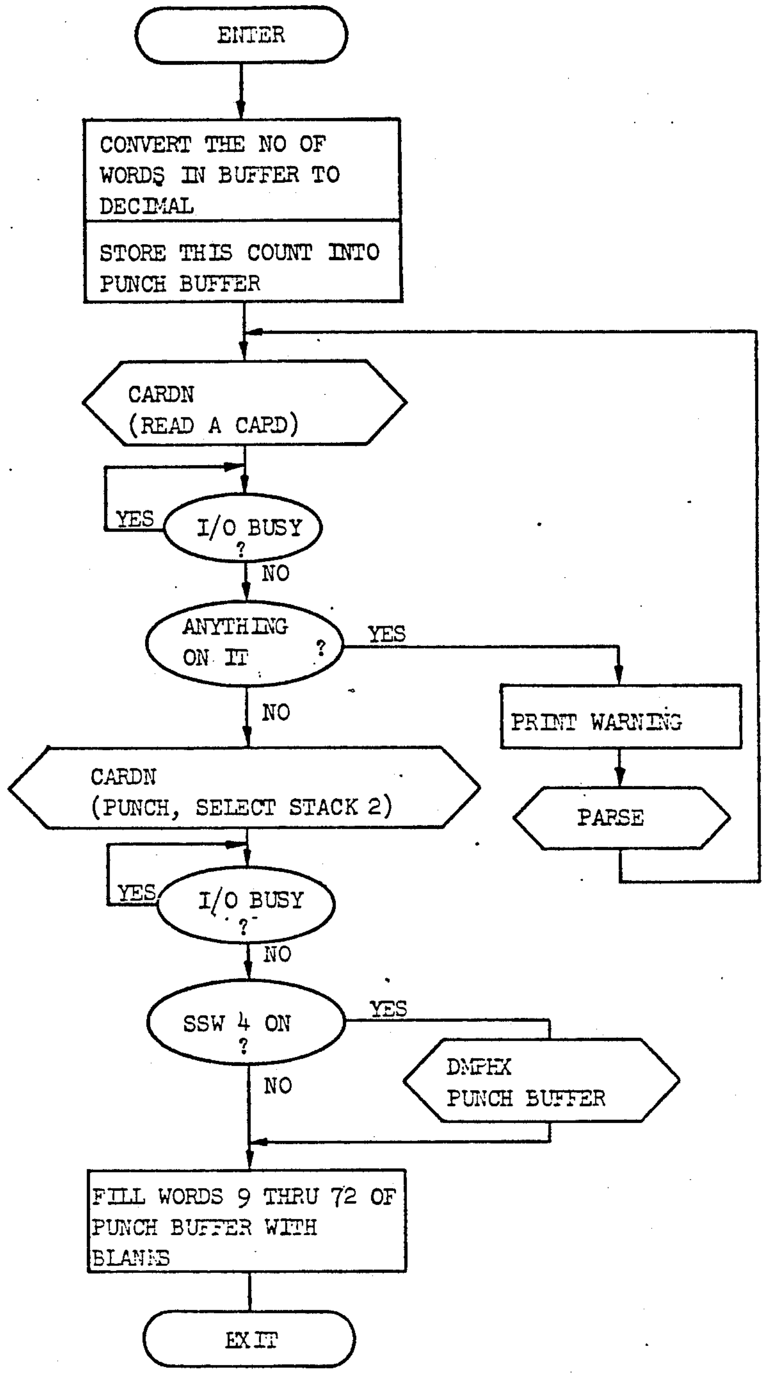

STOBJ

| | |
|---|---|
| Type | Nonrecursive Subroutine |
| Function | Stores object module on 2311 disk files. |
| Availability | Relocatable area. |
| Use | Call STOBJ |
| Subprograms Called | WRBIN, WRBUF |
| Remarks | The user has to specify the 'STORE' option in the variable field (starting in column 41 of ASM card) if the object module. is to be stored on a successful assembly. The object module generated by Pass 2 of the ASSEMBLER is in the NPWS area on 2310. |
| Limitations | The user has to create a subfile in the 2311 disk file with proper name before it can be stored. |
| Flow Chart | Described in TABLE XXIIIj |

TABLE XXIIIj
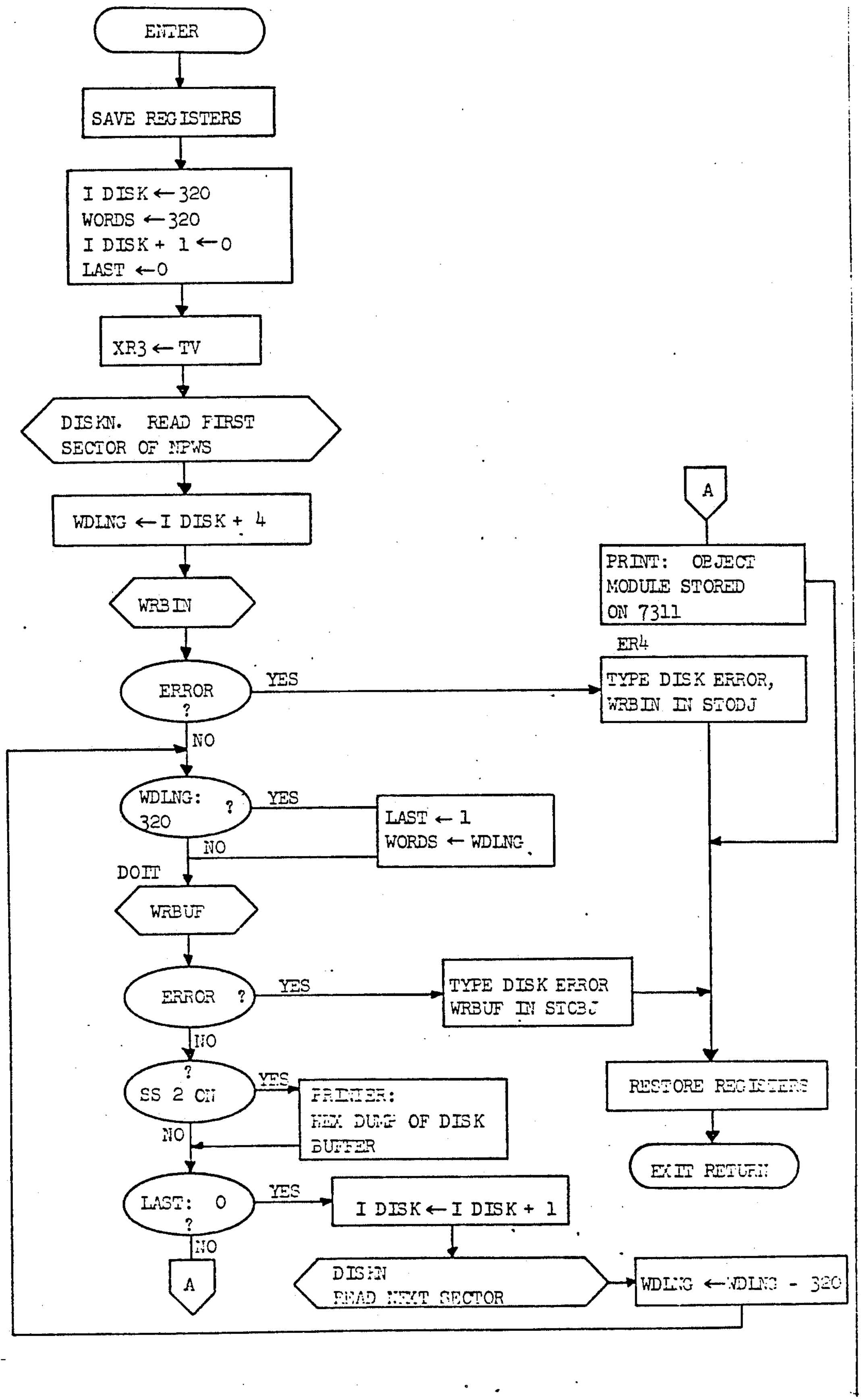

EROUT

| | |
|---|---|
| Type | Nonrecursive Subroutine |
| Function | To print out the Assembler Error Messages with line number, code number and alpha description An asterisk before the code number indicates that it is a fatal error. |
| Availability | Relocatable program LET (part of Core Load EPLOG). |
| Use | Call EROUT |
| Remarks | This is mainly used by the Core Load EPLOG and not a utilities subroutine. This assumes that the location TEC contains a pointer to the next available location in the error table. |
| Limitations | All error messages should be two words long with the two right bytes of the first word containint the code number. A maximum of only 100 messages can be stored. |
| Flow Chart | Described in TABLE XXIIIk |

WRFL

| | |
|---|---|
| Type | Nonrecursive Subroutine |
| Function | Copies symbol table into symbol table file on 2310 disk (DEFIL) |
| Availability | Relocatable area. |
| Use | Call WRFL |
| Subprograms called | DISKN |
| Remarks | The program searches FLET for a file named in the argument list and returns the word count and sector address, or an error flag if the file name is not in FLET |
| Flow Chart | Described in TABLE XXIIIl |

TABLE XXIIIk
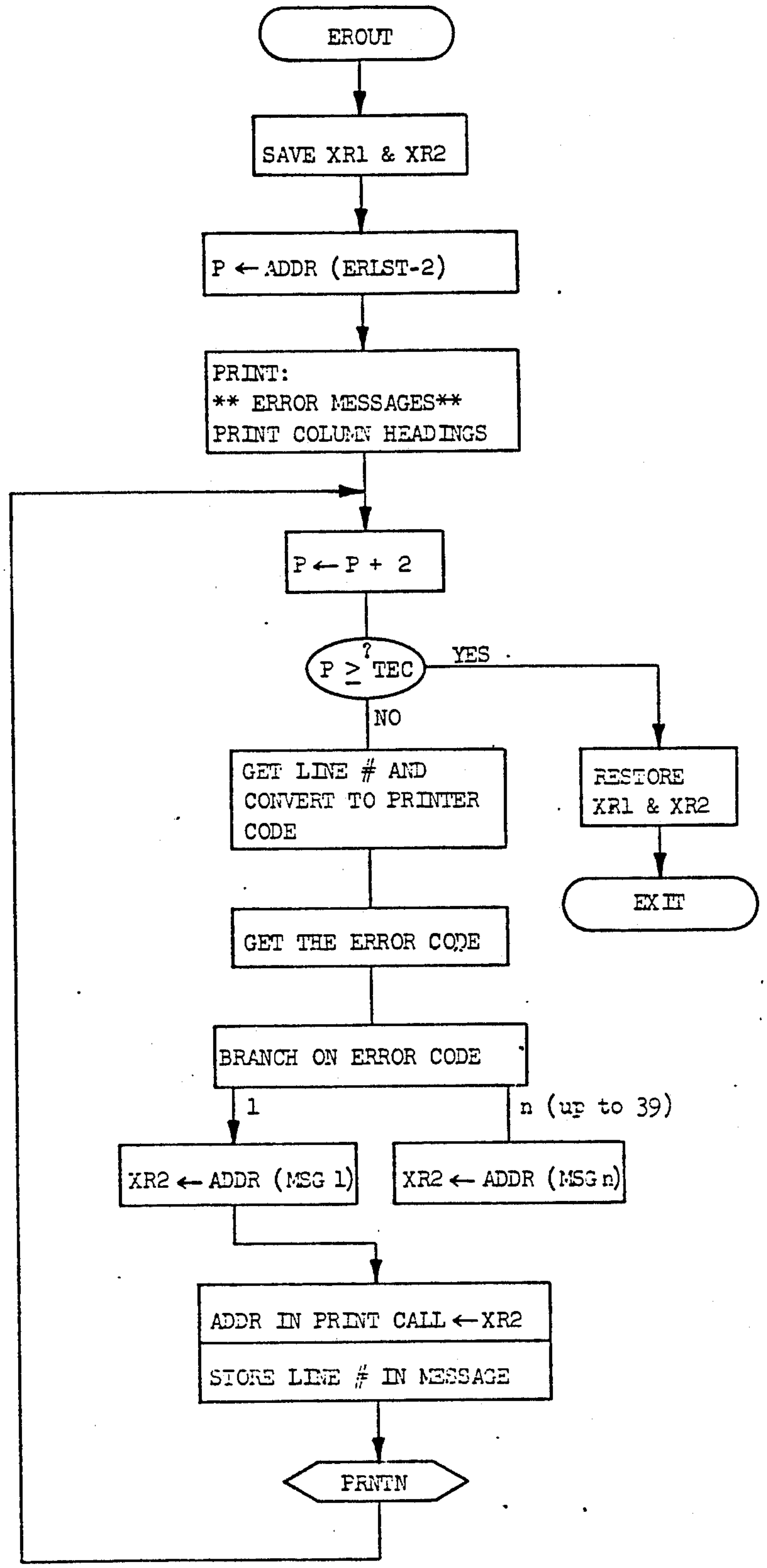

TABLE XXIII1
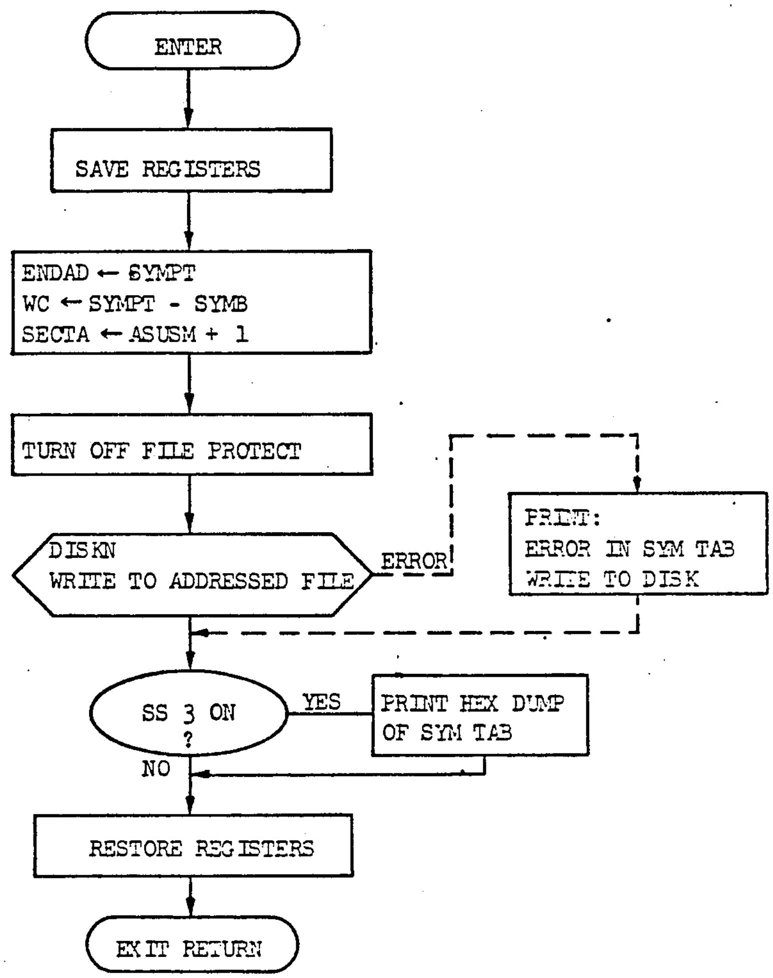

UTILITIES

The programs in the Utilities section perform necessary functions for the ASSEMBLER, but are not directly related to the logic of the ASSEMBLER itself. Rather than clutter up (and perhaps obscure) the main logic of the ASSEMBLER, they are presented separately.

In a sense, these programs interface the ASSEMBLER with the particular computer (the IBM 1800) used as the host or supervisory computer in the system. To implement the ASSEMBLER on a different computer, the logic in some of these utility programs might need changing. The rest of the ASSEMBLER programs should require only recoding in the particular language supported, without any changes in the logic flow.

PSHRA/PORRA

| | |
|---|---|
| Type | Nonrecursive Subroutine |
| Function | Pushes and pops the return address stack thereby providing recursive capabilities to the calling routine. |
| Availability | Relocatable area. |
| Subprograms Called | ERRIN |
| Core Loads Called | EPLOG |
| Remarks | The return address stack pointer (RAP) must be initialized to contain the address of the first available location in the stack. A call to EPLOG is made if the return address stack overflows. No registers are saved. |
| Limitations | The call to PSHRA must be the first executable statement upon entry to a subroutine. POPRA may be called anywhere. |
| Flow Chart | Described in TABLE XXIVa |

TABLE XXIVa
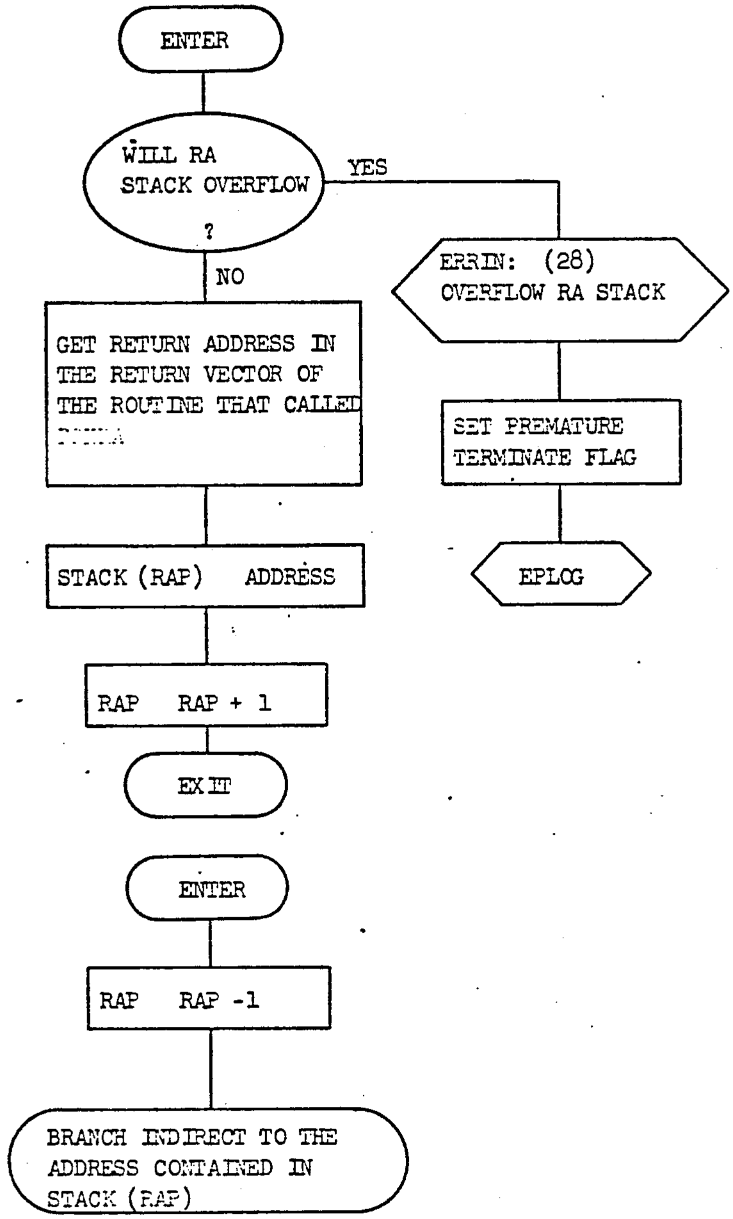

TOKEN

| | |
|---|---|
| Type | Nonrecursive Subroutine |
| Function | TOKEN scans the card image returning a code for each token found (see ASSEMBLER DESCRIPTION). Appropriate conversions are applied to each data type, routines are called to add symbols and references in the symbol table. |
| Availability | Relocatable area. |
| Use | Call TOKEN |
| Subprograms Called | ERRIN, COMPS, HSAH, FXHAS, INSYM, REFR, NOTHR. |
| Remarks | The value of the token is returned in TOK and TOKTP (see ASSEMBLER DESCRIPTION). Errors such as symbols too long, constants too large, symbol table overflow, etc., are diagnosed. |
| Limitations | TOKEN is restricted to the data types and character set as specified in ASSEMBLER DESCRIPTION. |
| Flow Chart | Described in TABLE XXIVb |

TABLE XXIVb
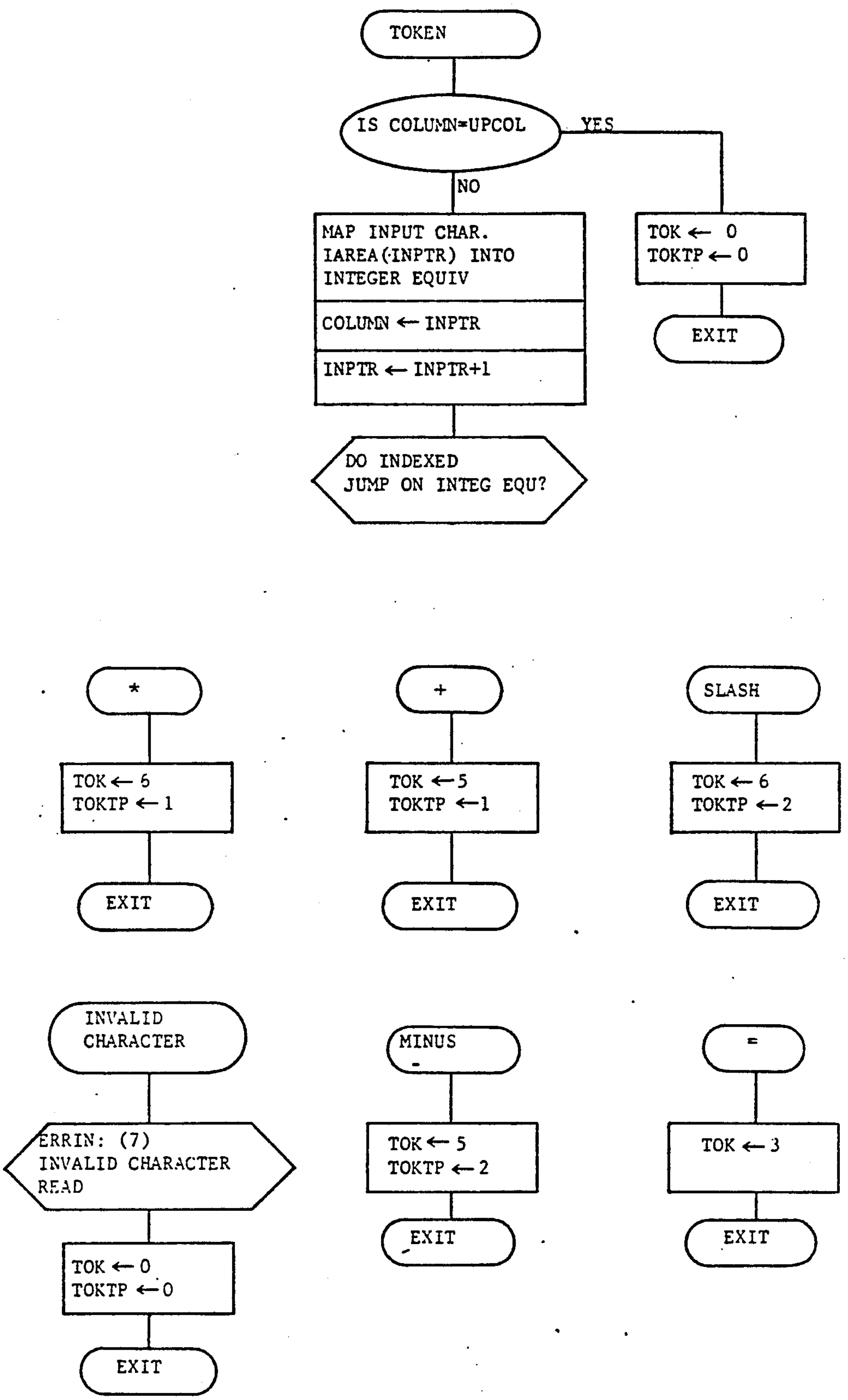

TABLE XXIVb (cont'd)
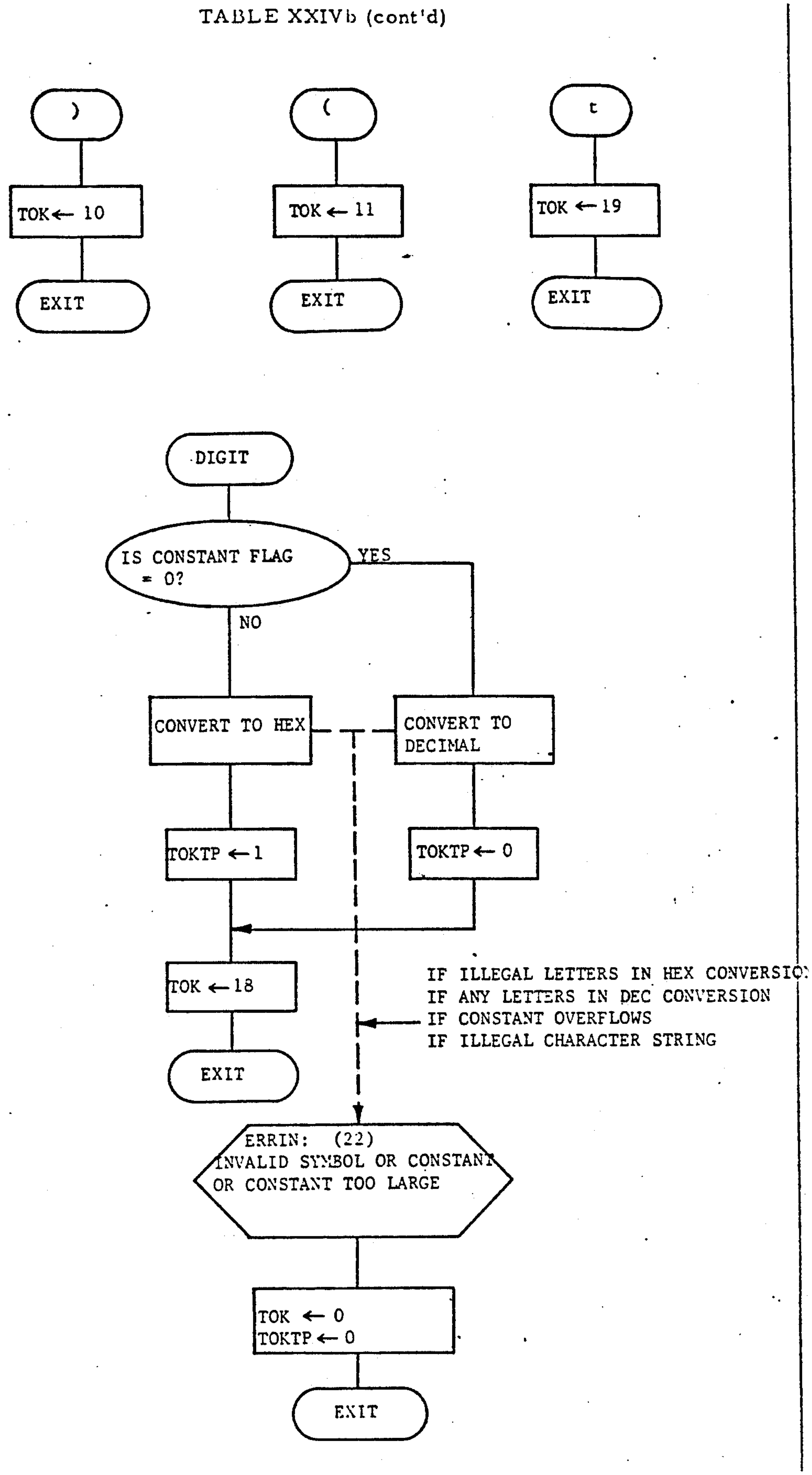

TABLE XXIVb (cont'd)
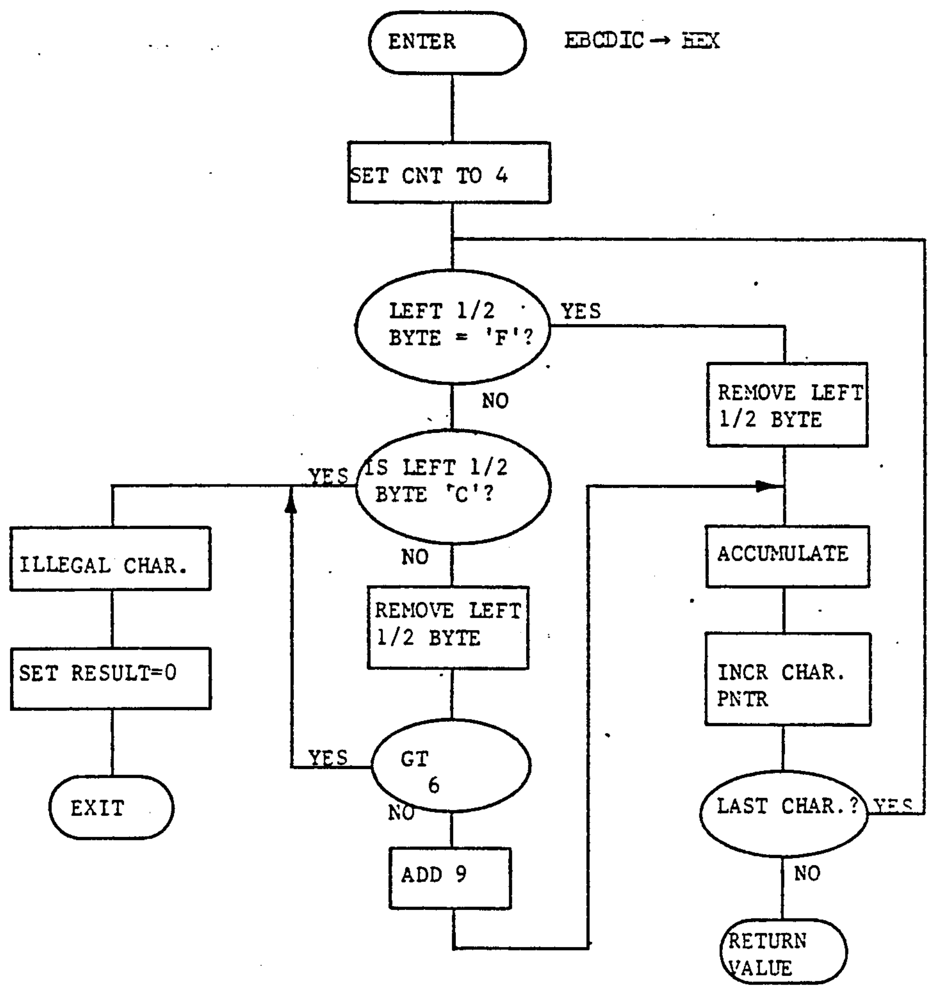

TABLE XXIVb (cont'd)
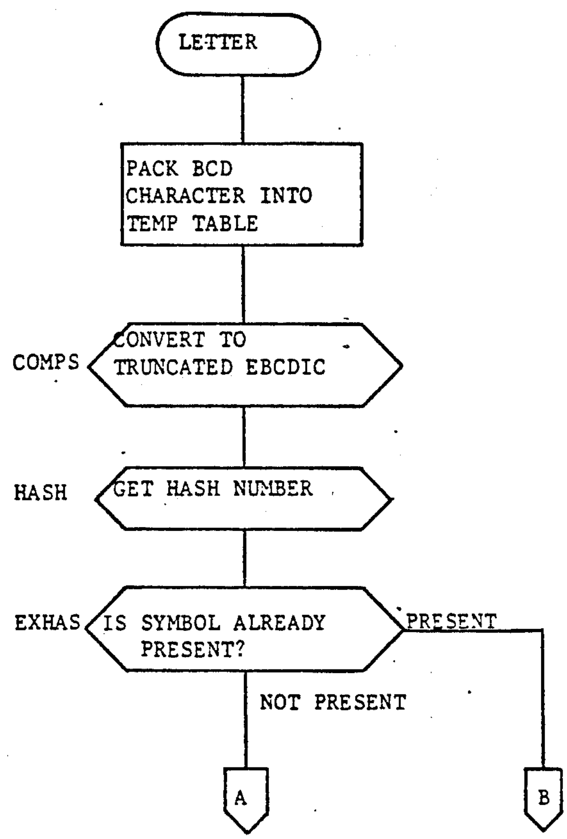

TABLE XXIVb (cont'd)
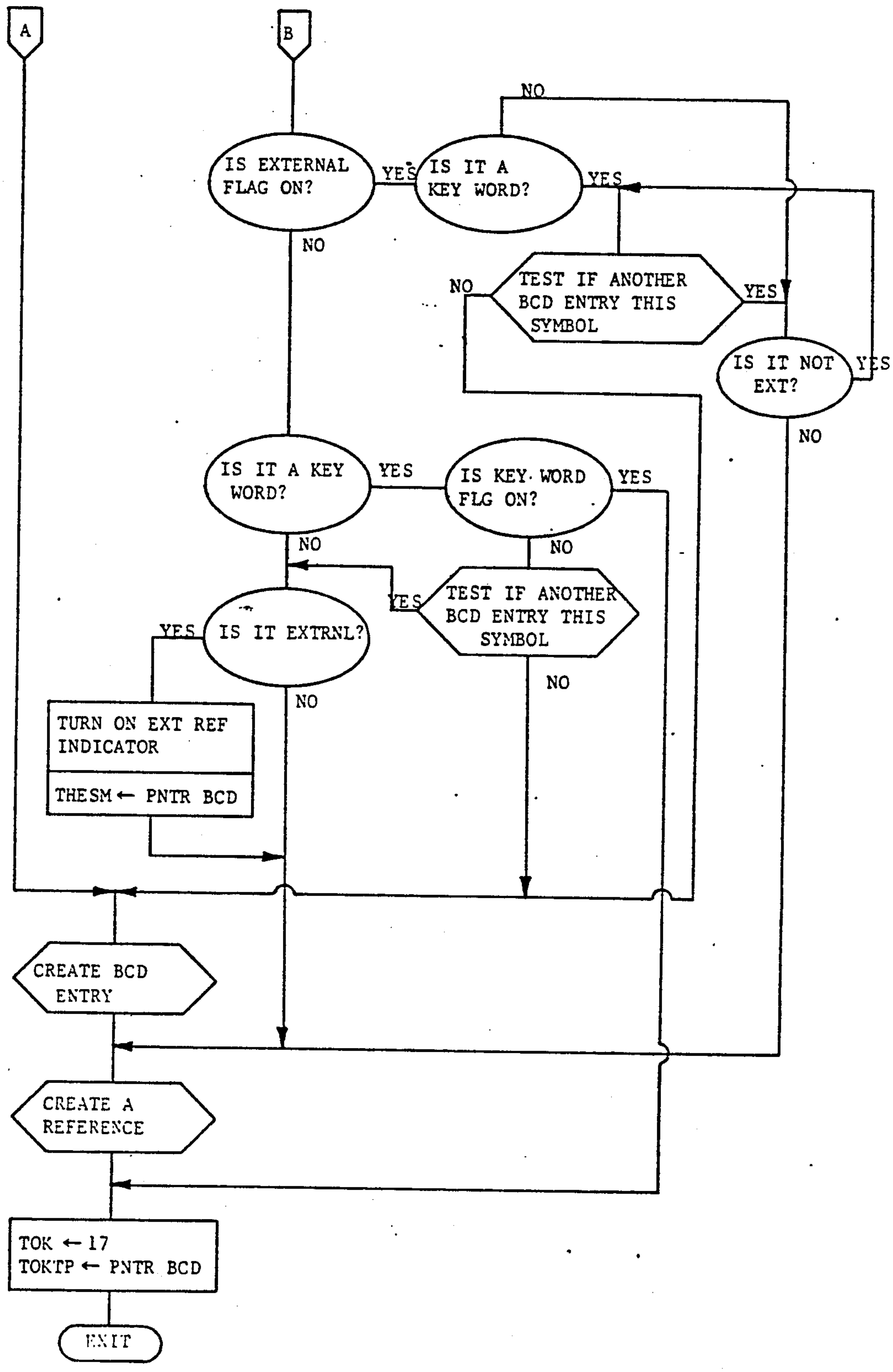

TABLE XXIVb (cont'd)
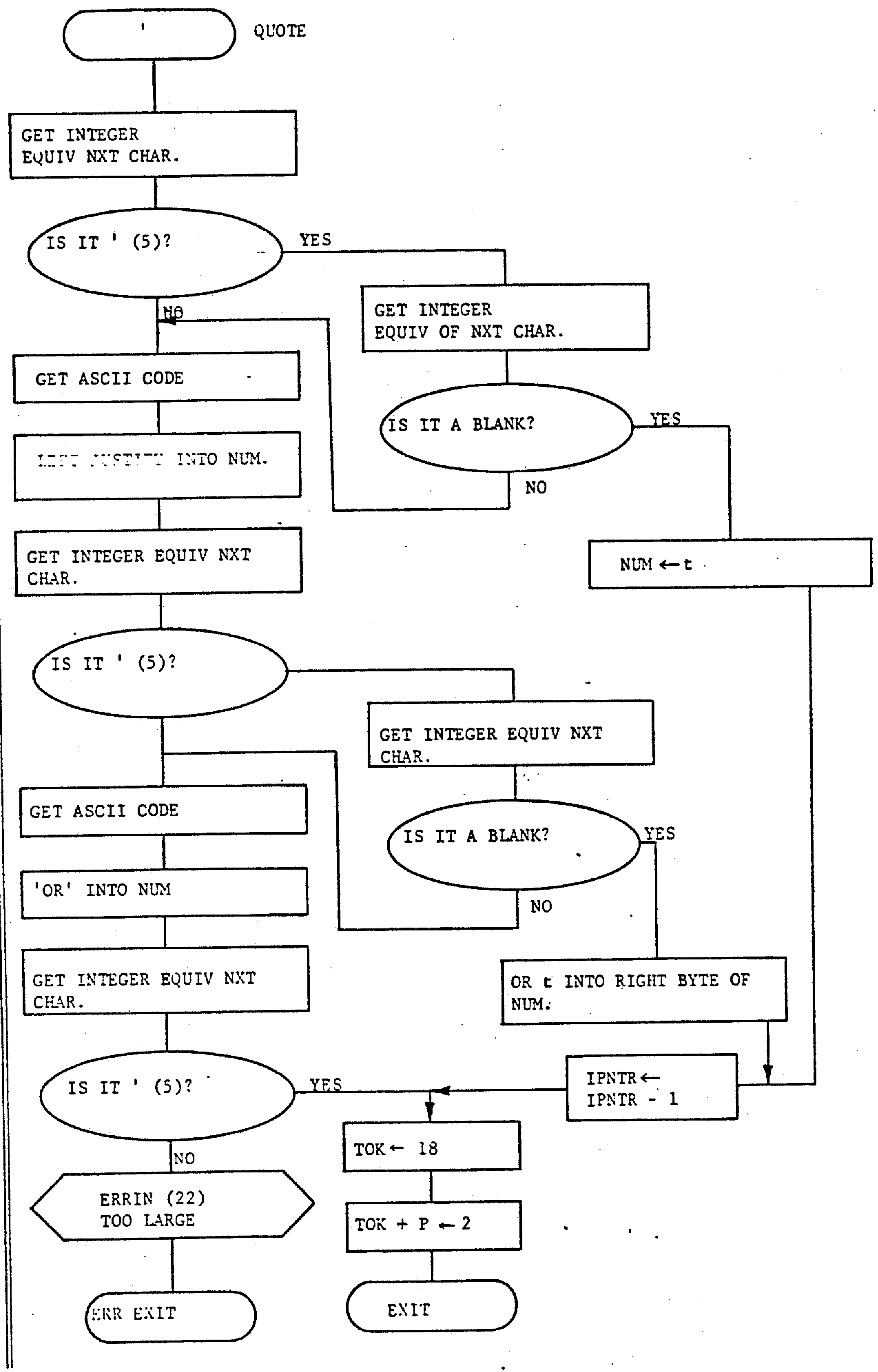

READC

| | |
|---|---|
| Type | Nonrecursive Subroutine |
| Function | Brings in a new source record (from disk or card) for each call, initializes the token pointer, and skips blank cards. If labels are found a pointer to the symbol table entry is left in LABEL. For statements with no labels LABEL = 0. When editing is specified, READC performs the edit. Line numbers for pass 1 are generated. |
| Availability | Relocatable area. |
| Use | Call READC |
| Subprograms Called | CARDN, HOLEB, TOKEN, INSP2, WRTP2, FTCHS, FTCHE, NXEDT. |
| Remarks | Input control is specified by CONTL, the control vector. No registers are saved. |
| Limitations | Input devices must be either card reader or 2311 disk. |
| Flow Chart | Described in TABLE XXIVc |

TABLE XXIVc
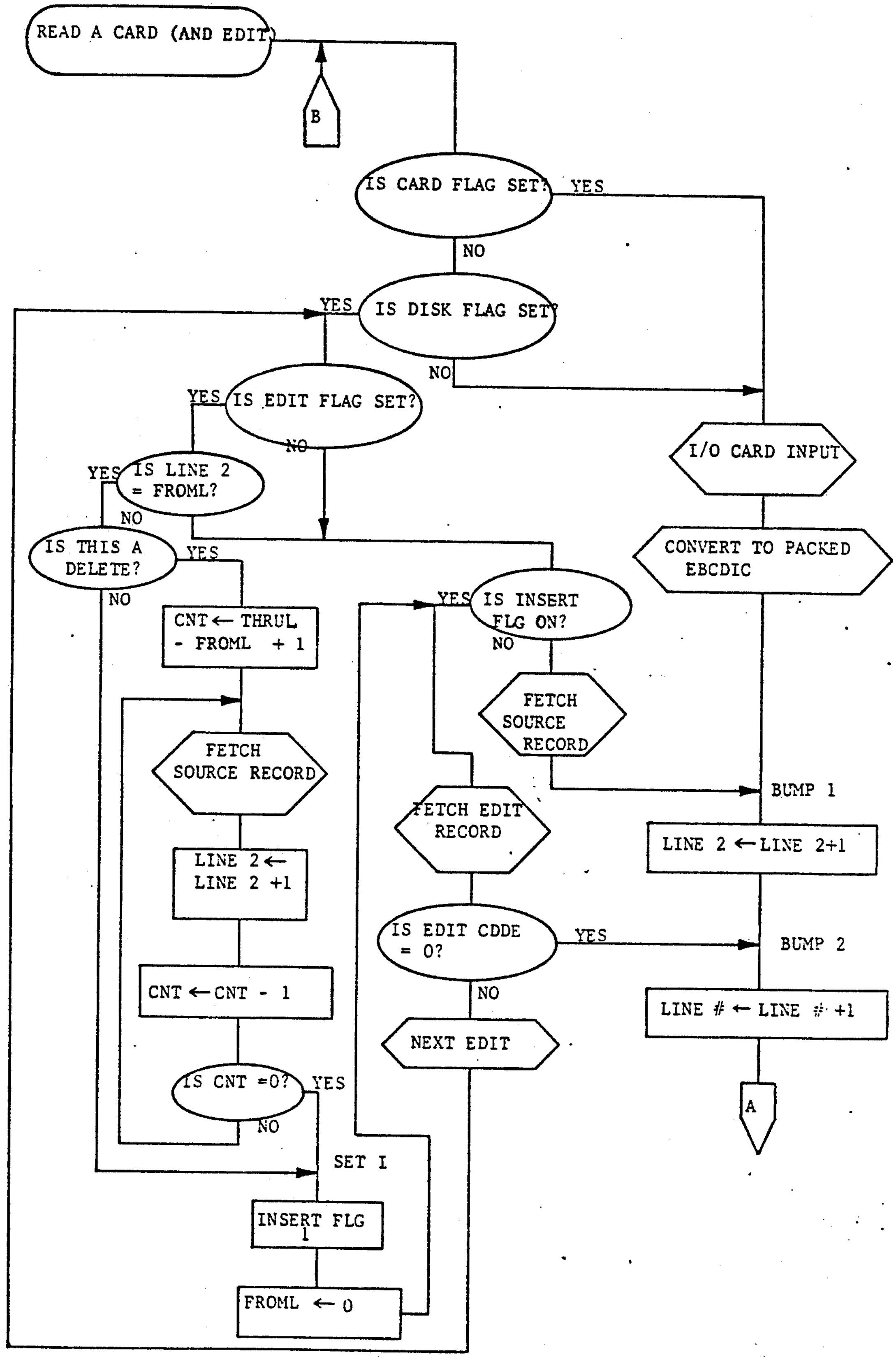

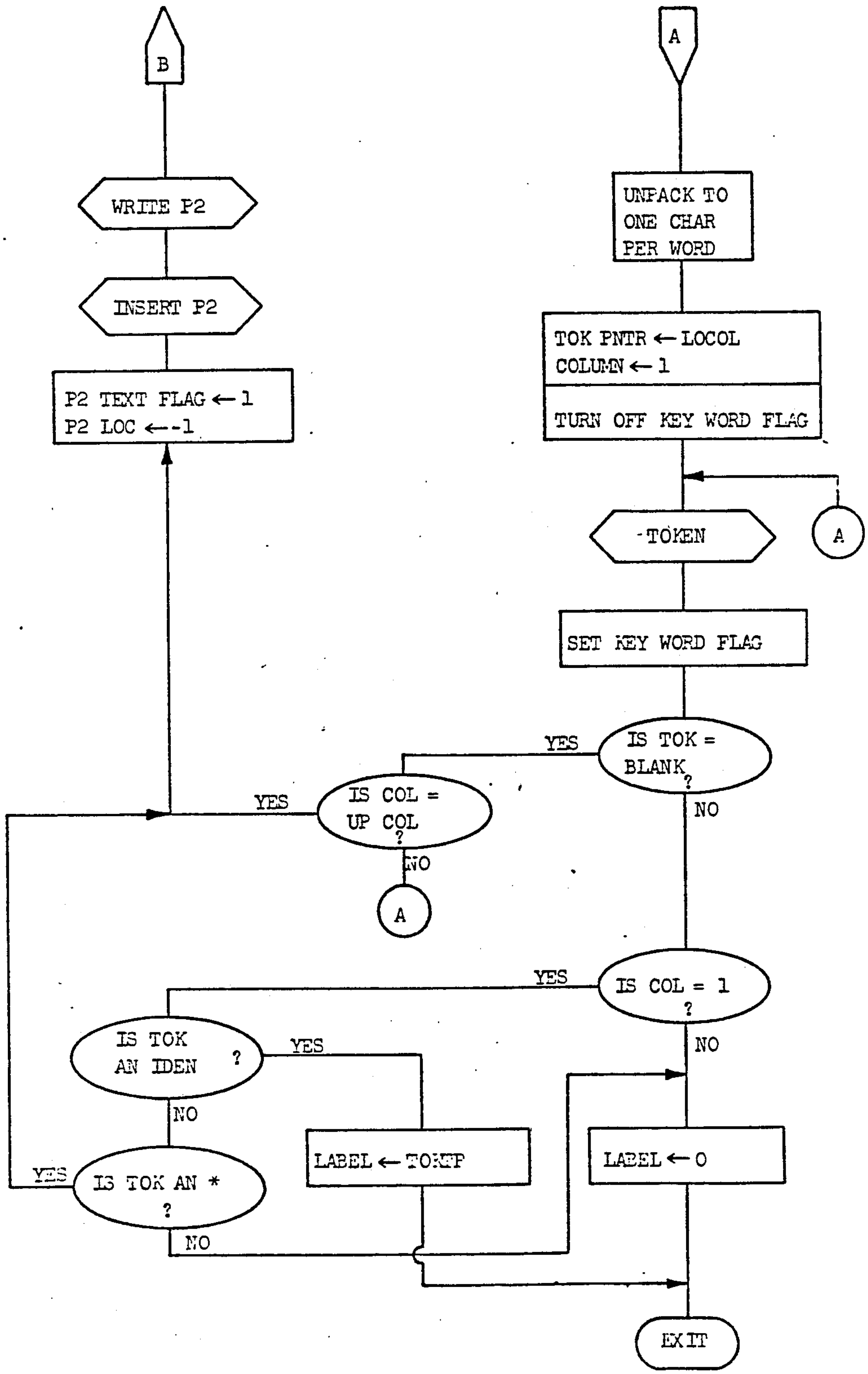
B
WRITE P2
INSERT P2
P2 TEXT FLAG ← 1
P2 LOC ← -1
A
UNPACK TO ONE CHAR PER WORD
TOK PNTR ← LOCOL
COLUMN ← 1
TURN OFF KEY WORD FLAG
A
TOKEN
SET KEY WORD FLAG
IS TOK = BLANK ?
YES
NO
IS COL = UP COL ?
YES
NO
A
IS COL = 1 ?
YES
NO
IS TOK AN IDEN ?
YES
NO
LABEL ← TOKTP
LABEL ← 0
IS TOK AN * ?
YES
NO
EXIT

EXPRN

| | |
|---|---|
| Type | Recursive Subroutine |
| Function | Parses expressions. |
| Availability | Relocatable area. |
| Use | CALL EXPRN<br>error return<br>relocatable expression return<br>absolute expression return |
| Subprograms Called | PSHRA, EX1, GENRA, ERRIN, POPRA |
| Remarks | The token pointer should point to the first token of the expression and upon return, token pointer points to the next token following the expression. Addition, subtraction, multiplication, and division are the allowable operations. Parentheses may be nested to any level (until the parse stack or return address stack overflows). A bottom up parse is the basic parsing technique, while the method of recursive descent is used to parse unary operators, constants, symbols, and parentheses. Syntax errors are detected. The registers are not saved. |
| Flow Chart | Described in TABLE XXIVd |

TABLE XXIVd
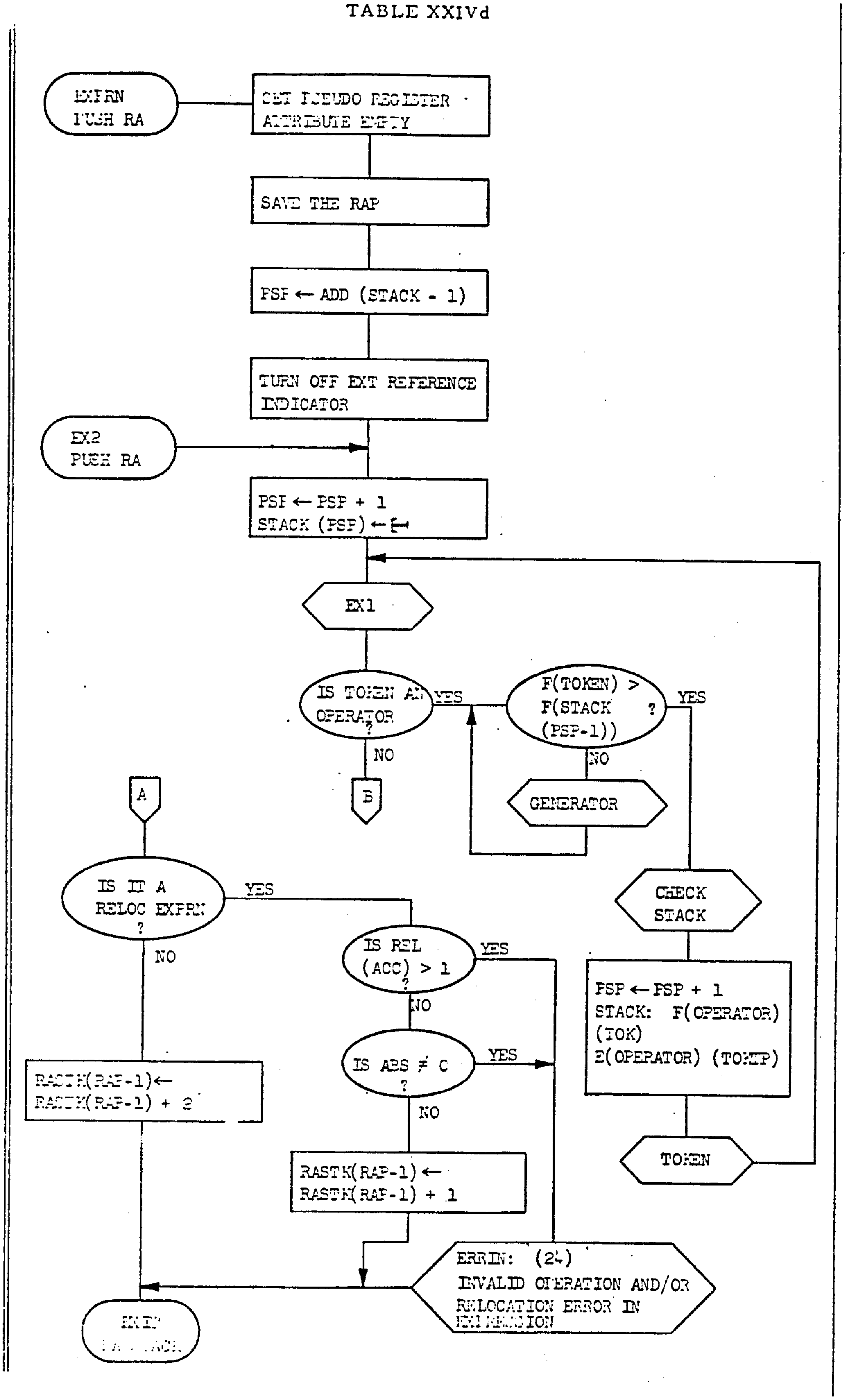

TABLE XXIVd (cont'd)
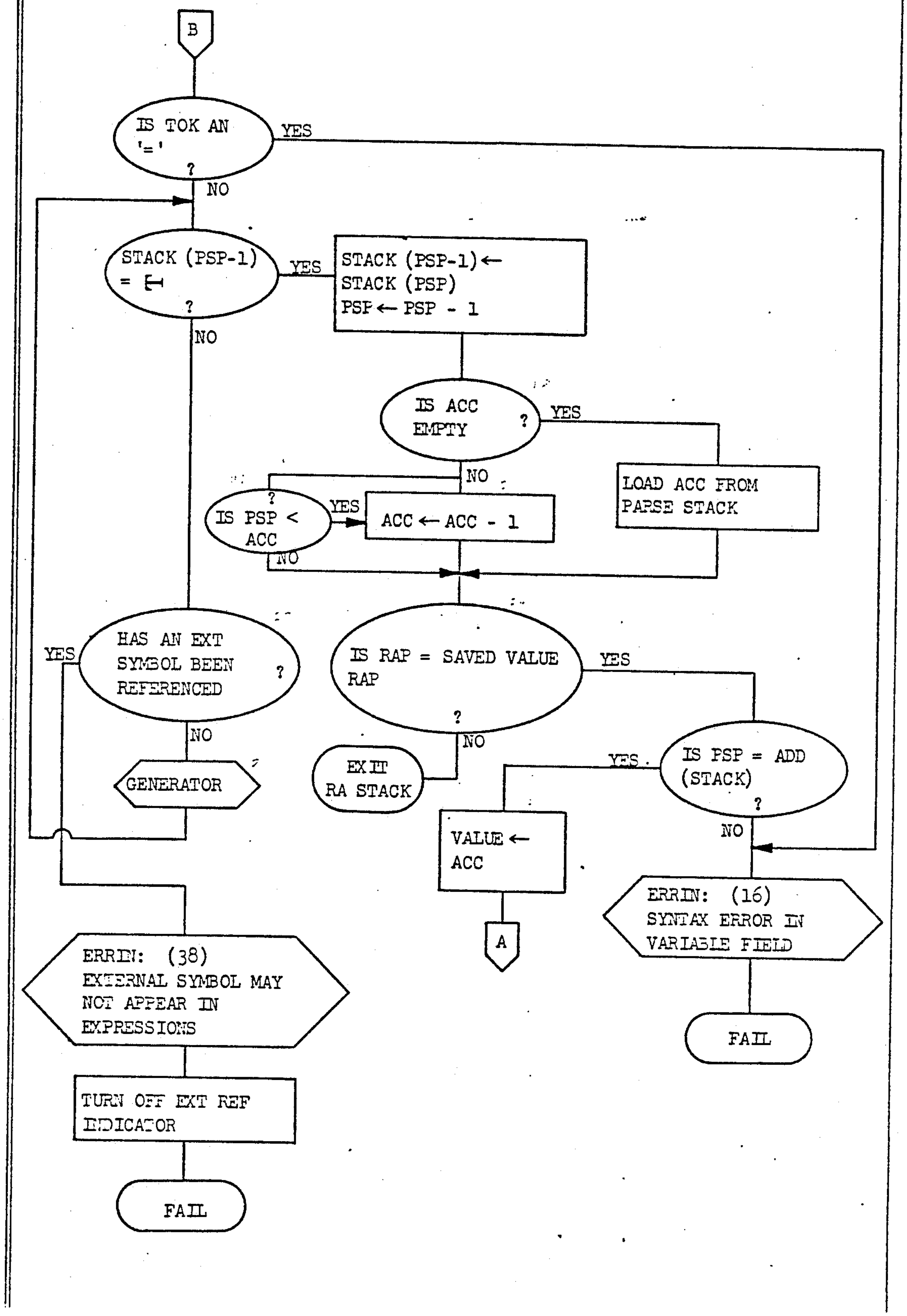

EX1

| | |
|---|---|
| Type | Recursive Subroutine |
| Function | Recursive descent portion of expression parse. |
| Availability | Relocatable area. |
| Use | Call EX1 |
| Subprograms Called | PSHRA, TOKEN, ERRIN, FAIL, POPRA |
| Remarks | Routine uses both the parse stack and return address stack. The registers are not saved. |
| Flow Chart | Described in TABLE XXIVe |

GENRA

| | |
|---|---|
| Type | Nonrecursive Subroutine |
| Function | Expression evaluation. Companion to EXPRN. GENRA is called from the expression parse to evaluate a term or expression. It consists of 2 basic parts: ADD/SWB generator and MUL/DIV generator. |
| Availability | Relocatable area. |
| Use | Call GENRA |
| Subprograms Called | ERRIN, FAIL |
| Remarks | Relocation errors are detected. A pseudo accumulator ACC is used in conjunction with the parse stack in the expression evaluation process. No registers are saved. |
| Flow Chart | Described in TABLE XXIVf |

TABLE XXIVe
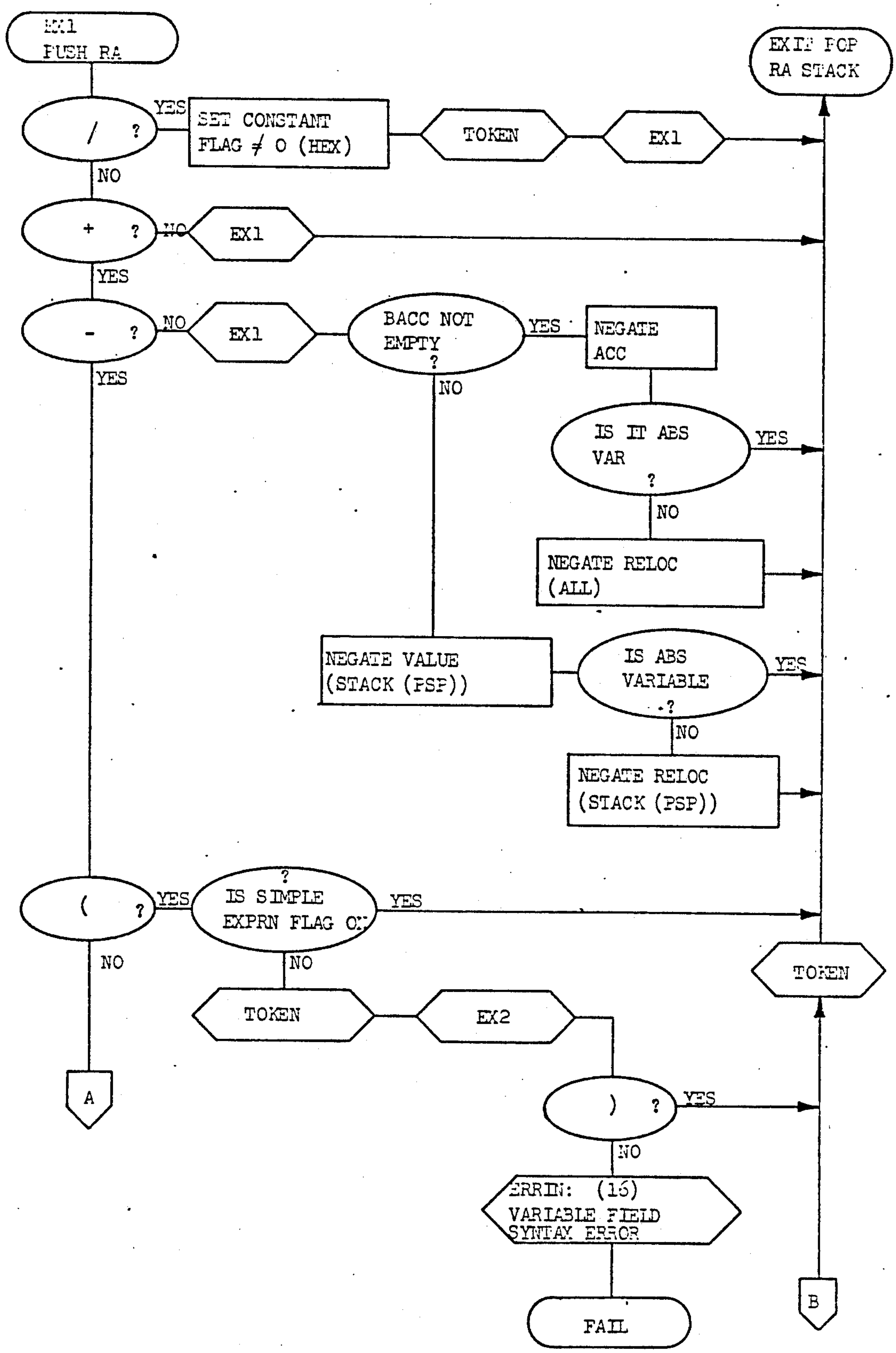

TABLE XXIVe (cont'd)
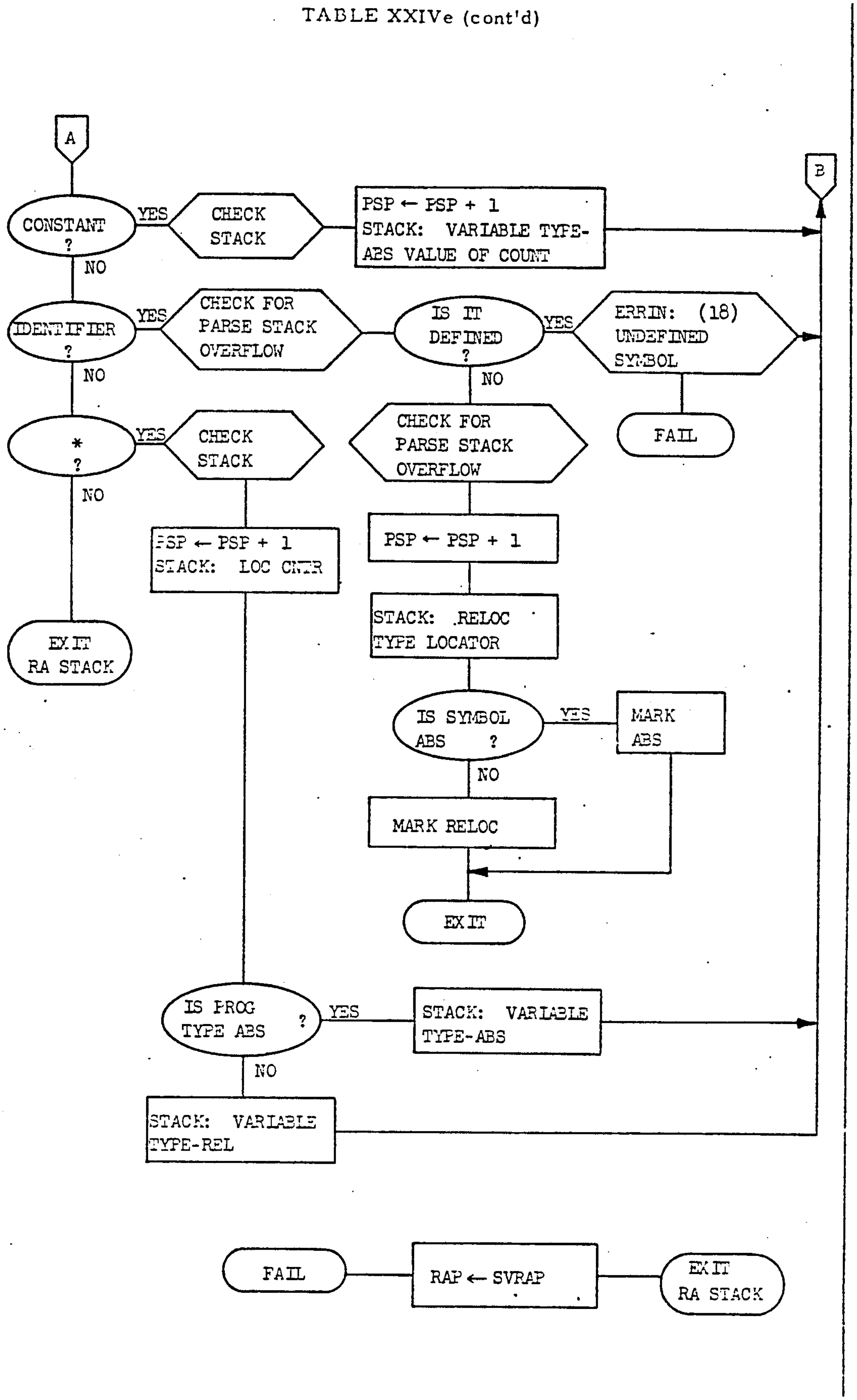

TABLE XXIVe (cont'd)
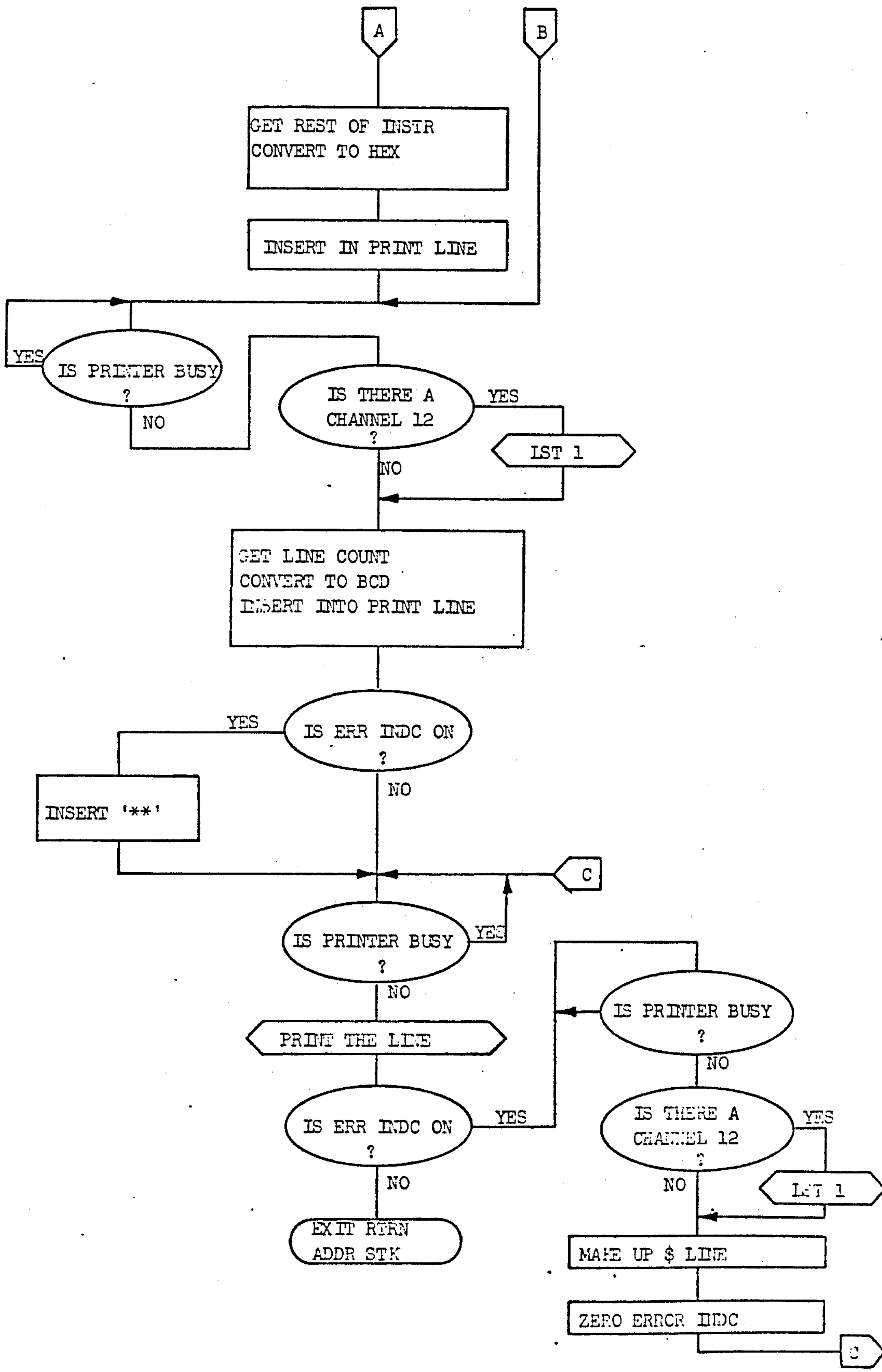

TABLE
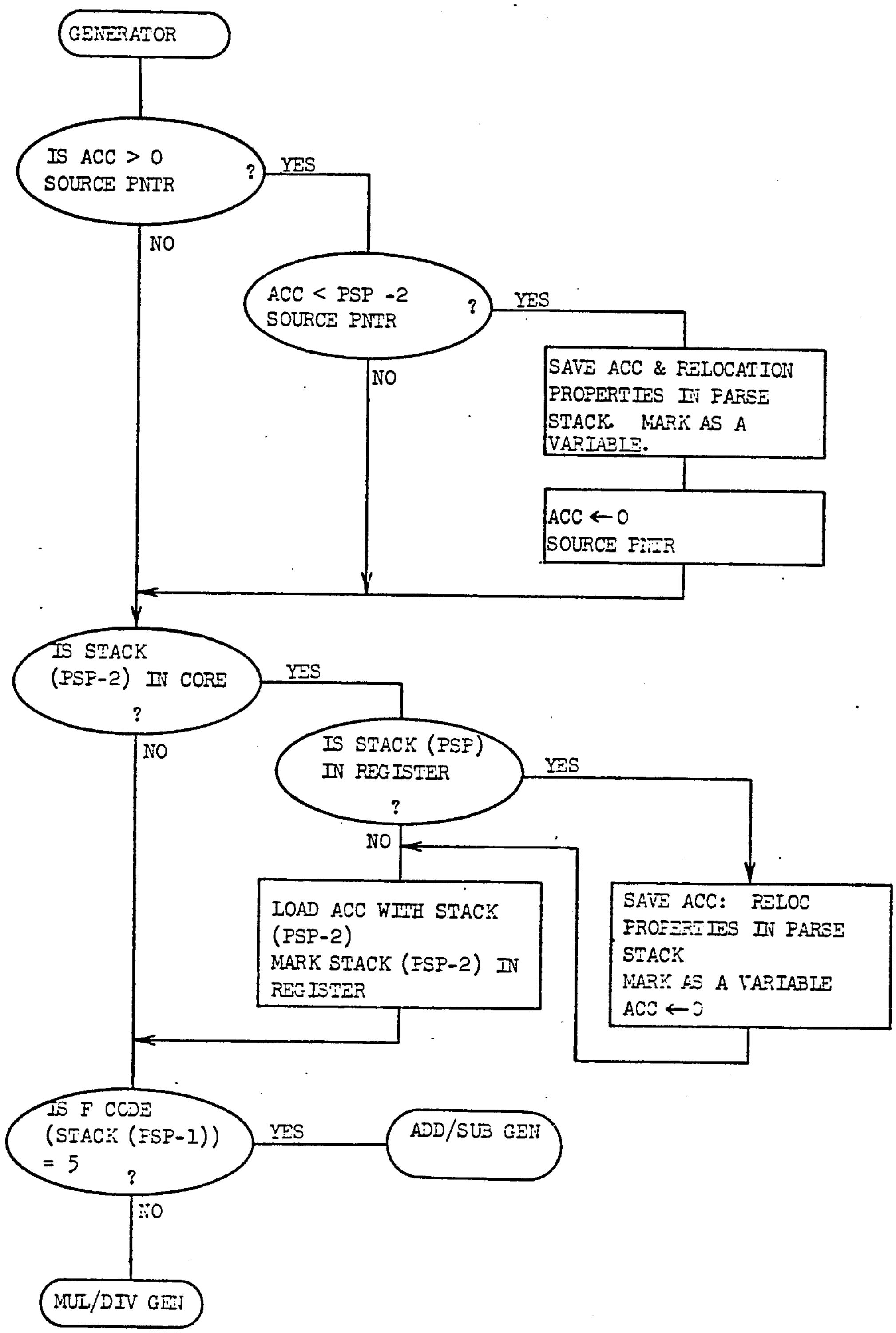

TABLE XXIVf (cont'd)
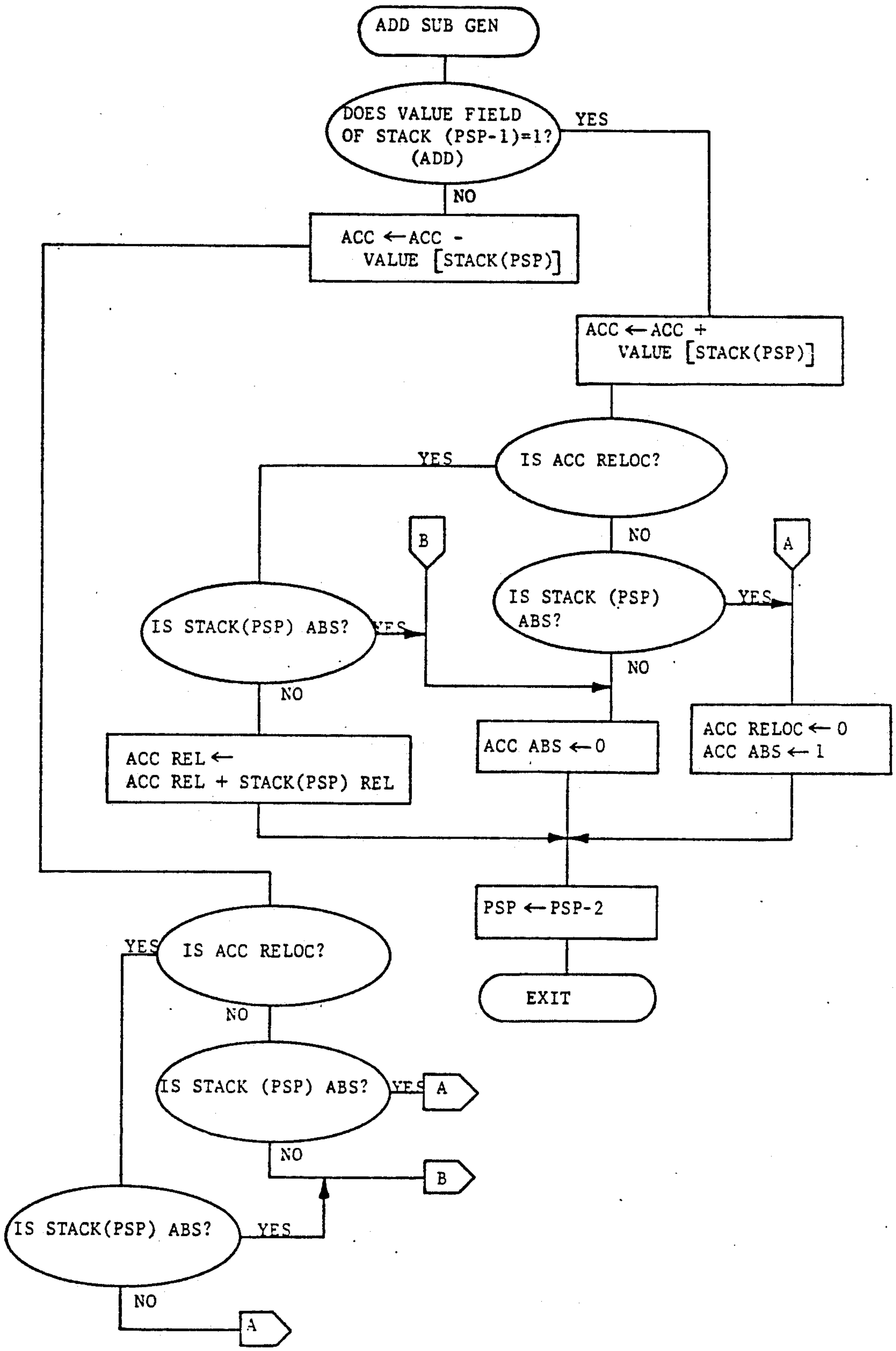

TABLE XXIVf (cont'd)
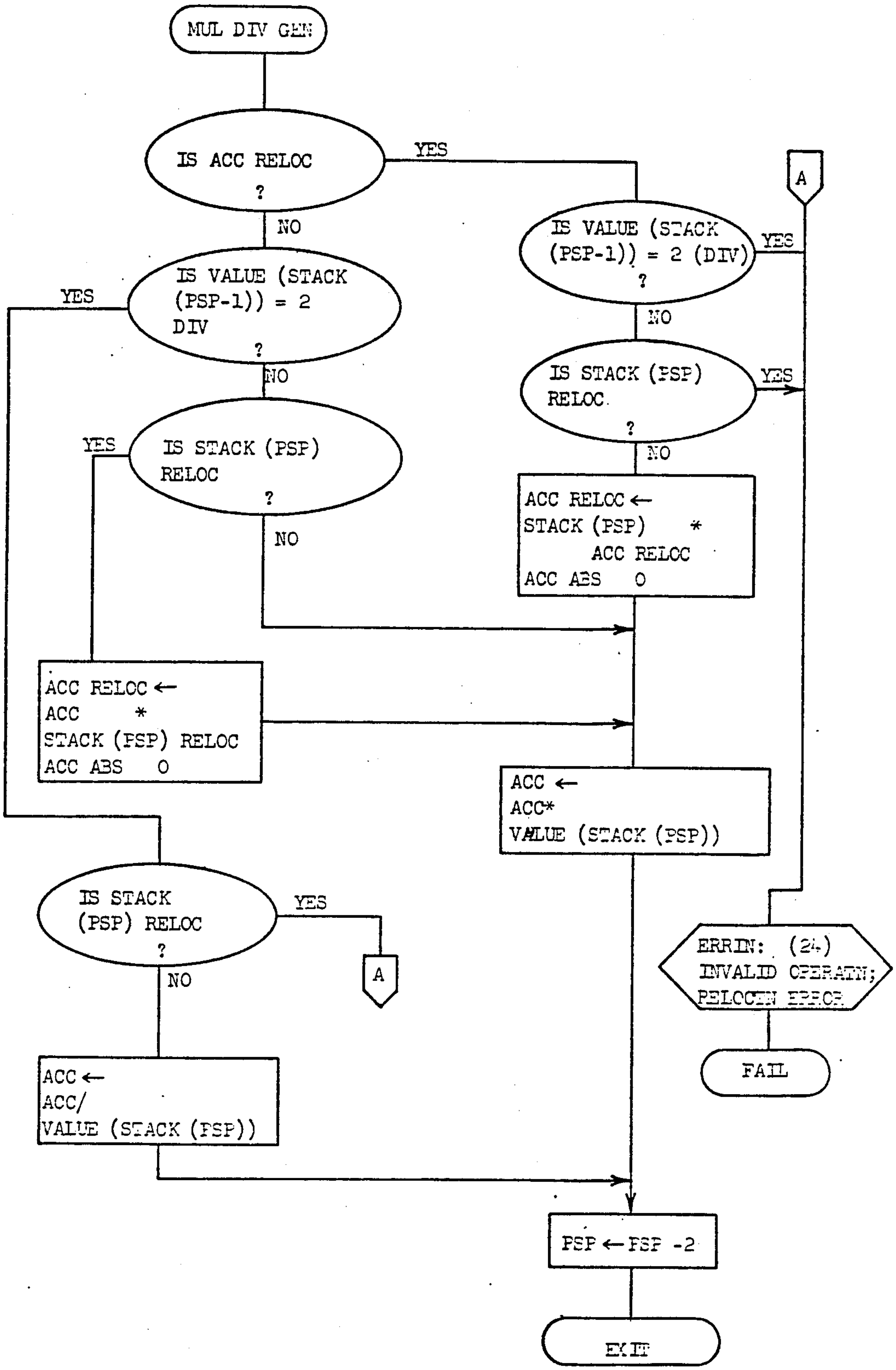

INSP2

| | |
|---|---|
| Type | Nonrecursive Subroutine |
| Function | Prefixes the Pass Two text with a header. |
| Availability | Relocatable area. |
| Use | Call INSP2 |
| Remarks | The header consists of<br>LOC CNTR<br>ERR INDIC/Op Code Num<br>P2 Text Flag/TOK PNTR<br>The routine is called just prior to writing the source text out to disk for use in Pass 2. No registers are saved. |
| Flow Chart | Described in TABLE XXIVg |

WRTP2

| | |
|---|---|
| Type | Nonrecursive Subroutine |
| Function | Buffers pass 2 text to 2310 disk. |
| Availability | Relocatable area. |
| Use | Call WRTP2 |
| Subprograms called | DISKN, MOVE |
| Remarks | A 322 word (320 data words) buffer named IDISK is the working buffer. 320 word physical records are written sequentially. No registers are saved. |
| Limitations | A 40 word logical record is expected. |
| Flow Chart | Described in TABLE XXIVh |

TABLE XXIVg
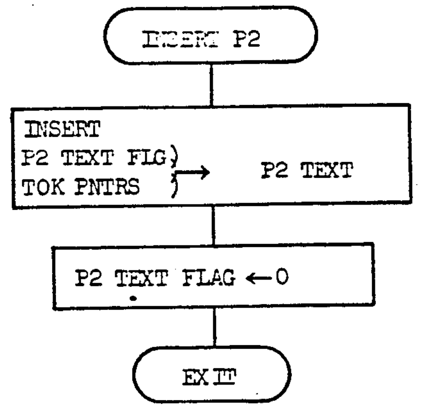
TABLE XXIVh
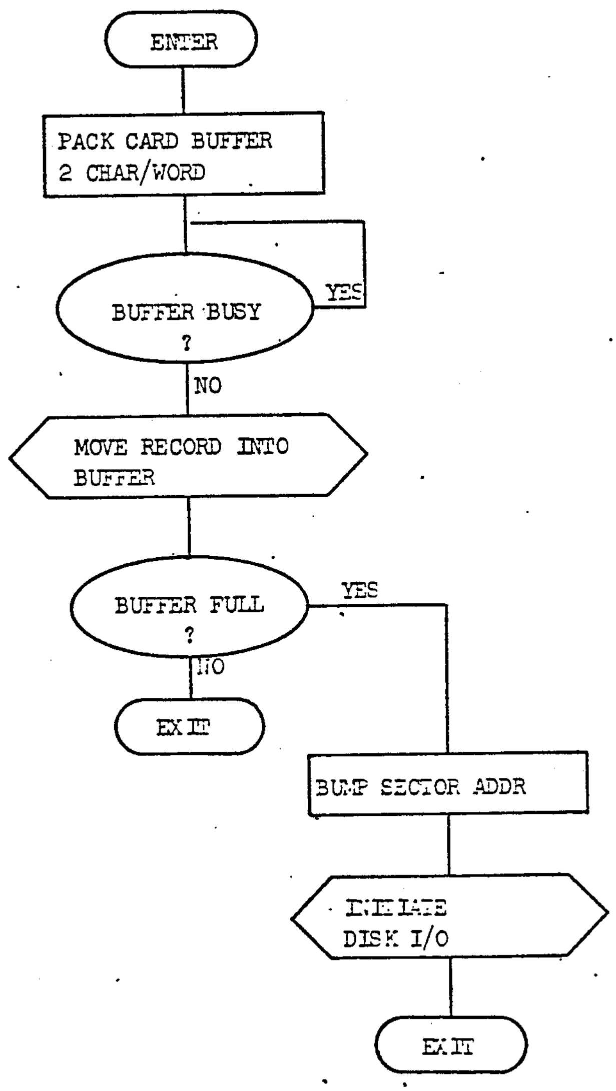

ERRIN

| | |
|---|---|
| Type | Nonrecursive Subroutine |
| Function | Accumulates error messages which will later be printed by EROUT. |
| Use | Call ERRIN<br>DC KCODE KCODE contains an error code. |
| Remarks | An entry in the error table consists of<br>column # / error code<br>line #<br>Both fatal and total error counts are maintained. ERRIN is called from both Pass 1 and Pass 2. No registers are saved. |
| Flow Chart | Described in TABLE XXIVi |

NXEDT

| | |
|---|---|
| Type | Nonrecursive Subroutine |
| Function | During the editing process and after each edit is made, a new edit vector is set up. |
| Availability | Relocatable area. |
| Use | Call NXEDT |
| Remarks | After the last edit is accomplished, the edit flag is turned off. No registers are saved. |
| Flow Chart | Described in TABLE XXIVj |

TABLE XXIVi
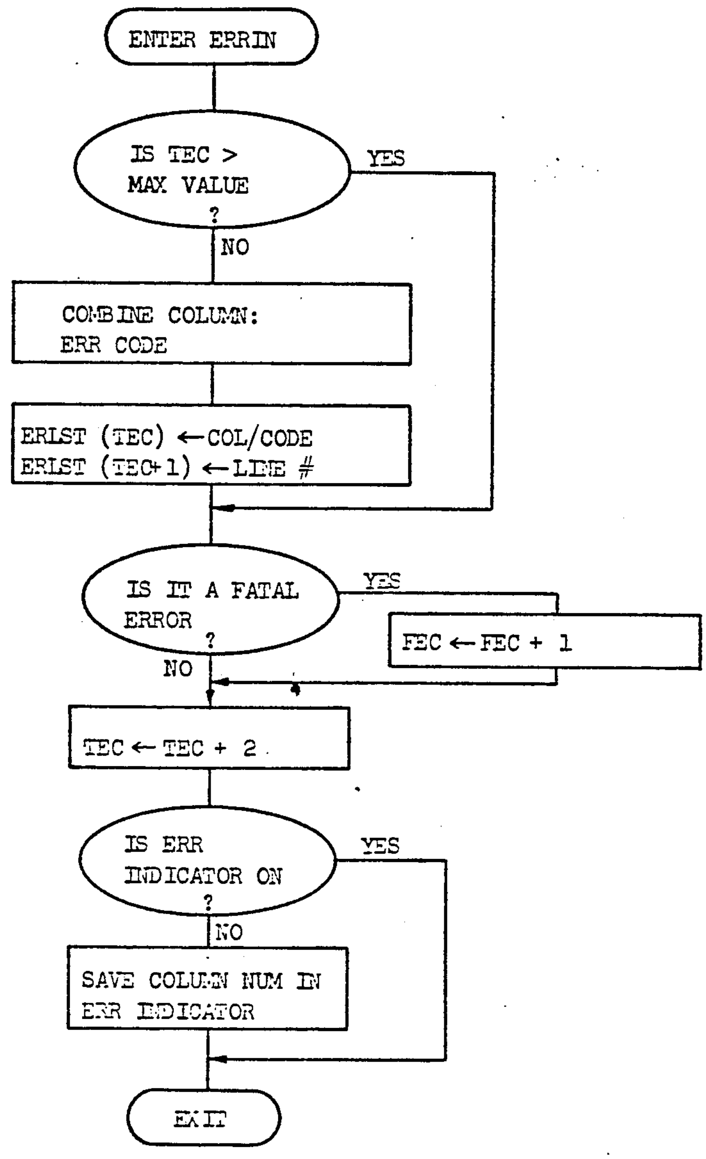

TABLE XXIVj
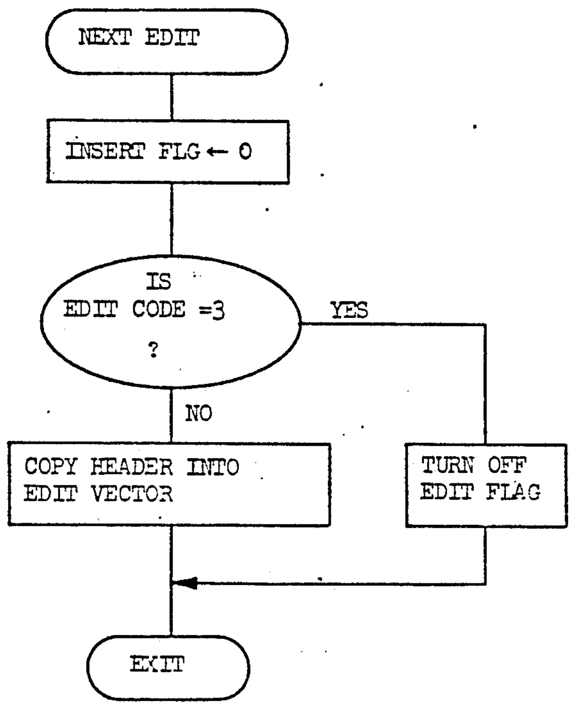

SAVEC

| | |
|---|---|
| Type | Nonrecursive Subroutine |
| Function | Buffers edit cards to the 2310 disk file EDIT. |
| Availability | Relocatable area. |
| Use | Call SAVEC |
| Subprograms called | DISKN, MOVE, ERRIN |
| Files referenced | EDIT |
| Core Loads Called | EPLOG |
| Remarks | Eight card images are blocked per sector. Edit file overflow is checked; and if it occurs, a call to EPLOG is executed. No registers are saved. |
| Flow Chart | Described in TABLE XXIVk |

COMPS

| | |
|---|---|
| Type | Nonrecursive Subroutine |
| Function | Maps five EBCDIC characters into right justified name code (30 bits). |
| Availability | Relocatable area. |
| Use | Call COMPS<br>DC ENAME 5 EBCDIC characters<br>DC NAME Resultant packed code. |
| Remarks | The reverse transformation is SPMOC. |
| Flow Chart | Described in TABLE XXIVl |

TABLE XXIVk
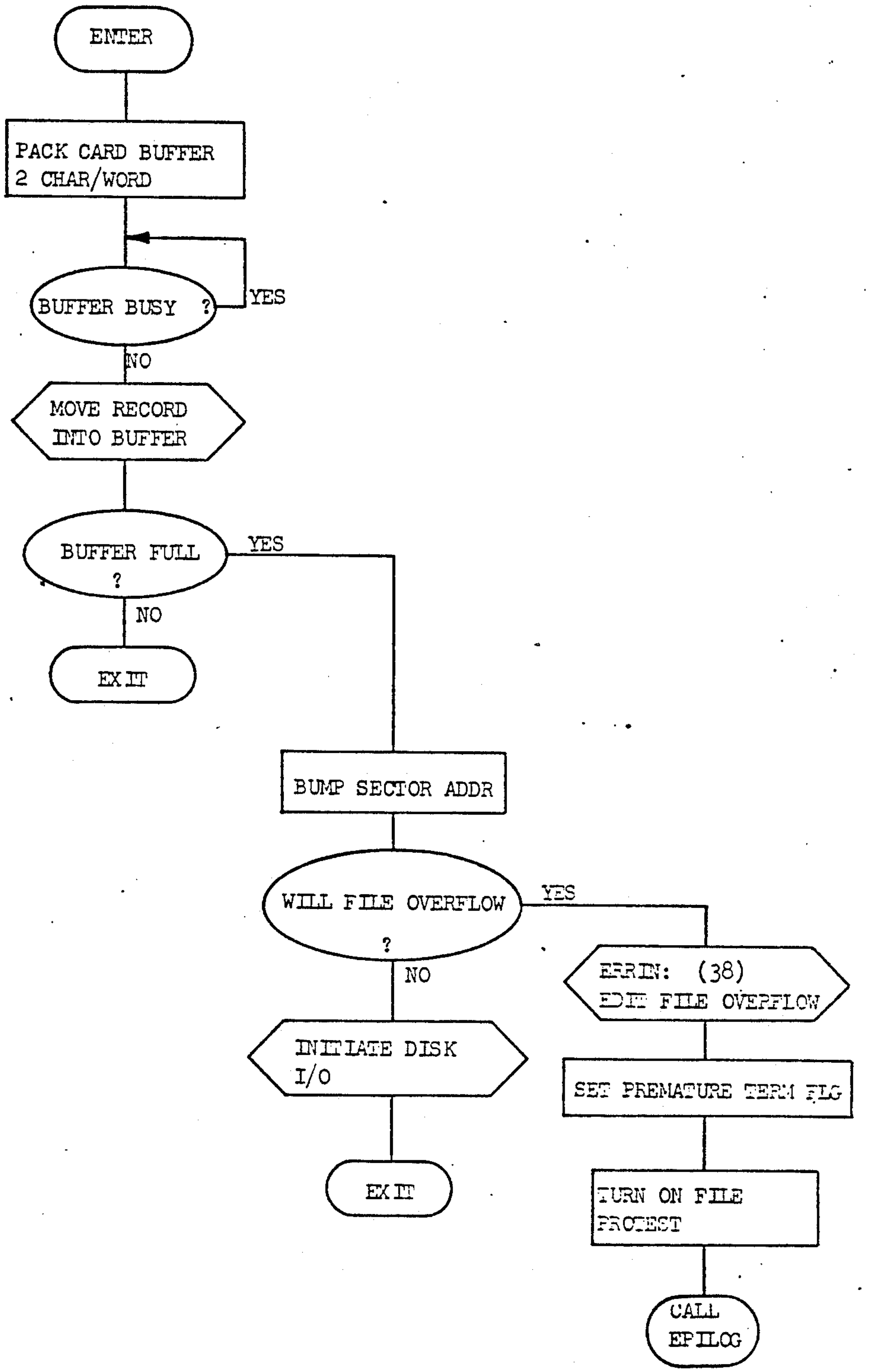

TABLE XXIVl
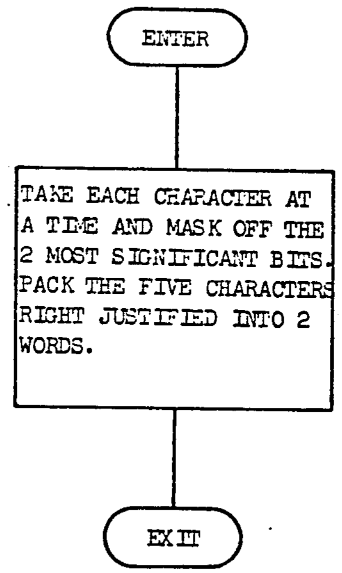
TABLE XXIVm
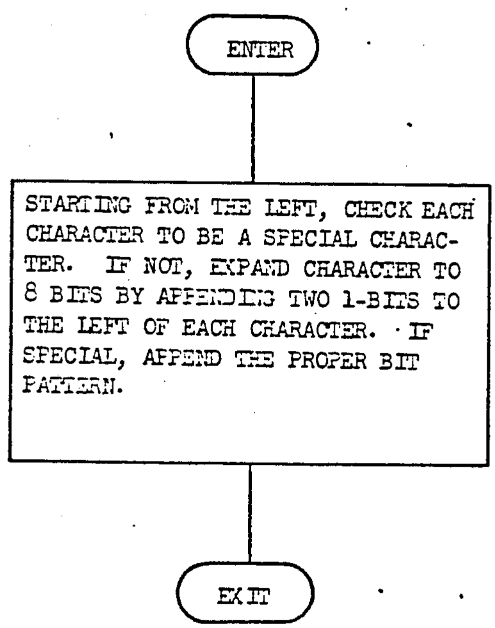

SPMOC

| | |
|---|---|
| Type | Nonrecursive Subroutine |
| Function | Maps right justified name code into 5 EBCDIC characters. |
| Availability | Relocatable area |
| Use | Call SPMOC<br>DC NAME Name code<br>DC ENAME 5 character EBCDIC |
| Remarks | The reverse transformation is COMPS. |
| Flow Chart | Described in TABLE XXIVm |

HASH

| | |
|---|---|
| Type | Nonrecursive Subroutine. |
| Function | Generates a hash number of a symbol. |
| Availability | Relocatable area. |
| Use | XR2 points to first word of symbol<br>Call HASH<br>ACC returns hash number. |
| Remarks | Algorithm described in January, 1968 issue of 'Communications of the ACM' entitled 'An Improved Hash Code for Scatter Storage', by W. D. Maurer. |
| Limitations | The hash code is generated for two words pointed to by XR2. |
| Flow Chart | Described in TABLE XXIVn |

TABLE XXIVn
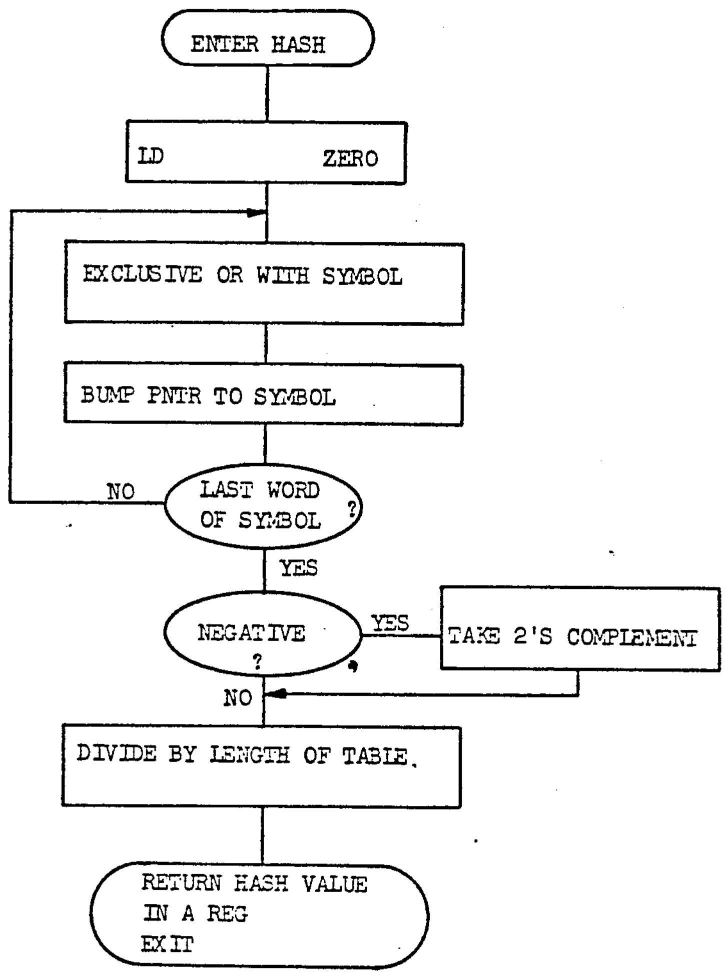

FXHAS

| | |
|---|---|
| Type | Nonrecursive Subroutine |
| Function | Searches a hash chain to determine if a symbol resides in the symbol table. |
| Availability | Relocatable area. |
| Use | Hash number in ACC<br>XR2 pointing to symbol<br>Call FXHAS<br>Present return<br>Not present return |
| Remarks | On "not present" return XR1 points to the hash link of the preceding chain item. On "present" return XR1 points to the hash link of the entry just found. No registers are saved. |
| Flow Chart | Described in TABLE XXIV. |

TABLE XXIVo
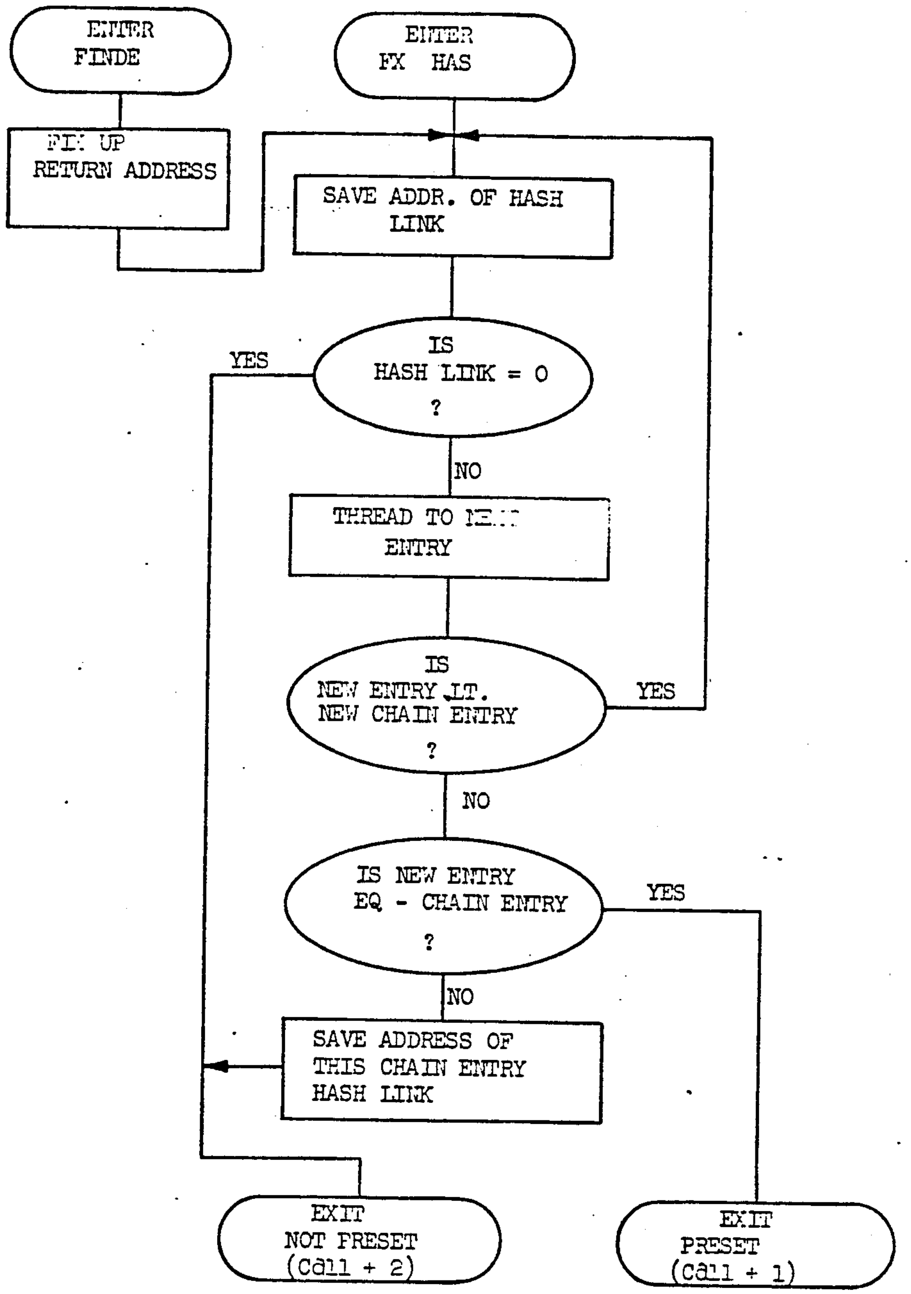

INSYM/ERINS

| | |
|---|---|
| Type | Nonrecursive Subroutine |
| Function | Creates a BCD entry in symbol table. |
| Availability | Relocatable area. |
| Use | XR1 points to hash link of prceding entry in the hash chain. XR2 points to the symbol character string (name code)<br>Call INSYM<br>ACC returns a pointer to new symbol. |
| Subprograms called | ERRIN |
| Core Loads called | EPLOG |
| Remarks | Symbol table overflow is checked, and if it occurs, EPLOG is called. ERINS is a secondary entry point that accomplishes the call to EPLOG. No registers are saved. |
| Flow Chart | Described in TABLE XXIVp |

TABLE XXIVp
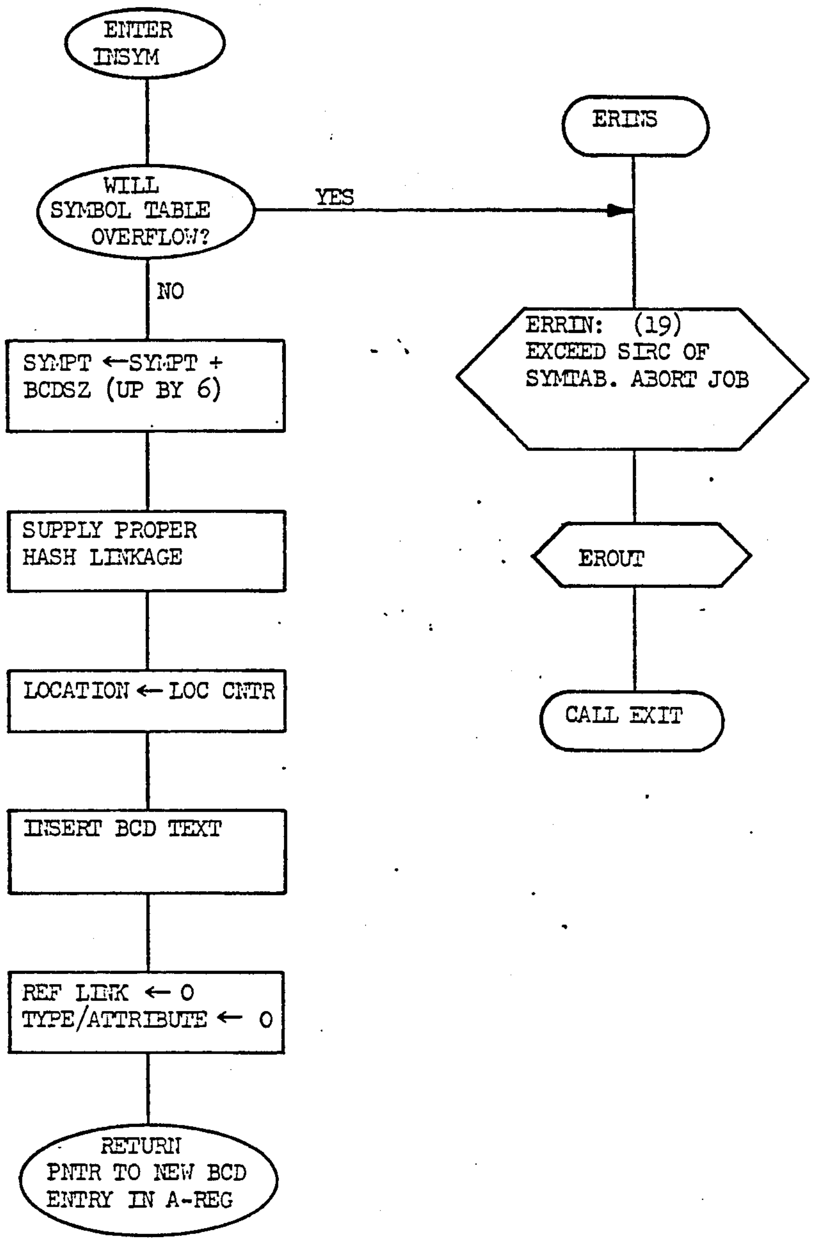

REFR

| | |
|---|---|
| Type | Nonrecursive Subroutine |
| Function | Creates references to symbols and maintains the reference chain whose head resides in the symbol table entry of the symbol referenced. |
| Available | Relocatable area. |
| Use | ACC contains pointer to the symbol table entry<br>Call REFR |
| Remarks | References are pushed down on the reference chains. The definition is maintained as the last entry on the chain. Symbol table overflow is checked. No registers are saved. |
| Flow Chart | Described in TABLE XXIVq |

TESTL

| | |
|---|---|
| Type | Nonrecursive Subroutine |
| Function | Tests for a labeled statement. If labeled, a non-terminating error is generated, and the label is purged from the symbol table. |
| Availability | Relocatable area. |
| Use | Call TESTL |
| Remarks | Routine is called for statements that must not have labels. |
| Flow Chart | Described in TABLE XXIVr |

TABLE XXIVq
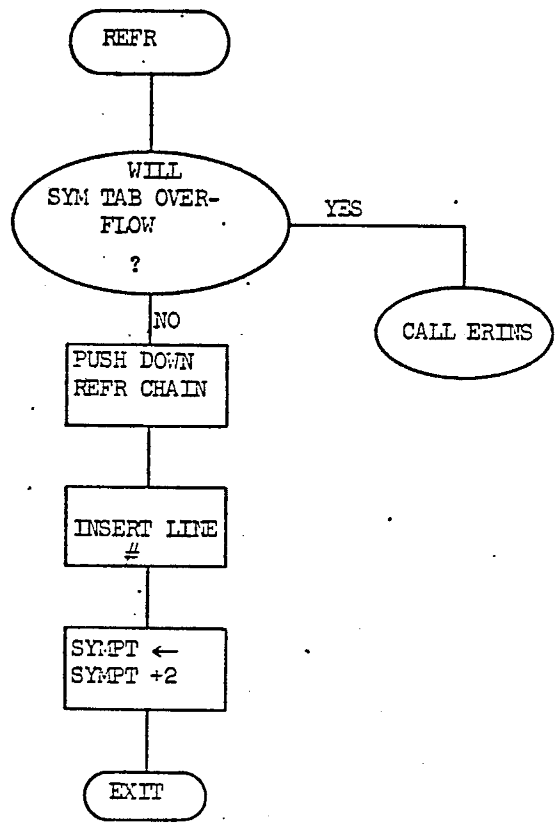

TABLE XXIVr
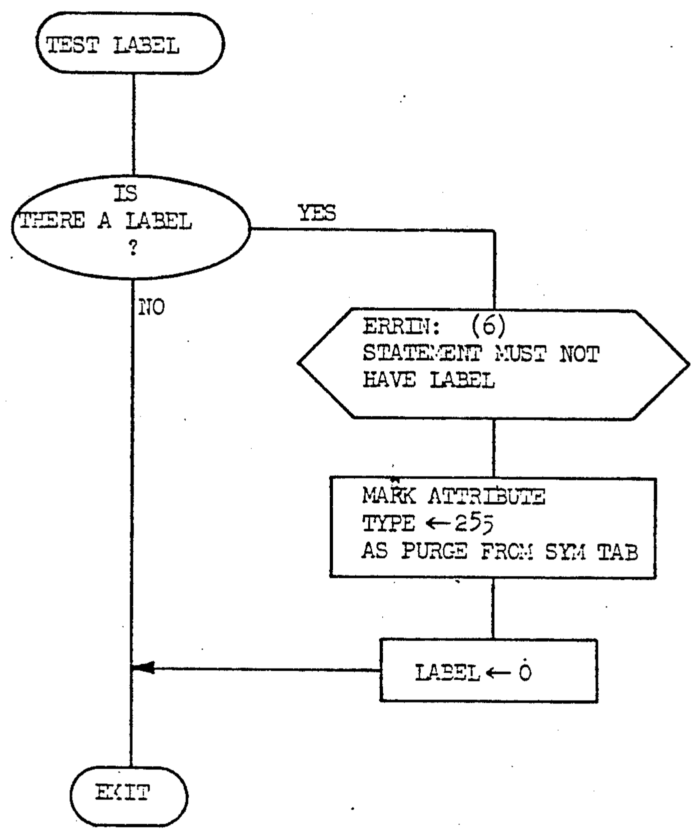

CHEKC

| | |
|---|---|
| Type | Nonrecursive Subroutine |
| Function | Checks to see if core size has been exceeded. Also records the lower and upper boundaries of the program. |
| Availability | Relocatable area. |
| Use | Call CHEKC |
| Flow Chart | Described in TABLE XXIVs |

GETNF

| | |
|---|---|
| Type | Nonrecursive Subroutine |
| Function | Calls taken discarding blanks until a non blank taken is found. |
| Availability | Relocatable area. |
| Use | Call GETNF<br>error return |
| Subprograms called | TOKEN, ERRIN |
| Remarks | If the end of the card is detected before finding a non blank token, a syntax error message is generated. |
| Flow Chart | Described in TABLE XXIVt |

TABLE XXIVs
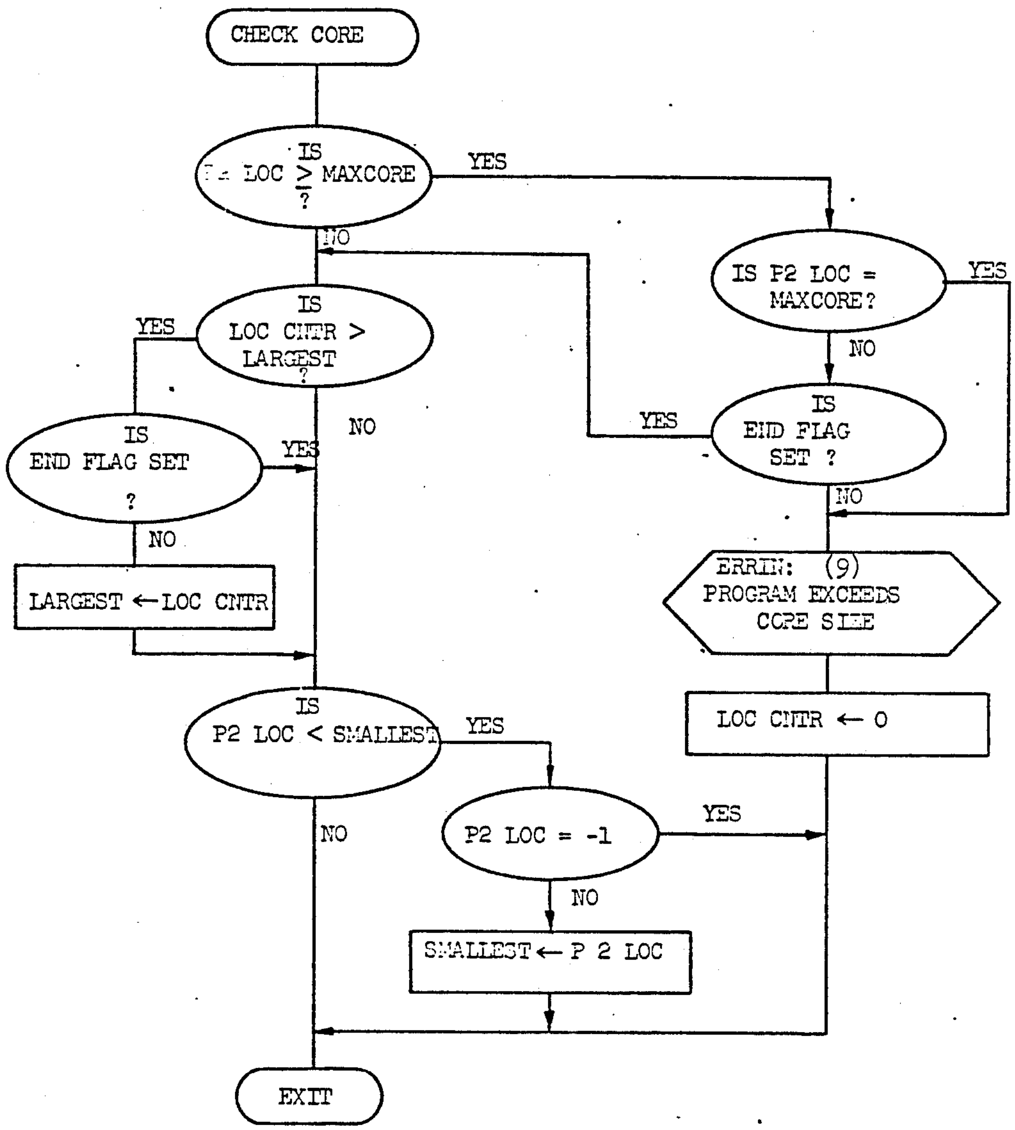

TABLE XXIVt
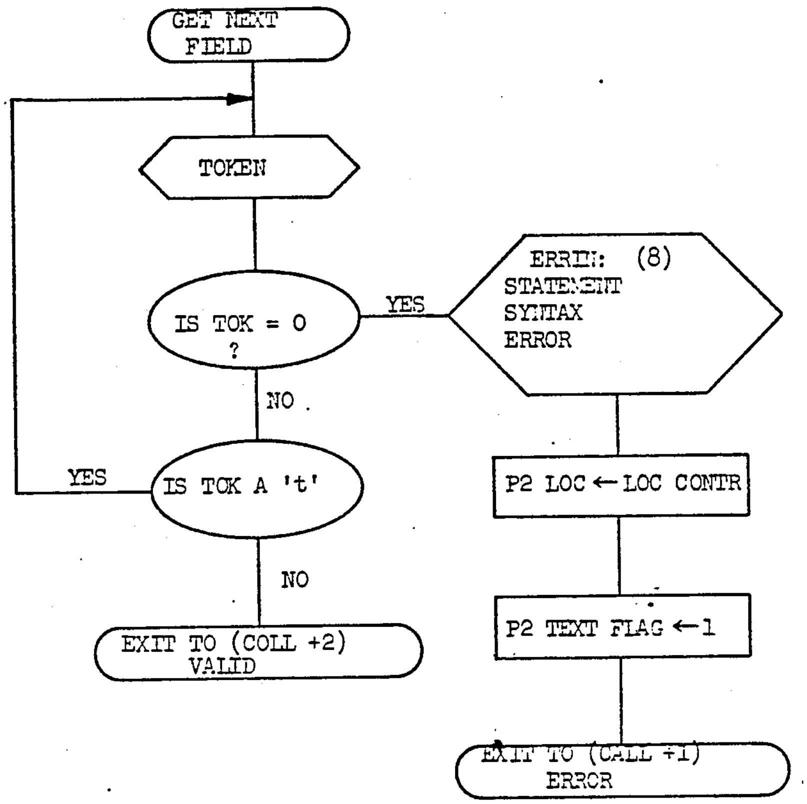

SVEXT

| | |
|---|---|
| Type | Nonrecursive Subroutine |
| Function | Creates an entry in the external reference list for each external reference encountered. |
| Availability | Relocatable area. |
| Use | Call SVEXT |
| Subprograms called | ERRIN |
| Remarks | If the maximum number of external references is exceeded, a non fatal error is created and the reference not stored. ACC is returned = 0 if successful; ACC = 1 otherwise. No registers are saved. |
| Flow Chart | Described in TABLE XXIVu |

MOVE

| | |
|---|---|
| Type | Nonrecursive Subroutine |
| Function | Move data storage to storage. |
| Availability | Relocatable area. |
| Use | XR1 points to source.<br>XR2 points to destination.<br>XR3 contains a word count.<br>Call MOVE. |
| Remarks | A call of zero word count does nothing. Registers are returned in their final state after the move is performed. |
| Limitations | Maximumblock that may be moved per call is 32767 words. |
| Flow Chart | Described in TABLE XXIVv |

TABLE XXIVu
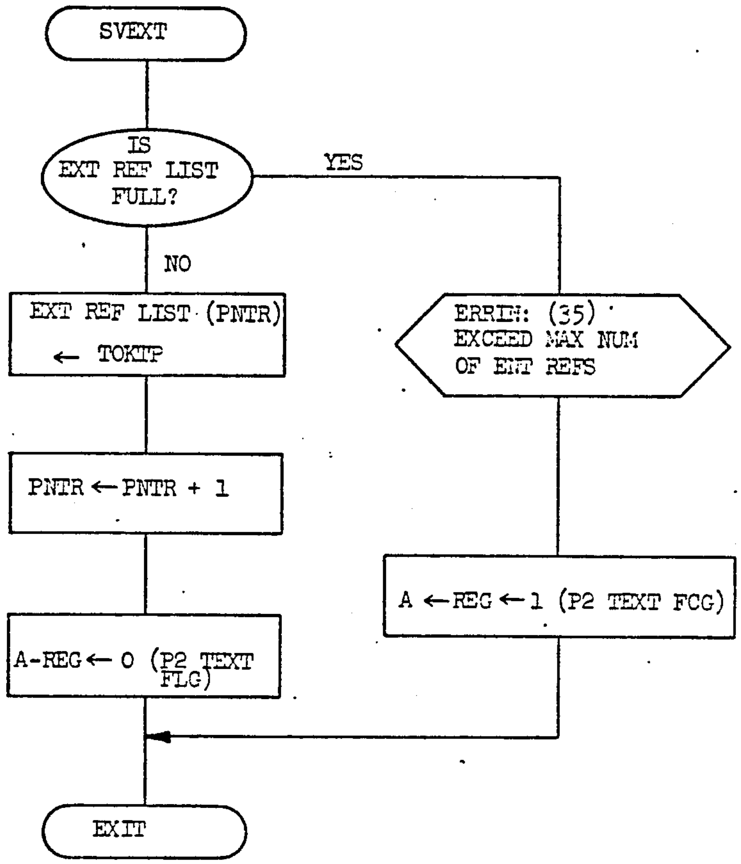

TABLE XXIVv
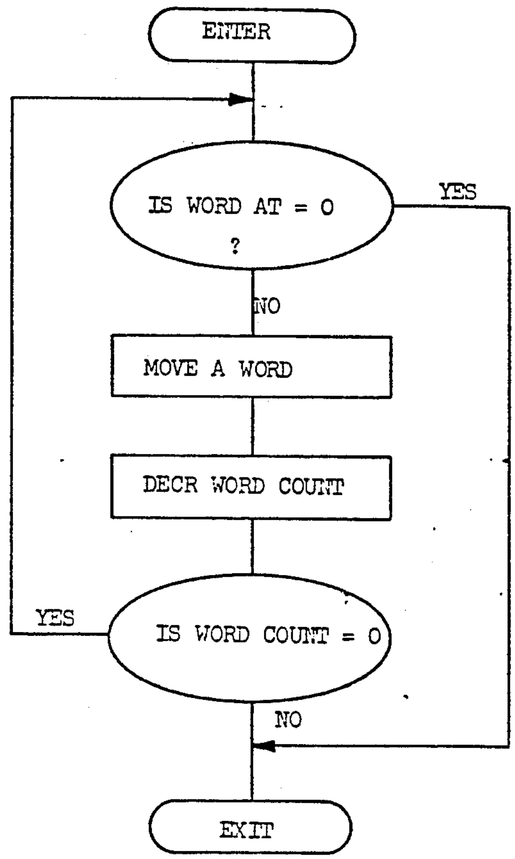

WRTOB

| | |
|---|---|
| Type | Nonrecursive Subroutine |
| Function | Routine buffers object code to the 2310 disk non process working storage. |
| Availability | Relocatable Area |
| Use | XR1 is set to source. XR3 contains the word count. |
| Subprograms called | MOVE, DISKN |
| Remarks | Sectors are written sequentially. |
| Flow Chart | Described in TABLE XXIVw |

FTCH2

| | |
|---|---|
| Type | Nonrecursive Subroutine |
| Function | Reads Pass 2 text from 2310 disk for Pass 2 processing. |
| Availability | Relocatable area. |
| Use | Call FTCH2 |
| Subprograms called | MOVE, DISKN |
| Remarks | The card image is unpacked to one character per word in the card area. No registers are saved. |
| Flow Chart | Described in TABLE XXIVx |

TABLE XXIVw
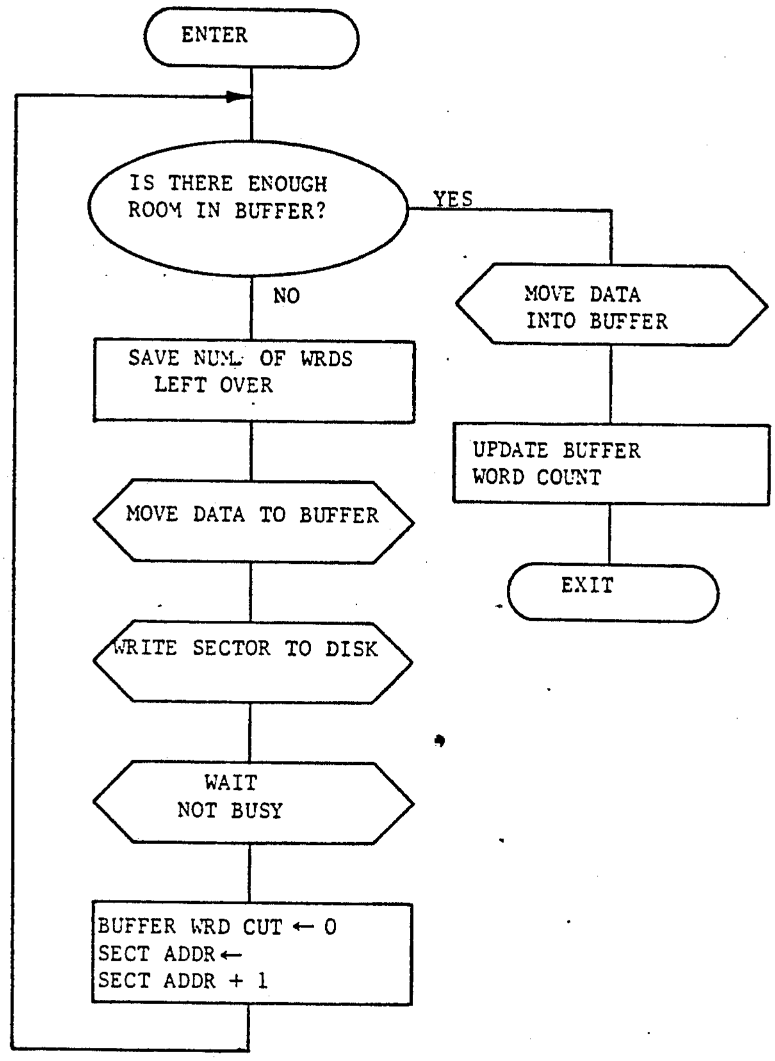

TABLE XXIVx
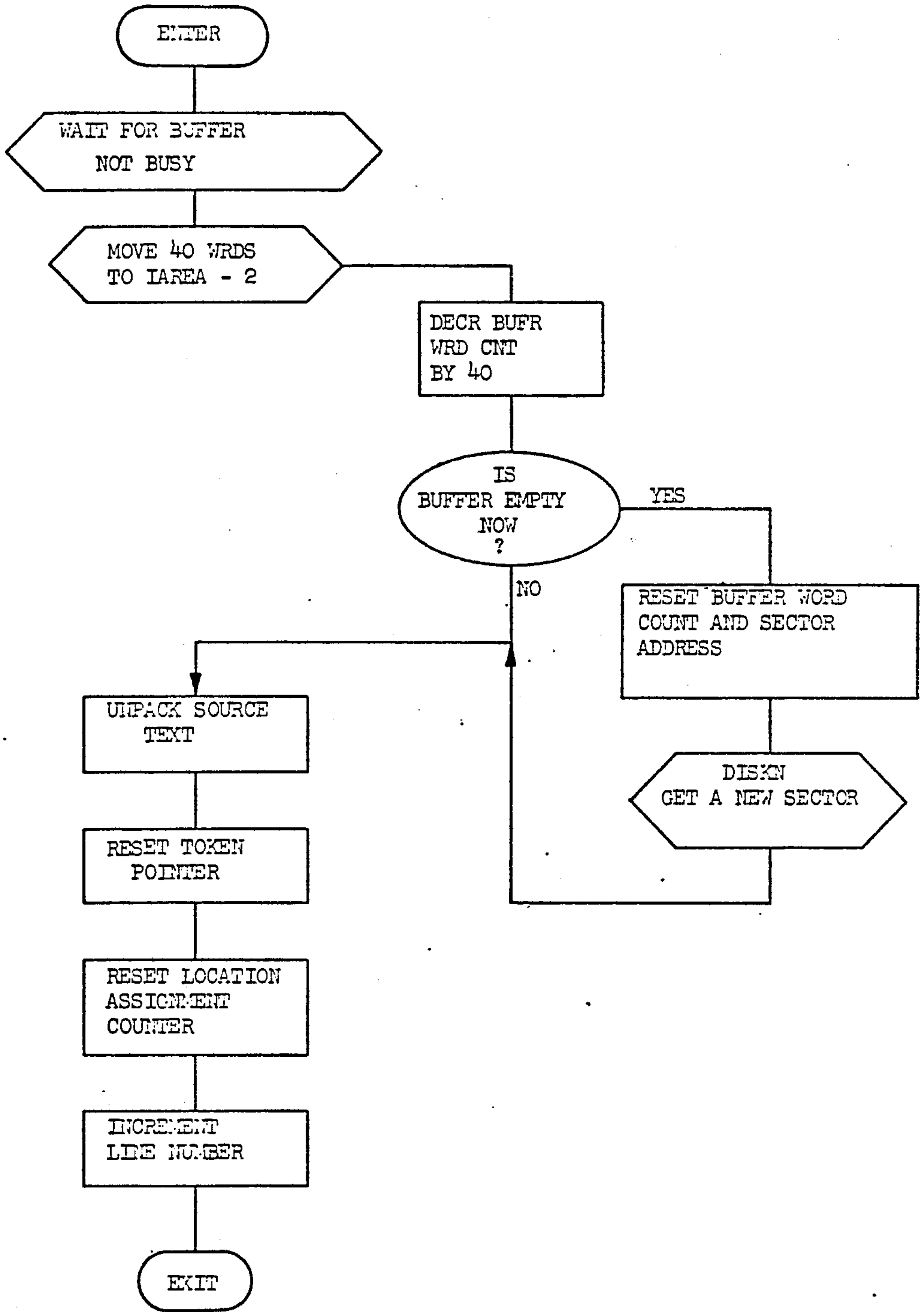

INS

| | |
|---|---|
| Type | Nonrecursive Subroutine |
| Function | Inserts an operand into the next available location on the operand list. |
| Availability | Relocatable area. |
| Use | Call INS |
| Subprograms called | None. |
| Remarks | As a parse routine extracts an operand from the variable field, it calls INS to save the operand in the operand list. No registers are saved. The count of the number of variables referenced is incremented. |
| Flow Chart | Described in TABLE XXIVy |

WRFL/WRTFL

| | |
|---|---|
| Type | Nonrecursive Subroutine |
| Function | Writes the symbol table to the 2310 file specified in ASVSM+1. |
| Availability | Relocatable area. |
| Use | Call WRFL or Call WRTFL |
| Subprograms called | DISKN, PRNTN |
| Remarks | WRFL is called whenever the save symbol table option is specified. WRTFL is called during assembler definition and uses the default file DEFIL. |
| Flow Chart | Described in TABLE XXIVz |

TABLE XXIVy
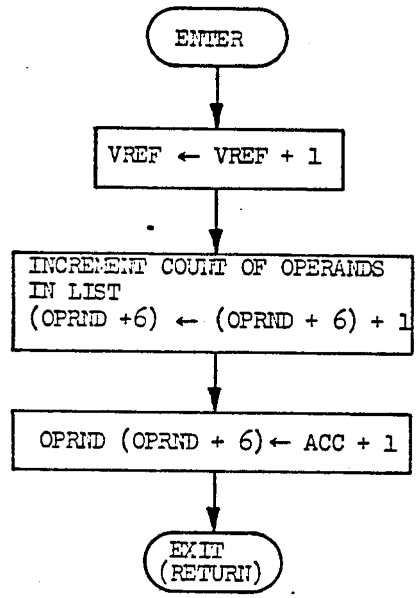
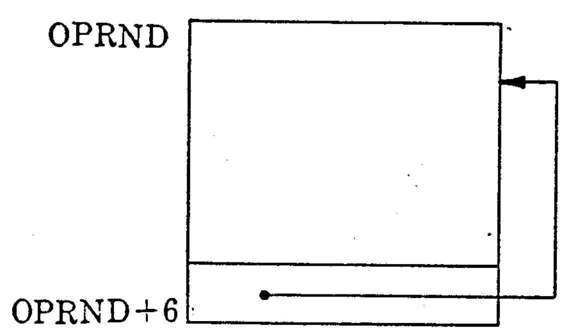

TABLE XXIVz
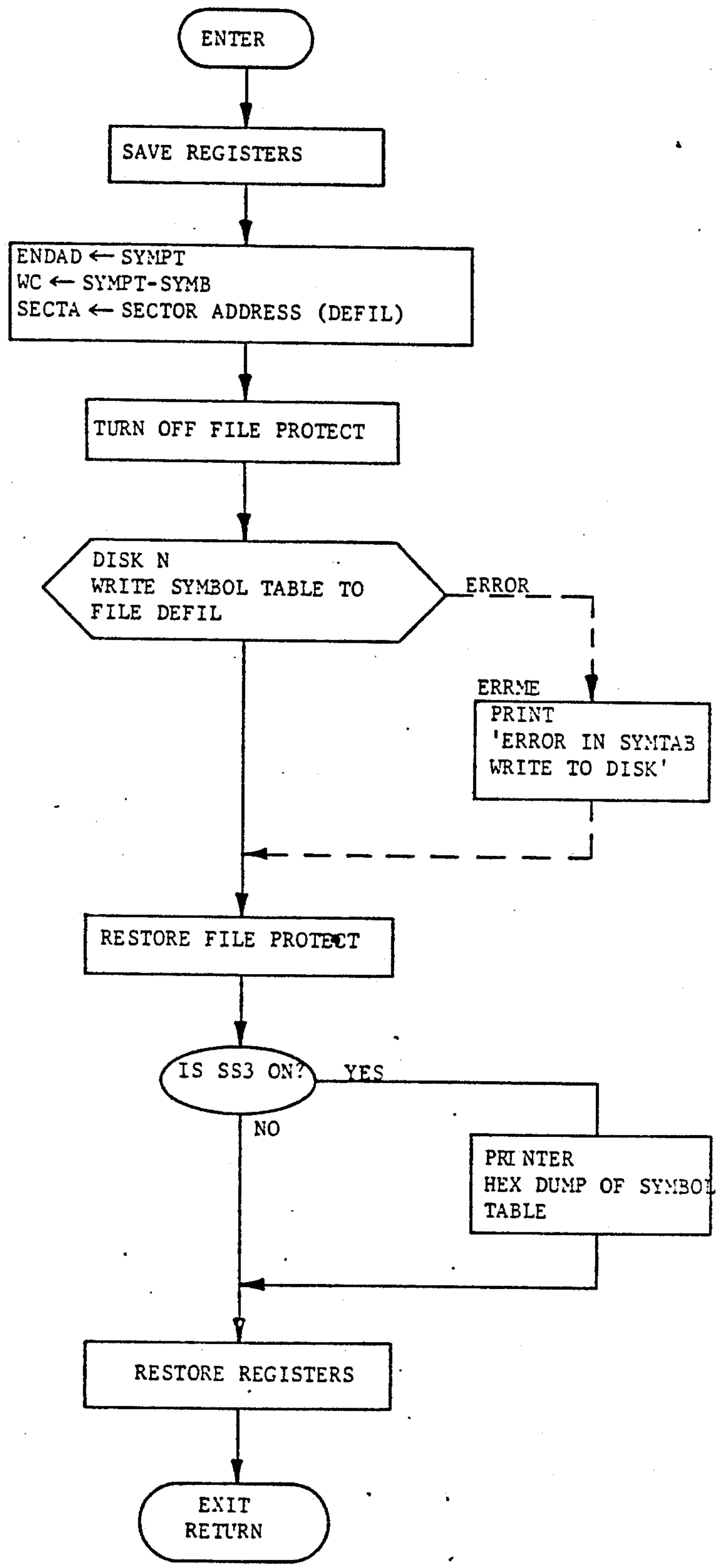

NOTHR

| | |
|---|---|
| Type | Nonrecursive Subroutine |
| Function | Checks if another symbol table entry exists for the same symbol. |
| Availability | Relocatable area. |
| Use | XR1 points to hash link of symbol table entry.<br>Call NOTHR<br>EXIT no other entries<br>EXIT if other entries and XR1 points to the hash link of the new entry. |
| Remarks | A symbol may be used differently in the same assembly as a keyword, an internal symbol, or an external symbol, and a different symbol table entry is created for each use. This routine will find all symbol table entries for a given symbol. No registers are saved. |
| Flow Chart | Described in TABLE XXVa |

STRIK

| | |
|---|---|
| Type | Nonrecursive Subroutine |
| Function | Strikes all reference chains from the symbol table. |
| Availability | Relocatable area. |
| Use | Call STRIK |
| Subprograms called | NEXTH |
| Remarks | When the system symbol table is used in an assembly, it contains the reference chains of the assembly when the save symbol table was executed. These chains are deleted so that only references in this assembly will be remembered. No registers are saved. |
| Flow Chart | Described in TABLE XXVb |

TABLE XXVa
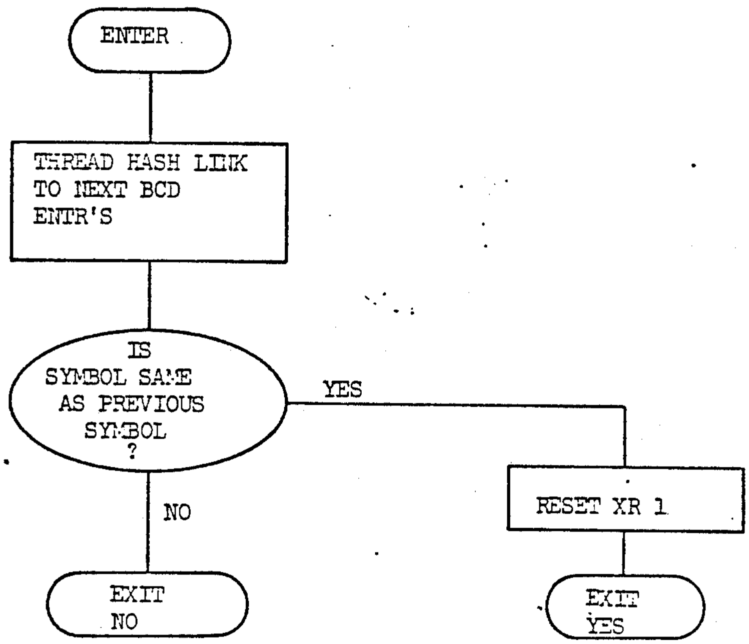

TABLE XXVb
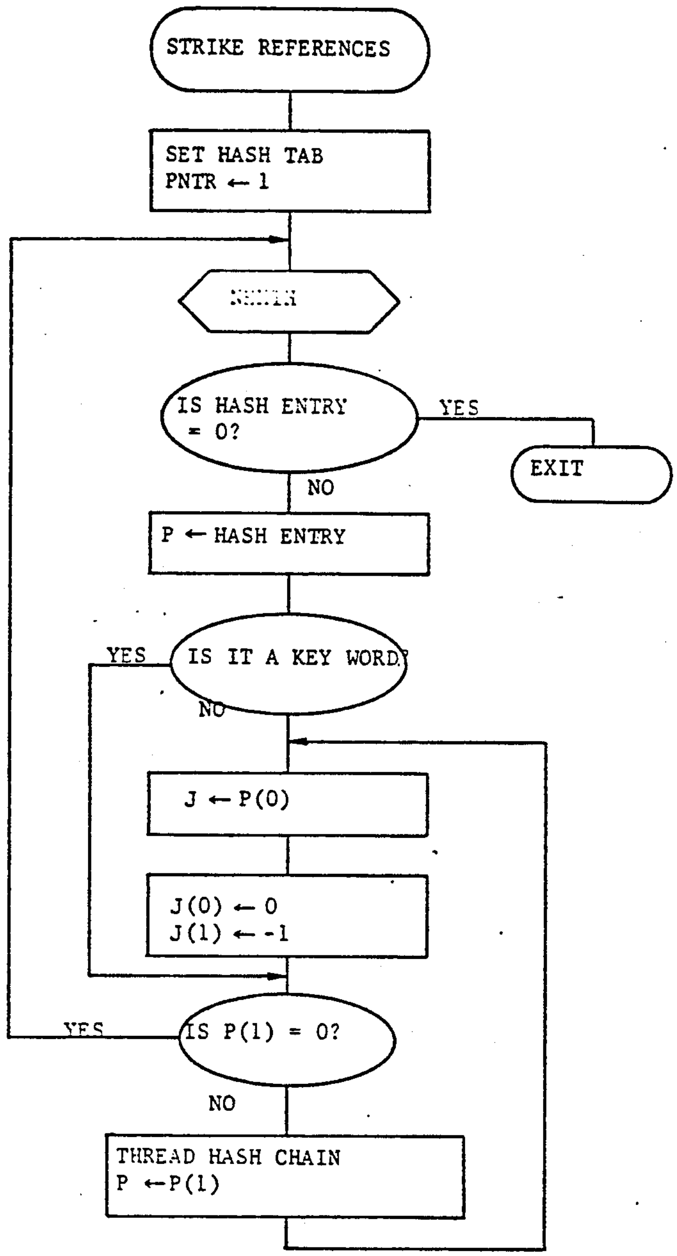

CUTB

| | |
|---|---|
| Type | Nonrecursive Subroutine |
| Function | Performs a fix up of the hash chains in the symbol table. |
| Availability | Relocatable area. |
| Use | Call CUTB |
| Subprograms called | NEXTH |
| Remarks | If a symbol table is used where a prior save symbol table has been executed, the user system symbols will be present on the hash chains. If an assembly is called which does not reference the system symbol table, the symbols which comprise the user system symbol table must be removed. This routine performs the needed garbage collection on the hash chains. No registers are saved. |
| Flow Chart | Described in TABLE XXVc |

NEXTH

| | |
|---|---|
| Type | Nonrecursive Subroutine |
| Function | Finds the head of the next hash chain to be processed |
| Availability | Relocatable area. |
| Use | XR1 points to the next address in the hash table.<br>Call NEXTH<br>ACC contains the head of the hash chain. |
| Remarks | XR1 is used to step through the hash table. Zero hash table entires are discarded, and the A-register returns the head of each hash chain. When the hash table is exhausted, A-register is returned zero. No registers are saved. |
| Flow Chart | Described in TABLE XXVd |

TABLE XXVc
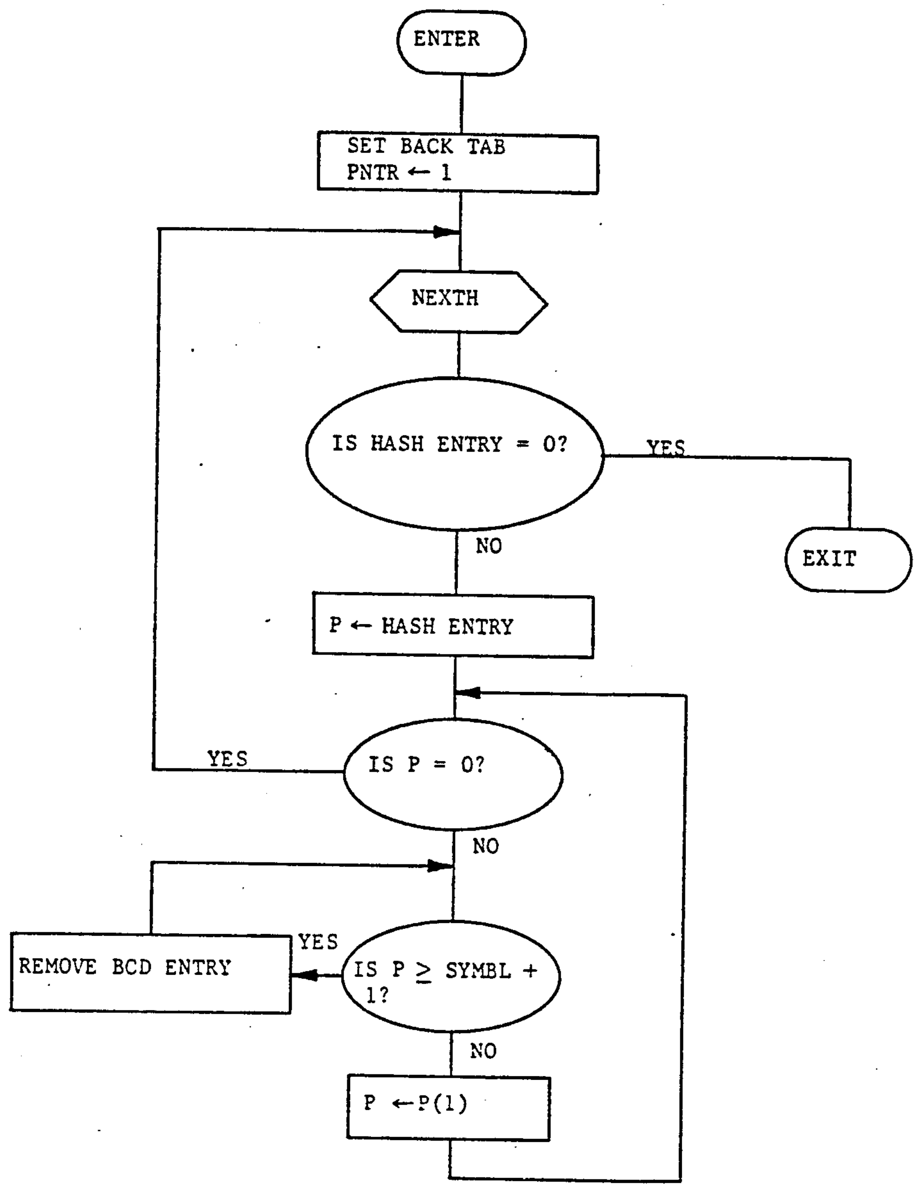

TABLE XXVd
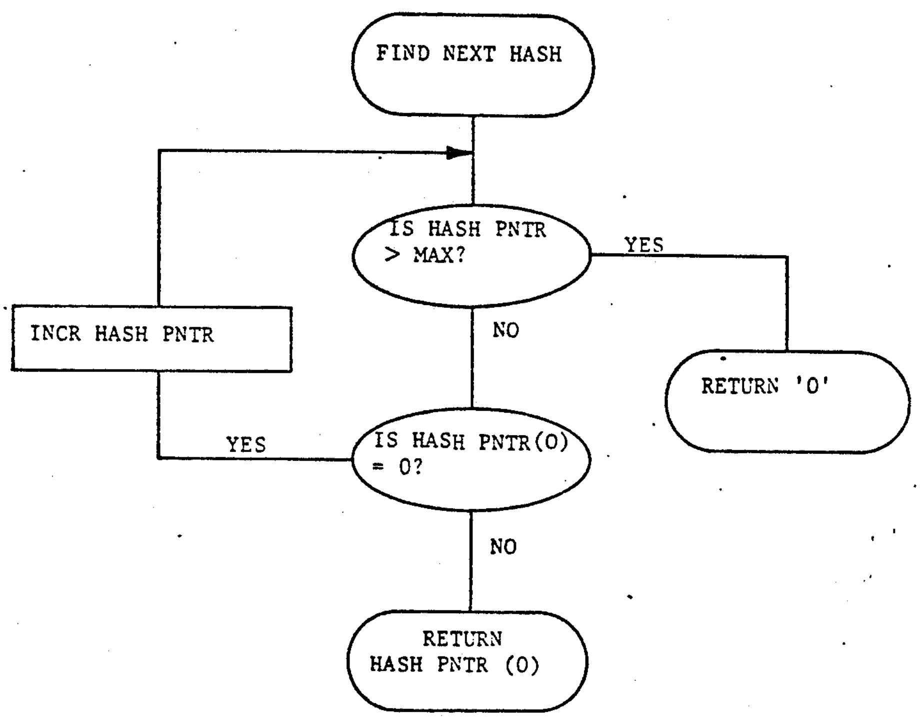

FLTSH

| | |
|---|---|
| Type | Nonrecursive Subroutine |
| Function | Finds disk location of a data file in the fixed area of the 2310. |
| Availability | Relocatable area. |
| Use | Call FLTSH |

```
Call     FLTSH
DC       Name
DC       Data
.
.
Name BSS  E       2  File name in name code
Data BSS          3  Disk location is returned in
*                    DATA +1
```

| | |
|---|---|
| Remarks | The 3 word return in word "DATA" is in the same format as the 1800 DSA statement. |
| Flow Chart | Described in TABLE XXVe |

REPK

| | |
|---|---|
| Type | Nonrecursive Subroutine |
| Function | The subroutine repacks to A2 format (37 words) the first 74 characters of a card image and moves a three word header to words 38-40 of the card image. |
| Availability | Relocatable program area. |
| Use | Call REPK |
| Remarks | The unpacked card image is assumed to be in words 4-77 of an 83 word area referenced by the system symbol IAREA, equated to the address of word 3 of the area (third word of the header). |
| Limitations | See Remarks |
| Flow Chart | Described in TABLE XXVf |

TABLE XXVe
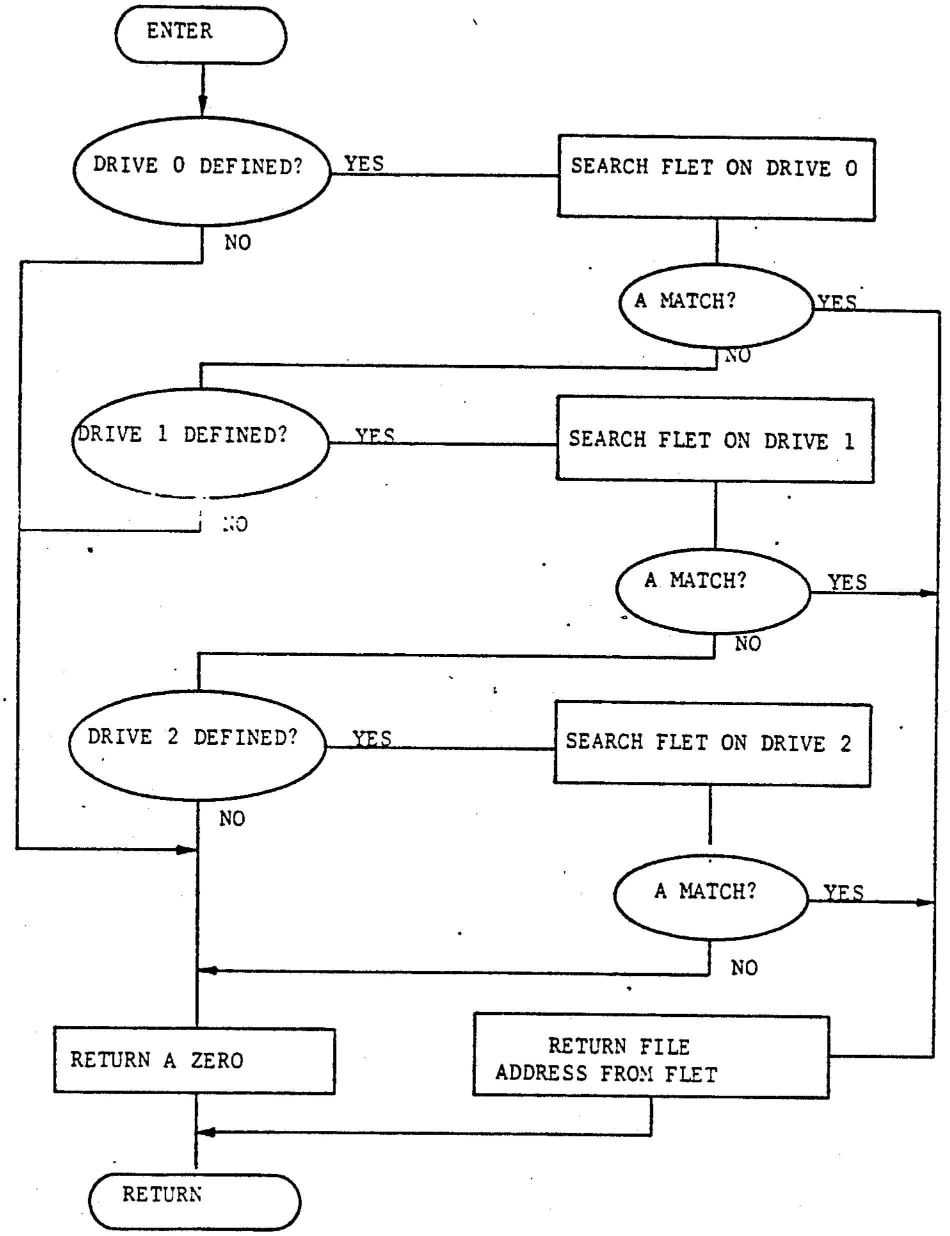

TABLE XXVf
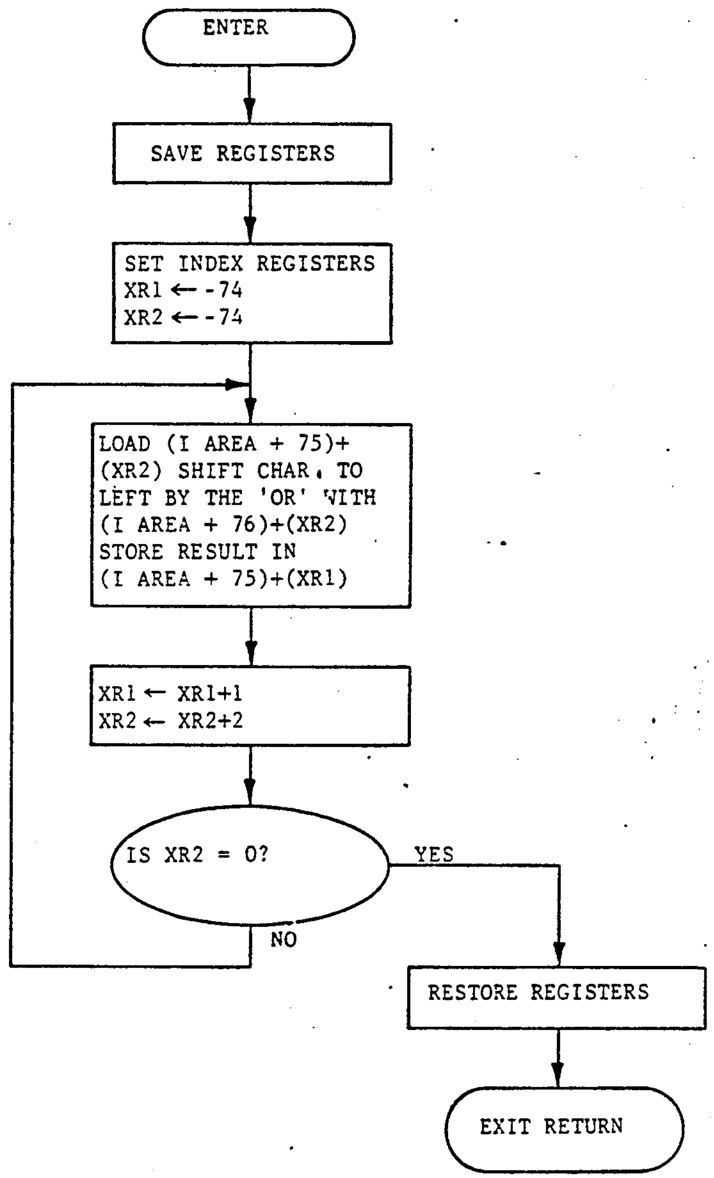

RPSVW

| | |
|---|---|
| Type | Nonrecursive Subroutine |
| Function | Writes source text back to the 2311. |
| Availability | Relocatable area. |
| Use | Call RPSVW |
| Subprogram called | WRBUF, TYPEN |
| Remarks | When assembling with the edit feature, the amended source text must be written back to the source file. |
| Flow Chart | Described in TABLE XXVg |

FTCHS

| | |
|---|---|
| Type | Nonrecursive Subroutine |
| Function | To read source code from 2311 disk during assembly. |
| Availability | Relocatable area. |
| Use | CALL FTCHS |
| Subprogram called | RDBUF |
| Remarks | This reads one card source code for each call from 2311 into 'SBUFR'. A 'DISK READ ERROR' message will be printed and the nonprocess monitor is called (job terminates) if there is a 2311 disk error. The card image can be dumped with SSW 5 on. |
| Flow Chart | Described in TABLE XXVh |

TABLE XXVg
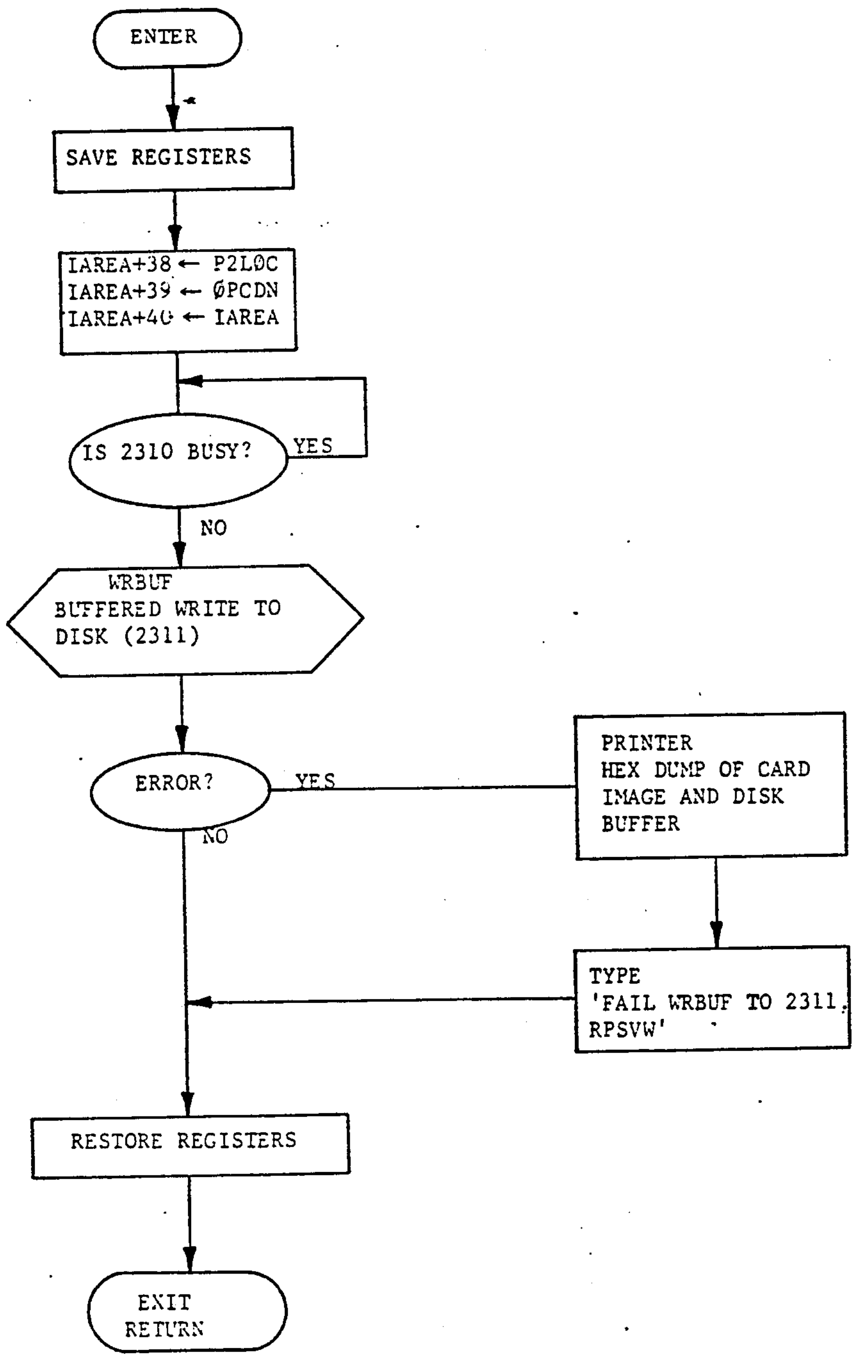

TABLE XXVh
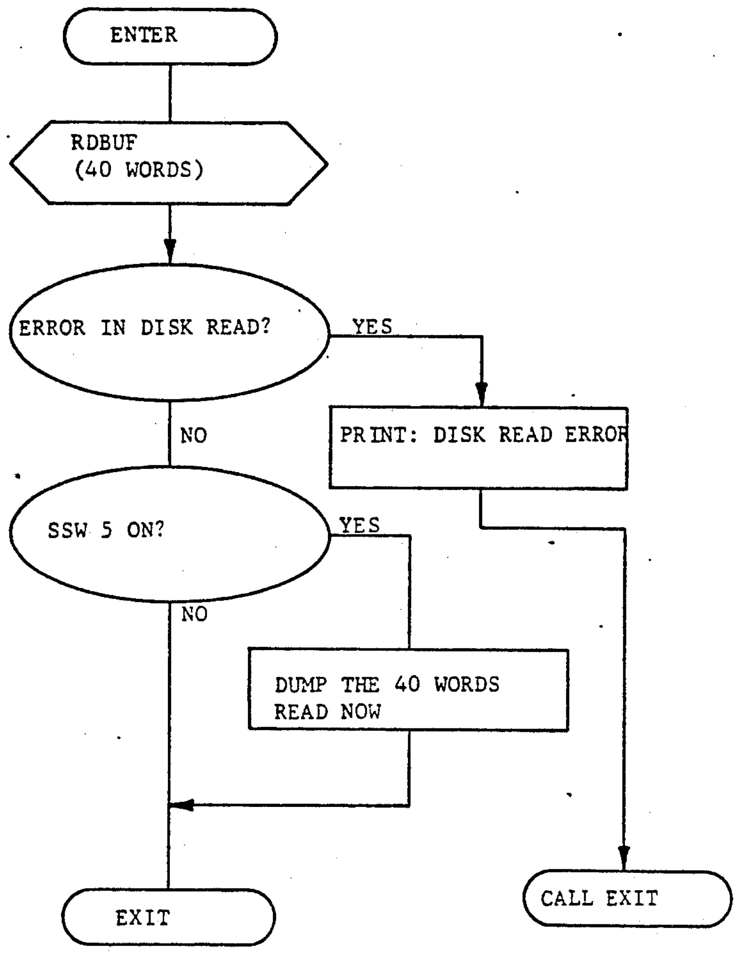

FTCHE

| | |
|---|---|
| Type | Nonrecursive Subroutine |
| Function | Fetches one card from edit file on 2310 disk into input area during the EDIT function of the ASSEMBLER. |
| Availability | Relocatable area. |
| Use | CALL FTCHE |
| Remarks | Buffering is done during the fetch of EDIT cards and when the buffer is empty the next sector of the EDIT file is read into the buffer called "EDISK". |
| Flow Chart | Described in TABLE XXVi |

MOVER

| | |
|---|---|
| Type | Nonrecursive Subroutine |
| Function | Moves definition reference to end of reference chain. |
| Use | XR1 points to symbol table entry.<br>Call MOVER |
| Remarks | Since the reference chain is pushed down for references, it must be reversed to reflect the proper order. Thus the definition is placed at the end of the chain so that it will appear first after reversal. |
| Flow Chart | Described in TABLE XXVj |

TABLE XXVi
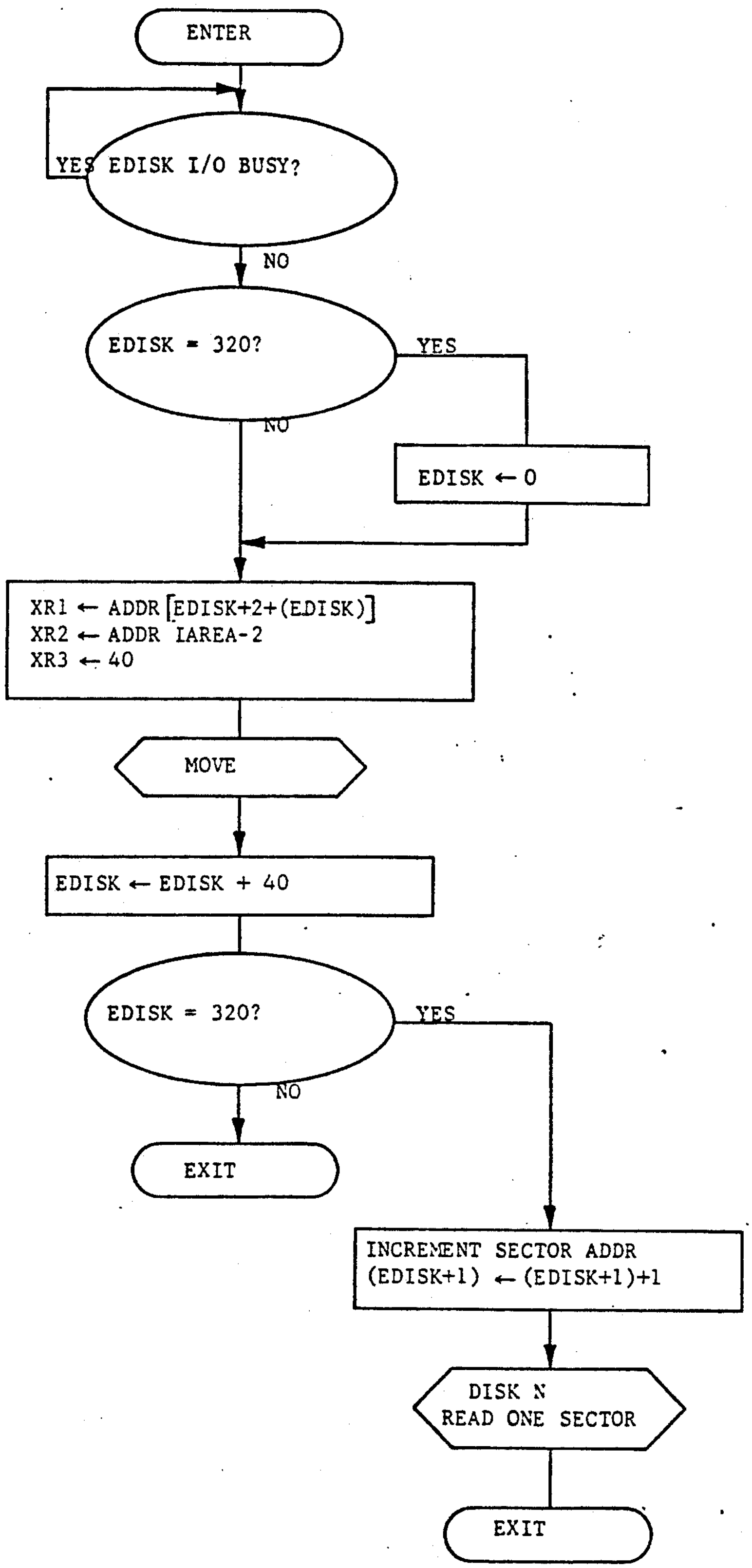

TABLE XXVj
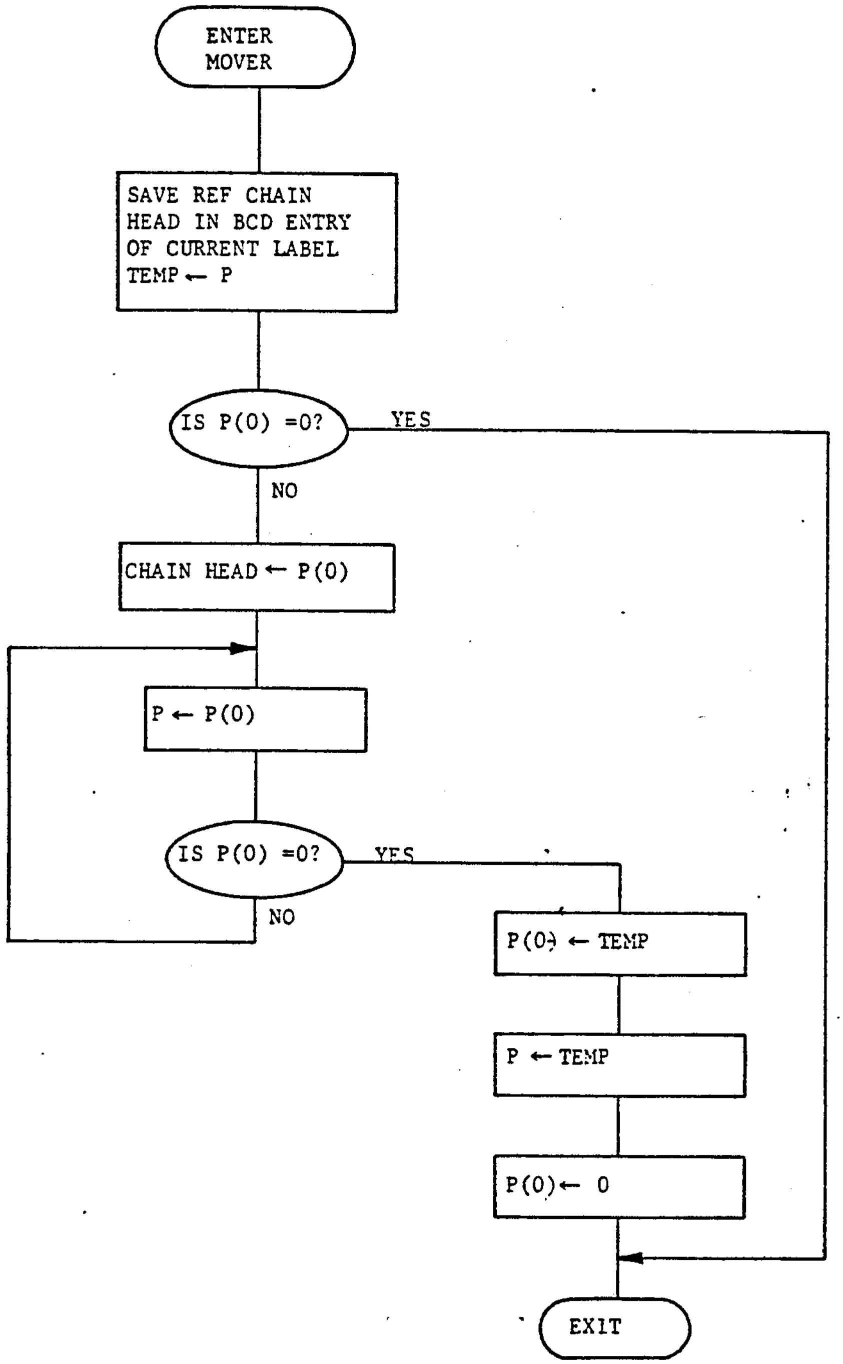

EXTRK

| | |
|---|---|
| Type | Nonrecursive Subroutine |
| Function | Extracts keywords from base chain of the symbol table. |
| Availability | Relocatable area. |
| Use | Call EXTRK |
| Remarks | The first hash chain of the symbol table contains keywords. They must be extracted before the symbol table is ordered, so that the symbol table can be printed out. |
| Flow Chart | Described in TABLE XXVk |

TABLE XXVk

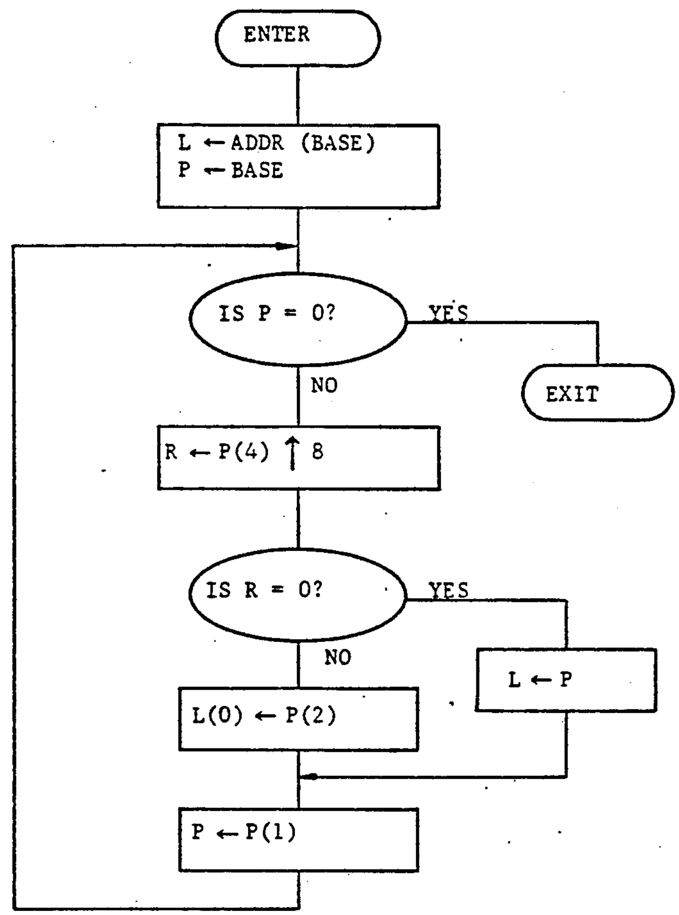

I/O DATA FLOW

The ASSEMBLER is subdivided into sections which each perform a functional step in the assembly process. To aid in comprehension of these functional steps, an understanding of the input and output of each section is helpful. The peripheral media used to obtain inputs and to hold the output of each step is pictured in FIGS. 17A and B.

Referring to FIG. 17A, the analyzer section of the ASSEMBLER 800 reads a control card 805 from the card reader. It scans the information punched into the card and interprets it as descriptive information which determines what the rest of the ASSEMBLER is to do, identifies the program name in a symbol table to be used, determines whether the program listing is to be obtained, formulates a cross reference map, determines whether the program is to be stored or erased, determines whether an object card deck is to be punched, and so on. Control is passed 801 to the Prolog of Pass 1 which reads in the symbol table from disk 810 which is either the default or the one specified on the control card read by the analyzer. The remainder of Pass 1 reads 802 cards punched with instructions and other program data from the card reader 806. Each card is scanned to determine any labels and instructions punched into it and the card image with a code number for the instruction is written to the Pass 2 text area 811 on the disk. Control then passes to Pass 2 of the ASSEMBLER 803. In Pass 2, the Pass 2 text is read back from the disk 11. The rest of the card is scanned for operands and a corresponding instruction is built. This instruction (or object code) is inserted into an object module in relocatable form or absolute form and stored back on the disk 812. During this step, if the list option was specified on the control card, the information on each card is printed along with the assembled instruction and any detected errors 807. Control passes to the Epilog of the ASSEMBLER 804. The Epilog contains the object code from the disk 812 and either stores the module 808 on disk or optionally punches the object module onto cards 809 or optionally prints the contents of the symbol table at the end of the assembly 813 or optionally prints a cross reference map of the symbols in the symbol table. Another option is to save the contents of the symbol table 814 on the disk.

Referring to FIG. 17B, the peripherals used in the instruction definition options of the ASSEMBLER are described. When the ASSEMBLER is executed in the definition phase, the source information is contained from cards 813 in the card reader. A symbol table is built by the ASSEMBLER and stored onto disk 814.

SPECIAL FUNCTIONS

Two features of the ASSEMBLER are worthy of special mention. They are 1) the scanning of source text on card images, and 2) the non-restricted use of symbols (i.e., the possible use of a symbol such as SUB to mean the name of a subroutine and also the name of a variable, in the same program).

CARD IMAGE SCANNING

One requirement in a free-form language, such as adopted here, is the ability to interpret each column on a cad image. The method selected is a left-to-right scan (i.e., columns 1-74 on the card), with the restriction that labels must begin in column 1, and asterisk in column 1 denotes a comment. Blanks are used as field delimiters. The order of fields on the card is label, followed by operand field, followed by comments.

The ability to distinguish fields, then, is an additional requirement.

In the operand field it is useful to permit subfields to describe options available in a given instruction. The subfields themselves may be arithmetic combinations of symbols and constants (expressions). Commas (and in some cases, parentheses) are used as subfield delimiters.

A third requirement is the ability to analyze expressions, subject to the normal precedence rules of addition, subtraction, multiplication and division.

There are three related programs in the ASSEMBLER which together provide the three capabilities mentioned above. The programs are TOKEN, GETNF, and EXPRN.

TOKEN is the program that scans and cracks each source record into its logical primitives. It must recognize combinations of letters as being symbols, such as LABEL or ENTRY, decimal and hexidecimal numeric data, and character strings. It is used by both EXPRN and GETNF to analyze the next item on the card (a pointer, IPNTR, is used to keep track of the next column to be analyzed). TOKEN moves the pointer to the next column and analyzes the character. If required, it continues until a blank or other special symbol is encountered, and returns one or two code numbers (TOK and TOKTP) to describe the result (token). The code numbers are arranged so that arithmetic operators (plus, minus, multiply, divide) have the desired precedence (i.e., the code number for multiply or divide is greater than the code number for add or subtract).

| TOKEN VALUES | | |
|---|---|---|
| If the SYMBOL is: | then TOK is set to: | and TOKTP is set to: |
| invalid character | 0 | 0 |
| blank | 1 | (ignored) |
| = | 3 | (ignored) |
| + | 5 | 1 |
| − | 5 | 2 |
| * | 6 | 1 |
| / | 6 | 2 |
| ) | 10 | (ignored) |
| ( | 11 | (ignored) |
| , | 14 | (ignored) |
| identifier (symbol) | 17 | symbol table address of BCD entry |
| decimal constant | 18 | 0 |
| hexadecimal constant | 18 | 1 |
| character string constant | 18 | 2 |

GETNF is a subprogram which skips blank characters. It is used to move the card scan pointer IPNTR to the next non-blank character (i.e., the next field).

EXPRN is a subprogram used to evaluate expressions. It uses TOKEN to locate primitives. The parse proceeds 'bottom up' (routine EXPRN) with unary operators parsed by recursive descent (routine EX1). A push down stack is maintained during parsing, and the evaluation of the stack (routine GENRA) is accomplished by performing the specified operations in a pseudo-accumulator (ACC). When the entire expression is evaluated, ACC+1 contains the value.

Arithmetic in the evaluation follows these rules, where

R=relocatable symbol

A=absolute symbol a=absolute coefficient a) $R \pm A \rightarrow R$ b) $aR \pm R \rightarrow (a \pm 1)R$ (note: O R is absolute)

c) $A^*R \rightarrow aR$

The following combinations are errors:

d) A/R e) R/A p1 f) R*R g) R/R

The * (when used to denote the location counter) assumes the relocation property of the program being assembled (either absolute or relocatable).

In general, to have a valid relocatable evaluation the expression's R coefficient must be 1, when 0 denotes absolute and 1 denotes relocatable.

DOMAIN OF SYMBOL DEFINITION

Three classes of symbols are known to the assembler:

1) Assembler keywords: This class of symbols include the current set of operation code mnemonics, assembler directives, and key words recognize in parsing.

2) Internal symbols: Internal symbols are created by the user during the assembly and are defined (used as a label) internally to the assembly.

3) External symbol: External symbols are defined external to the assembly and may be reference only. A symbol may be defined in one assembly and be declared external; another assembly may reference the same symbol, denoting it as externally defined. The loader program used to link the assembled programs and subroutines for execution must set up the appropriate linkage for the external symbols.

There are no reserved or 'forbidden' symbols. The same symbol may be used as an a) Assembler keyword, b) Internal symbol, c) External symbol in certain instances (ex: call to a subroutine), in the same assembly. A different symbol table entry is created for each use of the same symbol, the difference being the type and attributes of the symbol. It is, therefore, one function of the ASSEMBLER to determine from the contextual usage of the symbol which symbol table entry of the symbol to choose. The subroutine TOKEN, as one of its tasks, performs this class analysis of the symbol and directs the symbol table access appropriately.

STORAGE ASSIGNMENT AND LAYOUT STRUCTURE

STORAGE LAYOUT

Allocation of variable core is shown in TABLE XXXVIa.

TABLE XXVIa

| | | | |
|---|---|---|---|
| Symbol Table and Instruction Definition 4054 Words | 32767 | | |
| | 28717 | SYMBL | |
| | 28715 | SECTA | |
| | 28714 | WC | |
| Flag Area 120 Words | 28594 | IFLAG | |
| Card Input Buffer (plus control word) 81 Words | 28513 | IAREA | |
| Pass Two Text Header 2 Words | 28512 | OPCDN | |
| | 28511 | P2LOC | |
| External Reference List 100 Words | 28411 | EXLIST | |
| Error List 101 Words | 28310 | TEC | |
| Disk Buffer 322 Words | 27988 | IDISK | |
| HDNG Buffer 60 Words | 27928 | HDR | * For Edit Options This Area is Allocated Differently |
| 1 Word | 27927 | WC2 | |
| Output Disk Buffer Object Code 322 Words | 27605 | ODISK | |
| Write Source Text - 2311 328 Words | 27284 | WDISK | |
| Printing Buffer 61 Words | 27277 | | |
| | 27216 | PBUF | |

For the Edit option, the core allocation shown in TABLE XXVIb is applicable, during execution of Pass One.

TABLE XXVIb

| | Core Address (decimal) | Reference Symbol |
|---|---|---|
| 322 Words | 28310 | TEC |
| | 27988 | EDIBE |
| 322 Words | 27666 | EDISK |
| 328 Words | 27345 (EDISK-321) | SBUFR |
| | 27338 | |

The symbol table after instruction definition is shown in TABLE XXVIc.

TABLE XXVIc

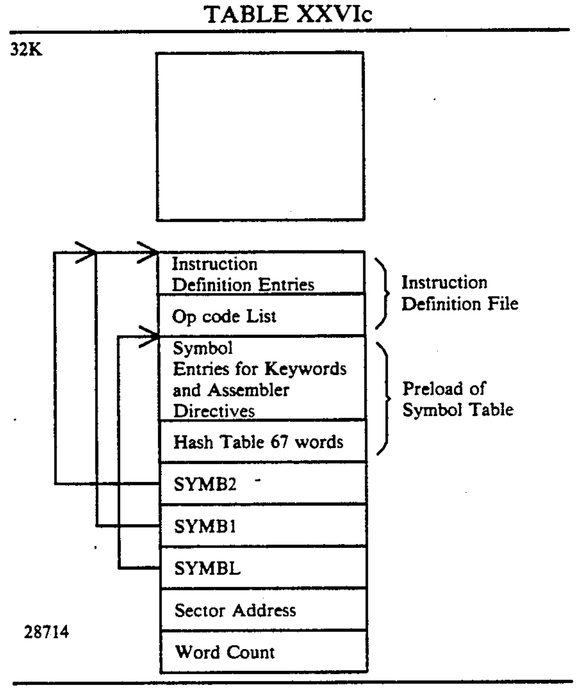

The symbol table after an assembly is shown in TABLE XXVId.

TABLE XXVId

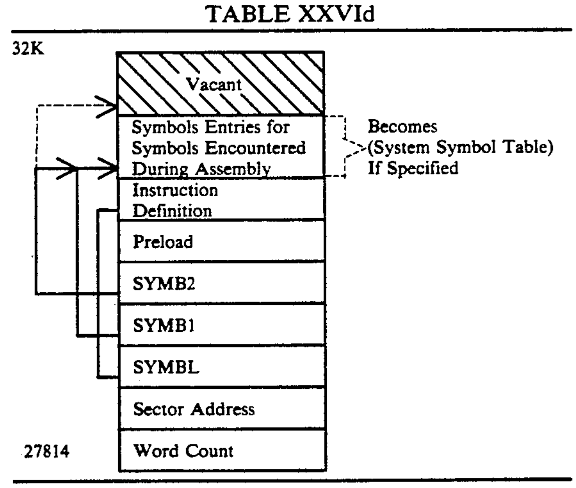

When assembly is requested the symbol table area in core is initialized to contain the preload and instruction definition areas. However, if "system symbol table" is specified, the system symbol area will also be included.

Entries for symbols encountered during assembly will be added in the next available space in the symbol table.

If "save symbol table" is specified, all entries in the symbol table will become system symbols by updating the third pointer word to the end of the table.

For assembly not requiring the system symbol table SYMPT←(SYMBL+1)

To obtain the system symbol table SYMPT←(-SYMBL+2)

To save the system symbol table (SYMBL+-2)←SYMPT

The symbol table for hash table entries is shown in TABLE XXVIe. The hash table in the present embodiment is a 67 word table. Entries are one word each, containing a pointer to a string of symbol table entries. Each symbol table entry contains a "hash link" word, which points to the location in the table of the next entry on the same string. The end of the string is indicated by the last entry having zero for its hash link. The symbol entries on each string are kept in aphabetical order.

TABLE XXVIf

| | |
|---|---|
| Reference Link | |
| Hash Link | |
| Locator | |
| Type Attribute | |
| Symbol (Alphabetic) | } 5 Truncated EBCDIC Characters, Packed Into Two Words |

The reference link is the head of the reference chain for that symbol, one two word reference is created at the end of the reference chain. The hash link points to the next symbol entry on the same hash chain. The locator contains the core address assigned to the symbol, if the symbol is a label. The type/attribute describes the symbol. There are three types recognized; op codes, assembler directives, and labels. A symbol may have the following attributes:

TABLE XXVIe

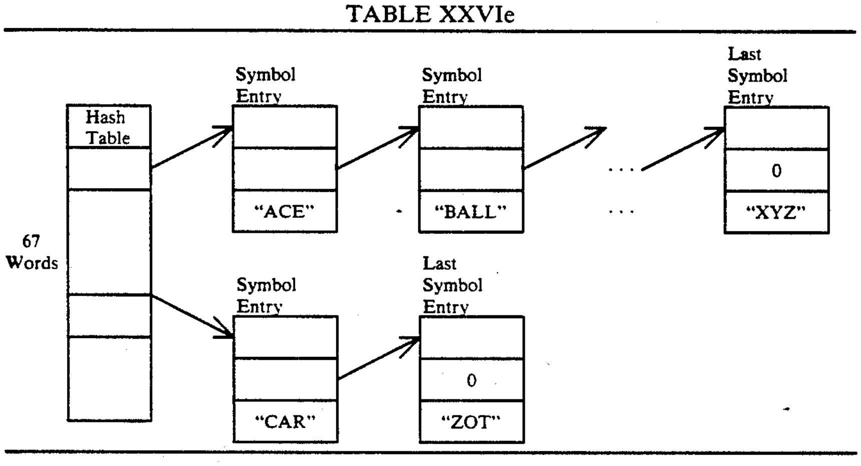

The hashing algorithm for deciding which chain a symbol belongs to is as follows:

1. Transform the alpha character string representing the symbol to truncated packed EBDIC format (5 characters into two words).
2. Exclusively "OR" the two words together.
3. If the result is negative, take the 2's complement of it.
4. Divide by 67 (an odd prime number)
5. The remainder (0<r<67) is the hash value for the symbol This algorithm is implemented in subroutine HASH.

The symbol table insertion algorithm is as follows:

1. Given the hash value for the symbol, it is interpreted as a displacement within the has table where the head of the appropriate hash chain resides.
2. The chain is transversed until the proper position for insertion in the chain is determined (chain must remain in alphabetical order). The has chain search is accomplished with subroutine FXHAS.
3. Create a symbol table entry at the end of the symbol table and 'include' the entry in the determined position in the hash chain. The actual insertion is accomplished with subroutine. INSYM.

The system table for symbol table entries is shown in TABLE XXVIf. Each symbol table entry is six words in length in the present embodiment.

| | |
|---|---|
| Bit 15 | defined for internal use |
| 14 | multiply defined |
| 13 | literal (not implemented) |
| 12 | entry |
| 11 | external |
| 10 | reloaction |
| 9 | defined for external use |
| Bits 0-7 | Type: op code number, if between 1 and 127 assembler pseudo op. if between 128 and 255 label, if zero. |

The symbol is the truncated packed EBCDIC equivalent of the alphanumeric characters of the symbol.

The symbol table for reference entries is shown in TABLE XXVIg. Labels are normally reference in a program. For each symbol a chain of reference entries is generated, one entry for each reference to a given symbol. Each entry is two words in length. The first word is a pointer and the second is the line number in the program where the label was referenced. The entries are linked by pointers, from one entry to the next, the last reference entry will have zero as its pointer and be interpreted as the line where symbol definition occurred.

TABLE XXVIg

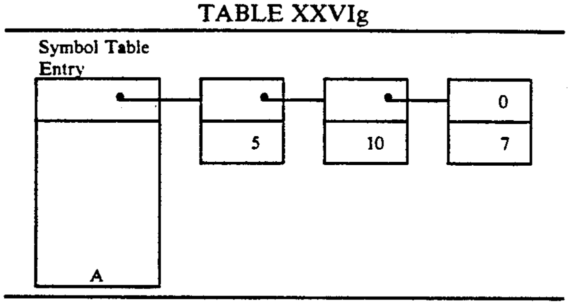

In the above example the symbol 'A' is defined on line 7 and referenced on lines 5 and 10. Note that the cross reference is by line number.

The creation of references is accomplished with subroutine REFR.

Each entry in the op code list of the Instruction Definition Area is one word in the present embodiment. The word is a pointer to the instruction definition header.

Header Op Code Definition Entries in Instruction Definition Area—The header for each instruction in the present embodiment is four words in length as shown in TABLE XXVIh. The first word is the machine operation code number for the instruction.

TABLE XXVIh

| |
|---|
| Op Code |
| Mode 1 Composition List |
| Mode 2 Composition List |
| Descriptor |

The second and third words are pointers to the composition list for Mode 1 and Mode 2, respectively. They may point to the same composition list if the instruction has identical form in both modes. One of them will contain zero if the instruction is not valid in that particular mode.

The fourth word contains the relocatable test type, the core allocation requirement, and syntax type (parse code number) for the instruction.

Op Code Definition Entries in Instruction Definition Area—The instruction composition list is variable in length. The first word contains both the number of variables referenced and numbers of fields used. Twice the number of fields used, plus one for the first word, is the length of the composition list. The description of each field used required two words. The first word contains the field code number and number of bits in the field. The second word contains either data or the number of the operand from the operand list to be used (first, second, third, etc.).

The instruction Composition List is shown in TABLES XXVIi and XXVIj.

TABLE XXVIi

| | | |
|---|---|---|
| Number of Variables Referenced | Number of Fields | |
| Field Code Number | | First Field |
| Data or Operand Number | | |
| ⋮ | | |
| Field Code Number | | |
| Data or Operand Number | | Last Field |

TABLE XXVIj

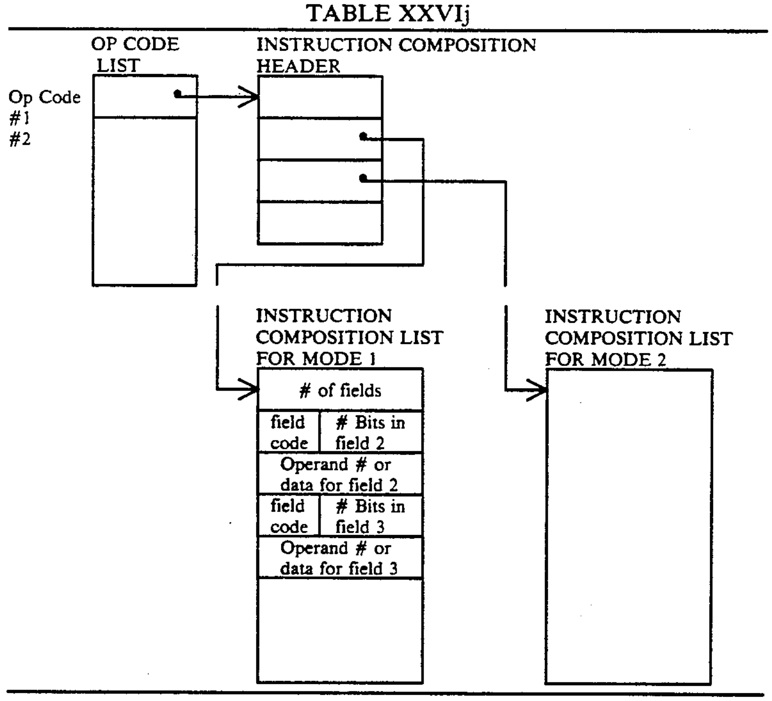

RETURN ADDRESS STACK

The return address stack is provided to permit recursive use of subroutines. When a subroutine is entered the return address is saved by adding it to the stack. When exit from a subroutine occurs, the last stack entry is removed and used as the branch address, hereby returning to the calling program. The stack is shown in TABLE XXVIk.

TABLE XXVIk

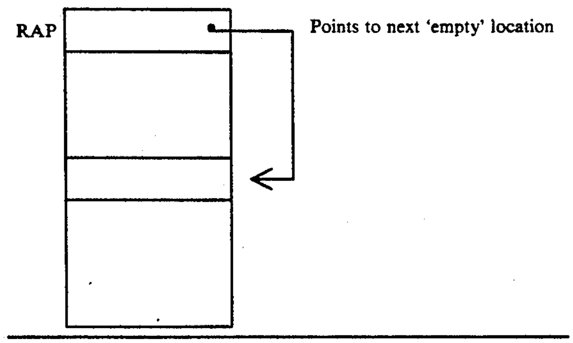

FLAG TABLE

The flag table provides a means of passing information from program to program without the overhead of passing argument lists as shown in TABLE XXVII.

TABLE XXVII

| SYMBOL | Meaning |
|---|---|
| CONTL | Assembler control vector. Bits are set by selecting options. |
| IPNTR | Card scan pointer. Points to next character on card image. |
| LINE | Line number in program. Same as card count, except HDNG and LIST ignored. |
| MNEMO | Count of mnemonics being defined. |
| COLUM | Card scan pointer. Points to beginning character of a field. |
| LABEL | Card scan pointer. Points to symbol entry for a label. |
| LARGP | Maximum address assigned in program being assembled. |
| NUM | Card scan value, if a constant. |
| VREG | Count of variables referenced in instruction build. |
| CONFG | Card scan flag, set if a constant is detected. |
| SYMPT | Symbol table pointer. Points to next available space. |
| BASE | Points to beginning of symbol chain during merge of alphabetically ordered symbol strings for printing. |
| LOCAT | Location counter. Contains next assignable location. |
| CHAIN | Points to last symbol string merged during merge of alphabetically ordered symbol strings for printing. |
| FEC | Fatal error count. Incremented for each fatal error detected. |
| LOPCD | Base address of instruction definition portion of symbol table. |
| NWORD | Number of words used for symbol table build. |
| IDEFN | Count of op codes defined. |
| MODE | Mode of instruction being defined. |
| INFLD | Number of fields in instruction being defined. |
| IHADR | Instruction definition pointer. Points to next available address. |
| P2FLG | Pass Two Text Flag |
| ICORE | Core allocation. |
| MAXC | Maximum core size of assembler target computer. |
| RTYPE | Program relocation type. |
| TOK | Card scan flag. Contains code number for type of character detected. |
| TOKTP | Card scan pointer. Points to symbol table entry if an identifier (keyword or label) detected. |
| SIMEX | Expression parse flag. Set to indicate expression evaluation is in progress. |
| MACHF | Pass One Control vector. Bits used as indicative flags. |
| ENTRY | Count of number of entry points encountered. |
| OBJCT | Pass Two control vector. Bits used as indicative flags. |
| THESM | External reference pointer. Points to symbol table entry for an externally referenced symbol. |
| EXREF | Count of number of external references encountered. |
| PGCNT | Page count for listing. |
| INSBL | Contains generated object code (two words). |
| OPRND | List of operands decoded from operand field (seven words). |
| EDITV | Edit control vector. |
| LINE2 | Line count for updated source text under edit option. |
| SMALL | Minimum address assigned in program being assembled. |
| ASVSM | Word count and sector address (two words) for symbol table specified under "use symbol table" option. |
| AUSSM | Word count and sector address (two words) for symbol table specified under "use symbol table" option. |
| PARSP | Parse stack pointer. First word of list (41 words) used in expression evaluation. |
| ACC | Value(s) returned from expression evaluation (4 words). |
| RAP | Return address stack pointer. First word of list (16 words) of current return address. |

TABLE XXVII-continued

| SYMBOL | Meaning |
|---|---|
| EXTRN | Card scan flag. Set to indicate search for external reference. |
| OBJMS | Object module size. Contains length of object module. |
| BCCNT | Binary core counter. Contains count of locations used. |
| PRTYP | Program relocation type. |
| HDCNT | Header word count. Number of words in data header. |
| SCHDR | Word count and sector address of record containing current data header (two words). |
| RPNTR | Relocation word pointer. Points to word of relocation bits. |
| WPNTR | Word pointer. Points to next available word in BFW8. |
| BFW8 | Buffer for object code (nine words). |

The three flags CONTL, MACHF, and OBJCT are used as control vectors. The bit assignments for each one is as shown in TABLES XXVIm and n.

TABLE XXVIm

| CONTL | | |
|---|---|---|
| Bit | 15 | Card Input |
| | 14 | Disk Input |
| | 13 | Print Symbol Table |
| | 12 | Punch Binary Card Deck |
| | 11 | Punch Binary Tape |
| | 10 | List Source Text |
| | 9 | Save Symbol Table |
| | 8 | System Symbol Table |
| | 7 | Cross Reference |
| | 6 | Premature Terminate Flag |
| | 5 | Not Used |
| | 4 | Program Name Supplied |
| | 3 | Store Program OBJ Module |
| | 2 | Edit Flag |
| | 1 | Insert Flag |
| | 0 | Not Used |

TABLE XXVIm1

MACHINE FLAGS

| MACHF | | |
|---|---|---|
| Bit | 15 | Machine Data Flag |
| | 14 | Machine Dummy Data Flag |
| | 13 | End Flag |
| | 12 | Process Flag |
| | 11 | Key Word Flag |
| | 10 | External REF Flag (used by CALL) |
| | 9 | External REF Indicator |

TABLE XXVIn

PASS 2 FLAGS

| OBJECT - System Symbol | | |
|---|---|---|
| Bit | 15 | No Object Code, if On |
| | 14 | Entry Flag, if On |
| | 13 | Tag Flag |
| | 12 | Simple Expression Flag |
| | 11 | Not Used |
| | 10 | Not Used |
| | 9 | Not Used |
| | 8 | Not Used |
| | 7 | Not Used |
| | 6 | Not Used |
| | 5 | Not Used |
| | 4 | Not Used |
| | 3 | Not Used |
| | 2 | Not Used |
| | 1 | Not Used |
| | 0 | Relocatable Operand Flag |

CARD BUFFER

The card buffer is 81 words long in the present embodiment. The symbol IAREA references its beginning address. It is used to read and process one card image (source text) at a time. Data is read in packed EBCDIC form (40 words) starting ar IREA+1. The data is "unpacked" to 80 words. Pass Two text is formed by using the three words IAREA, IAREA−1 AND IAREA−2 as a three word header appended to the card image, repacking the card image to 40 words, and using IAREA−2 to IAREA+37 as a unit record of Pass Two text. The last three words from the card image (IAREA+38, IAREA+39, IAREA+40) are discarded. The Card Buffer is represented in TABLES XXVIo and p.

TABLE XXVIo

| | | |
|---|---|---|
| IAREA-2 | | (also referenced as P2LOC) |
| IAREA-1 | | (also referenced as OPCDN) |
| IAREA | | |
| IAREA + 80 | | |

TABLE XXVIp

PASS TWO TEXT

| | |
|---|---|
| LOC CNTR | |
| ERROR INDIC | OP CODE NUM |
| P2 TEXT FLAG | TOK PNTR |
| PACKED EBCDIC CARD IMAGE | |

P2 TEXT CONVENTION PASS 1 a) Each special subroutine processor specifies the following P2 data to be inserted into P2 text.
   1. LOC CNTR
   2. OP CODE #
   3. ERR INDICATOR
   4. Last value of token pointer
b) Pass 1 processor inserts this information into P2 text prior to writing it.
c) Each special subroutine is responsible for calling the error generator when required.
d) The error generator maintains the ERROR CODE LIST and the error counter.

DISK BUFFERS

There are three 2310 disk buffers used by the ASSEMBLER. The symbols used to reference the beginning addresses are IDISK and ODISK. Each of them is 322 words long, with the first two words containing word count and sector address as shown in TABLE XXVIq.

IDISK is used for reading and writing card images from source text and Pass Two text. Card images are added (removed), 40 words at a time, until the buffer is full (empty). Then the buffer is written to (read from) disk, and the filling (emptying) process begins again.

ODISK is used for the object module generated by the ASSEMBLER. Object code for each instruction, along with the associated relocation factors, and new string locations when program discontinuities are encountered, is added to the buffer. When full, it is transferred to the disk.

EDISK is used to buffer the edit text to the edit file. The buffer is used only during Prolog.

TABLE XXVIq

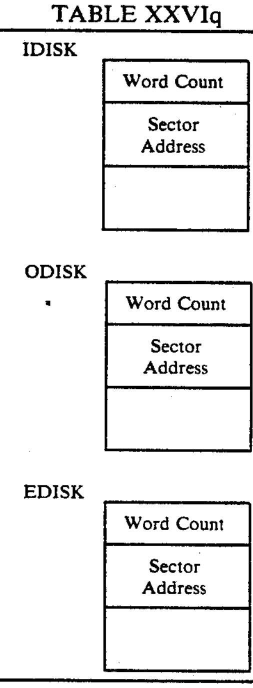

Another disk buffer is WDISK, shown in TABLE XXVIr. It is used to write edited source text to the 2311 disk.

TABLE XXVIr

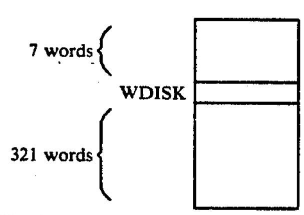

Heading Buffer and Print Buffer

A special buffer, shown in TABLE XXVIs is provided for page headings on output listing. When a heading instruction is encountered, the listing is ejected to a new page. The reset of the card image is interpreted as comments and transferred to the heading buffer. The comments appear at the top of every page, until another heading instruction appears.

TABLE XXVIs

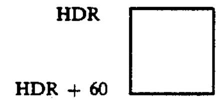

The printing buffer, shown in TABLE XXVIt is provided for listing card images during assembly. Each card image is transferred to the buffer, along with the location, generated object code, line number and error indicators and printed when the list option is set.

TABLE XXVIt

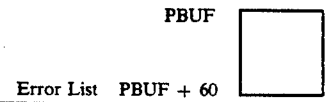

The error list of the present embodiment is 201 words long. The symbol used to reference its beginning address shown in TABLES XXVIu and v is TEC. The first word contains the address of the next available space in the table. Error entries are two words each; the first word contains the card column (from scanning) and code number for the error type; and the second word contains the line number in the program where the error occurred.

TABLE XXVIu

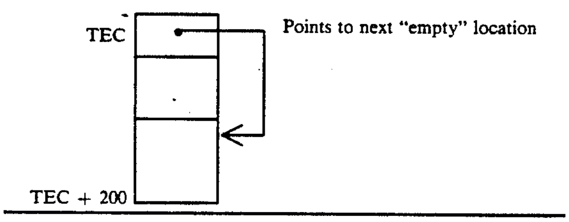

TABLE XXVIv

ERROR CODE LIST

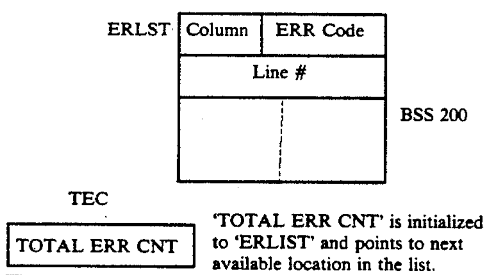

ACTUAL CNT=(TOTAL ERR CNT-ERLIST)/2

Only the first hundred errors will be retained. If more than 100 occur, ASM will not stop but only the first hundred errors will be listed; however, the error count will be maintained.

FEC ('FATAL ERROR COUNT') will also be kept. An object will be produced as long as FEC=0 regardless of the value of TEC.

PARSE STACK

The parse stack shown in TABLE XXVIw is used to evaluate expressions in the operand field of an instruction. When the operand field is scanned and the beginning of an expression detected, entries are made in the parse stack for each type of symbol, constant and operator. When a delimiter is reached, the contents of the stack serve as a pattern for evaluation.

TABLE XXVIw

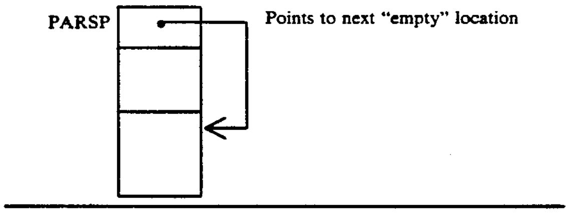

The stack is the mechanism for executing a bottom-up parse of the expression. An entry in the parse stack is shown in TABLE XXVIx.

TABLE XXVIx

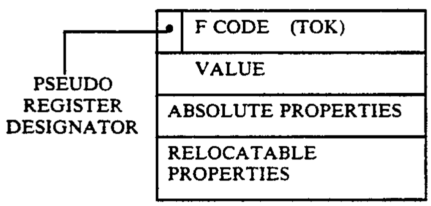

PSEUDO REGISTER DESIGNATOR
1 = data in Pseudo Register
0 = data in Value Field
F CODE - Precedence Level Indicator
VALUE - IDENTIFIERS - LOCATOR VALUE
CONSTANTS - CONSTANT VALUE
*UNARY OPERATOR - LOCATION COUNTER
OPERATORS - TOKTP
ABS/REL Properties - A tally is kept to insure no relocation errors are generated.

In conjunction with the parse stack, a pseudo accumulator, shown in TABLE XXVIy, is maintained.

TABLE XXVIy

PSEUDO ACCUMULATOR

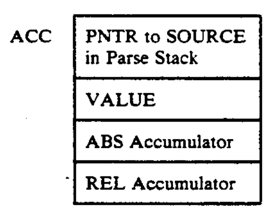

The pseudo accumulator is used by Expression Parse's generator subroutine. The pseudo accumulator in conjunction with the parse stack provides the vehicle for evaluation of expressions.

OPERAND LIST

The operand list is eleven words long in the present embodiment. The symbol used, a shown in TABLE XXVIz to reference its beginning address is OPRND. As the operand field of an instruction is scanned, the specified parse routine evaluates the data in the field and puts each item into the operand list.

TABLE XXVIz

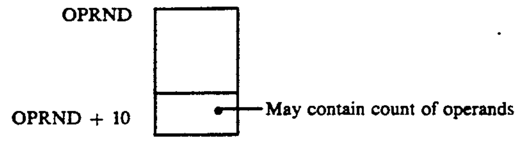

EXTERNAL REFERENCE LIST

The external reference list in the present embodiment is 100 words long. The symbol used to reference its beginning address, as shown in TABLE XXVIIa is EXLST. The first word contains the address of the next available place for an entry. Each entry is one word, containing the starting address of the symbol table entry for the referenced symbol. (external symbols).

TABLE XXVIIa

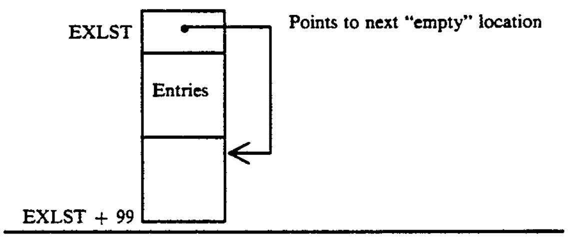

EDIT VECTOR

The Edit Vector shown in TABLE XXVIIb is utilized for updates. When all updates are complete, the update flag is turned off.

TABLE XXVIIb

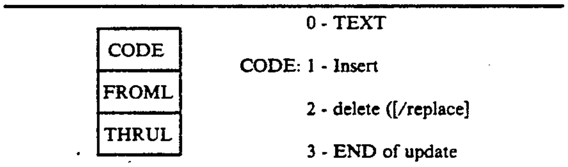

| | | | |
|---|---|---|---|
| 1 | 100 | | −100 |
| | | | First line to insert |
| | | | ⋮ |
| | | | Last line to insert |
| 2 | 104 | 105 | −105, 106 |
| 2 | 106 | 108 | −107, 109 |
| | | | First line to insert |
| 3 | | | - END |

OUTPUTS

OBJECT MODULE

The ASSEMBLER outputs an object module for each error-free program assembled. The object module contains the generated object code for each instruction in the program, the number and name of entry points, the number and name of external references, and the type and size of the program.

The object module is generated during execution of Pass Two. It is maintained in disk storage in Non Process Working Storage.

The format of the object module for relocatable programs is shown in TABLE XXVIIc.

TABLE XXVIIc

| # Entry Points | Program Type |
|---|---|
| Number of External References | |
| Object Module Size | |
| Binary Code Core Allocation | |
| If Mode 1, List of Truncated EBCDIC entry names and Definition | |
| List of Truncated EBCDIC External References | |
| Body of Program (Format Dependent on Mode). ← Data Blocks and Headers | |

The format of the object module for absolute programs is shown in TABLE XXVIId.

TABLE XXVIId

| #Entry Points | Program Type |
|---|---|
| MDUMY Size | |
| Object Module Size | |
| Binary Code Core Allocation | |
| NAME { Mode 2-10 EBCDIC Characters 5 Words; Mode 1-Truncated EBCDIC 3 Words | |
| Body of Program<br>.<br>.<br>. | |

The OBJ Module Program Type is shown in TABLE XXVIIe.

TABLE XXVIIe

| Mode Restriction | Program Type | Type Code |
|---|---|---|
| MODE 2 | MDATA | = 1 |
| MODE 2 | PROGRAM | = 2 |
| MODE 1 | ABS | = 3 |
| MODE 1 | REL | = 4 |

The Data Block (Header and Data) is shown in TABLE XXVIIf.

TABLE XXVIIf

| |
|---|
| Relative Origin |
| Data Word Count + 2 (for next header) |
| Data |
| Relative Origin |
| Word Count |
| .<br>.<br>. |
| Relative Origin |
| Word Count = 0 |

For ABS Program, data consists of binary code.

For REL Program, data consists of relocation word + object code.

Relocation Code

00 - EXTERNAL
01 - ABS
10 - REL
1100 - CALL

| | 0110 1100 0101 1010 |
|---|---|
| Relocation Code → | 0110 1100 0101 1010 |
| Object Code | ABS<br>REL |
| | SUBR<br>NAME |
| | ABS<br>ABS |
| | REL<br>REL |

Relocation word appears only in Mode 1 relocatable programs.

ABS-No relation

REL-Add in relocation factor

SUB NAME-Replace with a BSI call

Error Messages—The ASSEMBLER outputs a message regarding errors detected during assembly, either than none were detected, or the number and description of errors that were detected. The Error Codes utilized in the present embodiment are listed in TABLE XXVIIg.

TABLE XXVIIg

ERROR CODES AND ERRORS

USER ASSEMBLY ERRORS:

| | |
|---|---|
| *A1 | EDIT DIRECTIVE EXPECTED |
| *A2 | RELOCATION TYPE NOT SPECIFIED |
| *A3 | UNRECOGNIZABLE OP CODE |
| *A4 | MULTIPLE SYMBOL DEFINITION |
| *A5 | ILLEGAL OP CODE THIS MODE |
| A6 | STATEMENT MUST NOT BE LABELLED |
| *A7 | INVALID CHARACTER READ |
| *A8 | STATEMENT SYNTAX ERROR |
| *A9 | PROGRAM EXCEEDS FEP CORE SIZE |
| A10 | ASSEMBLER DIRECTIVE MUST APPEAR BEFORE BODY OF PROGRAM |
| A11 | ILLEGAL MODE SPECIFICATION |

TABLE XXVIIg-continued

| ERROR CODES AND ERRORS |
|---|
| A12 MDATA STATEMENT ALLOWED ONLY IN MODE 2 |
| A13 MULTIPLE RELOCATION TYPE SPECIFICATION |
| A14 CONFLICTING RELOCATION TYPE SPECIFICATION |
| *A15 RELOCATION ERROR |
| *A16 VARIABLE FIELD SYNTAX ERROR |
| *A17 ILLEGAL VALUE IN VARIABLE FIELD |
| *A18 UNDEFINED SYMBOL |
| *A19 EXCEED SIZE OF SYMBOL TABLE, ABORT JOB |
| *A20 EXCEED SIZE OF PARSE STACK |
| *A21 STATEMENT MUST BE LABELLED |
| *A22 INVALID SYMBOL OR CONSTANT OR CONSTANT TOO LARGE |
| *A23 NEGATIVE LOCATION COUNTER IS RESULT OF ORG OR MDUMY |
| *A24 INVALID OPERATION AND OR RELOCATION ERROR IN EXPRESSION |
| A25 ABORT SAVE SYMBOL TABLE. NOT AN ABS ASSEMBLY |
| A26 ORG STATEMENT ALLOWED ONLY IN MODE 1 |
| *A27 ABS ALLOWED ONLY IN MODE 1 OR ENT OR DEF ALLOWED ONLY IN MODE 2 |
| *A28 EXCEED SIZE OF RETURN ADDRESS STACK. ABORT JOB |
| A29 MDUMY STATEMENT ALLOWED ONLY IN MODE 2 |
| A30 MULTIPLE MDUMY STATEMENTS NOT ALLOWED |
| A31 ABORT SAVE SYMBOL TABLE. ASSEMBLY ERRORS |
| *A32 NAME NOT SUPPLIED FOR MODE 2 PROGRAM |
| *A33 EXCEED MAXIMUM NUMBER OF ENTRY SPECIFICATIONS AND EXTERNAL DEFINITIONS |
| *A34 CALL OR REF ALLOWED ONLY ON MODE 1 RELOCATABLE |
| *A35 EXCEED MAXIMUM NUMBER OF EXTERNAL REFERENCES |
| *A36 EDIT DIRECTIVE MUST REFERENCE INCREASING LINE NUMBERS |
| *A37 EDIT FILE OVERFLOW. ABORT JOB. |
| *A38 EXTERNAL SYMBOL NOT ALLOWED IN AN EXPRESSION |
| *A39 MULTIPLE EXTERNAL DECLARATION OF SYMBOL |
| A40 FEATURE NOT IMPLEMENTED |
| A41 DMES NOT TERMINATED OR CONTINUED PROPERLY |

*Indicates a fatal error.

Program Listing—The ASSEMBLER will print source text for each card in the program, along with generated object code; assigned location, and error indicators whenever the list option is selected. The listing has page and line numbers, and page headings for each page.

When list flag is on the ASSEMBLER prints page headings and lists each card image along with core location, generated object code, line number and error indicators.

The format of the page headings is as follows:

Total width of print line=120 columns.

First line at top of page: Heading.

In columns 2-13: ASSEMBLY

In columns 16-76: blanks, or 61 characters from the last HDNG card encountered.

In columns 79-91: DATE XX/YY/ZZ, where XX=month, YY=day, ZZ=year. The date is kept in one word in INSKEL/COMMON in the computer.

In columns 94-108: TIME XX.YY.ZZ.WW, where XX=hours, YY=minutes, ZZ=seconds; WW=AM or PM. Time of day is kept in fixed contents of core by system clock (Timer C).

In columns 111-119: PAGE XXXX, where XXXX=page number.

Second line on page: blank.

Third line of page: column titles.

In columns 3-6: HLOC (hexadecimal location).

In columns 9-19: INSTRUCTION (generated object code).

In columns 21-24: LINE (line number assigned by ASSEMBLER.

In columns 27-29: ERR (error flag).

In columns 31-40: SOURCE TEXT (card image).

In columns 116-120: DLOC (if not procedure program); or EVENT (if procedure program).

Card images are listed on fifth through fifty-fifth line of each page.

The format is

In columns 3-6: hexadecimal equivalent of location.

In columns 11-18: hexadecimal equivalent of generated object code.

In columns 27-28: blanks, if no error was detected on this card; or, two asterisks, if an error was detected.

In columns 31-104: first 74 columns of card image.

PRINT SYMBOL TABLE

The ASSEMBLER will print an alphabetical list of entries in the symbol table with a code for each entry showing type of symbol.

The format of the print symbol table is shown below.

ƀƀ Cƀ Symbol (5 characters) b Location (4 digits)ƀƀ . . . 7 repititions per line 16 columns ATTRIBUTE CODE (type of symbol)
C = ƀ - relocatable internal
M - multiply defined
U - undefined
E - entry
A - absolute internal
X - external

HEADING:
'SYMBOL TABLE'

Cross Reference Map—The ASSEMBLER will print an alphabetized list of symbols used in the program. For each symbol a summary of lines where that symbol was mentioned is generated.

The format of the Cross Reference Map is shown below:

ƀƀ 5 columnsƀƀ 5 columnsƀƀƀ 5 columns . . . 13 repititions . . .

$F_3$

ƀƀ 5 columns . . .

The following heading precedes the cross reference table:

CROSS REFERENCE

| DEF | SYMBOL | REF |
|---|---|---|

Field Definitions $F_1$ = defining line number
$F_2$ - SYMBOL
$F_3$ - referencing line number.

Object Code Card Deck—The ASSEMBLER will punch an object deck on cards for error-free absolute programs. The cares are formatted a special way.

Each card of the object deck contains starting address, data word count, data words, and identification.

In columns 1–4: location, in hexadecimal

In column 5: zero

In columns 6–7: data word count (maximum 16) in decimal

In column 8: zero

In columns 9–72: data words, in hexadecimal

In columns 73–76: the first four letters of the program name.

In columns 77–80: card sequence number, in decimal.

CORE LOAD BUILDER

This program builds a core load for MODE 1 programs to be loaded into a 2540M computer. Inputs to the program are object modules residing on disks (2311) generated and stored previously by the ASSEMBLER. Object modules for mainline and all other programs referenced by the mainline or interrupt servicing routines, if assigned, must reside on the disks for building the core load. Both absolute and relocatable programs can be input but cannot be intermixed in a given core load. Difference core loads are built to handle the two types. The programs, after relocation, are converted to core image format and stored on other (2310) disks in the fixed area supported by TSX. A core load map can be obtained, if desired. Core loads can be built for different core sizes. At present, the allowable options are only 8K and 16K. Object modes for mainline and all other programs that are referenced by the mainline or interrupt servicing routines (if assigned) is residing on 2311 disk for building the core loads successfully. A core load map can be obtained if desired. Core loads can be built for different core sizes. At present the allowable options are only 8K and 16K.

The program recognizes 6 control cards.

1) @LOADR
2) @LOADA
3) @ASSIGN
4) @COMMON
5) @INCLUDE
6) @END

The format and options of the control cards are described below in detail.

1. @LOADR

This specifies the number of loader specification cards to follow this card, the load, the name of the program, load point, module name, map option, maximum core size, and that the program to be loaded is relocatable.

| 1 | 89 | 11 | 21 | 31 | 41 | 51 |
|---|---|---|---|---|---|---|
| @ LOADR | NN | NAMEP | XXXXX | MODULENAME | MAP | CSIZE |

NN specifies the number of specification cards following this card for this core load (right justified).

NAMEP Columns 11 through 15, left justified is the name of the mainline program to be loaded (the first one loaded).

XXXXX columns 21 through 25, right justified, specifies the load point in decimal, where the programs should start.

MODULENAME Starting in column 31 (maximum of 10 characters including embedded blanks) is the name of the module for which this coreload is desired.

MAP in columns 41, 42 and 43 prints coreload map, otherwise no coreload map.

CSIZE Columns 51 through 55 right justified in decimal specifies the maximum core size.

Note: Any number greater than or equal to 16000 will set the core size to 16K, otherwise the core size is set to 8K. The default option is 8K.

Caution: Make sure that the size of the core image file on 2310 disk for this module is equal to or greater than the core size specified by this control card. Otherwise, the fixed area on disk will be overlayed.

2. LOADA card

| 1 | 11 15 | 21 |
|---|---|---|
| @ LOADA | XXXXX | NAMEP |

Same as LOADR-no map option. For absolute programs. This option not implemented.

3. @ASSIGN 1 14 21
@ ASSIGN YY NAMEP

This card assigns an interrupt service program to the specified interrupt level.

YY Columns 14 and 15-Interrupt level to be assigned.
NAMEP-Name of the program to be assigned to that level.

Note:
1) One relocatable programs can be assigned to interrupt levels.
2) This should follow a @LOADR or @COMMON cards and may not be used together with @LOADA.

4. @COMMON 1 11 15
@ COMMON XXXXX

XXXXX is the size of the common (in decimal) to be reversed at the high end of core memory. (right justified).

This card can be used in conjunction with @LOADR card only.

5. @INCLUDE

This specifies any subroutines to be included in a special dedicated branch table in the 2540 memory. A branch instruction referencing the entry point of the subroutine is stored into the branch table location specified by the inclusion number of the control card. The format of the control card is:

1 14 21
@ INCLUSIVE NN NAMEP

NN specifies the table entry assigned for this subroutine. NAMEP is the name of the program to be loaded.

6. @END

This card indicates the end of the loading process.

Note:
The core load build program searches the 2311 disk file to get the name of the core file for the specified module (computer) and find the disk address of the files by searching FLET entries. The format of the core load map is described in Functional Description part of this write up. For an example of the loader control cards and core load map, see the listing which follows.

PROGRAM OPERATION

The CORE LOAD BUILDER reads in all control cards and generates a Load Matrix, specifying by name all programs mentioned on the control cards. The order of entries is determined by order of appearance, except for interrupt assignments and special inclusions. The order of entries is important in that secondary entry points of programs, and external definitions, are loaded before they are referenced by other programs.

The CORE LOAD BUILDER program then makes two passes over the programs. During Pass 1, the object module header is read into core, and all the entries and references are processed for all the programs whose names were entered in the load matrix by the control program that reads control cards. Processing of entries and references is described in detail below. The names in the load matrix are processed in the same way as the other program names and continued until no more programs are referenced. If any errors are detected during Pass 1 no load indicator is set and the errors are printed out.

Four types of errors can be detected during Pass 1.

1. XXXXX NO PROGRAM THIS NAME means the object module for program XXXXX could not be found on 2311 disk.
2. XXXXX LOAD ONLY RELOCATABLE PROGRAMS means this program was assembled as absolute program and the object module is in absolute format. Correction: assemble as relocatable program and store.
3. XXXX MULTIPLE ENTRY POINTS WITH SAME NAME means there are more than one entry points with the same name XXXXX at different addresses. Correction: reassemble after correcting name, and store
4. CORE SIZE EXCEEDED All programs can not be loaded into core as the programs exceed the core size of computer.

PROCESSING ENTRIES AND REFERENCES

Processing could mean two different operations here. 1) To assign addresses if the name is entry point and marking it as defined in the load matrix, or 2) to enter the name of the external reference in the load matrix, if it was not there already and mark it as undefined. Later on we have to process these names for entries and references if they are the names of programs.

A core load map is printed if desired, irrespective of the errors at the end of Pass 1. The format of core load MAP is NAMEP LOC I.L. where NAMEP is the name of the program or entry point or external reference and LOC is the address of the program or entry point or the symbol in hex. I.L. is the interrupt level of the program, if the program had been assigned. If NAMEP is COMMON the value in LOC. specifies the size of COMMON in HEX assigned at the high end of the core. If NAMEP=CORE, the LOC. specifies the size of core remaining after loading all the program during this job.

The No Load indicator is checked before proceeding to Pass 2 and the job is aborted if it is set. Then the interrupt level assignments are made if necessary.

At this stage the total size of the core load excluding COMMON is inserted in the module file under programs 2311 disk file.

PASS 2

During Pass 2, the programs are relocated and converted to absolute format and stored on 2310 disk. This is done in the following manner.

Initialize load pointer to the beginning of load matrix. The first 5 records of object module are read into core by the main program.

MARKL subroutine is called to mark all the entry point names of this program that appear in the load matrix as loaded.

ERDEF subroutine is called to establish definitions (addresses) for all external references listed in the object module for this program. This is necessary since the serial number of the external reference is stored in object code. So we prepare a list of addresses of all external references of this program in the same order and pick up the address when this is referenced in code. Now everything is ready to relocate the program.

LOAD program converts all relocatable addresses (specified by relocation bits in the object module) by adding load point of this program to the address and stores on 2310 disk files (file protected). Internal buffering is used to achieve this relocation. In actual practice LOAD subroutine moves 9 words of object module and calls RLD subroutine to relocate. This RLD relocates the code and leaves it in another buffer DLIST and calls WRTCD subroutine to copy the relocated code buffer DLIST into the big buffer CIWC. Whenever this is full, it is copied onto the 2310 disk.

LOAD program calls MOVEW subroutine to move object module code into small buffer DBUF and also TSTBF to test for the availability of data in the object module buffer. (See block diagram of buffers). Whenever a block in the object module is completed it is copied to disk if necessary (i.e., if there are no more blocks) and a sector is read from the disk corresponding to the current address.

When the whole program is complete the load pointer is moved to the next entry until there are no more entries. (Entries marked as loaded are skipped).

The end is specified by the matrix pointer. At the end of Pass 2 when all the programs are finished a message is printed stating LOAD COMPLETED.

CORE LOAD EXECUTED FOR MODE 2 CORE LOAD BUILD

| CORE LOAD NAME | MAINLINE RELOCATABLE NAME |
|---|---|
| CLBLD | CONL |

The program flowcharts for the MODE 1 CORE LOAD BUILDER are as follows.

| | |
|---|---|
| CONL | Control Record Analyzer |
| Type | Mainline program (FORTRAN) |

-continued

| | |
|---|---|
| Function | To read loader control cards and process them. |
| Availability | Relocatable area. |
| Subprograms called | LOADR, LOADA |
| Remarks | This is the mainline program that reads all the loader control cards and makes entries in the load matrix. This recognizes 5 types of cards. 1) LOADR; 2) LOADA, 3) ASSIGN; 4) COMMON; 5) INCLUDE and 6) END. More than one program can be loaded within the same job. An END card terminates loading. |
| Limitations | All object modules are on 2311 disk for loading. |
| Note: | Absolute loader is not implemented. |
| Flow Chart | Described in TABLE XXVIIIa |
| LOADR | |
| Type | Subroutine |
| Function | To load relocatable programs from object module on to 2310 disk file in core image format. |
| Availability | Relocatable area. |
| Use | CALL LOADR |
| Subprograms called | FIND1, PREF1, PENT1, CMAP, ILEVA, ERDEF, MARKL, LOAD, RDBIN, RDBUF. |
| Remarks | This is called by control card analyzer after reading all the control cards and making entries in the load matrix. This is the main program that calls the other programs to load. If the core size exceeds the limit, or the object module is not found on the 2311 disk, the load function is aborted and a message is printed. |
| Flow Chart | Described in TABLE XXVIIIb |

TABLE XXVIIIa
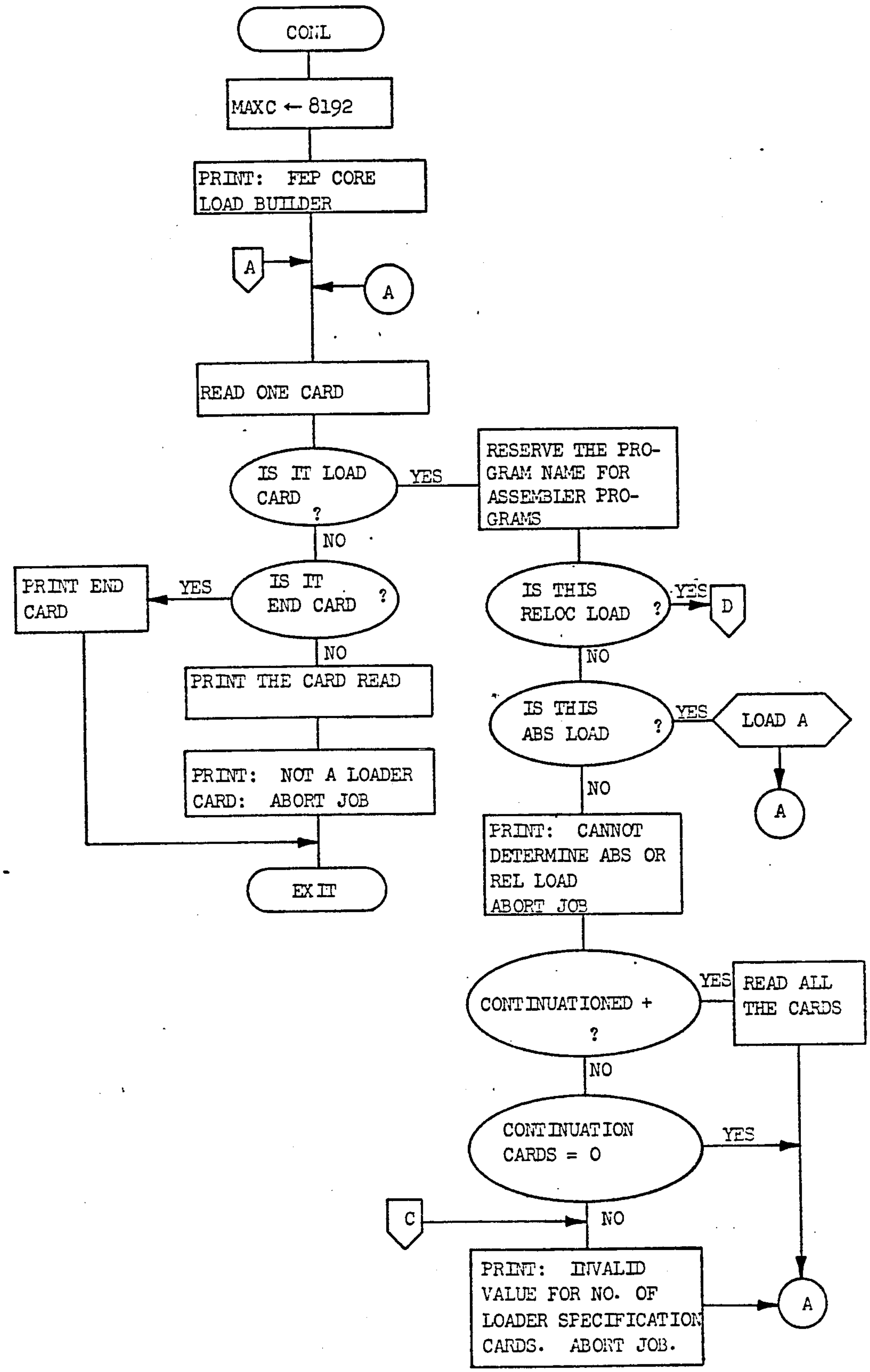

TABLE XXVIIIa (cont'd)
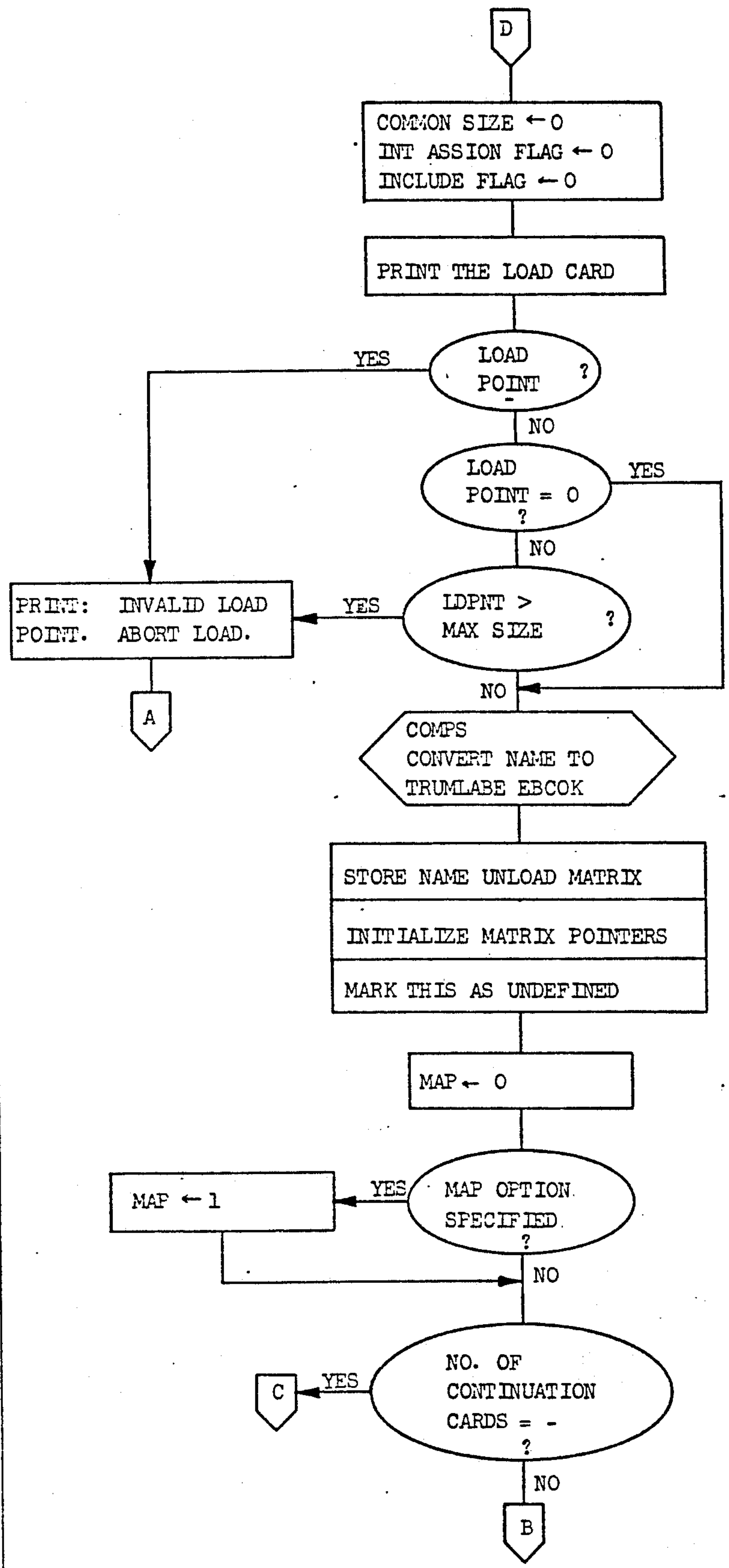

TABLE XXVIIIa (cont'd)
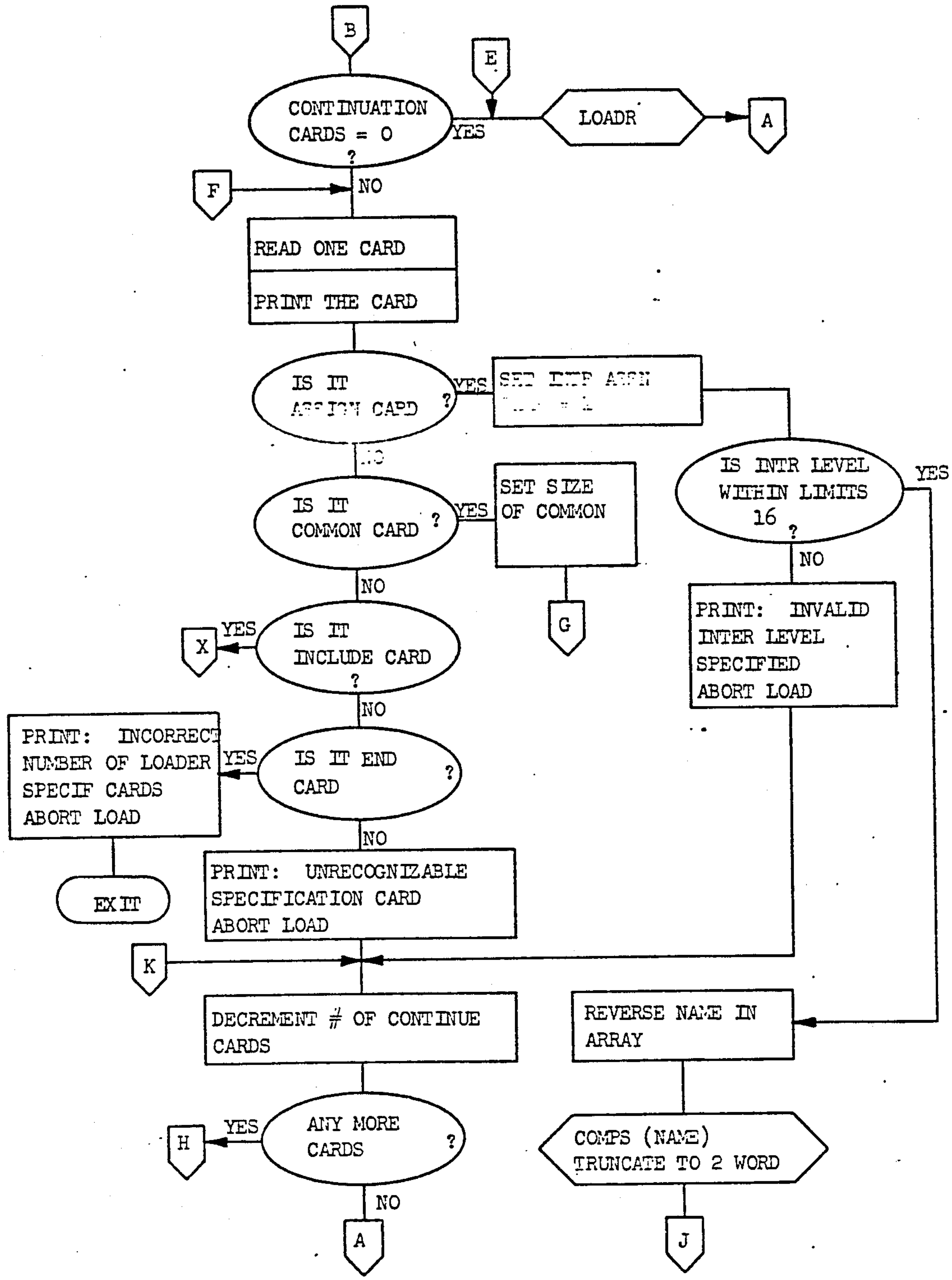

TABLE XXVIIIa (cont'd)
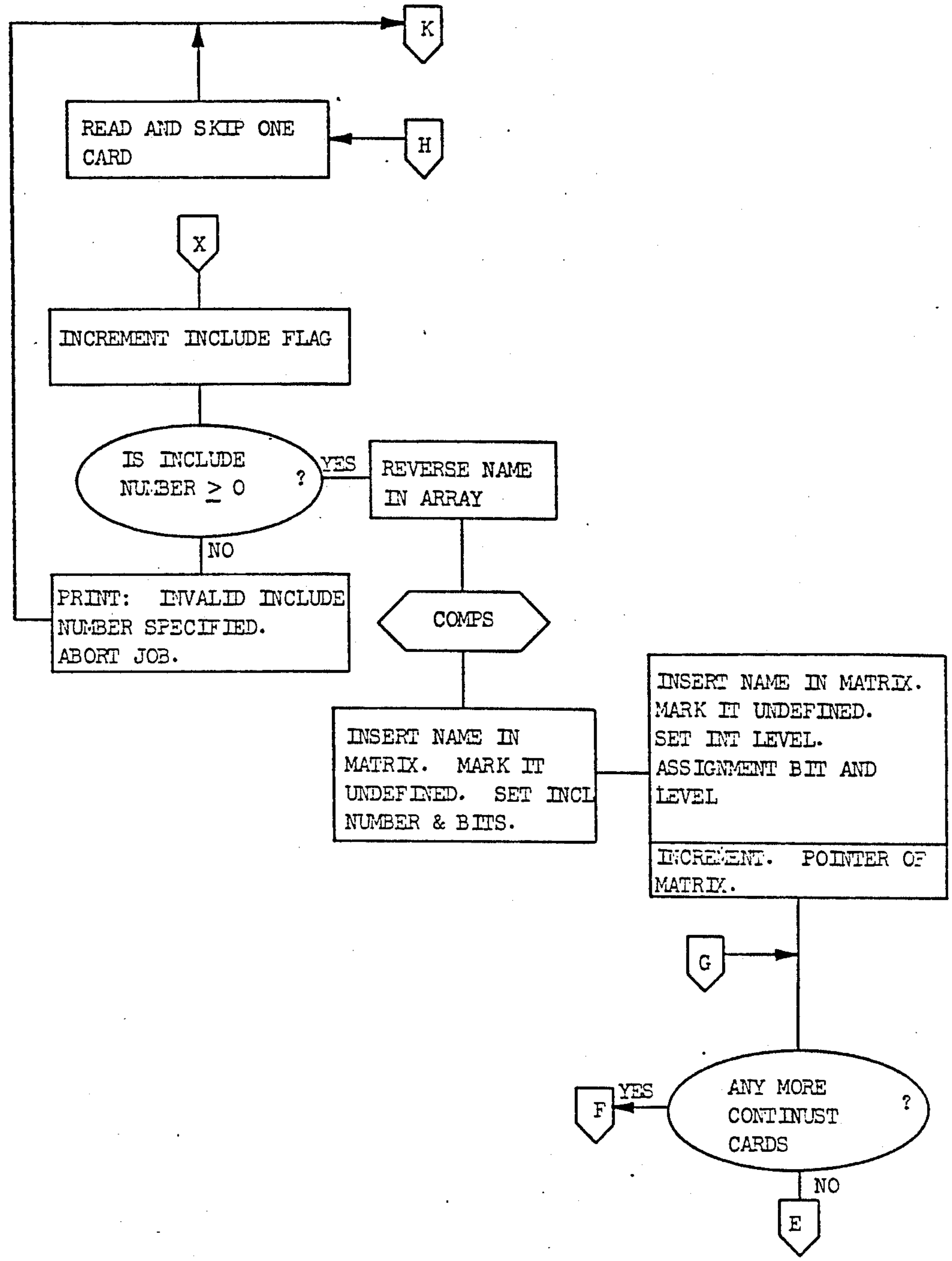

TABLE XXVIIIb
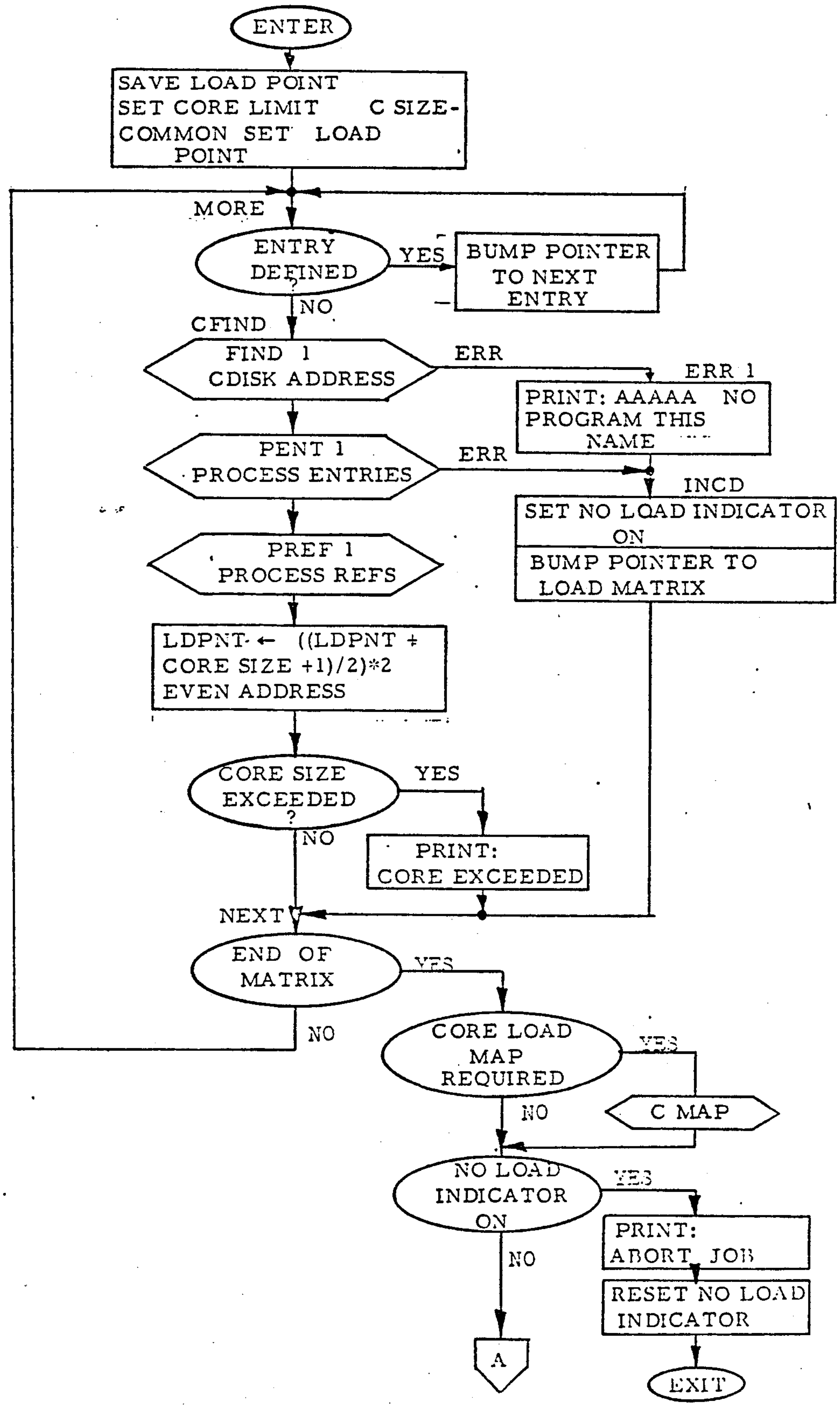

TABLE XXVIIIb (cont'd)
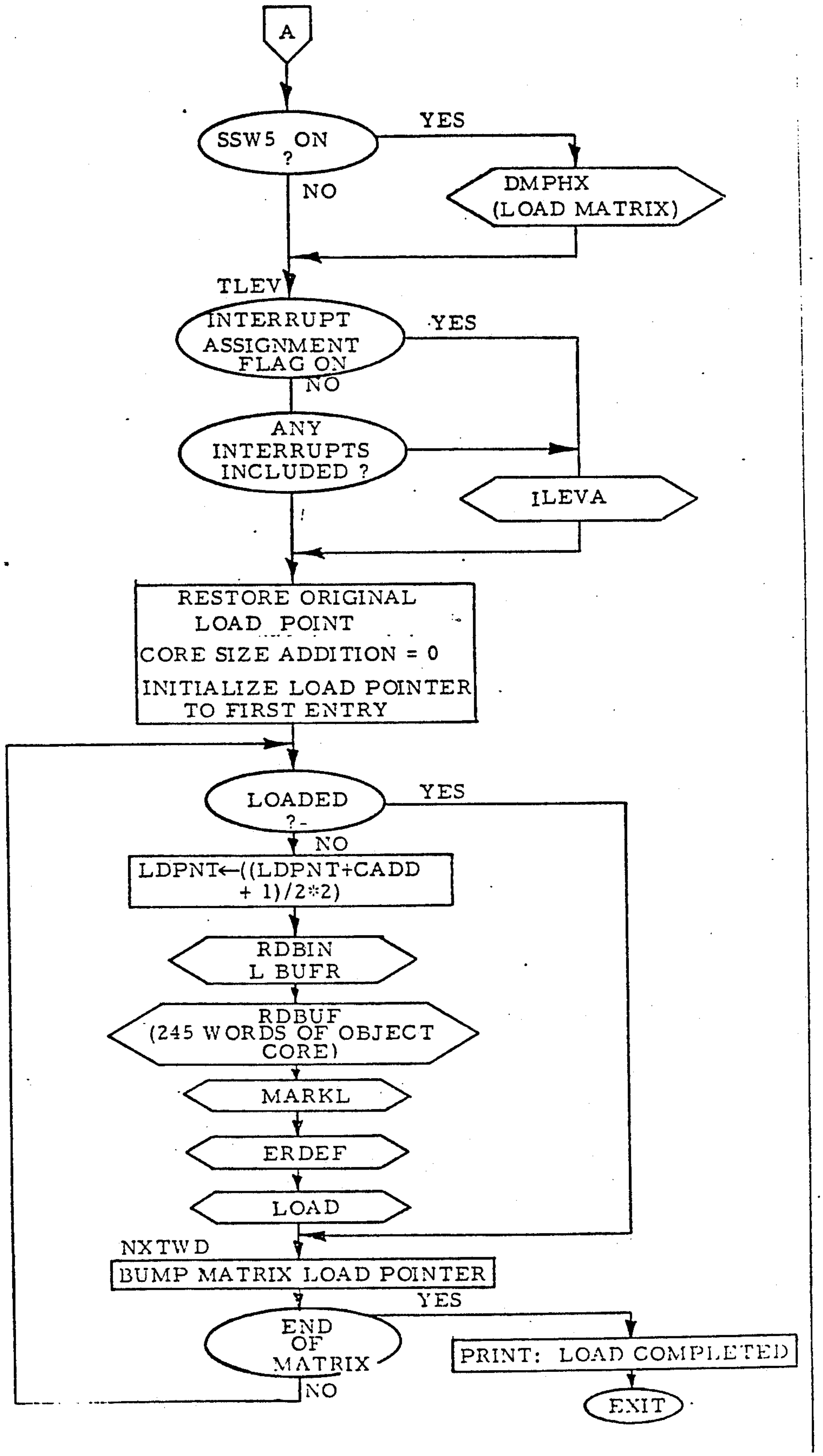

FIND1

| | |
|---|---|
| Type | Subroutine |
| Function | To find the disk address physical file number and record number of the object module of a program on 2311 files. |
| Availability | Relocatable area. |
| Use | Call FIND1 |
| Subprograms called | SPMOC, ISRCH, RDRC, KDISK |
| Remarks | The name of the program whose disk address has to be found is picked up from the location pointed by the Load Matrix definition pointer, converted from truncated EBCDIC and then searched in index files. If the search is successful, positive value is returned in the accumulator, else zero. |
| Limitations | System symbols are used for pointers and values rather than using arguments in call. |
| Flow Chart | Described in TABLE XXVIIIc |

TABLE XXVIIIc
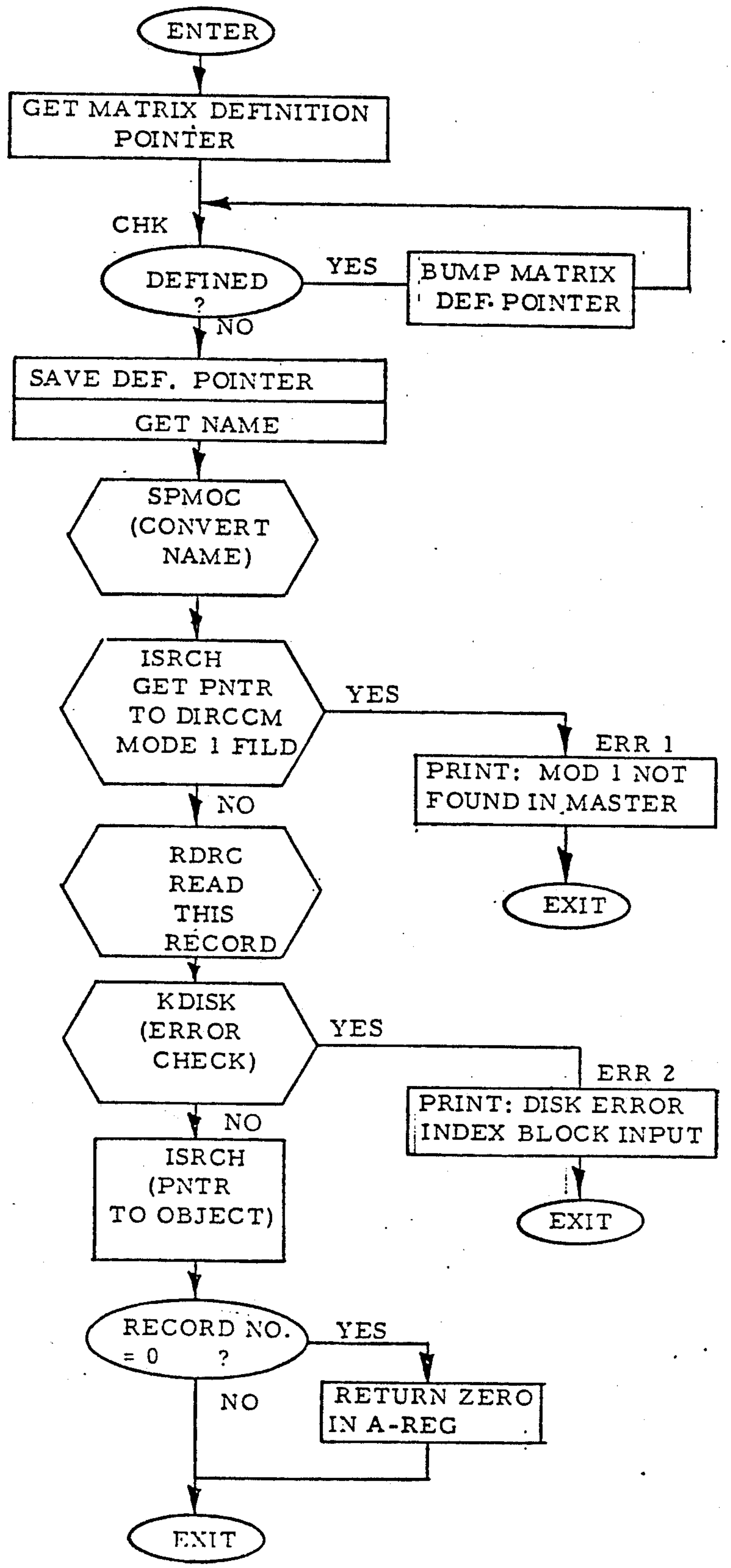

PENT1

| | |
|---|---|
| Type | Subroutine |
| Function | To process entry points in a program during Pass 1 of loader to set up load matrix. |
| Availability | Relocatable area. |
| Use | CALL PENT1 |
| Subprograms called | RDBIN, RDBUF |
| Remarks | This reads the object module from the 2311 disk and processes all entries by assigning absolute addresses and storing file and record numbers for multiple entries. An error message is printed if there are multiple entry points with the same name. |
| Limitations | Usage of system symbols instead of passing arguments with call. |
| Flow Chart | Described in TABLE XXVIIId |

TABLE XXVIIId
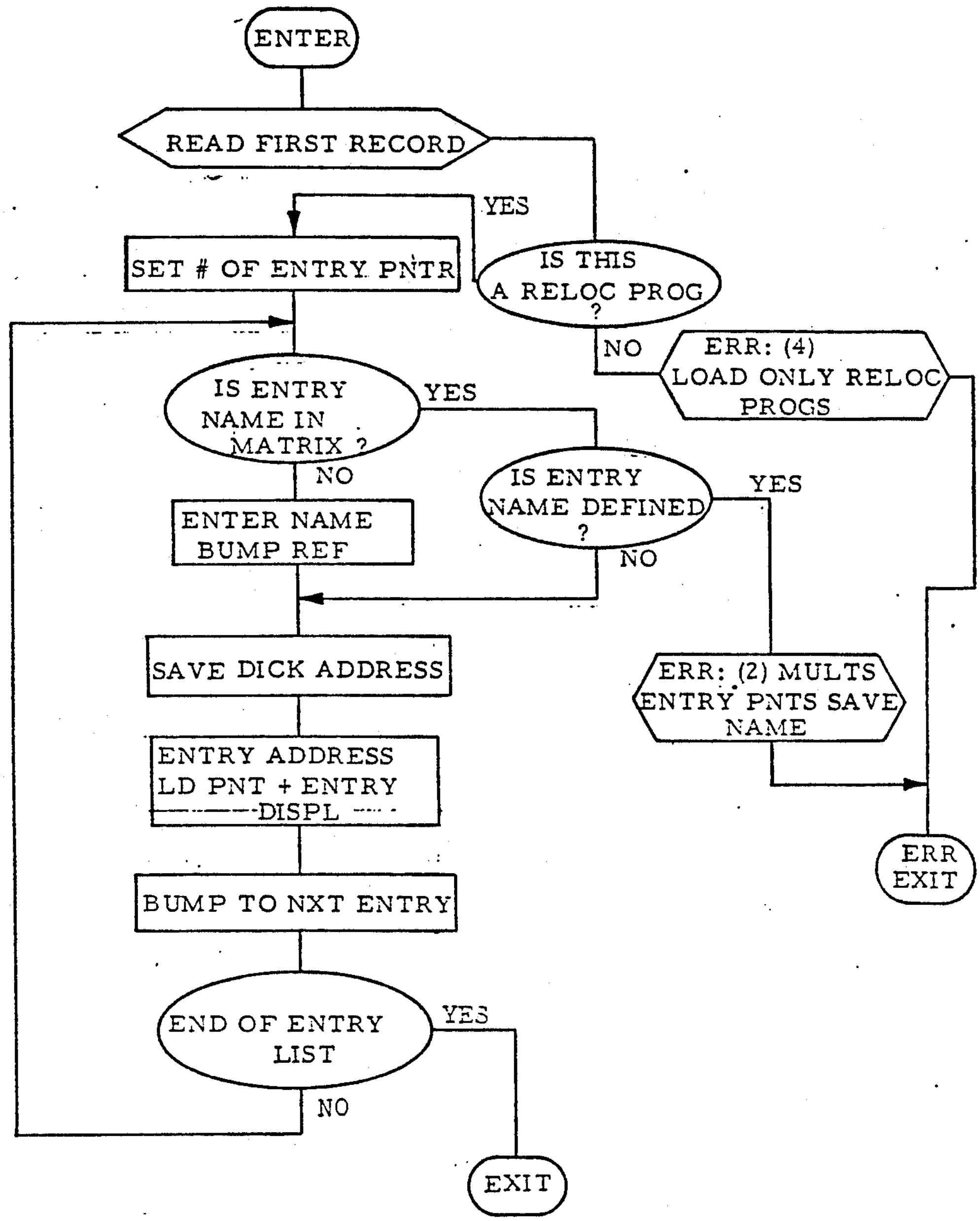

PREF1

| | |
|---|---|
| Type | Subroutine |
| Function | To process external references in a relocatable program during Pass 1 of loader. |
| Availability | Relocatable area. |
| Use | Call PREF1 |
| Subprograms called | None. |
| Remarks | This uses the object module read by PENT1 program. While processing the references, the load matrix is checked to make sure that no multiple entries are made for the same subroutine. After an entry is made in the load matrix, it is marked as undefined and the matrix reference pointer is bumped. |
| Flow Chart | Described in TABLE XXVIIIe |

CMAP

| | |
|---|---|
| Type | Subroutine |
| Function | To print out core load map. |
| Availability | Relocatable area. |
| Subprograms called | SPMOC |
| Use | CALL MAP |
| Remarks | The core load map is printed out if "MAP" option is specified in loader control cards. Column headings are printed and the names and the loading points (in HEX) and the interrupt level (if assigned) are printed in one line. The available core and the size of the common area are also printed at the end. |
| Flow Chart | Described in TABLE XXVIIIf |

TABLE XXVIIIe
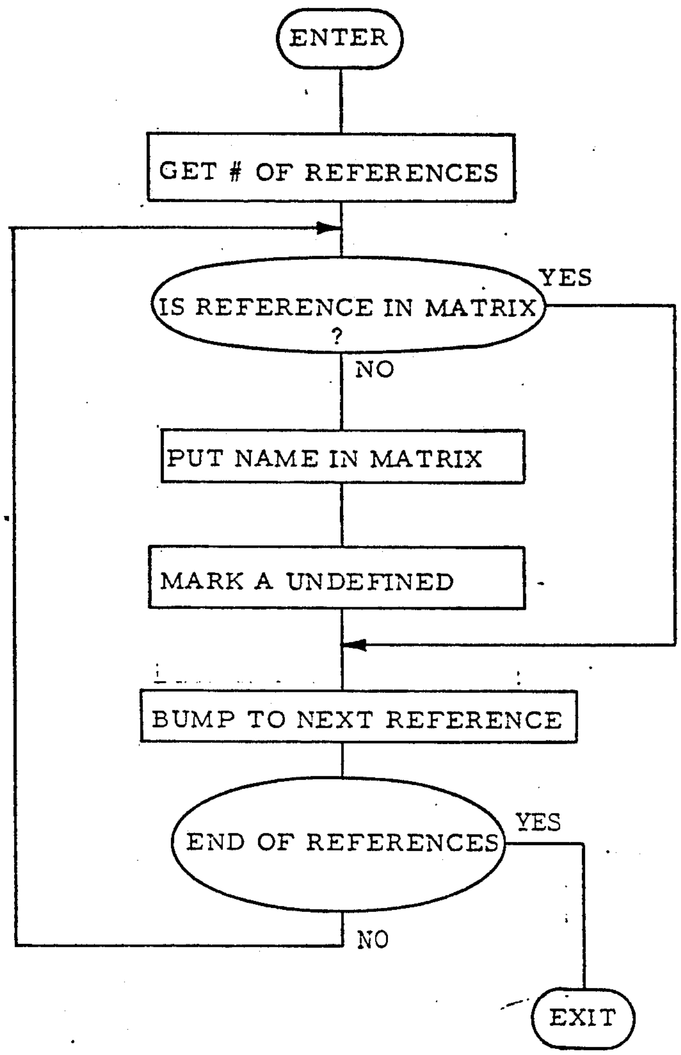

TABLE XXVIIIf
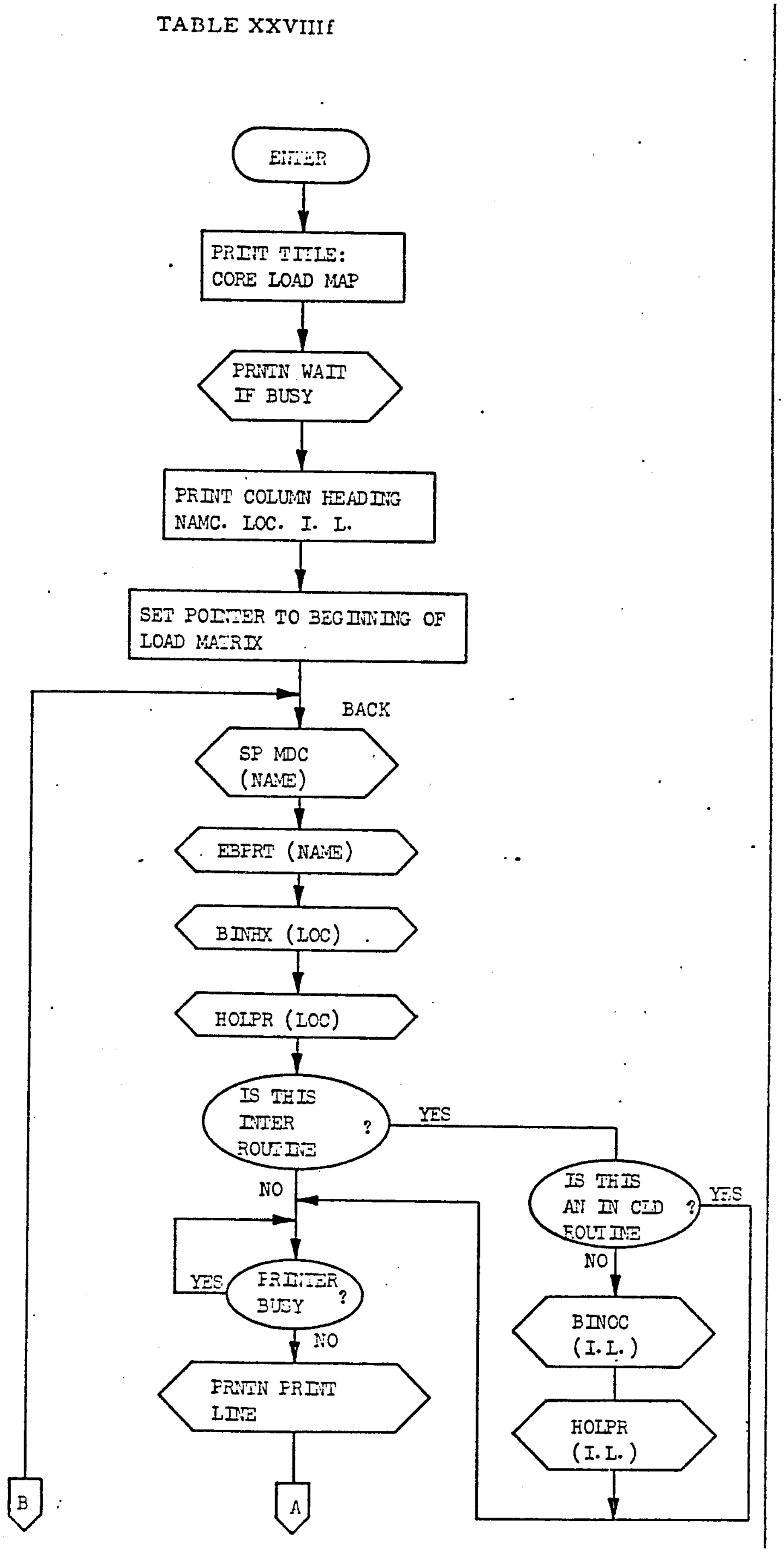

TABLE XXVIIIf (cont'd)
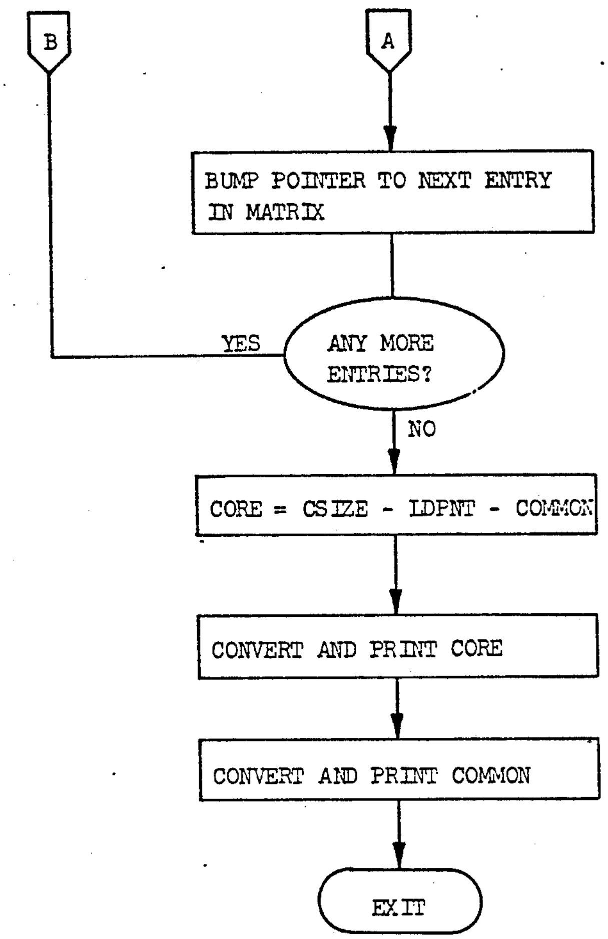

ILEVA

| | |
|---|---|
| Type | Subroutine |
| Function | To set up transfer vectors in the trap locations for the programs assigned to interrupt levels. |
| Availability | Relocatable area. |
| Use | CALL ILEVA |
| Remarks | This sets up the XSW instruction and the loadpoint of the program in the trap locations assigned for that interrupt level. |
| Limitations | The maximum number of levels that can be assigned is 16. |
| Flow Chart | Described in TABLE XXVIIIg |

MARKL

| | |
|---|---|
| Type | Subroutine |
| Function | To mark all the entries of the program currently being loaded as loaded. |
| Availability | Relocatable area. |
| Use | CALL MARKL |
| Remarks | This marks all the entry points of the current program as loaded by placing a negative value in the file number for that entry. The number of entries and the names are picked up from the object module read earlier by LOADR just before calling this. |
| Flow Chart | Described in TABLE XXVIIIh |

TABLE XXVIIIg
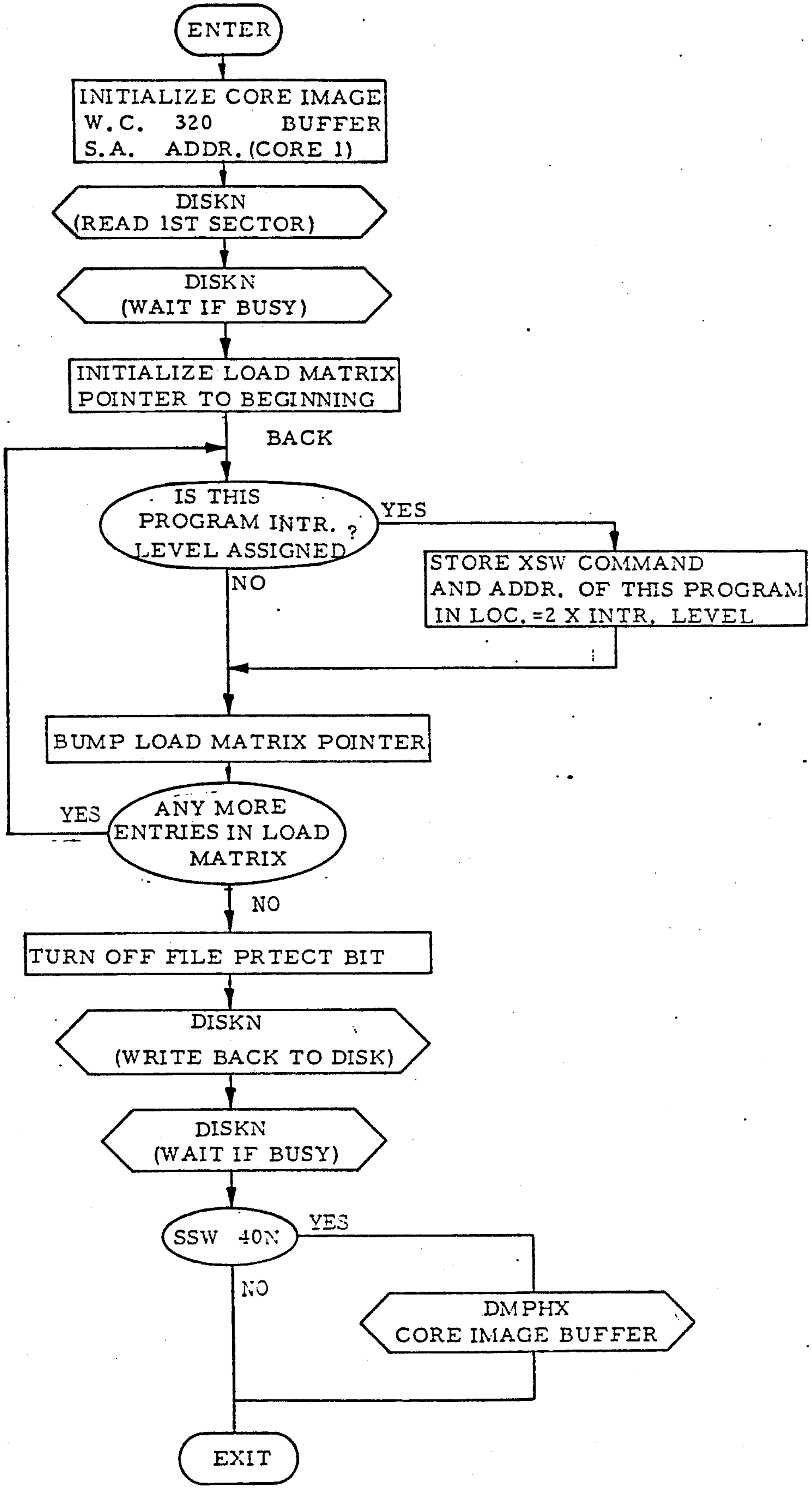

TABLE XXVIIIh
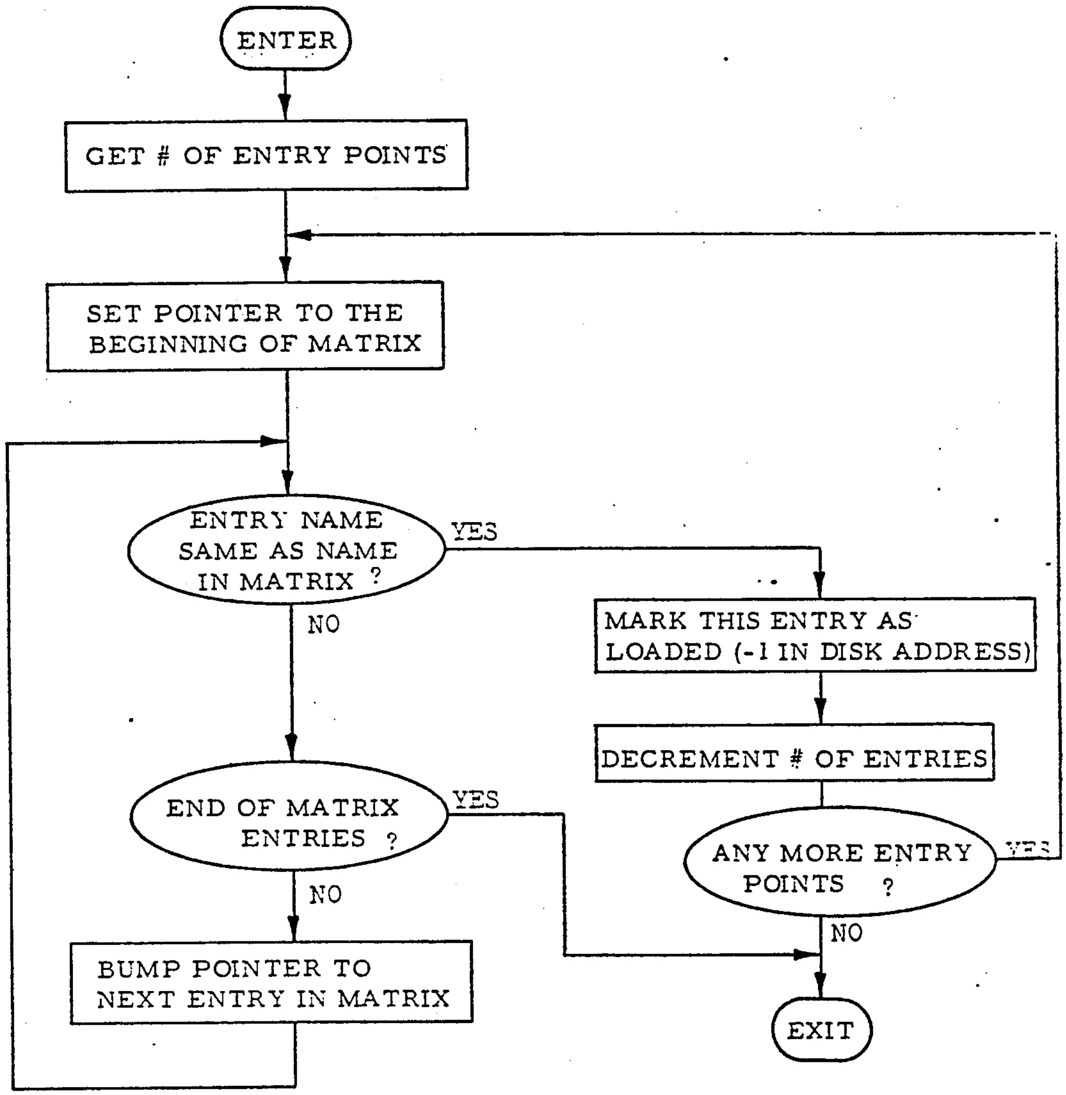

ERDEF

| | |
|---|---|
| Type | Subroutine. |
| Function | To establish definitions for all the external references in a program. |
| Availability | Relocatable area. |
| Use | CALL ERDEF |
| Remarks | The external references are picked up from the object module which has already been read into record buffer and compared with the names in the load matrix. When a match is found the loading point is copied into the RLIST. The addresses are in the same order as the external references. |
| Flow Chart | Described in TABLE XXVIIIi |

LOAD

| | |
|---|---|
| Type | Subroutine |
| Function | To load relocatable programs after converting to absolute. |
| Availability | Relocatable area. |
| Use | CALL LOAD |
| Subprograms called | RLD, TSTBF, MOVEW |
| Remarks | This is called by LOADR to load programs once for each program in the load matrix (not to be confused with entries). This sets up the sector address and displacement within the sector for load point, and also checks for word count in the data blocks of object module. The data is moved into another buffer (DBUF) and RLD is called to convert this data to absolute. |
| Flow Chart | Described in TABLE XXVIIIj |

TABLE XXVIIIi
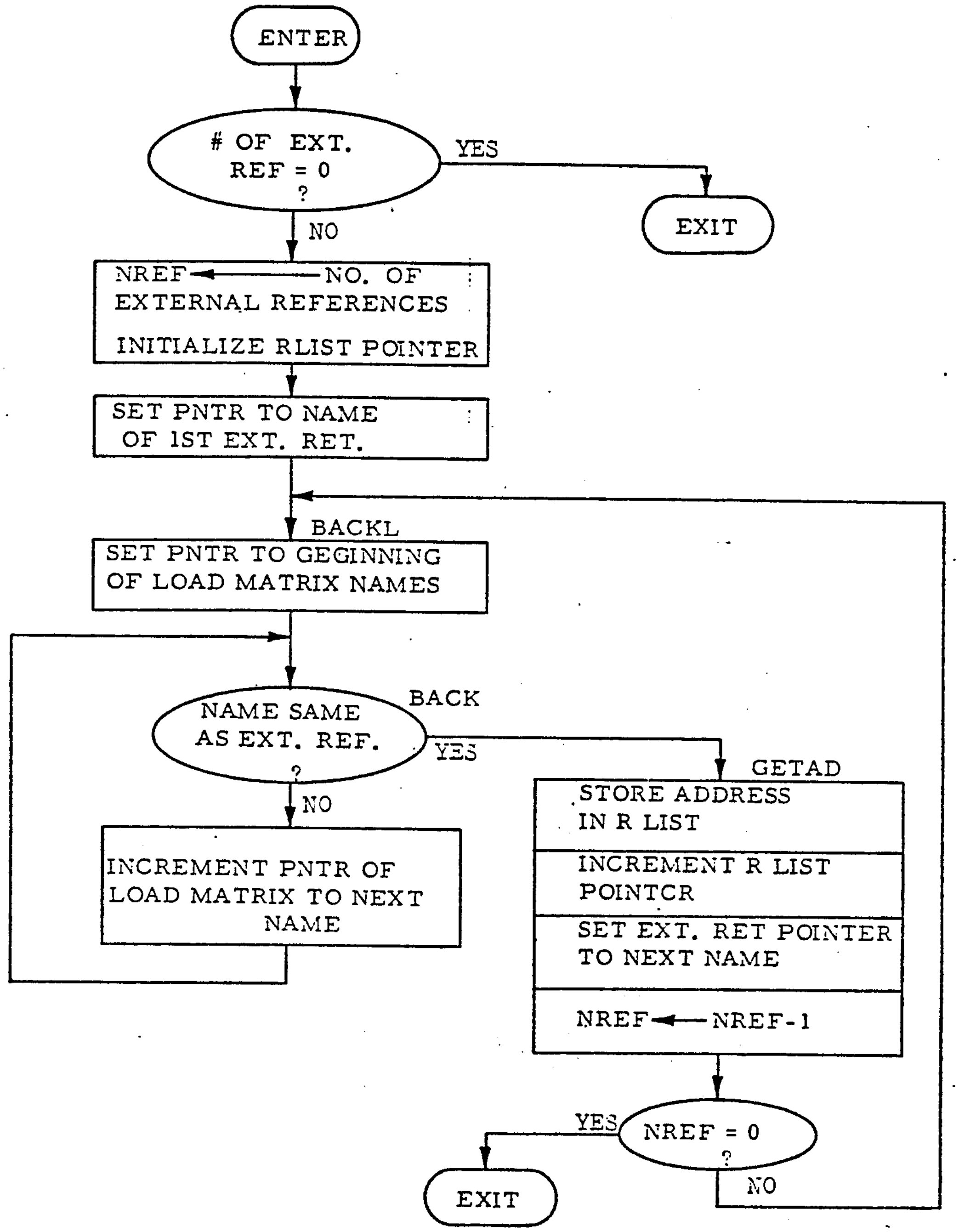

TABLE XXVIIIj
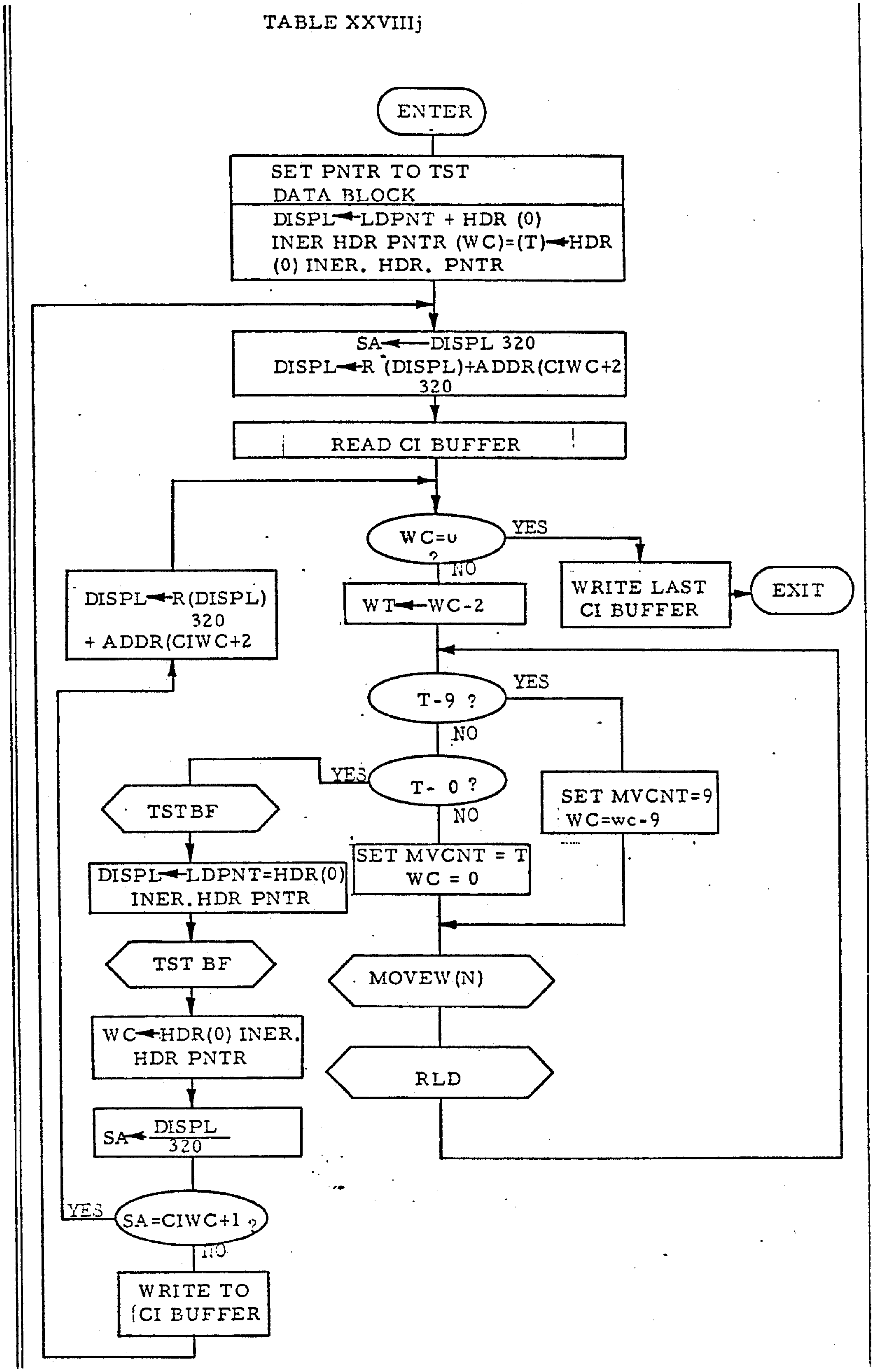

RLD

| | |
|---|---|
| Type | Subroutine |
| Function | To convert relocatable object code into absolute code. |
| Availability | Relocatable area. |
| Use | CALL RLD |
| Subprograms called | WRTCD |
| Remarks | This converts the relocatable addresses to absolute address by adding load point to the addresses and by picking the absolute address from RLIST for external references. The relocation word specifies the type of conversion to be done and if any. (See diagram of buffers used). |
| Limitations | The buffers should be initialized and set ready before calling this program. |
| Flow Chart | Described in TABLE XXVIIIk .. |

MOVEW

| | |
|---|---|
| Type | Subroutine |
| Function | To move data from one buffer to another small buffer (fixed location). |
| Availability | Relocatable area. |
| Use | CALL MOVEW |
| Subprograms Called | TSTBF |
| Remarks | This always moves data into a fixed area from RECBF, the starting address of the data being moved, picked up from a pointer. (RECBF-1). |
| Limitations | The maximum number of words that can be moved at one time is 9. This is dictated by the size of the buffer. |
| Flow Chart | Described in TABLE XXVIIIl |

TABLE XXVIIIk
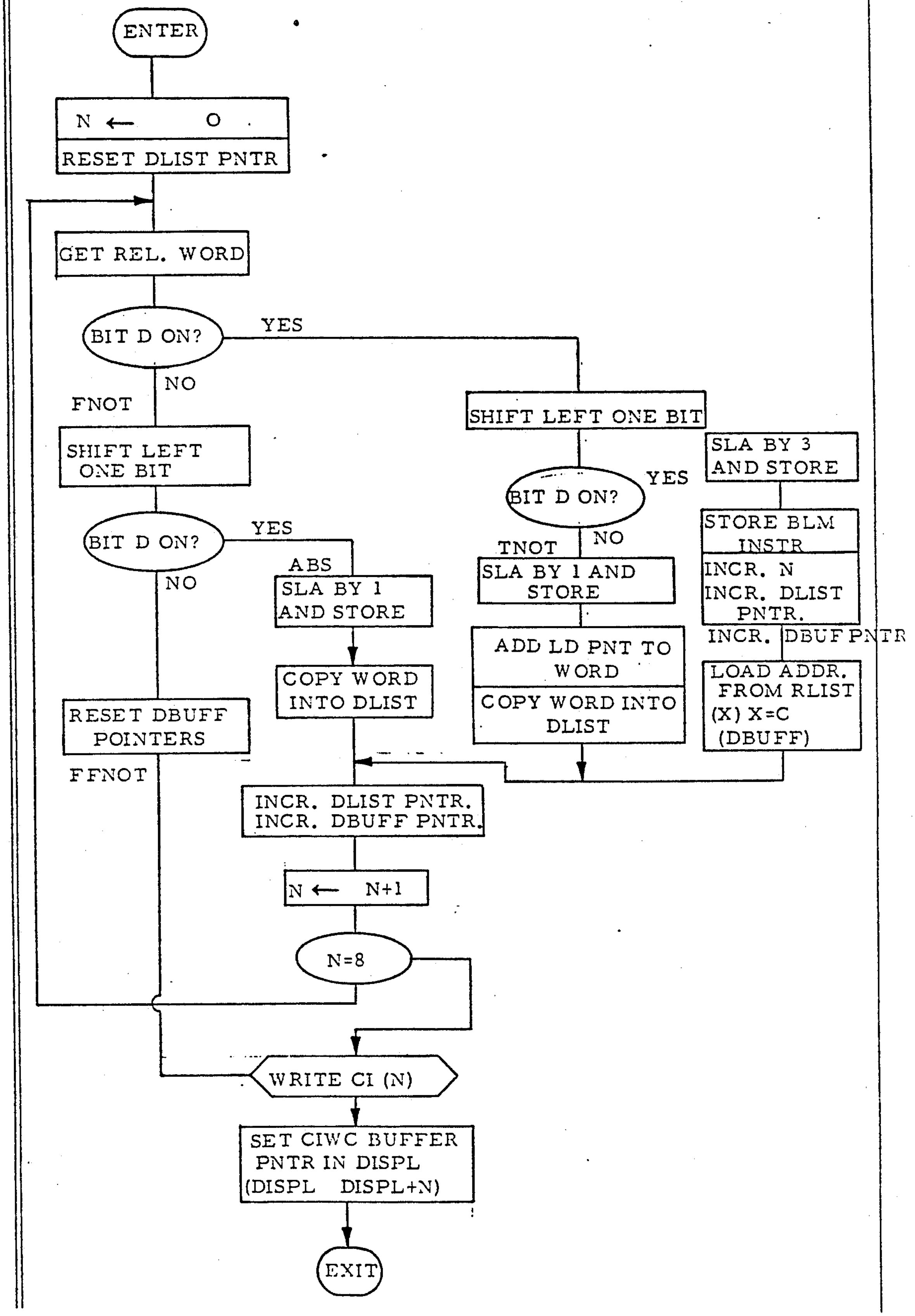

TABLE XXVIIII
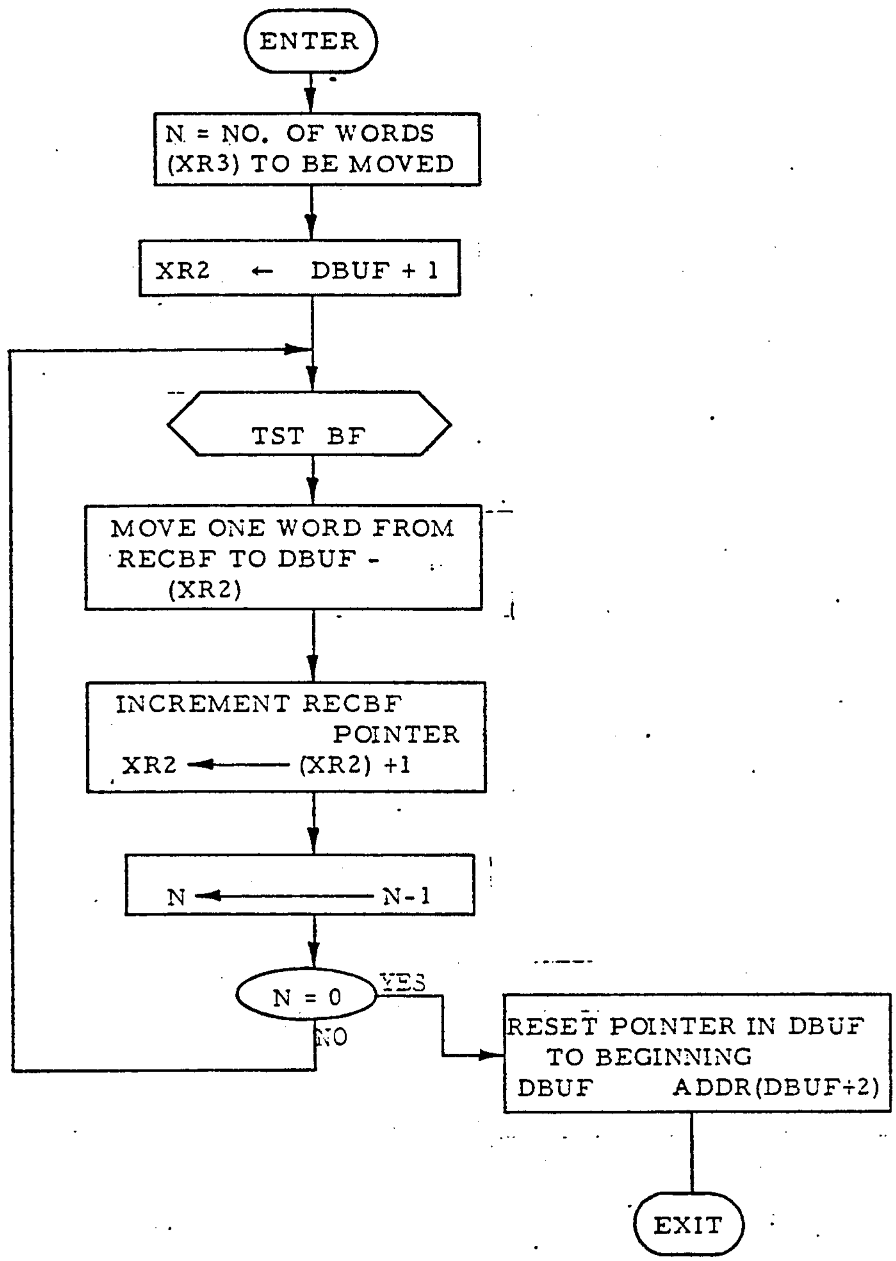

TSTBF

| | |
|---|---|
| Type | Subroutine |
| Function | To test if there are any words available in the buffer and if not, to read the next record into the buffer. |
| Availability | Relocatable Area. |
| Use | CALL TSTBF |
| Subprograms called | RDBUF |
| Remarks | A dump of the record can be obtained with SSW 4 on. |
| Flow Chart | Described in TABLE XXVIIIm |

COMPS

| | | | |
|---|---|---|---|
| Type | Nonrecursive Subroutine | | |
| Function | Maps five EBCDIC characters into right justified name code (30 bits). | | |
| Availability | Relocatable area. | | |
| Use | Call | COMPS | |
| | DC | ENAME | 5 EBCDIC characters |
| | DC | NAME | Resultant packed code. |
| Remarks | The reverse transformation is SPMOC. | | |
| Flow Chart | Described in TABLE XXIVl | | |

TABLE XXVIIIm
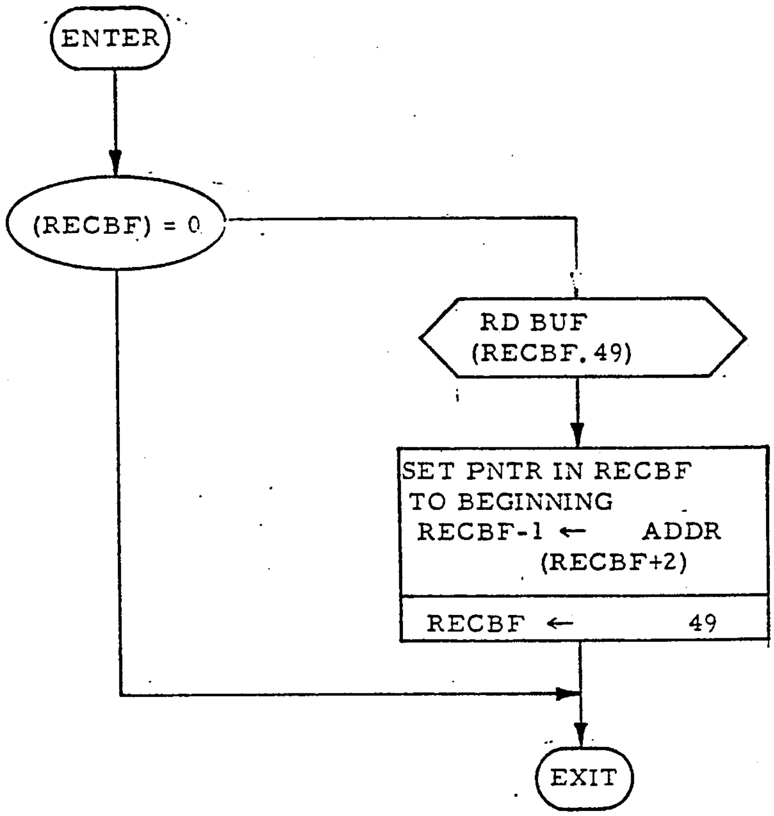

SPMOC

| | |
|---|---|
| Type | Nonrecursive Subroutine |
| Function | Maps right justified name code into 5 EBCDIC characters. |
| Availability | Relocatable area. |
| Use | Call SPMOC<br>DC NAME Name code<br>DC ENAME 5 character EBCDIC |
| Remarks | The reverse transformation is COMPS |
| Flow Chart | Described in TABLE XXIVm |

WRTCD

| | |
|---|---|
| Type | Nonrecursive Subroutine |
| Function | Copies relocated code into core image buffer |
| Availability | Relocatable area. |
| Use | CALL WRTCD<br>Index registers 2 and 3 should be set to the starting address of the block of words and the word count respectively. |
| Subprograms called | MOVE, DISKN |
| Remarks | Blocking and spanning is taken care of and the buffer is copies onto the disk whenever it is full. |
| Flow Chart | Described in TABLE XXVIIIn |

TABLE XXVIIIn
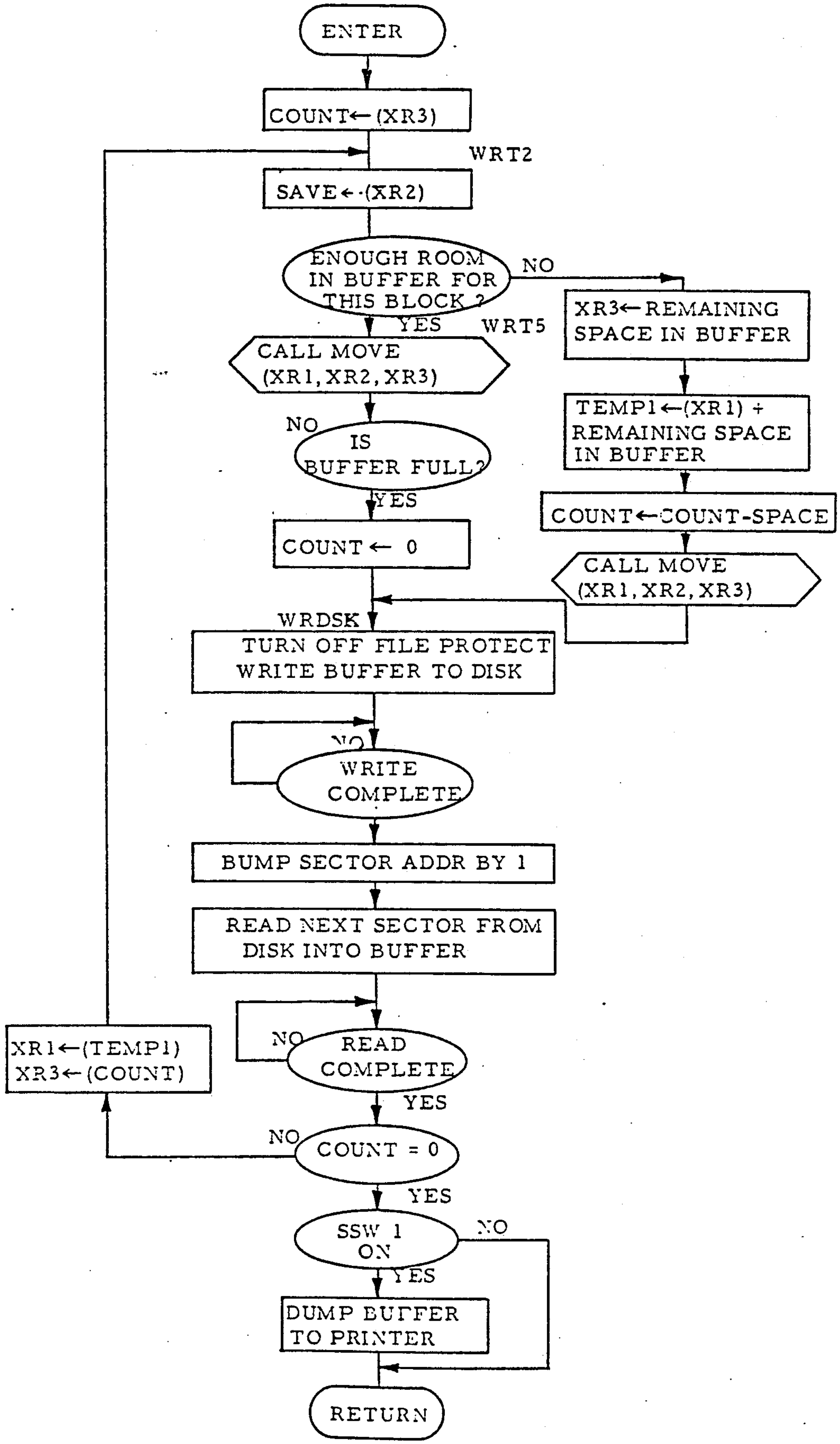

TABLE XXIX
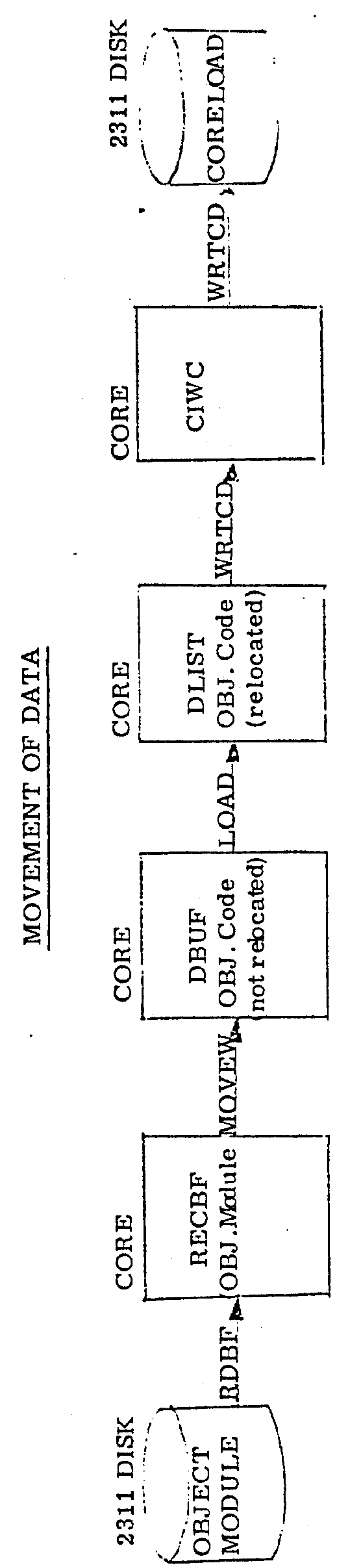
The above TABLE XXIX shows the movement of data from the object module to core load and the core load programs utilized for this purpose.

LOAD MATRIX DESCRIPTION (TABLES XXXa-XXXd)

TABLE XXXa

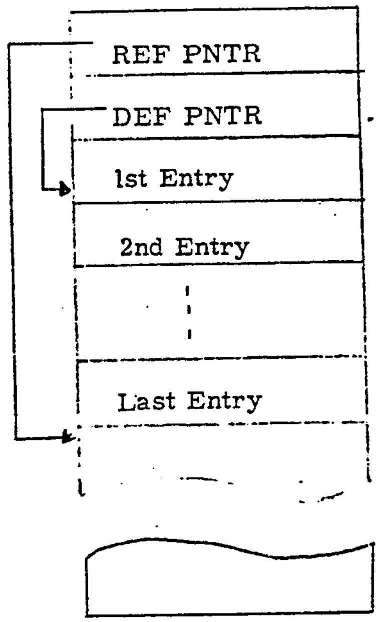

REF PNTR points to the next location for making an entry.

DEF PNTR points to the entry that is being processed currently.

Each entry has six words:

| | |
|---|---|
| Words 1 and 2 | Truncated EBCDIC name |
| Word 3 | Load point or address |
| Words 4 and 5 | Disk address (File and record number on 2311 files) |
| Word 6 | Bit 0 - off - nothing<br>Bit 0 - on - This program is assigned to interrupt load.<br>Bit 4 through 15 - interrupt level of this program. |

DEF PNTR is initialized to the first entry at the beginning of Pass 1 and Pass 2.

Total sixe of Load Matrix is 1200 words.

TABLE XXXb

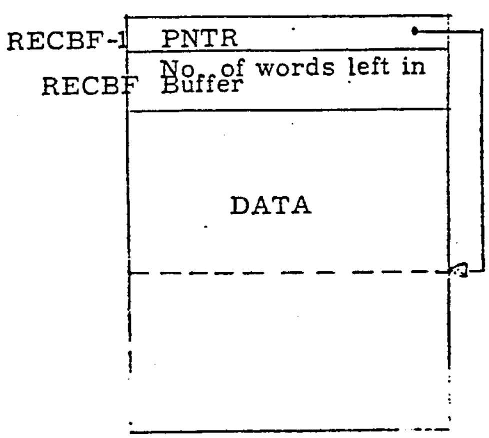

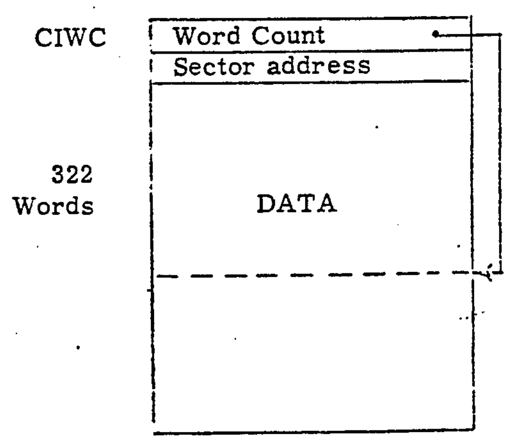

CIWC - First word in CIWC points to the word where data has to be copied. When the whole buffer is copied onto disk, the sector address is incremented to the next sector and then read into buffer. The pointer initialized to the first data word (CIWC + 2).

RECBF - RECBF keeps count of the number of data words still available in the buffer and the word before that points to the next available data word. Whenever the count is zero, the next record is read into the buffer by MOVEW and the pointer and the count are initialized to RECBF + 1 and the number of data words respectively.

TABLE XXXc

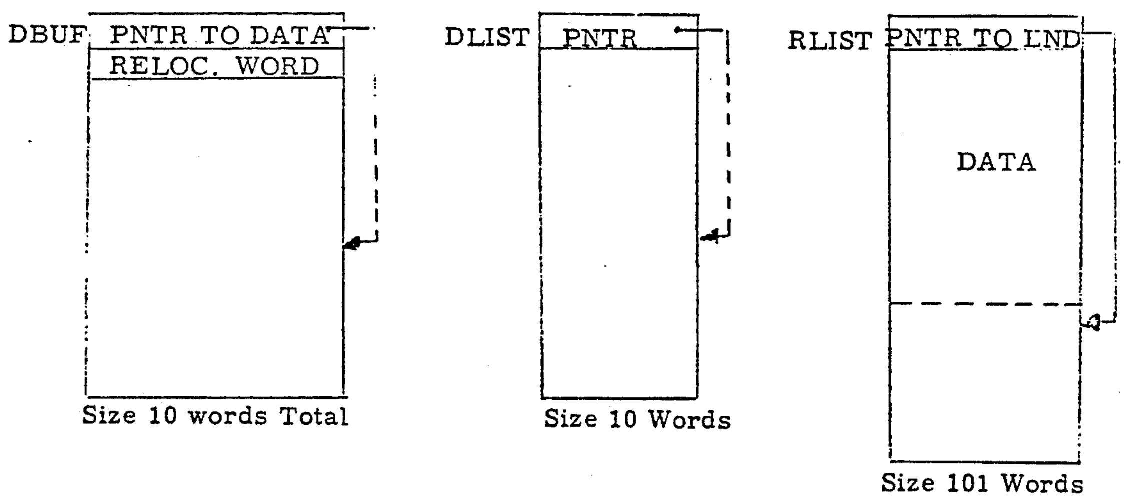

DBUC - Object code (relocatable)
DBUF initialized to DBUF + 2 and incremented as the data words are picked up DBUF+1 - will always be the relocation word.

DLIST - Buffer to hold the absolute code.
The first word is a pointer initialized to DLIST+1, and incremented as the data is stored into the buffer.
At the end the buffer content is copied to CIWC buffer.

RLIST - List containing the absolute addresses of external references for the program currently being loaded, in the serial order. (This is set up by ERDEF).
Pointer points to the end of the list (not used in this program).

TABLE XXXd

| | | |
|---|---|---|
| MODUL(6) | 30290 → 30295 | Module Name |
| INBLK(204) | 30296 → 30499 | Index blocks to read 2311 files |
| CADD | 30588 | Core size to be added |
| IRN | 30589 | Record number of object module |
| IFN | 30590 | File number of object module |
| IDATA(3) | 30591 → 30593 | Data of sector header |
| IFILA | 30592 | Sector address of 2310 file |
| ICONV | 30594 → 30595 | Truncated EBCDIC name |
| MAXC | 30596 | Maximum core size |
| ICOMN | 30597 | Size of COMMON |
| INAME | 30598 → 30600 | EBCDIC name of program |
| OBJBF | 30608 | Buffer for use of RDBIN |
| RECBF | 30666 | Buffer for object module |
| MATXB | 30974 → 32175 | Load Matrix |
| RLIST | 32176 → 32227 | External reference address list |
| DBUF | 32278 → 32287 | Object module data buffer |
| DLIST | 32288 → 32298 | Data list of relocated code |
| DISPL | 32299 | Displacement within the sector |
| LDPNT | 32300 | Load point of this core load |
| MAP | 32301 | Core load map option flag |
| INTRF | 32302 | Interrupt assignment flag |
| CIWC | 32446 → 32767 (322) | Core image buffer area |

SEGCL

| | |
|---|---|
| Type | Process mainline program (Segmented core load builder). |
| Function | This program combines the already linked MODE 1 for a 2540 with up to 5 data bases containing PROCEDURES and MDATA and makes all data bases absolute. A core load map and individual module maps are also generated. The eventual core layout is shown along with the flowchart. |
| Availability | The mainline core load is initiated from the console where the computer identification is input. |
| Limitations | This program will only work if the size of a single data base is less than 7925 words in length and if the MODE 1 size is less than 15,850 words. |
| Flowchart | Described in TABLE XXXIa. |

TABLE XXXIa
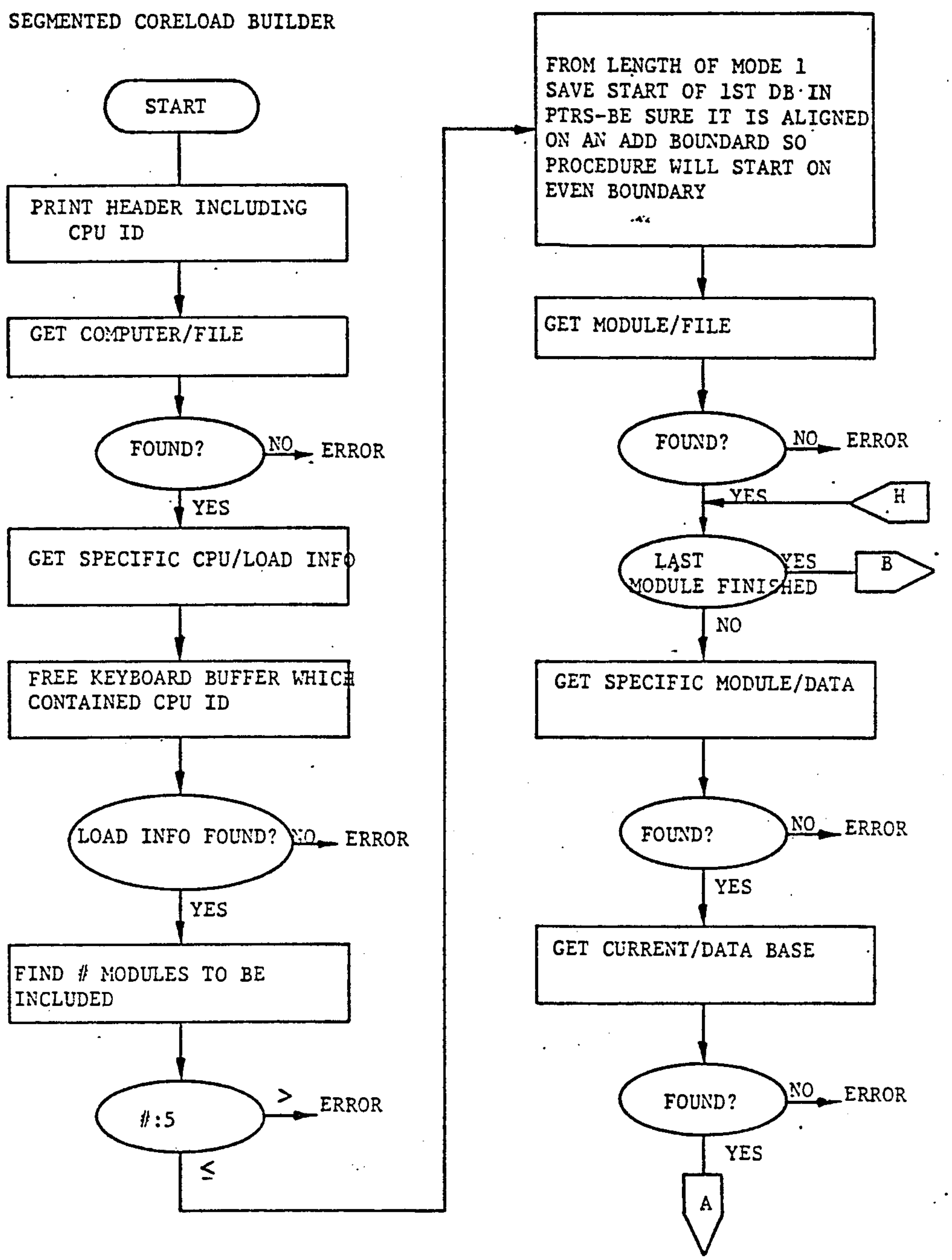

TABLE XXXIa (cont'd)
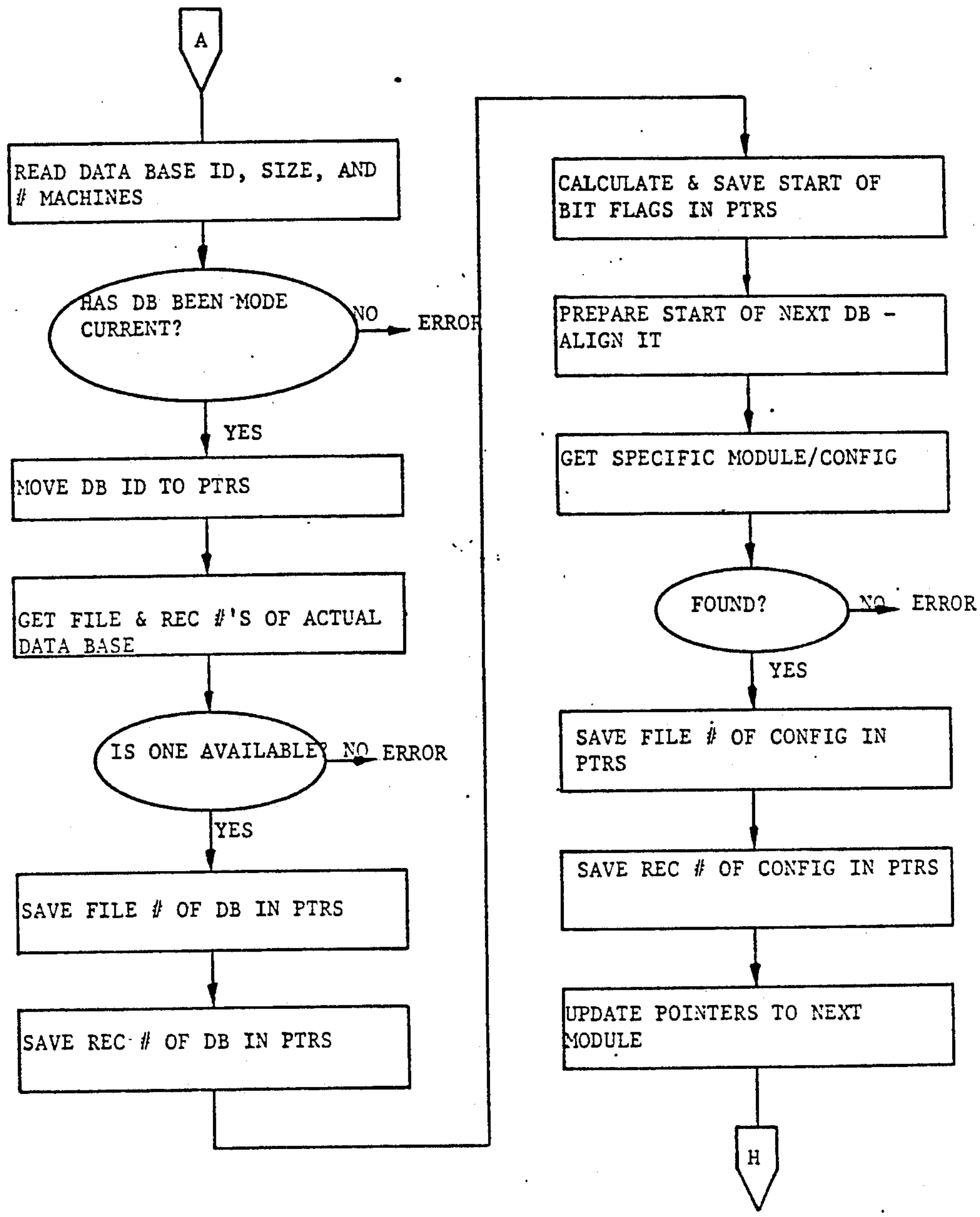

TABLE XXXIa (cont'd)
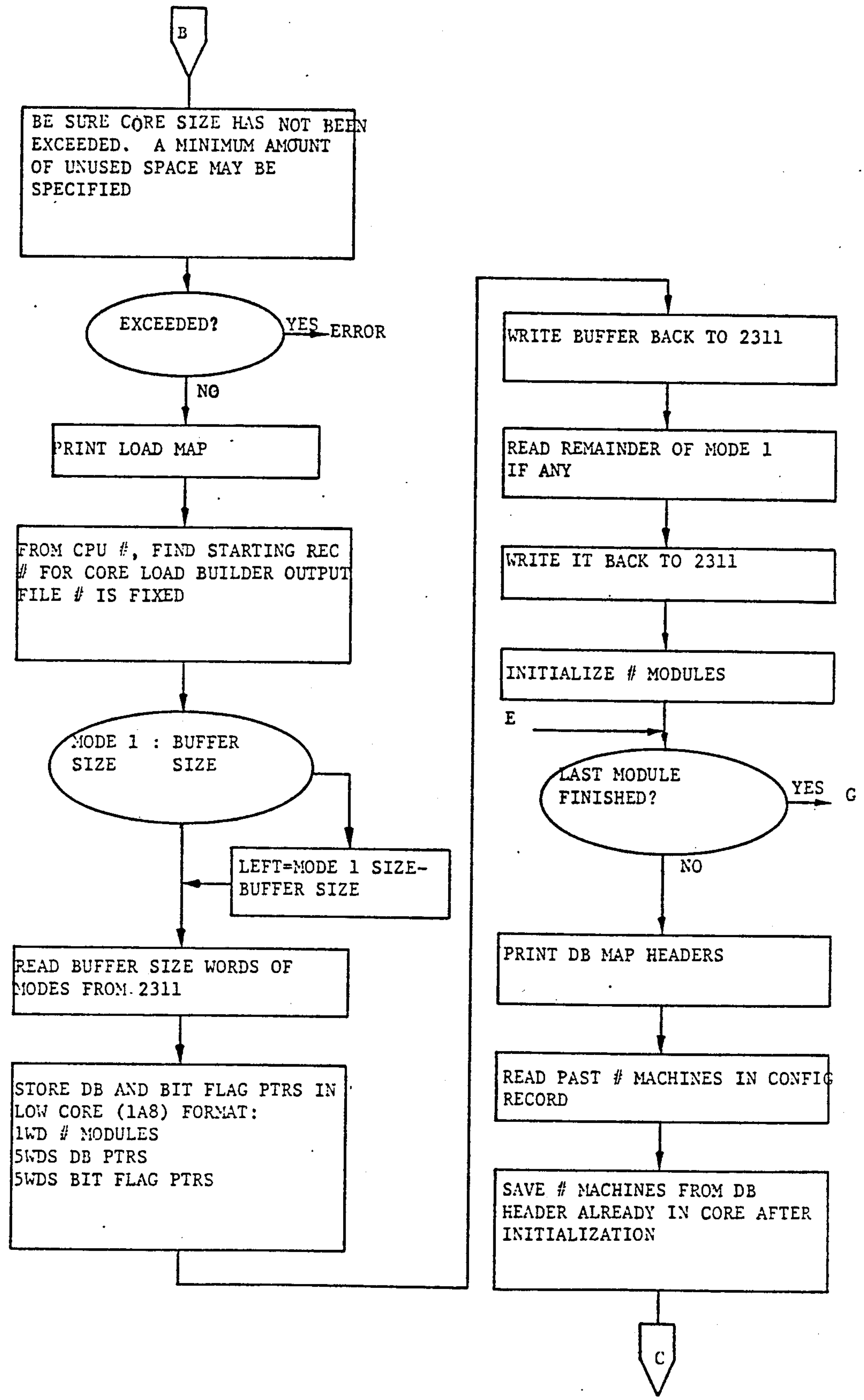

TABLE XXXIa (cont'd)
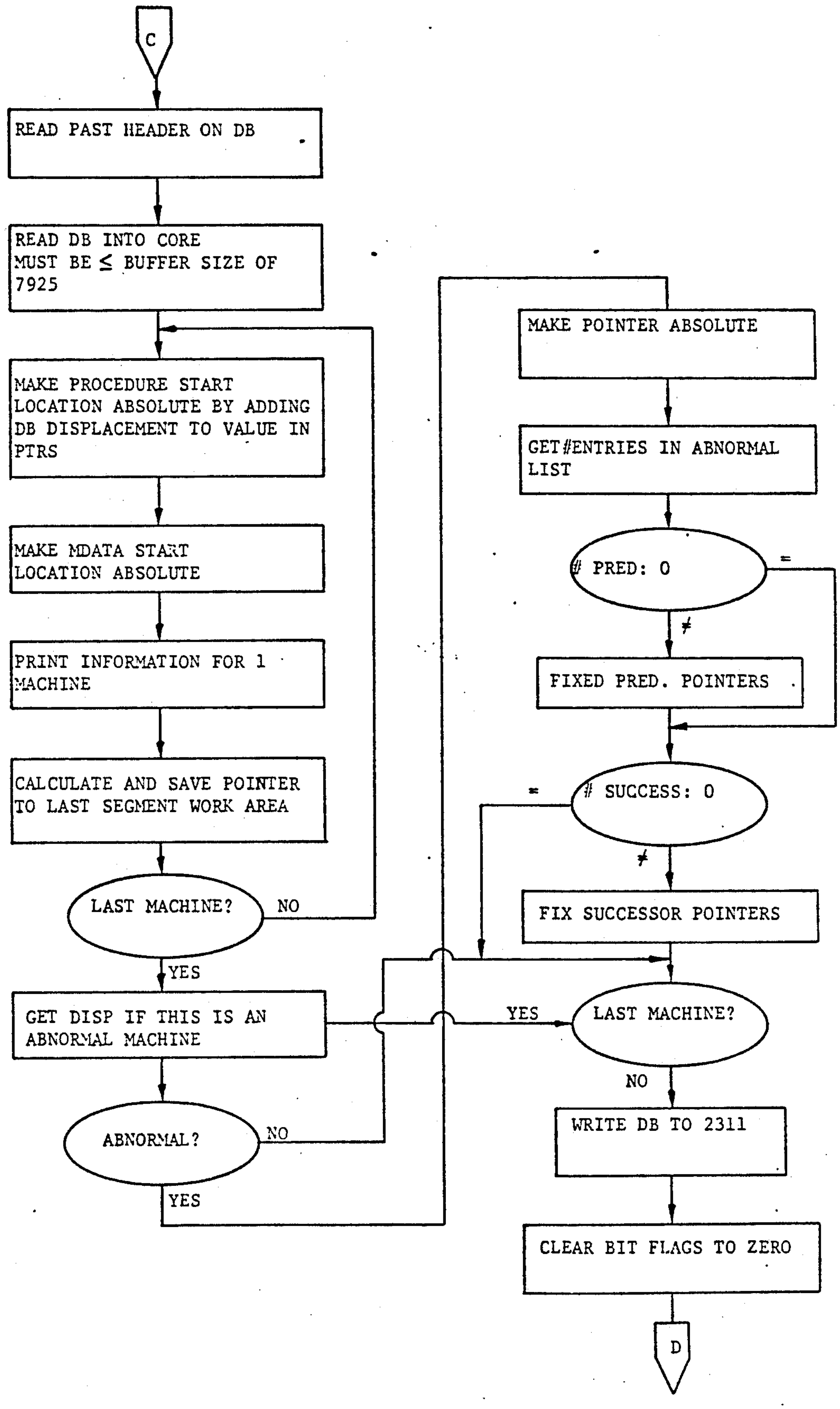

PTRS ARRAY
| MODULE # | DATA BASE ID | | | | | FILE # OF DB | REC # OF DB | DB START ADR | BIT FLAGS START ADR | FILE # OF CONFIG | REC # OF CONFIG |
|---|---|---|---|---|---|---|---|---|---|---|---|
| 1 | | | | | | | | | | | |
| 2 | | | | | | | | | | | |
| 3 | | | | | | | | | | | |
| 4 | | | | | | | | | | | |
| 5 | | | | | | | | | | | |
| | | | | | | | | | | | |
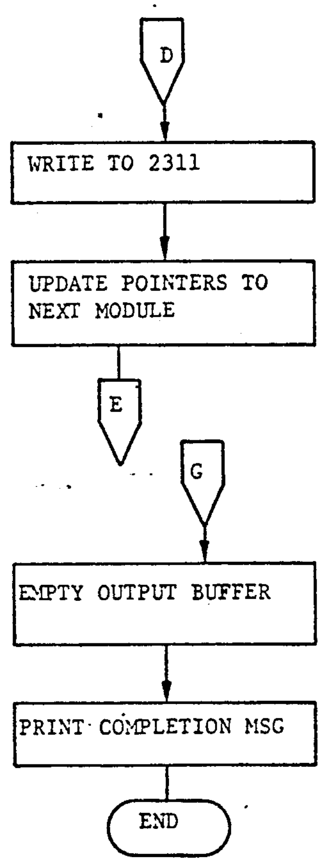
FINAL LAYOUT OF CORE
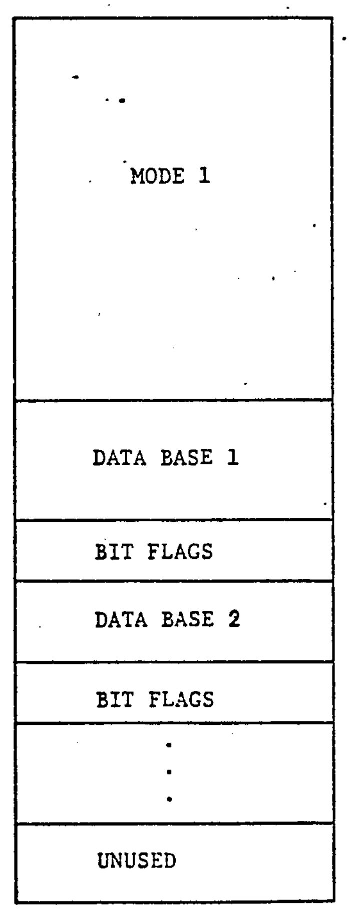

Data Base Builder (DATBX)

| | |
|---|---|
| Type | Non-process core load. |
| Function | Build and save on disk under a specified module name the object code block (executable procedures and data) for a given set of machines comprising the specified module. A disk-resident configuration list is accessed to obtain the order and names of the specific machines to be included. |
| Availability | Fixed area. |
| Use | Entered by //XEQ control card specifying name of the program. Data card following specifies the particular module. |
| Remarks | A "map" is printed showing the name and order of machines in the module, along with the name of the control program (procedure) referenced by each machine, and the total core requirement for the object code block. |
| Limitations | Object code block may not exceed 8K. Intended for use with a particular file structured disk containing pre-stored module names and configuration lists for each module, and pre-stored object code for each procedure referenced, and pre-stored object code MDATA blocks for each machine referenced. |
| Flowchart | Described in TABLE XXXIb. |

TABLE XXXIb
DATA BASE BUILDER
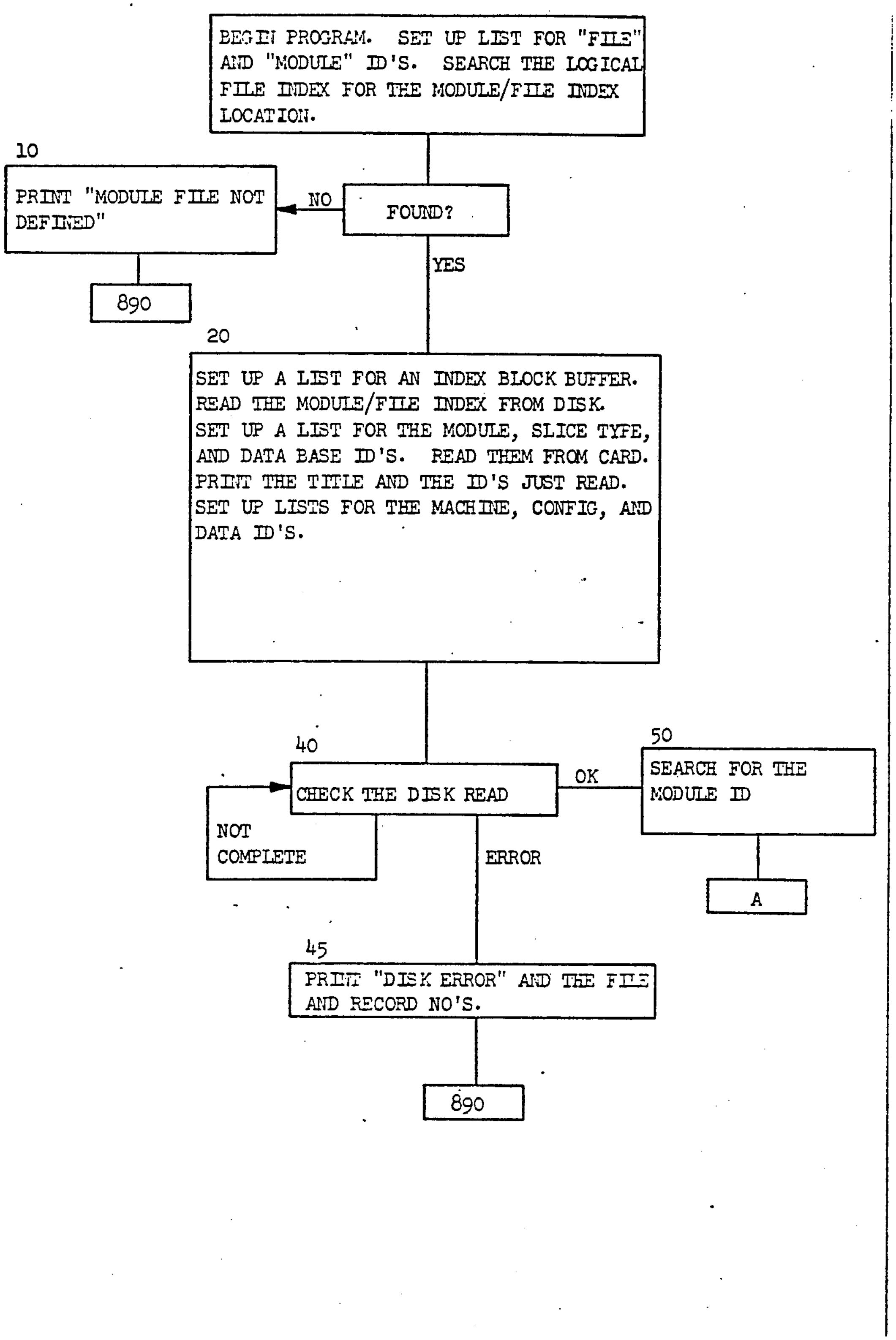

TABLE XXXIb (cont'd)
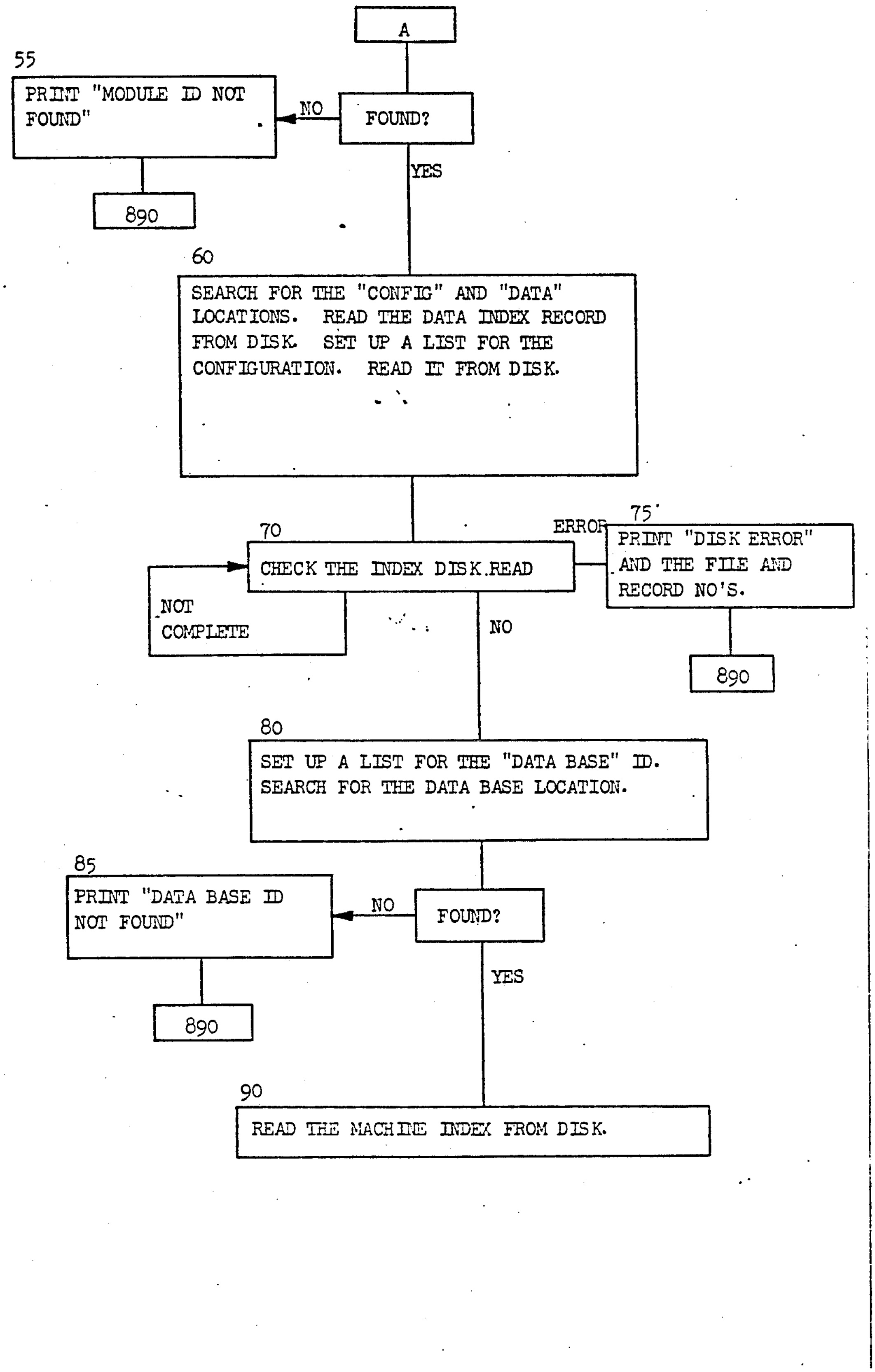

TABLE XXXIb (cont'd)
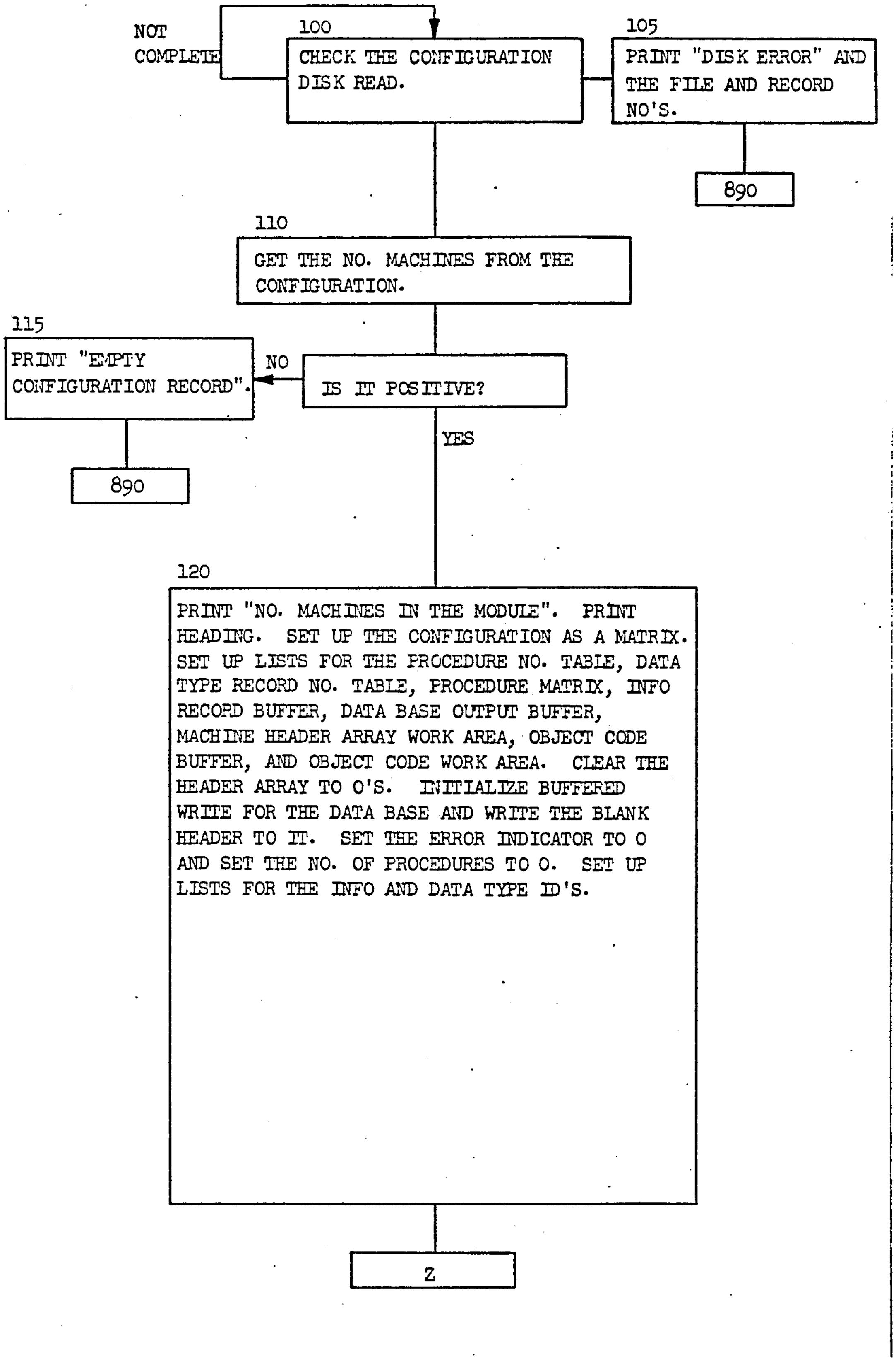

TABLE XXXIb (cont'd)
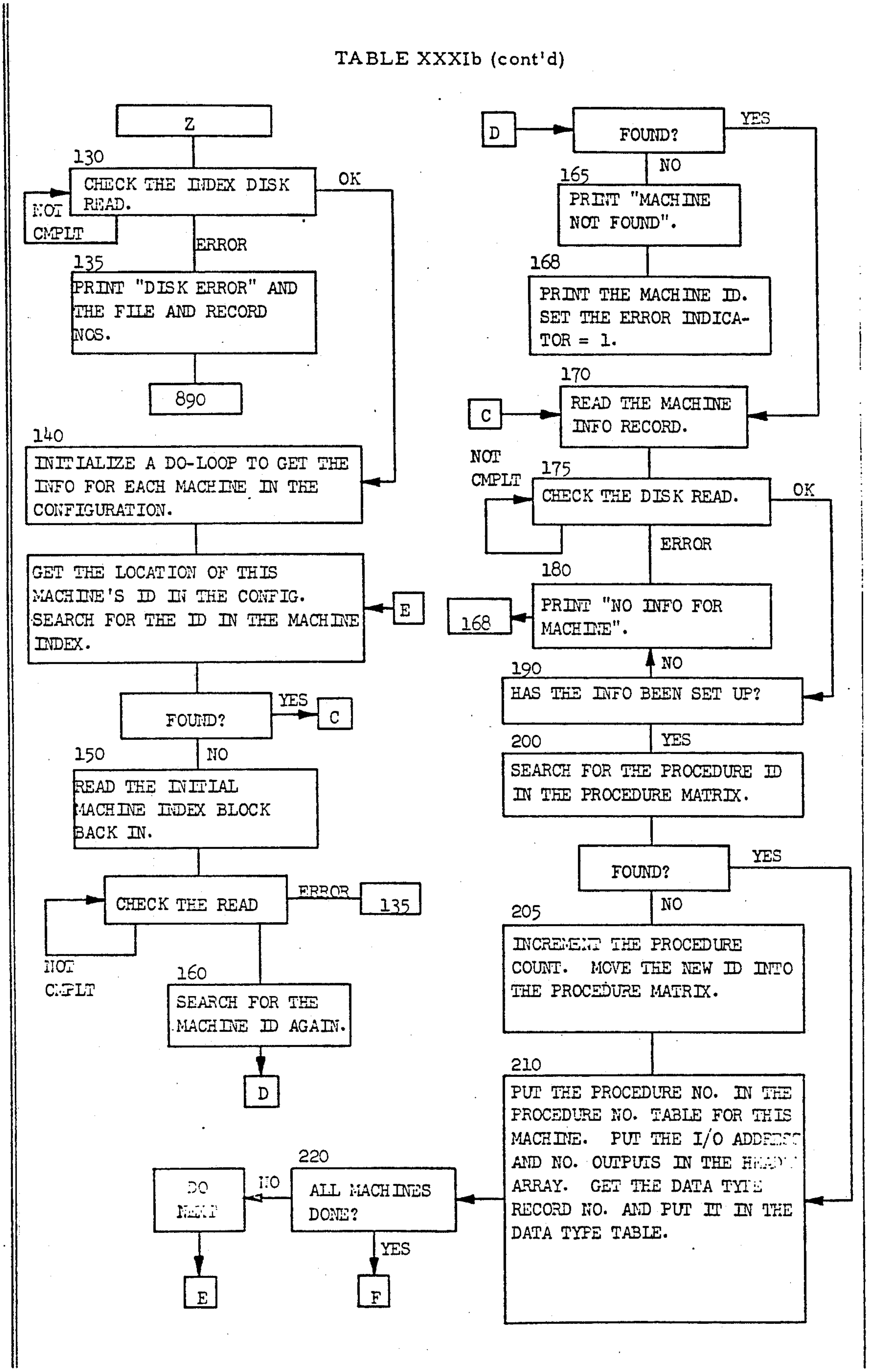

TABLE XXXIb (cont'd)
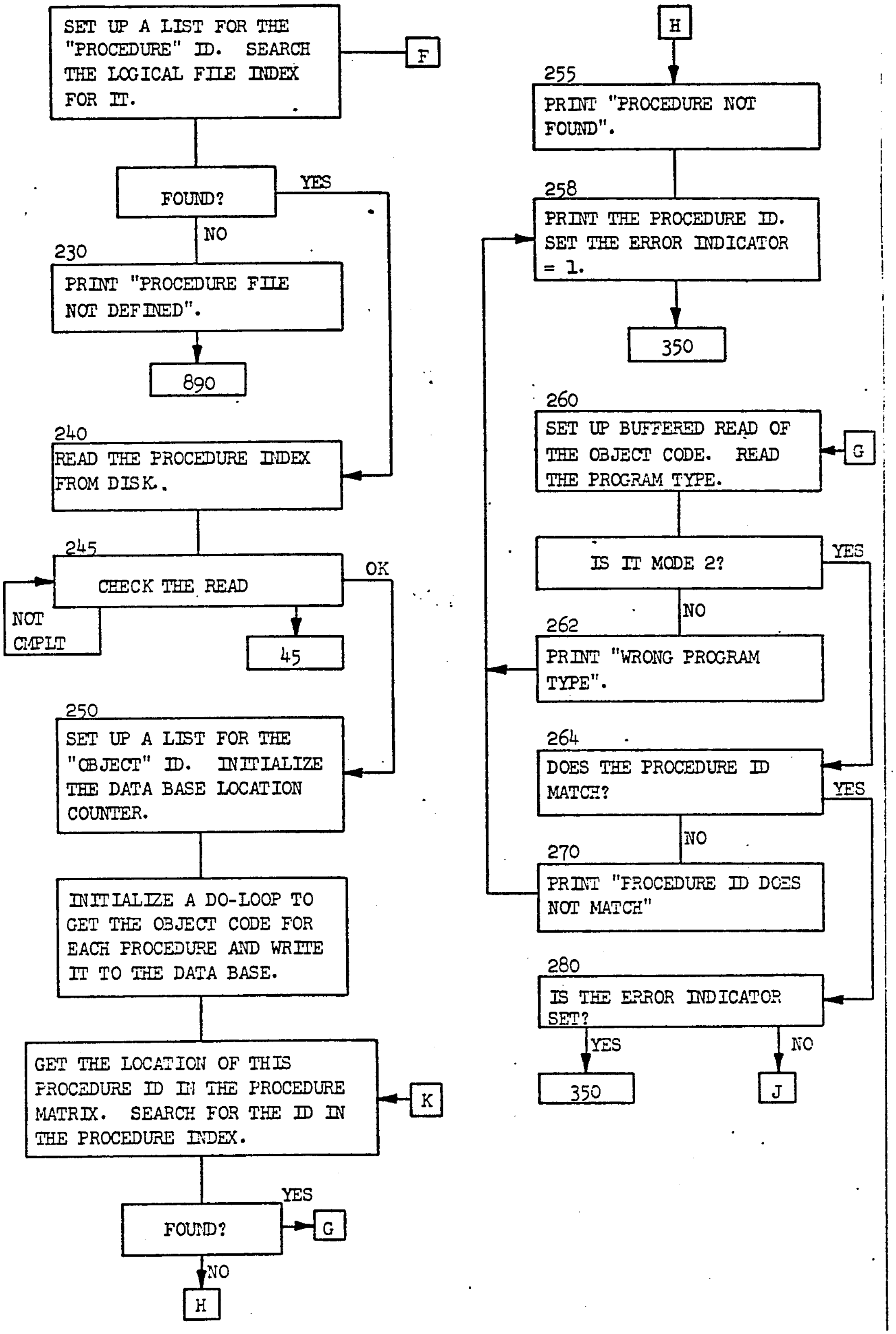

TABLE XXXIb (cont'd)
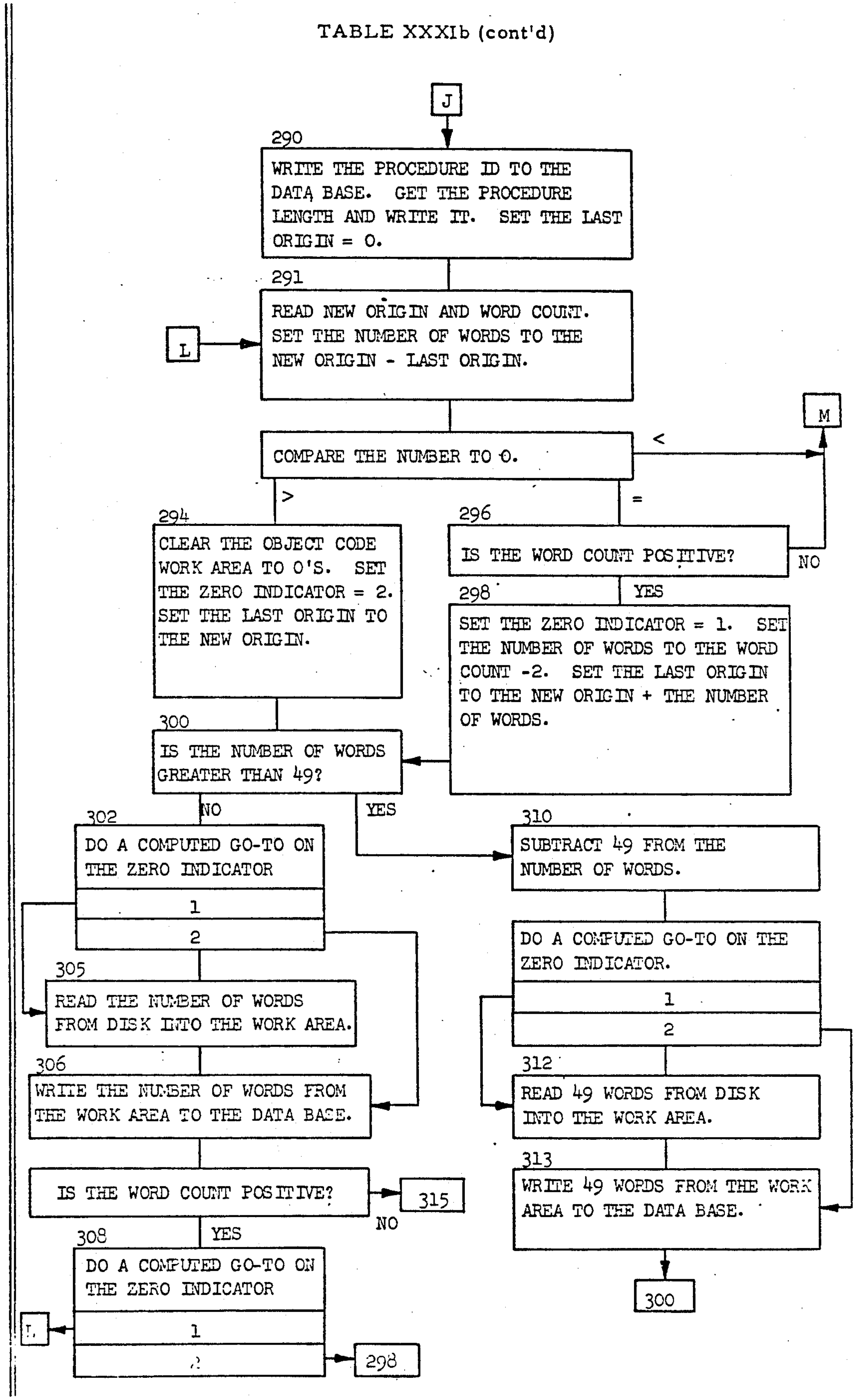

TABLE XXXIb (cont'd)
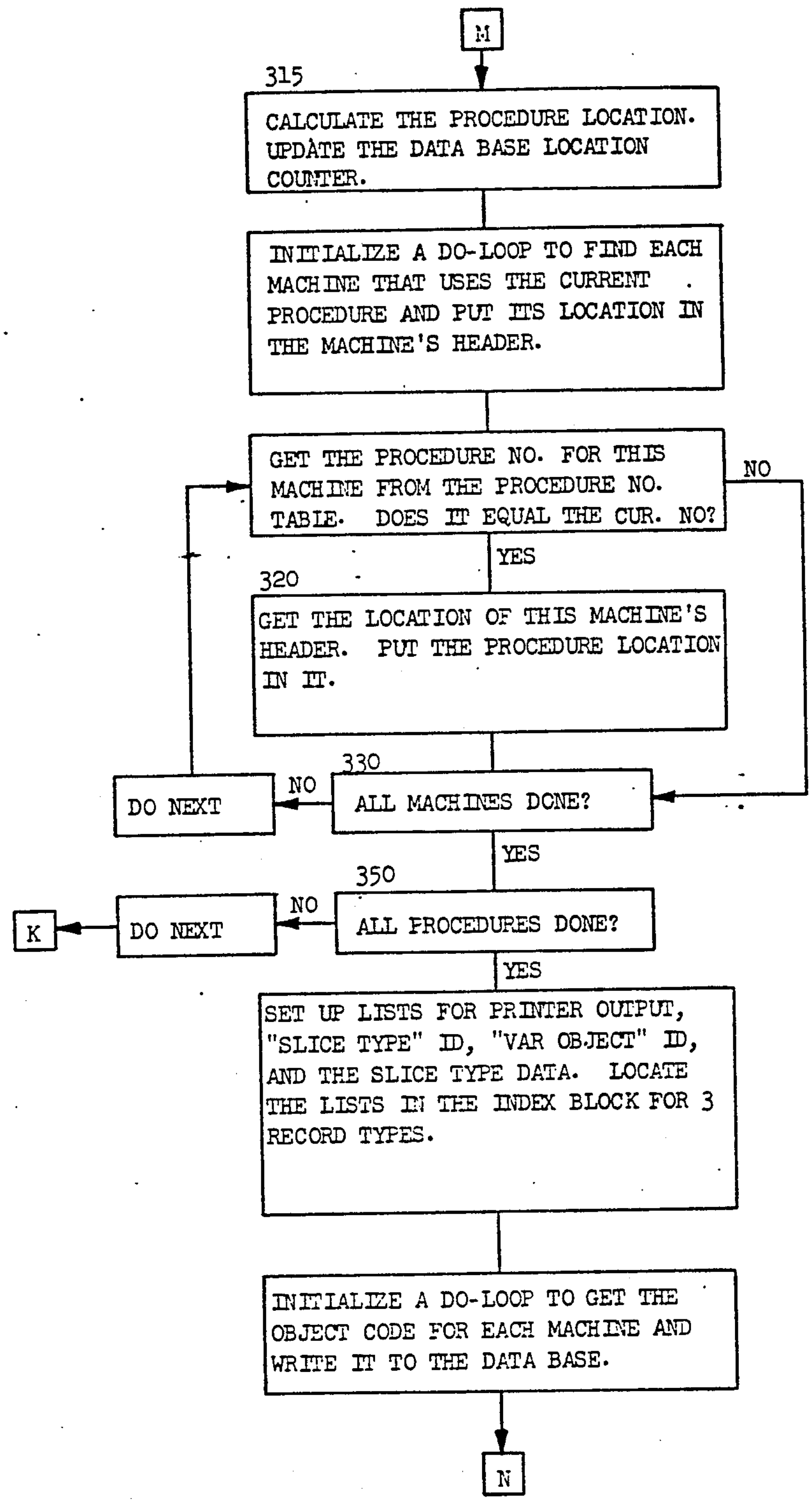

TABLE XXXIb (cont'd)
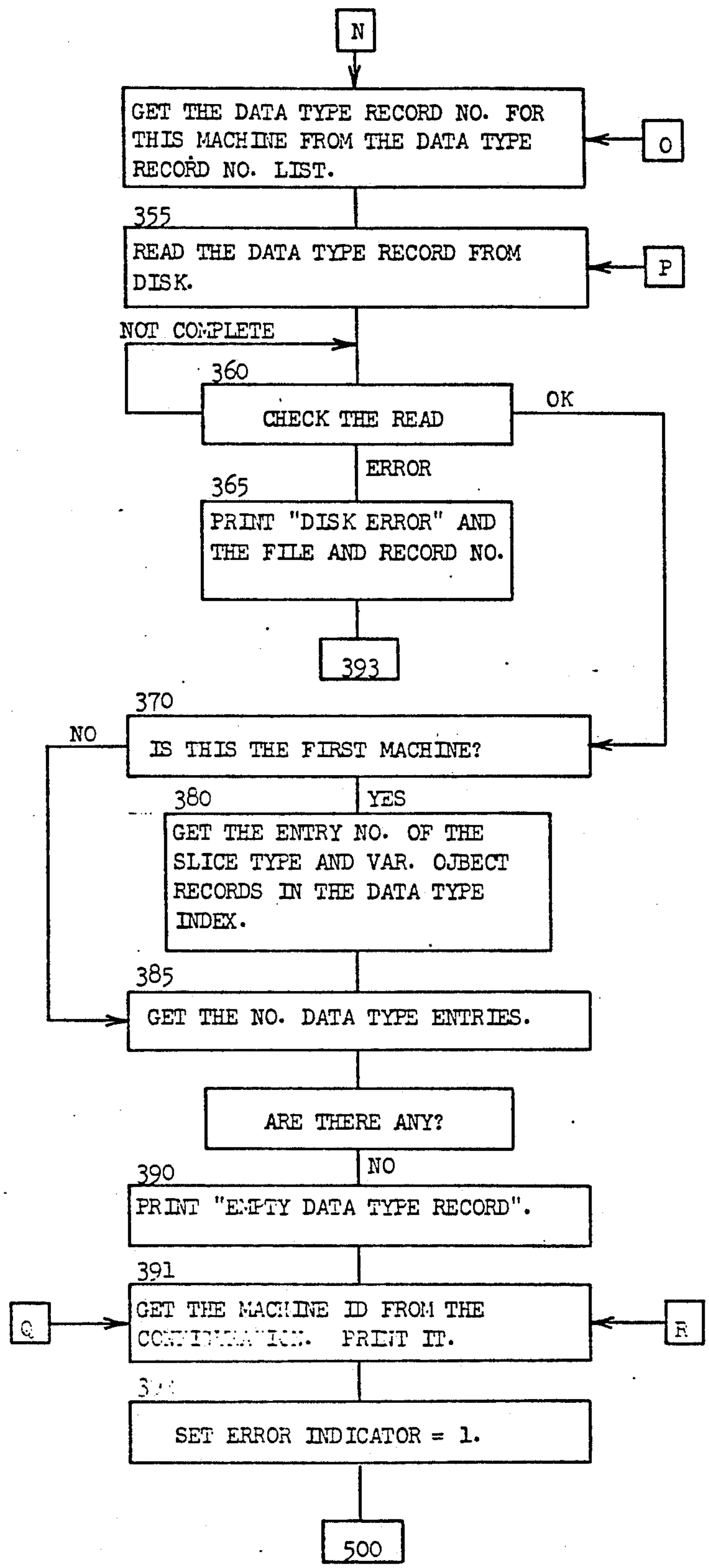

TABLE XXXIb (cont'd)
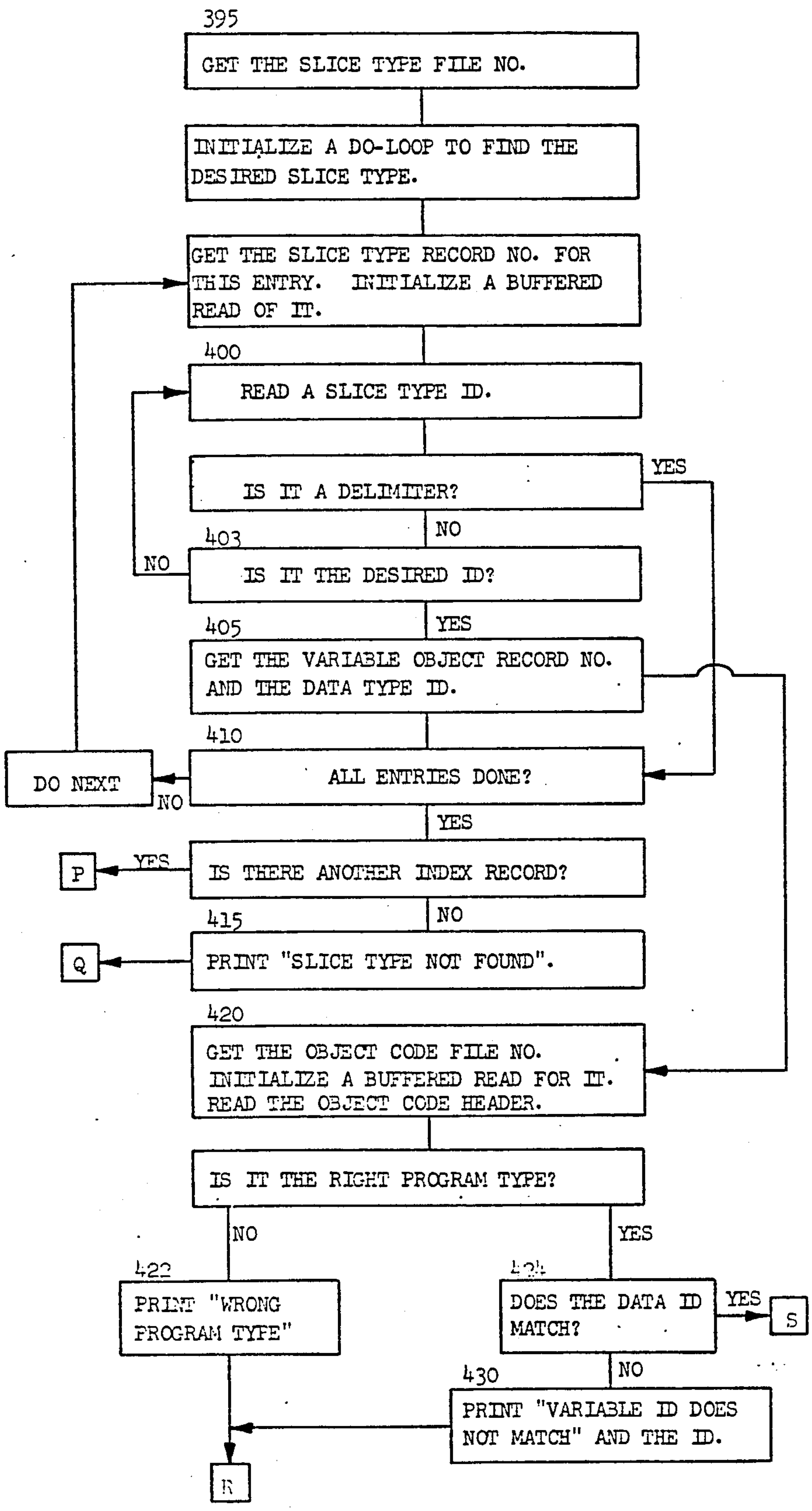

TABLE XXXIb (cont'd)
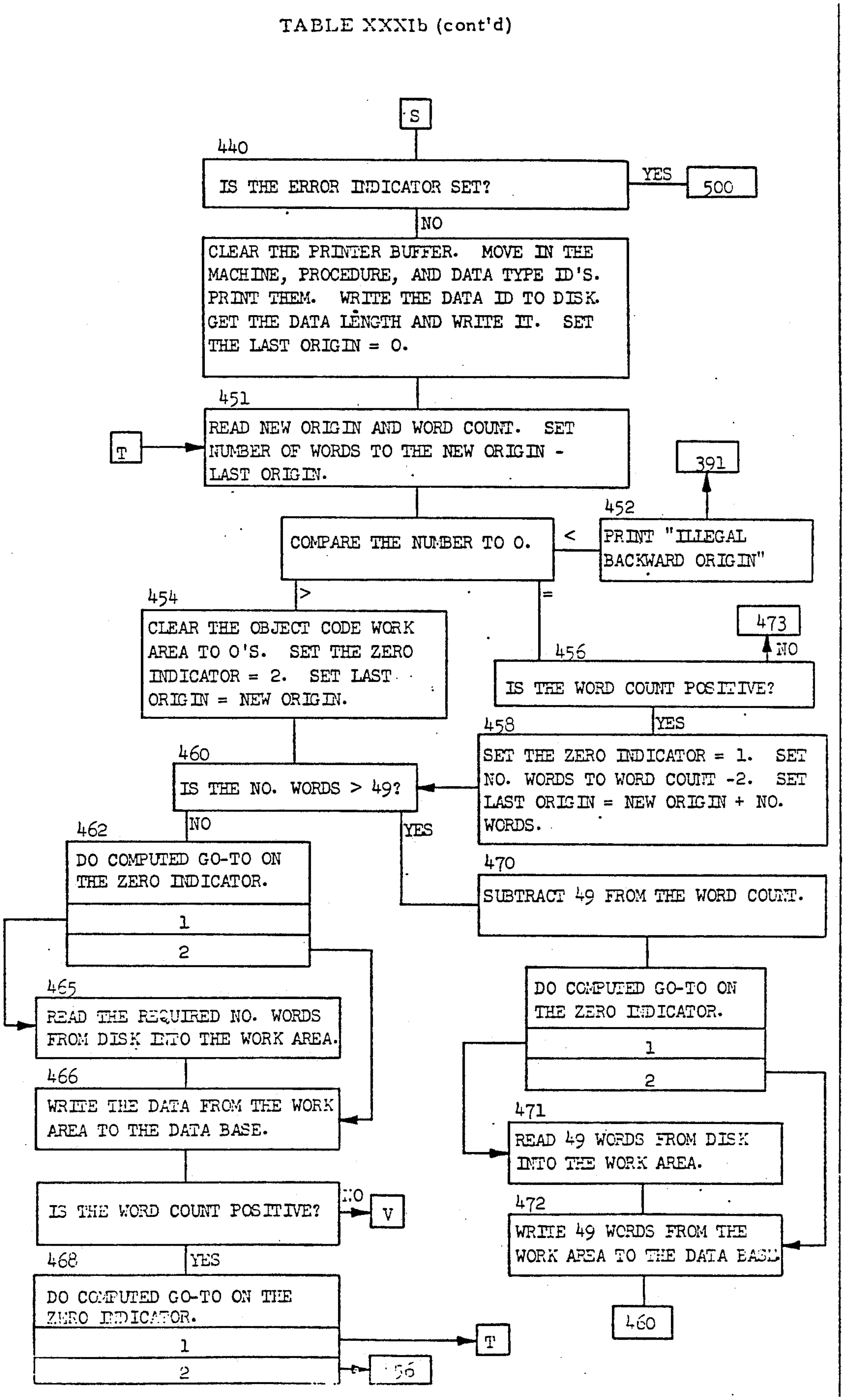

TABLE XXXIb (cont'd)
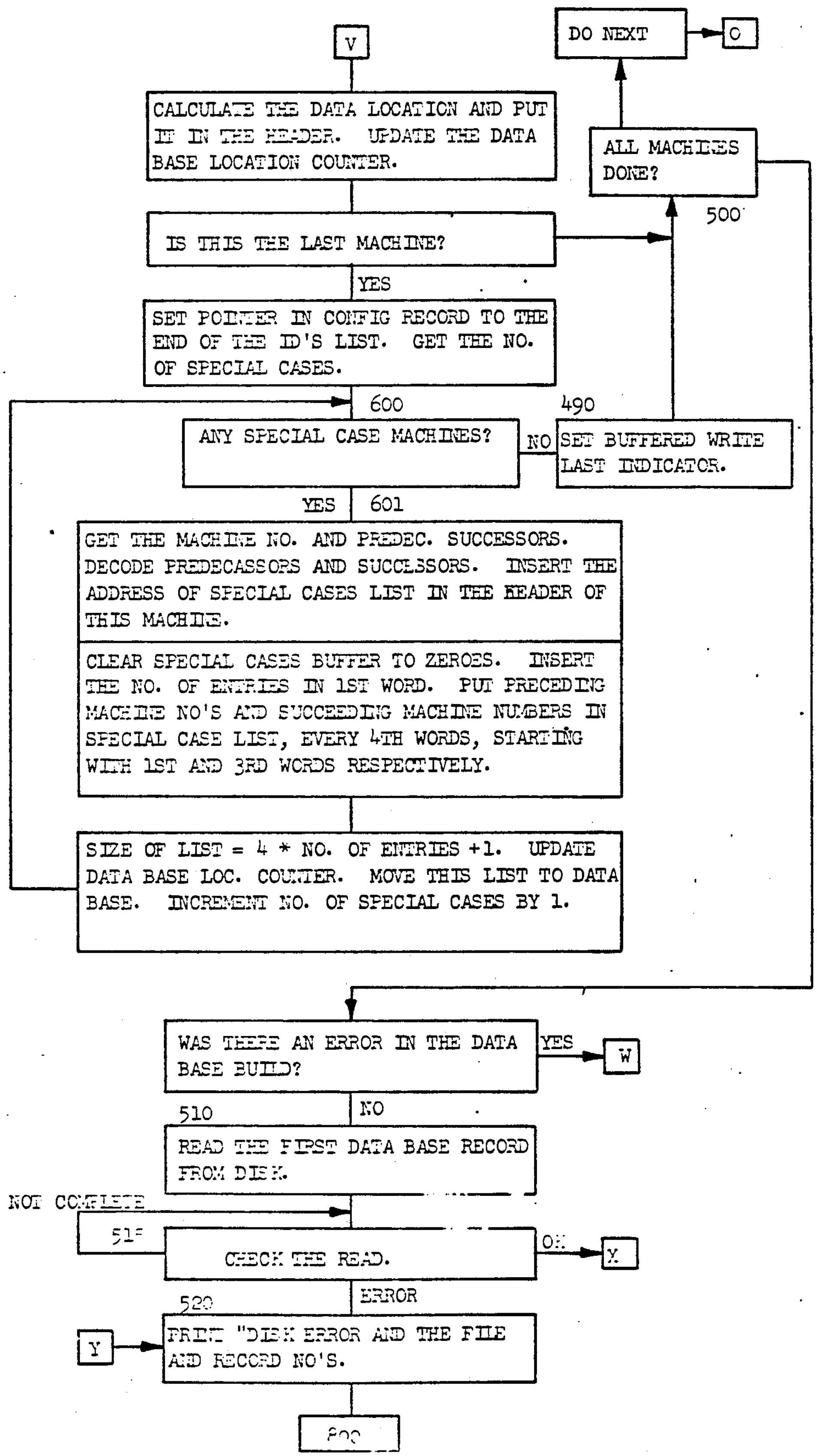

TABLE XXXIb (cont'd)
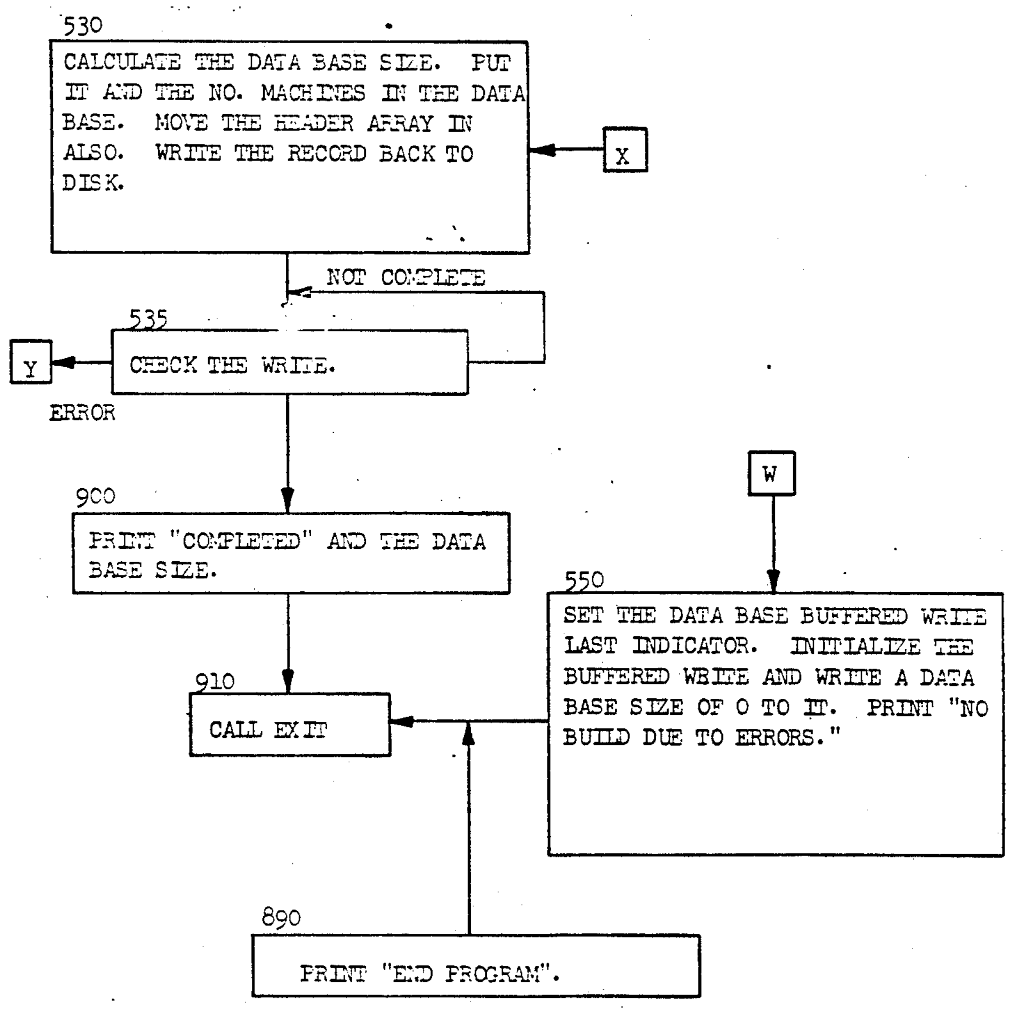

Access Logical File (MACLF)

| | |
|---|---|
| Type | Non-process core load. |
| Function | Allows user definition and maintenance of data files on the 2311 disk. Control cards (ampersand in column 1, followed by keywords for command) are read from a card reader. Ten character names for files and subfiles are recognized. |
| Availability | Fixed area. |
| Use | Entered by //XEQ control card specifying name of program. Data cards following specify the desired user options. |
| Remarks | The control cards recognized by the program are: |

@ NEWFILE IIIIIIIII

Used to define files and subfiles. The specified name may be ten characters in length. Special control cards specifying size and number of records follow.

@ STORE

Used to initialize file or subfile contents as specified on following data cards. Terminated by @ card.

@

Used to terminate an initialize function's data cards.

@ ACCESS JJJJJJJJJ/KKKKKKKKKK

Used to access a particular subfile (KKKKKKKKKK) of a defined file or subfile (JJJJJJJJJ). May be followed by any control card except @ .

@ BACK

Used to access one superfile level of the current subfile accessed (opposite of@ ACCESS function).

@ ADD LLLLLLLLL

Used to add one entry LLLLLLLLL to the current accessed subfile.

@ DELETE MMMMMMMMM

Used to delete one entry MMMMMMMMM to the current accessed subfile.

@ LIST

Used to list the entries of the current accessed subfile.

@END

Used to terminate execution of MACLF program.

| | |
|---|---|
| Note | Error messages are printed if named files or subfiles cannot be properly handled according to the desired control option. |
| Limitations | Intended for use with 2311 type disk. |
| Flowchart | Described in TABLE XXXIc. |

TABLE XXXIc
ACCESS LOGICAL FILE
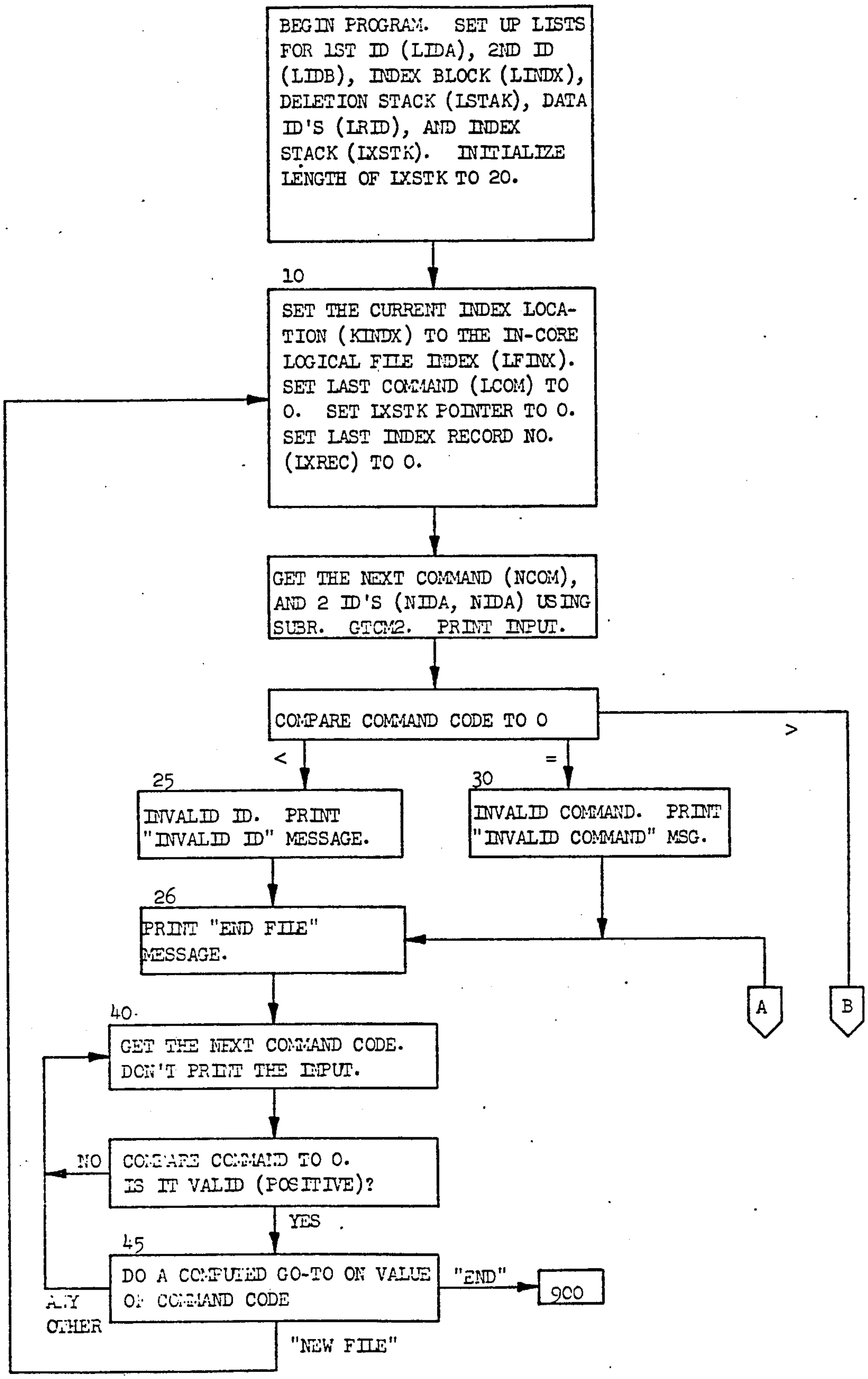

TABLE XXXIc (cont'd)
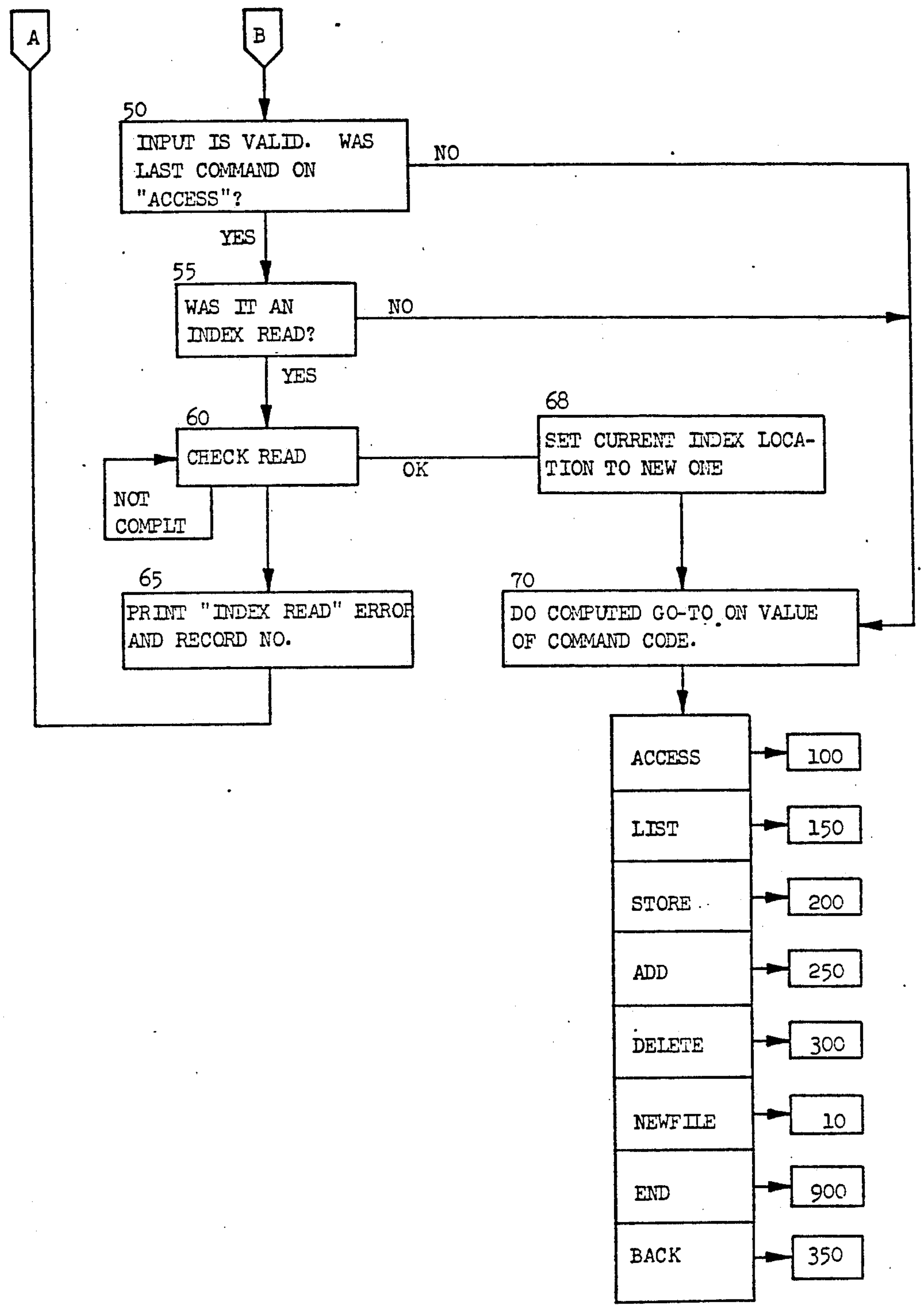

TABLE XXXIc (cont'd)
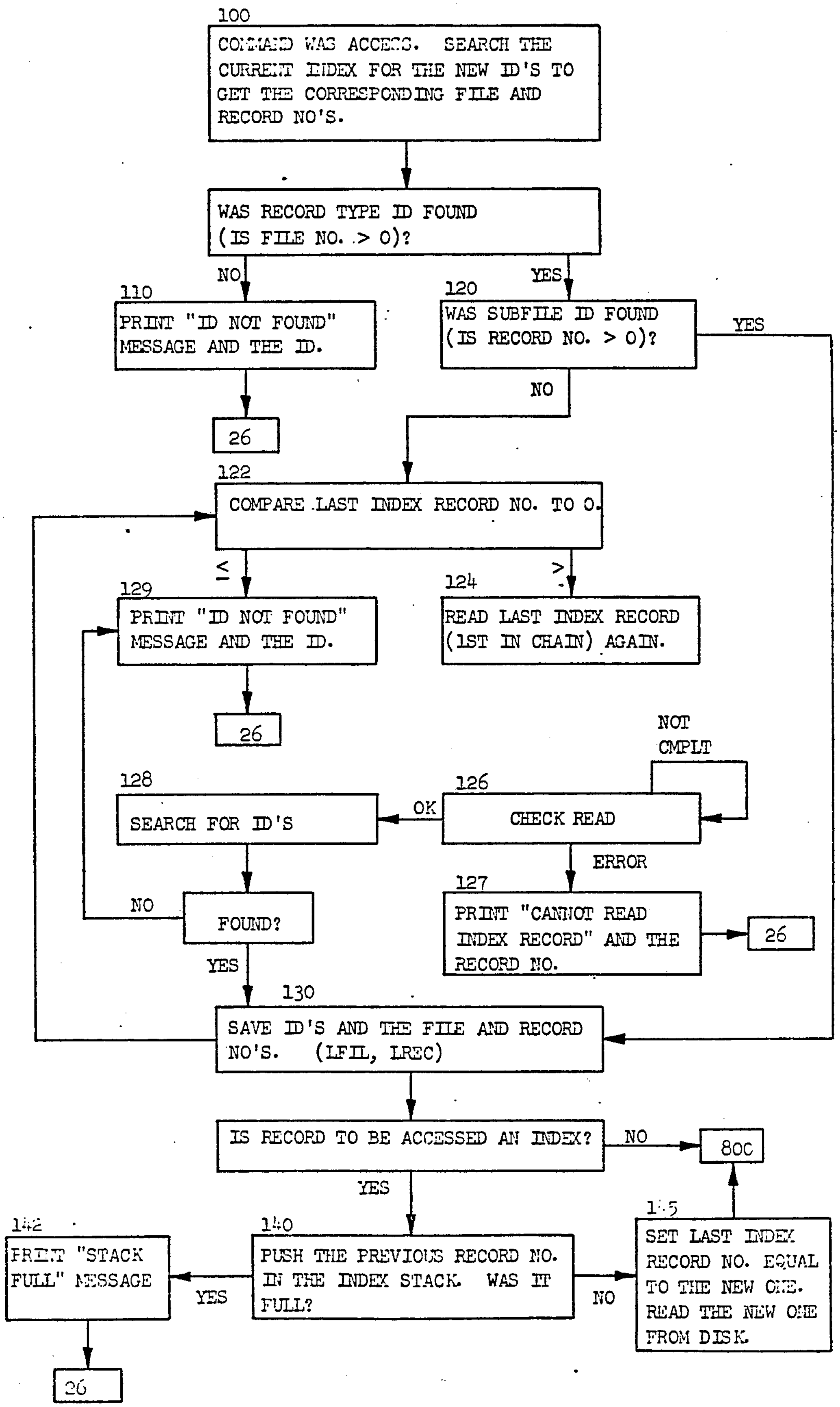

TABLE XXXIc (cont'd)
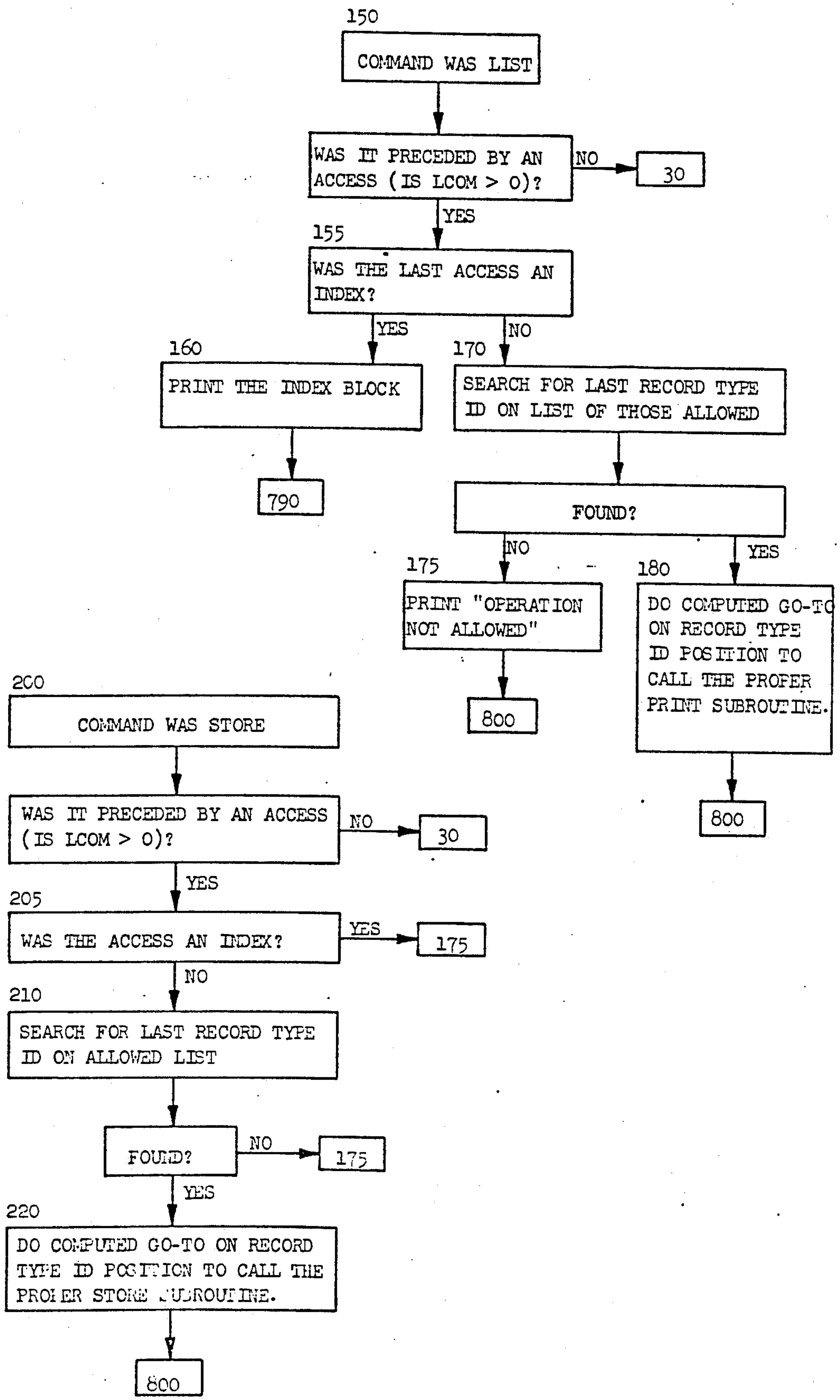

TABLE XXXIc (cont'd)
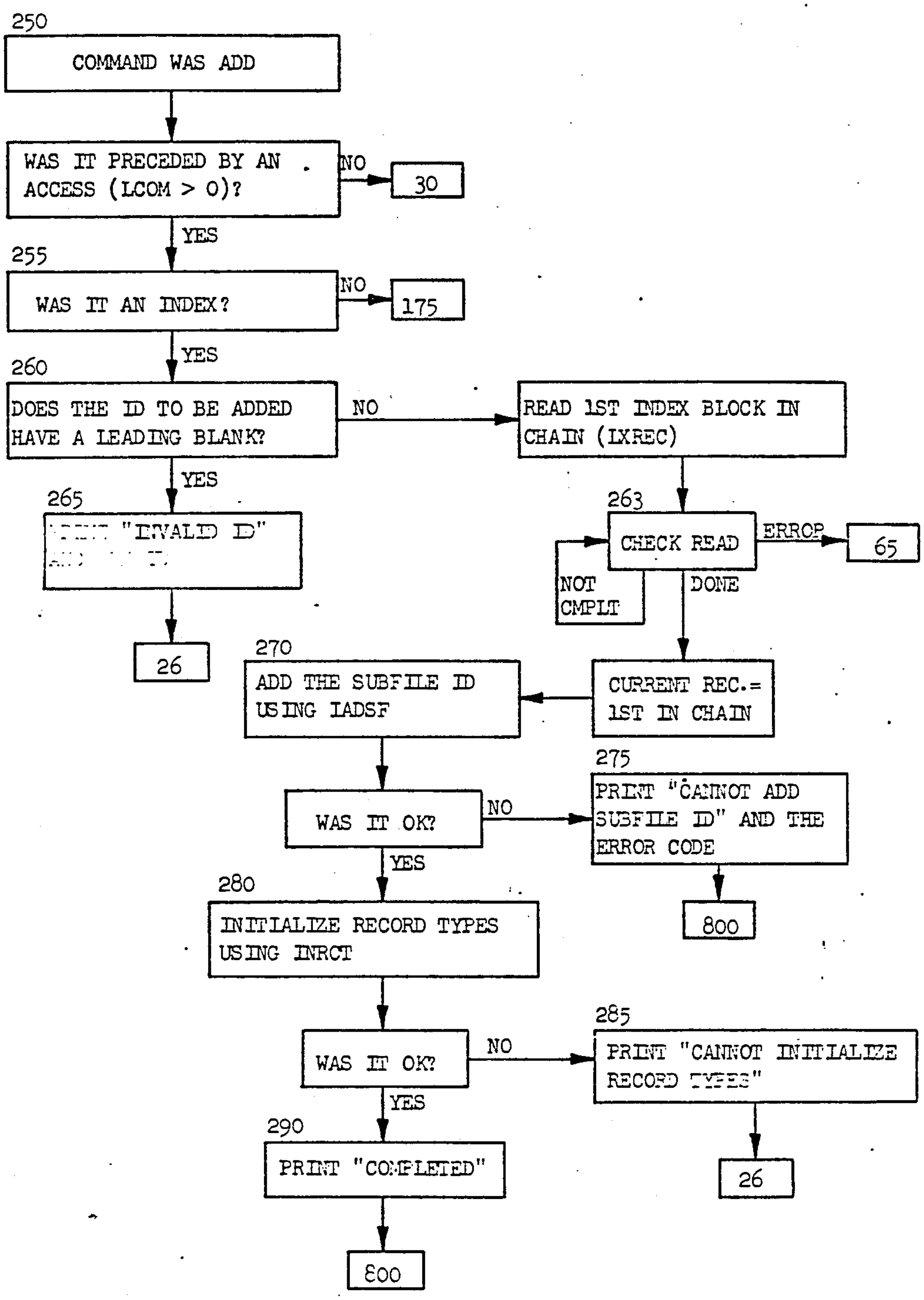

TABLE XXXIc (cont'd)
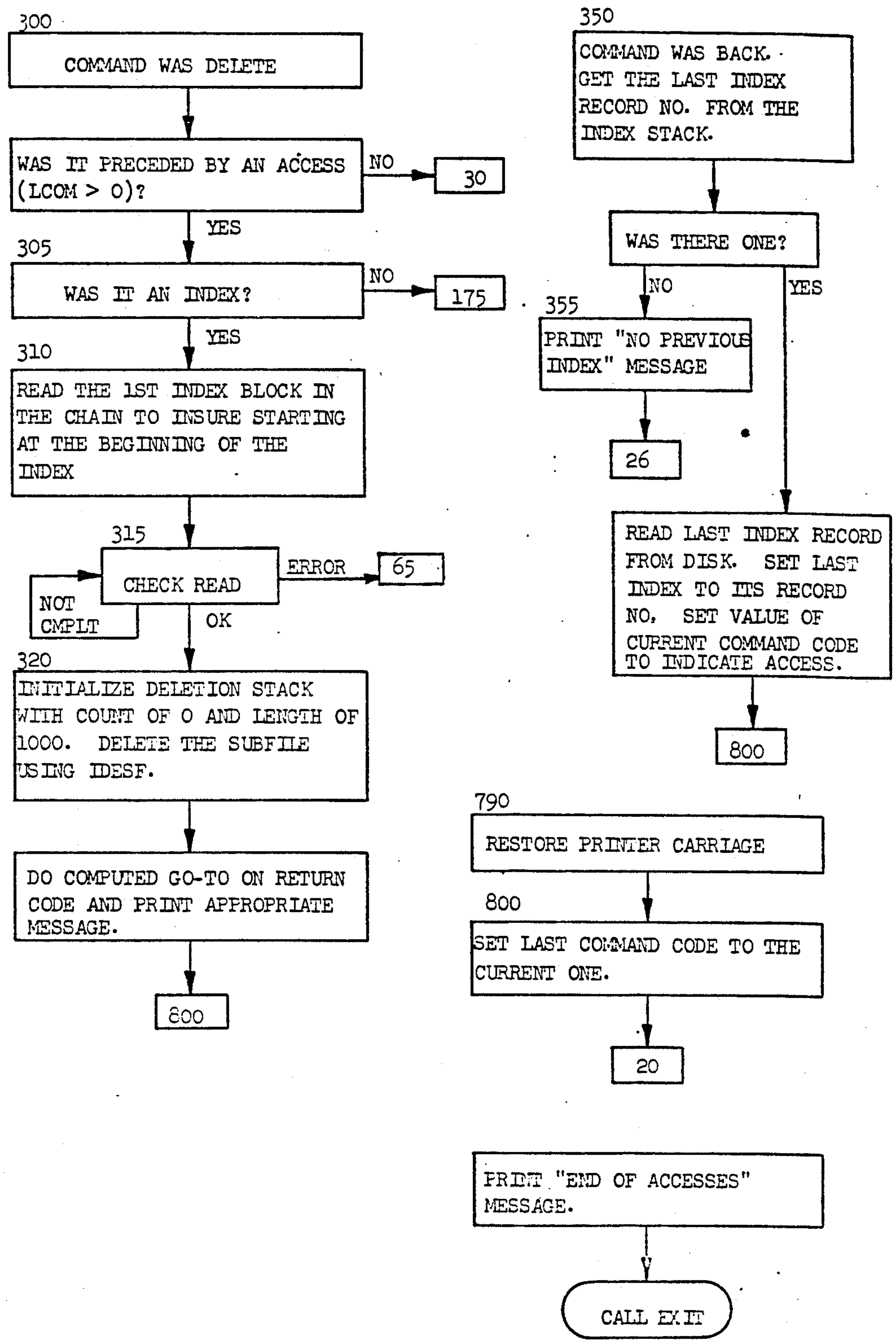

2540 BOOTSTRAP

| | |
|---|---|
| Type | Absolute (core image) program for 2540M computer. |
| Function | Sets interrupt status and list word substitution required for communication between host computer and 2540M computer, supports two communications approximately 8000 computer words long, and provides transfer to known location for beginning of Cold Start program execution when successful transfer complete is acknowledged by host. |
| Availability | Punched paper tape for auto-load function of 2540M. |
| Use | Entered through auto-load function of 2540M via paper tape, followed by manual transfer to location /3FB4. |
| Remarks | Program will retry, if unsuccessful transmission is indicated by host computer. |
| Limitations | Intended for use with Segmented Loader program in host computer, communicating through RCCA communications network. |
| Flowchart | Described in TABLE XXXId. |

TABLE XXXId
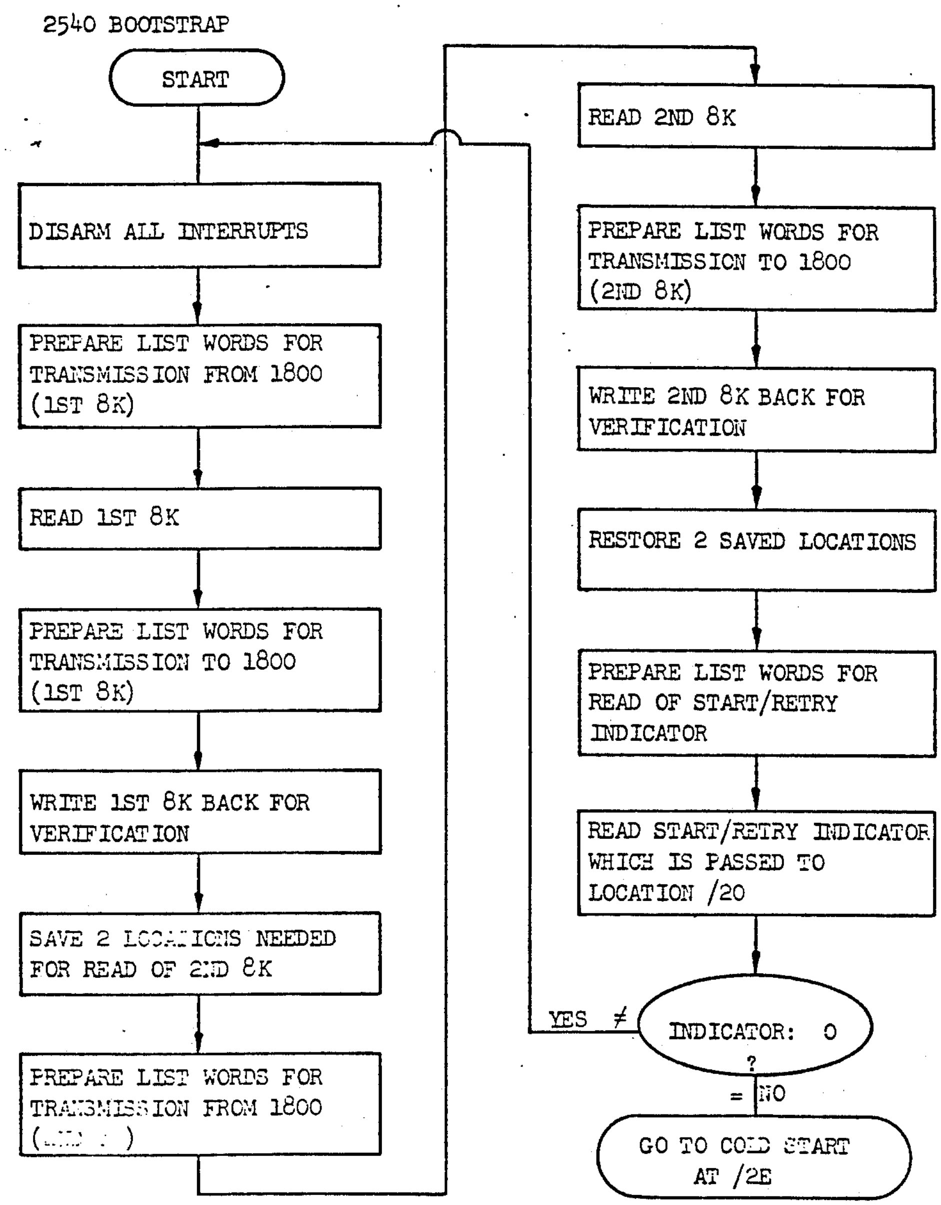

LOAD 2540

| | |
|---|---|
| Type | Process core load. |
| Function | Finds a core load that has previously been built and stored on the 2311 disk and, depending on the option entered by the user, sends the core load to the specified 2540 and/or dumps it. The dump may be to cards and/or the printer. A selective dump is also provided which allows the dumping of any portion of the core load. |
| Availability | Fixed Area. |
| Use | Enter through 'LOAD 2540' from keyboard dictionary or data switches. If the partial dump is chosen, a limit card must be read in with the hex lower limit in Cols. 1-4 and the hex upper limit in Cols. 10-13. |
| Remarks | Sense switch 4 indicates that the user's option has been entered through the data switches. Therefore, SS4 MUST be entered LAST and the switches must NOT be changed after execution has started. |
| Limitations | Both a partial dump and the sending of a complete core load to a 2540 is not allowed during one execution. |

LOAD 2540 (continued)

| | |
|---|---|
| Modifications | 1. Add a lead-back check. For the purpose of checking the transfer the coreload is read from the 2540 and compared, word by word with the coreload on disk.<br>2. Sense switch 7 may be used as a "kill" button to stop the dump.<br>3. The current time, date, and day of week is put into the coreload for use with the badge reader. |
| Flow Chart | Described in TABLE XXXIe. |

TABLE XXXIc
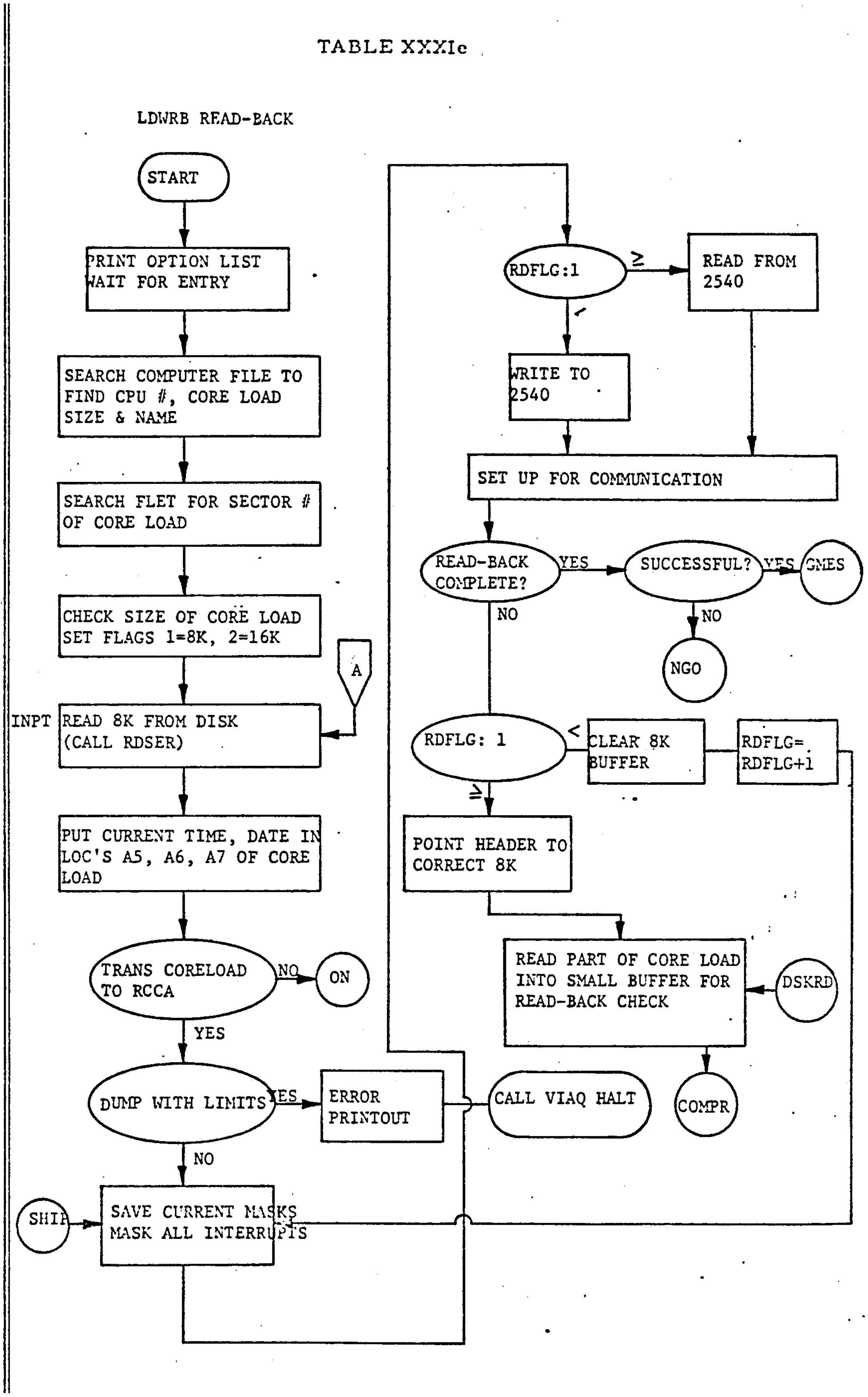

TABLE XXXIe (cont'd)
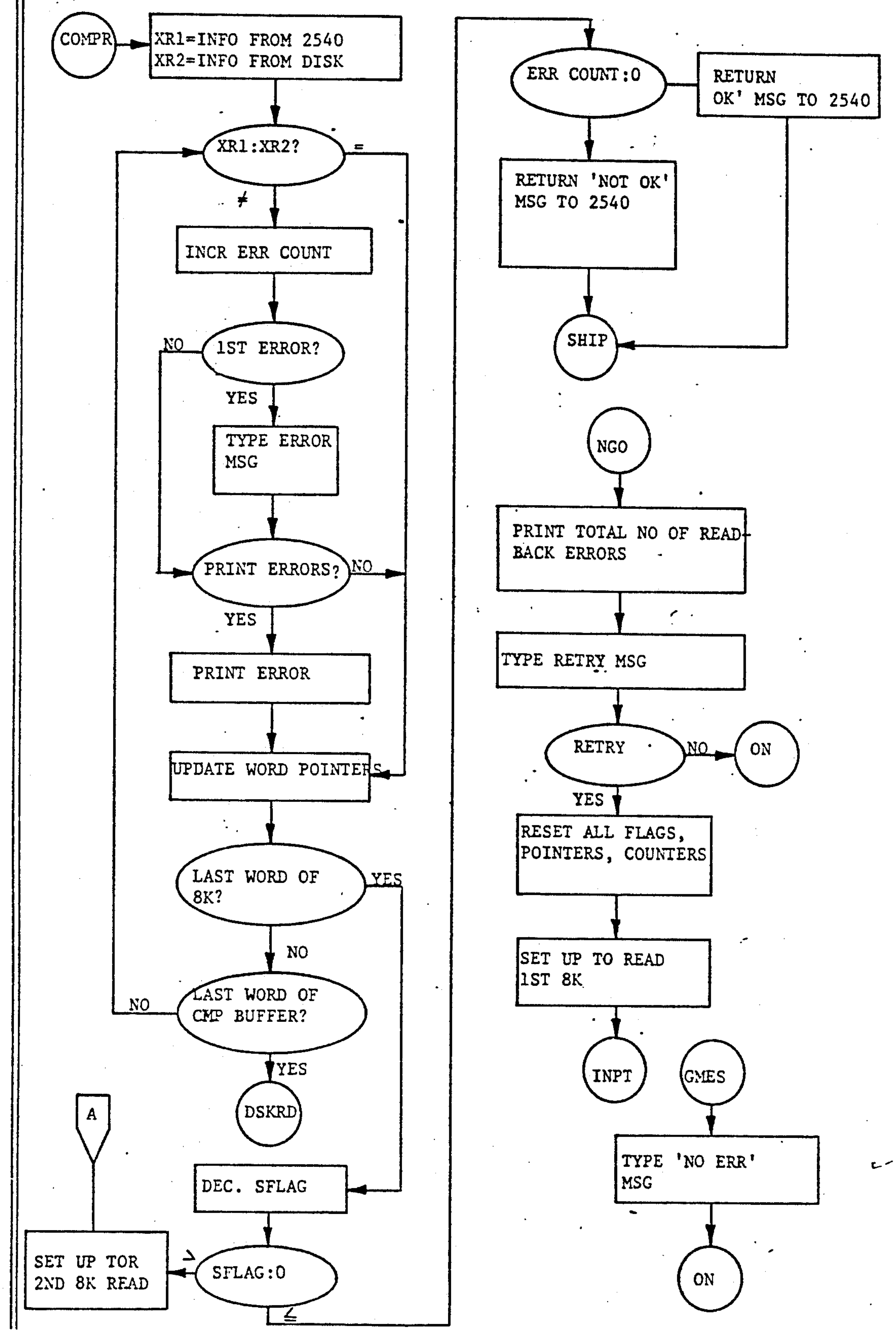

TABLE XXXIe (cont'd)
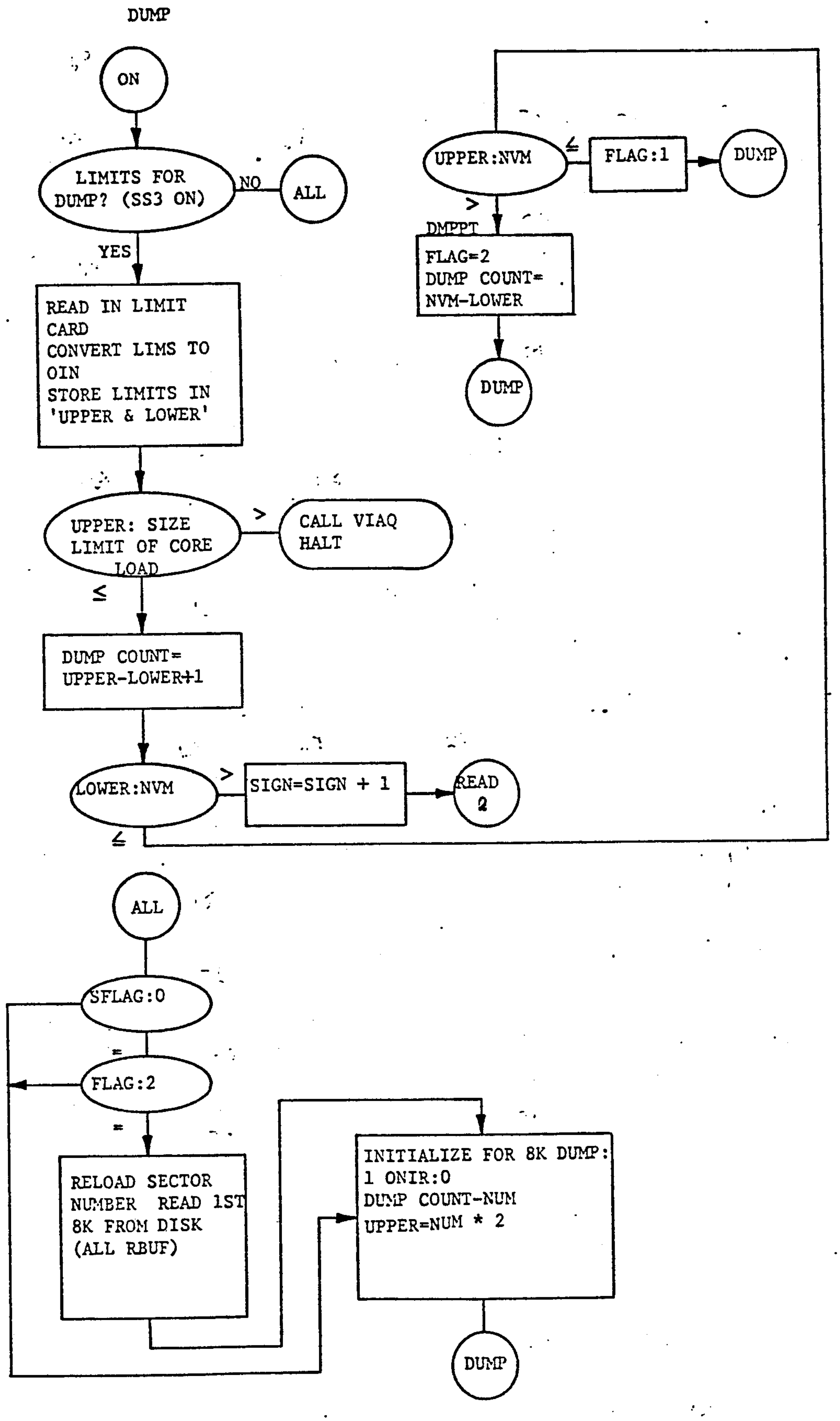

TABLE XXXIe (cont'd)
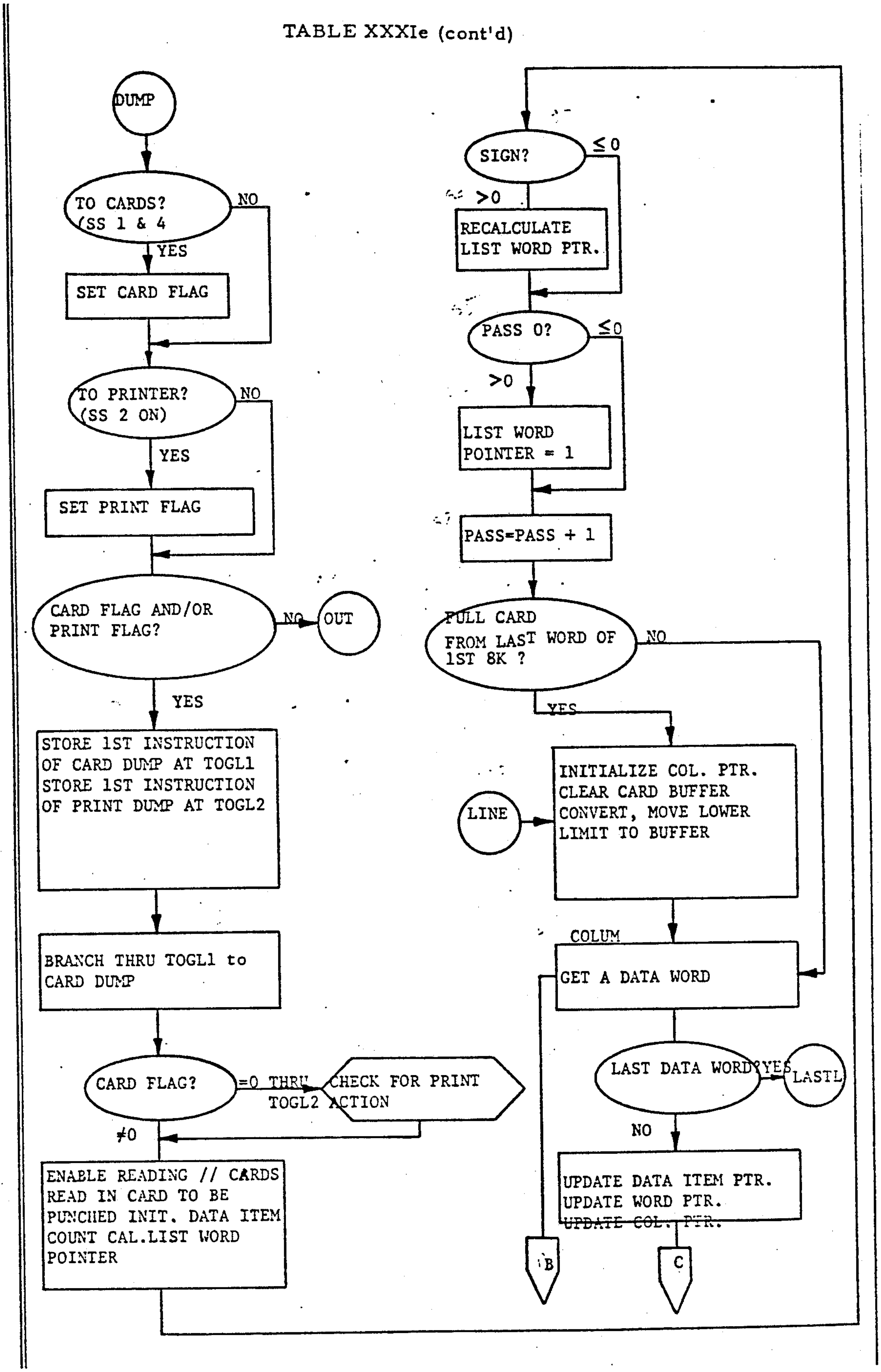

TABLE XXXIe (cont'd)
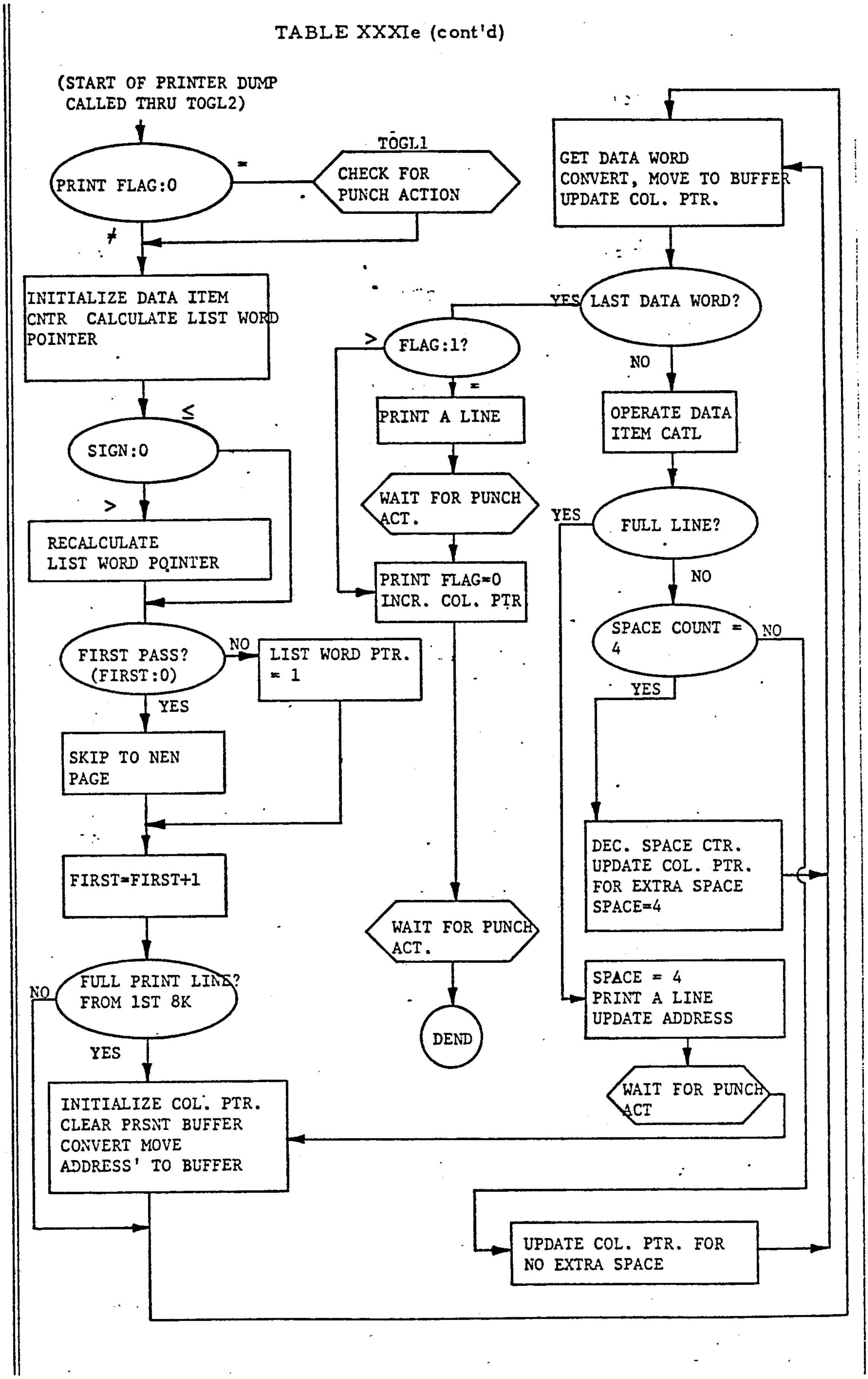

TABLE XXXIe (cont'd)
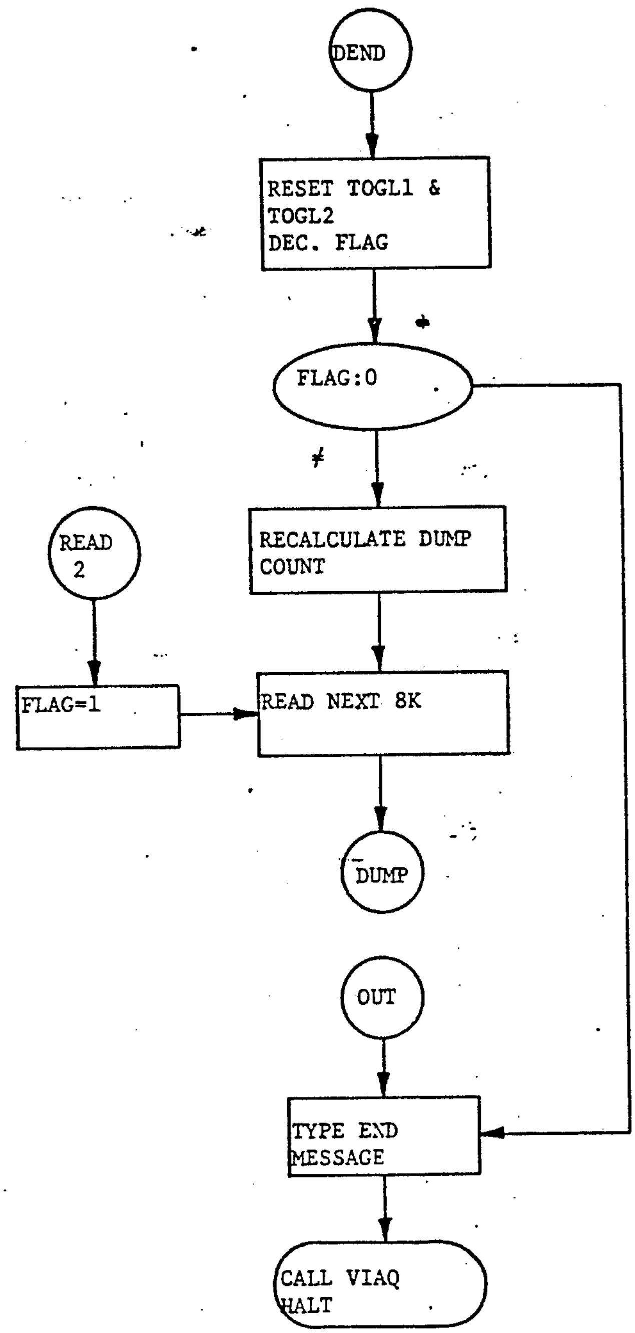

TABLE XXXIe (cont'd)
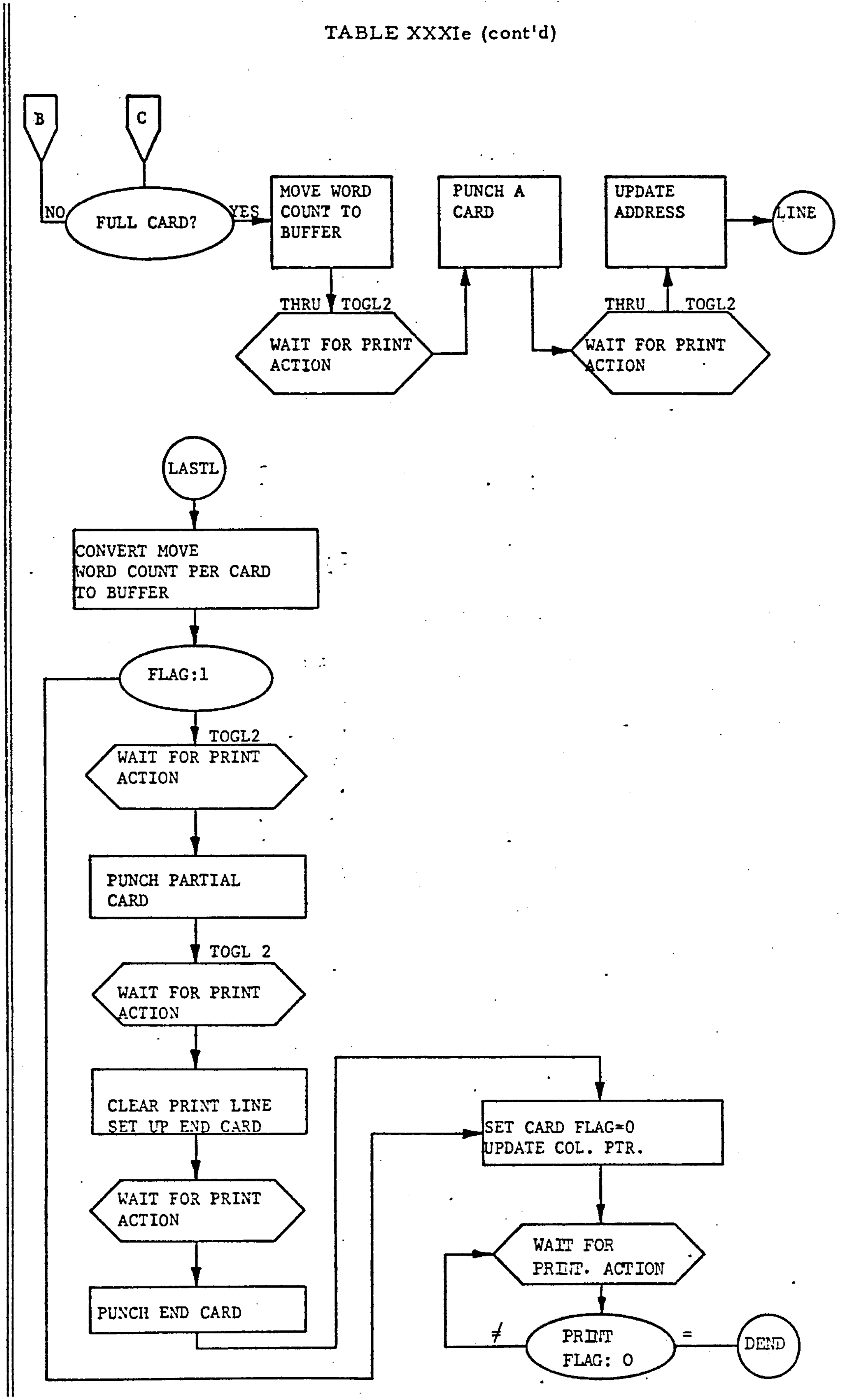

CONCLUSION

Several embodiments of the invention have now been described in detail. It is to be noted, however, that these descriptions of specific embodiments are merely illustrative of the principles underlying the inventive concept. It is contemplated that various modifications of the disclosed embodiments, as well as other embodiments of the invention will, without departing from the spirit and scope of the invention, be apparent to persons skilled in the art.

What is claimed is:

1. A method for controlling the operation of an assembly line comprised of a plurality of work stations utilizing a computer having stored in its memory work station operation programs, which control the operation of each work station of said assembly line, and a supervisory program causing said computer to perform the following steps:

(a) during execution of said supervisory program, sequentially checking the state of each work station to determine whether said work station requires control;

(b) initiating the execution of the work station operation program of each work station if said work station requires control;

(c) executing portions of said work station operation program to initiate operation groups by said work stations individually to the extent to which said work stations require control; and (d) allowing each work station to continue the operating group independently of the work station operation programs until said supervisory program determines a further control is required to provide an independent asynchronous operation of each work station with respect to any other work station of said assembly line.

2. The method according to claim 1 wherein each work station operation program includes:

(a) requesting a workpiece from preceding work station within said assembly line;

(b) preparing for the arrival of said workpiece;

(c) acknowledging receipt of said workpiece to said preceding work station;

(d) starting processing of said workpiece;

(e) informing following work station that the processing of said workpiece is complete and said workpiece is ready for release; and (f) releasing the workpiece to said following work station and informing said following work station when said workpiece exits.

3. A method of controlling the asynchronous operation of an assembly line provided with a plurality of work stations for processing workpieces utilizing a computer having a work station operation control routine stored therein comprising the steps of:

(a) setting an indicator in said computer to request a workpiece from an adjacent upstream work station;

(b) controlling said work station to begin preparation for said workpiece;

(c) setting indicator in said computer to acknowledge receipt of said workpiece from said upstream work station;

(d) controlling the beginning of one or more processing steps by said work station upon said workpiece;

(e) setting indicator in said computer to inform an adjacent downstream station when processing of said workpiece is complete and said workpiece is ready for release;

(f) releasing said workpiece to said downstream work station; and (g) setting an indicator in said computer when said workpiece exits from said work station.

4. A method of controlling asynchronous operation of an assembly line having a plurality of work stations for processing workpieces utilizing a computer, which has a work station operation control routine stored in said computer to cause said computer to perform the following operations upon execution of said operation control routine, comprising the steps of:

(a) controlling beginning of one or more processing steps by said work station upon said workpiece;

(b) setting an indicator in said computer to inform an adjacent downstream work station when the processing of said workpiece is complete and said workpiece is ready for release;

(c) controlling beginning of release of said workpiece to said downstream work station; and (d) setting an indicator in said computer to inform said downstream work station when said workpiece exits from said work station.

5. A method of controlling the asynchronous operation of an assembly line provided with a plurality of work stations utilizing a computer having stored in a memory thereof programs including work station operation programs for controlling the operation of each work station of said assembly line, comprising the steps of:

(a) upon execution of said work station operation programs, initiating one or more processing steps by said work station upon workpieces disposed therein and setting a respective counter to a predetermined initial value;

(b) operating said respective counters until a preselected end value is reached;

(c) sequentially checking the status of said counters; and (d) executing portions of said work station operation program after said respective counter reaches said preselected end value.

6. A control system having a stored program computer for controlling the operation of an assembly line having a plurality of work stations for performing operations on a workpiece, said control system comprising:

(a) a memory for storing work station operating programs therein, each work station operating program controlling operations of one work station of said assembly line, said computer executing said work station operating program for initiation of operation groups by a said work station;

(b) work station control counters for counting from a set level, at least one work station control counter associated with each work station of said assembly line, said computer responding to said work station operating program to periodically set said work station control counter to a predetermined set level, each predetermined set level indicating the time interval required for said work station to complete a particular operation group; and (c) means for checking the value stored in each work station control counter for initiating further execution of said work station operation program after said counter reaches a predetermined end level.

7. A method for controlling the operation of an assembly line comprised of a plurality of work stations utilizing a computer having stored in its memory work station operation programs, which control the operation of each work station of said assembly line, and a supervisory program causing said computer to perform the following steps:

(a) during execution of said supervisory program, responding to any work station requiring control;

(b) initiating the execution of the work station operation program of each work station if said work station requires control;

(c) executing portions of said work station operation program to initiate operation groups by said work stations individually to the extent to which said work stations require control; and (d) allowing each work station to continue the operating group independently of the work station operation programs until said supervisory program determines a further control is required to provide an independent asynchronous operation of each work station with respect to any other work station of said assembly line.

* * * * *